United States Patent
Lin et al.

(10) Patent No.: US 12,216,326 B2
(45) Date of Patent: Feb. 4, 2025

(54) OPTICAL MEMBER DRIVING MECHANISM

(71) Applicant: TDK TAIWAN CORP., Taoyuan (TW)

(72) Inventors: Hsiang-Chin Lin, Taoyuan (TW);
Shou-Jen Liu, Taoyuan (TW);
Guan-Bo Wang, Taoyuan (TW);
Kai-Po Fan, Taoyuan (TW);
Chan-Jung Hsu, Taoyuan (TW);
Shao-Chung Chang, Taoyuan (TW);
Shih-Wei Hung, Taoyuan (TW);
Ming-Chun Hsieh, Taoyuan (TW);
Wei-Pin Chin, Taoyuan (TW);
Sheng-Zong Chen, Taoyuan (TW);
Yu-Huai Liao, Taoyuan (TW);
Sin-Hong Lin, Taoyuan (TW); Wei-Jhe Shen, Taoyuan (TW); Tzu-Yu Chang, Taoyuan (TW); Kun-Shih Lin, Taoyuan (TW); Che-Hsiang Chiu, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 796 days.

(21) Appl. No.: 17/214,125

(22) Filed: Mar. 26, 2021

(65) Prior Publication Data
US 2021/0302690 A1 Sep. 30, 2021

Related U.S. Application Data

(60) Provisional application No. 63/050,503, filed on Jul. 10, 2020, provisional application No. 63/041,459, (Continued)

(51) Int. Cl.
*G02B 7/09* (2021.01)
*G02B 7/02* (2021.01)
*H04N 23/54* (2023.01)

(52) U.S. Cl.
CPC .............. *G02B 7/09* (2013.01); *G02B 7/023* (2013.01); *G02B 7/025* (2013.01); *G02B 7/026* (2013.01);
(Continued)

(58) Field of Classification Search
CPC .......... G02B 7/09; G02B 7/023; G02B 7/025; G02B 7/026; G02B 27/646;
(Continued)

(56) References Cited

U.S. PATENT DOCUMENTS

2016/0178867 A1* 6/2016 Huang ................ G02B 13/009
359/696
2020/0057228 A1* 2/2020 Zhang .................... H04N 23/54

FOREIGN PATENT DOCUMENTS

CN 215340495 U 12/2021
TW 201631348 A 9/2016

OTHER PUBLICATIONS

Office Action dated Nov. 27, 2024 issued in corresponding Taiwan Patent Application No. 110111161, 3 pages.
(Continued)

*Primary Examiner* — James C. Jones
(74) *Attorney, Agent, or Firm* — Muncy, Geissler, Olds & Lowe, P.C.

(57) ABSTRACT

An optical member driving mechanism for connecting an optical member is provided, including a fixed portion and a first adhesive member. The fixed portion includes a first member and a second member, wherein the first member is fixedly connected to the second member via the first adhesive member.

9 Claims, 173 Drawing Sheets

Related U.S. Application Data filed on Jun. 19, 2020, provisional application No. 63/017,313, filed on Apr. 29, 2020, provisional application No. 63/000,604, filed on Mar. 27, 2020.

(52) U.S. Cl.
CPC ...... *G03B 2205/0069* (2013.01); *H04N 23/54* (2023.01)

(58) Field of Classification Search
CPC .. G03B 2205/0069; G03B 5/00; G03B 13/36; H04N 23/54; H02K 41/0356
See application file for complete search history.

(56) References Cited

OTHER PUBLICATIONS

Office Action issued on Nov. 27, 2024 for the corresponding Application No. 202110328160.9 in China, 7 pages.

* cited by examiner

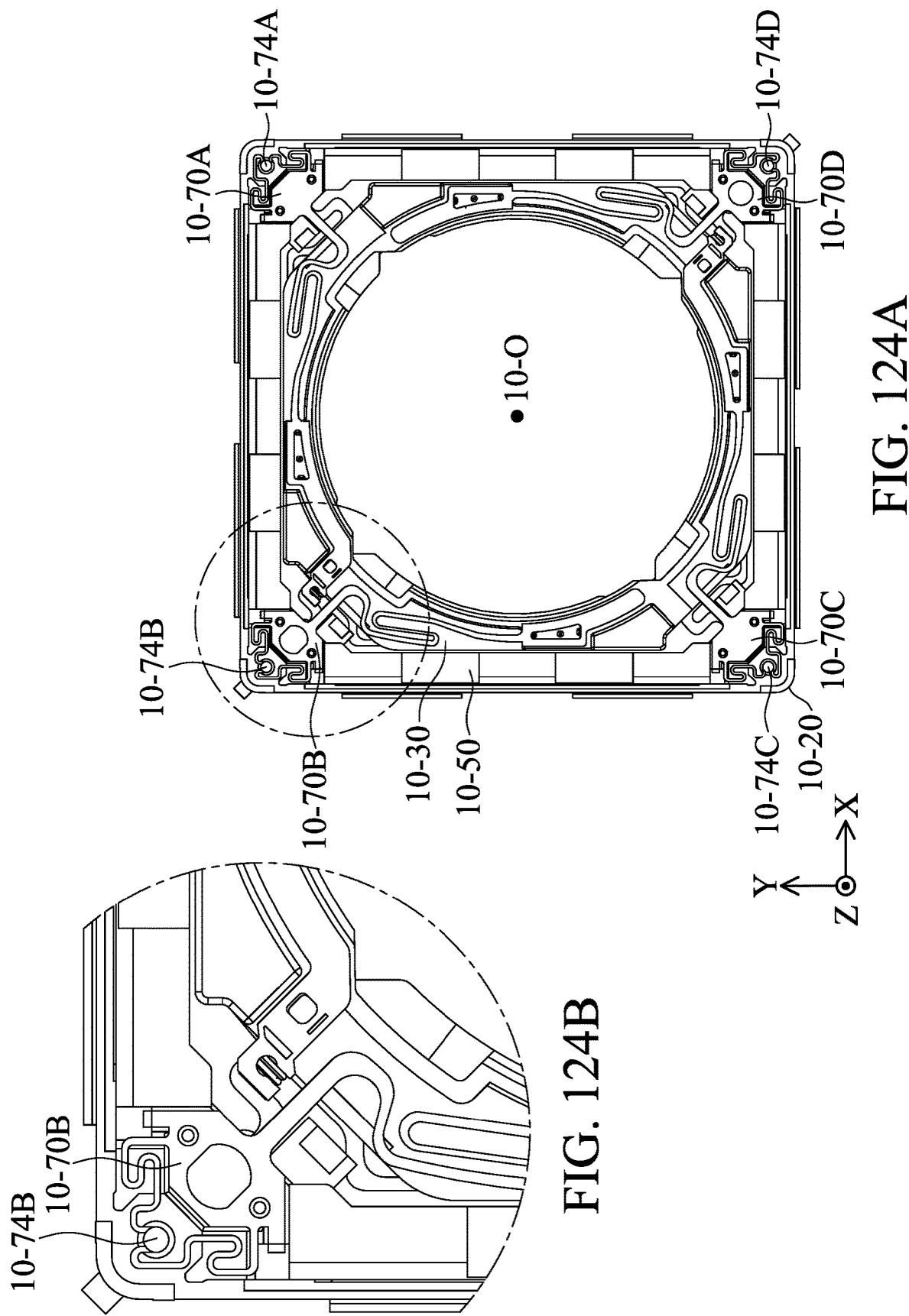

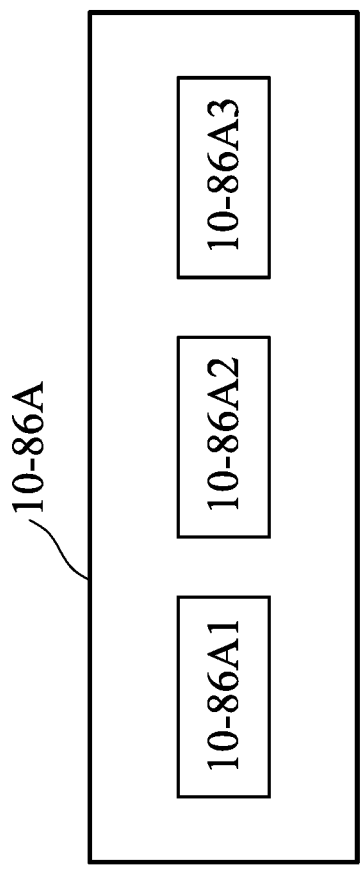
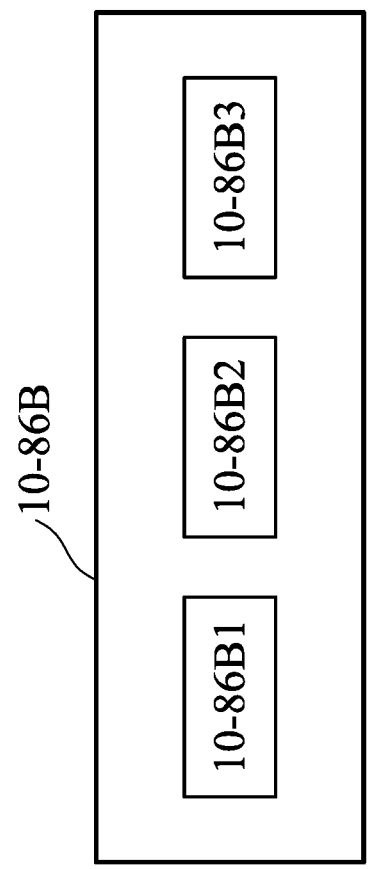
FIG. 131A
FIG. 131B

OPTICAL MEMBER DRIVING MECHANISM

CROSS REFERENCE TO RELATED APPLICATIONS

The present application claims priority of U.S. Provisional Patent Application No. 63/000,604 filed on Mar. 27, 2020, U.S. Provisional Patent Application No. 63/017,313, filed on Apr. 29, 2020, U.S. Provisional Patent Application No. 63/041,459, filed on Jun. 19, 2020, and U.S. Provisional Patent Application No. 63/050,503, filed on Jul. 10, 2020, which are incorporated by reference herein in their entirety.

BACKGROUND OF THE INVENTION

Field of the Invention

The application relates in general to an optical member driving mechanism, and in particular, to an optical member driving mechanism configured to drive an optical member to move.

Description of the Related Art

Advanced technology has allowed recent electronic devices (such as tablet computers and smartphones) to include a lens module capable of aiding in photography or recording video. These electronic devices have become more commonplace, and have been developed to be more convenient and thin. More and more choices are provided for users to choose from.

However, one or more gaps may be generated due to inaccurate tolerances or mistakes made during assembly. Consequently, external objects may enter the lens module, and cause wear and tear on the lens or other members inside the lens module. This may cause the lens driving mechanism to break. Therefore, how to address the aforementioned problem has become an important issue.

BRIEF SUMMARY OF INVENTION

To address the deficiencies of conventional products, an embodiment of the invention provides an optical member driving mechanism for connecting an optical member, including a fixed portion and a first adhesive member. The fixed portion includes a first member and a second member, wherein the first member is fixedly connected to the second member via the first adhesive member.

In some embodiments, the optical member driving mechanism further comprises a movable portion and a driving assembly. The movable portion is configured to connect the optical member, and the driving assembly is configured to drive the movable portion to move relative to the fixed portion.

In some embodiments, the optical member driving mechanism further comprises a second adhesive member, and the first member is fixedly connected to the second member via the second adhesive member. The Young's modulus of the cured first adhesive member is different from the Young's modulus of the cured second adhesive member. The Young's modulus of the cured first adhesive member is greater than the Young's modulus of the cured second adhesive member. The first adhesive member is in direct contact with the second adhesive member. The first member comprises a top wall and a lateral wall, the top wall has a plate structure and is perpendicular to the main axis, the lateral wall has a plate structure and extends from the edge of the top wall, and the extending direction of the lateral wall is not perpendicular to the main axis. The optical member driving mechanism further comprises a first gap formed between the first member and the second member, and the first gap is configured to receive the first adhesive member. As seen from the main axis, the first gap surrounds the second member. As seen from the main axis, the first gap continuously and uninterruptedly surrounds the second member. The optical member driving mechanism further comprises a second gap, configured to receive the second adhesive member. The second gap is formed between the first member and the second member. As seen from the exterior of the optical member driving mechanism, the first gap is not exposed. As seen from the exterior of the optical member driving mechanism, the first adhesive member is not exposed. As seen from the exterior of the optical member driving mechanism, at least a portion of the second gap is exposed. As seen from the exterior of the optical member driving mechanism, at least a portion of the second adhesive member is exposed. The shortest distance between the first member and the second member in the first gap is different from the shortest distance between the first member and the second member in the second gap. The shortest distance between the first member and the second member in the first gap is less than the shortest distance between the first member and the second member in the second gap. The first gap is communicated with the second gap. A receiving space is formed between the first member and the second member, and the receiving space is configured to receive the movable portion. The shortest distance between the first gap and the receiving space is different from the shortest distance between the second gap and the receiving space. The shortest distance between the first gap and the receiving space is less than the shortest distance between the second gap and the receiving space. The viscosity of the uncured first adhesive member is different from the viscosity of the uncured second adhesive member. The viscosity of the uncured first adhesive member is less than the viscosity of the uncured second adhesive member.

In some embodiments, the optical member driving mechanism further comprises a first elastic member, a third adhesive member, a fourth adhesive member, a second elastic member, a fifth adhesive member, a sixth adhesive member, and a third member. The movable portion is movably connected to the fixed portion via the first elastic member. The first elastic member is connected to the fixed portion via the third adhesive member. The first elastic member is connected to the movable portion via the fourth adhesive member. The movable portion is movably connected to the fixed portion via the second elastic member. The second elastic member is connected to the fixed portion via the fifth adhesive member. The second elastic member is connected to the movable portion via the sixth adhesive member. The third member is fixedly disposed on the first member. The Young's modulus of the cured third adhesive member is different from the Young's modulus of the cured first adhesive member. The Young's modulus of the cured third adhesive member is less than the Young's modulus of the cured first adhesive member. The Young's modulus of the cured third adhesive member is the same as the Young's modulus of the cured second adhesive member. The Young's modulus of the cured fourth adhesive member is the same as the Young's modulus of the cured third adhesive member. The Young's modulus of the cured fifth adhesive member is different from the Young's modulus of the cured third adhesive member and/or the Young's modulus of the cured fourth adhesive member. The Young's modulus of the cured fifth adhesive member is greater than the Young's modulus of the cured third adhesive member and/or the Young's modulus of the cured fourth adhesive member. The Young's modulus of the cured sixth adhesive member is different from the Young's modulus of the cured fifth adhesive member. The Young's modulus of the cured sixth adhesive member is less than the Young's modulus of the cured fifth adhesive member. The first elastic member is connected to the second member via the third adhesive member. The first elastic member has a plate structure. The first elastic member is perpendicular to the main axis. The material of the first elastic member is different from the material of the second member. The first elastic member includes metal. The second member includes plastic material. The second elastic member is connected to the first member via the fifth adhesive member. The second elastic member has a plate structure. The second elastic member includes metal. The first member includes metal. The third adhesive member is deformable to disperse excessive stress. The fourth adhesive member is deformable to disperse excessive stress. The sixth adhesive member is deformable to disperse excessive stress. At least a portion of the driving assembly is connected to the fixed portion via the fifth adhesive member. A magnetic member of the driving assembly is connected to the fixed portion via the fifth adhesive member. The magnetic member includes metal. As seen from a direction that is perpendicular to the main axis, at least a portion of the third member is disposed between the magnetic member and the first member. As seen from the main axis, the third member overlaps the magnetic member, and the third member overlaps the first member. The material of the third member is different from the material of the first member. The third member includes plastic material. The third member is fixedly connected to the first member via the fifth adhesive member. The second elastic member is connected to the third member via the fifth adhesive member. The fifth adhesive member is in direct contact with the first member. The fifth adhesive member is in direct contact with the third member. The fifth adhesive member is in direct contact with the magnetic member. The fifth adhesive member is in direct contact with the second elastic member.

In some embodiments, the first elastic member further comprises a first fixed portion connecting section, a first movable portion connecting section, and a first elastic deformable section. The first fixed portion connecting section is fixedly connected to the fixed portion via the third adhesive member. The first movable portion connecting section is fixedly connected to the movable portion via the fourth adhesive member. The first movable portion connecting section is connected to the first fixed portion connecting section via the first movable portion connecting section, the first fixed portion connecting section is fixedly connected to the second member via the third adhesive member, and the first elastic deformable section is deformable to disperse excessive stress. The second elastic member further comprises a second fixed portion connecting section, a second movable portion connecting section, and a second elastic deformable section. The second fixed portion connecting section is fixedly connected to the fixed portion via the fifth adhesive member. The second movable portion connecting section is fixedly connected to the movable portion via the sixth adhesive member. The second movable portion connecting section is connected to the second fixed portion connecting section via the second movable portion connecting section, and the second elastic deformable section is deformable to disperse excessive stress.

In some embodiments, the first adhesive member is cured by heating. The second adhesive member is cured by providing light. The third adhesive member is cured by providing light. The fourth adhesive member is cured by providing light. The fifth adhesive member is cured by heating. The sixth adhesive member is cured by providing light. The first adhesive member includes resin. The second adhesive member includes resin. The third adhesive member includes resin. The fourth adhesive member includes resin. The fifth adhesive member includes resin. The sixth adhesive member includes resin.

In some embodiments, the optical member driving mechanism further comprises a seventh adhesive member, configured to electrically connect to the driving assembly. The cured seventh adhesive member comprises a conductive region and an adhesive region. The adhesive region includes resin. The conductive region includes metal. The conductivity of the conductive region is different from the conductivity of the cured fifth adhesive member. The conductivity of the conductive region is greater than the conductivity of the cured fifth adhesive member. The Young's modulus of the adhesive region is different from the Young's modulus of the cured third adhesive member. The Young's modulus of the adhesive region is greater than the Young's modulus of the cured third adhesive member. The Young's modulus of the adhesive region is different from the Young's modulus of the cured fifth adhesive member. The Young's modulus of the adhesive region is less than the Young's modulus of the cured fifth adhesive member. The movable portion is connected to the first elastic member via the seventh adhesive member. The first elastic member is connected to a driving coil of the driving assembly via the seventh adhesive member. The seventh adhesive member is cured by heating.

In some embodiments, the optical member driving mechanism further comprises an eighth adhesive member, configured to electrically connect to the driving assembly. The eighth adhesive member includes metal. The conductivity of the cured eighth adhesive member is different from the conductivity of the cured third adhesive member. The conductivity of the cured eighth adhesive member is greater than the conductivity of the cured third adhesive member. The conductivity of the cured eighth adhesive member is different from the conductivity of the cured fifth adhesive member. The conductivity of the cured eighth adhesive member is greater than the conductivity of the cured fifth adhesive member. The Young's modulus of the cured eighth adhesive member is different from the Young's modulus of the cured fifth adhesive member. The Young's modulus of the cured eighth adhesive member is greater than the Young's modulus of the cured fifth adhesive member. The first elastic member is connected to the second member via the eighth adhesive member. The melting point of the eighth adhesive member is higher than the curing temperature of the seventh adhesive member.

In some embodiments, the optical member driving mechanism further comprises a ninth adhesive member, and the ninth adhesive member comprises a damping member. The ninth adhesive member is in direct contact with at least one of the movable portion, the fixed portion, the first elastic member, and the second elastic member. The Young's modulus of the cured ninth adhesive member is different from the Young's modulus of the cured fourth adhesive member. The Young's modulus of the cured ninth adhesive member is less than the Young's modulus of the cured fourth adhesive member. The ninth adhesive member is in direct contact with at least one of the movable portion, the fixed portion, and the first elastic member. The ninth adhesive member is in direct contact with at least one of the movable portion and the fixed portion.

In some embodiments, the first member further comprises a first tapered structure. The first tapered structure corresponds to the first gap, and has a first surface facing the first gap. The first tapered structure further has a second surface, the first surface is not perpendicular to the second surface, and the first surface and the second surface face different directions. The first surface is not parallel to the second surface. The first surface is parallel to the main axis. The second surface is not parallel to the main axis. The first tapered structure corresponds to the second gap. The first surface faces the second gap. The first surface has a plane structure. As seen from a direction that is perpendicular to the first surface, the first surface overlaps the first gap, and the first surface overlaps the second gap. The first adhesive member is in direct contact with the first surface. The second adhesive member is in direct contact with the second surface. The second member comprises a second tapered structure corresponding to the first gap. The second tapered structure has a third surface, and the third surface faces the first gap. The second tapered structure has a fourth surface, the third surface is not perpendicular to the fourth surface, and the third surface and the fourth surface face different directions. The third surface is parallel to the main axis. The third surface is parallel to the main axis. The fourth surface is not parallel to the main axis. The first adhesive member is in direct contact with the third surface. The second adhesive member is in direct contact with the third surface. The second tapered structure corresponds to the second gap. The third surface faces the second gap. As seen from a direction that is perpendicular to the third surface, the third surface overlaps the first gap, and the third surface overlaps the second gap. The ninth adhesive member is in direct contact with the second tapered structure. The ninth adhesive member is in direct contact with the fourth surface. As seen from the direction that is perpendicular to the main axis, the tapering direction of the first tapered structure is different from the tapering direction of the second tapered structure. As seen from the direction that is perpendicular to the main axis, the tapering direction of the first tapered structure is opposite to the tapering direction of the second tapered structure. As seen from the direction that is perpendicular to the first surface, the first tapered structure overlaps the second tapered structure. The third adhesive member is in direct contact with a first attaching surface of the fixed portion. The third adhesive member is in direct contact with a second attaching surface of the first elastic member, and the first attaching surface and the second attaching surface face the same direction.

BRIEF DESCRIPTION OF DRAWINGS

The invention can be more fully understood by reading the subsequent detailed description and examples with references made to the accompanying drawings, wherein:

FIG. 119 is a perspective view of an optical element driving mechanism in some embodiments of the present disclosure;

FIG. 120A is an exploded view of the optical element driving mechanism;

FIG. 120B is a cross-sectional view of the optical element driving mechanism;

FIG. 120C is an enlarged view of FIG. 120B;

FIG. 121 is a top view of the optical element driving mechanism when an optical element is provided in the optical element driving mechanism;

FIG. 122 is a top view of the optical element driving mechanism;

FIG. 123A is a perspective view of the optical element driving mechanism;

FIG. 123B is an enlarged view of FIG. 123A;

FIG. 124A is a top view of the optical element driving mechanism, wherein the case is omitted;

FIG. 124B is an enlarged view of FIG. 124A;

FIG. 125 is a perspective view of the optical element driving mechanism, wherein the case is omitted;

FIG. 126A is a perspective view of the optical element driving mechanism, wherein the case, the frame, and the upper resilient element are omitted;

Figure 2:
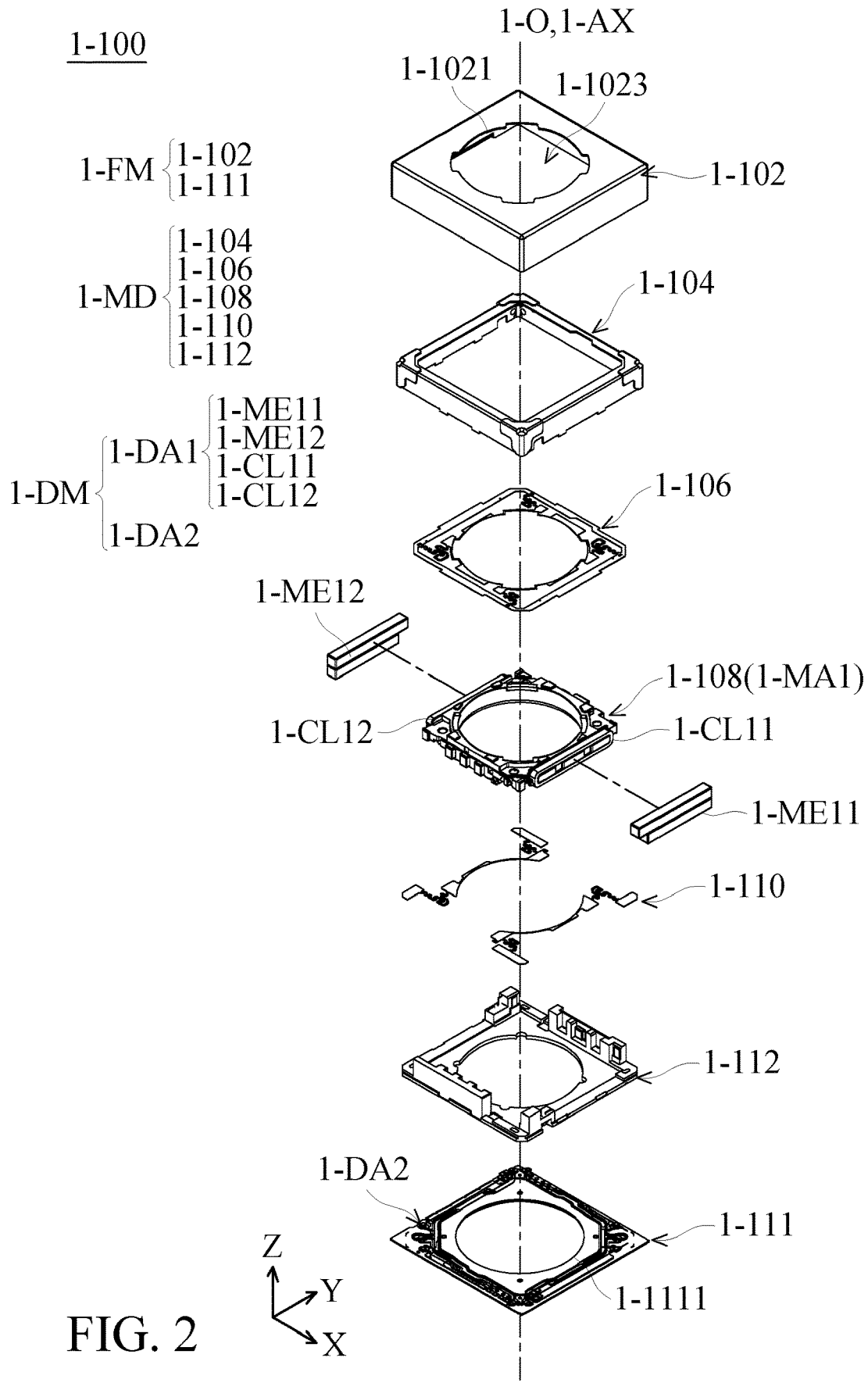
FIG. 2 is an exploded diagram of the optical element driving mechanism 1-100 according to an embodiment of the present disclosure.
Figure 126B:
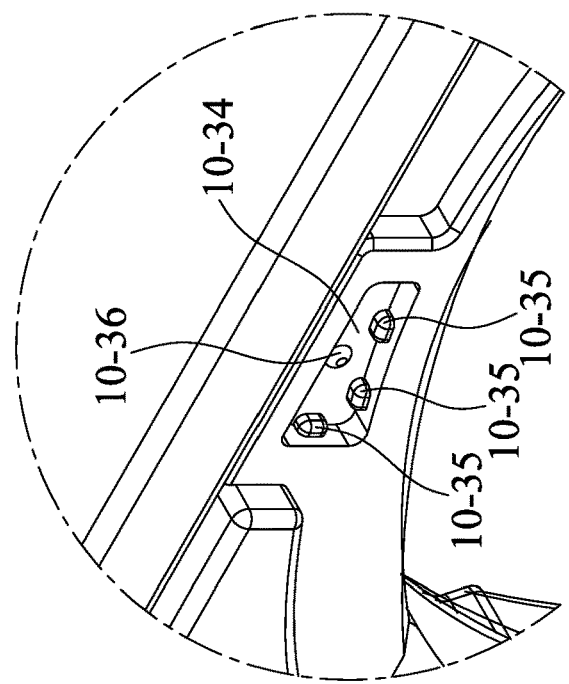
Figure 126A:
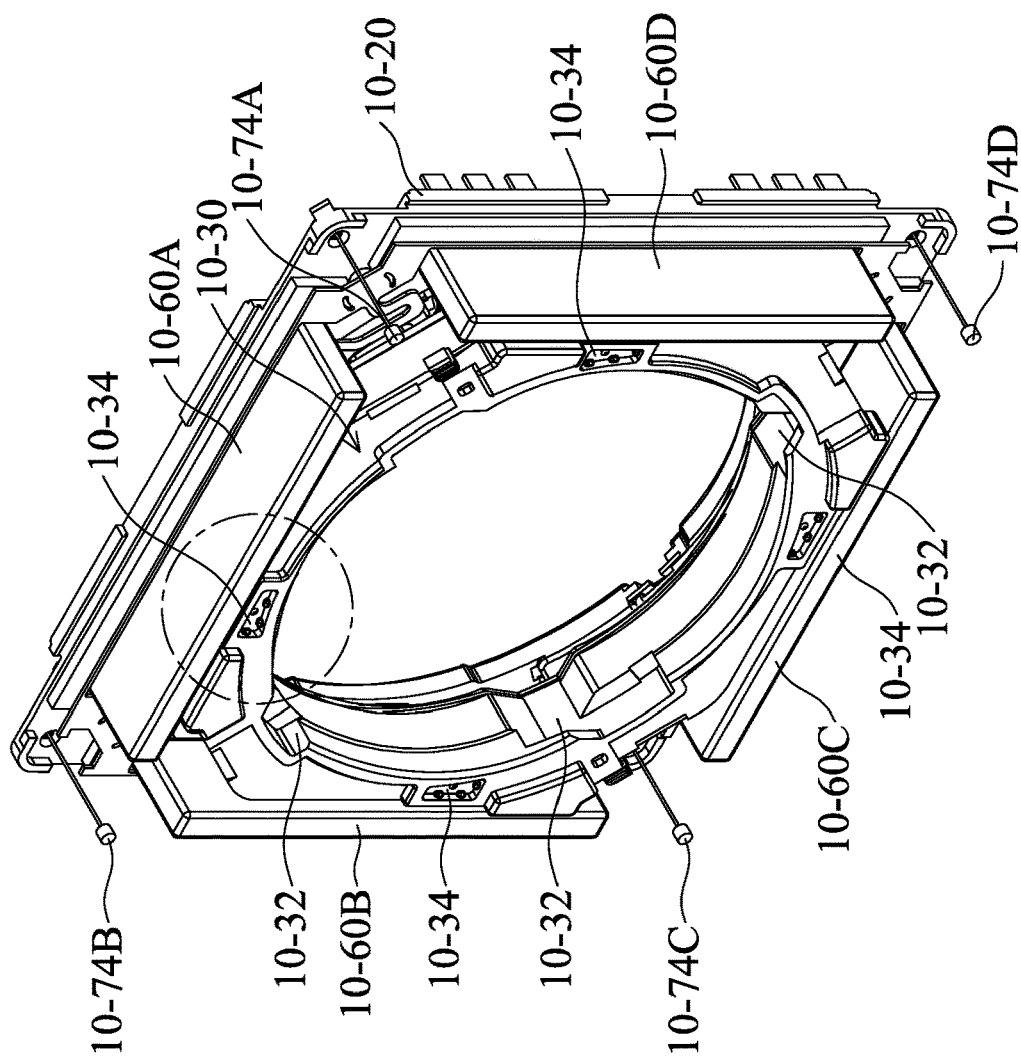
Figure 127:
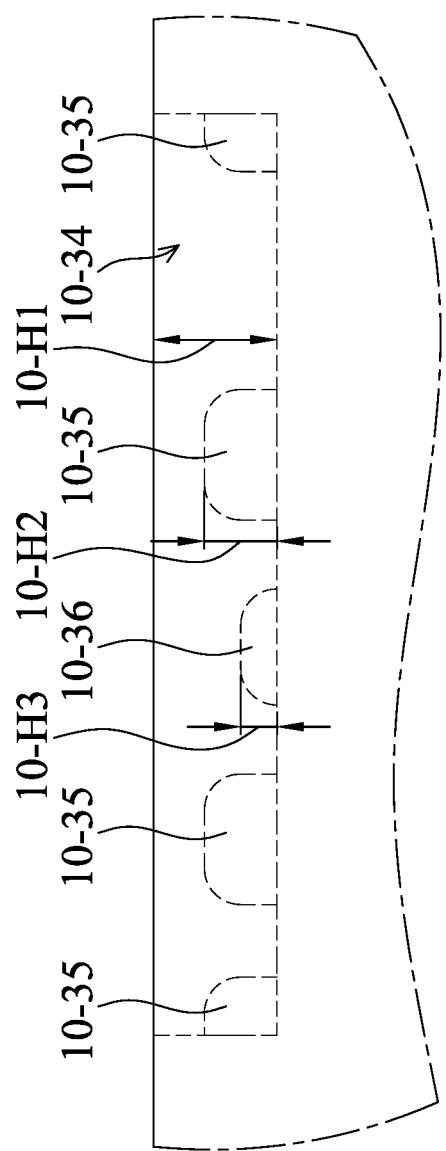
Figure 128:
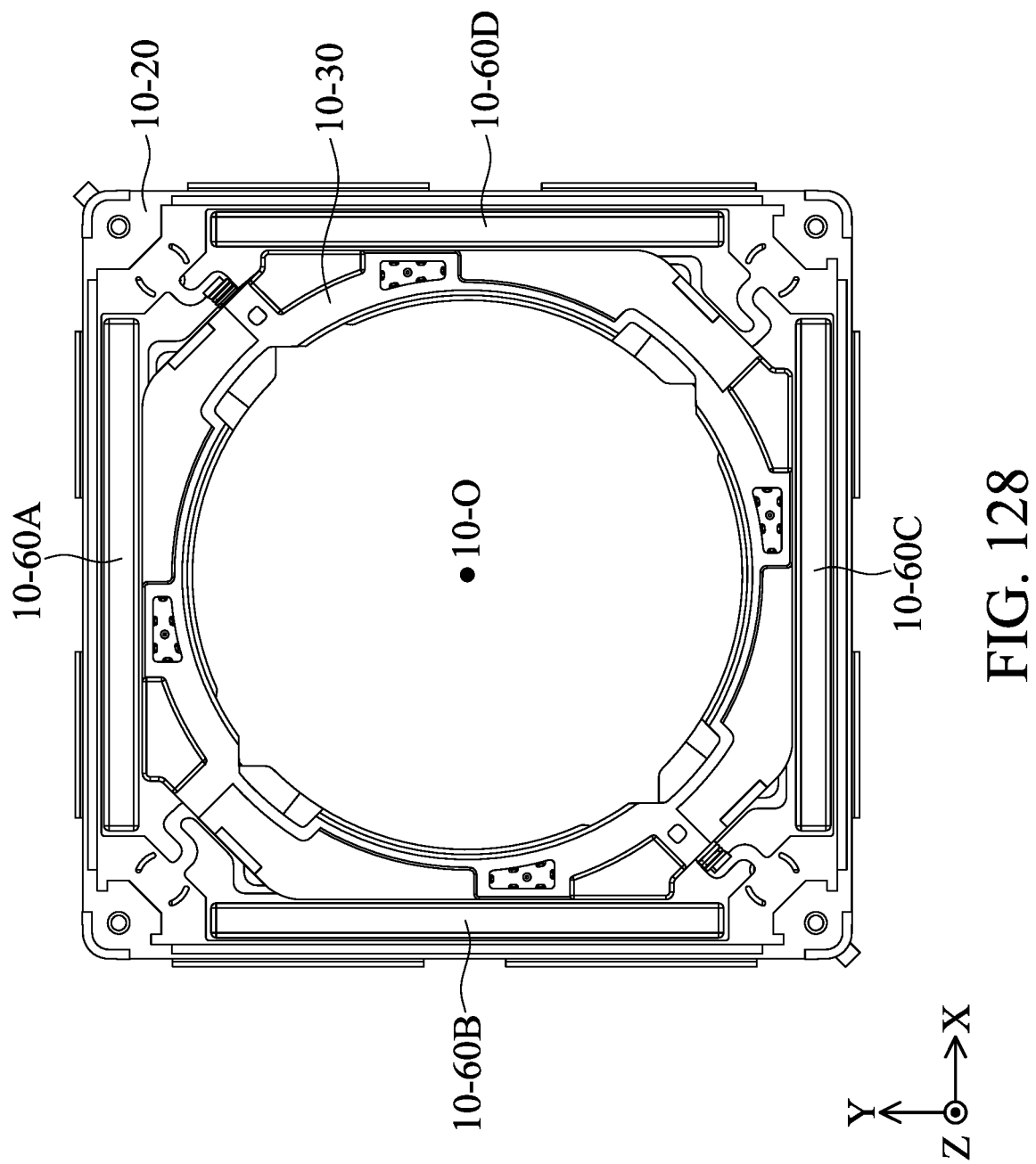
Figure 129:
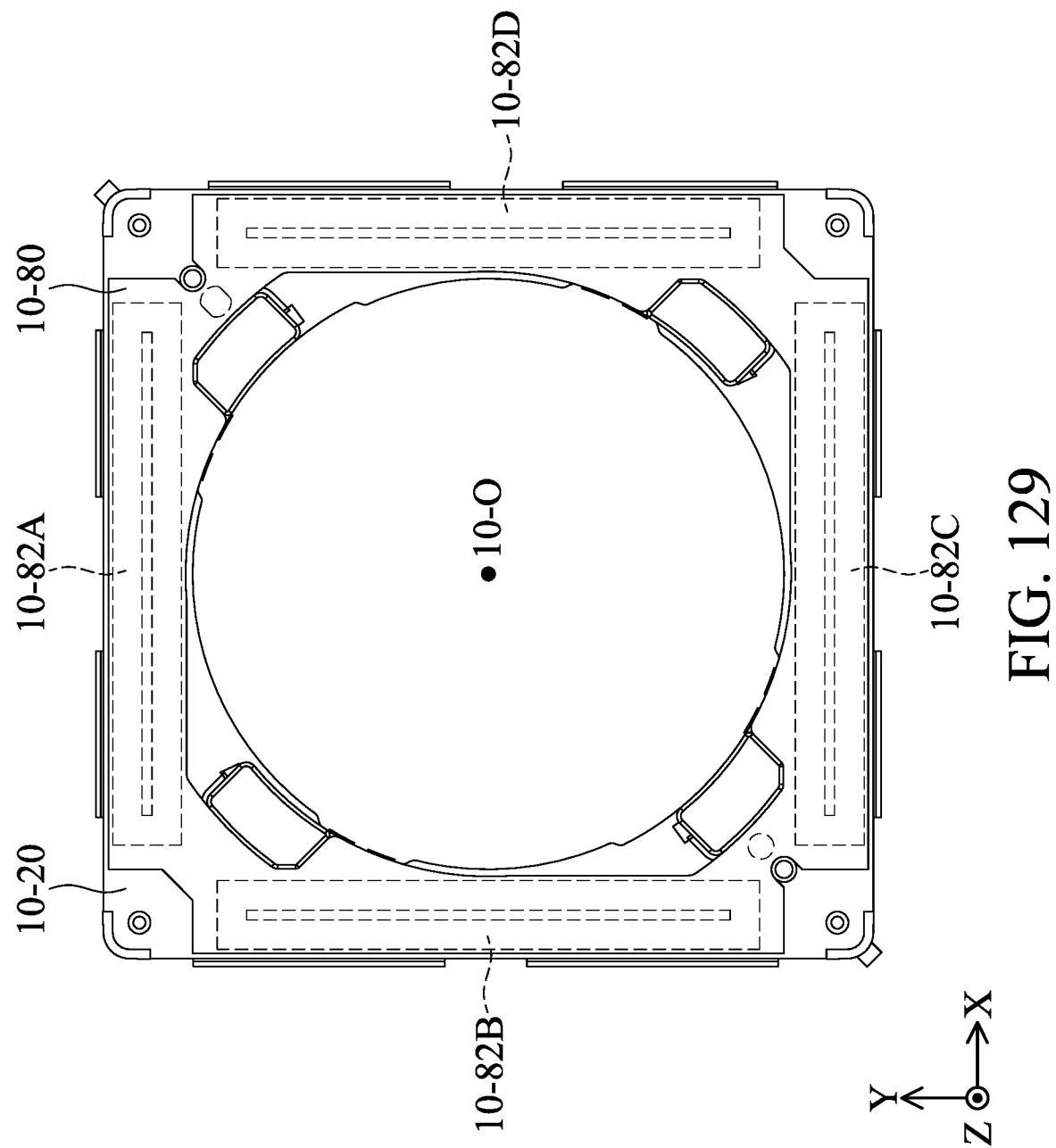
Figure 130A:
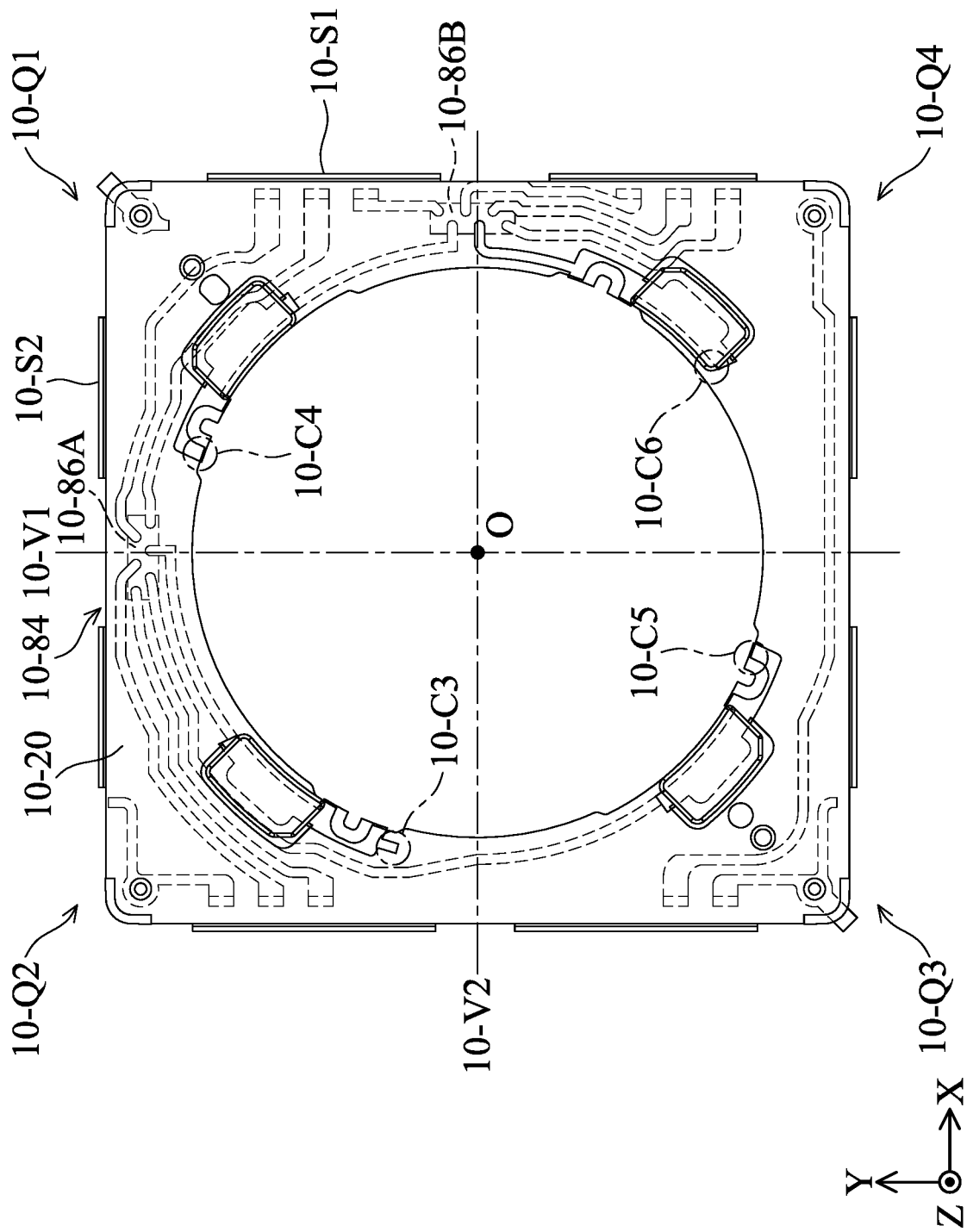
Figure 130B:
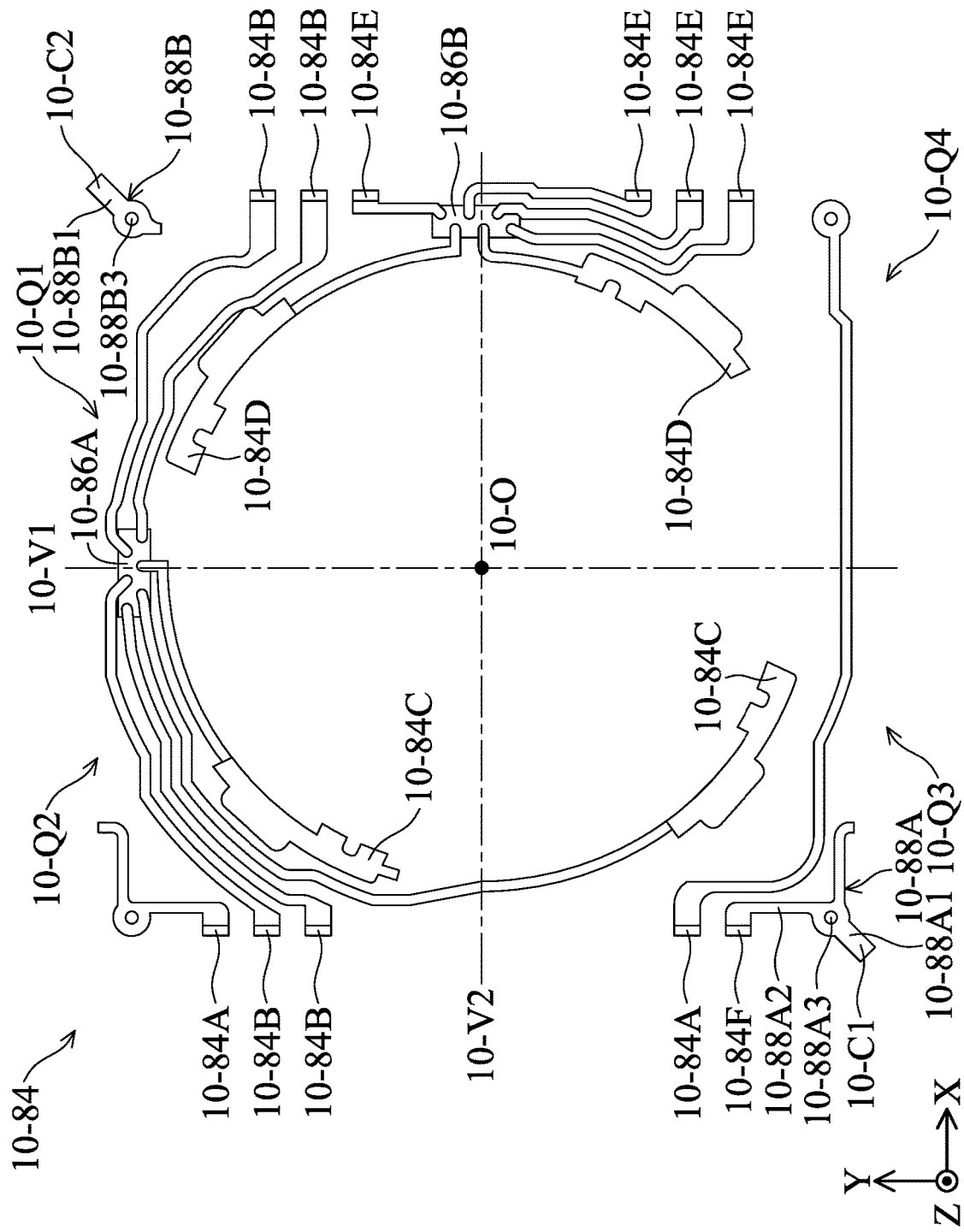
Figure 130C:
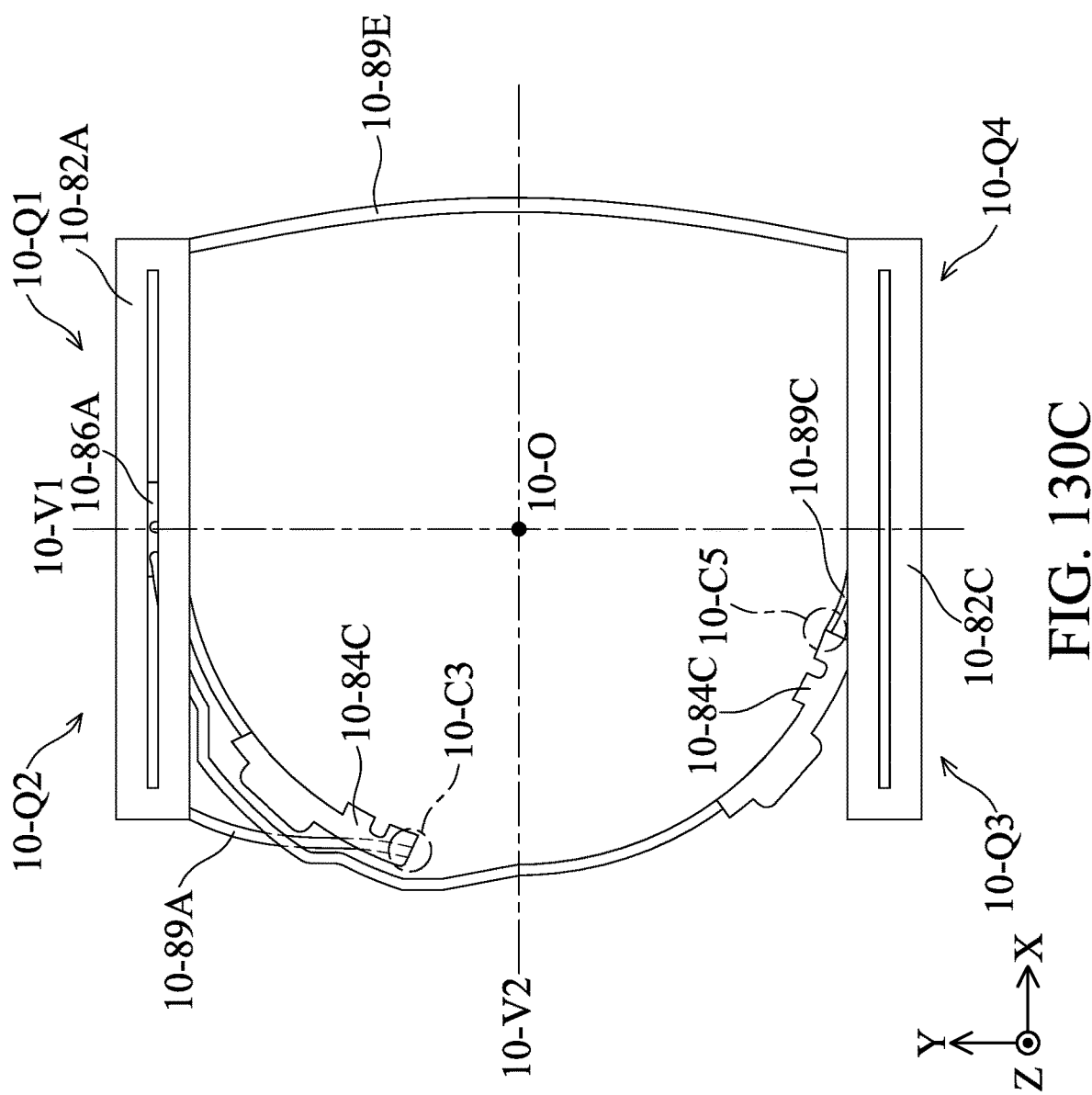
Figure 130D:
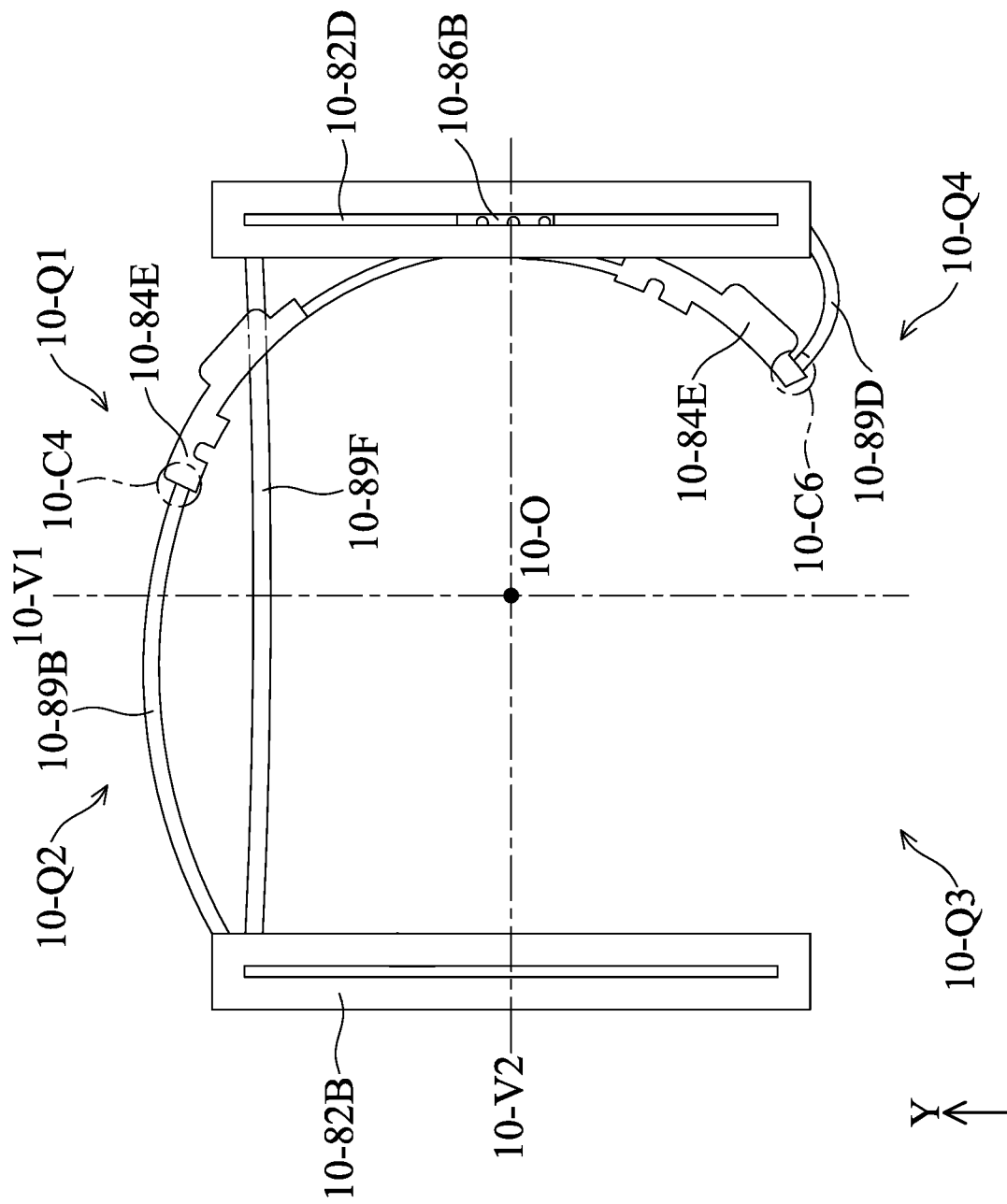
Figure 132:
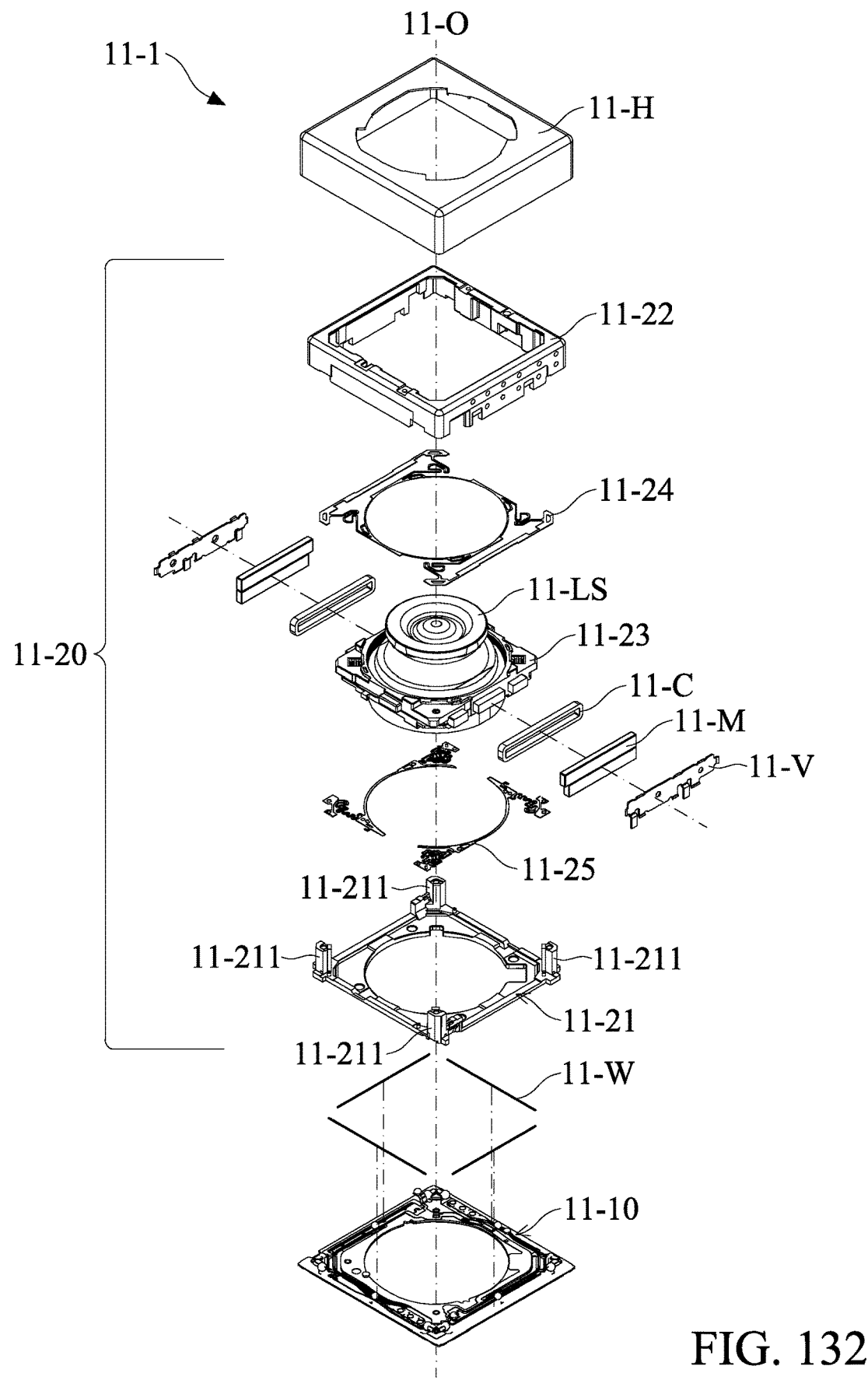
Figure 133:
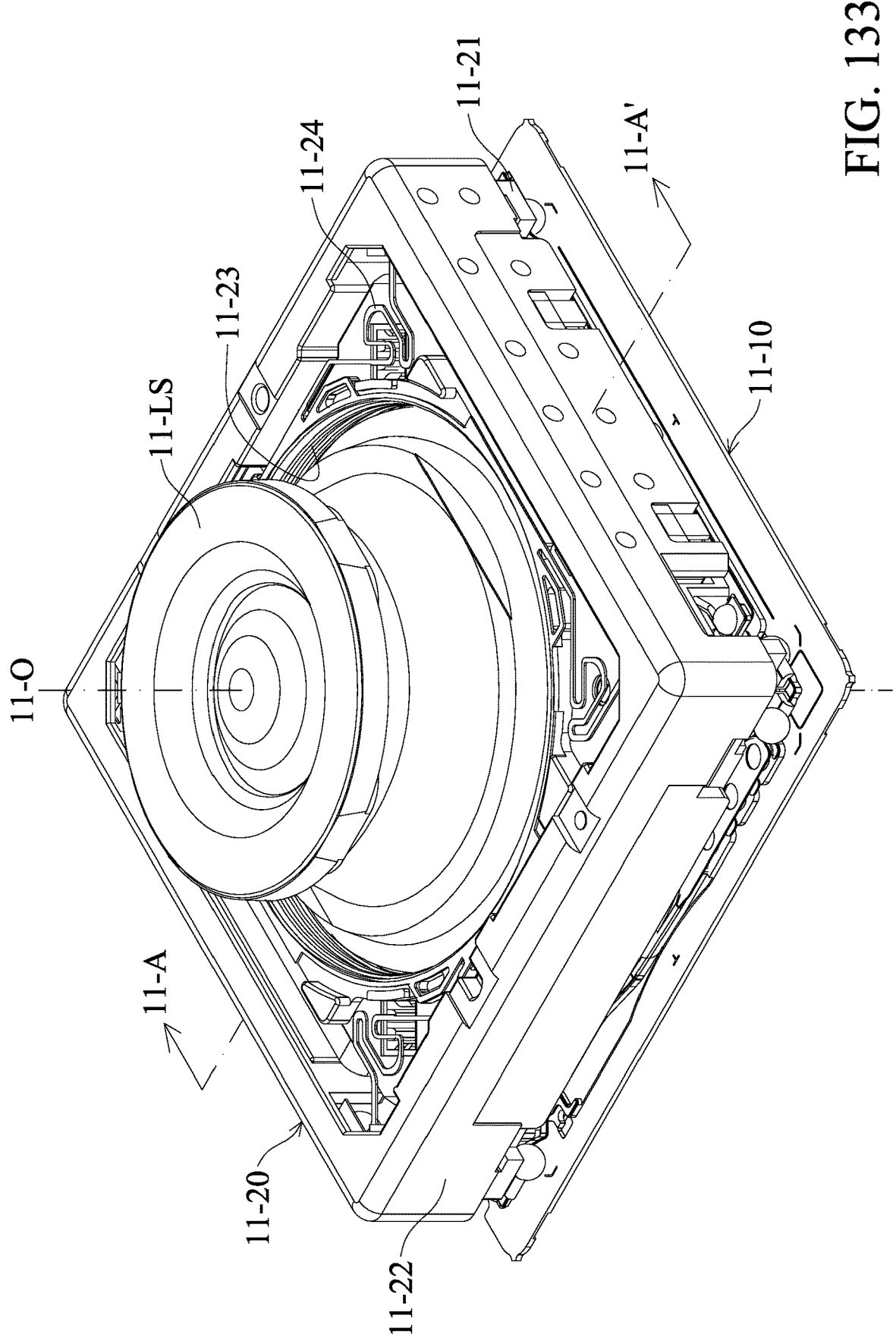
Figure 134:
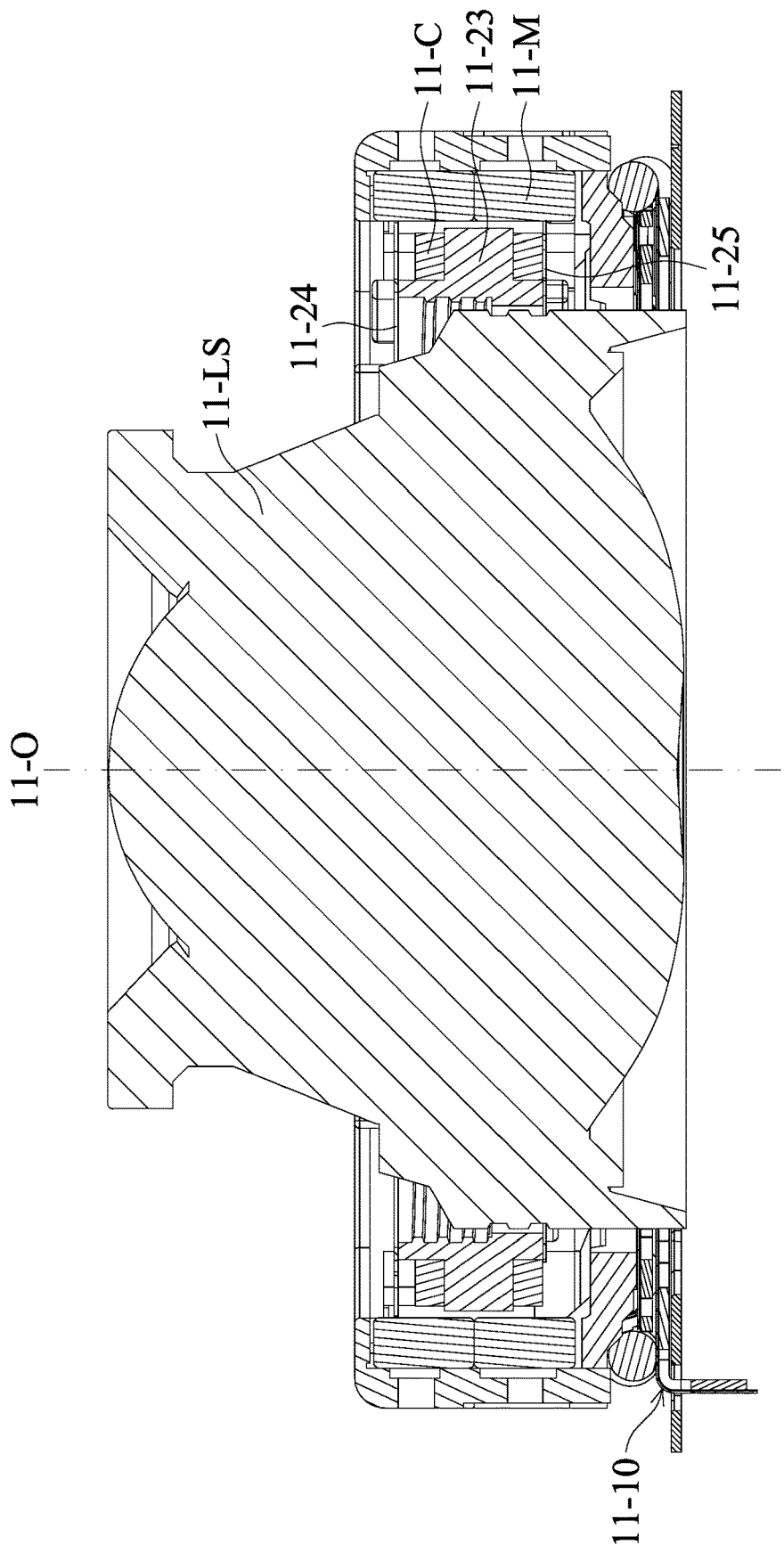
Figure 135:
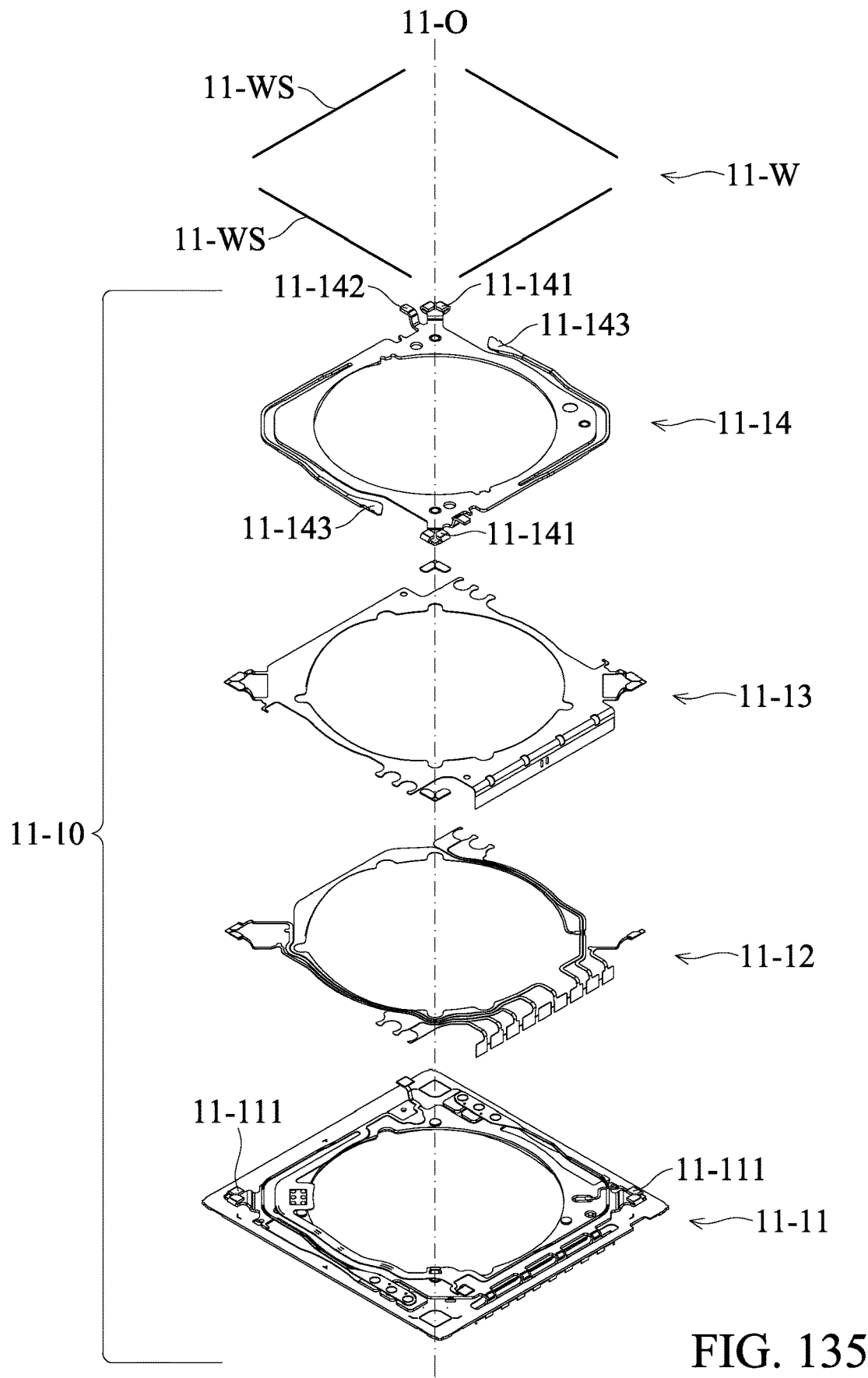
Figure 136:
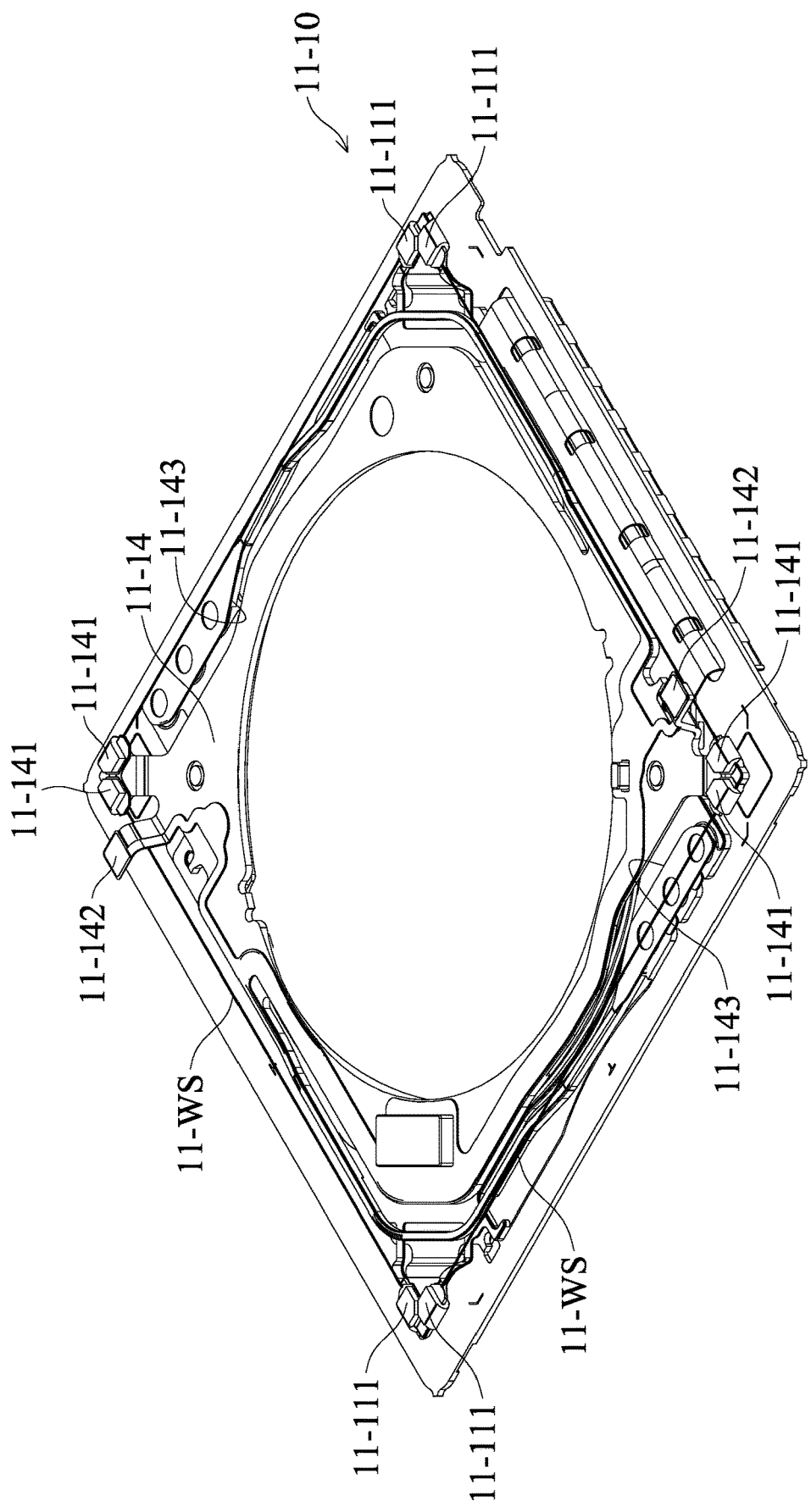
Figure 137A:
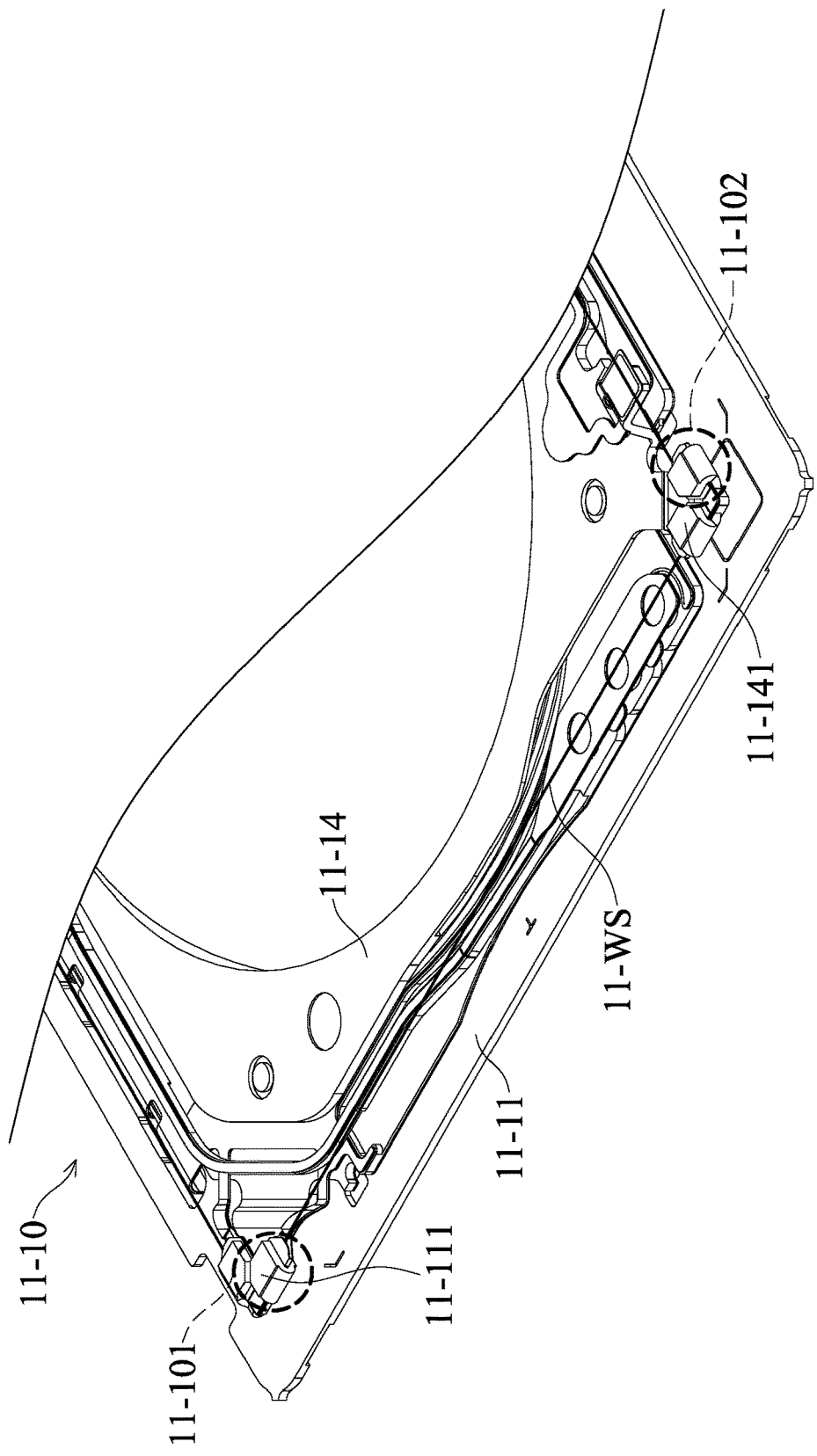
Figure 137B:
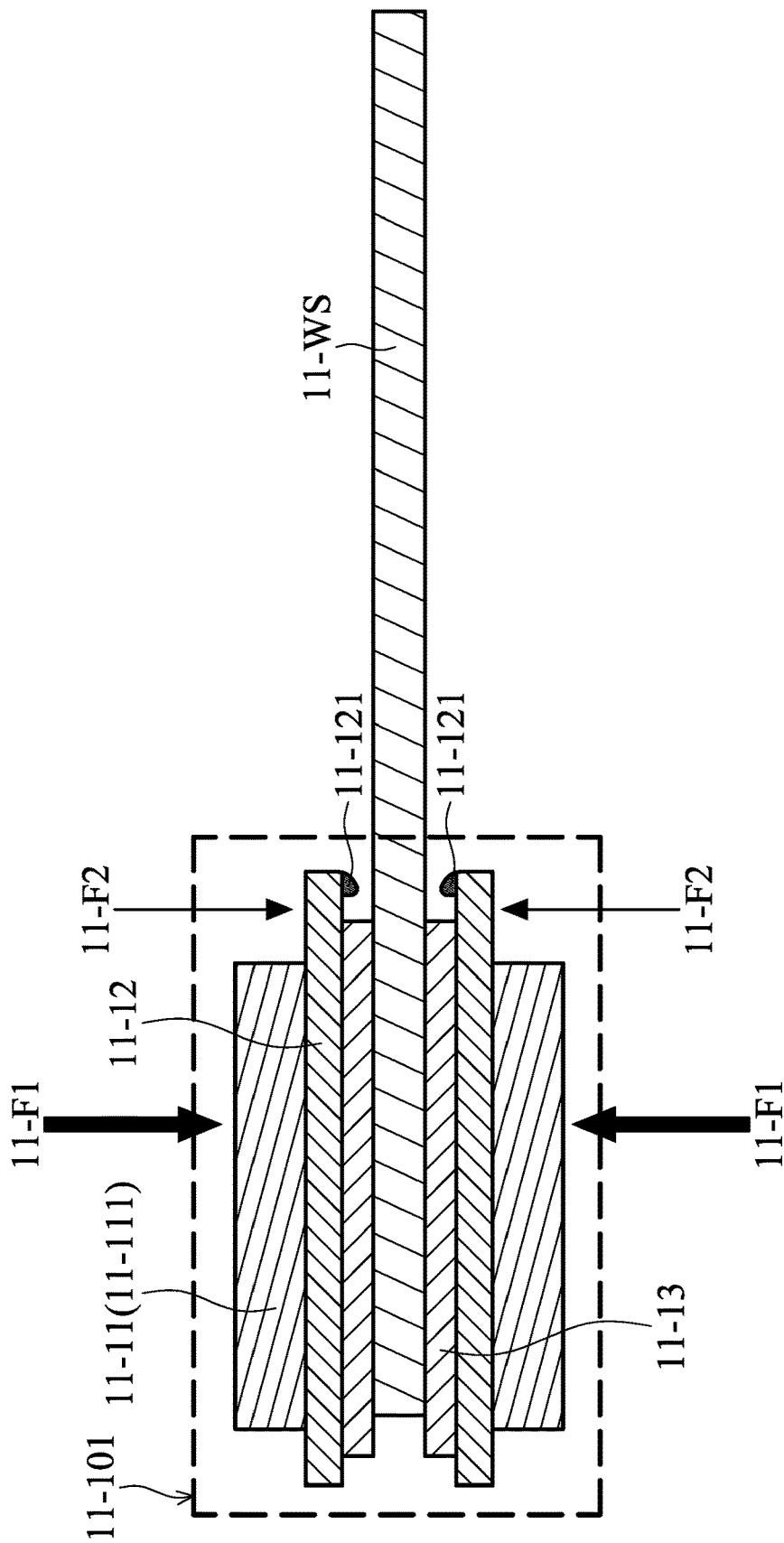
Figure 137C:
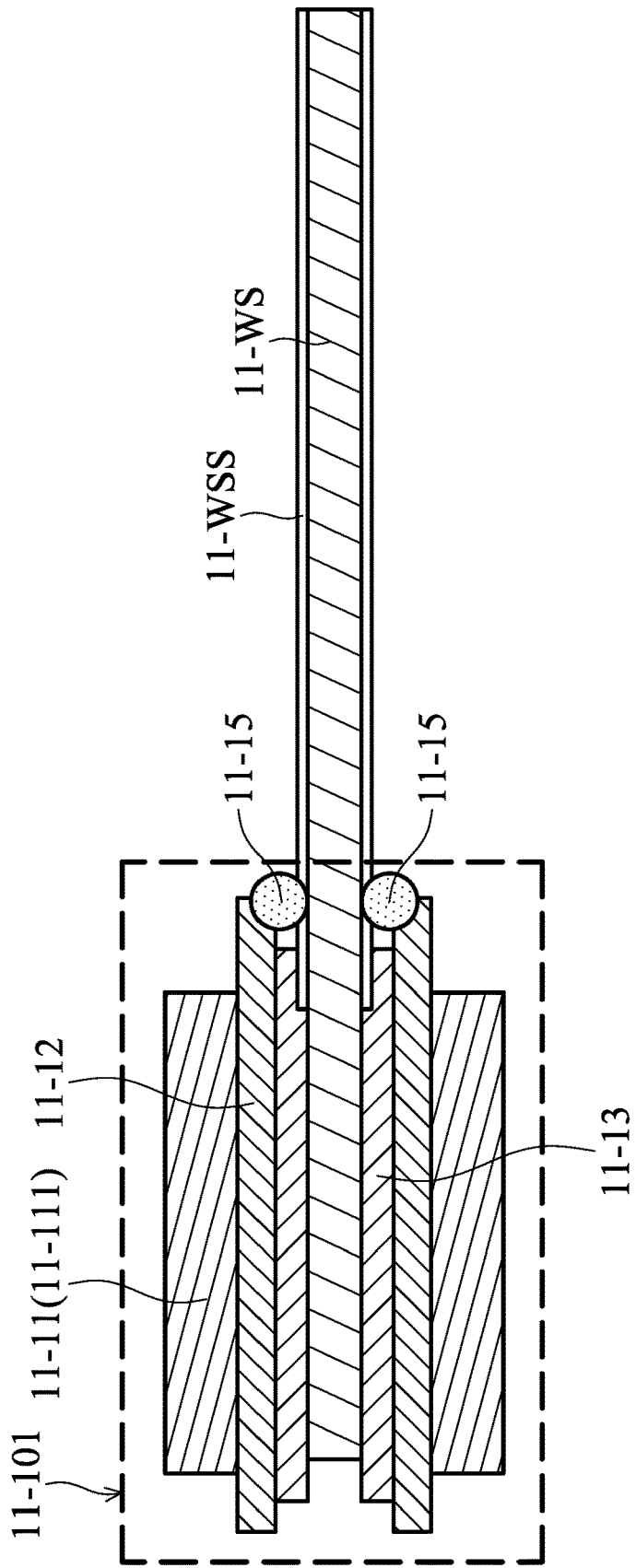
Figure 137D:
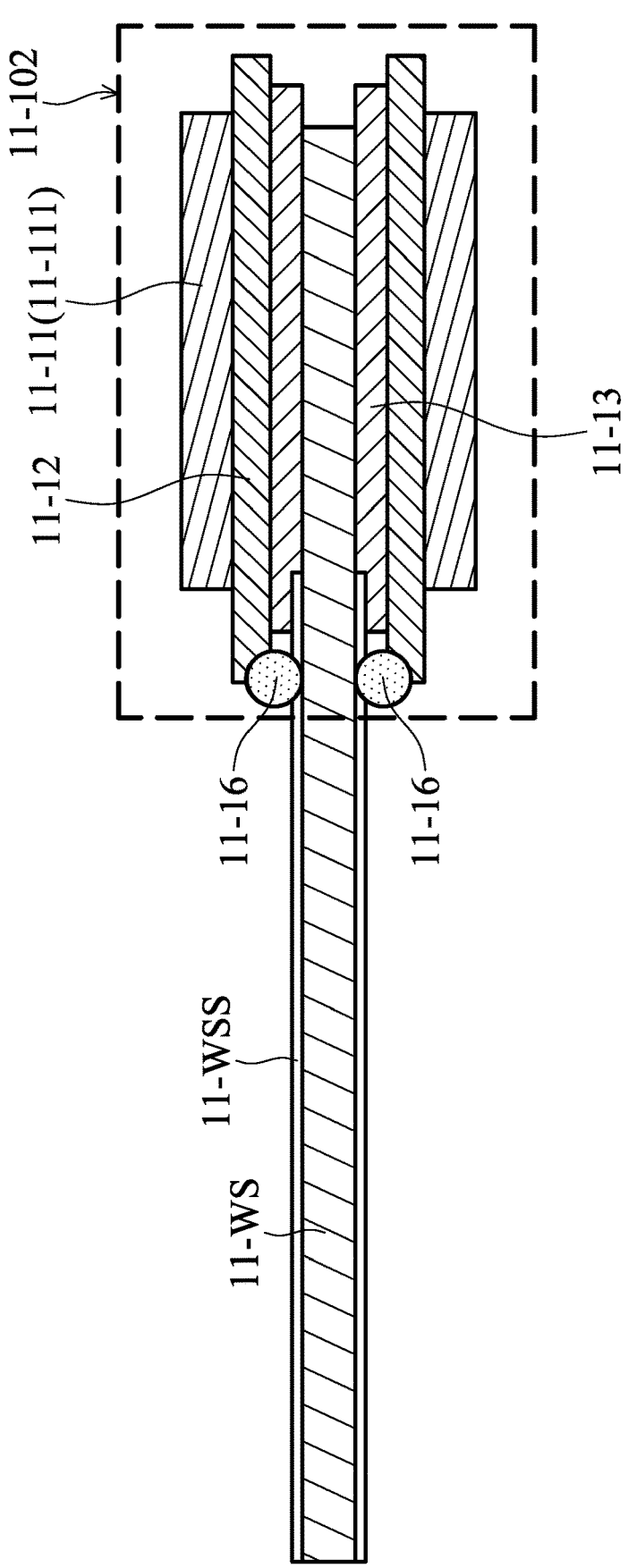
Figure 138:
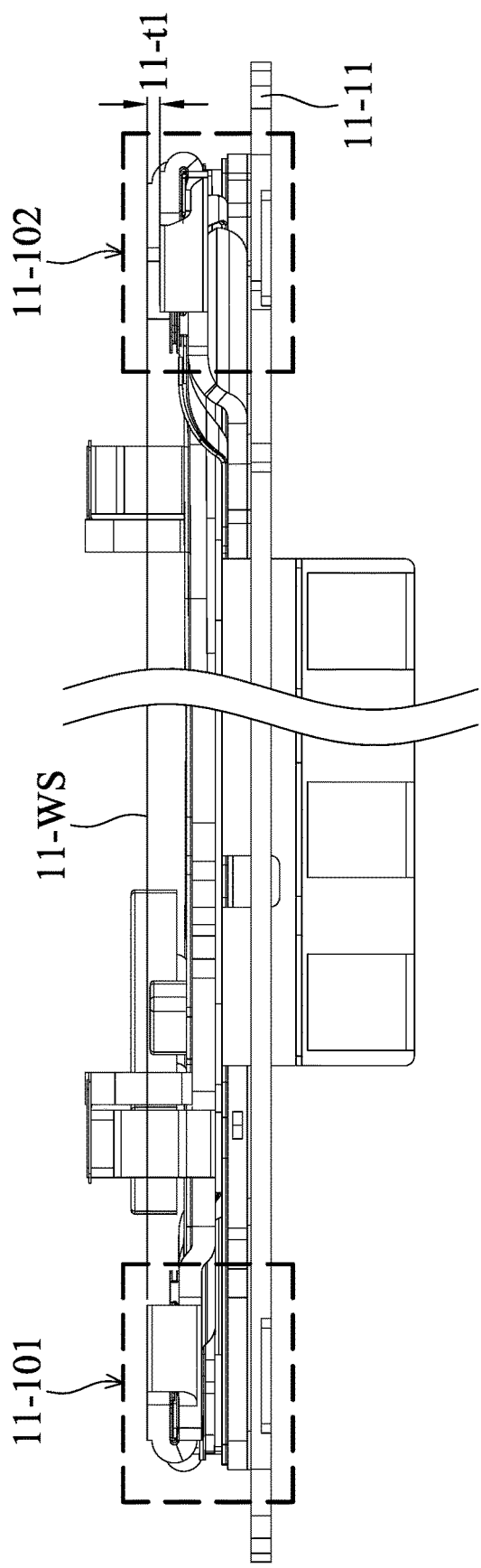
Figure 139:
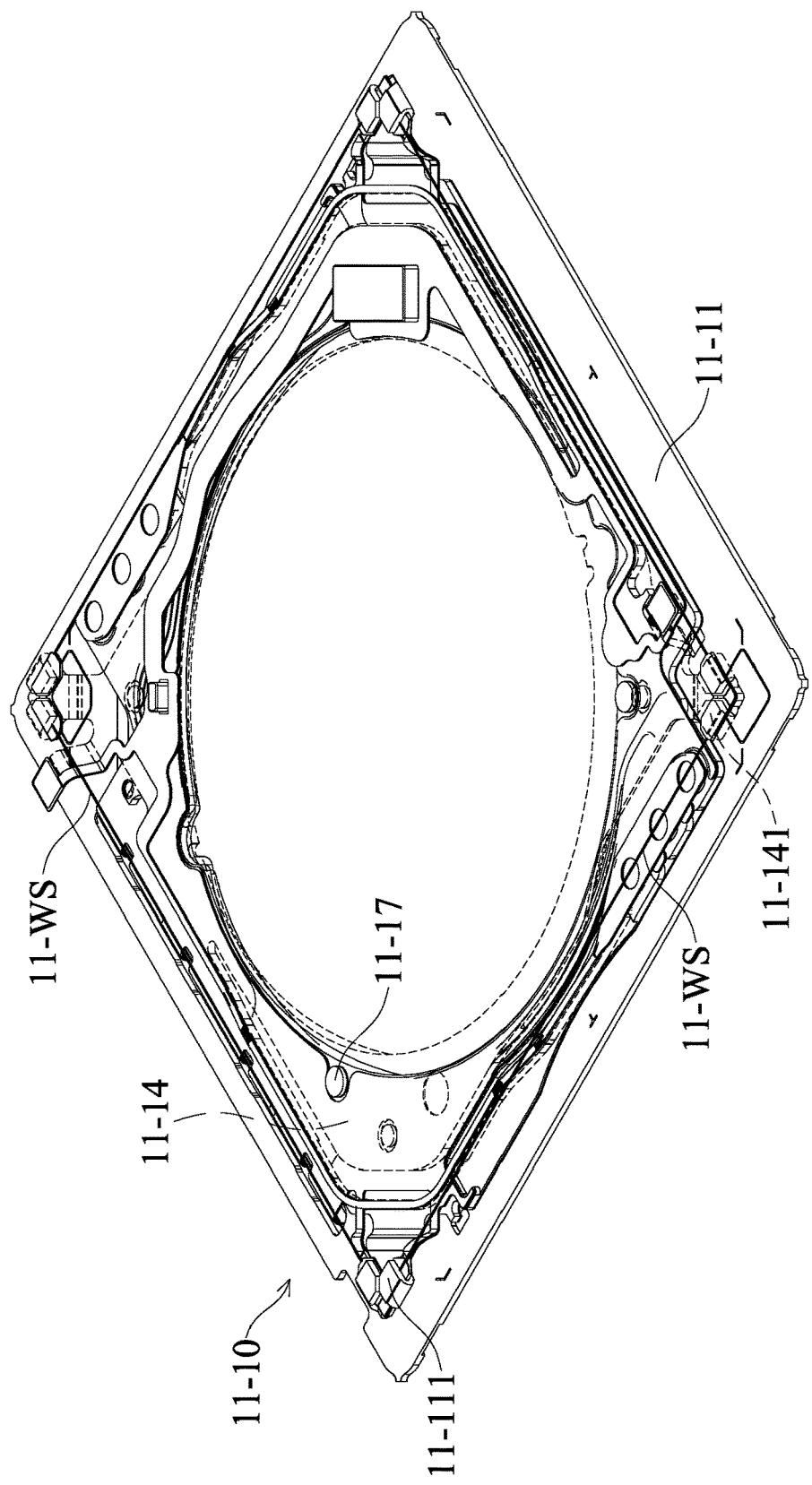
Figure 140A:
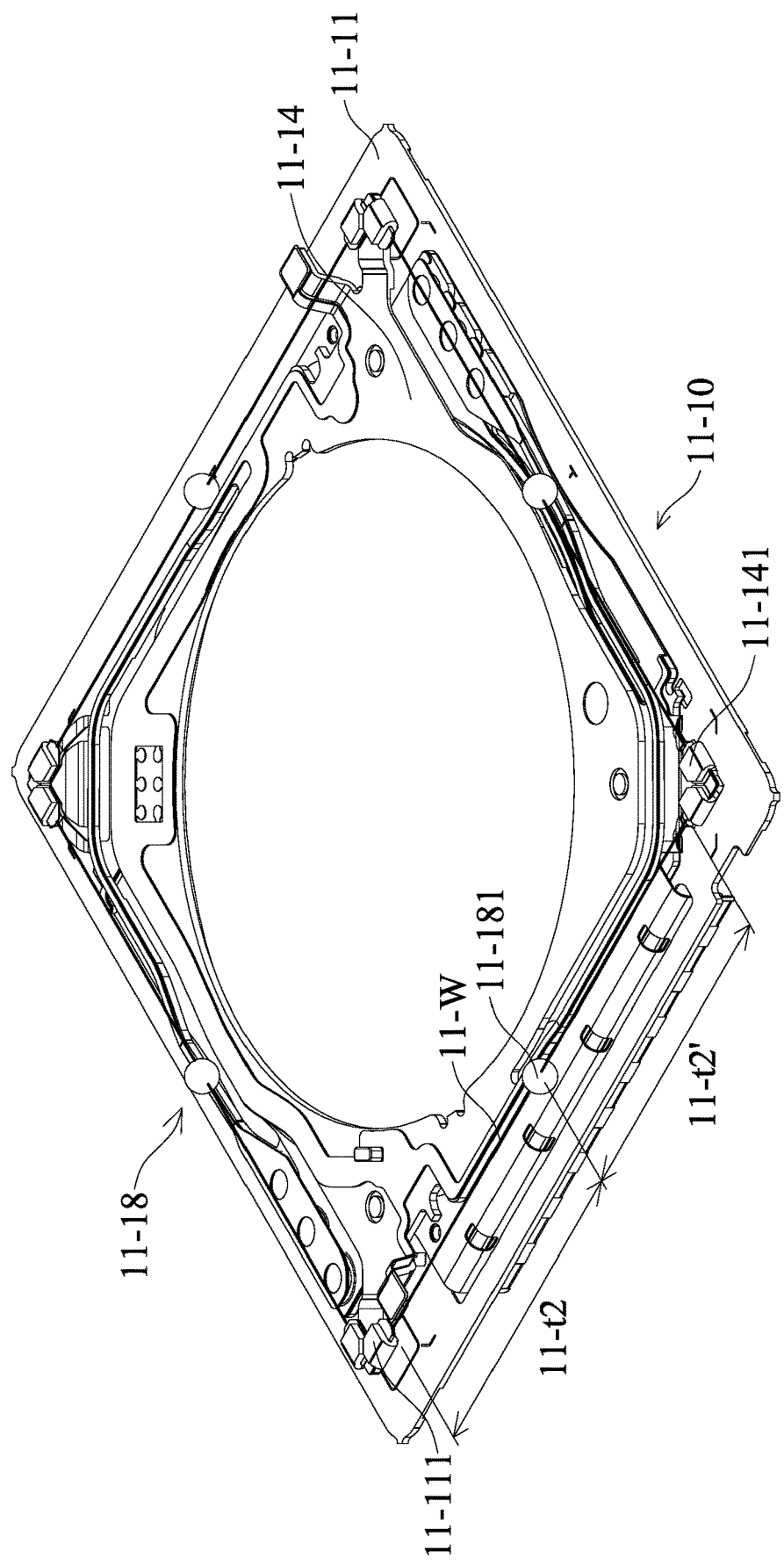
Figure 140B:
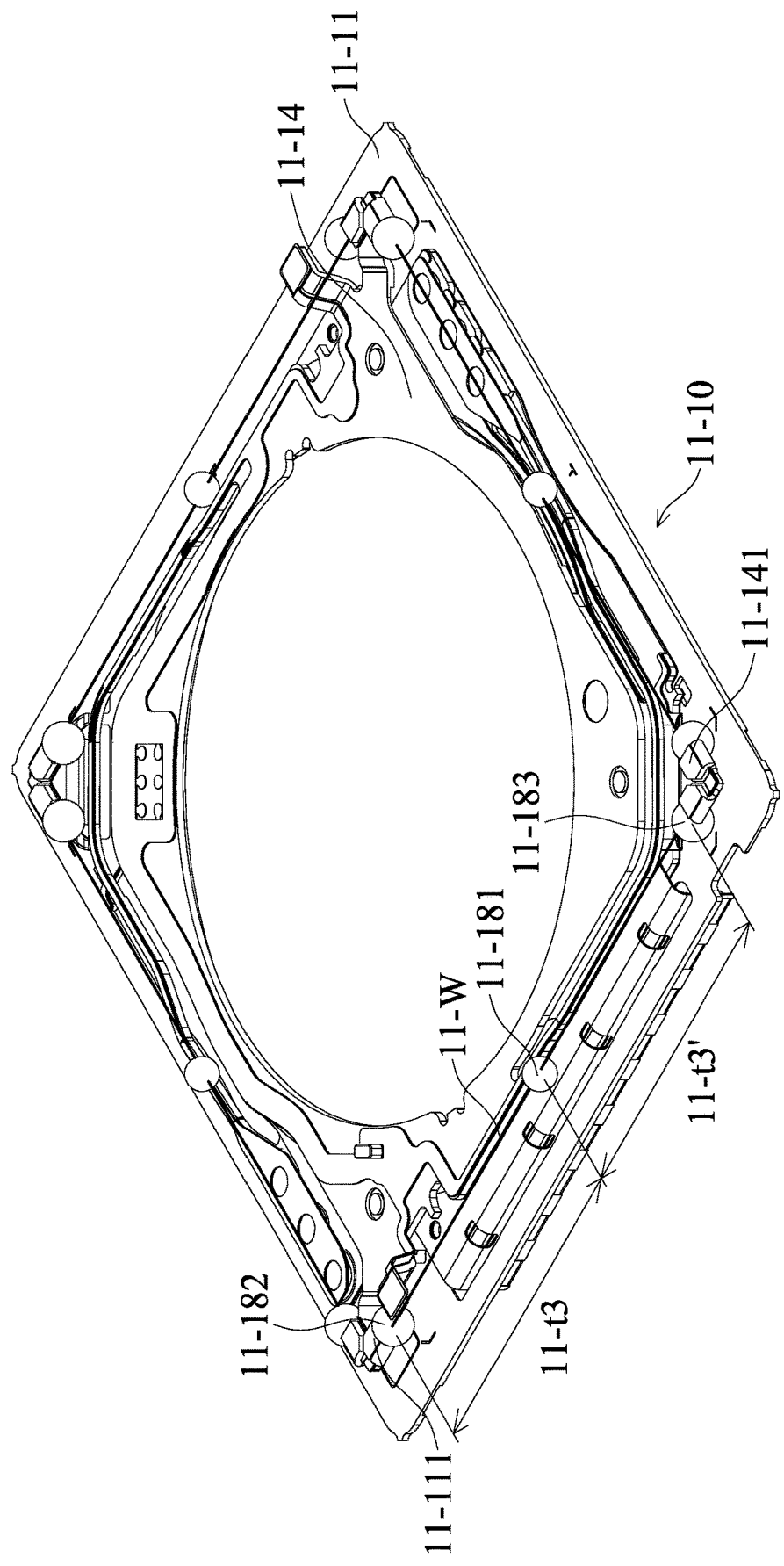
Figure 140C:
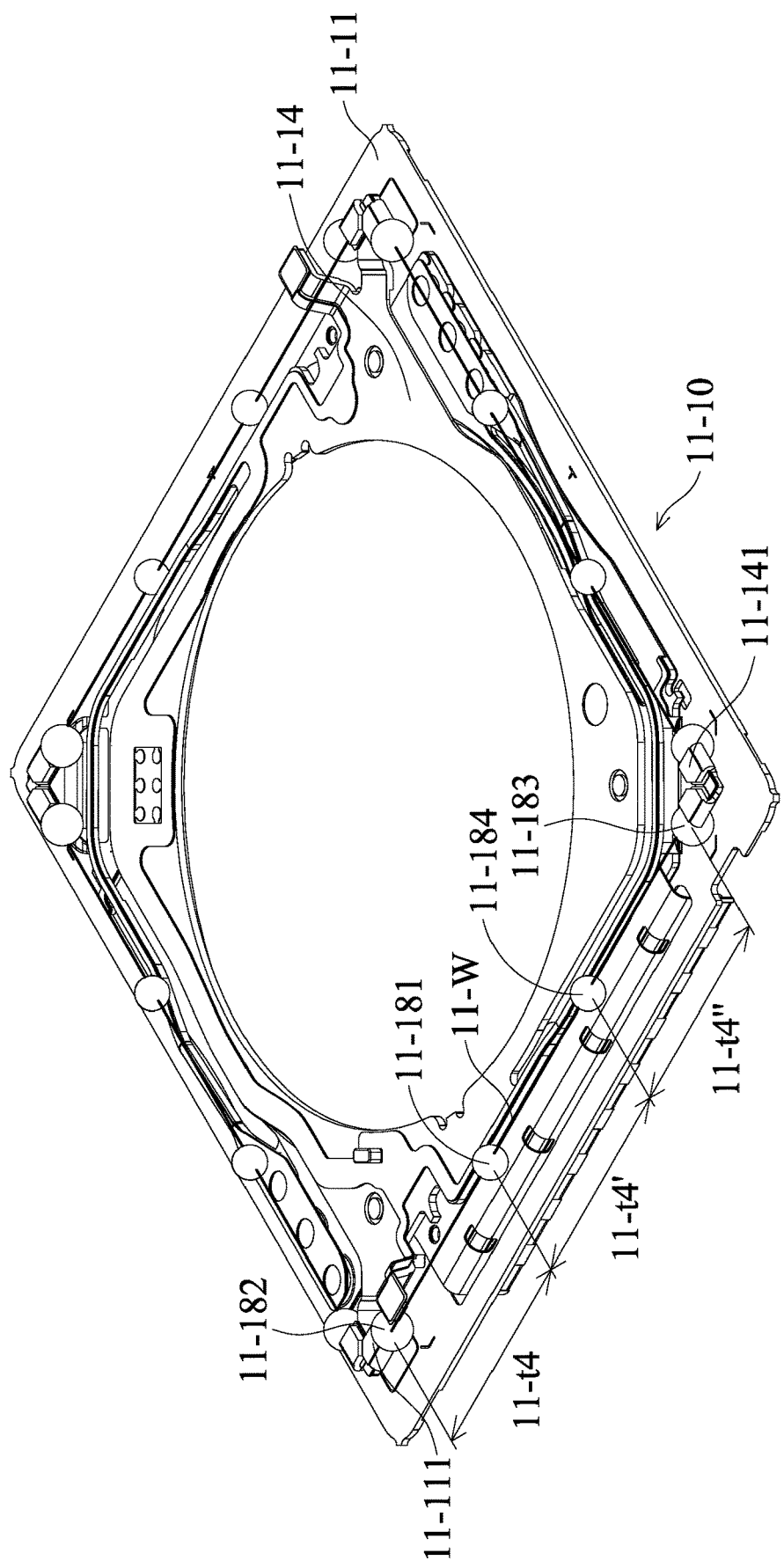
Figure 141:
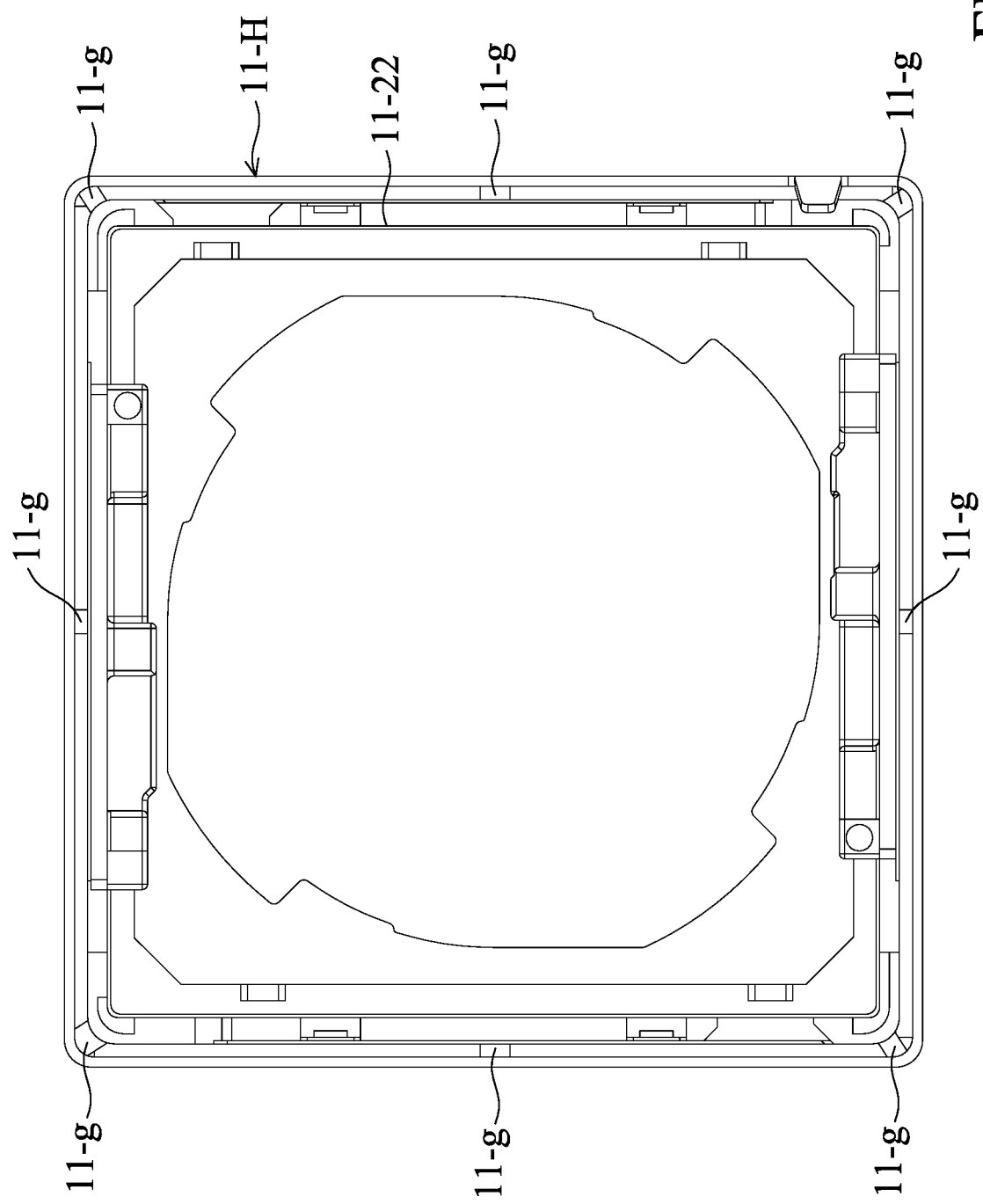
Figure 142:
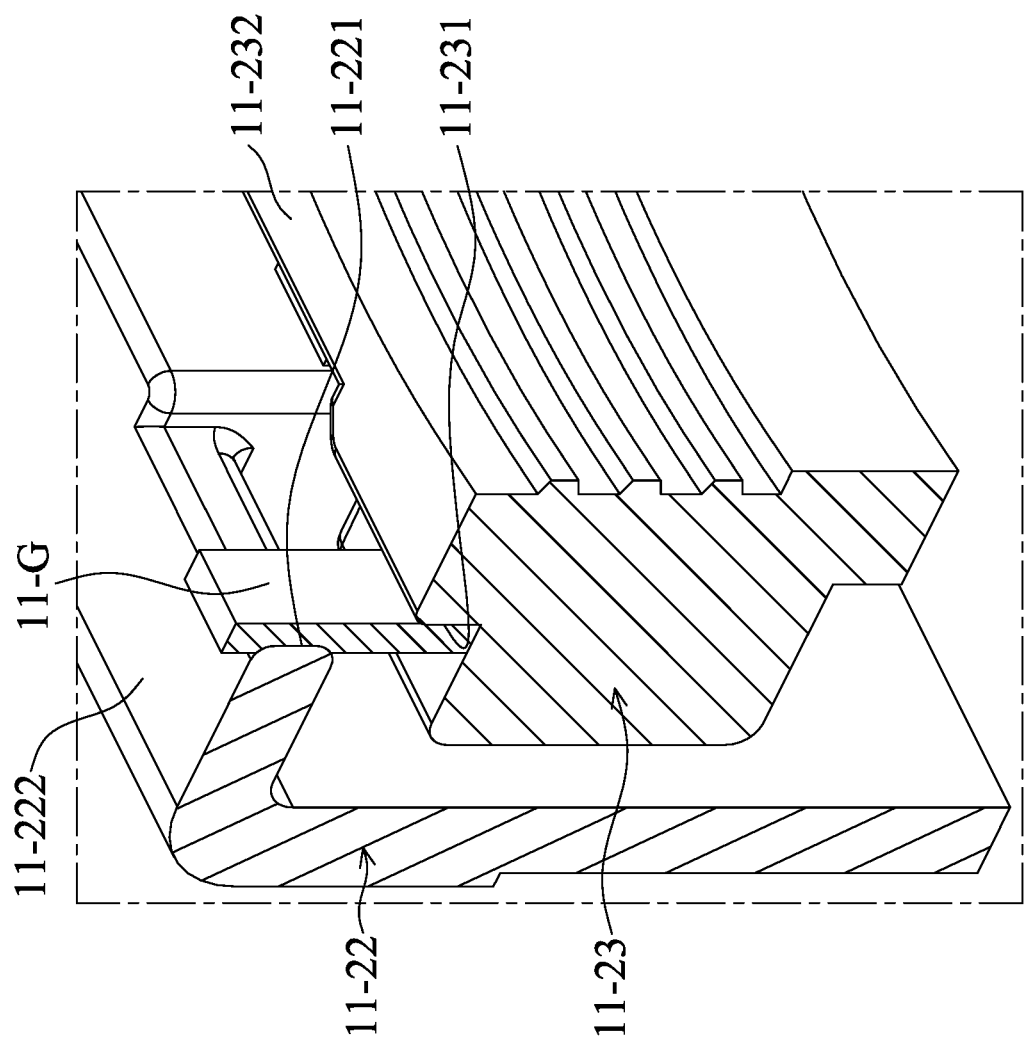
Figure 143:
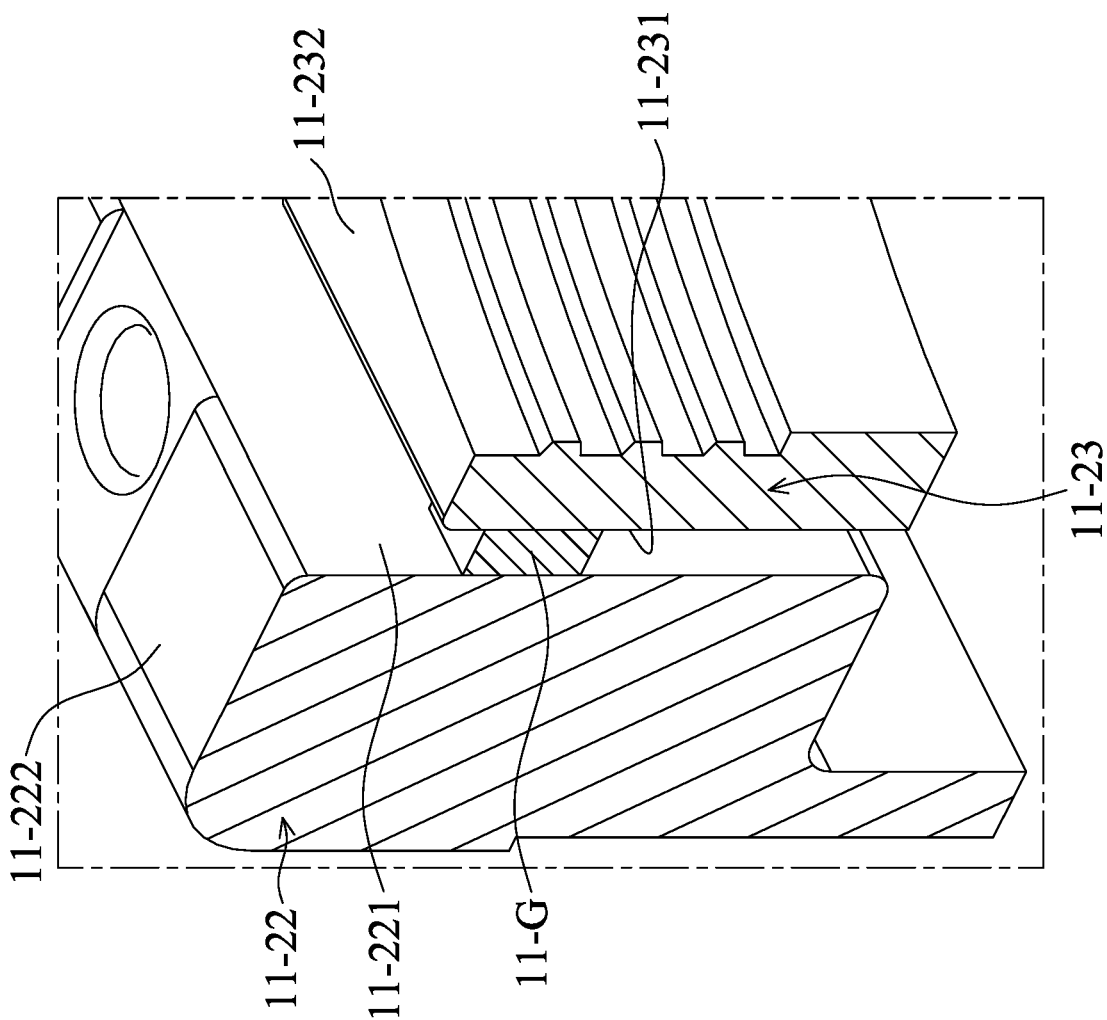
Figure 144:
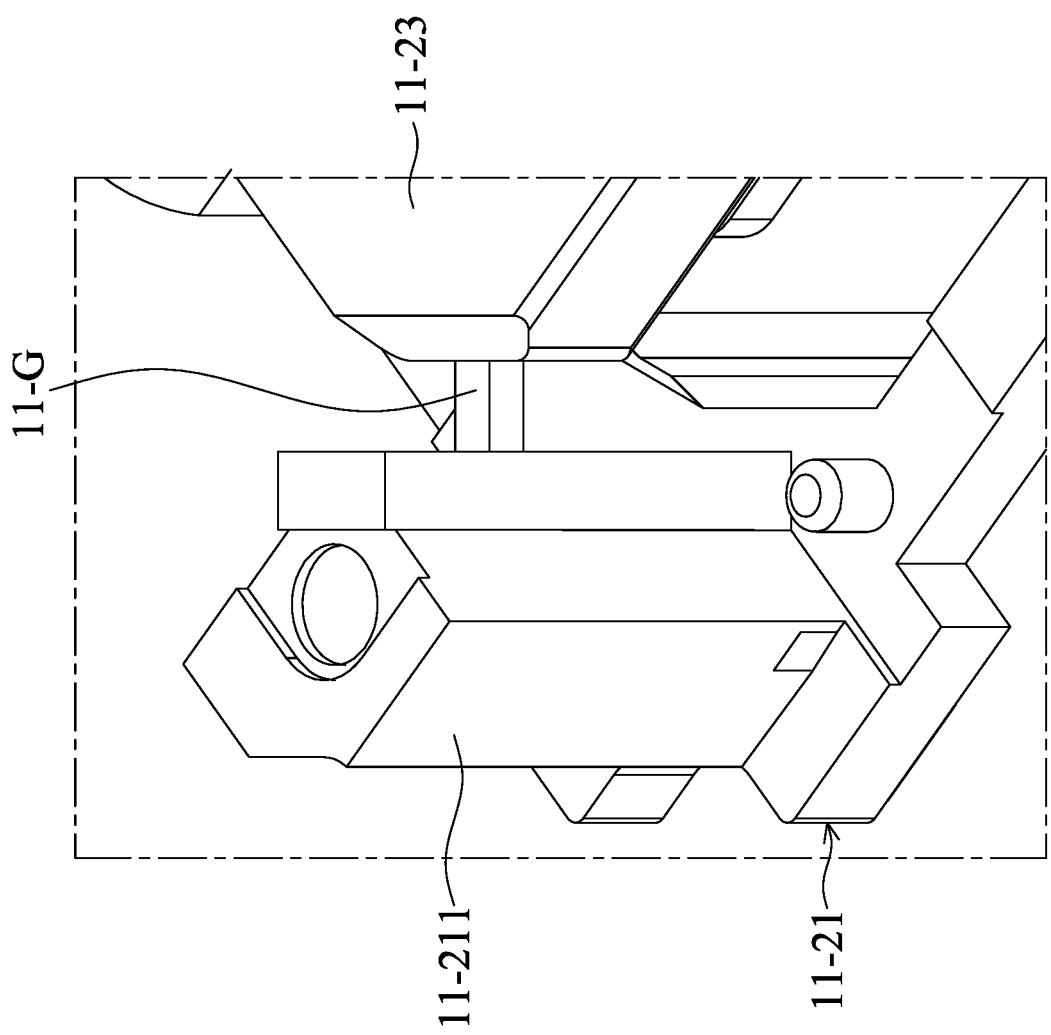
Figure 145:
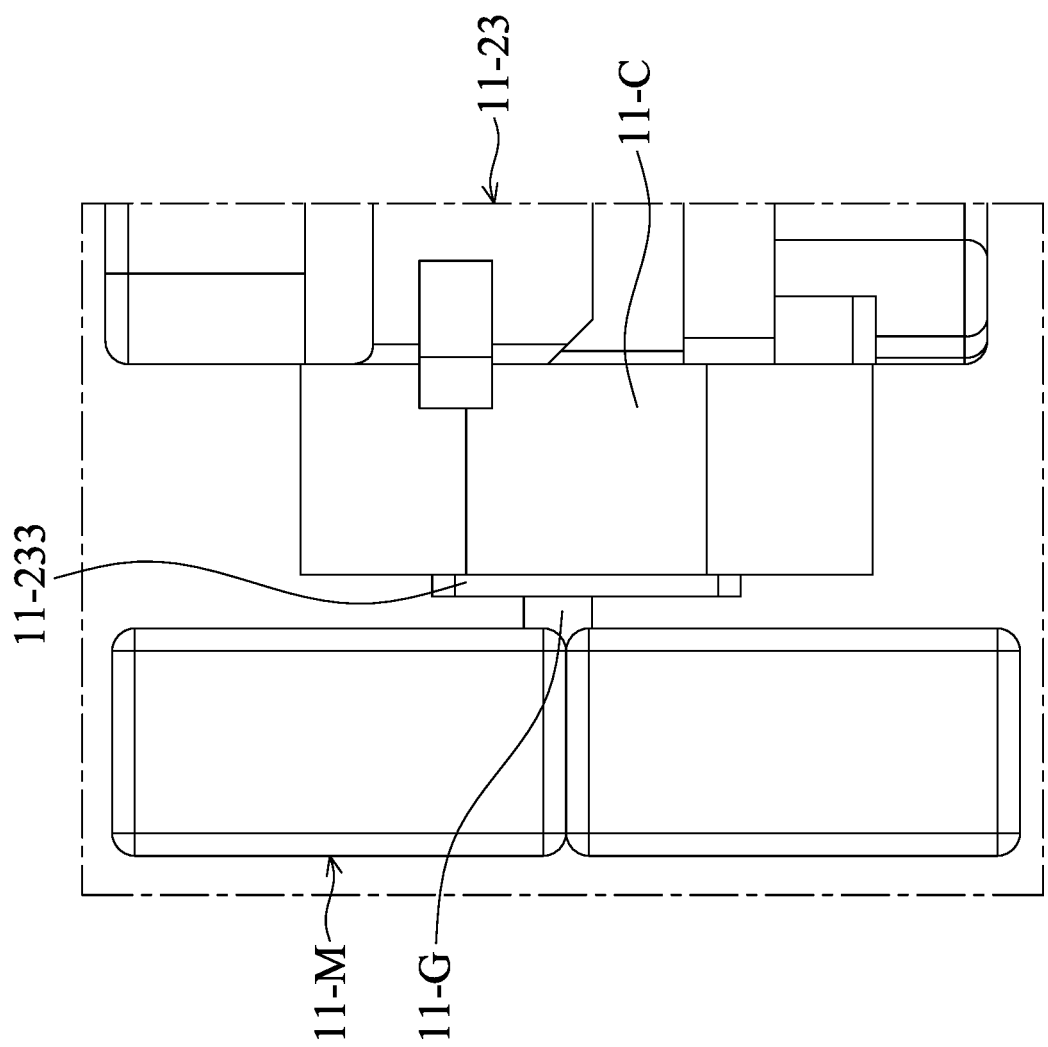
Figure 146:
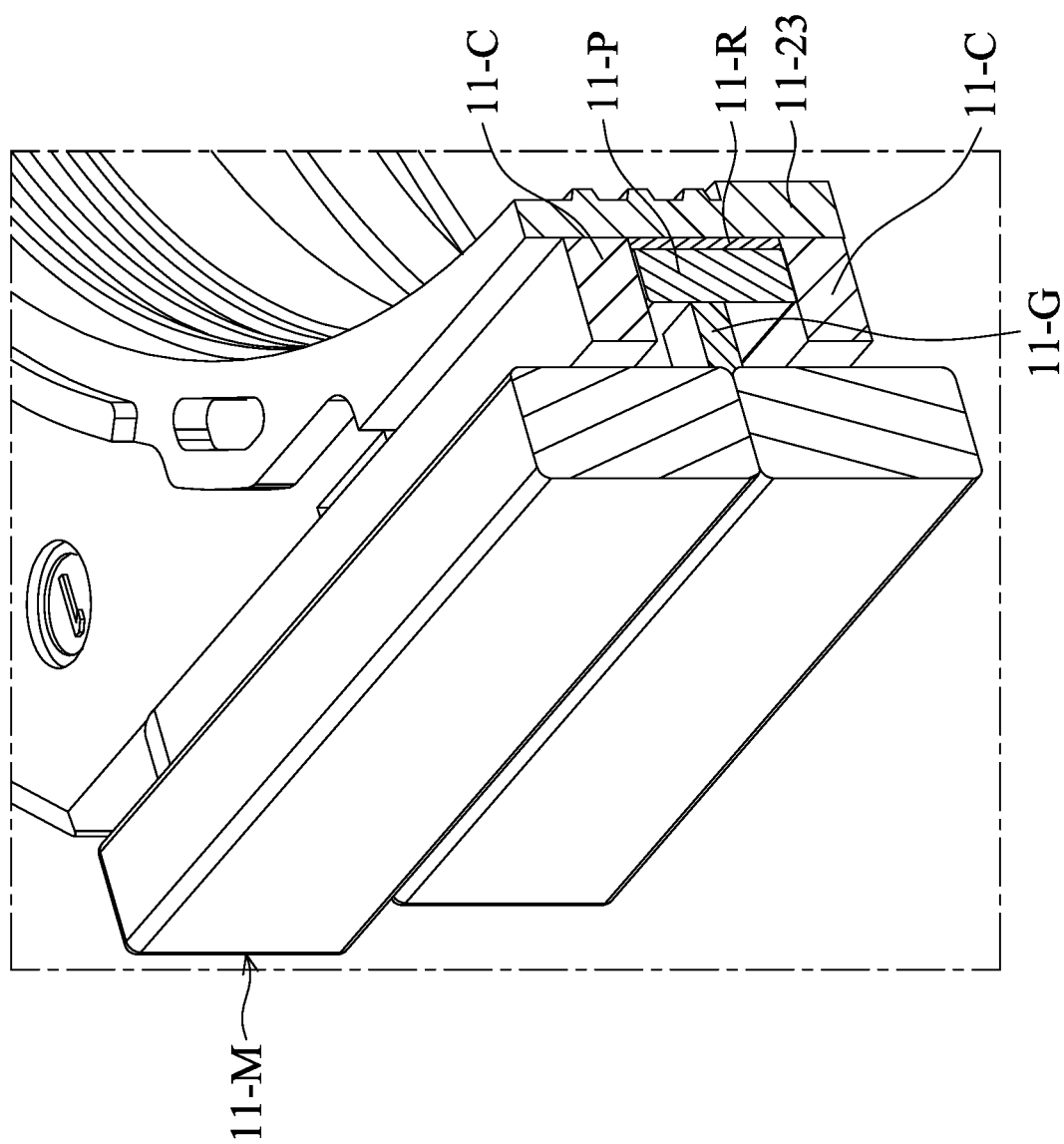
Figure 147:
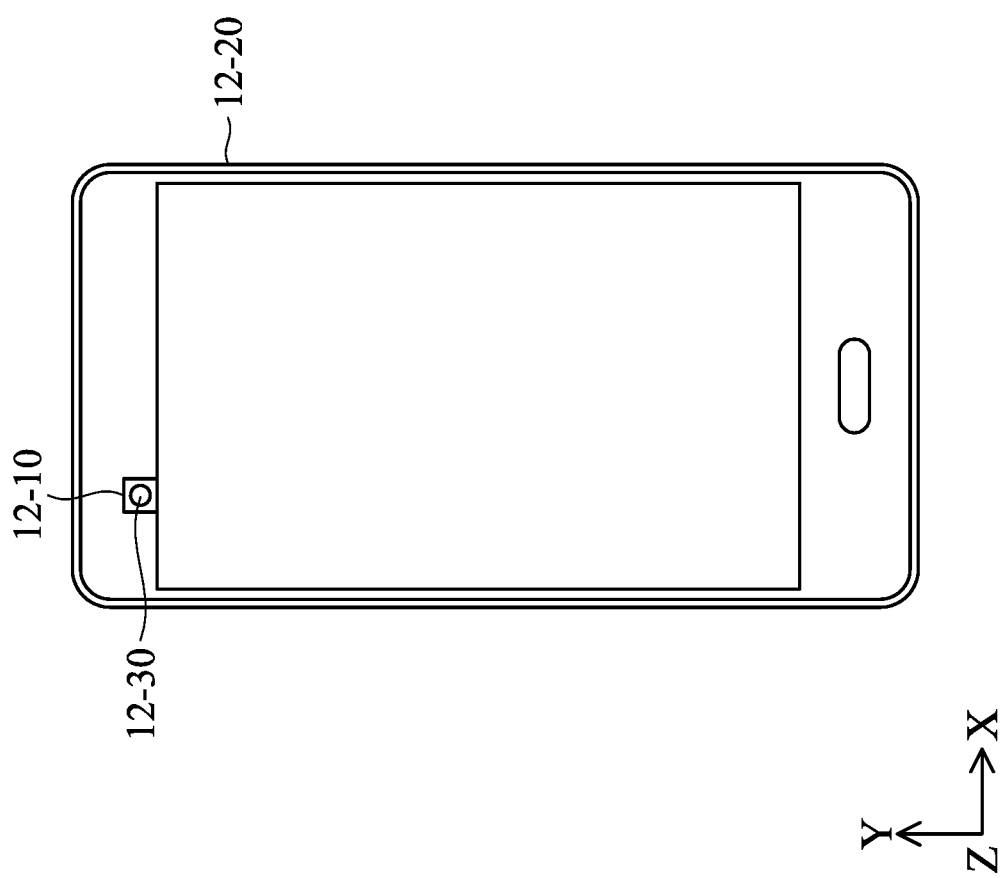
Figure 148:
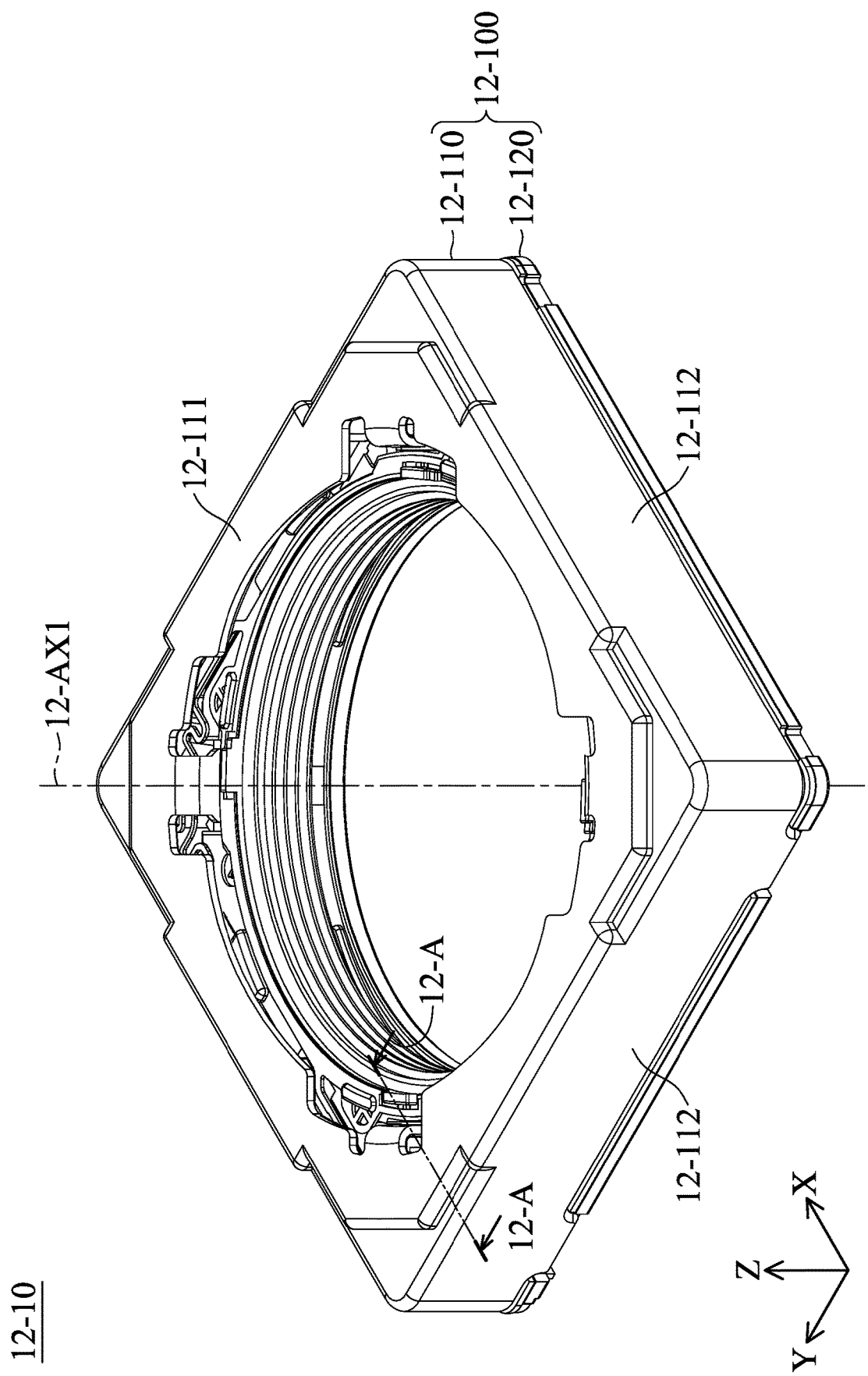
Figure 149:
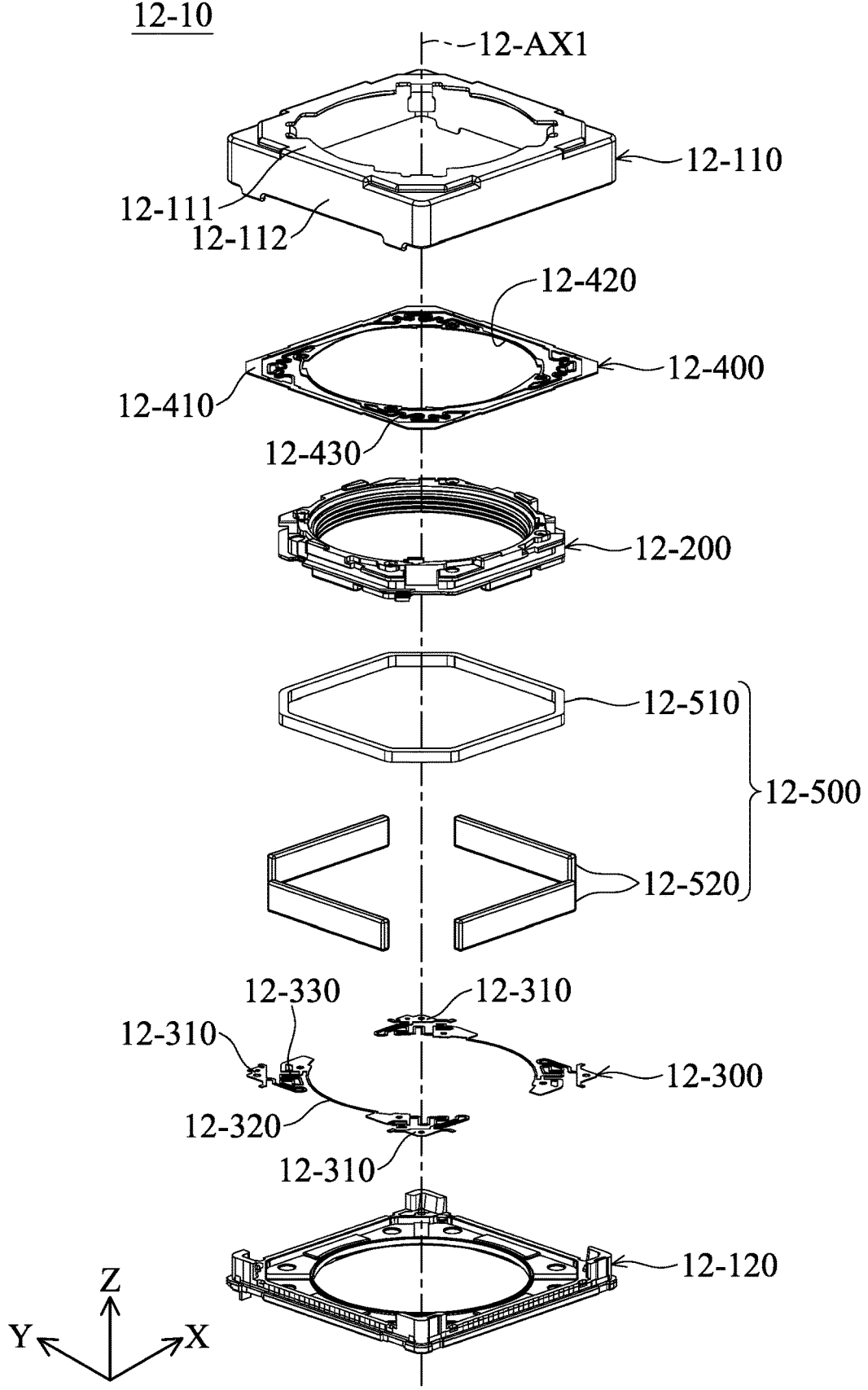
Figure 150:
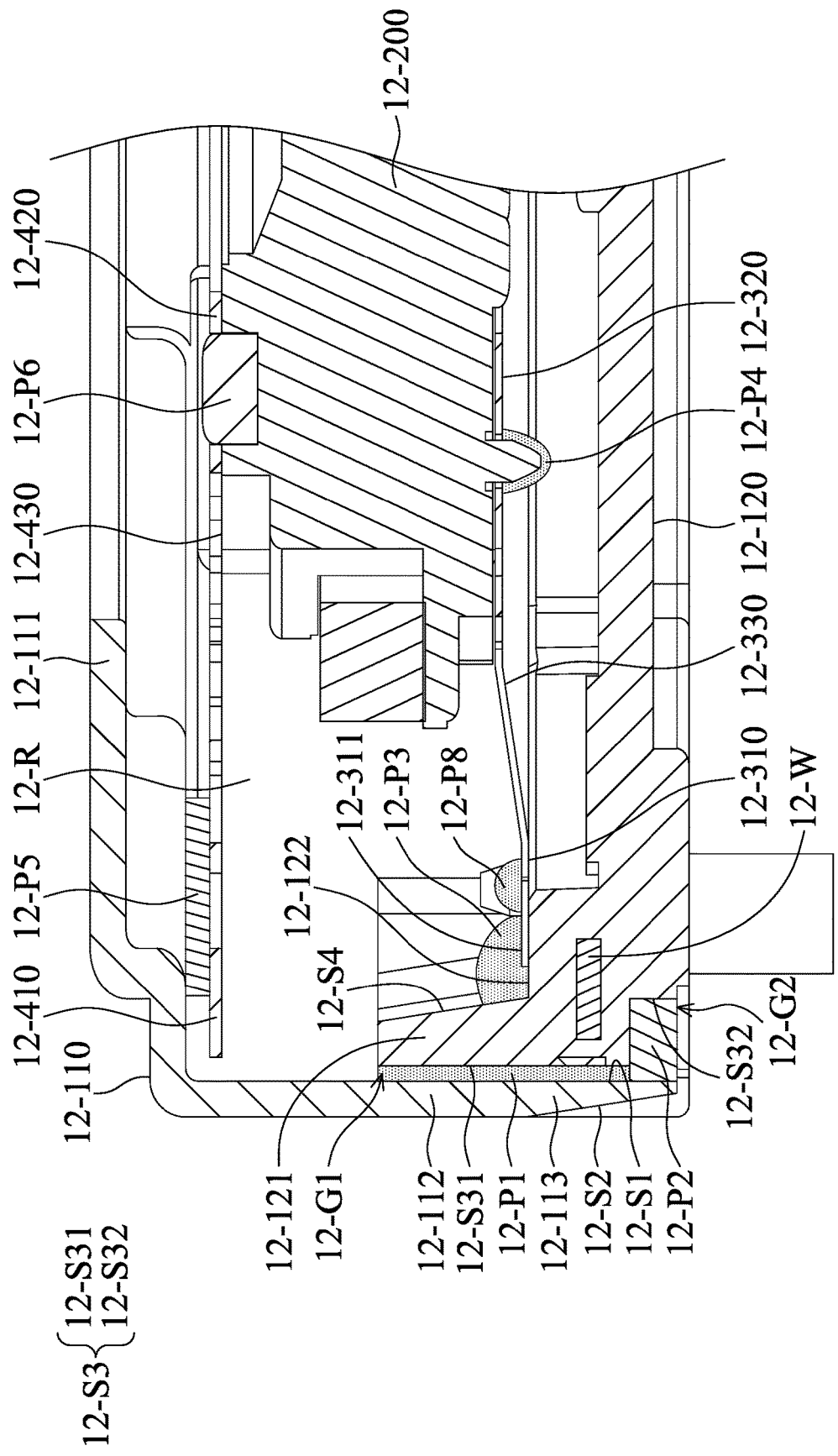
Figure 151:
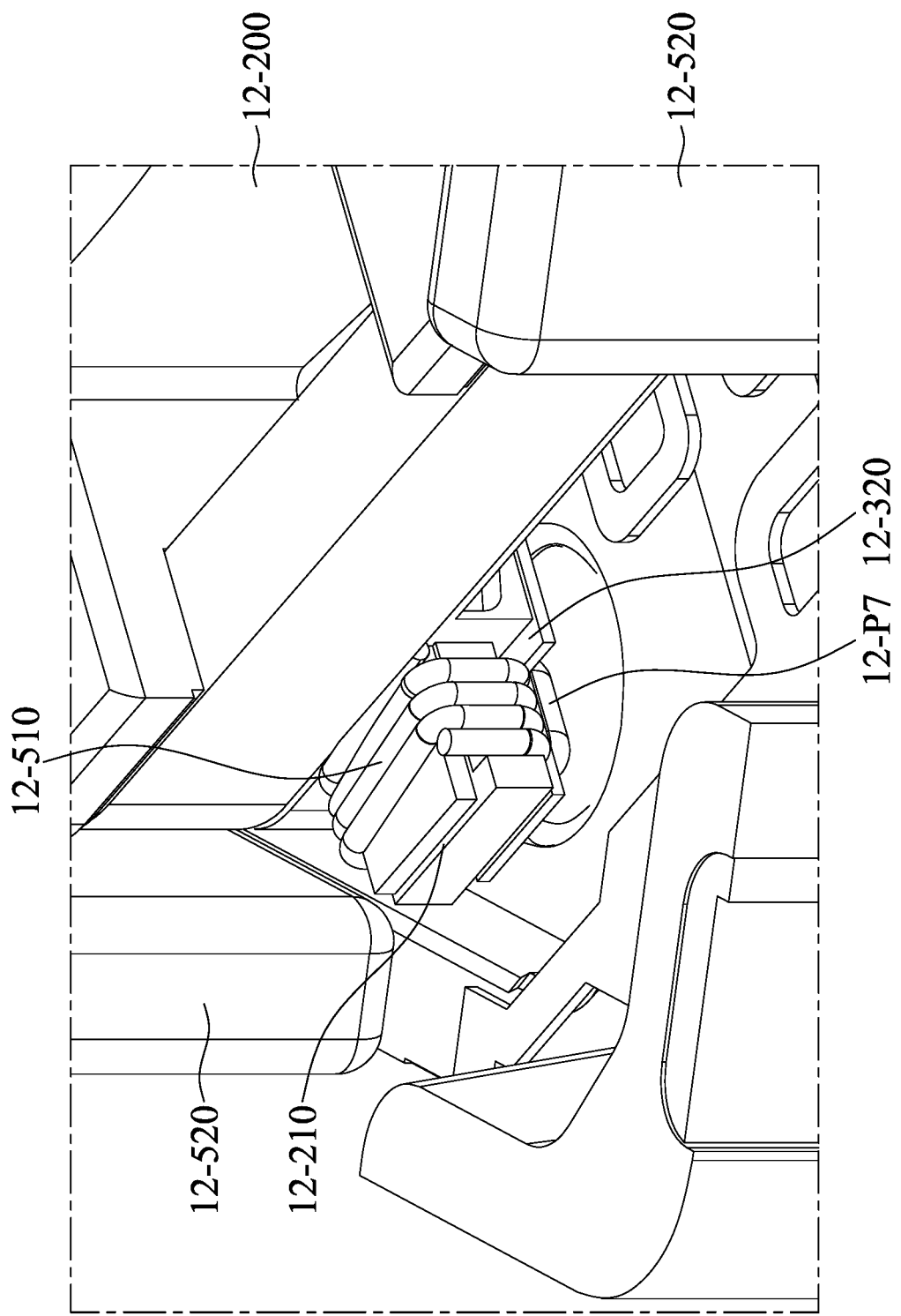
Figure 152:
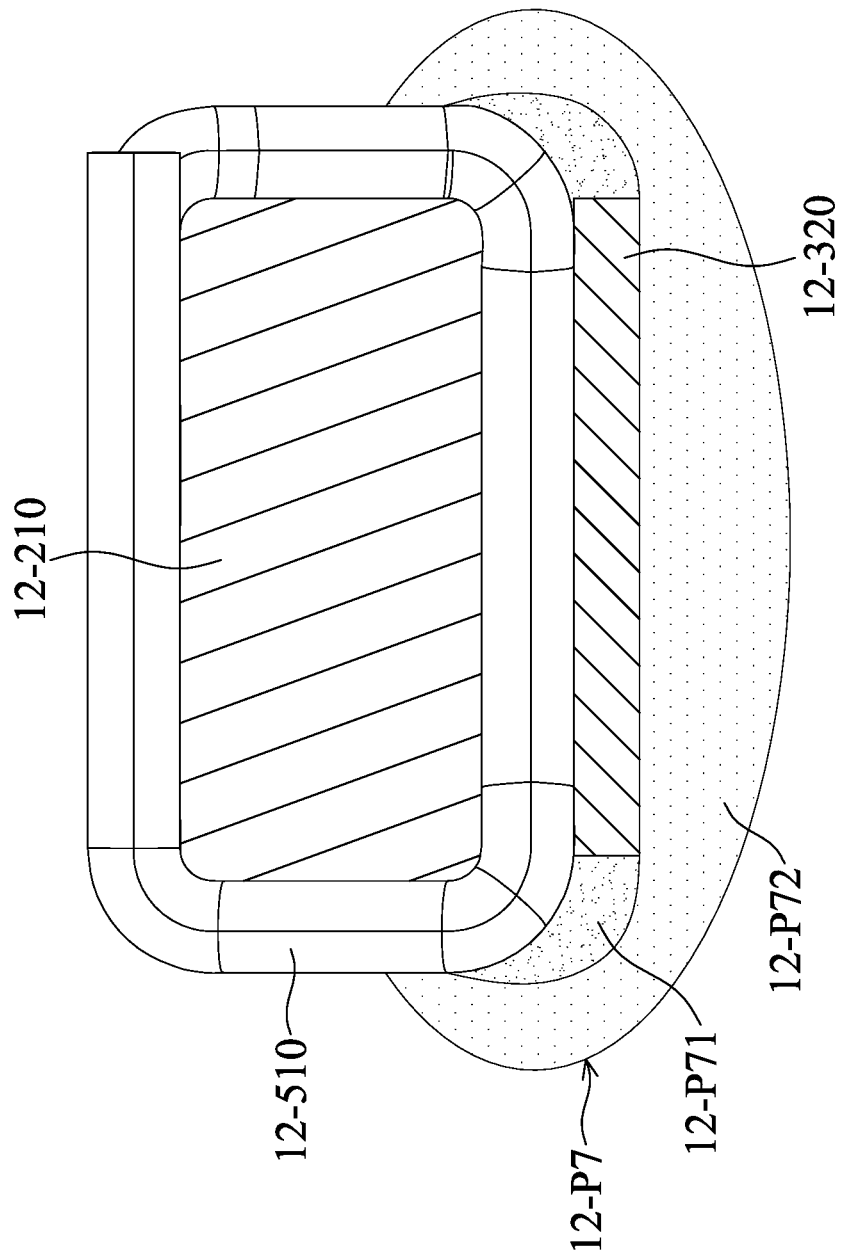
Figure 153:
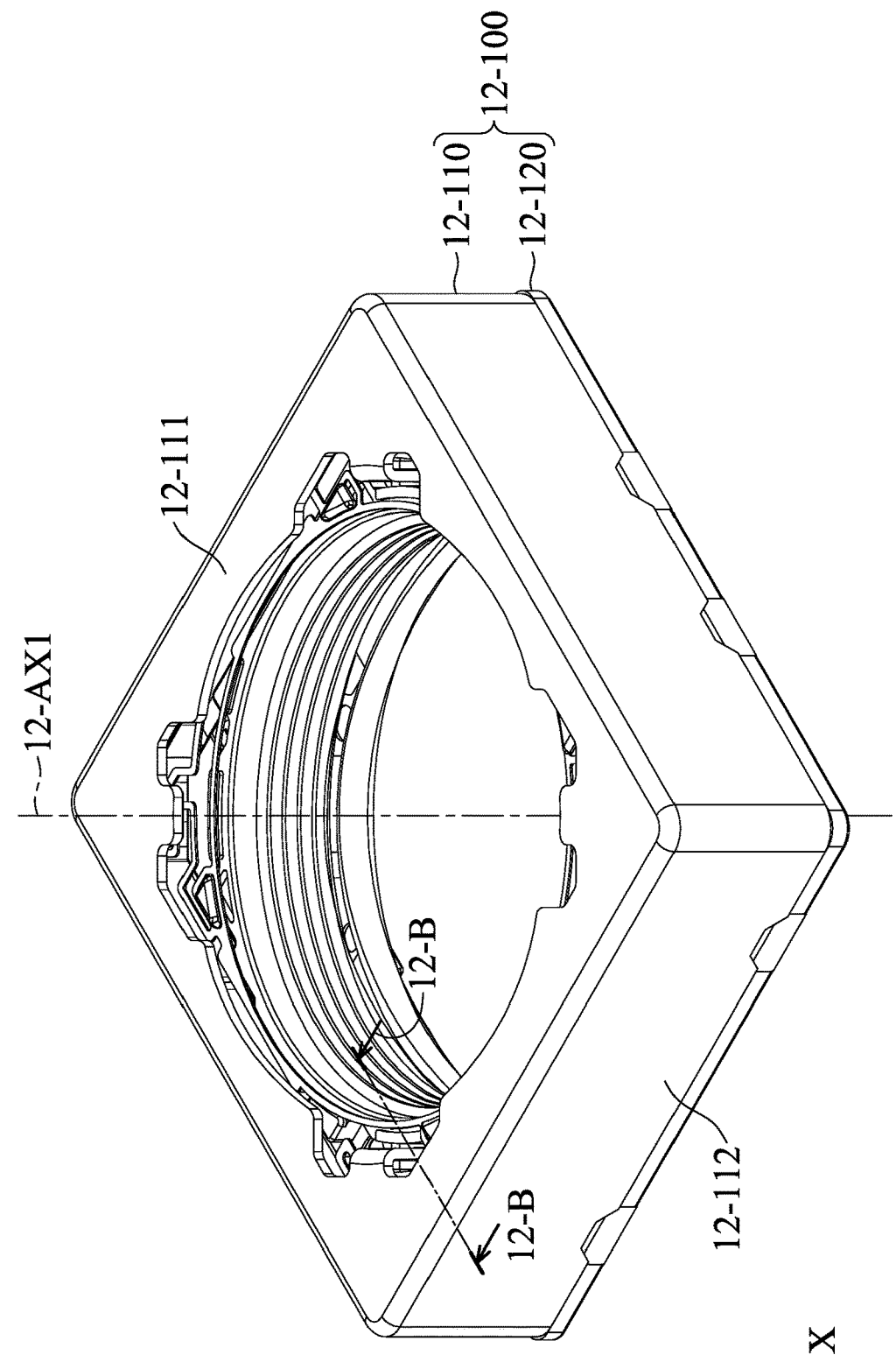
Figure 154:
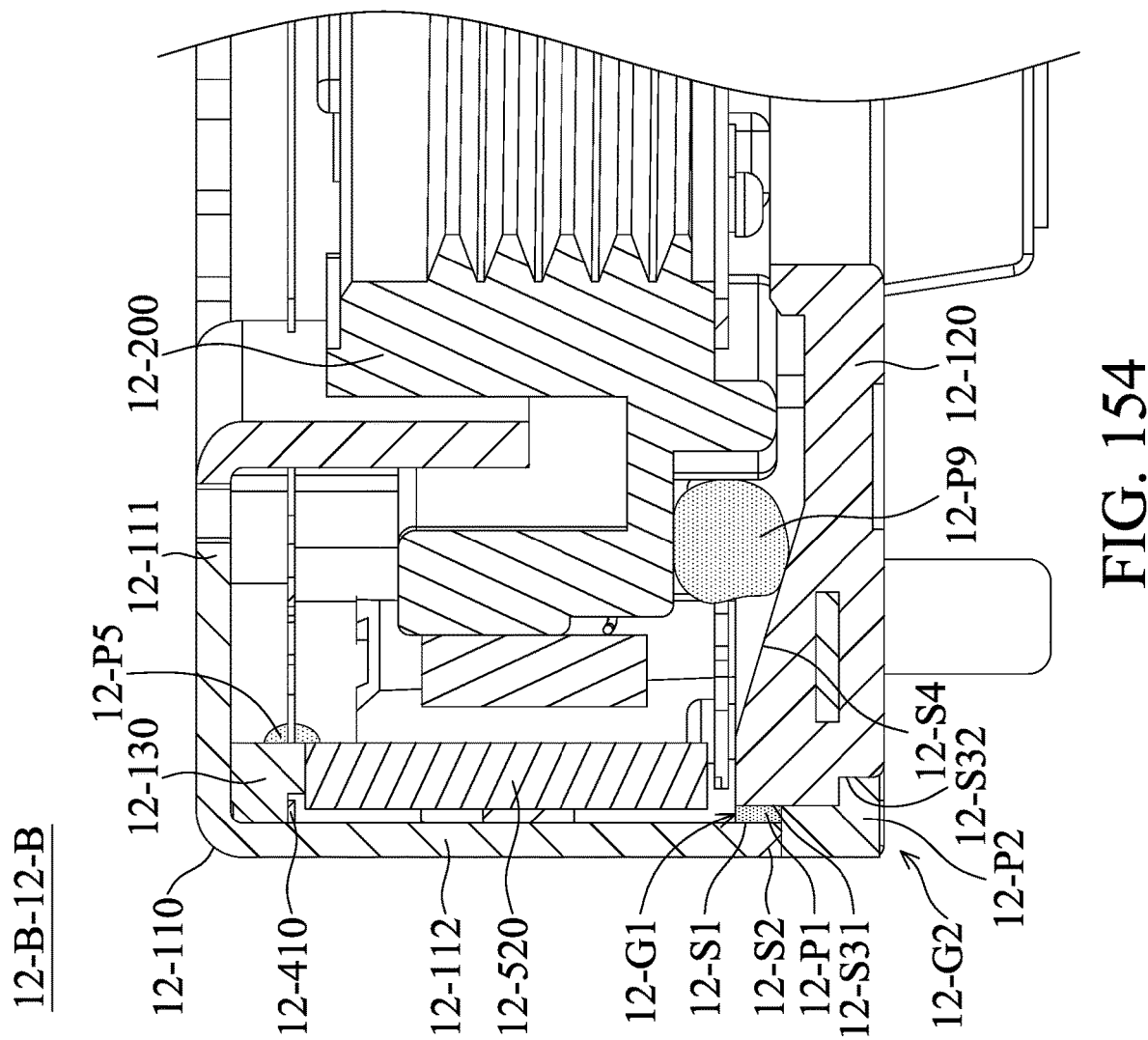
Figure 155:
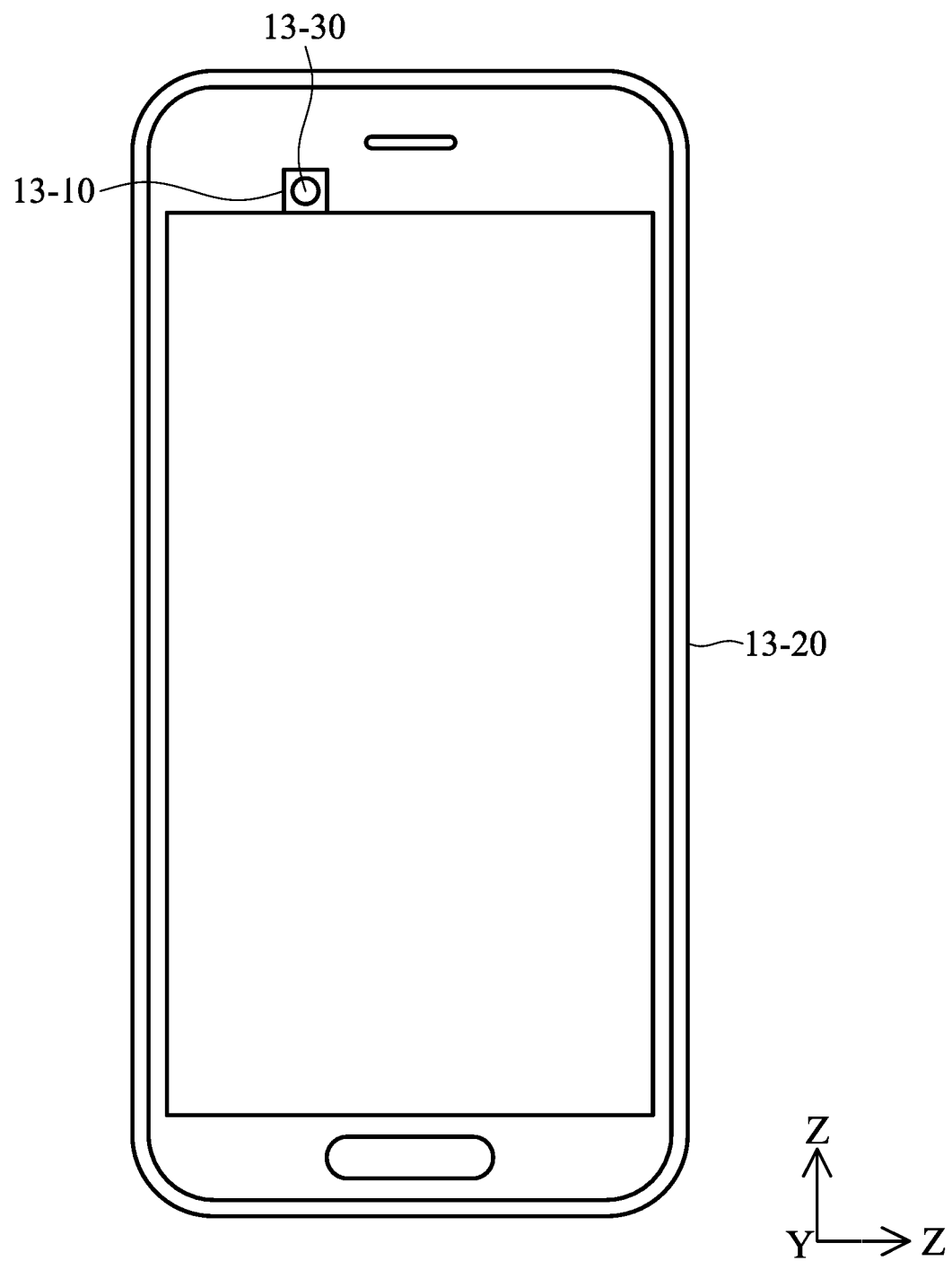
Figure 156:
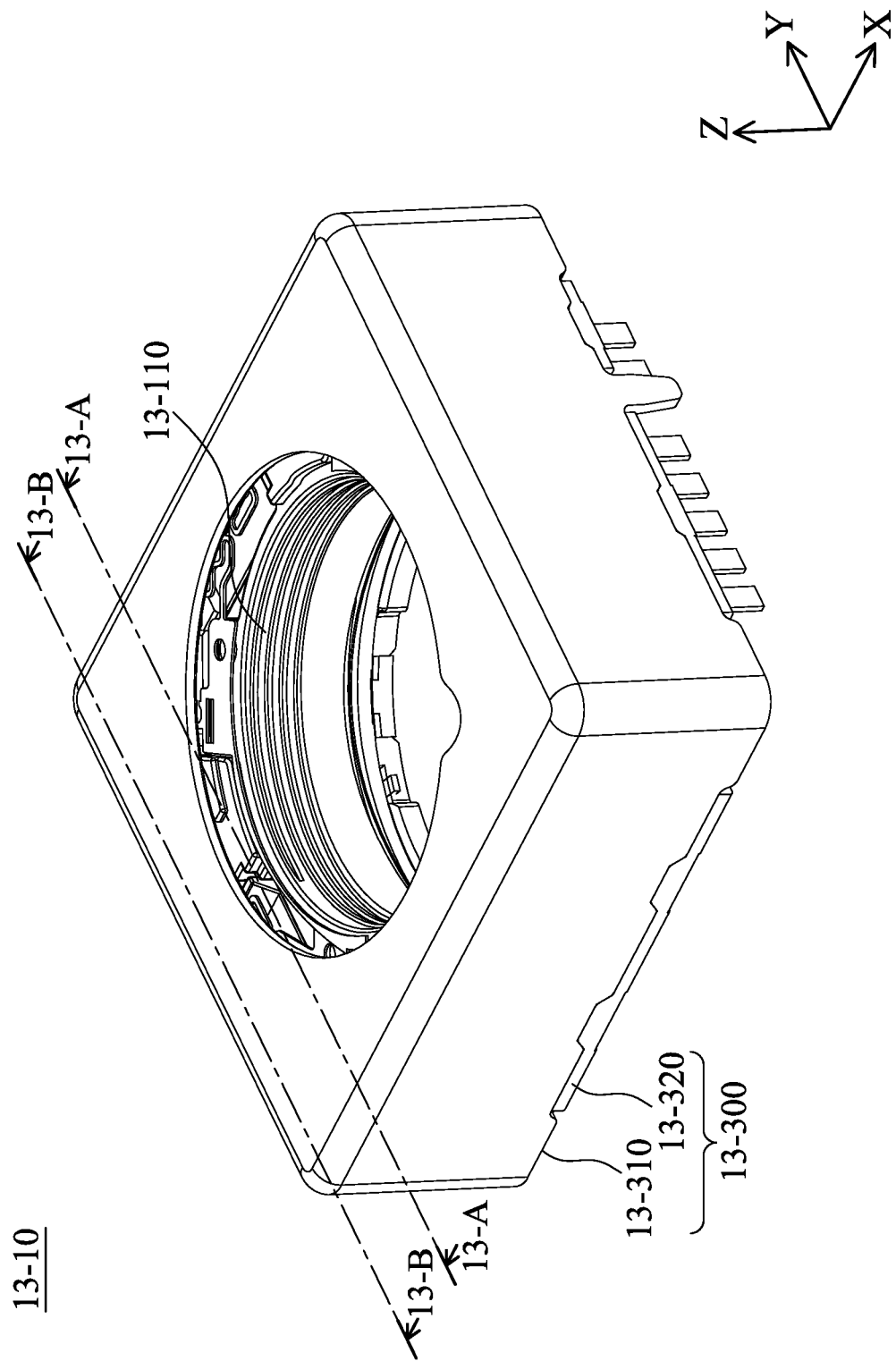
Figure 157:
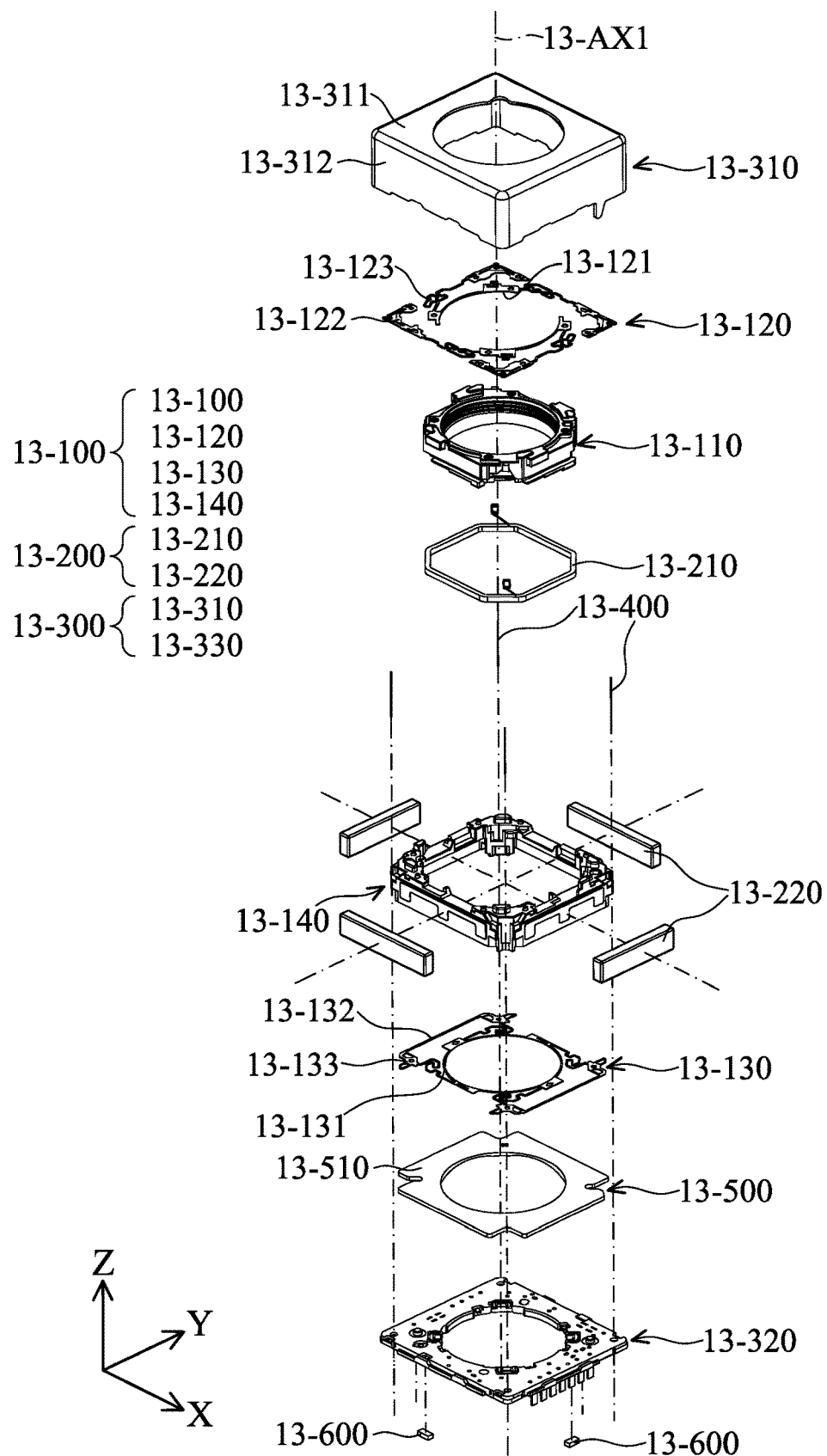
Figure 158:
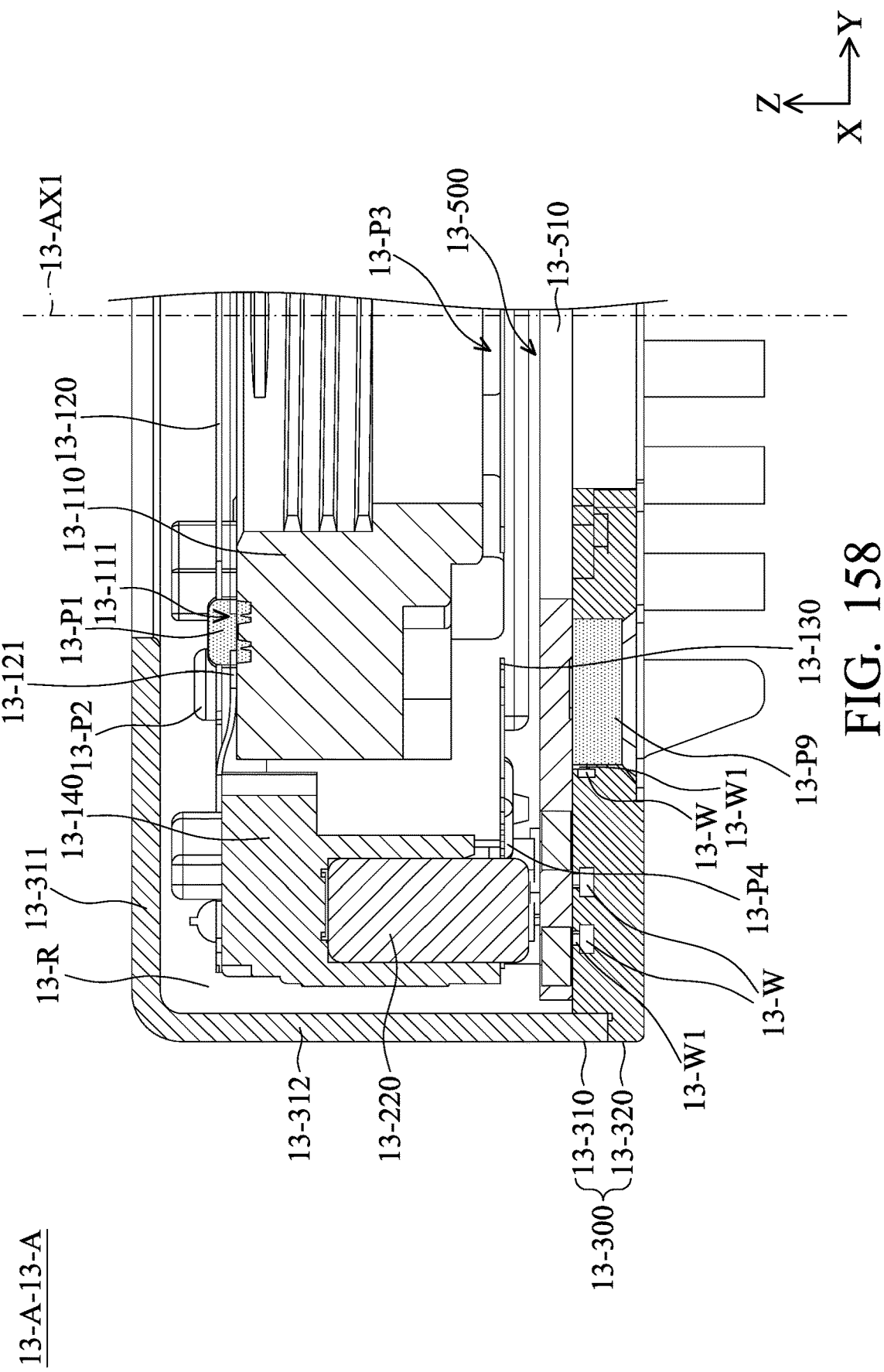
Figure 159:
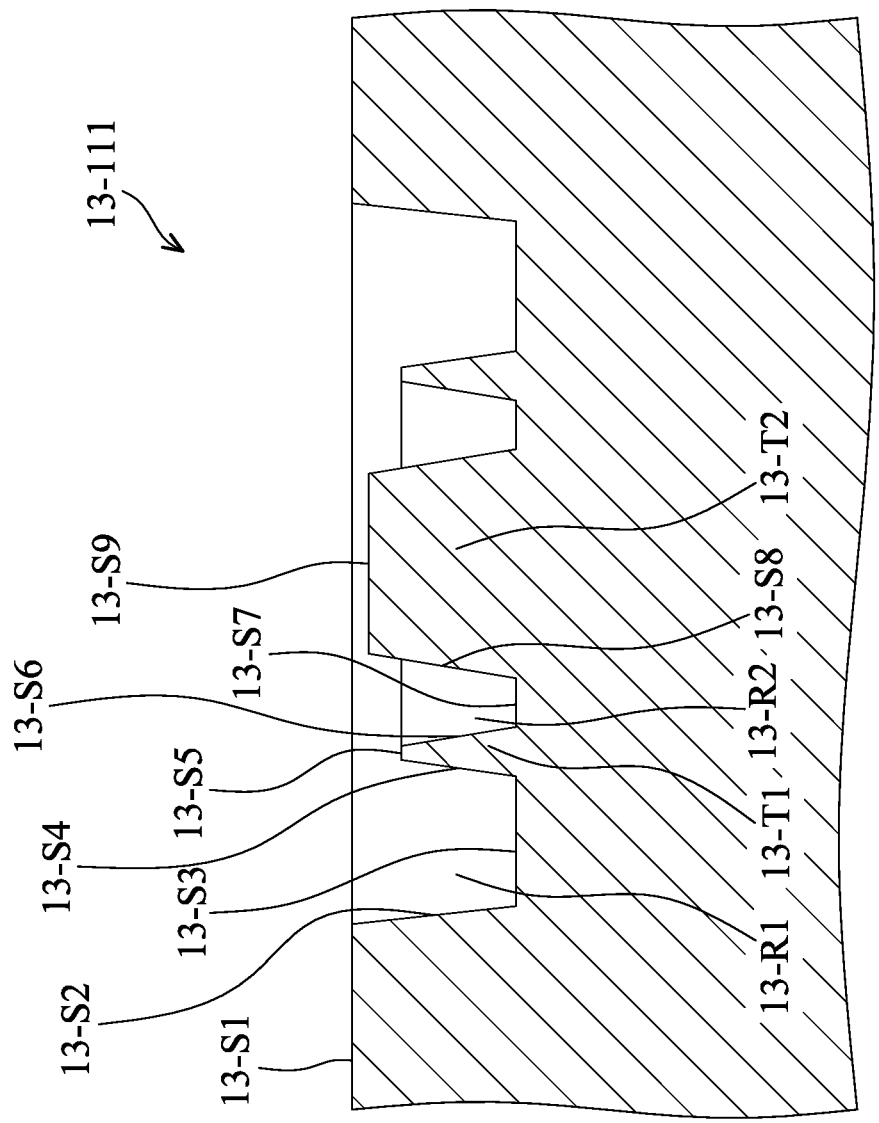
Figure 160:
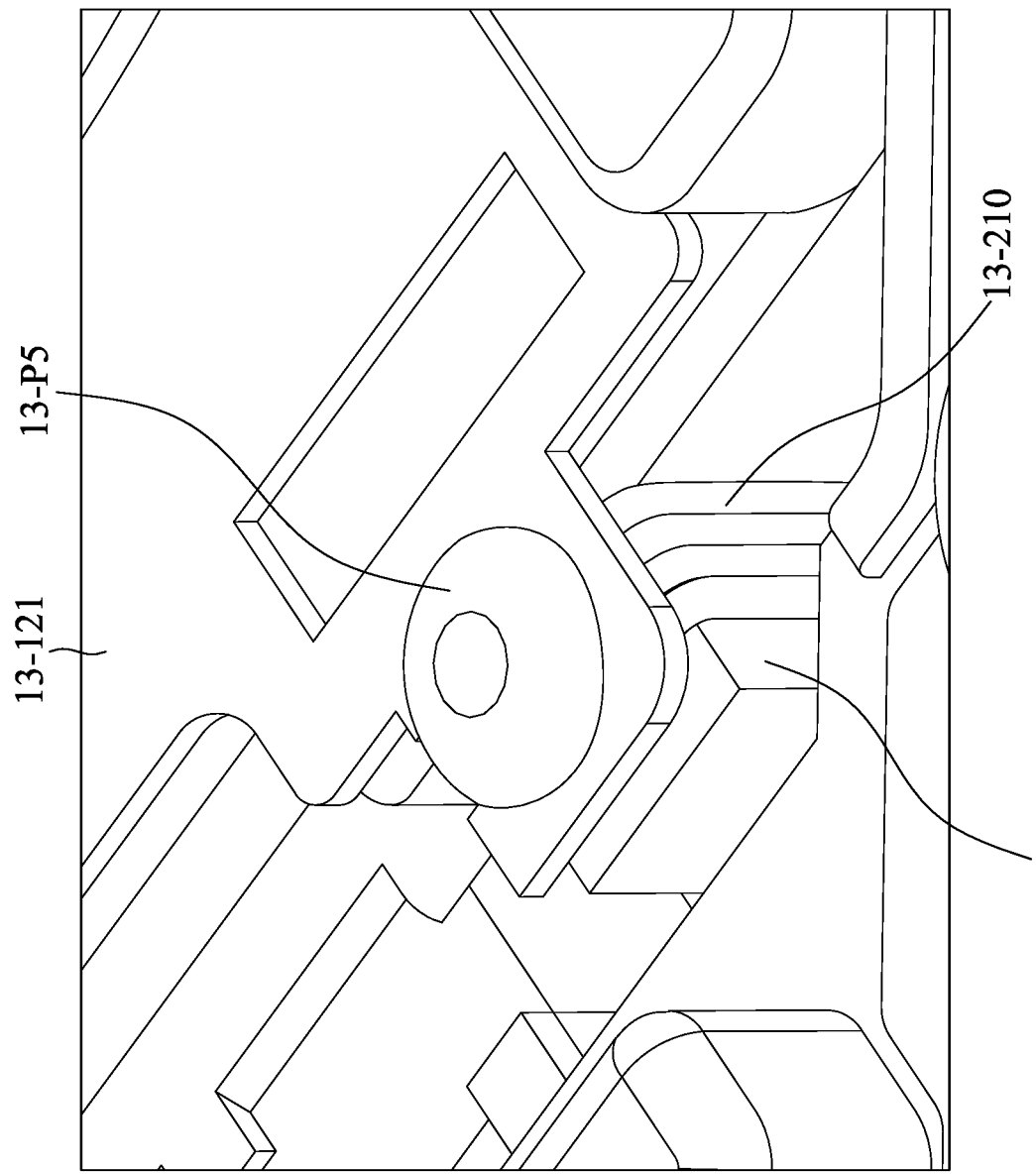
Figure 161:
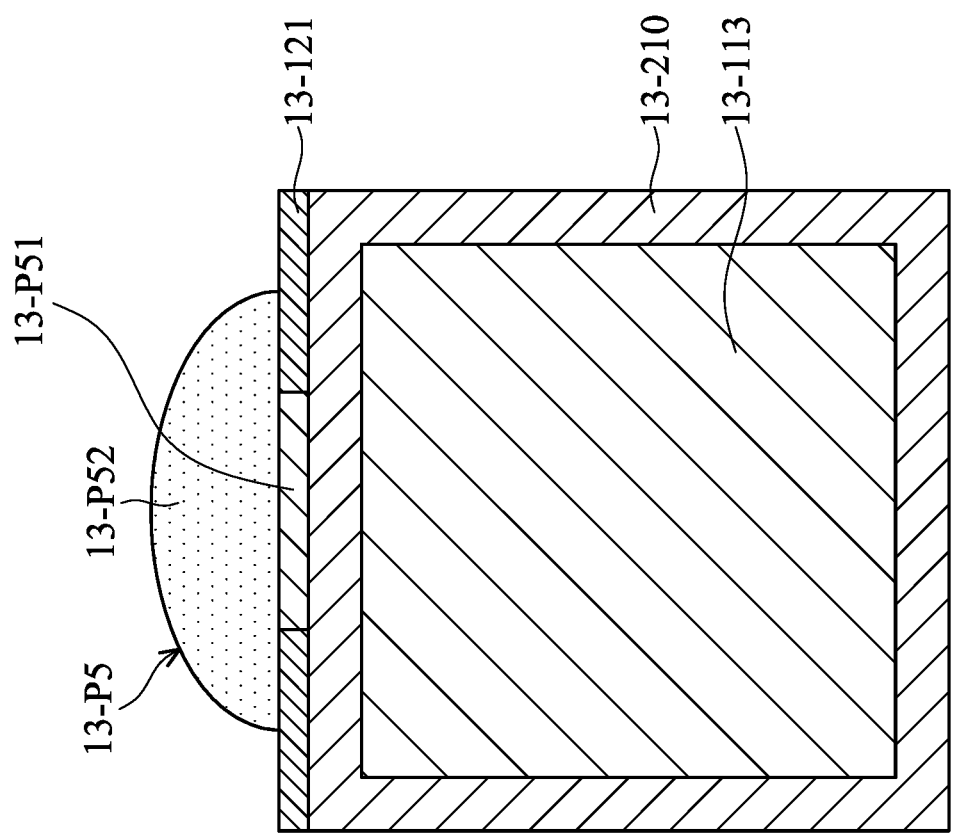
Figure 162:
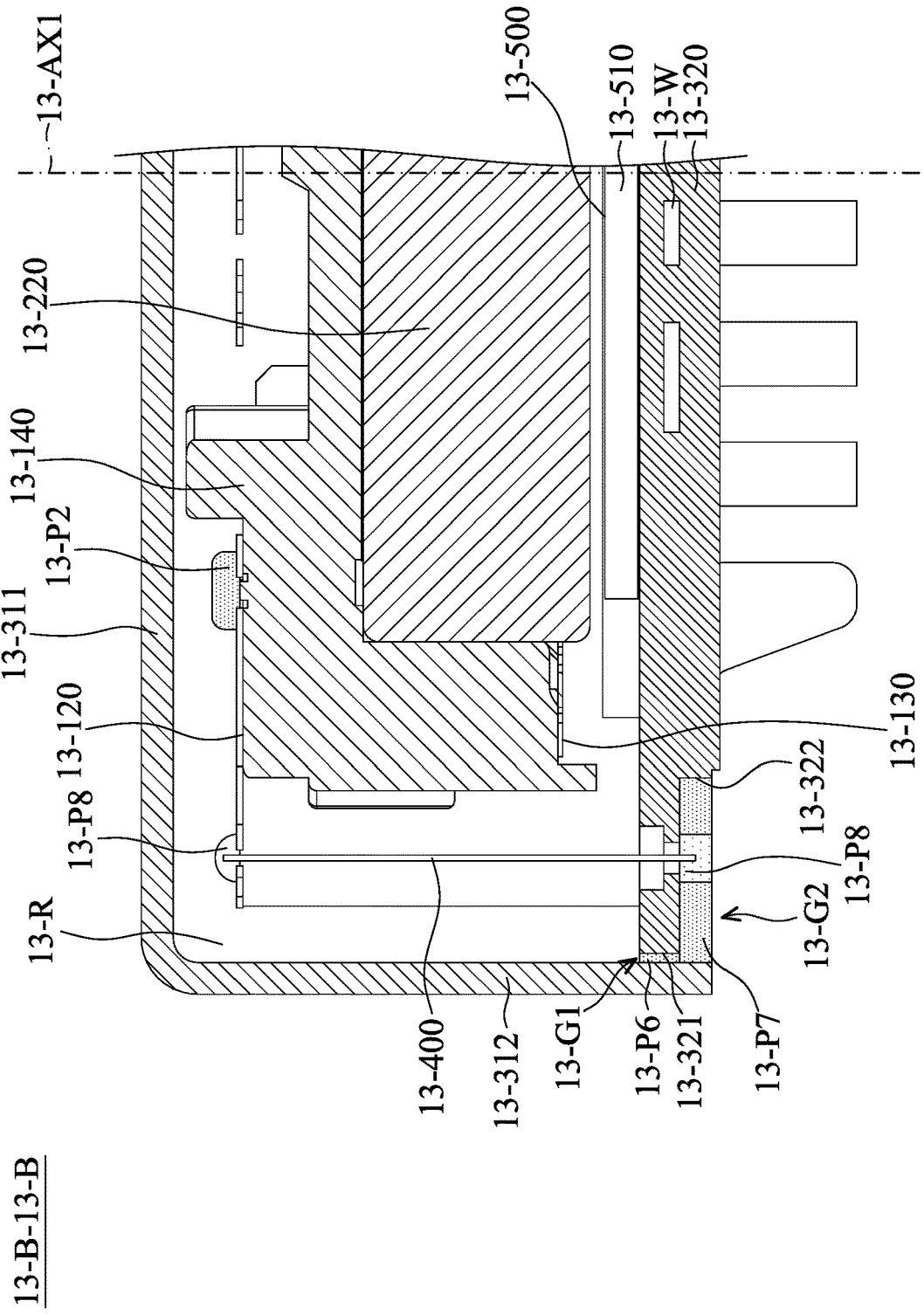
Figure 163:
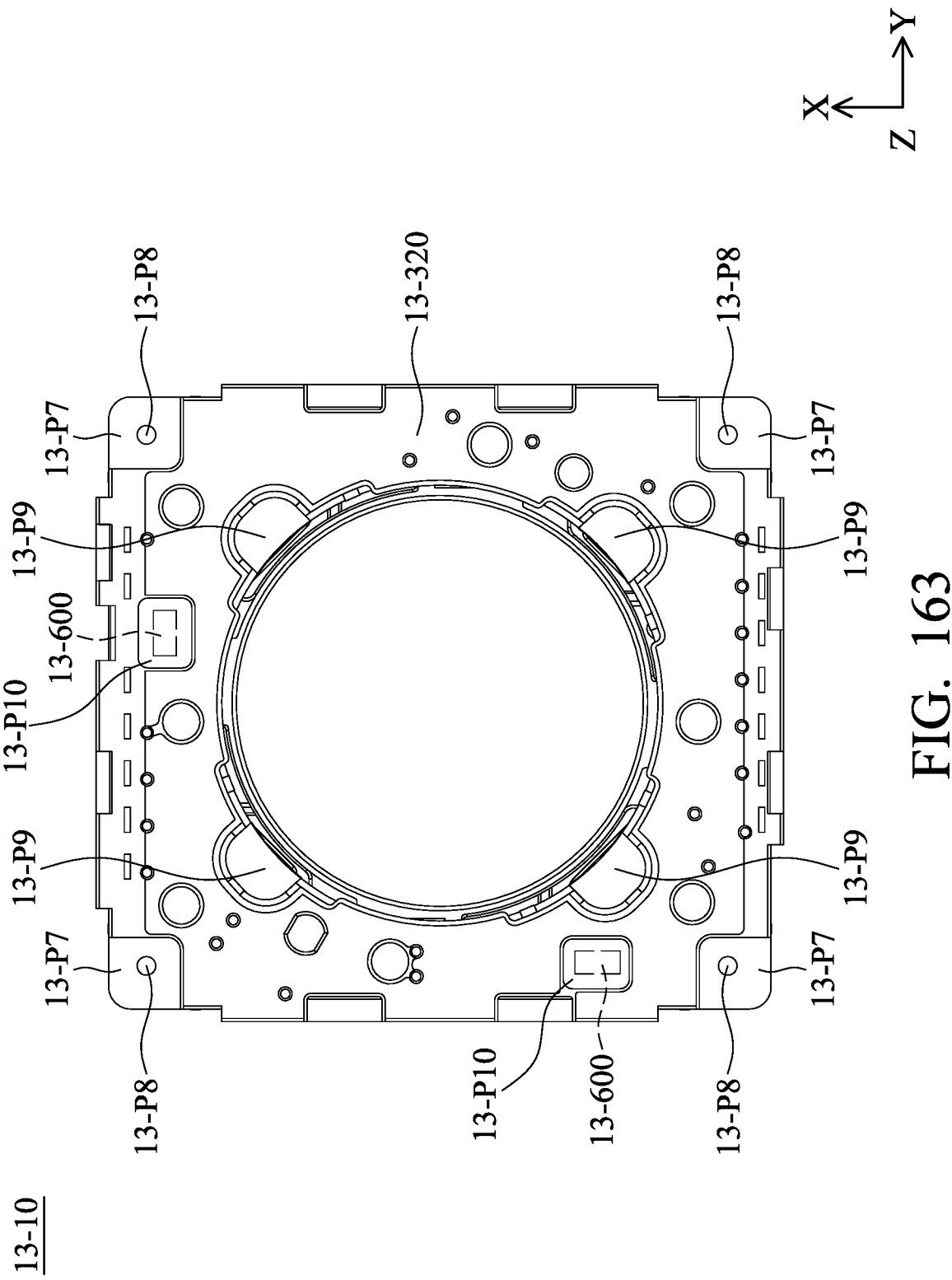
Figure 164:
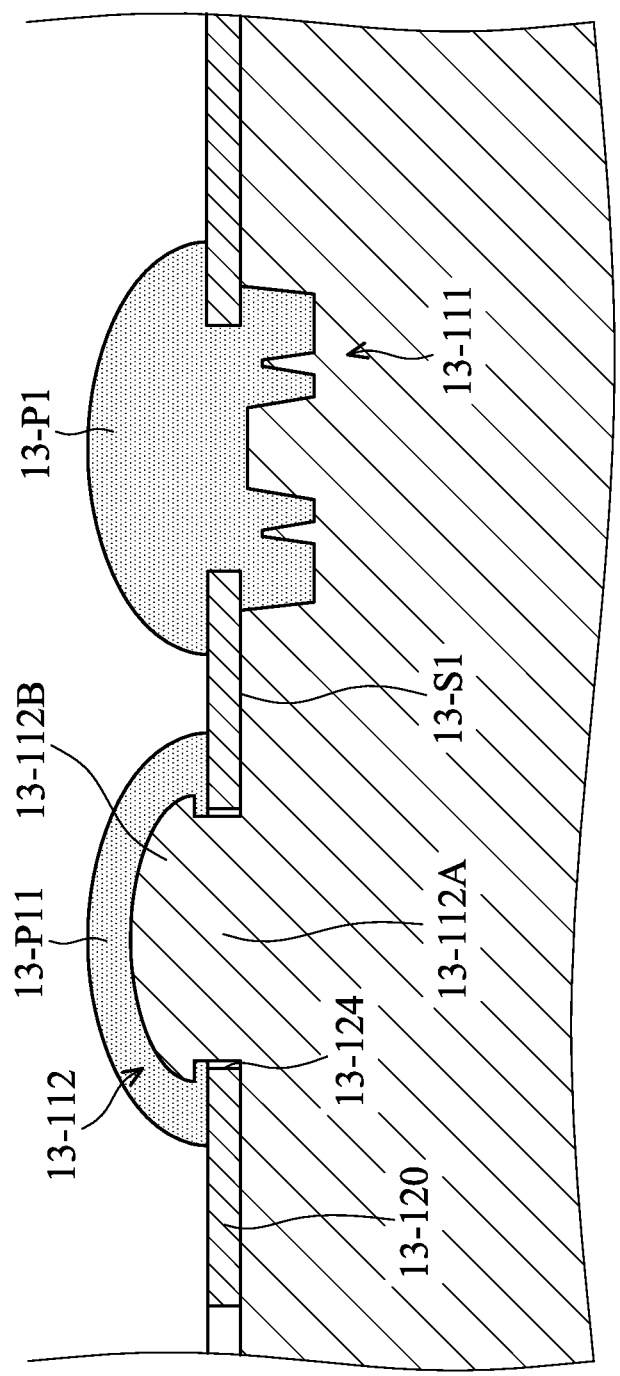

FIG. 126B is an enlarged view of FIG. 126A;

FIG. 127 is a schematic view of the recessed structure;

FIG. 128 is a top view of the optical element driving mechanism, wherein the case, the frame, and the upper resilient element are omitted;

FIG. 129 is a top view of the bottom and the circuit board;

FIG. 130A is a schematic view of the bottom and the circuit assembly in the bottom;

FIG. 130B is a schematic view of the circuit assembly and the control element;

FIG. 130C and FIG. 130D are schematic views when the first coil, the third coil, the second coil, and the fourth coil are electrically connected to some elements of the circuit assembly;

FIG. 131A and FIG. 131B are schematic views of the first control element and the second control element;

FIG. 132 is an exploded view diagram of an optical driving mechanism according an embodiment of the present disclosure;

FIG. 133 is a schematic diagram showing the assembled optical driving mechanisms in FIG. 132 (the housing 11-H is omitted);

FIG. 134 is a cross-sectional view taken along the line 11-A to 11-A' in FIG. 2;

FIG. 135 is a schematic diagram of the bottom plate and the biasing assembly;

FIG. 136 shows a schematic diagram of the bottom plate and the biasing assembly in FIG. 135 after assembly;

FIG. 137A is a schematic diagram of the partial bottom plate and the biasing assembly in FIG. 136;

FIG. 137B is a schematic diagram of the first electrical connection portion and the biasing element;

FIG. 137C is a cross-sectional view diagram showing the first electrical connection portion of the bottom plate and the biasing element, wherein the bottom plate further includes a first resin member, and the surface of the biasing member further includes a protective layer;

FIG. 137D is a cross-sectional view diagram showing the second electrical connection portion of the bottom plate and the biasing element, wherein the bottom plate further includes a second resin member, and the surface of the biasing member further includes a protective layer;

FIG. 138 is a schematic diagram of a height difference between the first and second electrical connection portions;

FIG. 139 is a schematic diagram of the bottom plate having a slider;

FIG. 140A is a schematic diagram of the bottom plate having a vibration-damping assembly;

FIG. 140B is a schematic diagram of another vibration-damping assembly according an embodiment of the present disclosure;

FIG. 140C is a schematic diagram of another vibration-damping assembly according an embodiment of the present disclosure;

FIG. 141 is a bottom view of a frame 11-22, a housing 11-H, and at least a damper 11-g disposed between the frame 11-22 and the housing 11-H, in accordance with another embodiment of the present disclosure;

FIG. 142 is a partial sectional view of a buffer element 11-G connected between the holder 11-23 and the frame 11-22 along a vertical direction, in accordance with another embodiment of the present disclosure;

FIG. 143 is a partial sectional view of a buffer element 11-G connected between the holder 11-23 and the frame 11-22 along a horizontal direction, in accordance with another embodiment of the present disclosure;

FIG. 144 is a partial perspective view of a buffer element 11-G connected between the holder 11-23 and the base 11-21 along a horizontal direction, in accordance with another embodiment of the present disclosure;

FIG. 145 is a partial side view of a buffer element 11-G connected between the magnetic assembly 11-M and a protrusion 11-233 of the holder 11-23 along a horizontal direction, in accordance with another embodiment of the present disclosure;

FIG. 146 is a partial perspective view of a buffer element 11-G connected between the magnetic assembly 11-M and a circuit element 11-P on a lateral side of the holder 11-23 along a horizontal direction, in accordance with another embodiment of the present disclosure;

FIG. 147 is a schematic diagram of an electronic device according to an embodiment of the invention;

FIG. 148 is a schematic diagram of an optical member driving mechanism according to an embodiment of the invention;

FIG. 149 is an exploded-view diagram of the optical member driving mechanism according to an embodiment of the invention;

FIG. 150 is a cross-sectional view along line 12-A-12-A in FIG. 148;

FIG. 151 is a schematic diagram of a winding portion, a driving coil, a first elastic member, and a seventh adhesive member according to an embodiment of the invention;

FIG. 152 is a cross-sectional view of the winding portion, the driving coil, the first elastic member, and the seventh adhesive member according to an embodiment of the invention;

FIG. 153 is a schematic diagram of an optical member driving mechanism according to another embodiment of the invention;

FIG. 154 is a cross-sectional view along line 12-B-12-B in FIG. 153;

FIG. 155 is a schematic diagram of an electronic device according to an embodiment of the invention;

FIG. 156 is a schematic diagram of an optical member driving mechanism according to an embodiment of the invention;

FIG. 157 is an exploded-view diagram of the optical member driving mechanism according to an embodiment of the invention;

FIG. 158 is a cross-sectional view along line 13-A-13-A in FIG. 156;

FIG. 159 is a schematic diagram of an attaching enhanced structure according to an embodiment of the invention;

FIG. 160 is a schematic diagram of a winding portion, a driving coil, a first elastic member, and a fifth adhesive member according to an embodiment of the invention;

FIG. 161 is a cross-sectional view of the winding portion, the driving coil, the first elastic member, and the fifth adhesive member according to an embodiment of the invention;

FIG. 162 is a cross-sectional view along line 13-B-13-B in FIG. 156;

FIG. 163 is a bottom view of the optical member driving mechanism according to an embodiment of the invention; and FIG. 164 is a partial schematic diagram of a optical member driving mechanism according to another embodiment of the invention.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
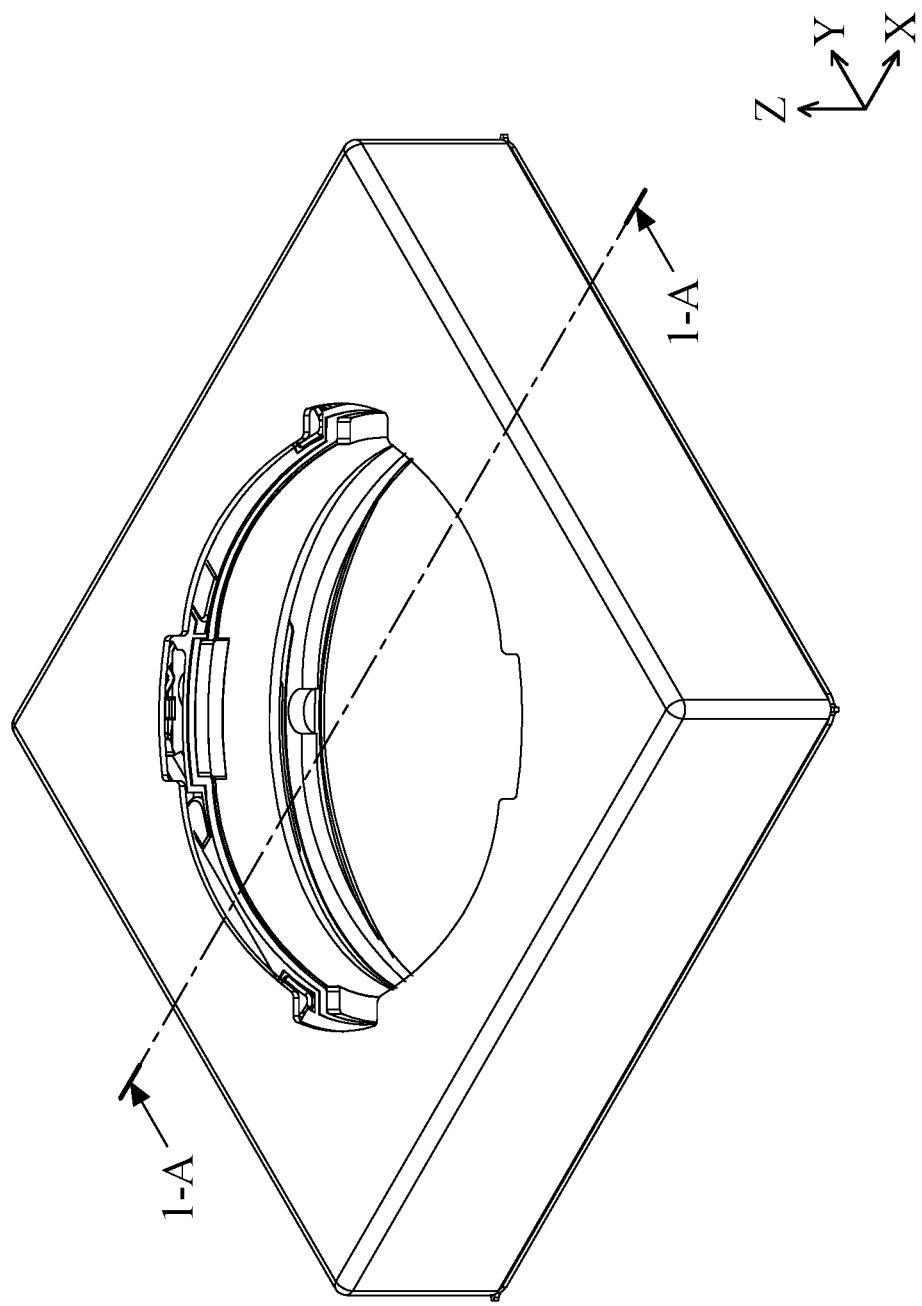
FIG. 1 is a schematic diagram of an optical element driving mechanism 1-100 according to an embodiment of the present disclosure.
Figure 3:
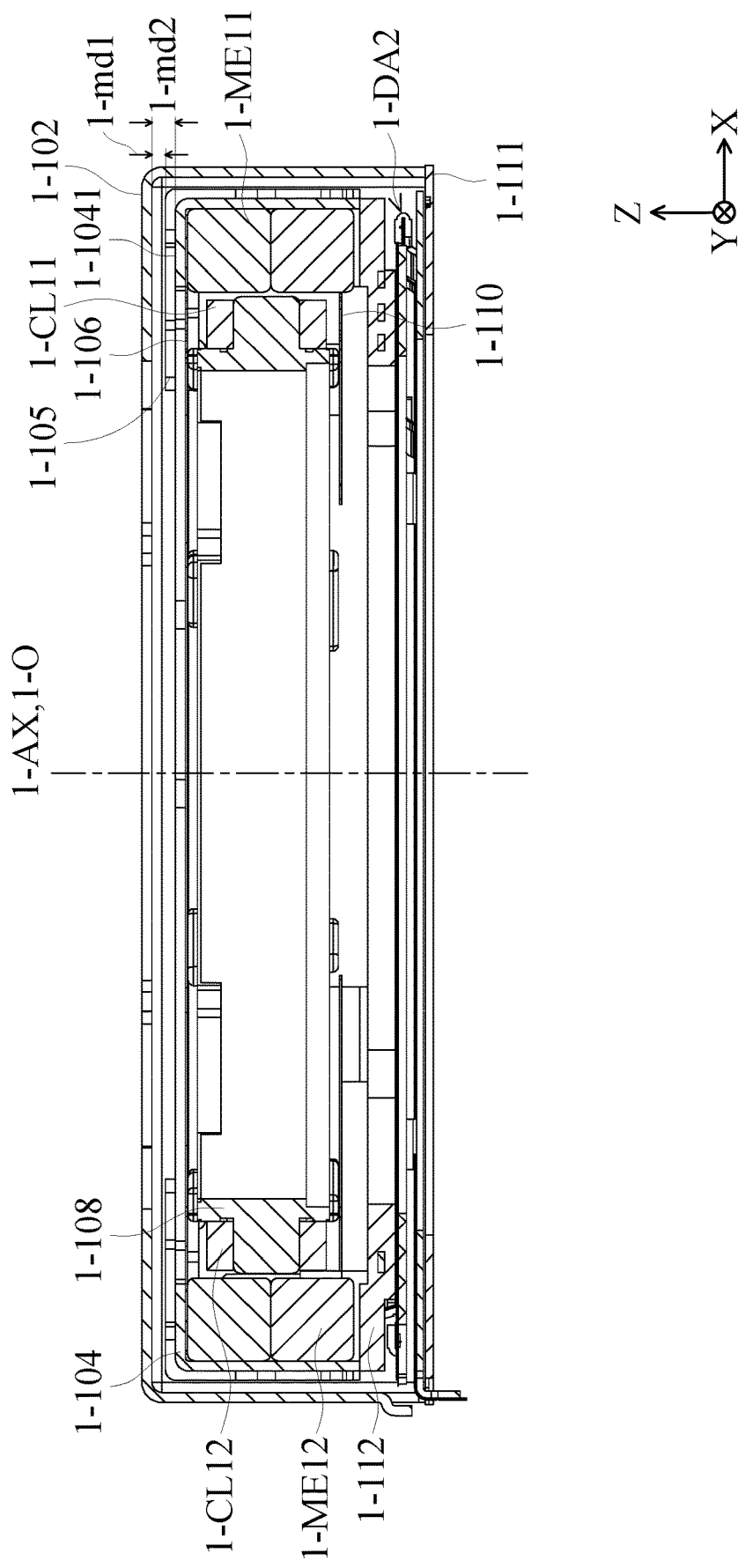
FIG. 3 is a cross-sectional view of the optical element driving mechanism 1-100 along line 1-A-1-A in FIG. 1 according to an embodiment of the present disclosure.

Please refer to FIG. 1 to FIG. 3. FIG. 1 is a schematic diagram of an optical element driving mechanism 1-100 according to an embodiment of the present disclosure, FIG. 2 is an exploded diagram of the optical element driving mechanism 1-100 according to an embodiment of the present disclosure, and FIG. 3 is a cross-sectional view of the optical element driving mechanism 1-100 along line 1-A-1-A in FIG. 1 according to an embodiment of the present disclosure. The optical element driving mechanism 1-100 can be an optical camera system and can be configured to hold and drive an optical element. The optical element driving mechanism 1-100 can be installed in various electronic devices or portable electronic devices, such as a smartphone, for allowing a user to perform the image capturing function. In this embodiment, the optical element driving mechanism 1-100 can be a voice coil motor (VCM) with an auto-focusing (AF) function, but it is not limited thereto. In other embodiments, the optical element driving mechanism 1-100 can also perform the functions of auto-focusing and optical image stabilization (OIS).

As shown in FIG. 2, in the present embodiment, the optical element driving mechanism 1-100 can include a fixed module 1-FM, a movable module 1-MD, and a driving module 1-DM. The movable module 1-MD is movably connected to the fixed module 1-FM, and the movable module 1-MD is configured to hold an optical element (not shown in the figures). The driving module 1-DM is configured to drive the movable module 1-MD to move relative to the fixed module 1-FM.

In this embodiment, as shown in FIG. 2, the fixed module 1-FM includes a casing 1-102 and a substrate 1-112. The movable module 1-MD includes a lens holder 1-108 and the aforementioned optical element, and the lens holder 1-108 is used for holding the optical element. The lens holder 1-108 and the optical element can be referred to a first movable assembly 1-MA1

As shown in FIG. 2, the casing 1-102 has a hollow structure, and a casing opening 1-1021 is formed thereon, and a substrate opening 1-1121 is formed on the substrate 1-111. The center of the casing opening 1-1021 corresponds to the optical axis 1-O of the optical element, and the substrate opening 1-1121 corresponds to a photosensitive element (not shown) disposed under the substrate 1-111. The external light can enter the casing 1-102 from the casing opening 1-1021 to be received by the photosensitive element after passing through the optical element and the substrate opening 1-1121 so as to generate a digital image signal.

Furthermore, the casing 1-102 is disposed on the substrate 1-111 and may have an accommodating space 1-1023 for accommodating the movable module 1-MD (including the aforementioned optical element and the lens holder 1-108) and the driving module 1-DM.

The movable module 1-MD can more include a frame 1-104 and a base 1-112, arranged along a main axis 1-AX. The main axis 1-AX can be parallel to or overlap the optical axis 1-O. The frame 1-104 is fixed to the base 1-112, and the base 1-112 is movably connected to the substrate 1-111 by a second driving assembly 1-DA2.

The movable module 1-MD may further include a first elastic member 1-106 and a second elastic member 1-110. The outer portion (the outer ring portion) of the first elastic member 1-106 is fixed to the inner wall surface of the casing 1-102, the outer portion (the outer ring portion) of the second elastic member 1-110 is fixed to the base 1-112, and the inner portions (the inner ring portions) of the first elastic member 1-106 and the second elastic member 1-110 are respectively connected to the upper and lower sides of the lens holder 1-108, so that the lens holder 1-108 can be suspended in the accommodating space 1-1023.

In this embodiment, the driving module 1-DM may include a first driving assembly 1-DA1 and a second driving assembly 1-DA2. The first driving assembly 1-DA1 may include a first magnetic element 1-ME11 (the first driving magnet), a second magnetic element 1-ME12 (the second driving magnet), a first driving coil 1-CL11, and a second driving coil 1-CL12. The first magnetic element 1-ME11 and the second magnetic element 1-ME12 are disposed on the frame 1-104 and respectively corresponds to the first driving coil 1-CL11 and the second driving coil 1-CL12.

In this embodiment, the first driving coil 1-CL11 and the second driving coil 1-CL12 may be wound coils and be disposed on opposite sides of the lens holder 1-108. When the first driving coil 1-CL11 and the second driving coil 1-CL12 are provided with electricity, the first driving coil 1-CL1/ and the second driving coil 1-CL12 respectively act with the first magnetic element 1-ME11 and the second magnetic element 1-ME12 to generate an electromagnetic force, so as to drive the lens holder 1-108 and the held optical element to move relative to the base 1-112 along the optical axis 1-O (the Z-axis).

In addition, the second driving assembly 1-DA2 is connected between the base 1-112 and the substrate 1-111, and the second driving assembly 1-DA2 may drive the movable module 1-MD to moves along the XY plane so as to achieve the efficacy of optical image stabilization.

Figure 4:
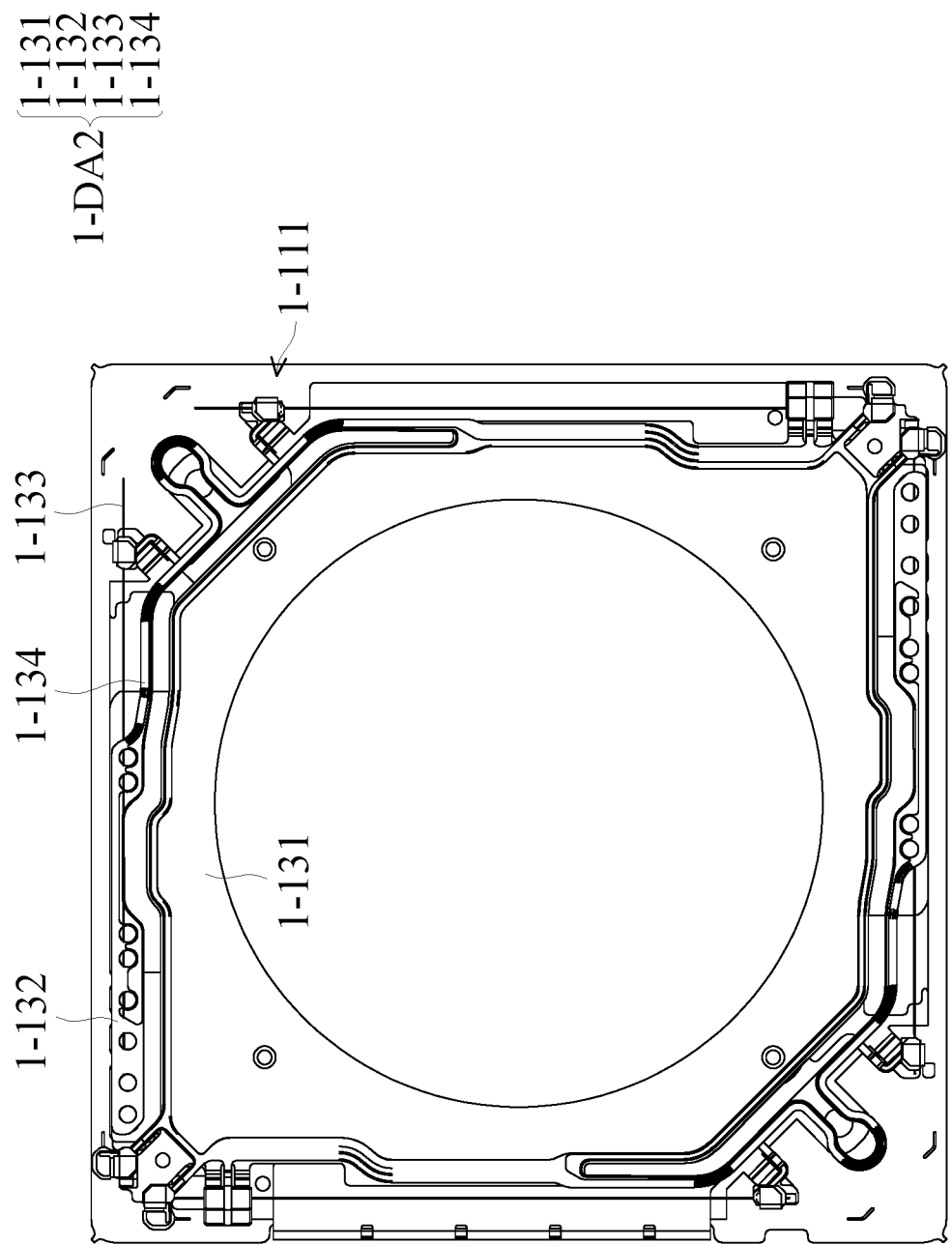
FIG. 4 is a top view of the second driving assembly 1-DA2 and the substrate 1-111 according to an embodiment of the present disclosure.

Please refer to FIG. 4. FIG. 4 is a top view of the second driving assembly 1-DA2 and the substrate 1-111 according to an embodiment of the present disclosure. In this embodiment, as shown in FIG. 4, the second driving assembly 1-DA2 can include a first connecting member 1-131, a second connecting member 1-132, a driving element 1-133, and an elastic portion 1-134. The first connecting member 1-131 is fixedly connected to the base 1-112, the second connecting member 1-132 is fixedly connected to the substrate 1-111, and the second connecting member 1-132 is movably connected to the first connecting member 1-131 through the elastic portion. 1-134.

The driving element 1-133 is connected between the first connecting member 1-131 and the substrate 1-111, and the driving element 1-133 may be made of shape memory alloys (SMA). Shape memory alloy (SMA) is an alloy that can eliminate the deformation in lower temperature by heating. When the shape memory alloy performs plastic deformation under its phase transition temperature, it may return to its original shape by heating. By controlling the temperature of the driving element 1-133, the movable module 1-MD can be moved relative to the substrate 1-111.

Figure 5:
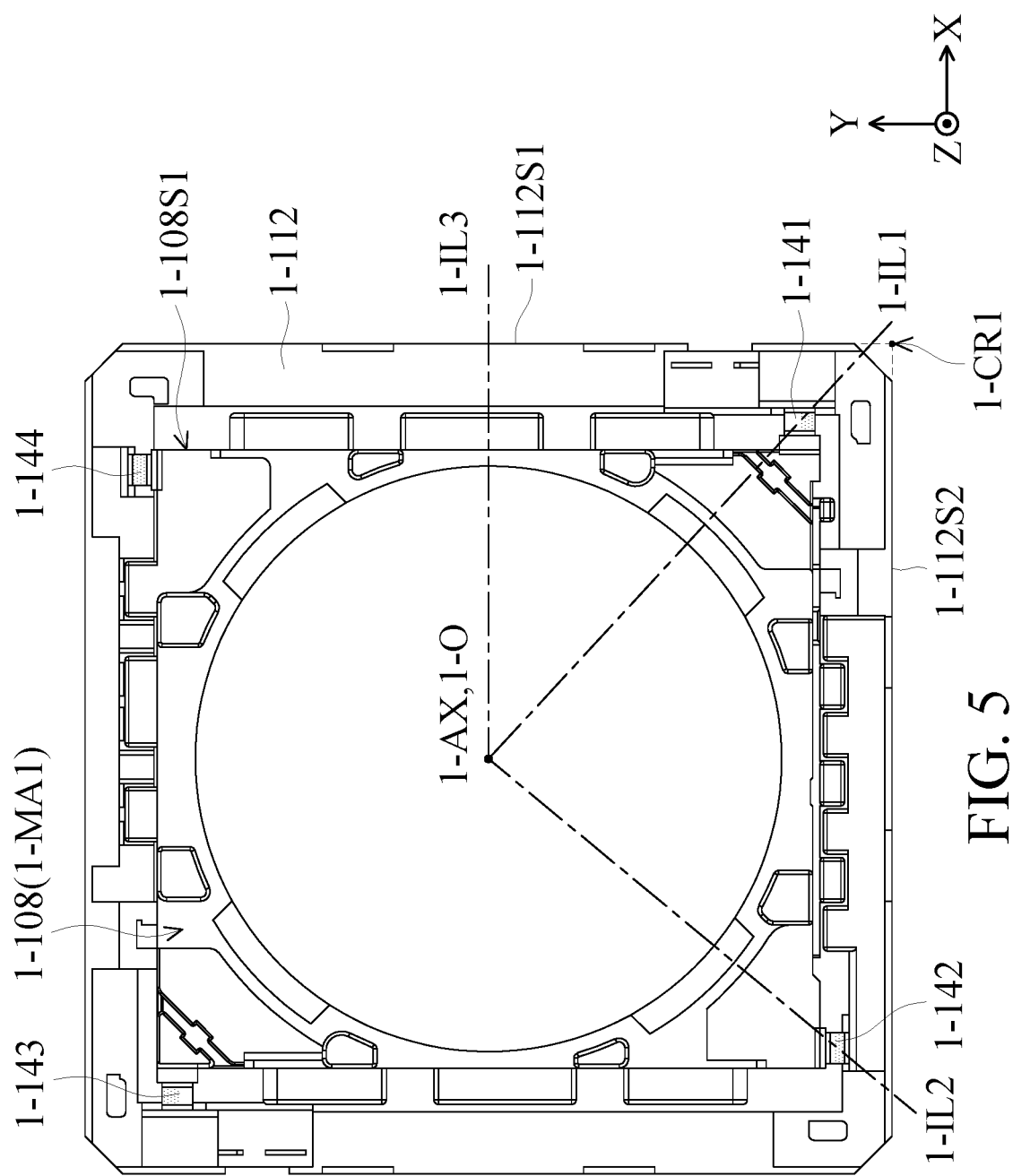
FIG. 5 is a top view of the lens holder 1-108 and the base 1-112 according to an embodiment of the present disclosure.

Please refer to FIG. 5, which is a top view of the lens holder 1-108 and the base 1-112 according to an embodiment of the present disclosure. In this embodiment, the optical element driving mechanism 1-100 may further include a first shock absorption element 1-141 for adjusting the damping parameter of the lens holder 1-108 (the first movable assembly 1-MA1) relative to the base 1-112. The first shock absorption element 1-141 is disposed between the first movable assembly 1-MA1 and the base 1-112, and the first shock absorption element 1-141 directly contacts the base 1-112 and the first movable assembly 1-MA1.

When viewed along the main axis 1-AX, the base 1-112 has a polygonal structure, and the base 1-112 has even-numbered sides. Specifically, as shown in FIG. 5, when viewed along the main axis 1-AX, the base 1-112 has a rectangular structure and has four sides.

When viewed along the main axis 1-AX, a center of the first shock absorption element 1-141 and a center (for example, main axis 1-AX) of the optical element driving mechanism 1-100 may define a first imaginary connection line 1-IL1, and the first imaginary connection line 1-I1 does not pass through any corner of the base 1-112 or the lens holder 1-108.

For example, the base 1-112 has a side 1-112S1 and a side 1-112S2. The side 1-112S1 extends along the Y-axis, the side 1-112S2 extends along the X-axis, and the side 1-112S1 and the side 1-112S2 can extend to meet at a corner 1-CR1. As shown in FIG. 5, the first imaginary connection line 1-IL1 does not pass through the corner 1-CR1.

Similarly, the optical element driving mechanism 1-100 further includes a second shock absorption element 1-142 for adjusting the damping parameter of the first movable assembly 1-MA1 relative to the base 1-112. When viewed along the main axis 1-AX, a center of the second shock absorption element 1-142 and the center of the optical element driving mechanism 1-100 may define a second imaginary connection line 1-IL2, and the second imaginary connection line 1-IL2 does not pass through any corner of the base 1-112 or the lens holder 1-108. In addition, the first imaginary connection line 1-IL1 and the second imaginary connection line 1-IL2 are not parallel.

The first shock absorption element 1-141 and the second shock absorption element 1-142 may be gels, but they are not limited thereto. In the present disclosure, the first shock absorption element 1-141 only directly contacts the first movable assembly 1-MA1 and the base 1-112, and the second shock absorption element 1-142 only directly contacts the first movable assembly 1-MA1 and the base 1-112. For example, the first shock absorption element 1-141 and the second shock absorption element 1-142 are not disposed on other elements of the optical element driving mechanism 1-100, such as the first elastic member 1-106.

Figure 6:
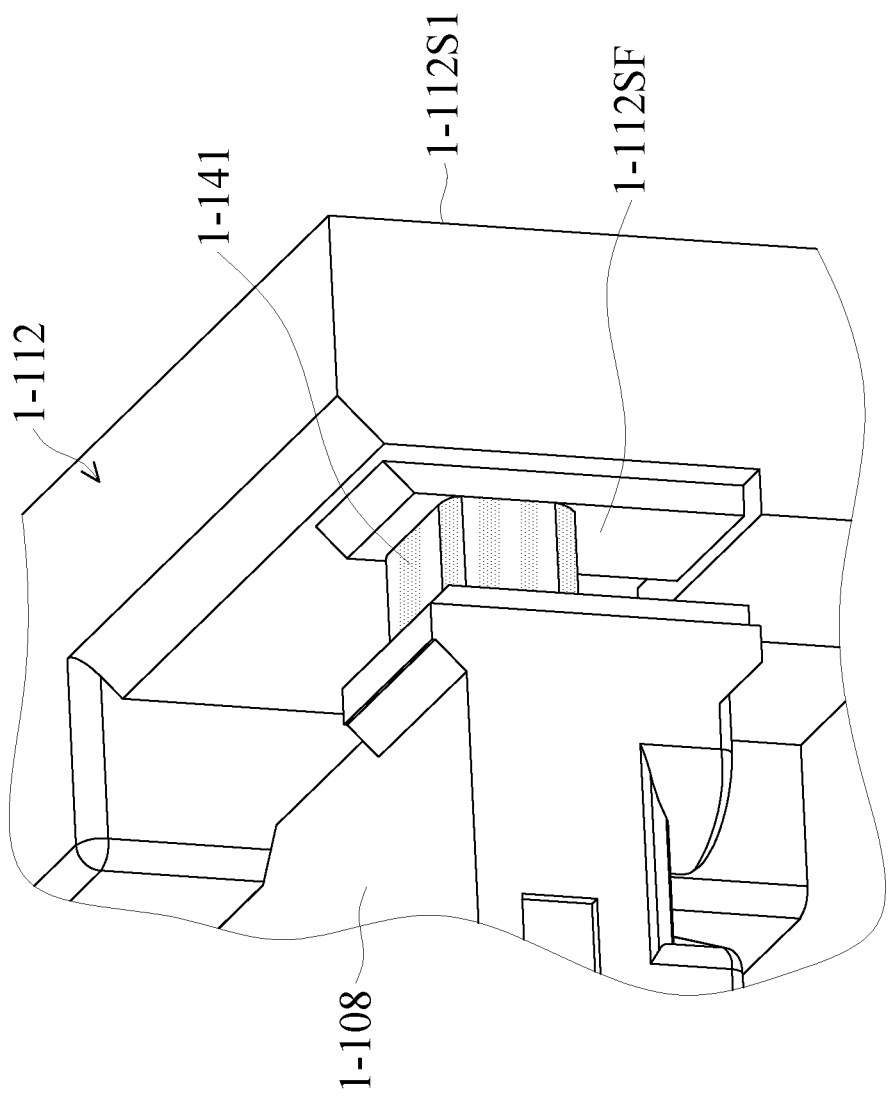
FIG. 6 is a three-dimensional enlarged view of the lower right corner area of FIG. 5 according to an embodiment of the present disclosure.

Please refer to FIG. 6, which is a three-dimensional enlarged view of the lower right corner area of FIG. 5 according to an embodiment of the present disclosure. The base 1-112 further has a first base surface 1-112SF, which faces the first shock absorption element 1-141. The first base surface 1-112SF is parallel to the main axis 1-AX. When viewed along the main axis 1-AX, the first base surface 1-112SF is parallel to the side 1-112S1 of the base 1-112.

As shown in FIG. 5, the optical element driving mechanism 1-100 further includes another first shock absorption element 1-143 and another second shock absorption element 1-144. When viewed along the main axis 1-AX, these first shock absorption elements and these second shock absorption elements are rotationally symmetric with respect to the main axis 1-AX.

The lens holder 1-108 of the first movable assembly 1-MA1 has a first side 1-108S1. A center of the first side 1-108S1 and the main axis 1-AX define a third imaginary connection line 1-IL3, and when viewed along the main axis 1-AX, an angle between the first imaginary connection line 1-I1 and the third imaginary connection line 1-IL3 is less than 45 degrees.

Figure 7:
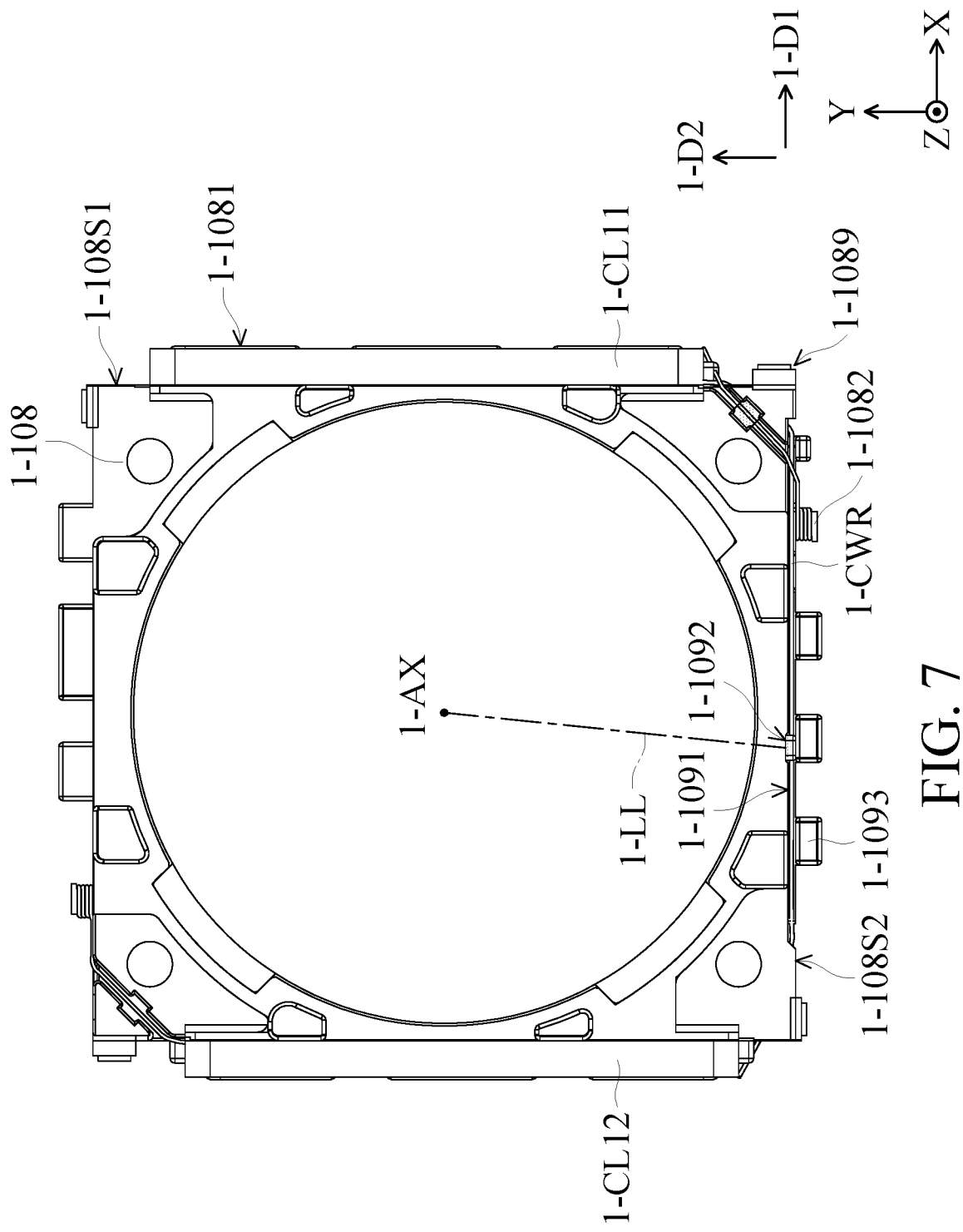
FIG. 7 is a top view of the lens holder 1-108, the first driving coil 1-CL11, and the second driving coil 1-CL12 according to an embodiment of the present disclosure.
Figure 8:
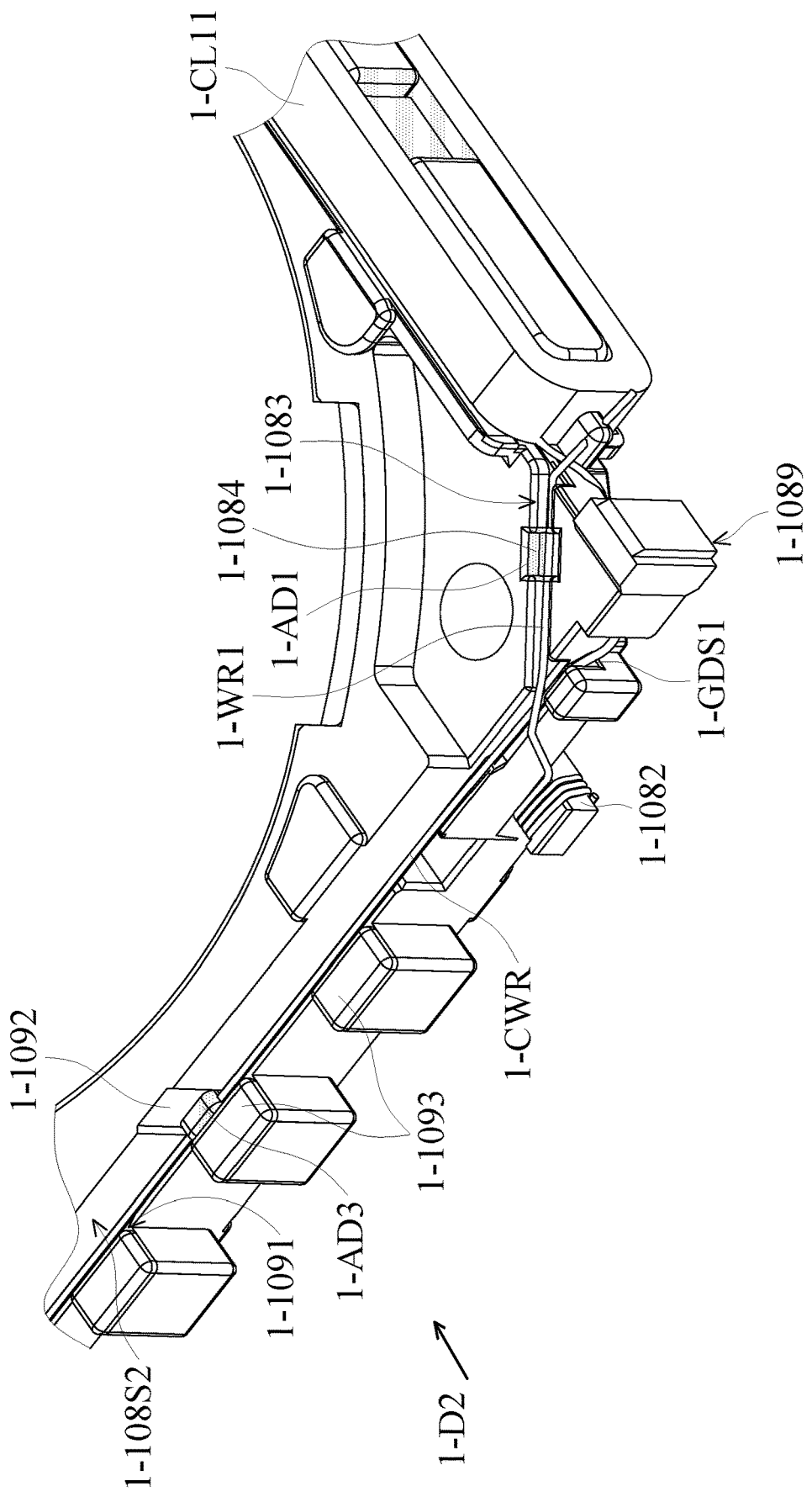
FIG. 8 is an enlarged view of the lens holder 1-108 and the first driving coil 1-CL11 according to an embodiment of the present disclosure.
Figure 9:
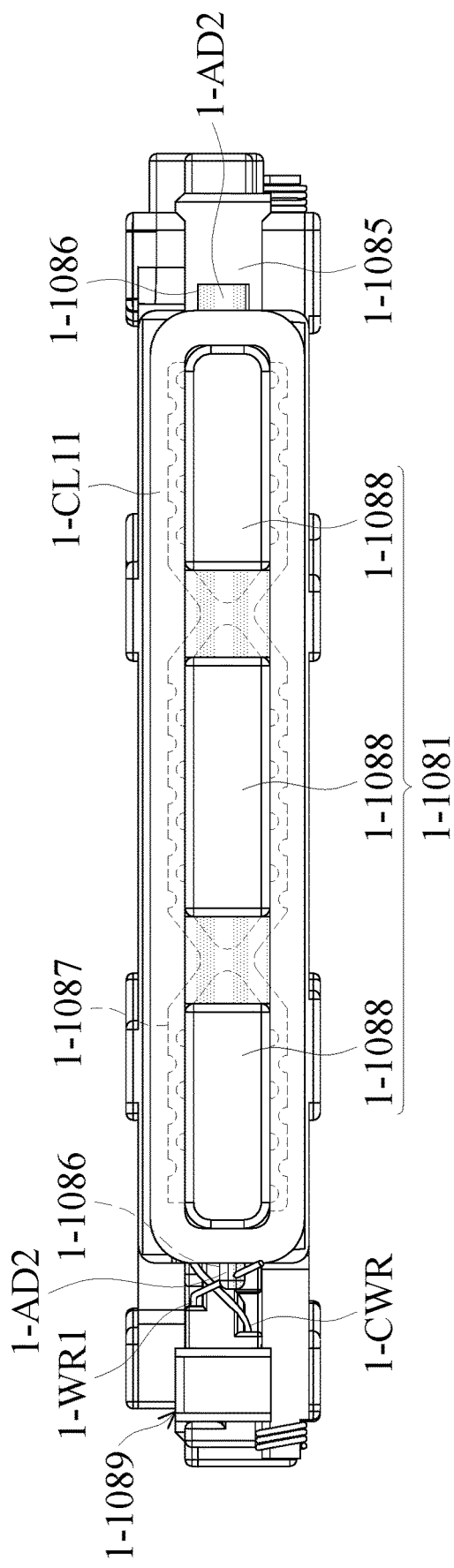
FIG. 9 is a side view of the lens holder 1-108 and the first driving coil 1-CL11 according to an embodiment of the present disclosure.

Please refer to FIG. 7 to FIG. 9. FIG. 7 is a top view of the lens holder 1-108, the first driving coil 1-CL11, and the second driving coil 1-CL12 according to an embodiment of the present disclosure. FIG. 8 is an enlarged view of the lens holder 1-108 and the first driving coil 1-CL11 according to an embodiment of the present disclosure, and FIG. 9 is a side view of the lens holder 1-108 and the first driving coil 1-CL11 according to an embodiment of the present disclosure.

As shown in FIG. 7, the second driving coil 1-CL12 is electrically connected to the first driving coil 1-CL11. Specifically, the first driving assembly 1-DA1 may further include a connecting wire 1-CWR, and the first driving coil 1-CL11 is electrically connected to the second driving coil 1-CL12 via the connecting wire 1-CWR.

The lens holder 1-108 of the first movable assembly 1-MA1 has an installation structure 1-1081, and the first driving coil 1-CL11 is sleeved on the installation structure 1-1081. As shown in FIG. 8, the lens holder 1-108 of the first movable assembly 1-MA1 can have a winding structure 1-1082 and an accommodating trench 1-1083, and a first leading wire 1-WR1 of the first driving coil 1-CL1*l* is disposed in accommodating trench 1-1083 and wound on the winding structure 1-1082.

The accommodating trench 1-1083 is an elongated trench, and the lens holder 1-108 of the first movable assembly 1-MA1 may further have an accommodating groove 1-1084, which is disposed in the accommodating trench 1-1083. The accommodating groove 1-1084 is configured to accommodate an adhesive element 1-AD1 to prevent the first leading wire 1-WR1 from separating from the accommodating trench 1-1083.

In this embodiment, the lens holder 1-108 of the first movable assembly 1-MA1 may have a first side surface 1-1085 facing the first driving coil 1-CL11, and the first side surface 1-1085 has two glue grooves 1-1086 which are disposed on opposite sides of the first driving coil 1-CL11. The adhesive element 1-AD2 can be disposed in the glue groove 1-1086 so that the first driving coil 1-CL11 is affixed to the installation structure 1-1081.

Figure 10:
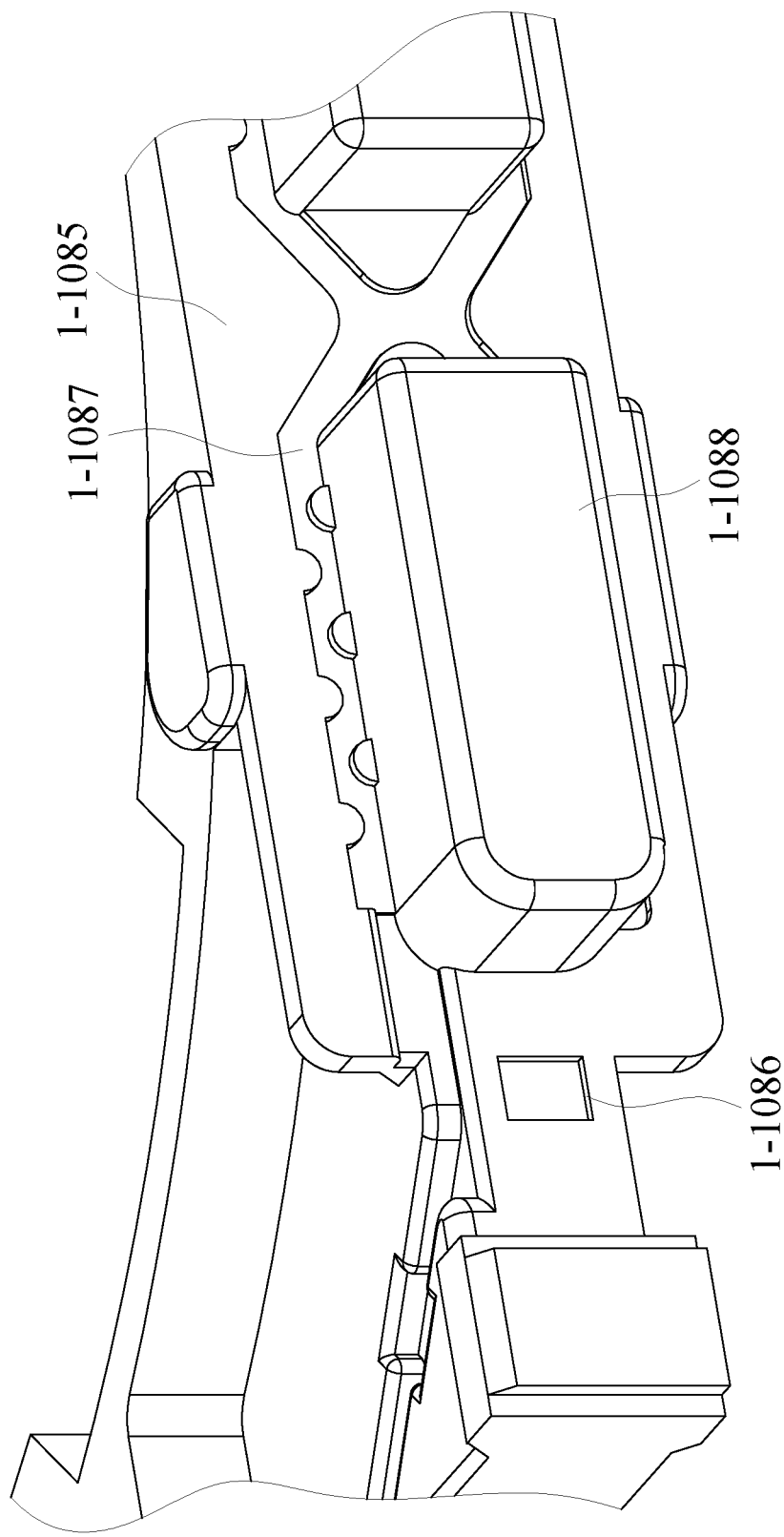
FIG. 10 is a three-dimensional enlarged view of the lens holder 1-108 according to an embodiment of the present disclosure.

Please also refer to FIG. 10, which is a three-dimensional enlarged view of the lens holder 1-108 according to an embodiment of the present disclosure. A first glue trench 1-1087 can be formed on the first side surface 1-1085, and when viewed along a first direction 1-D1 (the X-axis), the first glue trench 1-1087 overlaps at least part of the first driving coil 1-CL11. The first direction 1-D1 is perpendicular to the first side surface 1-1085.

In this embodiment, the installation structure 1-1081 includes three installation portions 1-1088. The installation portion 1-1088 can be a protruding structure, which is protruded along the first direction 1-D1 from the first side surface 1-1085. As shown in FIG. 10, the first glue trench 1-1087 is connected to the two adjacent installation portions 1-1088. When viewed along the first direction 1-D1, at least a part of the first glue trench 1-1087 is located between two adjacent installation portions 1-1088.

Figure 11:
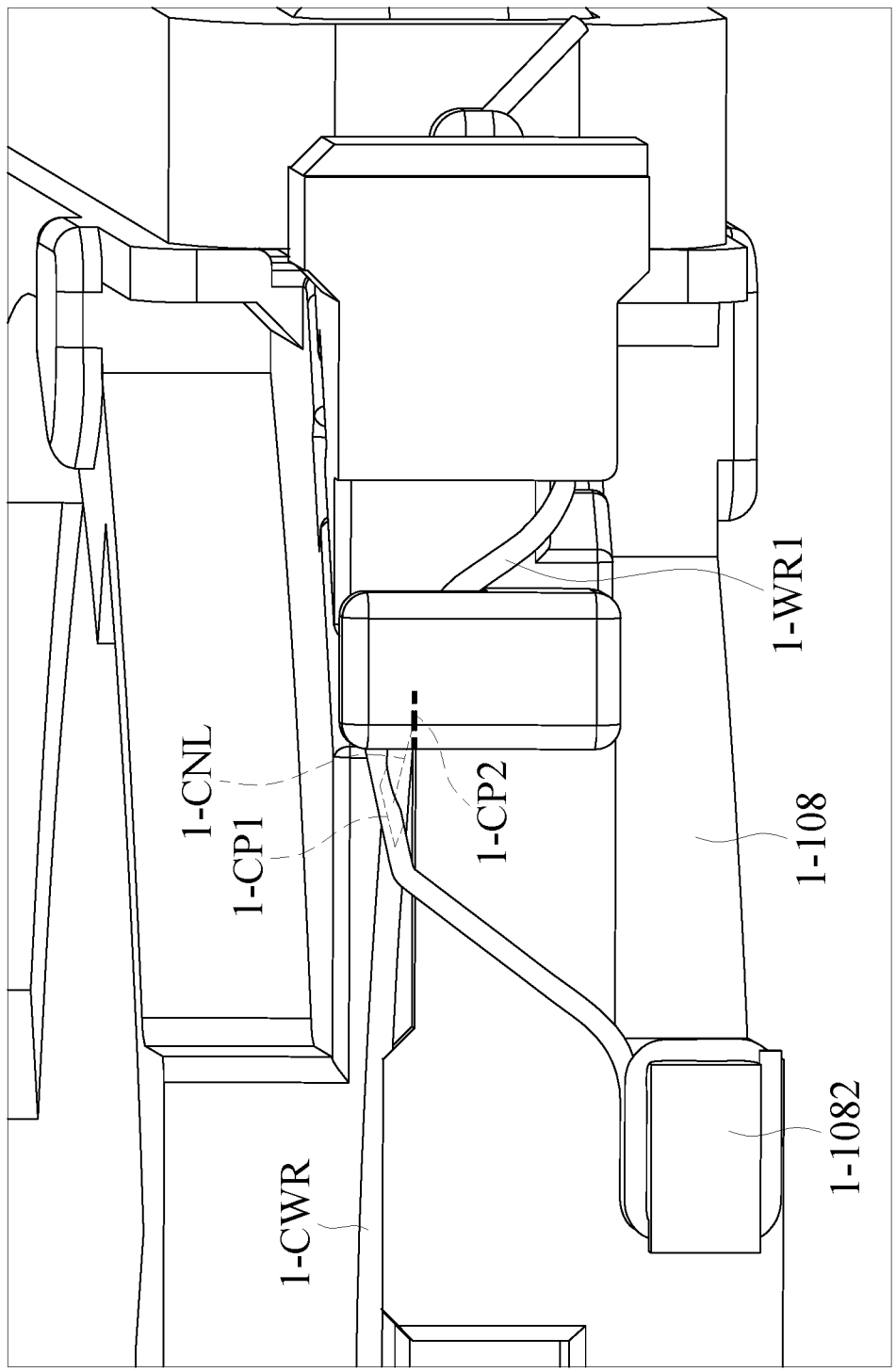
FIG. 11 is a three-dimensional enlarged diagram of the lens holder 1-108 in another view according to an embodiment of the present disclosure.

Please also refer to FIG. 11, which is a three-dimensional enlarged diagram of the lens holder 1-108 in another view according to an embodiment of the present disclosure. At least a part of the connecting wire 1-CWR is located between the first leading wire 1-WR1 and the lens holder 1-108 of the first movable assembly 1-MA1.

A first contact portion 1-CP1 of the first leading wire 1-WR1 directly contacts the connecting wire 1-CWR, and a second contact portion 1-CP2 of the lens holder 1-108 of the first movable assembly 1-MA1 directly contacts the connecting wire 1-CWR. At least a part of the connecting wire 1-CWR is located between the first leading wire 1-WR1 and the lens holder 1-108, and a center connecting line 1-CNL of the first contact portion 1-CP1 and the second contact portion 1-CP2 passes through the connecting wire 1-CWR.

As shown in FIG. 8 and FIG. 9, the lens holder 1-108 of the first movable assembly 1-MA1 further includes a guiding structure 1-GDS1 and a first corner structure 1-1089. When viewed along the main axis 1-AX, the guiding structure 1-GDS1 is located between the winding structure 1-1082 and the first corner structure 1-1089, and the guiding structure 1-GDS1 is configured to guide the connecting wire 1-CWR to extend toward the first corner structure 1-1089.

In addition, as shown in FIG. 9, when viewed in a direction (such as the X-axis) perpendicular to the first side surface 1-1085, the first leading wire 1-WR1 and the connecting wire 1-CWR are located on opposite sides of the first corner structure 1-1089. Based on the above structural design, the stability of the first leading wire 1-WR1 and the connecting wire 1-CWR on the lens holder 1-108 can be increased.

As shown in FIG. 7 and FIG. 8, the lens holder 1-108 of the first movable assembly 1-MA1 has the first side 1-108S1 and a second side 1-108S2. The first side surface 1-1085 is located on the first side 1-108S1, a guiding trench 1-1091 is formed on the second side 1-108S2, and the connecting wire 1-CWR is disposed in the guiding trench 1-1091.

Furthermore, a second glue trench 1-1092 is further formed on the second side 1-108S2, which is recessed in a second direction 1-D2. The second glue trench 1-1092 can accommodate an adhesive element 1-AD3, so that the connecting wire 1-CWR is firmly disposed in the guiding trench 1-1091. The second direction 1-D2 is toward the main axis 1-AX and perpendicular to the second side 1-108S2. When viewed along the main axis 1-AX, a line 1-LL of the second glue trench 1-1092 and the main axis 1-AX is not parallel to the second direction 1-D2.

The lens holder 1-108 of the first movable assembly 1-MA1 may further include a plurality of protruding portions 1-1093, protruding from the second side 1-108S2 along the Y-axis, and the guiding trench 1-1091 is formed between these protruding portions 1-1093 and the second side 1-108S2. When viewed along the second direction 1-D2, these protruding portions 1-1093 overlap at least a part of the connecting wire 1-CWR.

Based on the above-mentioned structural design, the connecting wire 1-CWR can be stably disposed in the guiding trench 1-1091, and it can avoid the problem the that the connecting wire 1-CWR is separated from the guiding trench 1-1091 when the lens holder 1-108 moves.

Figure 12:
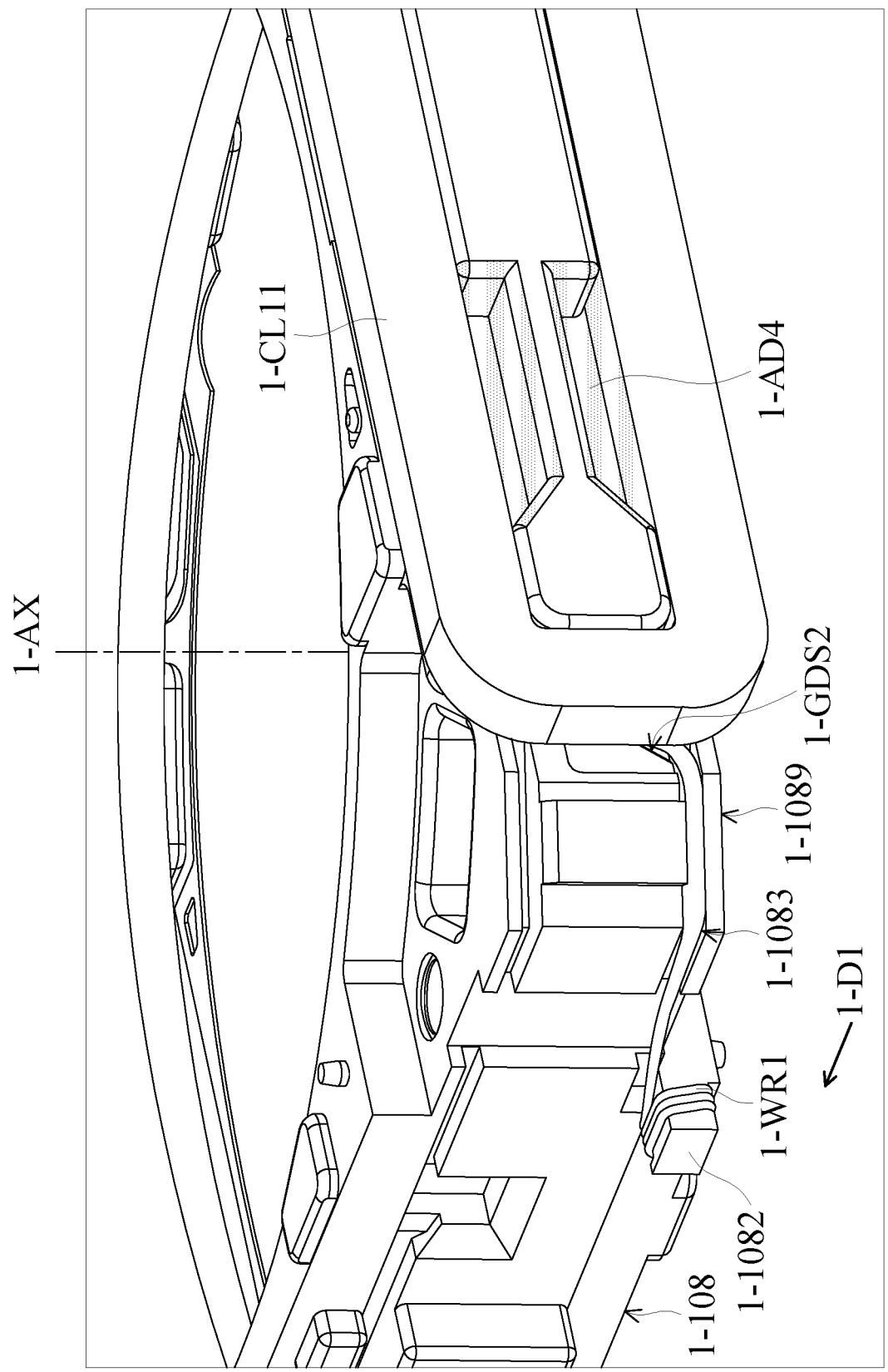
FIG. 12 is a perspective enlarged diagram of the lens holder 1-108 and the first driving coil 1-CL11 according to another embodiment of the present disclosure.
Figure 13:
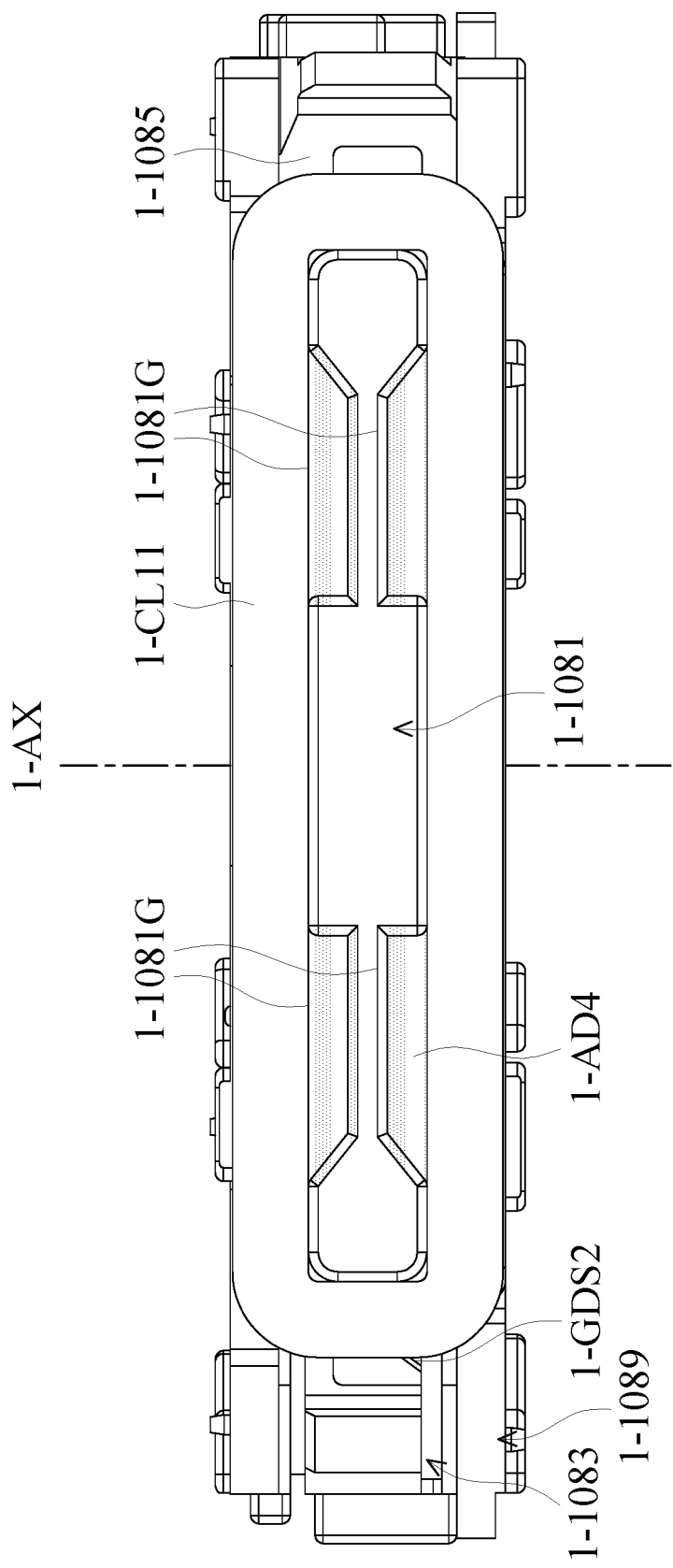
FIG. 13 is a side view of the lens holder 1-108 and the first driving coil 1-CL11 according to another embodiment of the present disclosure.

Please refer to FIG. 12 and FIG. 13. FIG. 12 is a perspective enlarged diagram of the lens holder 1-108 and the first driving coil 1-CL11 according to another embodiment of the present disclosure, and FIG. 13 is a side view of the lens holder 1-108 and the first driving coil 1-CL11 according to another embodiment of the present disclosure.

In this embodiment, the lens holder 1-108 of the first movable assembly 1-MA1 also includes a guiding structure 1-GDS2 and a first corner structure 1-1089. When viewed along the main axis 1-AX, the first corner structure 1-1089 is located between the winding structure 1-1082 and the guiding structure 1-GDS2.

The guiding structure 1-GDS2 extends from the first side surface 1-1085 of the lens holder 1-108 toward the first corner structure 1-1089. The guiding structure 1-GDS2 is communicated with the accommodating trench 1-1083, and at least a part of the accommodating trench 1-1083 is located on the first corner structure 1-1089. The guiding structure 1-GDS2 is configured to guide the first leading wire 1-WR1 to extend towards the first corner structure 1-1089.

As shown in FIG. 13, the installation structure 1-1081 and the first driving coil 1-CL11 form a plurality of installation slots 1-1081G configured to accommodate the adhesive element 1-AD4. When viewed along the first direction 1-D1 perpendicular to the first side surface 1-1085, at least one of the installation slots 1-1081G can have a trapezoidal structure so that the adhesive element 1-AD4 can be evenly distributed in the installation slot 1-1081G. Therefore, the first driving coil 1-CL11 is firmly adhered to the installation structure 1-1081.

The present disclosure provides an optical element driving mechanism 1-100 that includes the first driving assembly 1-DA1 and the second driving assembly 1-DA2. The second driving assembly 1-DA2 can drive the movable module 1-MD to move relative to the substrate 1-111, and the first driving assembly 1-DA1 can drive the lens holder 1-108 to move relative to the base 1-112, so as to achieve the functions of auto-focusing and optical image stabilization.

In addition, the optical element driving mechanism 1-100 can include multiple shock absorption elements, which are disposed between the lens holder 1-108 and the frame 1-104, and these shock absorption elements are disposed on multiple sides of the lens holder 1-108. Based on the configuration of the shock absorption elements, the vibration of the lens holder 1-108 can be more effectively suppressed, thereby increasing the stability of the optical element driving mechanism 1-100.

Figure 14:
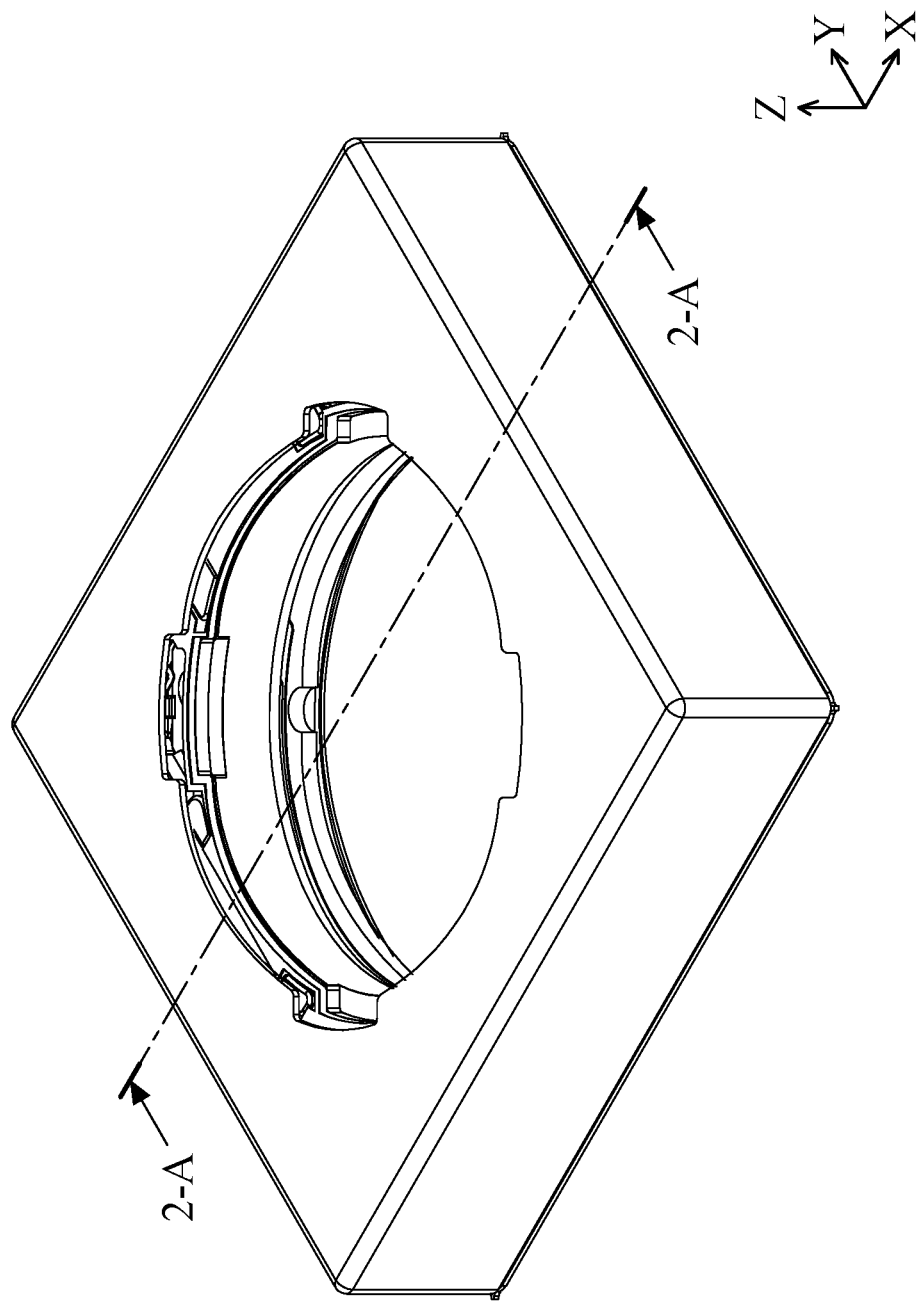
FIG. 14 is a schematic diagram of an optical element driving mechanism 2-100 according to an embodiment of the present disclosure.
Figure 15:
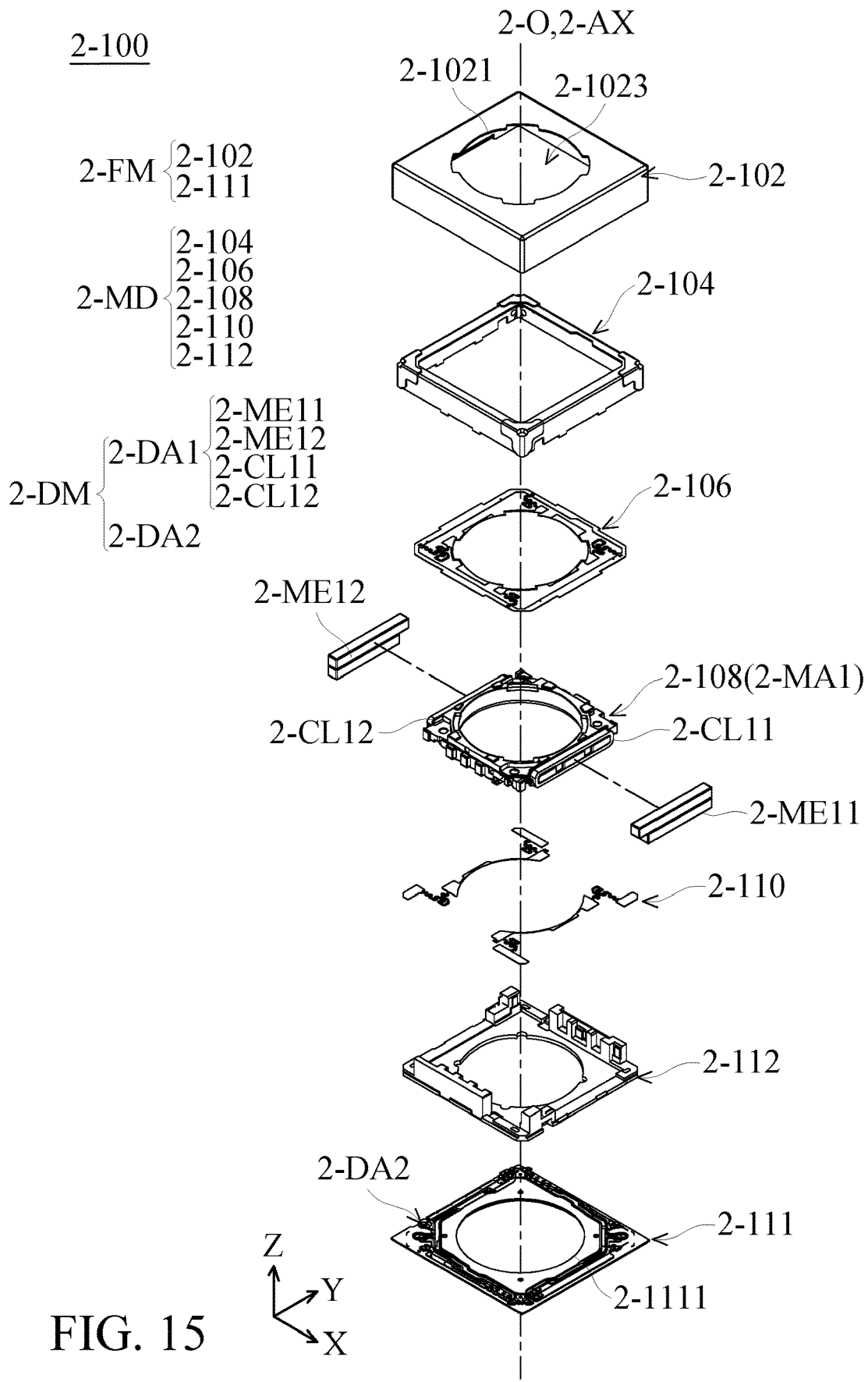
FIG. 15 is an exploded diagram of the optical element driving mechanism 2-100 according to an embodiment of the present disclosure.
Figure 16:
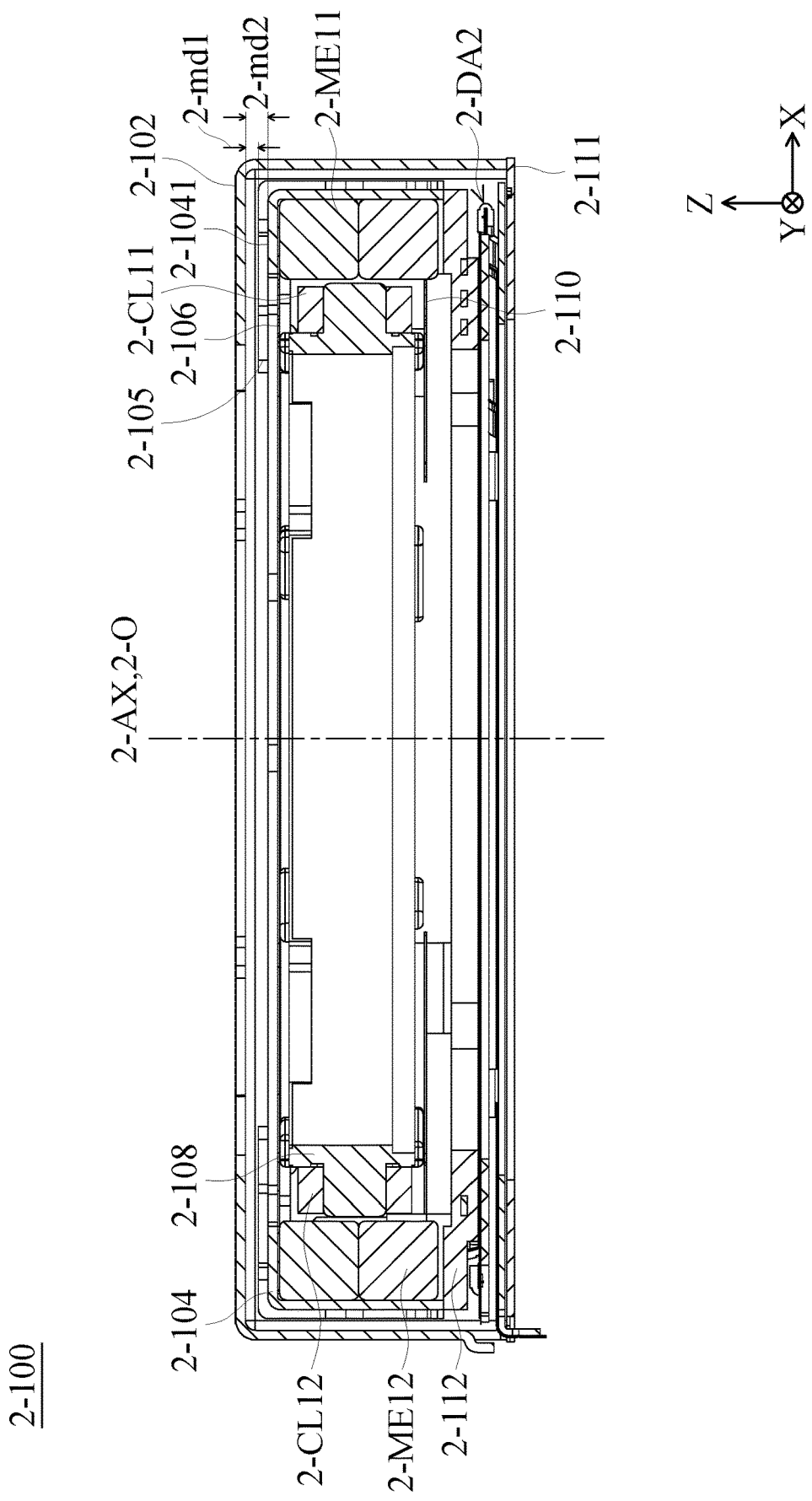
FIG. 16 is a cross-sectional view of the optical element driving mechanism 2-100 along line 2-A-2-A in FIG. 14 according to an embodiment of the present disclosure.

Please refer to FIG. 14 to FIG. 16. FIG. 14 is a schematic diagram of an optical element driving mechanism 2-100 according to an embodiment of the present disclosure, FIG. 15 is an exploded diagram of the optical element driving mechanism 2-100 according to an embodiment of the present disclosure, and FIG. 16 is a cross-sectional view of the optical element driving mechanism 2-100 along line 2-A-2-A in FIG. 14 according to an embodiment of the present disclosure. The optical element driving mechanism 2-100 can be an optical camera system and can be configured to hold and drive an optical element. The optical element driving mechanism 2-100 can be installed in various electronic devices or portable electronic devices, such as a smartphone, for allowing a user to perform the image capturing function. In this embodiment, the optical element driving mechanism 2-100 can be a voice coil motor (VCM) with an auto-focusing (AF) function, but it is not limited thereto. In other embodiments, the optical element driving mechanism 2-100 can also perform the functions of auto-focusing and optical image stabilization (OIS).

As shown in FIG. 15, in the present embodiment, the optical element driving mechanism 2-100 can include a fixed module 2-FM, a movable module 2-MD, and a driving module 2-DM. The movable module 2-MD is movably connected to the fixed module 2-FM, and the movable module 2-MD is configured to hold an optical element (not shown in the figures). The driving module 2-DM is configured to drive the movable module 2-MD to move relative to the fixed module 2-FM.

In this embodiment, as shown in FIG. 15, the fixed module 2-FM includes a casing 2-102 and a substrate 2-112. The movable module 2-MD includes a lens holder 2-108 and the aforementioned optical element, and the lens holder 2-108 is used for holding the optical element. The lens holder 2-108 and the optical element can be referred to a first movable assembly 2-MA1

As shown in FIG. 15, the casing 2-102 has a hollow structure, and a casing opening 2-1021 is formed thereon, and a substrate opening 2-1121 is formed on the substrate 2-111. The center of the casing opening 2-1021 corresponds to the optical axis 2-O of the optical element, and the substrate opening 2-1121 corresponds to a photosensitive element (not shown) disposed under the substrate 2-111. The external light can enter the casing 2-102 from the casing opening 2-1021 to be received by the photosensitive element after passing through the optical element and the substrate opening 2-1121 so as to generate a digital image signal.

Furthermore, the casing 2-102 is disposed on the substrate 2-111 and may have an accommodating space 2-1023 for accommodating the movable module 2-MD (including the aforementioned optical element and the lens holder 2-108) and the driving module 2-DM.

The movable module 2-MD can more include a frame 2-104 and a base 2-112, arranged along a main axis 2-AX. The main axis 2-AX can be parallel to or overlap the optical axis 2-O. The frame 2-104 is fixed to the base 2-112, and the base 2-112 is movably connected to the substrate 2-111 by a second driving assembly 2-DA2.

The movable module 2-MD may further include a first elastic member 2-106 and a second elastic member 2-110. The outer portion (the outer ring portion) of the first elastic member 2-106 is fixed to the inner wall surface of the casing 2-102, the outer portion (the outer ring portion) of the second elastic member 2-110 is fixed to the base 2-112, and the inner portions (the inner ring portions) of the first elastic member 2-106 and the second elastic member 2-110 are respectively connected to the upper and lower sides of the lens holder 2-108, so that the lens holder 2-108 can be suspended in the accommodating space 2-1023.

In this embodiment, the driving module 2-DM may include a first driving assembly 2-DA1 and a second driving assembly 2-DA2. The first driving assembly 2-DA1 may include a first magnetic element 2-ME11 (the first driving magnet), a second magnetic element 2-ME12 (the second driving magnet), a first driving coil 2-CL11, and a second driving coil 2-CL12. The first magnetic element 2-ME11 and the second magnetic element 2-ME12 are disposed on the frame 2-104 and respectively corresponds to the first driving coil 2-CL11 and the second driving coil 2-CL12.

In this embodiment, the first driving coil 2-CL11 and the second driving coil 2-CL12 may be wound coils and be disposed on opposite sides of the lens holder 2-108. When the first driving coil 2-CL11 and the second driving coil 2-CL12 are provided with electricity, the first driving coil 2-CL11 and the second driving coil 2-CL12 respectively act with the first magnetic element 2-ME11 and the second magnetic element 2-ME12 to generate an electromagnetic force, so as to drive the lens holder 2-108 and the held optical element to move relative to the base 2-112 along the optical axis 2-O (the Z-axis).

In addition, the second driving assembly 2-DA2 is connected between the base 2-112 and the substrate 2-111, and the second driving assembly 2-DA2 may drive the movable module 2-MD to moves along the XY plane so as to achieve the efficacy of optical image stabilization.

Figure 17:
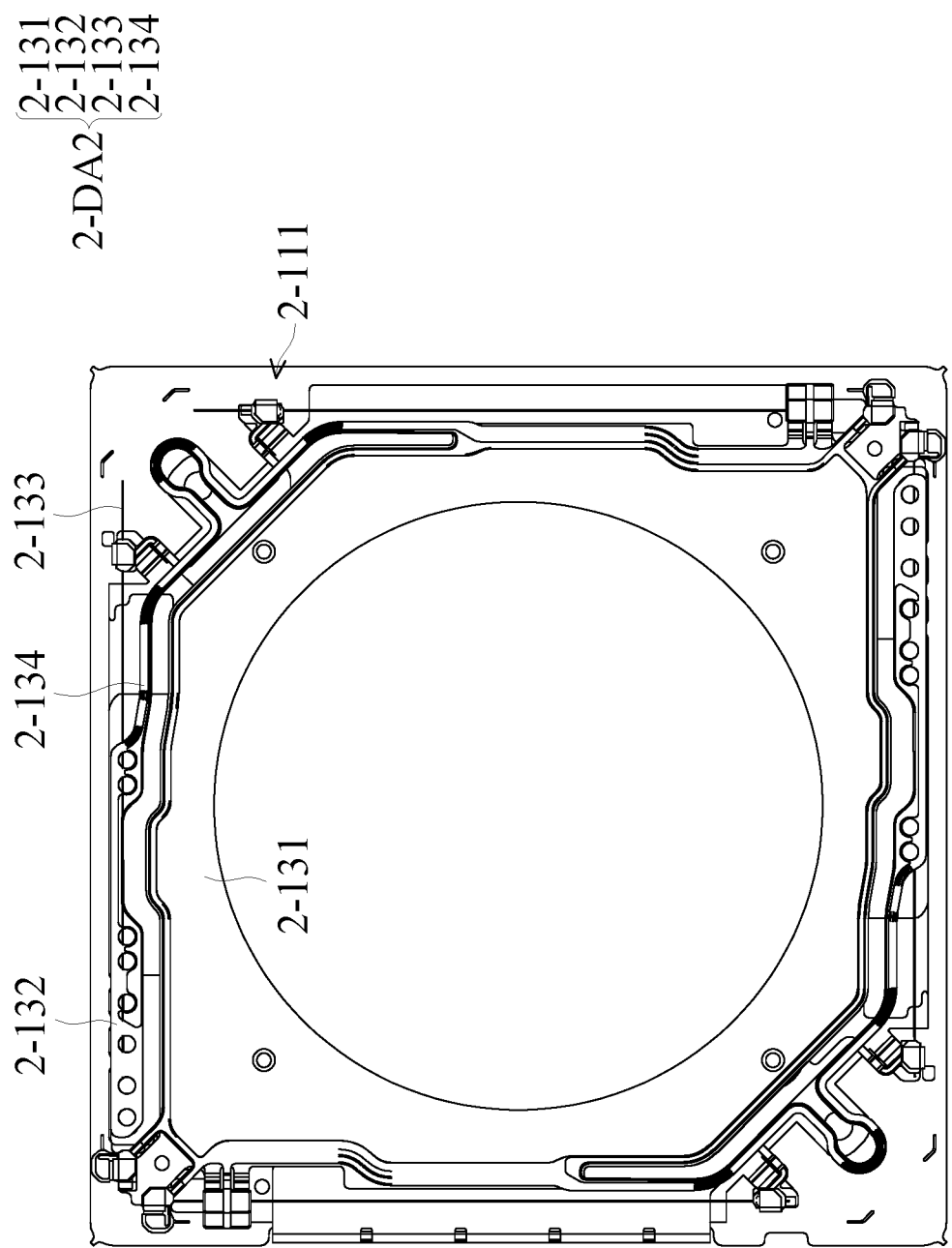
FIG. 17 is a top view of the second driving assembly 2-DA2 and the substrate 2-111 according to an embodiment of the present disclosure.

Please refer to FIG. 17. FIG. 17 is a top view of the second driving assembly 2-DA2 and the substrate 2-111 according to an embodiment of the present disclosure. In this embodiment, as shown in FIG. 17, the second driving assembly 2-DA2 can include a first connecting member 2-131, a second connecting member 2-132, a driving element 2-133, and an elastic portion 2-134. The first connecting member 2-131 is fixedly connected to the base 2-112, the second connecting member 2-132 is fixedly connected to the substrate 2-111, and the second connecting member 2-132 is movably connected to the first connecting member 2-131 through the elastic portion. 2-134.

The driving element 2-133 is connected between the first connecting member 2-131 and the substrate 2-111, and the driving element 2-133 may be made of shape memory alloys (SMA). Shape memory alloy (SMA) is an alloy that can eliminate the deformation in lower temperature by heating.

When the shape memory alloy performs plastic deformation under its phase transition temperature, it may return to its original shape by heating. By controlling the temperature of the driving element 2-133, the movable module 2-MD can be moved relative to the substrate 2-111.

Figure 18:
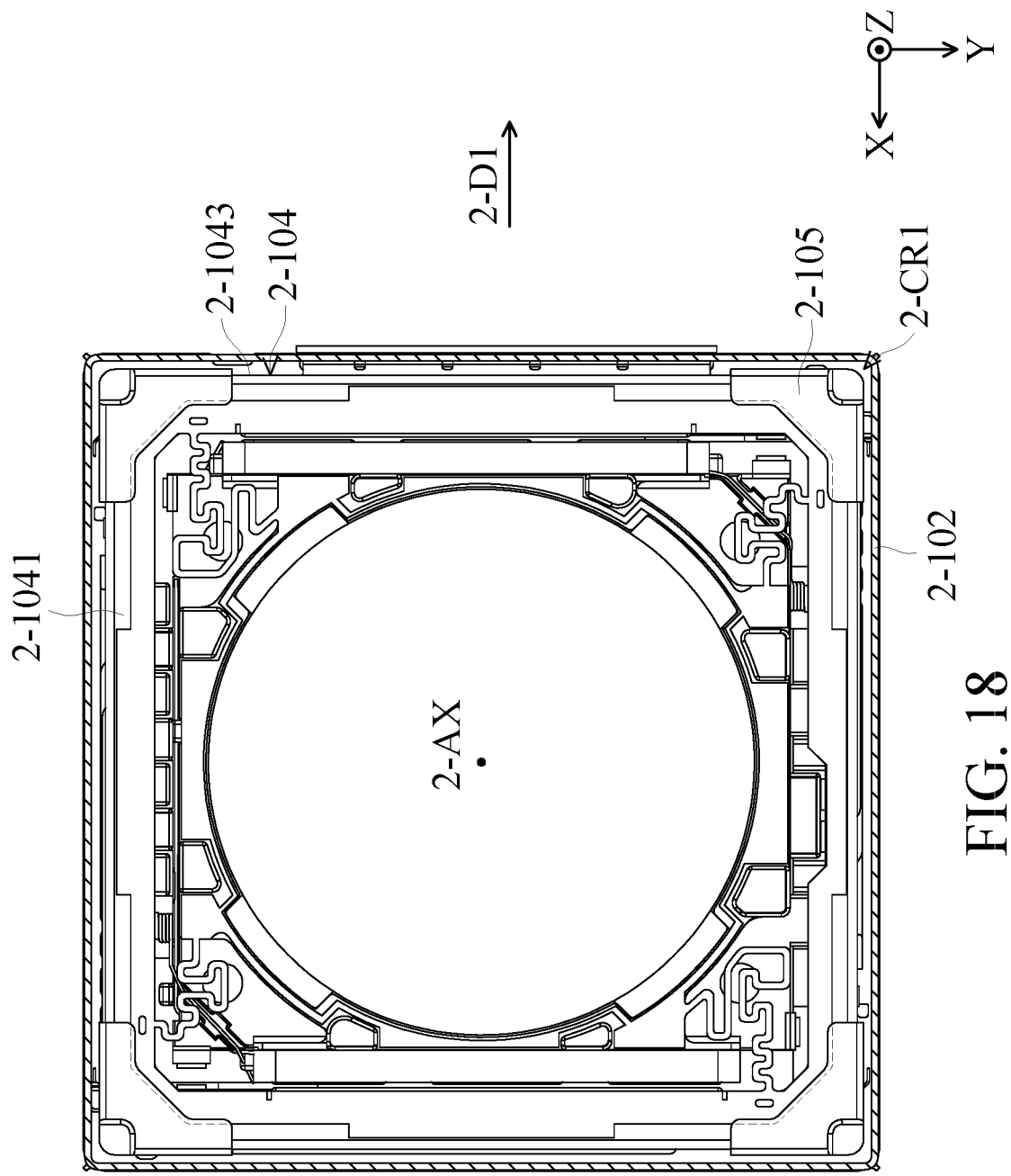
FIG. 18 is a top view of a partial structure of the optical element driving mechanism 2-100 according to an embodiment of the present disclosure.
Figure 19:
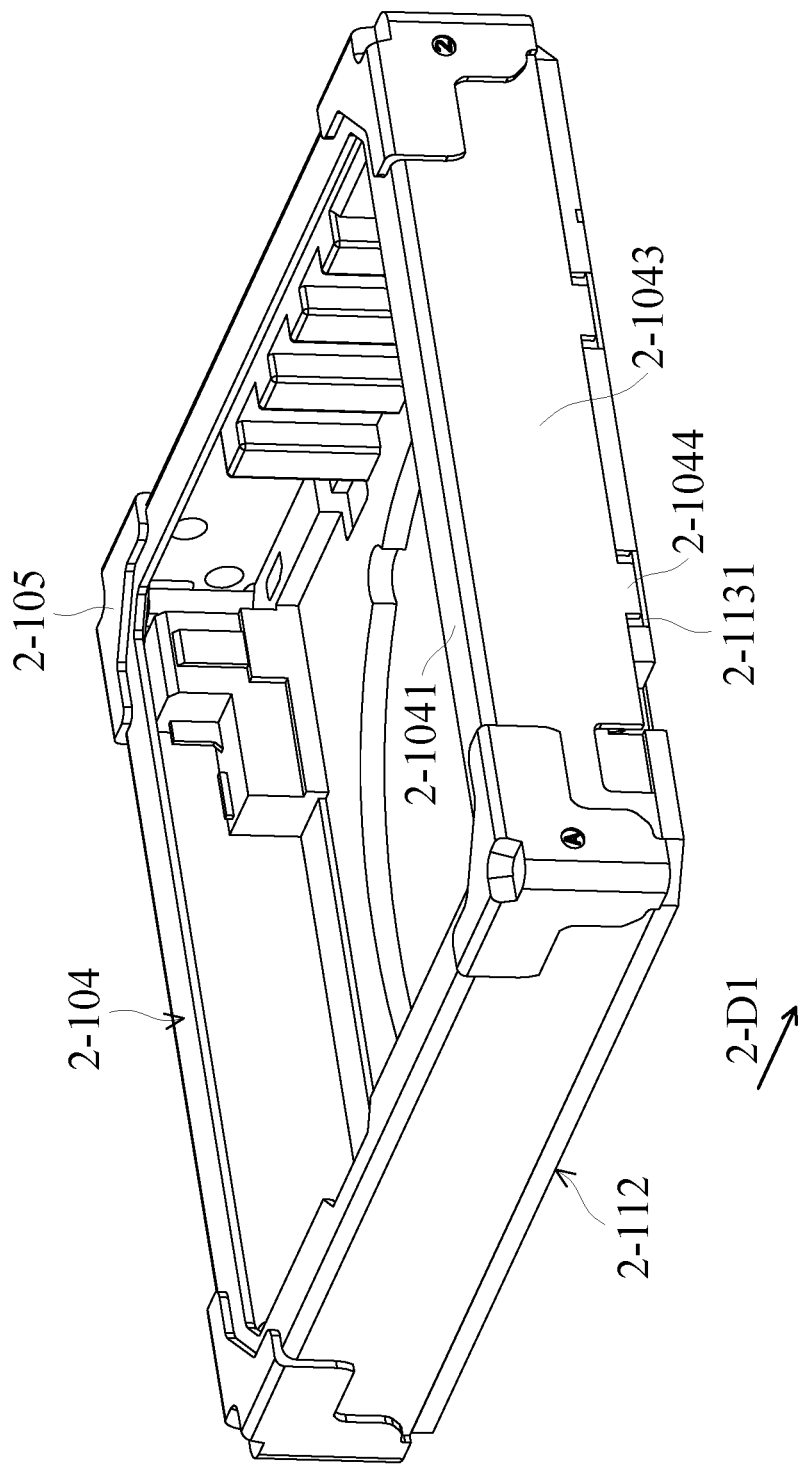
FIG. 19 is a three-dimensional diagram of the frame 2-104 and the base 2-112 according to an embodiment of the present disclosure.

Please refer to FIG. 15, FIG. 16, FIG. 18, and FIG. 19. FIG. 18 is a top view of a partial structure of the optical element driving mechanism 2-100 according to an embodiment of the present disclosure, and FIG. 19 is a three-dimensional diagram of the frame 2-104 and the base 2-112 according to an embodiment of the present disclosure. In this embodiment, the movable module 2-MD is movable relative to the casing 2-102, and the frame 2-104 and the casing 2-102 have different permeability. For example, the permeability of the casing 2-102 is less than the permeability of the frame 2-104, so that the problem of magnetic interference can be avoided.

As shown in FIG. 18, when viewed along the main axis 2-AX, the frame 2-104 has a polygonal structure and has a first corner 2-CR1. For example, the frame 2-104 has a rectangular structure. Furthermore, the optical element driving mechanism 2-100 may further include a blocking element 2-105, which is fixed on the frame 2-104 and located at the first corner 2-CR1. In this embodiment, the optical element driving mechanism 2-100 may include four blocking elements 2-105, which are fixed at the four corners of the frame 2-104, respectively.

The frame 2-104 further includes a top surface 2-1041 and a side wall 2-1043 extending from the top surface 2-1041 along the main axis 2-AX. As shown in FIG. 16, in a direction of the main axis 2-AX (for example, in the Z-axis), a shortest distance 2-md1 between the blocking element 2-105 and the casing 2-102 is less than a shortest distance 2-md2 between the top surface 2-1041 of the frame 2-104 and the casing 2-102. The blocking element 2-105 is configured to be in contact with an inner wall surface of the casing 2-102 and limit movement range of the movable module 2-MD.

As shown in FIG. 18, in a first direction 2-D1 (the X-axis) perpendicular to the side wall 2-1043, a shortest distance between the blocking element 2-105 and the casing 2-102 is less than a shortest distance between the side wall 2-1043 of the frame 2-104 and the casing 2-102.

When viewed along the main axis 2-AX, the blocking element 2-105 overlaps at least a part of the frame 2-104. Similarly, when viewed along the first direction 2-D1, the blocking element 2-105 overlaps at least a part of the frame 2-104. In this embodiment, the blocking element 2-105 can be made of a plastic material, the frame 2-104 can be made of a metal material, and the blocking element 2-105 can be affixed to the frame 2-104 by glue.

Figure 20:
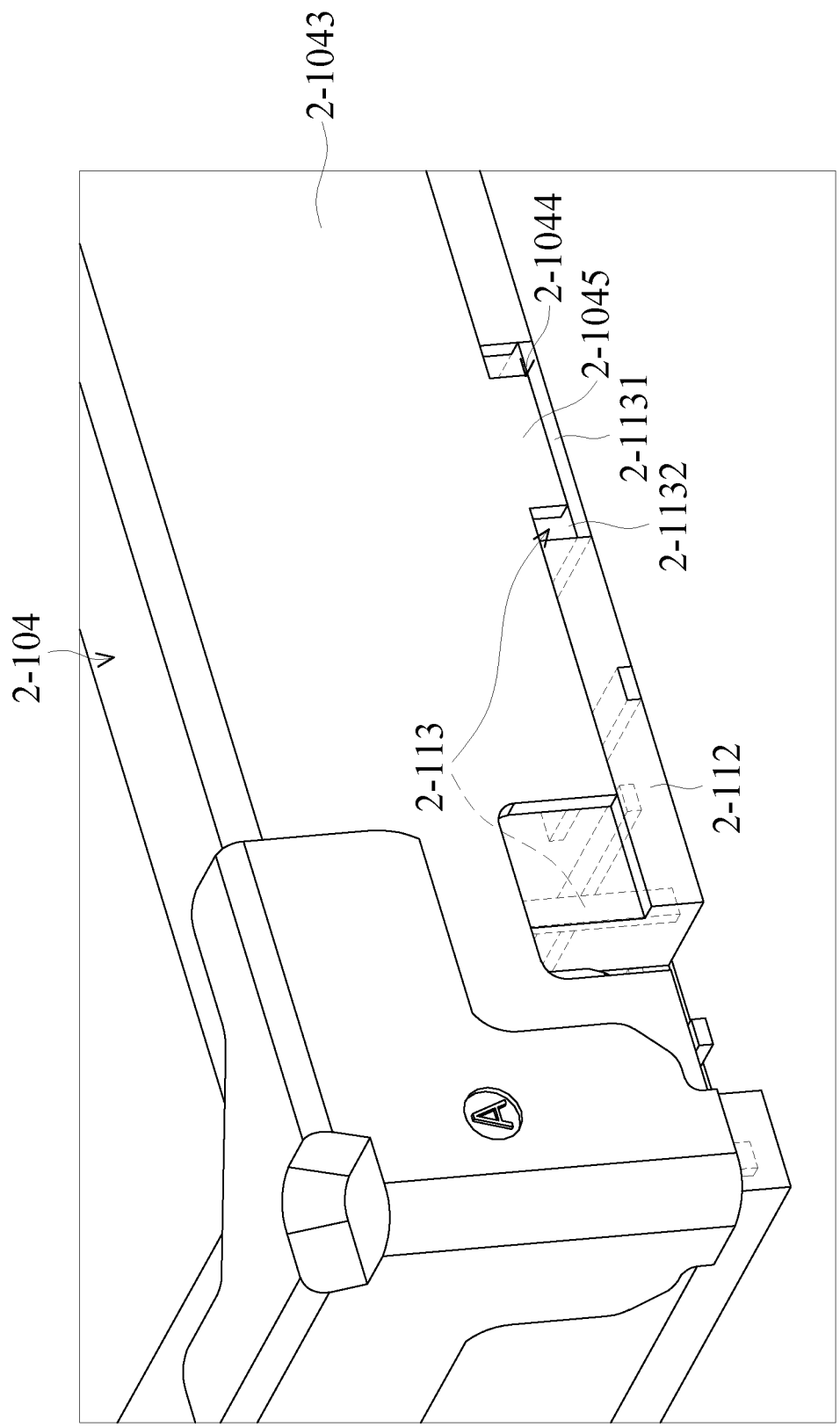
FIG. 20 is an enlarged view of the frame 2-104 and the base 2-112 according to an embodiment of the present disclosure.

Please refer to FIG. 20 together. FIG. 20 is an enlarged view of the frame 2-104 and the base 2-112 according to an embodiment of the present disclosure. In this embodiment, the base 2-112 is fixedly connected to the side wall 2-1043 of the frame 2-104. For example, the base 2-112 can be fixedly connected to the side wall 2-1043 by welding. The welding method can be fusion welding, but it is not limited to this. In other embodiments, solder can also be used to connect the base 2-112 and the side wall 2-1043.

In this embodiment, the base 2-112 can be made of a plastic material, and a plurality of circuit members 2-113 can be disposed in the base 2-112. The circuit members 2-113 are formed in the base 2-112 in the form of the molded interconnected device (MID).

The frame 2-104 may have a first connecting protrusion 2-1044, the base 2-112 has a second connecting protrusion 2-1131, and the first connecting protrusion 2-1044 is fixedly connected to the second connecting protrusion 2-1131 by welding. For example, the first connecting protrusion 2-1044 is fixedly connected to the second connecting protrusion 2-1131 by laser welding, but it is not limited to this.

Figure 21:
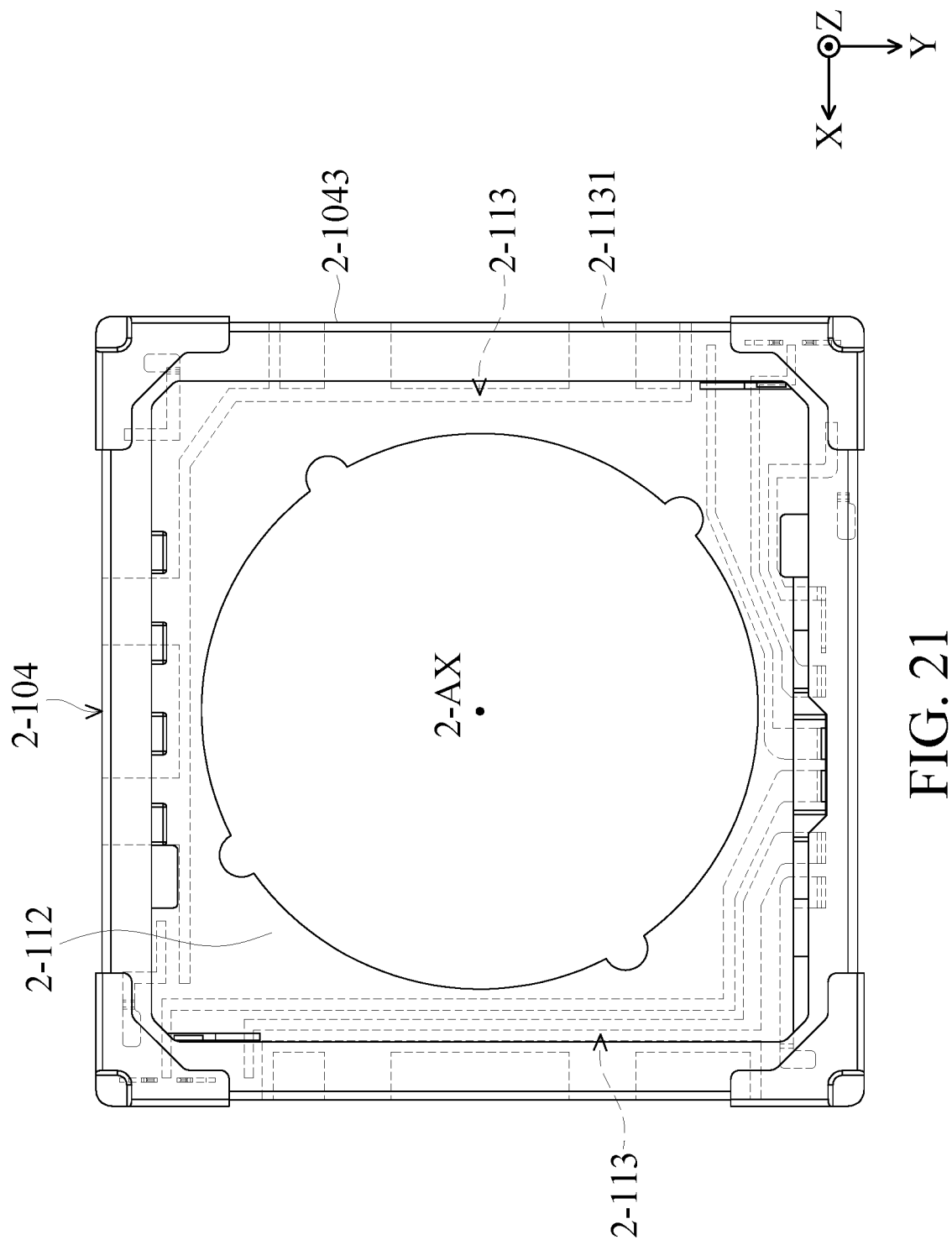
FIG. 21 is a top view of the frame 2-104 and the base 2-112 according to an embodiment of the present disclosure.

Please refer to FIG. 20 and FIG. 21 together. FIG. 21 is a top view of the frame 2-104 and the base 2-112 according to an embodiment of the present disclosure. The second connecting protrusion 2-1131 is a part of the circuit member 2-113, and when viewed along the main axis 2-AX, the base 2-112 or the circuit member 2-113 does not protrude from the frame 2-104. Specifically, when viewed along the main axis 2-AX, the second connecting protrusion 2-1131 is approximately flush with the side wall 2-1043. Based on this structural design, it can prevent the driving element 2-133 from hooking the second connecting protrusion 2-1131 when the driving element 2-133 is actuated, causing damage to the driving element 2-133.

Figure 22:
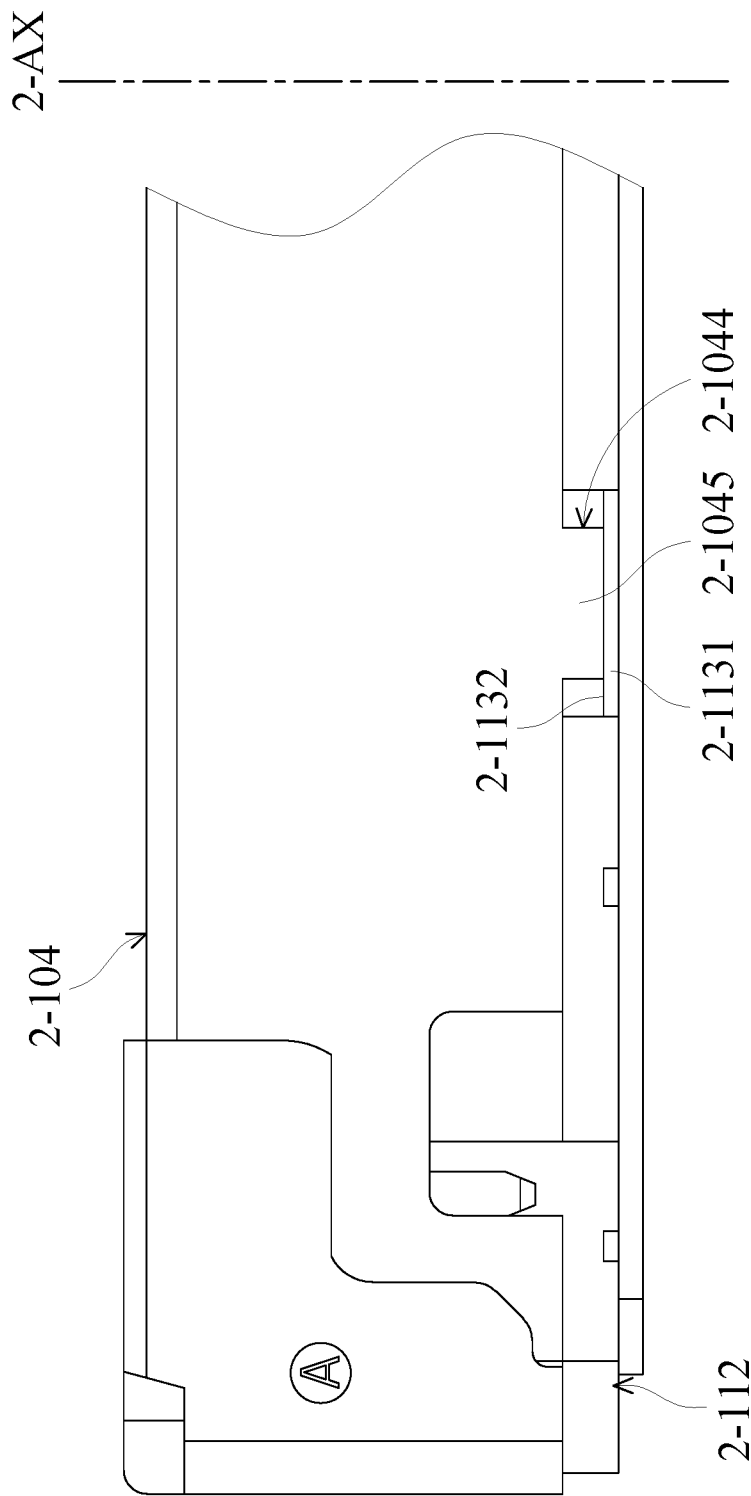
FIG. 22 is a side view of a partial structure of the frame 2-104 and the base 2-112 according to an embodiment of the present disclosure.

Please refer to FIG. 20 and FIG. 22 together. FIG. 22 is a side view of a partial structure of the frame 2-104 and the base 2-112 according to an embodiment of the present disclosure. When viewed along a direction perpendicular to the main axis 2-AX (for example, in the first direction 2-D1), a distance between the second connecting protrusion 2-1131 and a first side surface 2-1045 of the first connecting protrusion 2-1044 of the frame 2-104 is equal to zero, but it is not limited to this. In other embodiments, the distance between the second connecting protrusion 2-1131 and the first side surface 2-1045 may also be greater than zero.

The second connecting protrusion 2-1131 has a second side surface 2-1132, and the second side surface 2-1132 is not parallel to the first side surface 2-1045. For example, the first side surface 2-1045 is perpendicular to the second side surface 2-1132. In this embodiment, laser welding is implemented at the junction of the first side surface 2-1045 and the second side surface 2-1132. Based on this structural design, the connection strength between the frame 2-104 and the base 2-112 can be increased.

Figure 23:
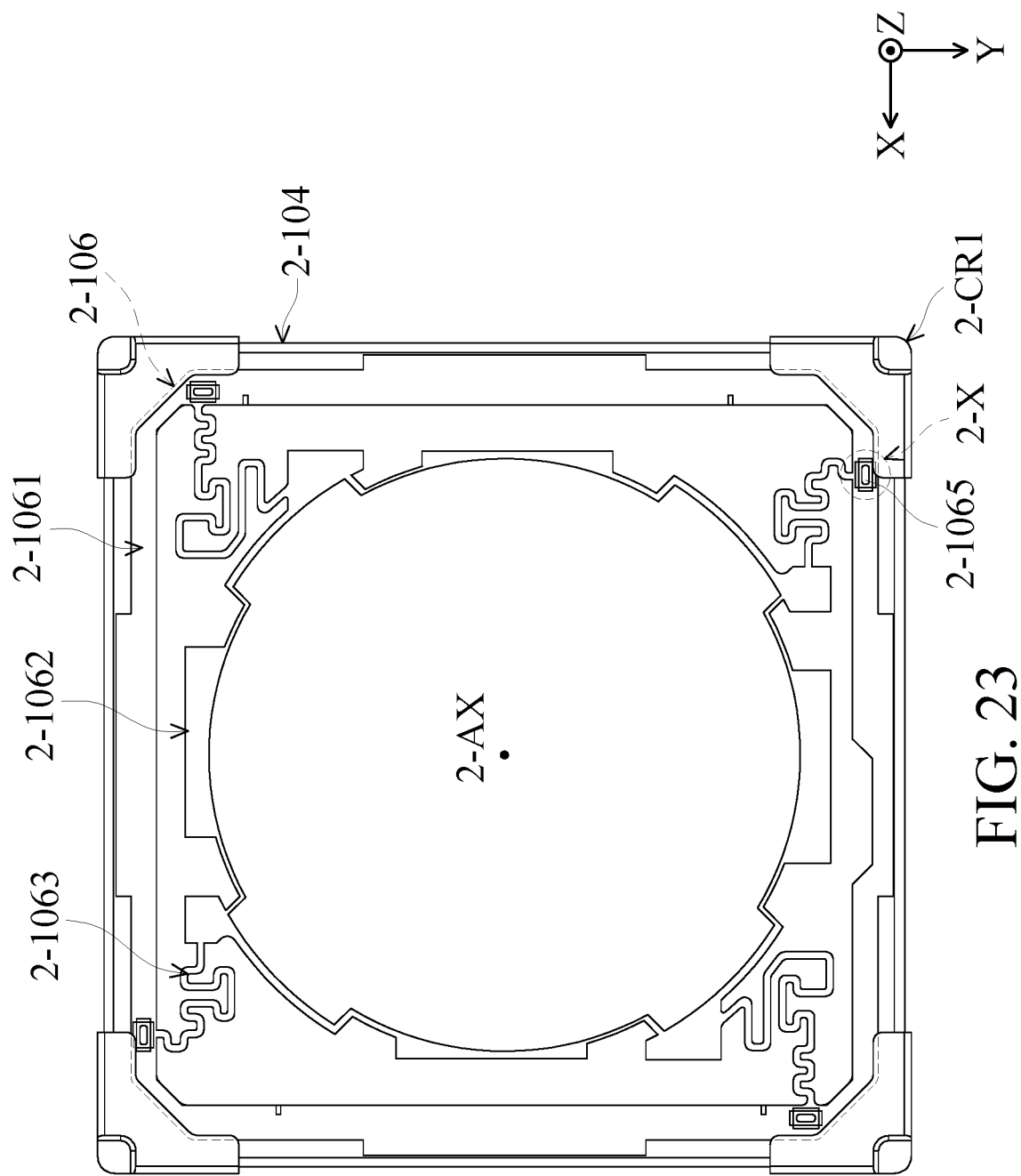
FIG. 23 is a top view of the first elastic member 2-106 and the frame 2-104 according to an embodiment of the present disclosure.
Figure 24:
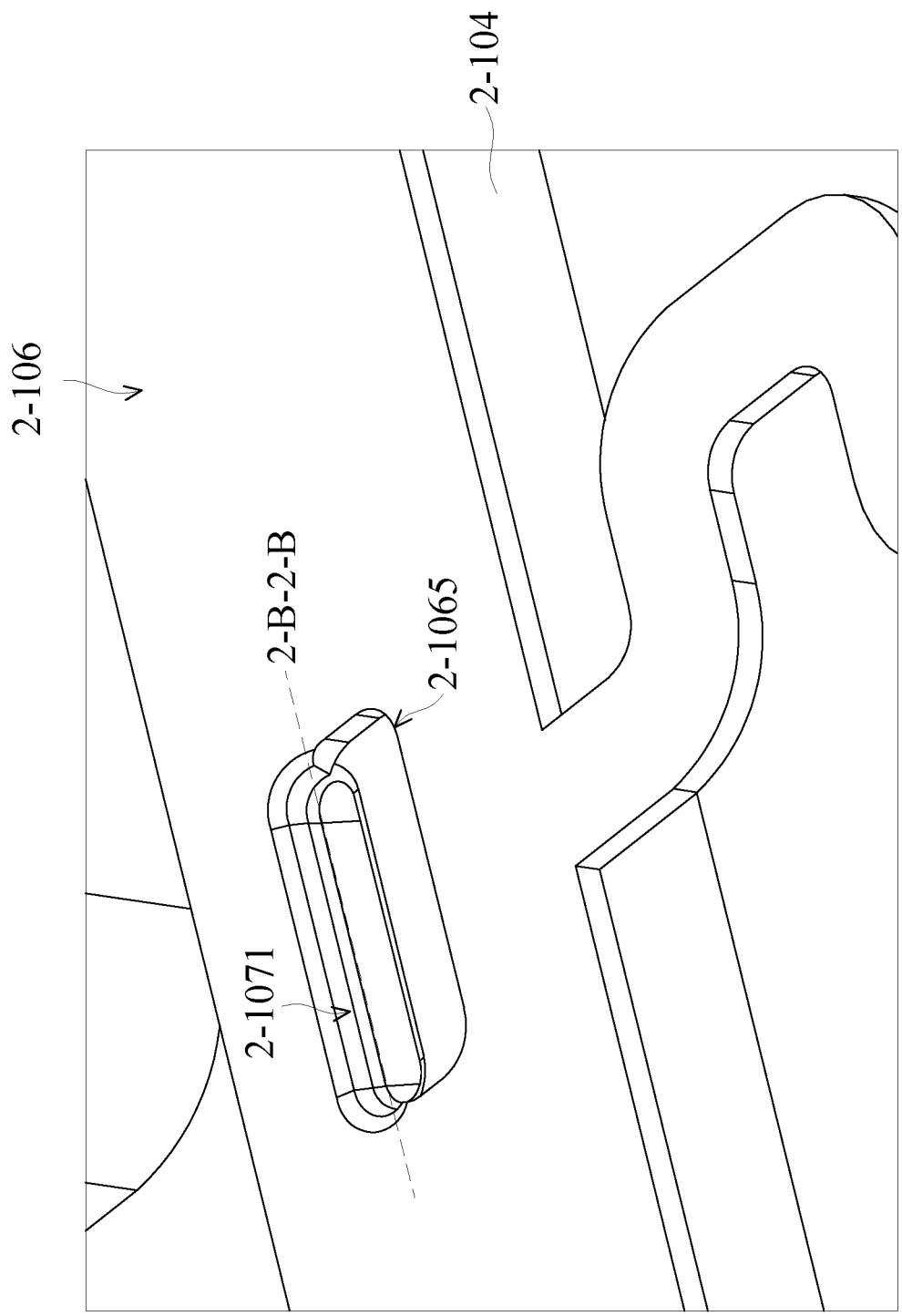
FIG. 24 is an enlarged diagram of an area 2-X in FIG. 23 according to an embodiment of the present disclosure.
Figure 25:
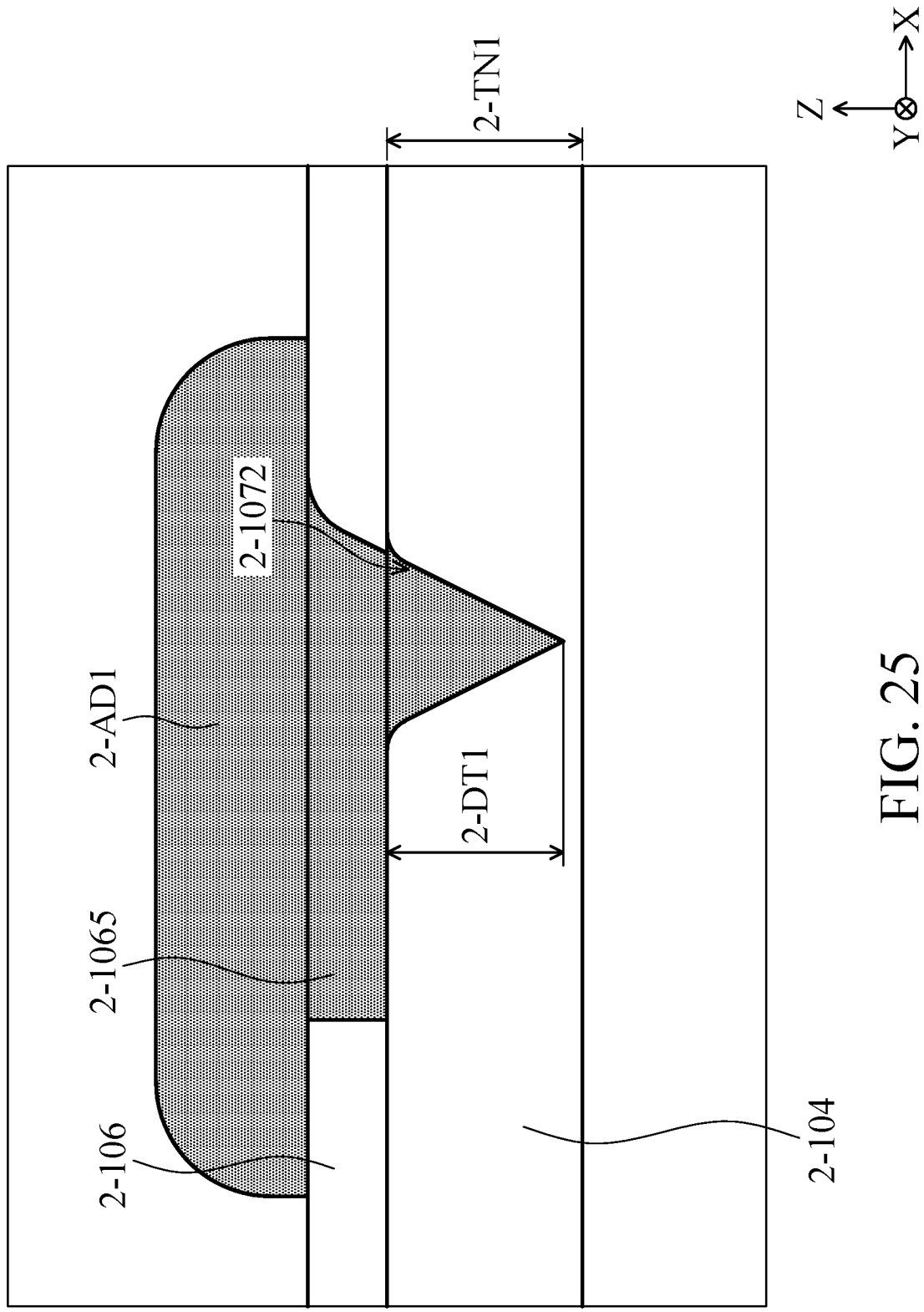
FIG. 25 is a cross-sectional view along the line 2-B-2-B in FIG. 24 according to an embodiment of the present disclosure.

Please refer to FIG. 23 to FIG. 25 at the same time. FIG. 23 is a top view of the first elastic member 2-106 and the frame 2-104 according to an embodiment of the present disclosure, FIG. 24 is an enlarged diagram of an area 2-X in FIG. 23 according to an embodiment of the present disclosure, and FIG. 25 is a cross-sectional view along the line 2-B-2-B in FIG. 24 according to an embodiment of the present disclosure. In this embodiment, the lens holder 2-108 of the first movable assembly 2-MA1 is movably connected to the frame 2-104 via the first elastic member 2-106.

The first elastic member 2-106 may include a first outer frame portion 2-1061, a first inner frame portion 2-1062, and a first elastic portion 2-1063. The first outer frame portion 2-1061 is fixedly disposed on the frame 2-104, the first inner frame portion 2-1062 is fixedly disposed on the lens holder 2-108 of the first movable assembly 2-MA1, and the first inner frame portion 2-1062 is movably connected to the first outer frame portion 2-1061 via the first elastic portion 2-1063.

The first elastic member 2-106 can be connected to the frame 2-104 by welding technology, for example, by fusion welding. For example, the first outer frame portion 2-1061 can be fixedly connected to the frame 2-104 by laser welding. In addition, as shown in FIG. 23 and FIG. 16, the first elastic member 2-106 is disposed between the frame 2-104 and the blocking element 2-105.

As shown in FIG. 24, the first elastic member 2-106 has a first opening 2-1065, and when viewed along the main axis 2-AX, a welding portion 2-1071 between the first elastic member 2-106 and the frame 2-104 overlaps at least a part of the first opening 2-1065. As shown in FIG. 23, the first opening 2-1065 is located at the first corner 2-CR1.

In this embodiment, the first elastic member 2-106 and the frame 2-104 are made of a metal material, and the welding laser is implemented on the welding portion 2-1071. Due to the irradiation of the laser, the first elastic member 2-106 and the frame 2-104 are melt and connected to each other, so that the welding portion 2-1071 produces a concave structure 2-1072. As shown in FIG. 25, when viewed in a direction perpendicular to the main axis 2-AX, a depth 2-DT1 of the concave structure 2-1072 along the main axis 2-AX (the Z-axis) is at least half of a thickness 2-TN1 of the frame 2-104 along the main axis 2-AX.

Based on the above design, the connection strength between the first elastic member 2-106 and the frame 2-104 can be increased to prevent the first elastic member 2-106 from separating from the frame 2-104 when the optical element driving mechanism 2-100 is impacted. In addition, as shown in FIG. 25, an adhesive element 2-AD1 can be disposed on the first elastic member 2-106 to further increase the connection strength between the first elastic member 2-106 and the frame 2-104.

Figure 26:
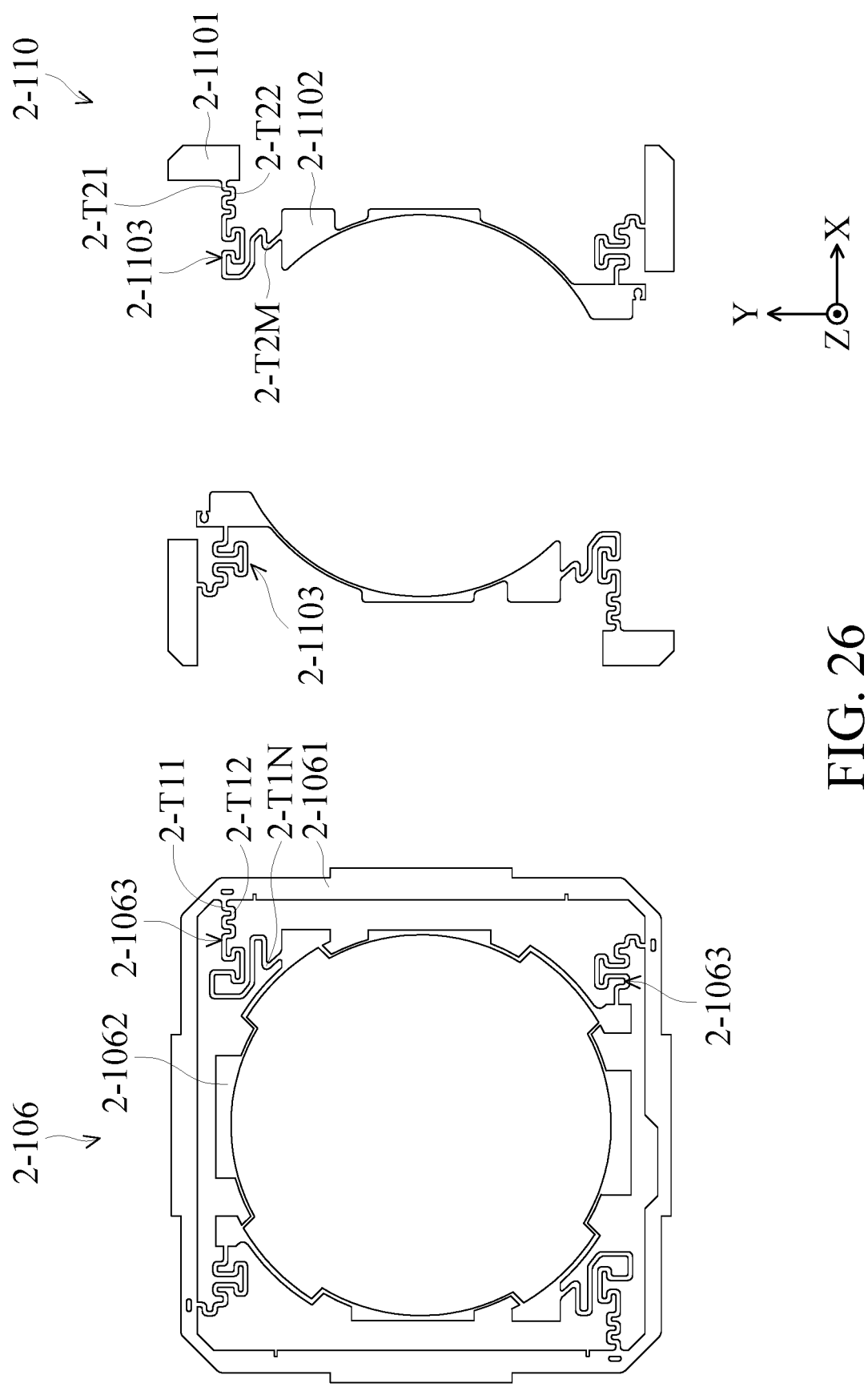
FIG. 26 is a top view of the first elastic member 2-106 and the second elastic member 2-110 according to an embodiment of the present disclosure.

Please refer to FIG. 26, which is a top view of the first elastic member 2-106 and the second elastic member 2-110 according to an embodiment of the present disclosure. The first movable assembly 2-MA1 is also movably connected to the frame 2-104 via the second elastic member 2-110. The second elastic member 2-110 may include at least one second outer frame portion 2-1101, at least one second inner frame portion 2-1102, and at least one second elastic portion 2-1103.

The second outer frame portion 2-1101 is fixedly disposed on the frame 2-104, the second inner frame portion 2-1102 is fixedly disposed on the lens holder 2-108 of the first movable assembly 2-MA1, and the second inner frame portion 2-1102 is movably connected to the second outer frame portion 2-1101 via the second elastic portion 2-1103. As shown in FIG. 26, a part of the first elastic portion 2-1063 and a part of the second elastic portion 2-1103 may have the same contour.

When viewed along the main axis 2-AX (the Z-axis), the first elastic portion 2-1063 includes a plurality of bent portions, and when viewed along the main axis 2-AX, the second elastic portion 2-1103 including a plurality of bent portions. Specifically, the first outer frame portion 2-1061 is connected to the first inner frame portion 2-1062 through a first bent portion 2-T11, a second bent portion 2-T12, . . . , and a Nth bent portion 2-T1N of the first elastic portions 2-1063 in sequence.

The second outer frame portion 2-1101 is connected to the second inner frame portion 2-1102 through a first bent portion 2-T21, a second bent portion 2-T22, . . . , and a Mth bent portion 2-T2M of the second elastic portions 2-1103 in sequence.

It is worth noting that the bending angles of the first bent portion 2-T11 of the first elastic portion 2-1063 and the first bent portion 2-T21 of the second elastic portion 2-1103 are the same, and the bending angles of the second bent portion 2-T12 of the first elastic portion 2-1063 and the second bent portion 2-T22 of the second elastic portion 2-1103 are the same, and so on. That is, the bending angles of the Nth bent portion 2-TiN of the first elastic portion 2-1063 and the Mth bent portion 2-T2M of the second elastic portion 2-1103 are the same. N is equal to M, and they are natural numbers (not including 0). Based on the above design, the stability of the movable module 2-MD during movement can be increased.

Figure 27:
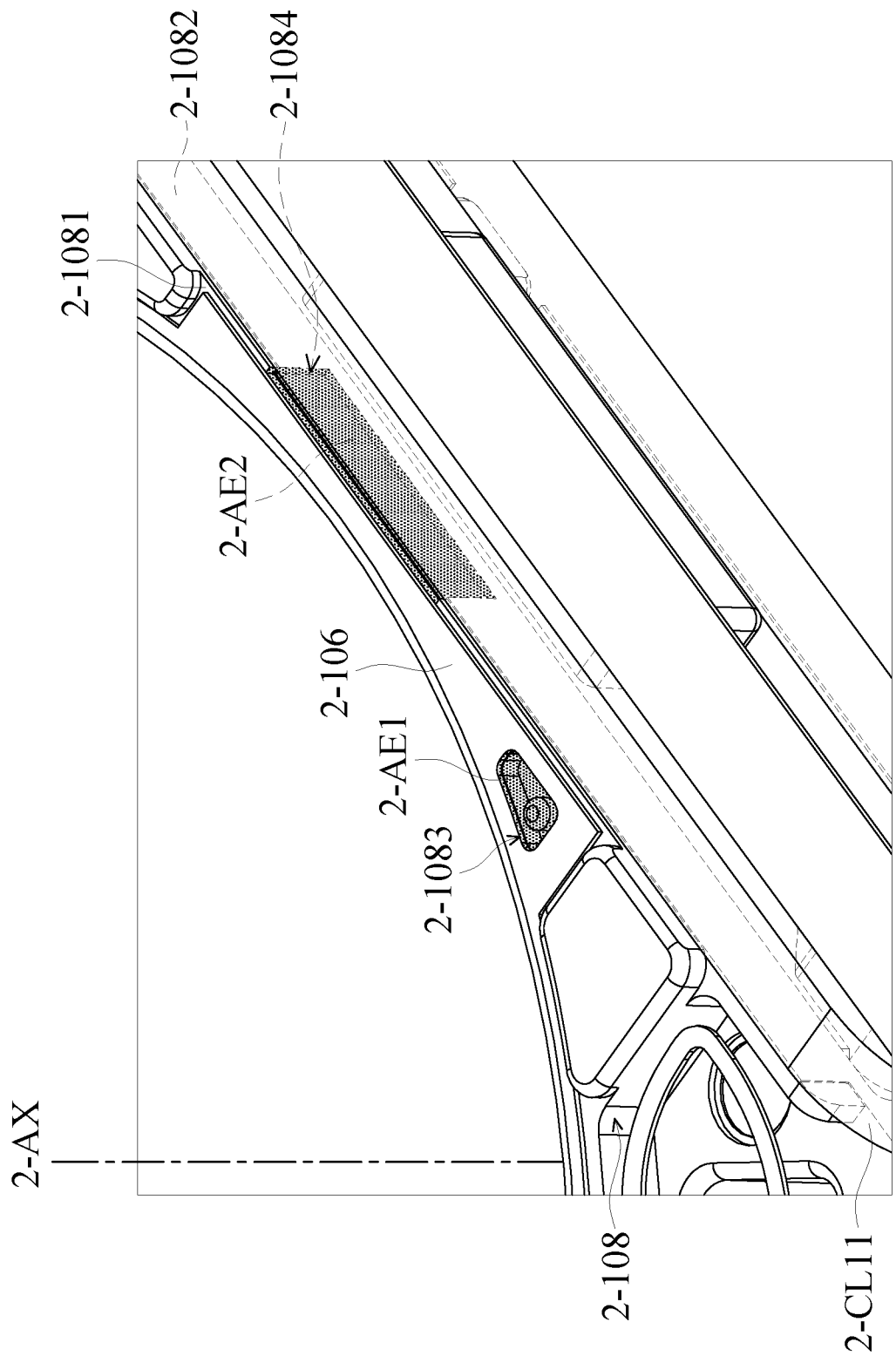
FIG. 27 is a three-dimensional enlarged diagram of the lens holder 2-108, the first elastic member 2-106, and the first driving coil 2-CL11 according to another embodiment of the present disclosure.

Please refer to FIG. 27, which is a three-dimensional enlarged diagram of the lens holder 2-108, the first elastic member 2-106, and the first driving coil 2-CL11 according to another embodiment of the present disclosure. The lens holder 2-108 of the first movable assembly 2-MA1 includes a contact top surface 2-1081 and a first side surface 2-1082, and the first side surface 2-1082 is extended along the main axis 2-AX from the contact top surface 2-1081.

A first accommodating groove 2-1083 is formed on the contact top surface 2-1081 and is configured to accommodate a first adhesive element 2-AE1. The first side surface 2-1082 forms a second accommodating groove 2-1084 which is configured to accommodate a second adhesive element 2-AE2. The first elastic member 2-106 is fixedly connected to the lens holder 2-108 of the first movable assembly 2-MA1 through the first adhesive element 2-AE1.

Furthermore, the first driving coil 2-CL11 is fixedly connected to the lens holder 2-108 of the first movable assembly 2-MA1 through the second adhesive element 2-AE2. The second adhesive element 2-AE2 can bond the first elastic member 2-106 and the first driving coil 2-CL11. Based on the above-mentioned design of the first accommodating groove 2-1083 and the second accommodating groove 2-1084, the first elastic member 2-106 can be more firmly connected to the lens holder 2-108.

The present disclosure provides an optical element driving mechanism 2-100 that includes the first driving assembly 2-DA1 and the second driving assembly 2-DA2. The second driving assembly 2-DA2 can drive the movable module 2-MD to move relative to the substrate 2-111, and the first driving assembly 2-DA1 can drive the lens holder 2-108 to move relative to the base 2-112, so as to achieve the functions of auto-focusing and optical image stabilization.

In addition, the optical element driving mechanism 2-100 can include multiple circuit members 2-113 which are disposed in the base 2-112 and can be fixedly connected to the frame 2-104 by laser welding, thereby increasing the overall mechanical strength of the optical element driving mechanism 2-100. In addition, the plurality of bent portions of the first elastic portion 2-1063 and the plurality of bent portions of the second elastic portion 2-1103 of the present disclosure have the same bending angle, so that the movable module 2-MD can be more stable during movement, thereby increasing the stability of the optical element driving mechanism 2-100.

Figure 28:
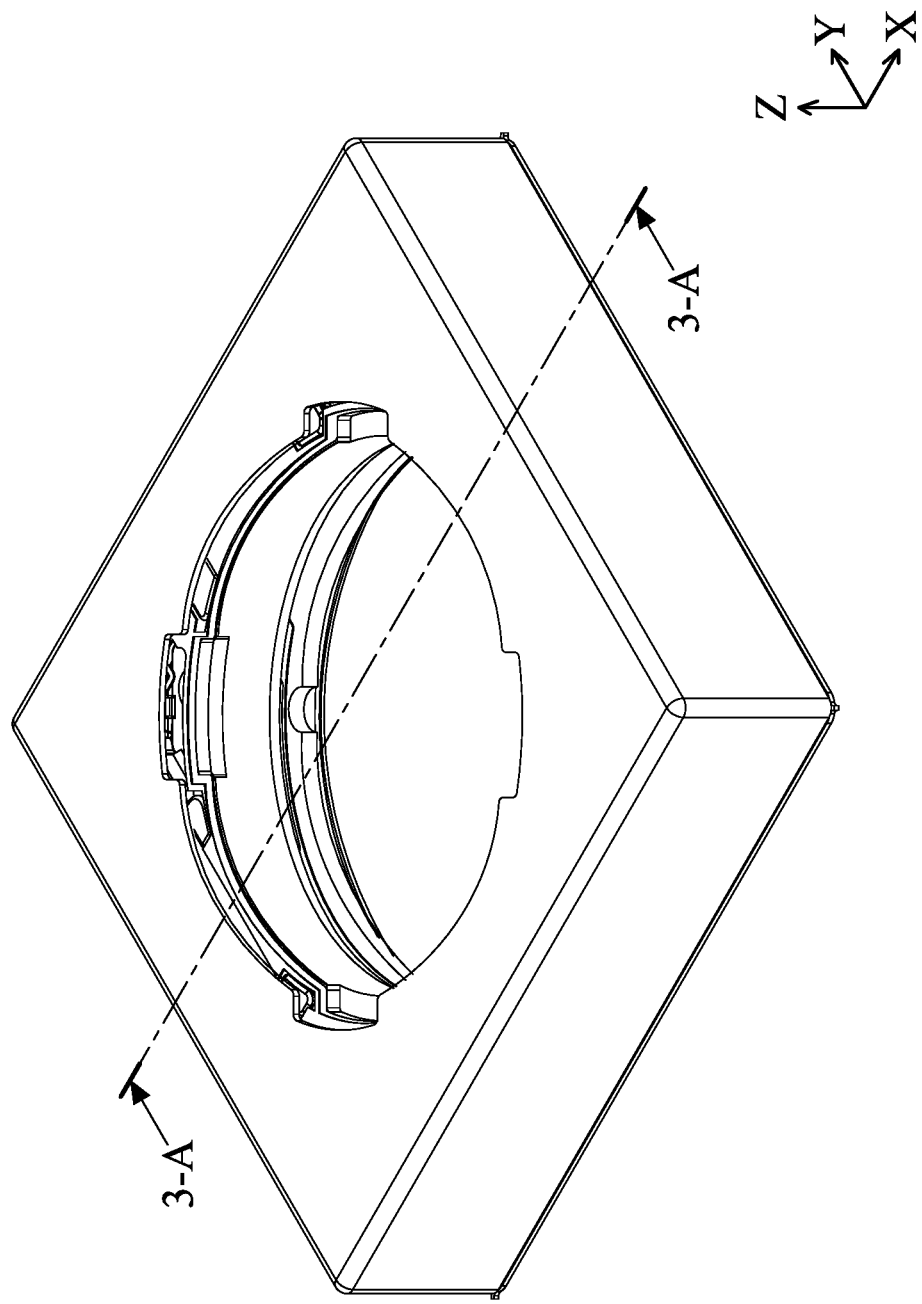
FIG. 28 is a schematic diagram of an optical element driving mechanism 3-100 according to an embodiment of the present disclosure.
Figure 29:
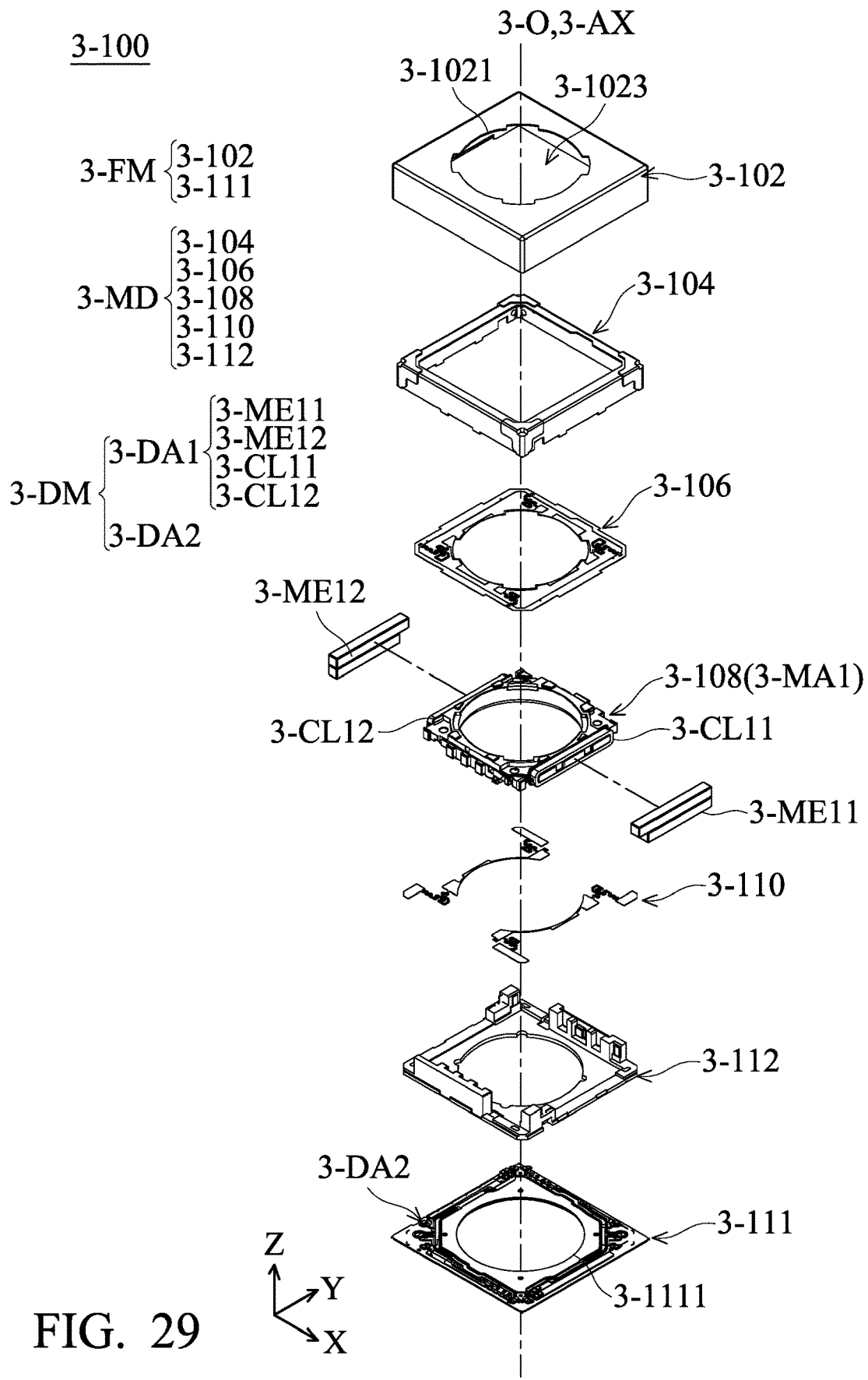
FIG. 29 is an exploded diagram of the optical element driving mechanism 3-100 according to an embodiment of the present disclosure.
Figure 30:
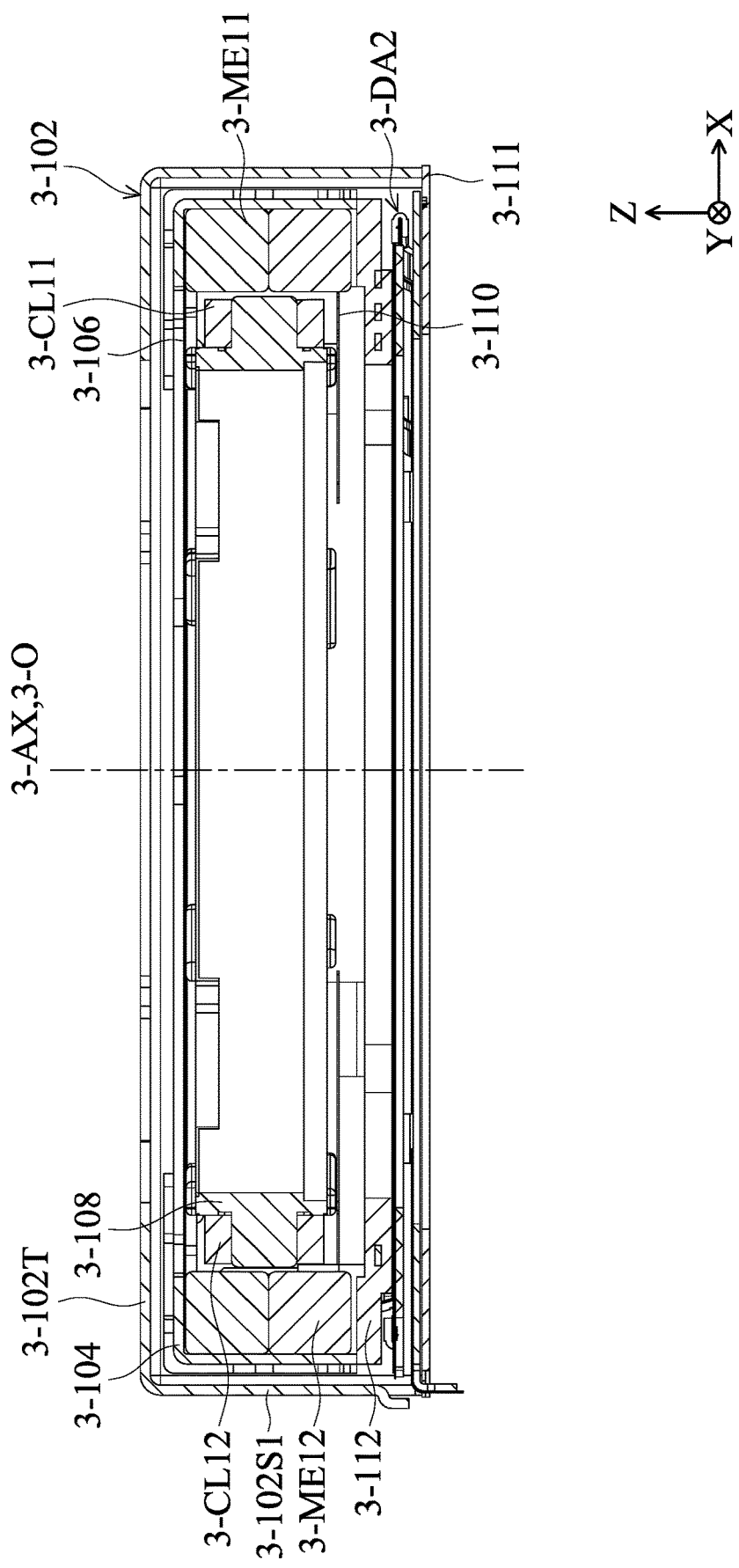
FIG. 30 is a cross-sectional view of the optical element driving mechanism 3-100 along line 3-A-3-A in FIG. 28 according to an embodiment of the present disclosure.

Please refer to FIG. 28 to FIG. 30. FIG. 28 is a schematic diagram of an optical element driving mechanism 3-100 according to an embodiment of the present disclosure, FIG. 29 is an exploded diagram of the optical element driving mechanism 3-100 according to an embodiment of the present disclosure, and FIG. 30 is a cross-sectional view of the optical element driving mechanism 3-100 along line 3-A-3-A in FIG. 28 according to an embodiment of the present disclosure. The optical element driving mechanism 3-100 can be an optical camera system and can be configured to hold and drive an optical element. The optical element driving mechanism 3-100 can be installed in various electronic devices or portable electronic devices, such as a smartphone, for allowing a user to perform the image capturing function. In this embodiment, the optical element driving mechanism 3-100 can be a voice coil motor (VCM) with an auto-focusing (AF) function, but it is not limited thereto. In other embodiments, the optical element driving mechanism 3-100 can also perform the functions of auto-focusing and optical image stabilization (OIS).

As shown in FIG. 29, in the present embodiment, the optical element driving mechanism 3-100 can include a fixed module 3-FM, a movable module 3-MD, and a driving module 3-DM. The movable module 3-MD is movably connected to the fixed module 3-FM, and the movable module 3-MD is configured to hold an optical element (not shown in the figures). The driving module 3-DM is configured to drive the movable module 3-MD to move relative to the fixed module 3-FM.

In this embodiment, as shown in FIG. 29, the fixed module 3-FM includes a casing 3-102 and a substrate 3-112. The movable module 3-MD includes a lens holder 3-108 and the aforementioned optical element, and the lens holder 3-108 is used for holding the optical element. The lens holder 3-108 and the optical element can be referred to a first movable assembly 3-MA1

As shown in FIG. 29, the casing 3-102 has a hollow structure, and a casing opening 3-1021 is formed thereon, and a substrate opening 3-1121 is formed on the substrate 3-111. The center of the casing opening 3-1021 corresponds to the optical axis 3-O of the optical element, and the substrate opening 3-1121 corresponds to a photosensitive element (not shown) disposed under the substrate 3-111. The external light can enter the casing 3-102 from the casing opening 3-1021 to be received by the photosensitive element after passing through the optical element and the substrate opening 3-1121 so as to generate a digital image signal.

Furthermore, the casing 3-102 is disposed on the substrate 3-111 and may have an accommodating space 3-1023 for accommodating the movable module 3-MD (including the aforementioned optical element and the lens holder 3-108) and the driving module 3-DM.

The movable module 3-MD can more include a frame 3-104 and a base 3-112, arranged along a main axis 3-AX. The main axis 3-AX can be parallel to or overlap the optical axis 3-O. The frame 3-104 is fixed to the base 3-112, and the base 3-112 is movably connected to the substrate 3-111 by a second driving assembly 3-DA2.

The movable module 3-MD may further include a first elastic member 3-106 and a second elastic member 3-110. The outer portion (the outer ring portion) of the first elastic member 3-106 is fixed to the inner wall surface of the casing 3-102, the outer portion (the outer ring portion) of the second elastic member 3-110 is fixed to the base 3-112, and the inner portions (the inner ring portions) of the first elastic member 3-106 and the second elastic member 3-110 are respectively connected to the upper and lower sides of the lens holder 3-108, so that the lens holder 3-108 can be suspended in the accommodating space 3-1023.

In this embodiment, the driving module 3-DM may include a first driving assembly 3-DA1 and a second driving assembly 3-DA2. The first driving assembly 3-DA1 may include a first magnetic element 3-ME11 (the first driving magnet), a second magnetic element 3-ME12 (the second driving magnet), a first driving coil 3-CL11, and a second driving coil 3-CL12. The first magnetic element 3-ME11 and the second magnetic element 3-ME12 are disposed on the frame 3-104 and respectively corresponds to the first driving coil 3-CL11 and the second driving coil 3-CL12.

In this embodiment, the first driving coil 3-CL11 and the second driving coil 3-CL12 may be wound coils and be disposed on opposite sides of the lens holder 3-108. When the first driving coil 3-CL11 and the second driving coil 3-CL12 are provided with electricity, the first driving coil 3-CL11 and the second driving coil 3-CL12 respectively act with the first magnetic element 3-ME11 and the second magnetic element 3-ME12 to generate an electromagnetic force, so as to drive the lens holder 3-108 and the held optical element to move relative to the base 3-112 along the optical axis 3-O (the Z-axis).

In addition, the second driving assembly 3-DA2 is connected between the base 3-112 and the substrate 3-111, and the second driving assembly 3-DA2 may drive the movable module 3-MD to moves relative to the substrate 3-111 along the XY plane so as to achieve the efficacy of optical image stabilization.

Figure 31:
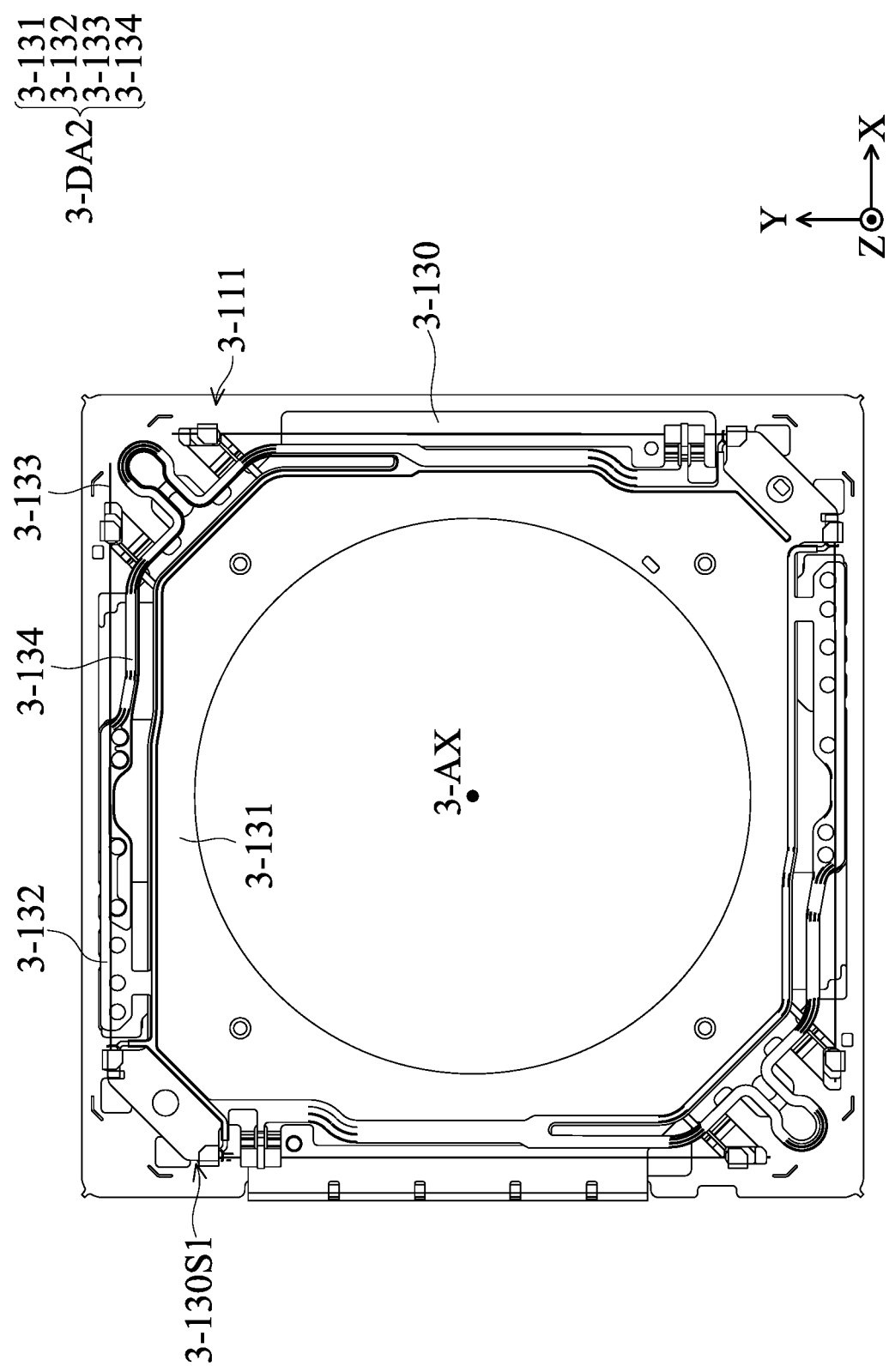
FIG. 31 is a top view of the second driving assembly 3-DA2 and the substrate 3-111 according to an embodiment of the present disclosure.
Figure 32:
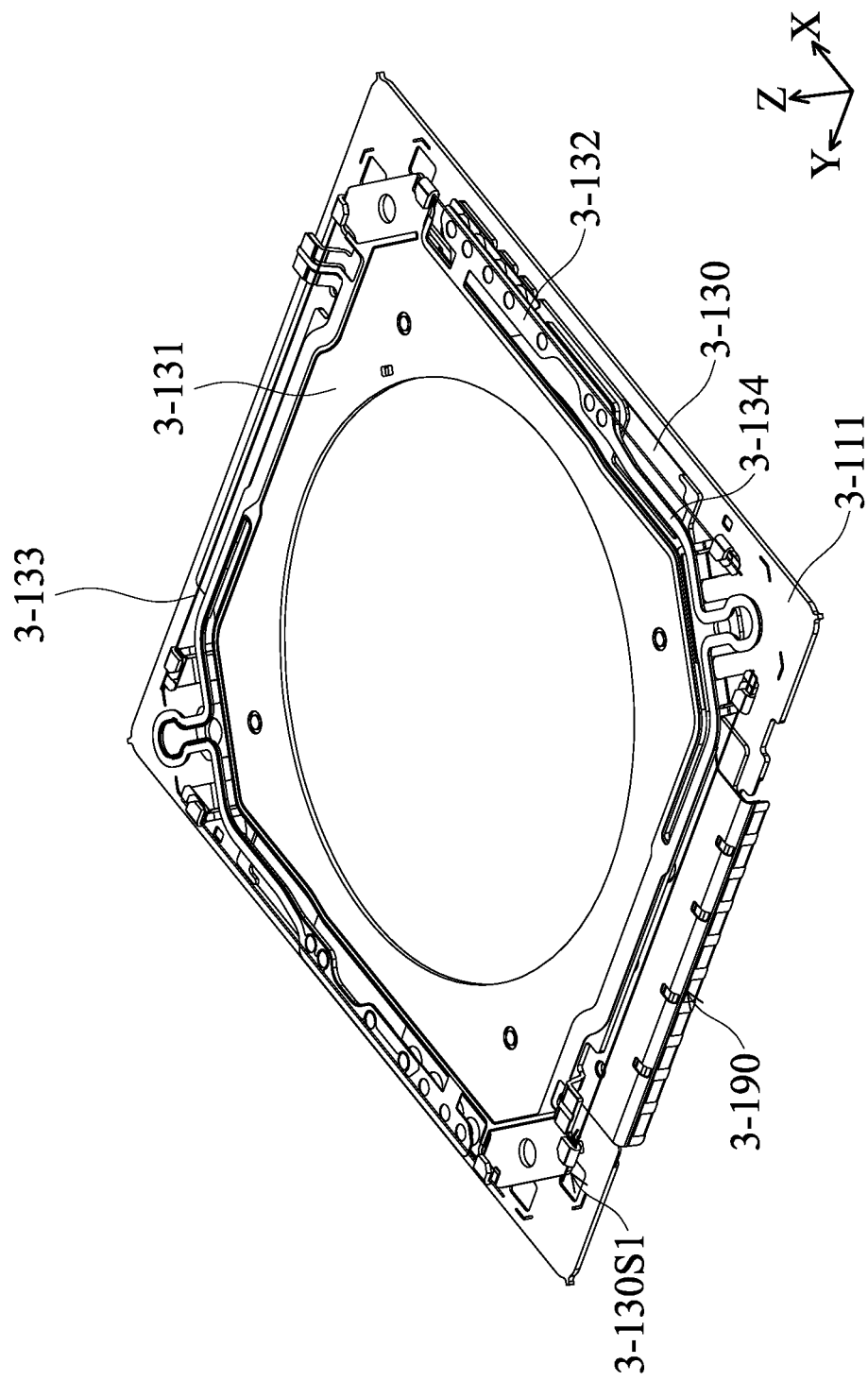
FIG. 32 is a schematic diagram of the second driving assembly 3-DA2 and the substrate 3-111 according to an embodiment of the present disclosure.

Please refer to FIG. 31 and FIG. 32. FIG. 31 is a top view of the second driving assembly 3-DA2 and the substrate 3-111 according to an embodiment of the present disclosure, and FIG. 32 is a schematic diagram of the second driving assembly 3-DA2 and the substrate 3-111 according to an embodiment of the present disclosure. In this embodiment, as shown in FIG. 31, the second driving assembly 3-DA2 can include a fixed member 3-130, a first connecting member 3-131, at least one second connecting member 3-132, at least one driving element 3-133, at least one elastic portion 3-134 and a circuit assembly 3-190. The fixed member 3-130 is fixedly connected to the substrate 3-111. The first connecting member 3-131 is fixedly connected to the base 3-112 of the movable module 3-MD, the second connecting member 3-132 is fixedly connected to the fixed member 3-130, and the elastic portion 3-134 is connected between the first connecting member 3-131 and the second connecting member 3-132, so that the second connecting member 3-132 is movably connected to the first connecting member 3-131 through the elastic portion 3-134.

The driving element 3-133 is connected between the first connecting member 3-131 and the fixed member 3-130, and the driving element 3-133 may be made of shape memory alloys (SMA). Shape memory alloy (SMA) is an alloy that can eliminate the deformation in lower temperature by heating. When the shape memory alloy performs plastic deformation under its phase transition temperature, it may return to its original shape by heating. By controlling the temperature of the driving element 3-133, the movable module 3-MD can be moved relative to the substrate 3-111.

The circuit assembly 3-190 may be a flexible circuit board disposed between the first connecting member 3-131 and the fixed member 3-130, and the circuit assembly 3-190 is configured to be electrically connected to an external circuit, such as a main circuit board of a smart phone. In addition, it is worth noting that the first connecting member 3-131, the second connecting member 3-132, and the elastic portion 3-134 can be integrally formed, and the first connecting member 3-131 is movably connected to the fixed member 3-130 by the elastic portion 3-134 and the second connecting member 3-132.

Figure 33:
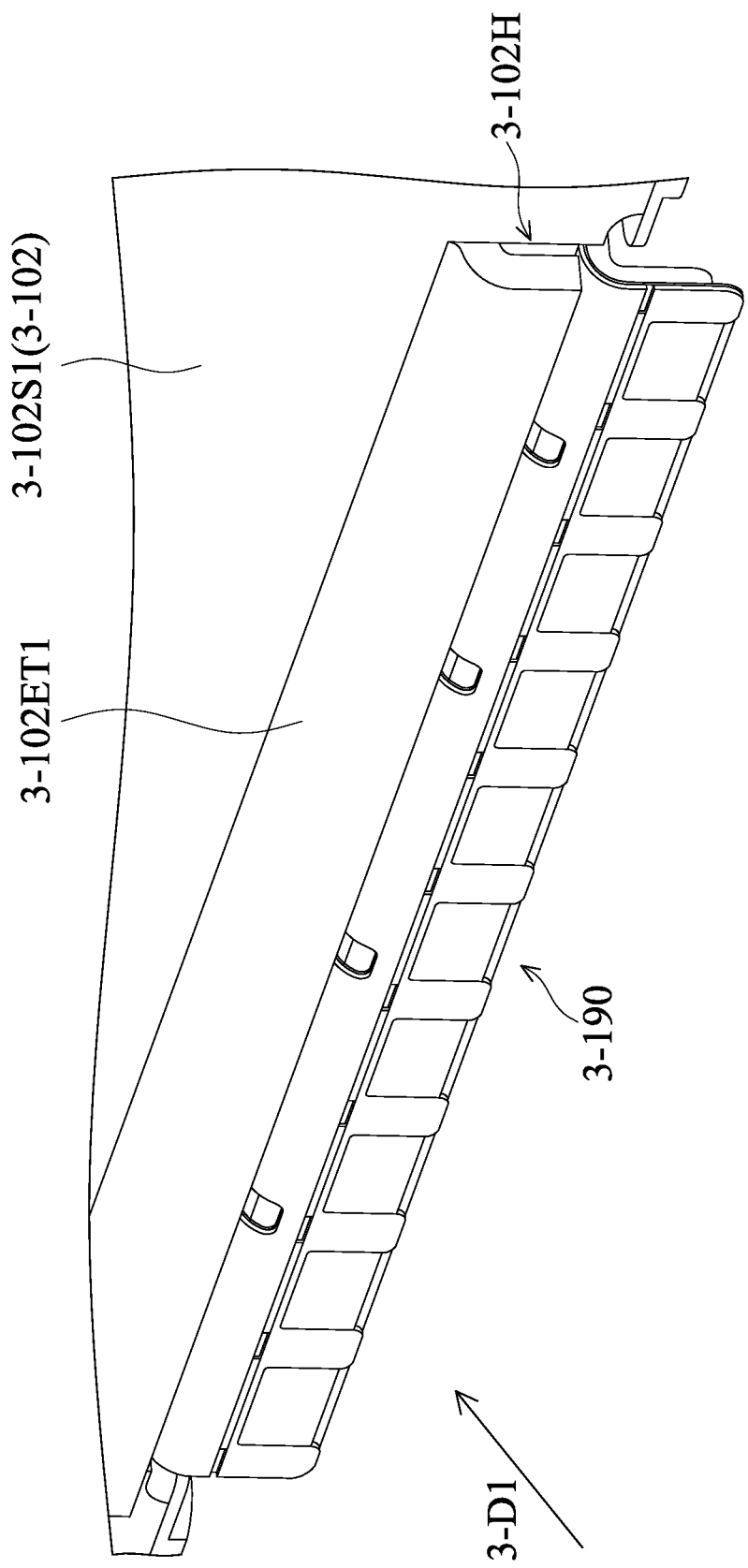
FIG. 33 is a schematic diagram of a partial structure of the optical element driving mechanism 3-100 according to an embodiment of the present disclosure.
Figure 34:
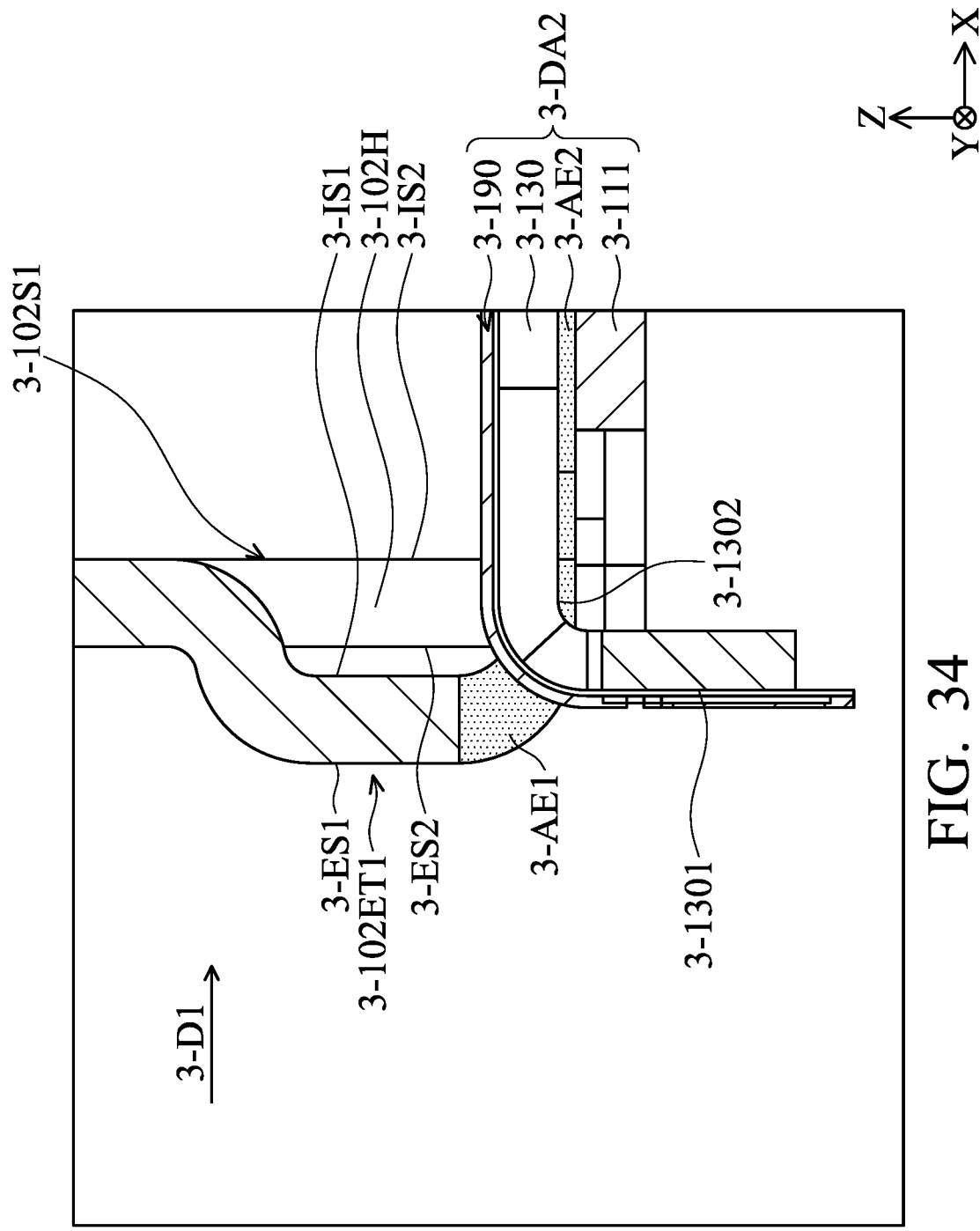
FIG. 34 is an enlarged diagram of FIG. 30 according to an embodiment of the present disclosure.

Please refer to FIG. 33 and FIG. 34. FIG. 33 is a schematic diagram of a partial structure of the optical element driving mechanism 3-100 according to an embodiment of the present disclosure, and FIG. 34 is an enlarged diagram of FIG. 30 according to an embodiment of the present disclosure. In this embodiment, as shown in FIG. 33, an opening 3-102H is formed on the casing 3-102 of the fixed module 3-FM, and a part (the circuit assembly 3-190) of the driving module 3-DM is exposed from the opening 3-102H.

As shown in FIG. 30 and FIG. 34, the casing 3-102 has a top wall 3-102T and a first side wall 3-102S1. The first side wall 3-102S1 is extended along the main axis 3-AX from the top wall 3-102T, and the opening 3-102H is formed on the first side wall 3-102S1.

When viewed along the main axis 3-AX, the first side wall 3-102S1 overlaps a part of the second driving assembly 3-DA2. For example, the projection of the first side wall 3-102S1 along the main axis 3-AX overlaps the circuit assembly 3-190, and the circuit assembly 3-190 protrudes from the first side wall 3-102S1 through the opening 3-102H.

Furthermore, a first extending portion 3-102ET1 may be formed on the first side wall 3-102S1, and when viewed along the main axis 3-AX, the first extending portion 3-102ET1 can completely shield the second driving assembly 3-DA2. When viewed along the main axis 3-AX, at least a part of the first extending portion 3-102ET1 does not overlap the opening 3-102H. For example, the projection of apart of the first extending portion 3-102ET1 along the main axis 3-AX does not fall within the opening 3-102H.

When viewed along a first direction 3-D1 (the X-axis) perpendicular to the main axis 3-AX, the first extending portion 3-102ET1 overlaps at least a part of the opening 3-102H. As shown in FIG. 34, the optical element driving mechanism 3-100 may further include a first adhesive element 3-AE1 configured to be connected to the first extending portion 3-102ET1 and the circuit assembly 3-190 of the second driving assembly 3-DA2. In some embodiments, the first adhesive element 3-AE1 can completely close the gap between the first extending portion 3-102ET1 and the circuit assembly 3-190 to prevent dust from entering the optical element driving mechanism 3-100 through the opening 3-102H to affect the image effect of optical element driving mechanism 3-100.

As shown in FIG. 34, the first extending portion 3-102ET1 has a first outer surface 3-ES1 and a first inner surface 3-IS1, and the first side wall 3-102S1 has a second outer surface 3-ES2 and a second inner surface 3-IS2. When viewed along a second direction 3-D2 (the Y-axis) perpendicular to the main axis 3-AX, at least a part of the first adhesive element 3-AE1 does not overlap the first inner surface 3-IS1 in the main axis 3-AX. For example, the projection of the first inner surface 3-IS1 along the main axis 3-AX does not overlap a part of the first adhesive element 3-AE1.

When viewed along the second direction 3-D2 (the Y-axis), the first adhesive element 3-AE1 does not overlap the second outer surface 3-ES2 along the main axis 3-AX. When viewed along the second direction 3-D2, the first adhesive element 3-AE1 does not overlap the second inner surface 3-IS2 in the main axis 3-AX. As shown in FIG. 34, when viewed along the second direction 3-D2, the first adhesive element 3-AE1 is located between the first outer surface 3-ES1 and the second outer surface 3-ES2.

Based on the above structural design, it can avoid the problem that the driving element 3-133 contacts the first adhesive element 3-AE1 when it is deformed and adheres to the first adhesive element 3-AE1, thereby causing damage to the driving element 3-133.

In this embodiment, the casing 3-102 may have a metal material, a first insulating element (not shown in the figures) may be disposed on the first inner surface 3-IS1, and the first insulating element may also be disposed on the second inner surface 3-IS2. For example, the first insulating element can be an insulating layer, and the first insulating element can be disposed on all inner surfaces of the casing 3-102.

Since the first insulating element can be electrically insulated, it can avoid the driving element 3-133 from contacting the casing 3-102 and conducting with the casing 3-102 when the driving element 3-133 is deformed. In addition, the hardness of the first insulating element is less than the hardness of the casing 3-102, so that the problem of damage caused by hitting the casing 3-102 when the driving element 3-133 is deformed can be avoided.

In addition, the optical element driving mechanism 3-100 may further include a second adhesive element 3-AE2 disposed between the fixed member 3-130 and the substrate 3-111, so that the fixed member 3-130 is affixed to the substrate 3-111. The fixed member 3-130 has a first contact surface 3-1301 and a second contact surface 3-1302, and the second adhesive element 3-AE2 is disposed between the second contact surface 3-1302 and the substrate 3-111.

A second insulating element (not shown in the figures) is disposed on the first contact surface 3-1301, and the second insulating element is located between the circuit assembly 3-190 and the fixed member 3-130. In this embodiment, the fixed member 3-130 includes a metal material, so that the second insulating element can prevent the circuit assembly 3-190 from conducting with the fixed member 3-130.

Furthermore, the substrate 3-111 may also have a metal material, and the second adhesive element 3-AE2 may have a plastic material. For example, the second adhesive element 3-AE2 may include plastic microplastic particles, which means that the second adhesive element 3-AE2 may also be an insulating element and can prevent the fixed member 3-130 from conducting with the substrate 3-111.

Figure 35:
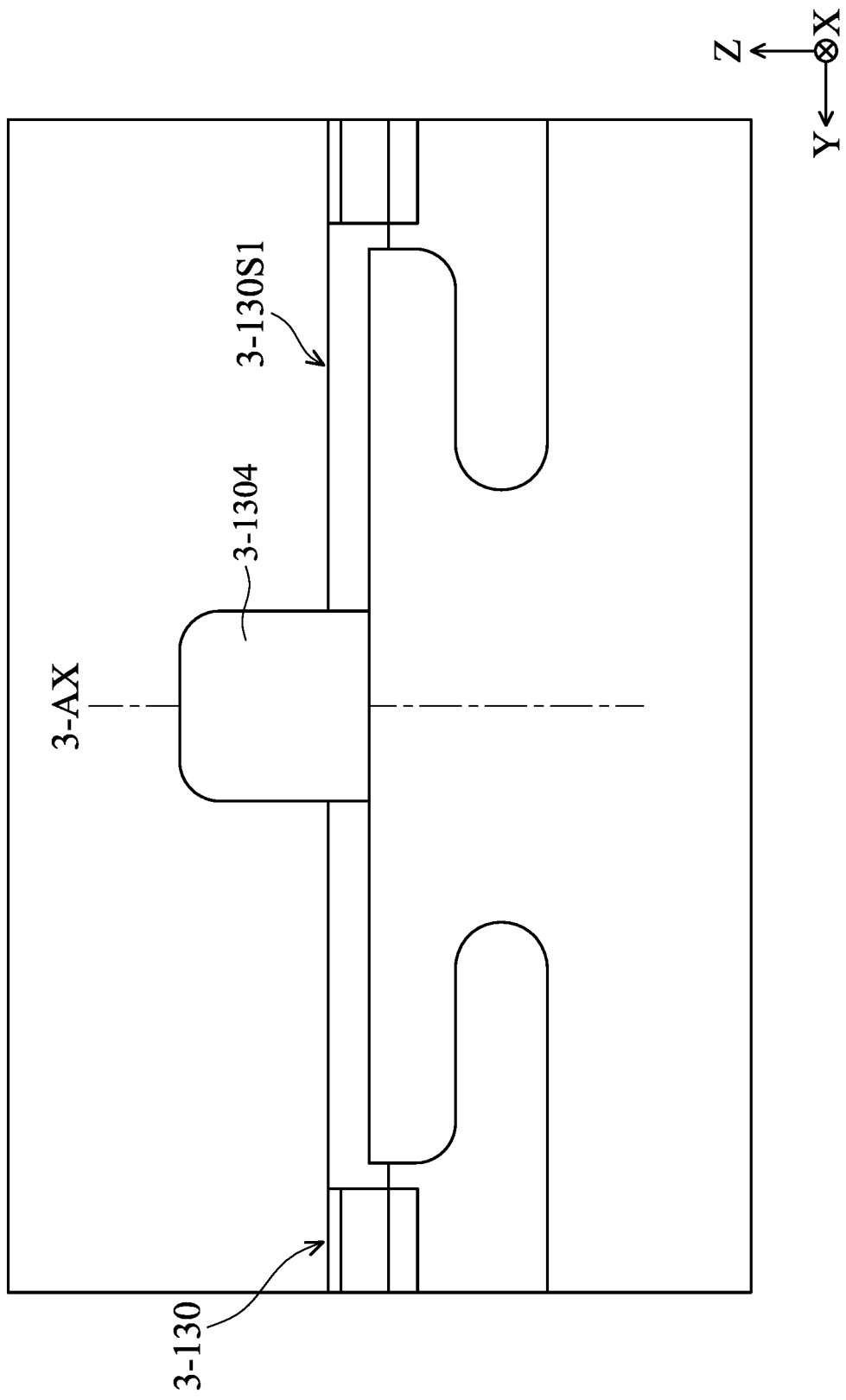
FIG. 35 is a side view of a partial structure of the fixed member 3-130 viewed along the X-axis according to another embodiment of the present disclosure.
Figure 36:
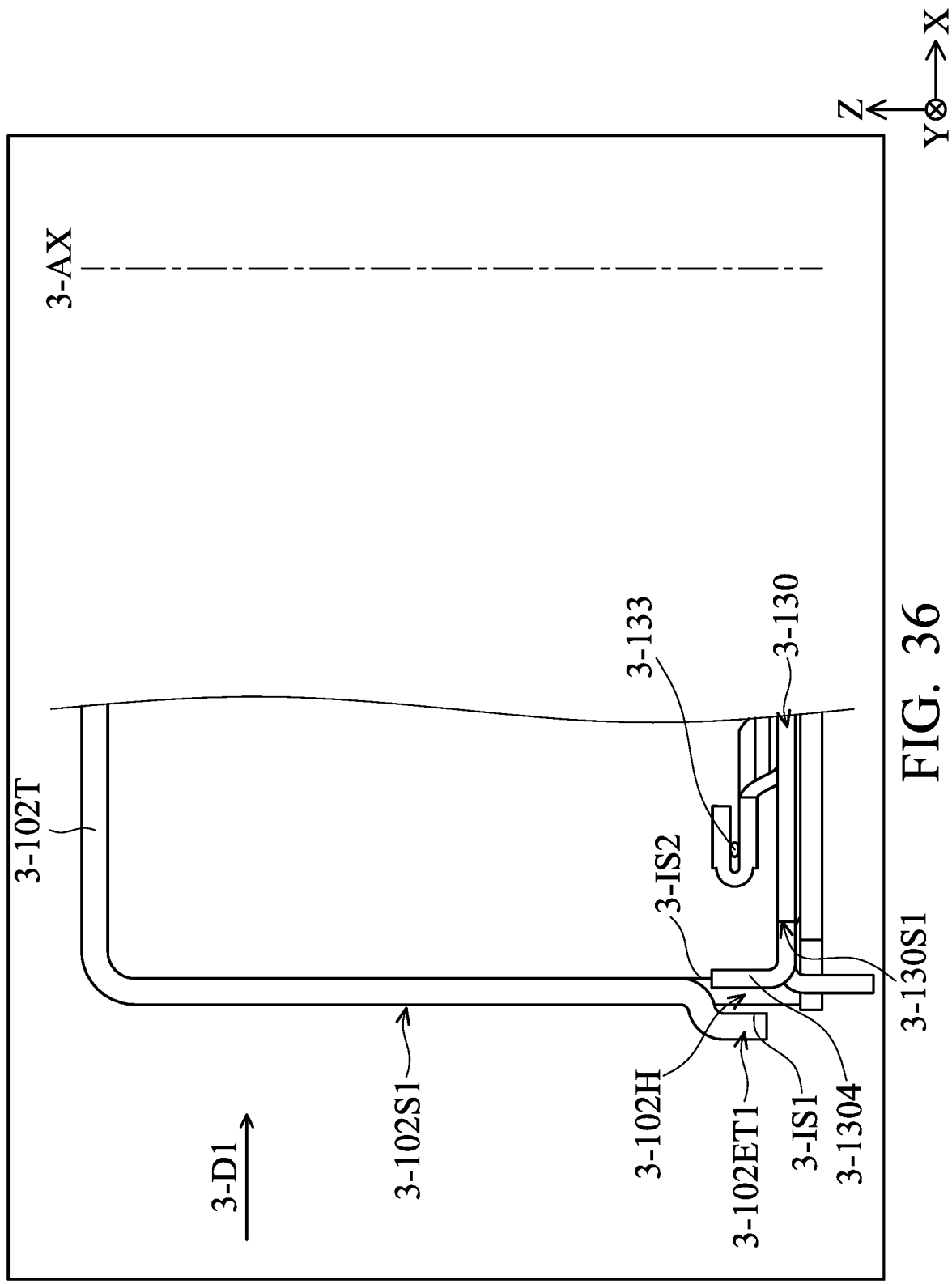
FIG. 36 is a cross-sectional view of a partial structure of the optical element driving mechanism 3-100 according to another embodiment of the present disclosure.

Please refer to FIG. 31, FIG. 32, FIG. 35 and FIG. 36. FIG. 35 is a side view of a partial structure of the fixed member 3-130 viewed along the X-axis according to another embodiment of the present disclosure. FIG. 36 is a cross-sectional view of a partial structure of the optical element driving mechanism 3-100 according to another embodiment of the present disclosure.

When viewed along the main axis 3-AX, the fixed member 3-130 has a rectangular structure, and the fixed member 3-130 has a first side 3-130S1 corresponding to the first side wall 3-102S1. The fixed member 3-130 further has a blocking portion 3-1304, which extends from the first side 3-130S1 and is bent toward the top wall 3-102T. As shown in FIG. 35, when viewed along the first direction 3-D1 (the X-axis), the blocking portion 3-1304 is located at the center of the first side 3-130S1, but it is not limited thereto.

When viewed along the main axis 3-AX, the first inner surface 3-IS1 does not overlap the blocking portion 3-1304. When viewed along the main axis 3-AX, the second inner surface 3-IS2 overlaps the blocking portion 3-1304. When viewed along the first direction 3-D1, the first extending portion 3-102ET1 overlaps at least a part of the blocking portion 3-1304.

Based on the design of the blocking portion 3-1304, the problem of damage caused by hitting the casing 3-102 when the driving element 3-133 is deformed can be further avoided.

Figure 37:
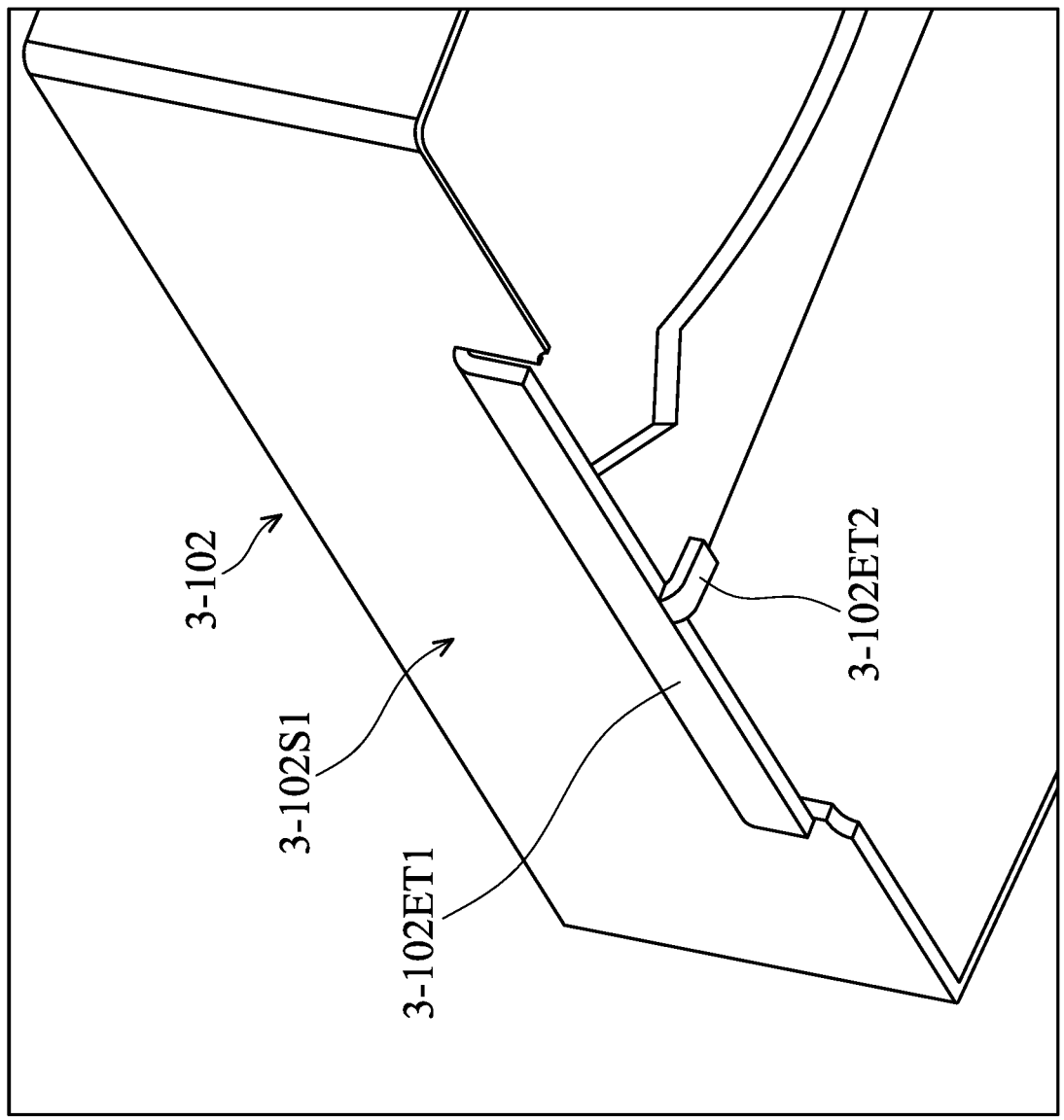
FIG. 37 is a perspective view of the casing 3-102 in another view according to another embodiment of the present disclosure.
Figure 38:
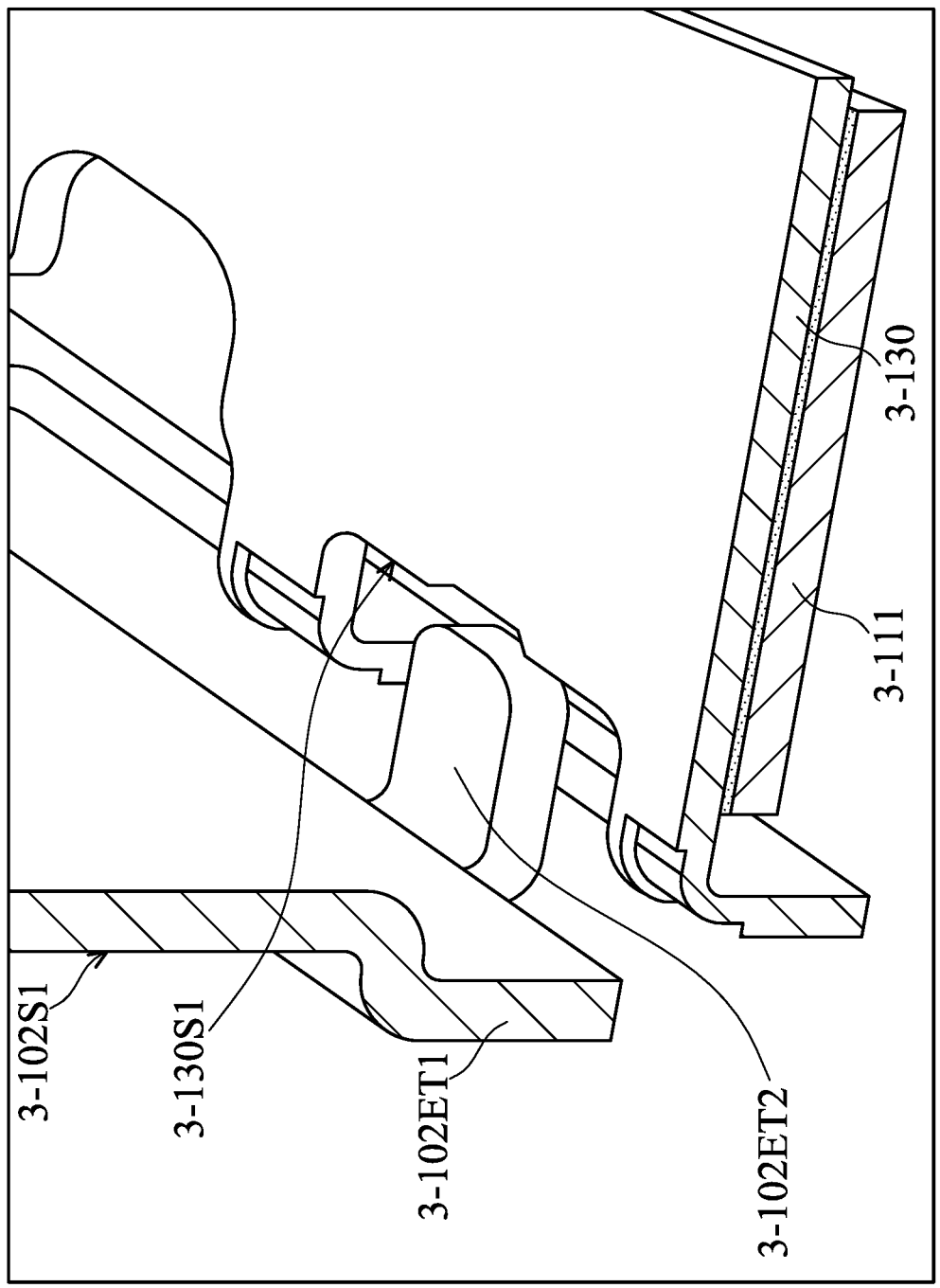
FIG. 38 is a three-dimensional cross-sectional view of the casing 3-102, the fixed member 3-130 and the substrate 3-111 according to another embodiment of the present disclosure.
Figure 39:
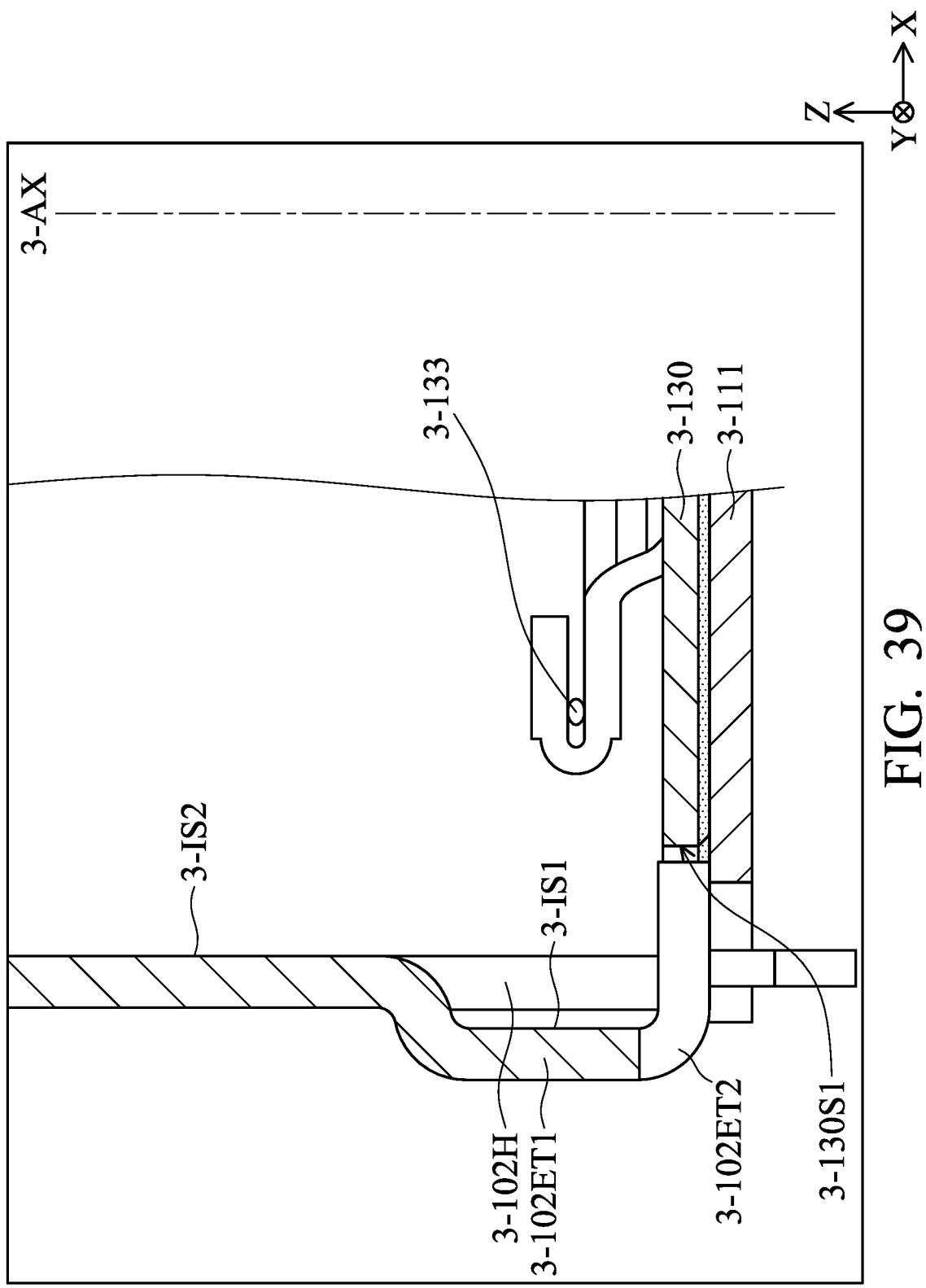
FIG. 39 is a cross-sectional view of the casing 3-102, the fixed member 3-130, and the substrate 3-111 viewed along the Y-axis according to another embodiment of the present disclosure.

Please refer to FIG. 37 to FIG. 39. FIG. 37 is a perspective view of the casing 3-102 in another view according to another embodiment of the present disclosure, FIG. 38 is a three-dimensional cross-sectional view of the casing 3-102, the fixed member 3-130 and the substrate 3-111 according to another embodiment of the present disclosure, and FIG. 39 is a cross-sectional view of the casing 3-102, the fixed member 3-130, and the substrate 3-111 viewed along the Y-axis according to another embodiment of the present disclosure.

As shown in FIG. 37 to FIG. 39, in this embodiment, a second extending portion 3-102ET2 is formed on the first extending portion 3-102ET1, and the second extending portion 3-102ET2 extends toward the first side 3-130S1. The first extending portion 3-102ET1 may have a plate-shaped structure, and the second extending portion 3-102ET2 may have a strip-shaped structure, but they are not limited thereto. In this embodiment, the second extending portion 3-102ET2 is formed at the center of the first extending portion 3-102ET1.

When viewed along the main axis 3-AX, the first inner surface 3-IS1 overlaps the second extending portion 3-102ET2, and when viewed along the main axis 3-AX, the second inner surface 3-IS2 overlaps the second extending portion 3-102ET2. That is, the projections of the first inner surface 3-IS1 and the second inner surface 3-IS2 overlap the second extending portion 3-102ET2

Furthermore, when viewed along the second direction 3-D2 (such as the Y-axis), the second extending portion 3-102ET2 overlaps a part of the fixed member 3-130. Based on the above structural design, not only can the problem of exceeding the opening 3-102H when the driving element 3-133 is deformed can be further avoided, but also the optical element driving mechanism 3-100 can be miniaturized.

Figure 40:
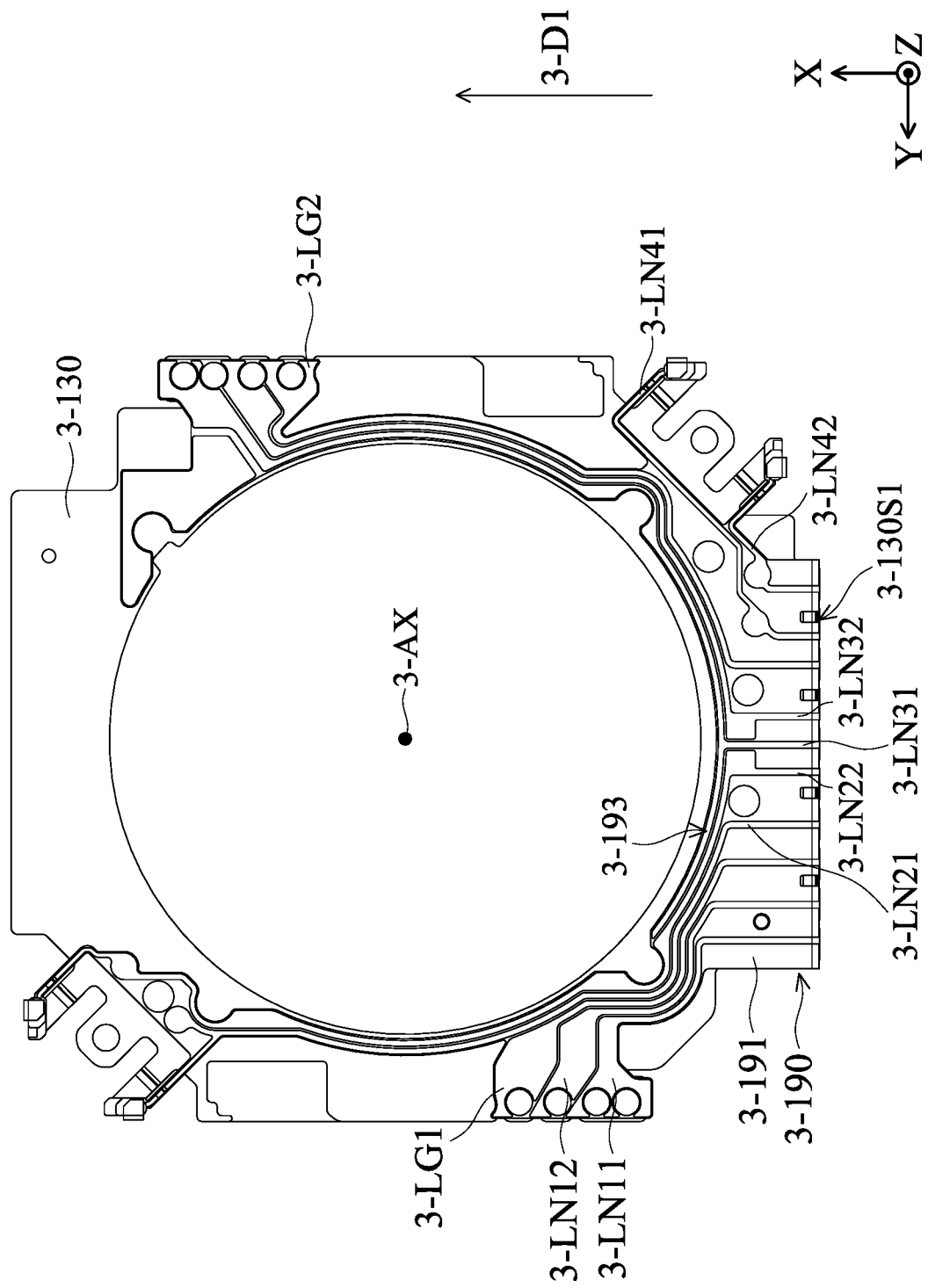
FIG. 40 is a top view of the circuit assembly 3-190 and the fixed member 3-130 according to an embodiment of the present disclosure.
Figure 41:
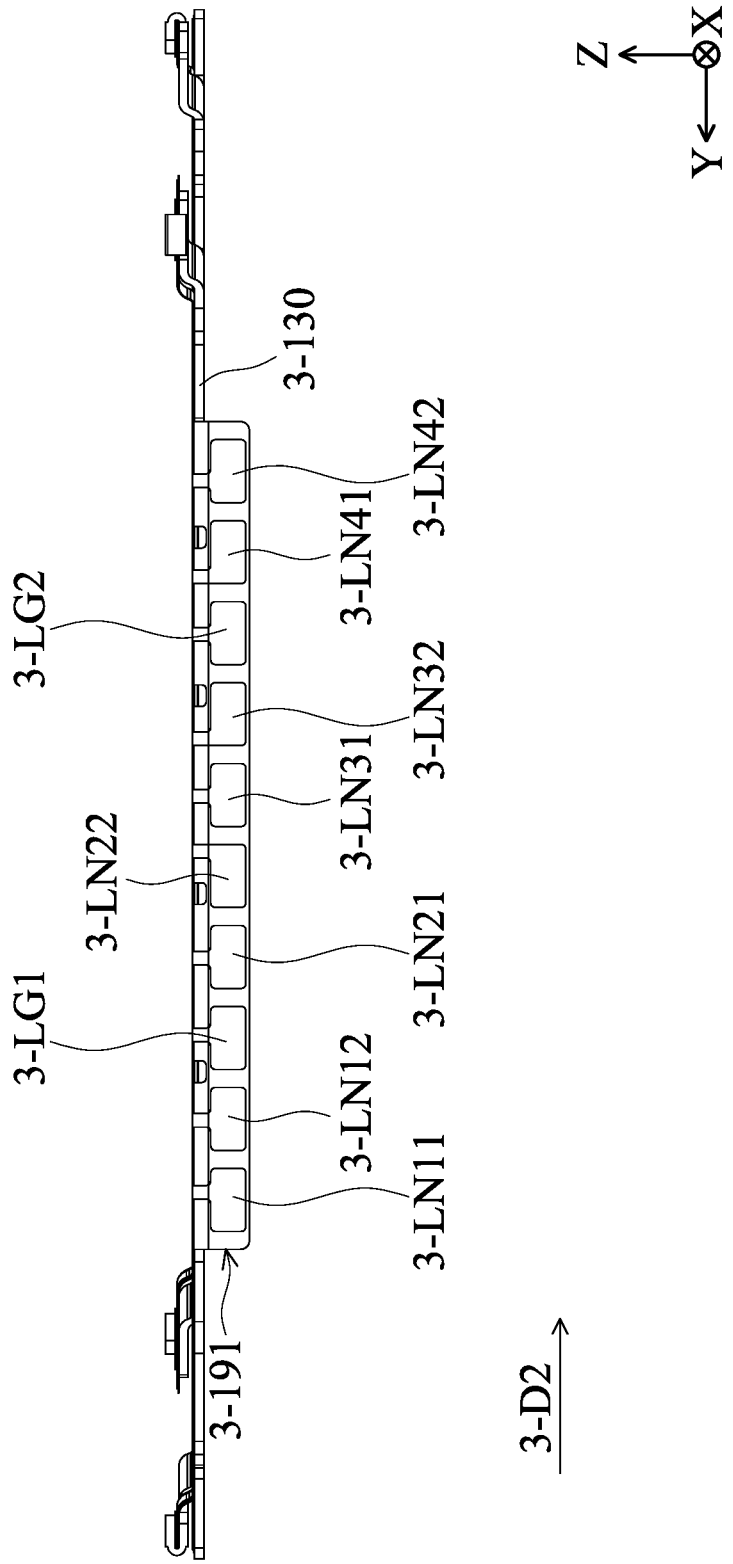
FIG. 41 is a front view of the circuit assembly 3-190 and the fixed member 3-130 according to an embodiment of the present disclosure.

Please refer to FIG. 40 and FIG. 41. FIG. 40 is a top view of the circuit assembly 3-190 and the fixed member 3-130 according to an embodiment of the present disclosure, and FIG. 41 is a front view of the circuit assembly 3-190 and the fixed member 3-130 according to an embodiment of the present disclosure.

The circuit assembly 3-190 may include a circuit substrate 3-191, a first pair of metal lines, a second pair of metal lines, a third pair of metal lines, and a fourth pair of metal lines. The first pair of metal lines includes a metal line 3-LN11 and a metal line 3-LN12, the second pair of metal lines includes a metal line 3-LN21 and a metal line 3-LN22, the third pair of metal lines includes a metal line 3-LN31 and a metal line 3-LN32, and the fourth pair of metal lines includes a metal line 3-LN41 and a metal line 3-LN42.

The circuit substrate 3-191 is disposed on the fixed member 3-130 and has an insulating material. For example, an insulating layer can be disposed on the circuit substrate 3-191, and the first pair of metal lines to the fourth pair of metal lines are disposed on the insulating layer of the circuit substrate 3-191.

As shown in FIG. 41, when viewed along the first direction 3-D1, the first pair of metal lines to the fourth pair of metal lines are sequentially arranged along the second direction 3-D2. In this embodiment, the second pair of metal lines and the fourth pair of metal lines are used to transmit different high frequency signals, and the first pair of metal lines and the third pair of metal lines are used to transmit different non-high frequency signals. That is, the metal lines used to transmit high-frequency signals and the metal lines used to transmit non-high-frequency signals are arranged in a staggered manner.

Furthermore, the circuit assembly 3-190 further includes a ground line 3-LG1 and a ground line 3-LG2, and the ground line 3-LG2 is disposed between the second pair of metal lines and the fourth pair of metal lines. Based on the design of the ground line 3-LG2 separating the second pair of metal lines from the fourth pair of metal lines, the problem of mutual interference of high-frequency signals can be avoided.

As shown in FIG. 40, when viewed along the main axis 3-AX, each of these metal lines is a complete continuous line. Specifically, no via is disposed between two electrical connection terminals of each metal line.

In addition, as shown in FIG. 40, when viewed along the main axis 3-AX, one of the third pair of metal lines (the metal line 3-LN31) is perpendicular to the first side 3-130S1 of the fixed member 3-130, and a strengthening part 3-193 is further disposed on the circuit substrate 3-191. The strengthening part 3-193 is electrically connected to the metal line 3-LN31 of the third pair of metal lines, and the strengthening part 3-193 is electrically independent of the other metal lines except the metal line 3-LN31.

Because the circuit substrate 3-191 is a flexible substrate, the strengthening part 3-193 can increase the overall structural strength of the circuit assembly 3-190. The installation position and number of strengthening part 3-193 are not limited to this embodiment.

The present disclosure provides an optical element driving mechanism 3-100, and the casing 3-102 can have an opening 3-102H so that a part of the circuit assembly 3-190 can be exposed through the opening 3-102H. Therefore, the optical element driving mechanism 3-100 can be quickly and easily installed on an external electronic device. The first extending portion 3-102ET1 can be formed on the casing 3-102, and the first adhesive element 3-AE1 can be connected to the first extending portion 3-102ET1 and the circuit assembly 3-190 of the second driving assembly 3-DA2 to avoid dust from entering the optical element driving mechanism 3-100 through the opening 3-102H.

Furthermore, a ground line can be formed on the circuit assembly 3-190 of the present disclosure, and the ground line is disposed between the high-frequency signal line and the non-high-frequency signal line, so that the problem of mutual interference of high-frequency signals can be avoided.

Figure 42:
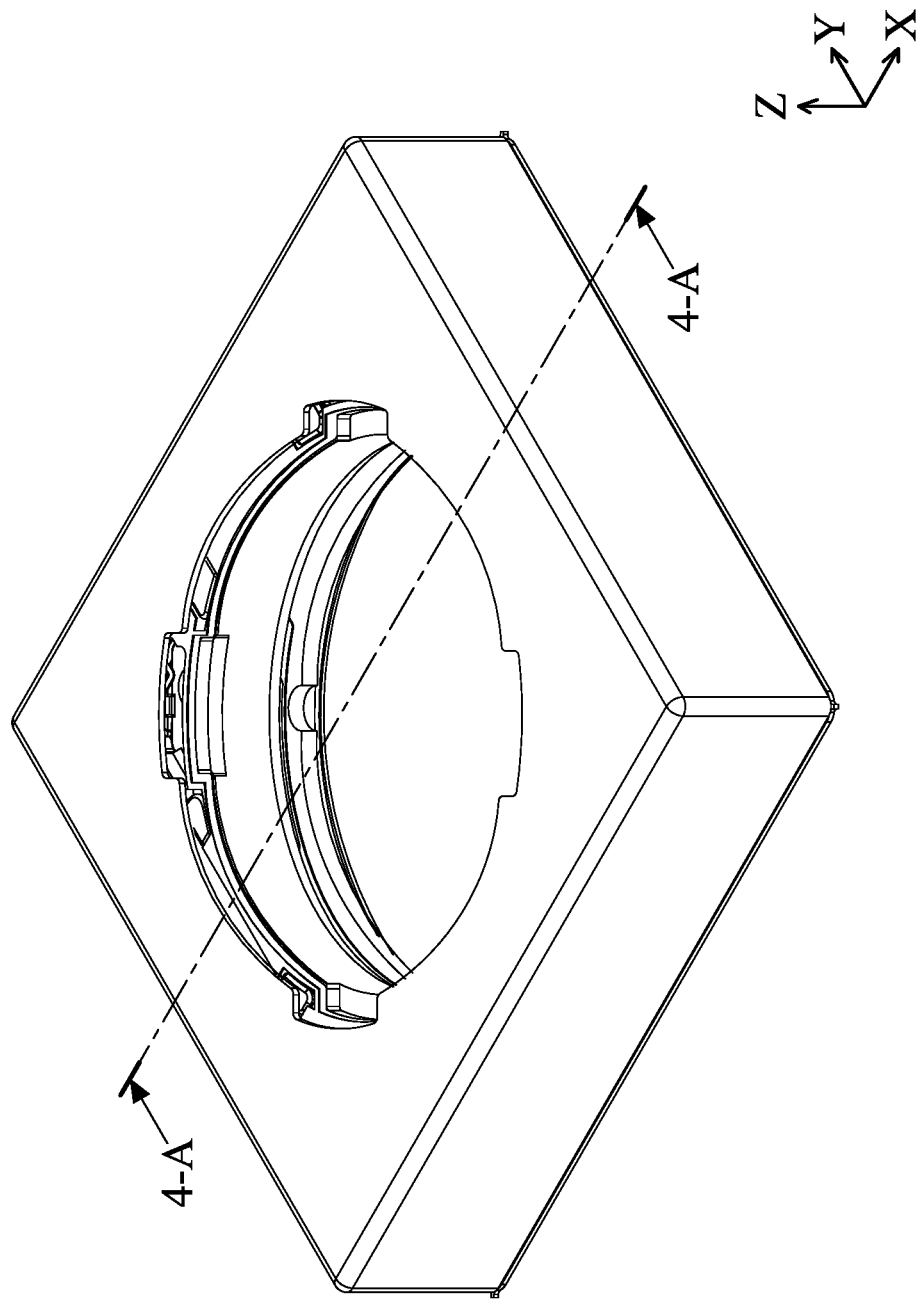
FIG. 42 is a schematic diagram of an optical element driving mechanism 4-100 according to an embodiment of the present disclosure.
Figure 43:
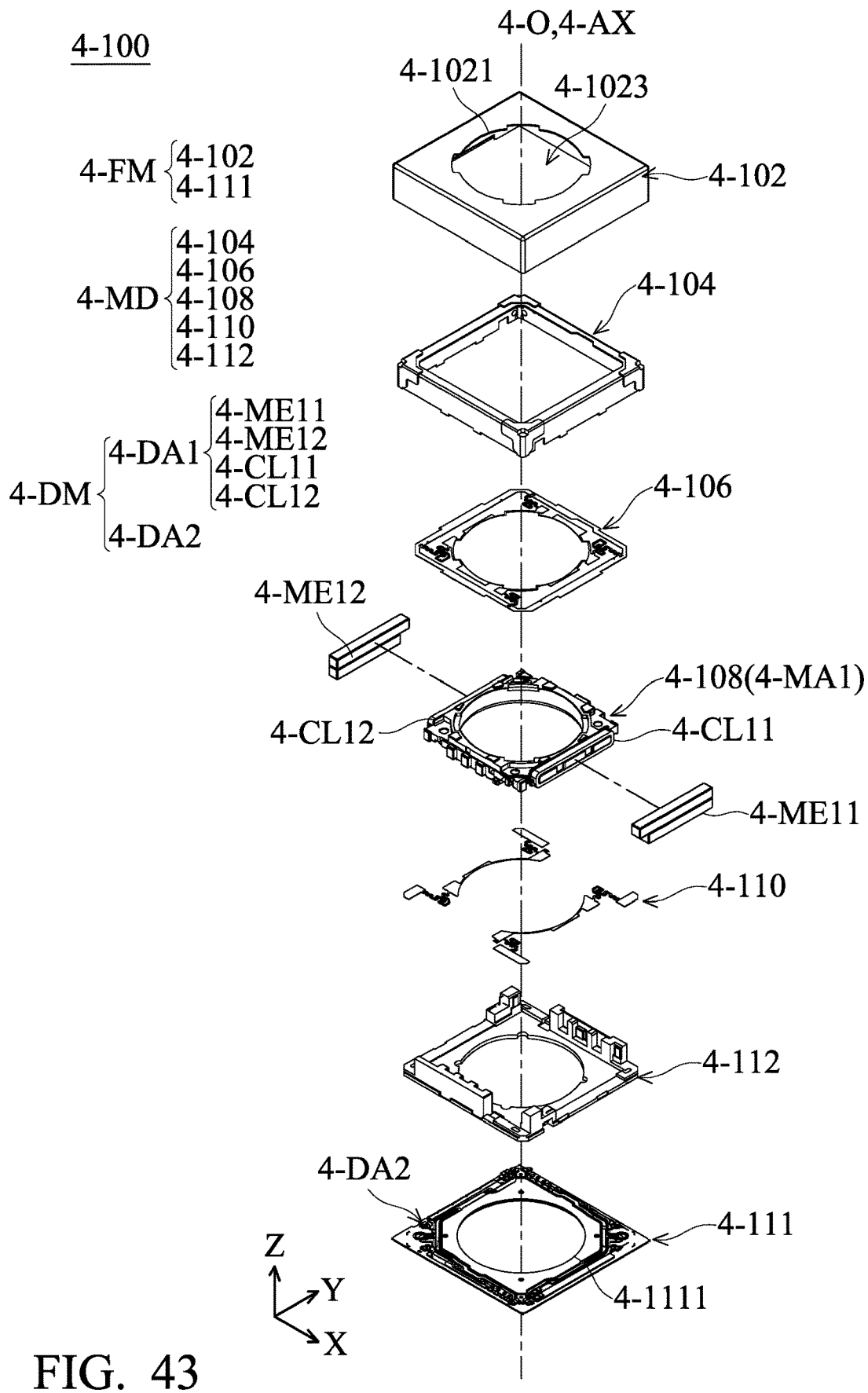
FIG. 43 is an exploded diagram of the optical element driving mechanism 4-100 according to an embodiment of the present disclosure.
Figure 44:
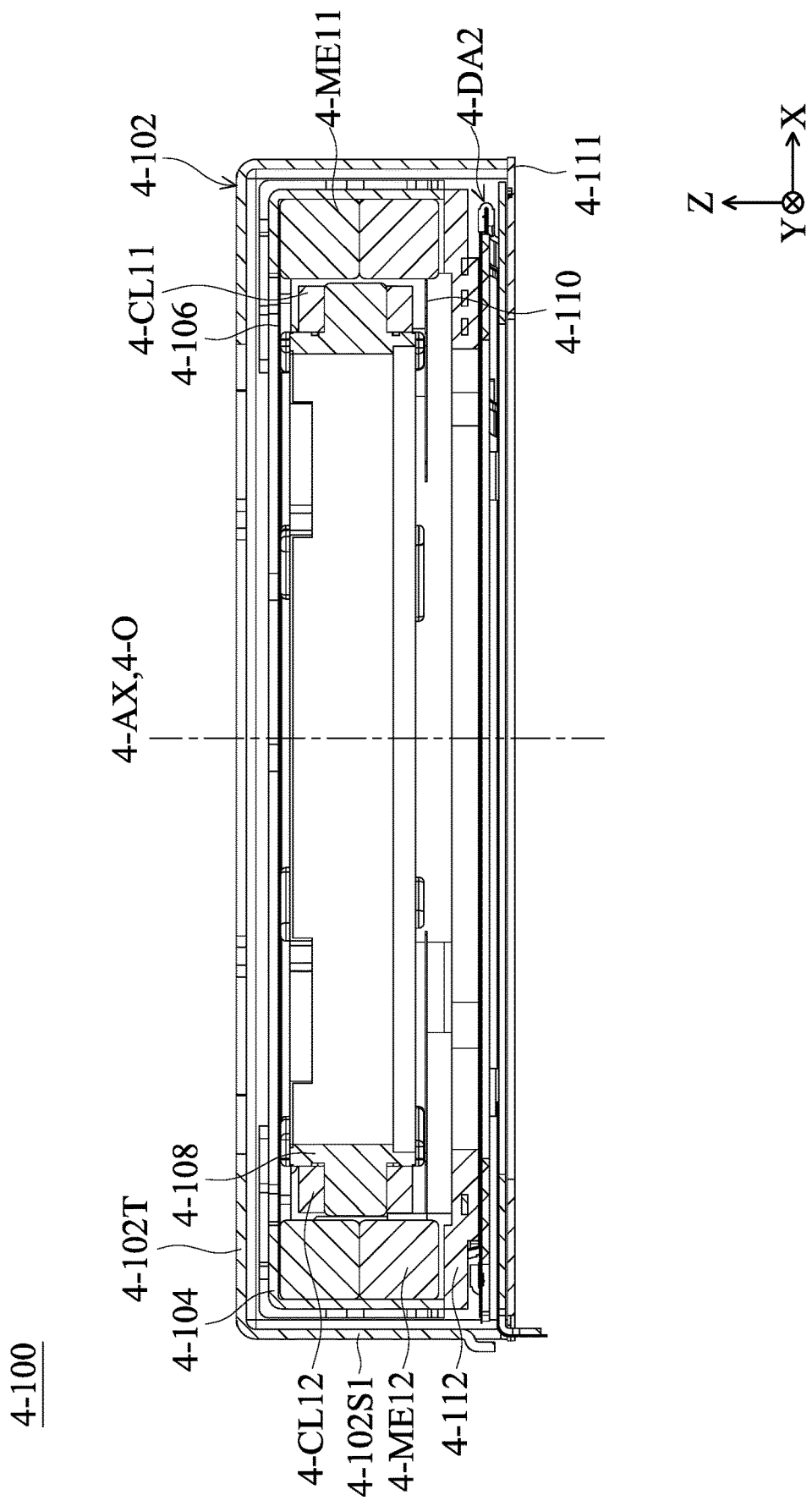
FIG. 44 is a cross-sectional view of the optical element driving mechanism 4-100 along line 4-A-4-A in FIG. 42 according to an embodiment of the present disclosure.

Please refer to FIG. 42 to FIG. 44. FIG. 42 is a schematic diagram of an optical element driving mechanism 4-100 according to an embodiment of the present disclosure, FIG. 43 is an exploded diagram of the optical element driving mechanism 4-100 according to an embodiment of the present disclosure, and FIG. 44 is a cross-sectional view of the optical element driving mechanism 4-100 along line 4-A-4-A in FIG. 42 according to an embodiment of the present disclosure. The optical element driving mechanism 4-100 can be an optical camera system and can be configured to hold and drive an optical element. The optical element driving mechanism 4-100 can be installed in various electronic devices or portable electronic devices, such as a smartphone, for allowing a user to perform the image capturing function. In this embodiment, the optical element driving mechanism 4-100 can be a voice coil motor (VCM) with an auto-focusing (AF) function, but it is not limited thereto. In other embodiments, the optical element driving mechanism 4-100 can also perform the functions of auto-focusing and optical image stabilization (OIS).

As shown in FIG. 43, in the present embodiment, the optical element driving mechanism 4-100 can include a fixed module 4-FM, a movable module 4-MD, and a driving module 4-DM. The movable module 4-MD is movably connected to the fixed module 4-FM, and the movable module 4-MD is configured to hold an optical element (not shown in the figures). The driving module 4-DM is configured to drive the movable module 4-MD to move relative to the fixed module 4-FM.

In this embodiment, as shown in FIG. 43, the fixed module 4-FM includes a casing 4-102 and a substrate 4-112. The movable module 4-MD includes a lens holder 4-108 and the aforementioned optical element, and the lens holder 4-108 is used for holding the optical element. The lens holder 4-108 and the optical element can be referred to a first movable assembly 4-MA1

As shown in FIG. 43, the casing 4-102 has a hollow structure, and a casing opening 4-1021 is formed thereon, and a substrate opening 4-1121 is formed on the substrate 4-111. The center of the casing opening 4-1021 corresponds to the optical axis 4-O of the optical element, and the substrate opening 4-1121 corresponds to a photosensitive element (not shown) disposed under the substrate 4-111. The external light can enter the casing 4-102 from the casing opening 4-1021 to be received by the photosensitive element after passing through the optical element and the substrate opening 4-1121 so as to generate a digital image signal.

Furthermore, the casing 4-102 is disposed on the substrate 4-111 and may have an accommodating space 4-1023 for accommodating the movable module 4-MD (including the aforementioned optical element and the lens holder 4-108) and the driving module 4-DM.

The movable module 4-MD can more include a frame 4-104 and a base 4-112, arranged along a main axis 4-AX. The main axis 4-AX can be parallel to or overlap the optical axis 4-O. The frame 4-104 is fixed to the base 4-112, and the base 4-112 is movably connected to the substrate 4-111 by a second driving assembly 4-DA2.

The movable module 4-MD may further include a first elastic member 4-106 and a second elastic member 4-110. The outer portion (the outer ring portion) of the first elastic member 4-106 is fixed to the inner wall surface of the casing 4-102, the outer portion (the outer ring portion) of the second elastic member 4-110 is fixed to the base 4-112, and the inner portions (the inner ring portions) of the first elastic member 4-106 and the second elastic member 4-110 are respectively connected to the upper and lower sides of the lens holder 4-108, so that the lens holder 4-108 can be suspended in the accommodating space 4-1023.

In this embodiment, the driving module 4-DM may include a first driving assembly 4-DA1 and a second driving assembly 4-DA2. The first driving assembly 4-DA1 may include a first magnetic element 4-ME11 (the first driving magnet), a second magnetic element 4-ME12 (the second driving magnet), a first driving coil 4-CL11, and a second driving coil 4-CL12. The first magnetic element 4-ME11 and the second magnetic element 4-ME12 are disposed on the frame 4-104 and respectively corresponds to the first driving coil 4-CL11 and the second driving coil 4-CL12.

In this embodiment, the first driving coil 4-CL11 and the second driving coil 4-CL12 may be wound coils and be disposed on opposite sides of the lens holder 4-108. When the first driving coil 4-CL11 and the second driving coil 4-CL12 are provided with electricity, the first driving coil 4-CL11 and the second driving coil 4-CL12 respectively act with the first magnetic element 4-ME11 and the second magnetic element 4-ME12 to generate an electromagnetic force, so as to drive the lens holder 4-108 and the held optical element to move relative to the base 4-112 along the optical axis 4-O (the Z-axis).

In addition, the second driving assembly 4-DA2 is connected between the base 4-112 and the substrate 4-111, and the second driving assembly 4-DA2 may drive the movable module 4-MD to moves relative to the substrate 4-111 along the XY plane so as to achieve the efficacy of optical image stabilization.

Figure 45:
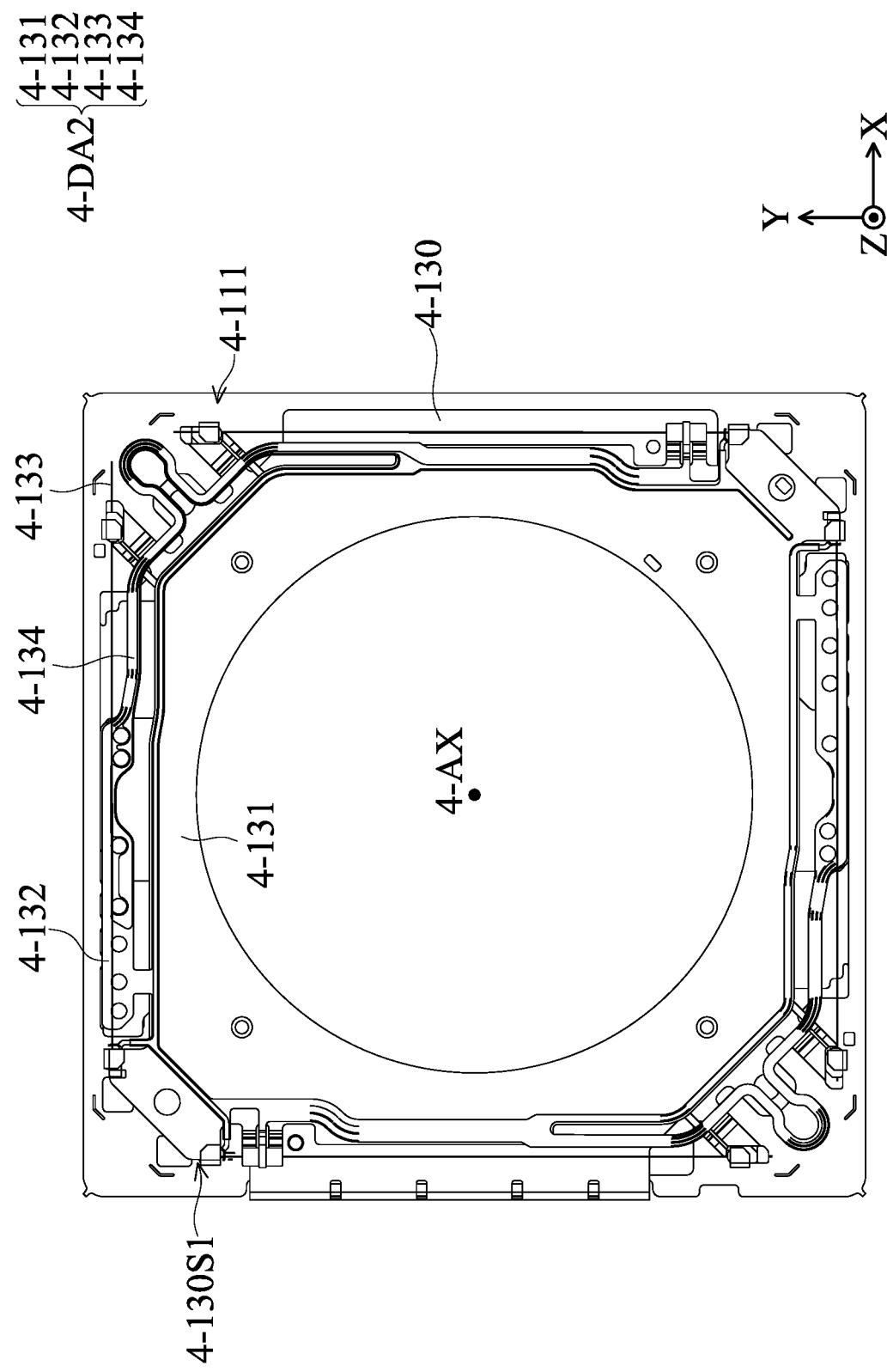
FIG. 45 is a top view of the second driving assembly 4-DA2 and the substrate 4-111 according to an embodiment of the present disclosure.
Figure 46:
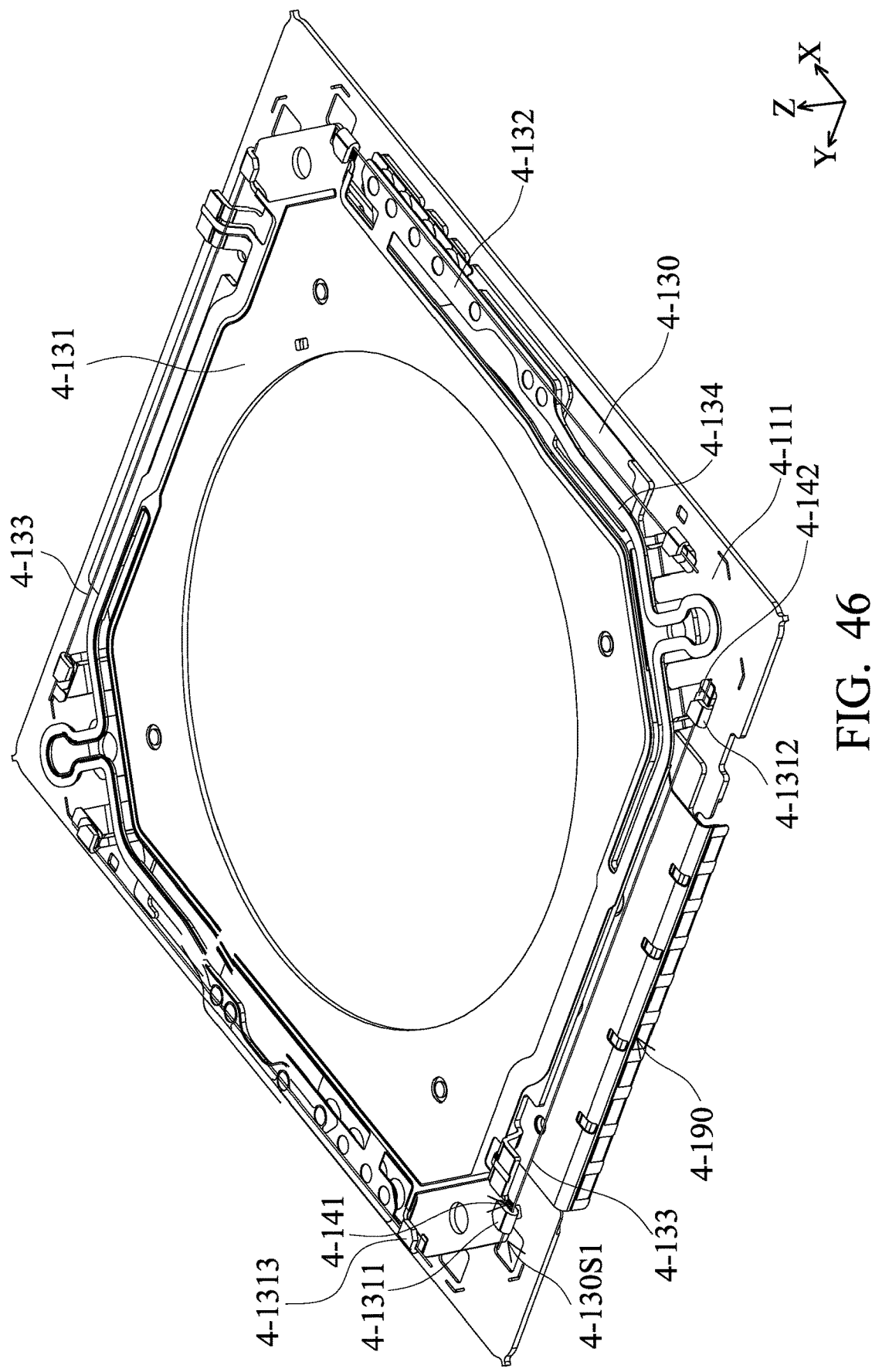
FIG. 46 is a schematic diagram of the second driving assembly 4-DA2 and the substrate 4-111 according to an embodiment of the present disclosure.

Please refer to FIG. 45 and FIG. 46. FIG. 45 is a top view of the second driving assembly 4-DA2 and the substrate 4-111 according to an embodiment of the present disclosure, and FIG. 46 is a schematic diagram of the second driving assembly 4-DA2 and the substrate 4-111 according to an embodiment of the present disclosure. In this embodiment, as shown in FIG. 45, the second driving assembly 4-DA2 can include a fixed member 4-130, a first connecting member 4-131, at least one second connecting member 4-132, at least one driving element 4-133, at least one elastic portion 4-134 and a circuit assembly 4-190. The fixed member 4-130 is fixedly connected to the substrate 4-111. The first connecting member 4-131 is fixedly connected to the base 4-112 of the movable module 4-MD, the second connecting member 4-132 is fixedly connected to the fixed member 4-130, and the elastic portion 4-134 is connected between the first connecting member 4-131 and the second connecting member 4-132, so that the second connecting member 4-132 is movably connected to the first connecting member 4-131 through the elastic portion 4-134.

The driving element 4-133 is connected between the first connecting member 4-131 and the fixed member 4-130, and the driving element 4-133 may be made of shape memory alloys (SMA). Shape memory alloy (SMA) is an alloy that can eliminate the deformation in lower temperature by heating. When the shape memory alloy performs plastic deformation under its phase transition temperature, it may return to its original shape by heating. By controlling the temperature of the driving element 4-133, the movable module 4-MD can be moved relative to the substrate 4-111.

The circuit assembly 4-190 may be a flexible circuit board disposed between the first connecting member 4-131 and the fixed member 4-130, and the circuit assembly 4-190 is configured to be electrically connected to an external circuit, such as a main circuit board of a smart phone. In addition, it is worth noting that the first connecting member 4-131, the second connecting member 4-132, and the elastic portion 4-134 can be integrally formed, and the first connecting member 4-131 is movably connected to the fixed member 4-130 by the elastic portion 4-134 and the second connecting member 4-132.

Figure 47:
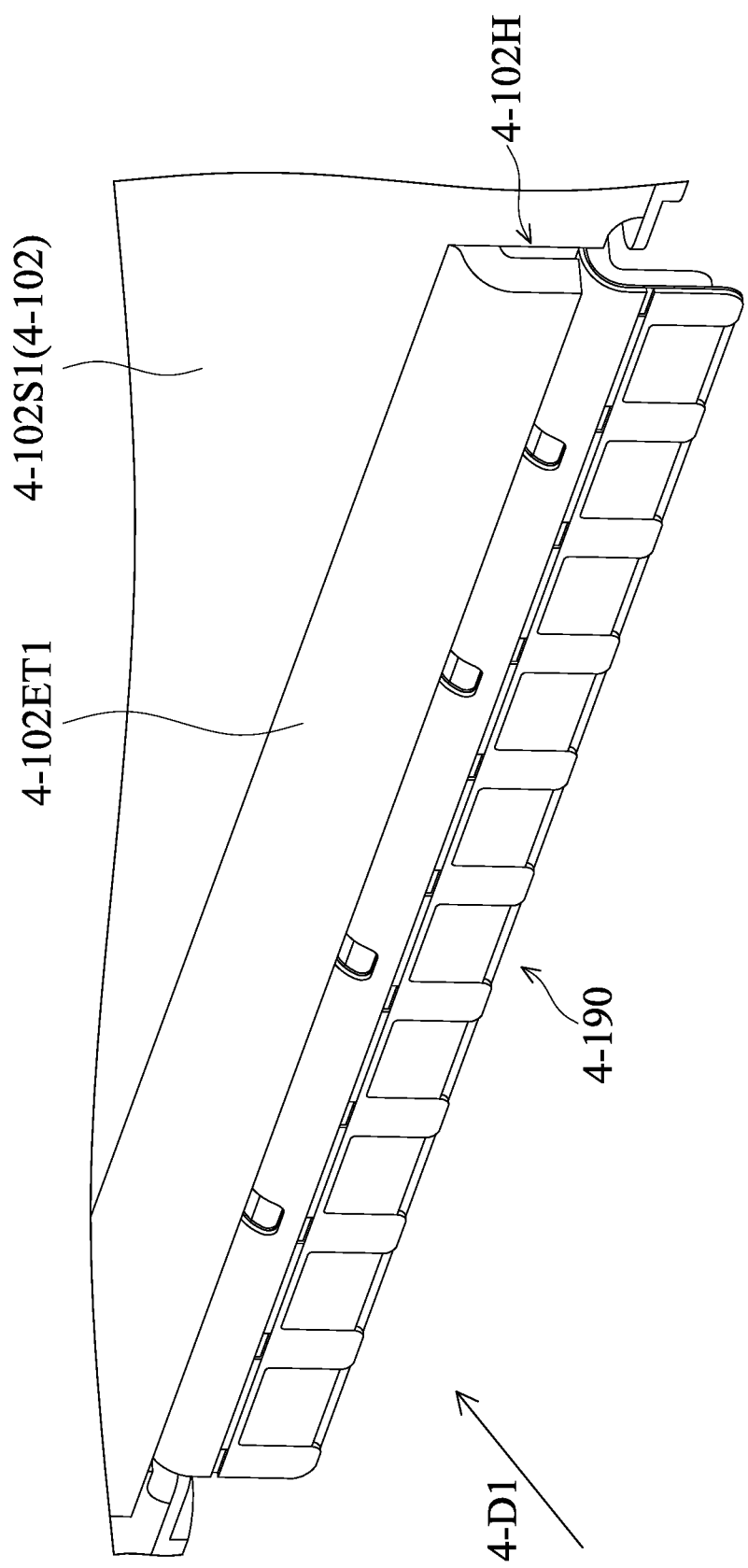
FIG. 47 is a schematic diagram of a partial structure of the optical element driving mechanism 4-100 according to an embodiment of the present disclosure.
Figure 48:
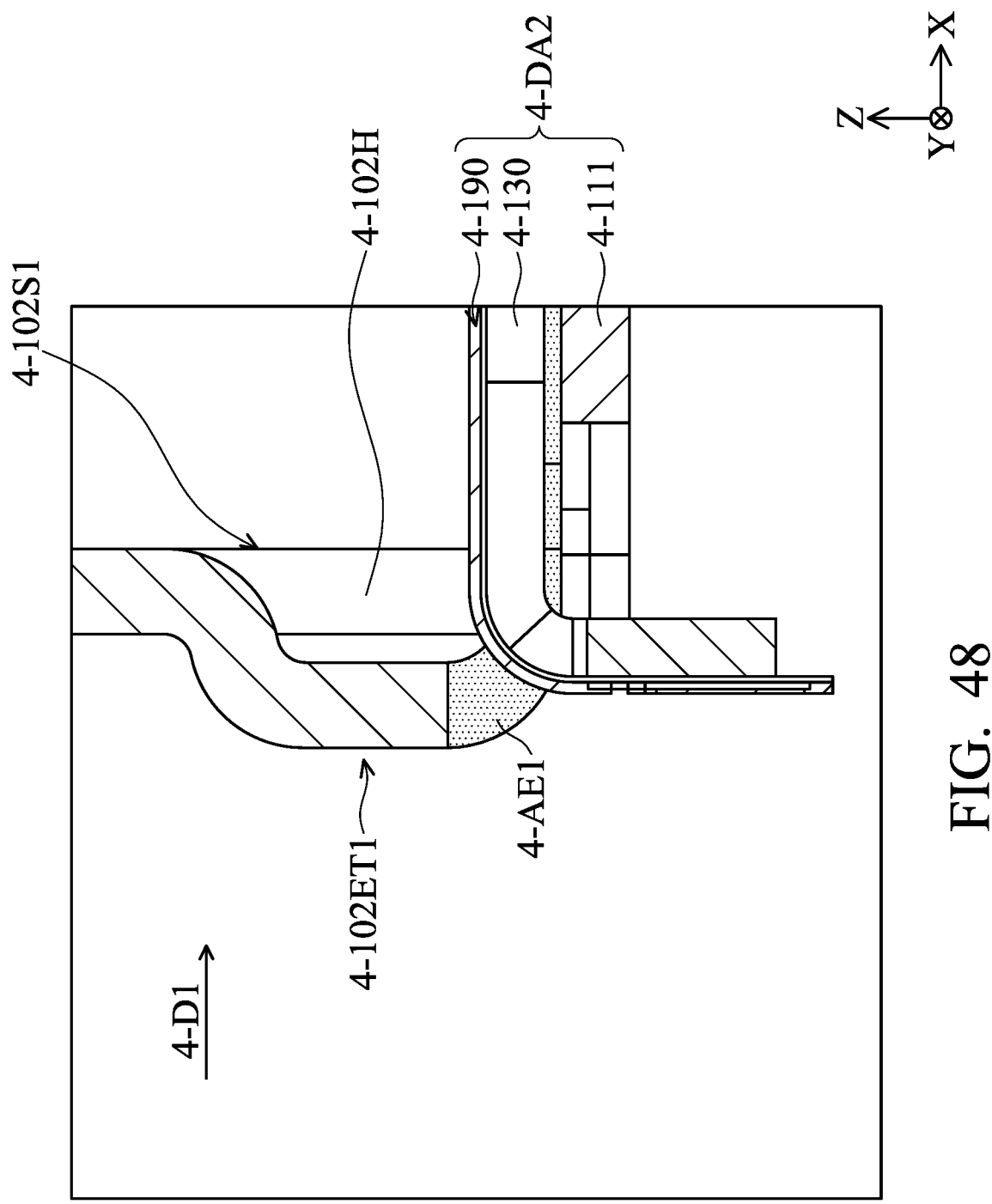
FIG. 48 is an enlarged diagram of FIG. 44 according to an embodiment of the present disclosure.

Please refer to FIG. 47 and FIG. 48. FIG. 47 is a schematic diagram of a partial structure of the optical element driving mechanism 4-100 according to an embodiment of the present disclosure, and FIG. 48 is an enlarged diagram of FIG. 44 according to an embodiment of the present disclosure. In this embodiment, as shown in FIG. 47, an opening 4-102H is formed on the casing 4-102 of the fixed module 4-FM, and a part (the circuit assembly 4-190) of the driving module 4-DM is exposed from the opening 4-102H.

As shown in FIG. 44 and FIG. 48, the casing 4-102 has a top wall 4-102T and a first side wall 4-102S1. The first side wall 4-102S1 is extended along the main axis 4-AX from the top wall 4-102T, and the opening 4-102H is formed on the first side wall 4-102S1.

When viewed along the main axis 4-AX, the first side wall 4-102S1 overlaps a part of the second driving assembly 4-DA2. For example, the projection of the first side wall 4-102S1 along the main axis 4-AX overlaps the circuit assembly 4-190, and the circuit assembly 4-190 protrudes from the first side wall 4-102S1 through the opening 4-102H.

Furthermore, a first extending portion 4-102ET1 may be formed on the first side wall 4-102S1, and when viewed along the main axis 4-AX, the first extending portion 4-102ET1 can completely shield the second driving assembly 4-DA2. When viewed along the main axis 4-AX, at least a part of the first extending portion 4-102ET1 does not overlap the opening 4-102H. For example, the projection of a part of the first extending portion 4-102ET1 along the main axis 4-AX does not fall within the opening 4-102H.

When viewed along a first direction 4-D1 (the X-axis) perpendicular to the main axis 4-AX, the first extending portion 4-102ET1 overlaps at least a part of the opening 4-102H. As shown in FIG. 48, the optical element driving mechanism 4-100 may further include a first adhesive element 4-AE1 configured to be connected to the first extending portion 4-102ET1 and the circuit assembly 4-190 of the second driving assembly 4-DA2. In some embodiments, the first adhesive element 4-AE1 can completely close the gap between the first extending portion 4-102ET1 and the circuit assembly 4-190 to prevent dust from entering the optical element driving mechanism 4-100 through the opening 4-102H to affect the image effect of optical element driving mechanism 4-100.

Figure 49:
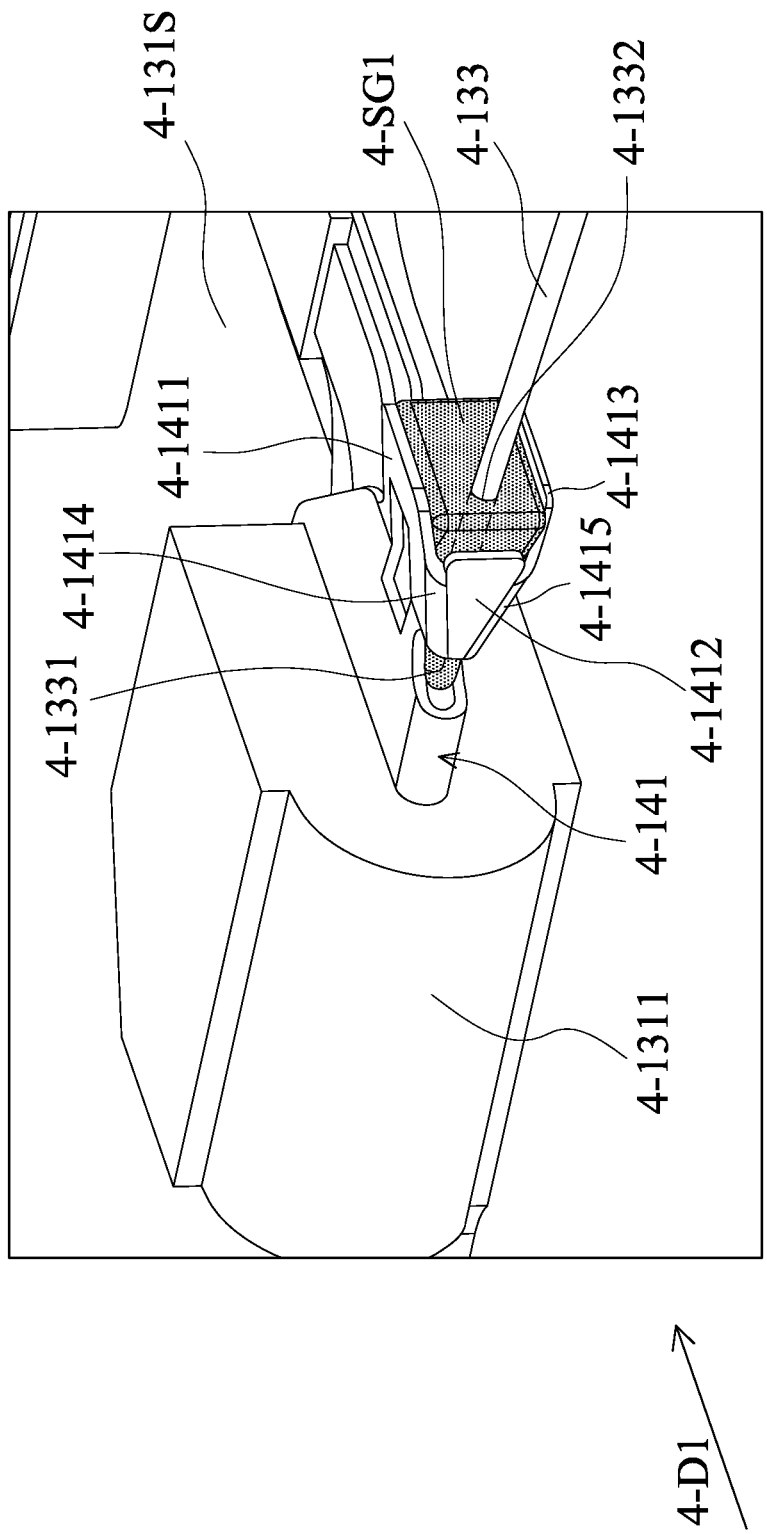
FIG. 49 is an enlarged diagram of a partial structure of the second driving assembly 4-DA2 according to an embodiment of the present disclosure.

Please refer to FIG. 46 and FIG. 49. FIG. 49 is an enlarged diagram of a partial structure of the second driving assembly 4-DA2 according to an embodiment of the present disclosure. In this embodiment, the second driving assembly 4-DA2 may further include a first bending member 4-141, a second bending member 4-142, a first clamping member 4-1311, and a second clamping member 4-1312. The first bending member 4-141 can be electrically connected to the elastic portion 4-134, and the second bending member 4-142 can be electrically connected to the circuit assembly 4-190.

The first clamping member 4-1311 is disposed on the first connecting member 4-131 and configured to clamp a first end of the driving element 4-133 through the first bending member 4-141. In this embodiment, the first clamping member 4-1311 and the first connecting member 4-131 are integrally formed. The second clamping member 4-1312 is disposed on the fixed member 4-130 and configured to clamp a second end of the driving element 4-133 through the second bending member 4-142.

In this embodiment, the second clamping member 4-1312 and the fixed member 4-130 are integrally formed. In addition, in this embodiment, the first bending member 4-141 and the elastic portion 4-134 may be integrally formed, but it is not limited thereto.

As shown in FIG. 49, the first bending member 4-141 may include a first bending portion 4-1411, a second bending portion 4-1412, and a third bending portion 4-1413, and the optical element driving mechanism 4-100 may further include a first stabilizing element 4-SG1 disposed between the first bending portion 4-1411, the second bending portion 4-1412, and the third bending portion 4-1413.

The first stabilizing element 4-SG1 is configured to be connected to the first end of the driving element 4-133 and the first bending member 4-141. In this embodiment, the first stabilizing element 4-SG1 may be a gel, which is configured to reduce the degree of shaking of the driving element 4-133 during deformation.

As shown in FIG. 49, the driving element 4-133 and the first stabilizing element 4-SG1 form a first junction 4-1331 and a second junction 4-1332. A distance between the first junction 4-1331 and the first bending member 4-141 along the main axis 4-AX (the Z-axis) is less than a distance between the second junction 4-1332 and the first bending member 4-141 along the main axis 4-AX. Furthermore, when viewed along a direction perpendicular to the main axis 4-AX (for example, along the first direction 4-D1), the first bending portion 4-1411, the second bending portion 4-1412, and the third bending portion 4-1413 forms a tapered structure.

In this embodiment, the first bending portion 4-1411 is not parallel to the second bending portion 4-1412, the second bending portion 4-1412 is not parallel to the third bending portion 4-1413, and the third bending portion 4-1413 is not parallel to the first bending portion 4-1411. When viewed along a direction (the first direction 4-D1) perpendicular to the main axis 4-AX, the first bending portion 4-1411 and the third bending portion 4-1413 form an acute angle.

Furthermore, the first bending member 4-141 may further include a first connecting portion 4-1414 and a second connecting portion 4-1415. The first bending portion 4-1411 is connected to the second bending portion 4-1412 via the first connecting portion 4-1414, and the second bending portion 4-1412 is connected to the third bending portion 4-1413 via the second connecting portion 4-1415.

A strengthening layer is disposed inside each of the first bending portion 4-1411, the second bending portion 4-1412, and the third bending portion 4-1413. The strengthening layer may be, for example, a metal layer, and no strengthening layer is disposed in the first connecting portion 4-1414 and the second connecting portion 4-1415. Therefore, the first connecting portion 4-1414 and the second connecting portion 4-1415 can be bent, so that the first bending portion 4-1411, the second bending portion 4-1412, and the third bending portion 4-1413 can form the aforementioned tapered structure.

Figure 50:
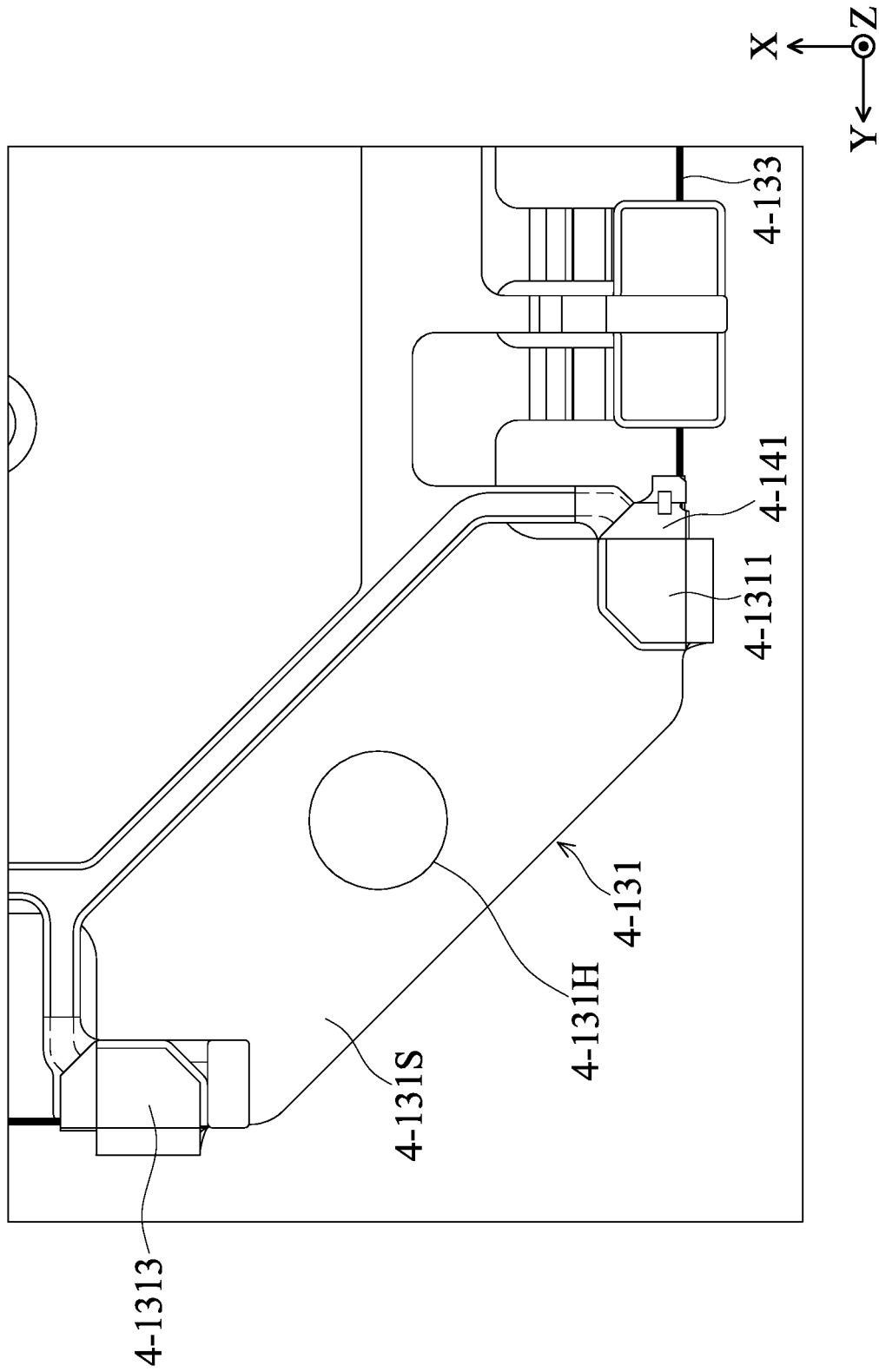
FIG. 50 is a top view of a partial structure of the second driving assembly 4-DA2 according to an embodiment of the present disclosure.

Please refer to FIG. 45, FIG. 49 and FIG. 50. FIG. 50 is a top view of a partial structure of the second driving assembly 4-DA2 according to an embodiment of the present disclosure. The second driving assembly 4-DA2 of the present disclosure may further include a third clamping member 4-1313 disposed on the first connecting member 4-131. When viewed along the main axis 4-AX, the first connecting member 4-131 has a polygonal structure (such as a rectangular structure), and the first clamping member 4-1311 and the third clamping member 4-1313 are located at a corner of the first connecting member 4-131.

A positioning hole 4-131H is formed on the first connecting member 4-131, and when viewed along the main axis 4-AX (the Z-axis), the positioning hole 4-131H is located between the first clamping member 4-1311 and the third clamping member 4-1313. In addition, the first connecting member 4-131 may have an upper surface 4-131S, the positioning hole 4-131H is formed on the upper surface 4-131S, and the first bending member 4-141 is in contact with the upper surface 4-131S.

Figure 51:
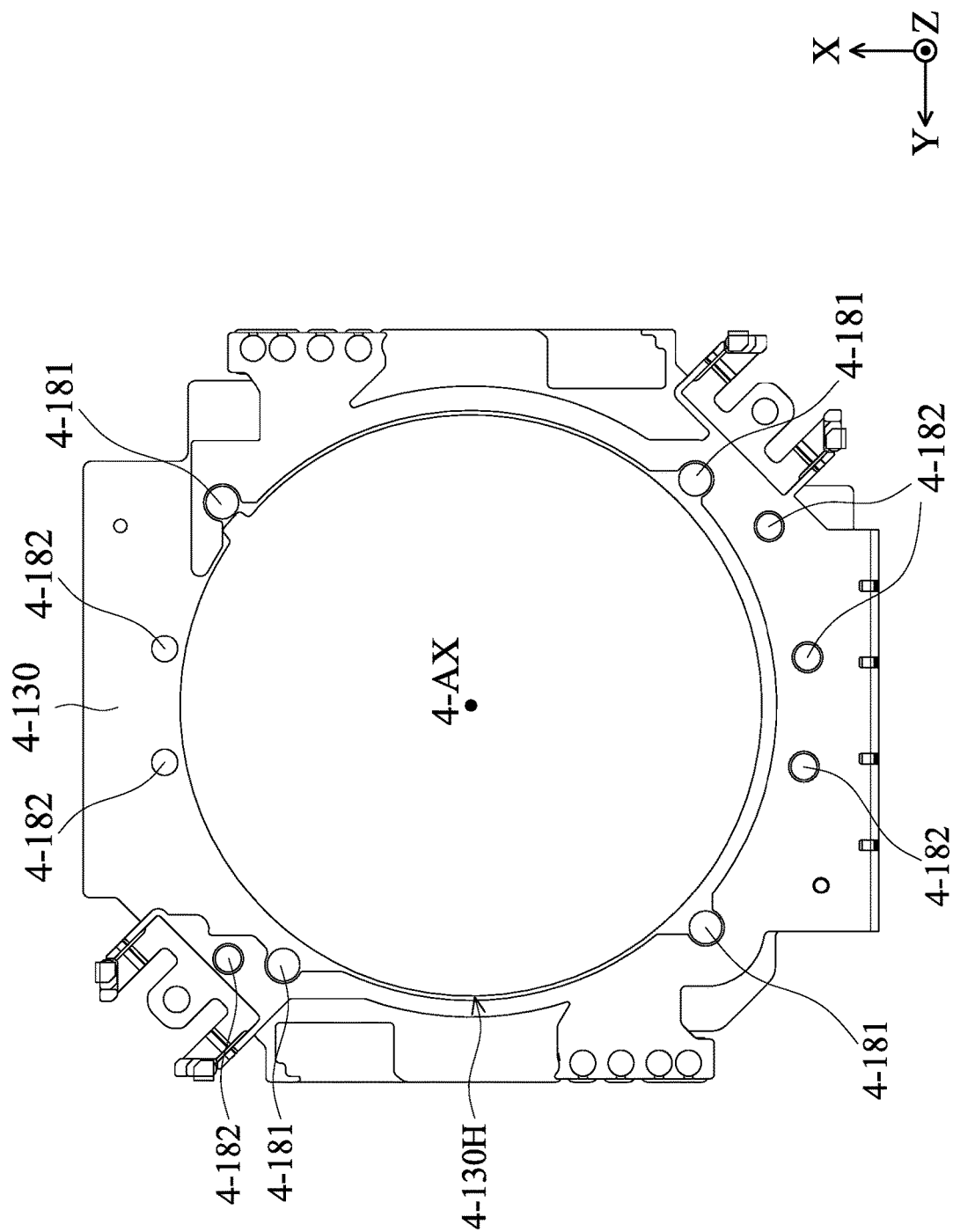
FIG. 51 is a top view of a partial structural of the second driving assembly 4-DA2 according to an embodiment of the present disclosure.
Figure 52:
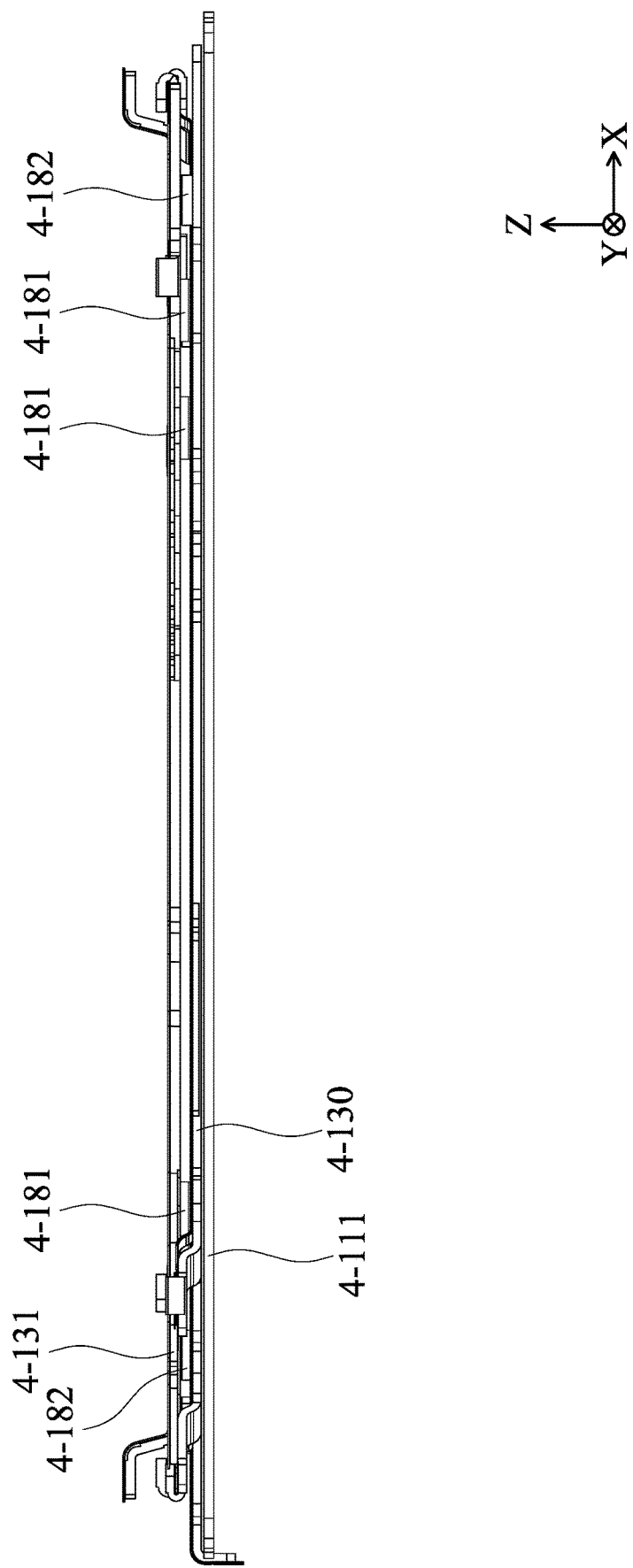
FIG. 52 is a front view of the second driving assembly 4-DA2 according to an embodiment of the present disclosure.

Please refer to FIG. 51 and FIG. 52 together. FIG. 51 is a top view of a partial structural of the second driving assembly 4-DA2 according to an embodiment of the present disclosure, and FIG. 52 is a front view of the second driving assembly 4-DA2 according to an embodiment of the present disclosure. As shown in FIG. 51, in this embodiment, the second driving assembly 4-DA2 may further include a plurality of first supporting elements 4-181 disposed between the first connecting member 4-131 and the fixed member 4-130.

The first supporting elements 4-181 are fixed on the fixed member 4-130. These first supporting elements 4-181 are configured to support the first connecting member 4-131 so that the first connecting member 4-131 can move relative to the fixed member 4-130. It should be noted that these first supporting elements 4-181 are not affixed to the first connecting member 4-131.

When viewed along the main axis 4-AX, the fixed member 4-130 may have a polygonal structure, such as a rectangular structure. As shown in FIG. 51, the four first supporting elements 4-181 can respectively correspond to the four corners of the fixed member 4-130. The fixed member 4-130 has a central opening 4-130H, and the first supporting elements 4-181 surround the central opening 4-130H.

Figure 53:
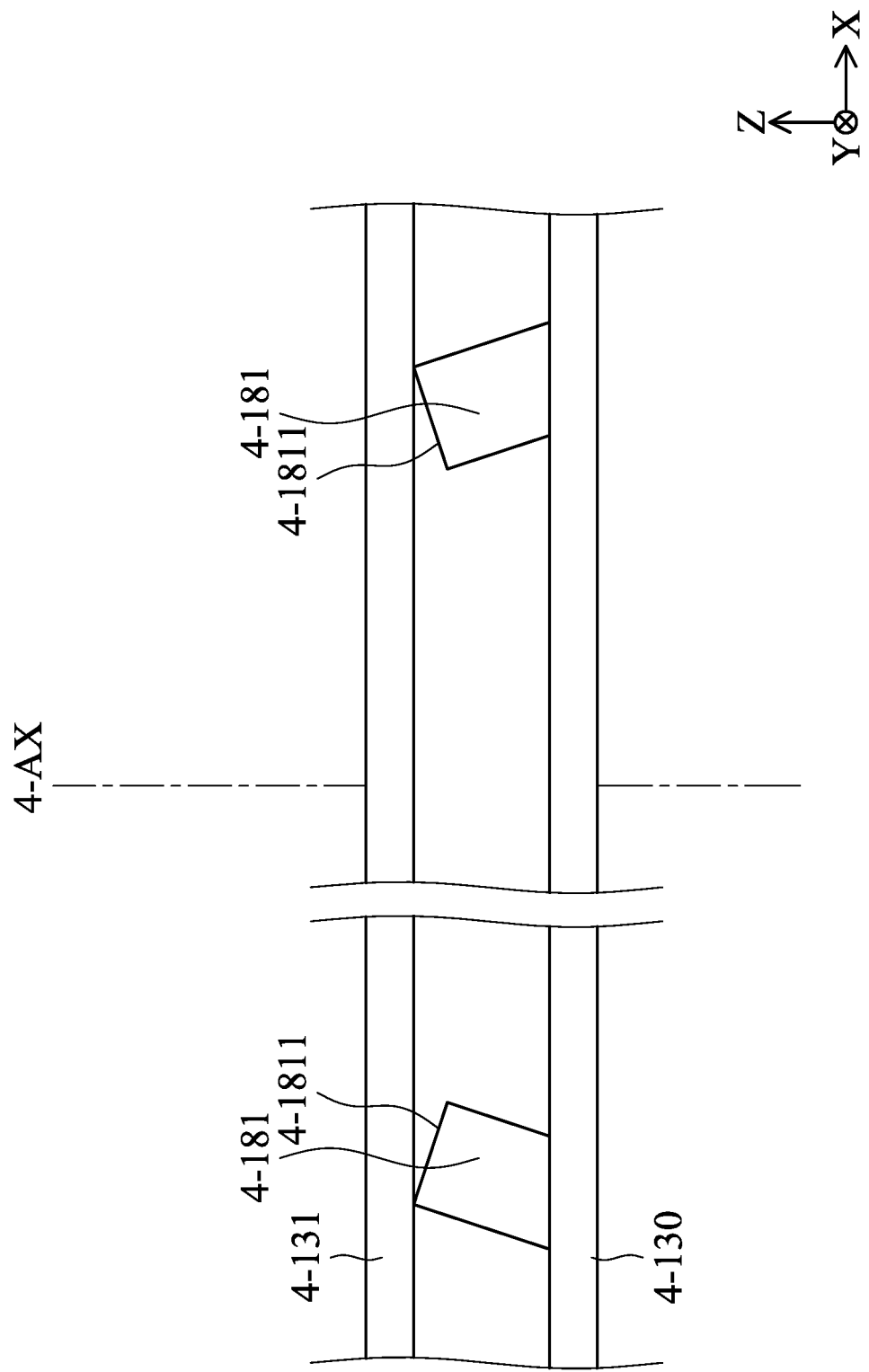
FIG. 53 is a front view of a partial structure of the first connecting member 4-131, the first supporting elements 4-181, and the fixed member 4-130 according to an embodiment of the present disclosure.

Please refer to FIG. 53, which is a front view of a partial structure of the first connecting member 4-131, the first supporting elements 4-181, and the fixed member 4-130 according to an embodiment of the present disclosure. In this embodiment, the optical element driving mechanism 4-100 can define a light incident end and a light exiting end. The light incident end can be, for example, the casing opening 4-1021, and the light exiting end can be, for example, the substrate opening 4-1111.

As shown in FIG. 53, each of the first supporting elements 4-181 has a supporting surface 4-1811 configured to contact the first connecting member 4-131. When viewed along a direction perpendicular to the main axis 4-AX (such as the Y-axis), the supporting surfaces 4-1811 of the two adjacent first supporting elements 4-181 face the light incident end, but it is not limited thereto.

Figure 54:
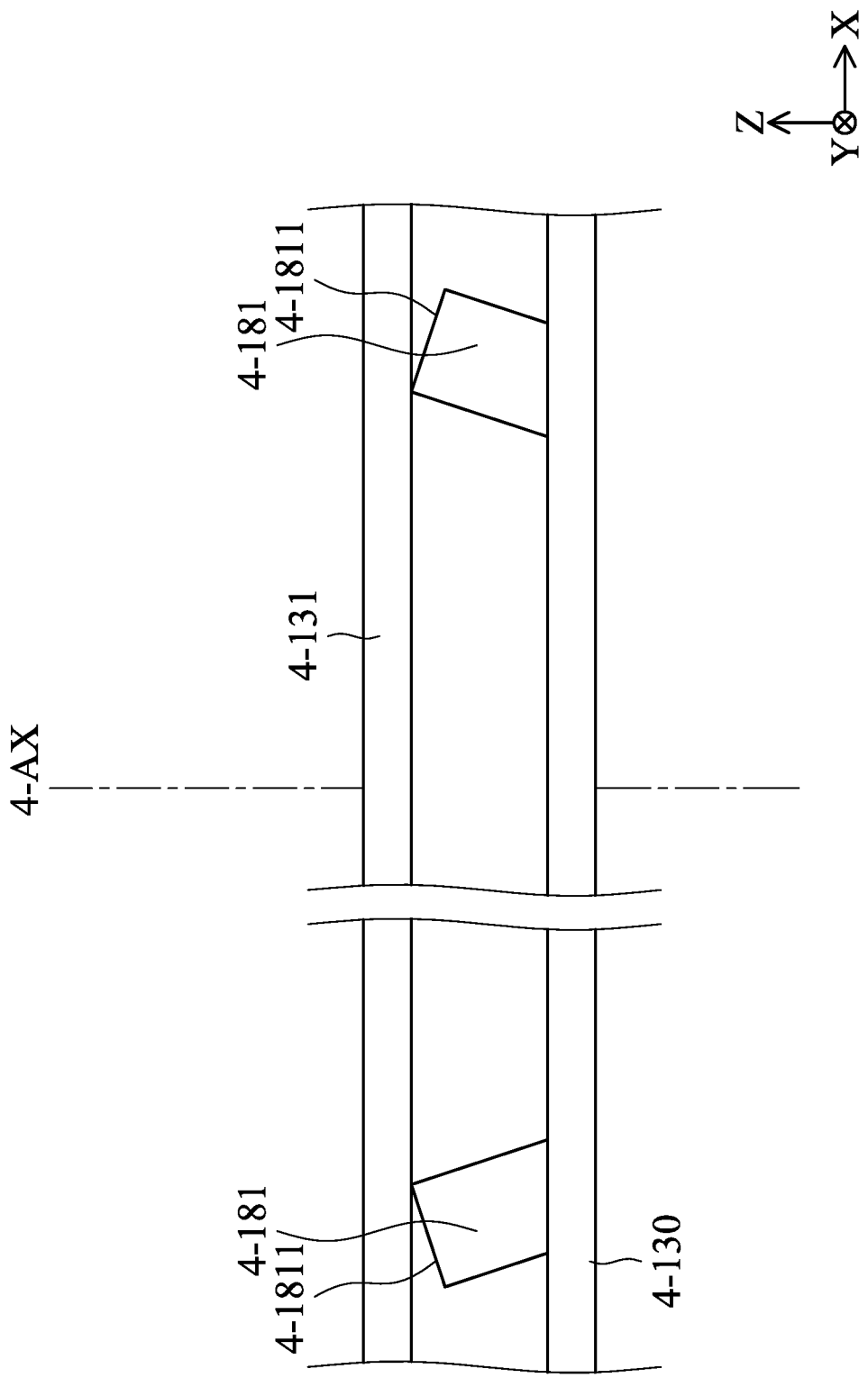
FIG. 54 is a front view of a partial structure of the first connecting member 4-131, the first supporting elements 4-181, and the fixed member 4-130 according to another embodiment of the present disclosure.

Please refer to FIG. 54, which is a front view of a partial structure of the first connecting member 4-131, the first supporting elements 4-181, and the fixed member 4-130 according to another embodiment of the present disclosure. In this embodiment, the two supporting surfaces 4-1811 may not face the light incident end. In addition, in other embodiments, the supporting surfaces 4-1811 can completely be in contact with the bottom surface of the first connecting member 4-131, and the supporting surfaces 4-1811 are perpendicular to the main axis 4-AX.

Please return to FIG. 51. The second driving assembly 4-DA2 may further include a plurality of second supporting elements 4-182 disposed between the first connecting member 4-131 and the fixed member 4-130. These second supporting elements 4-182 are fixed on the fixed member 4-130. These second supporting elements 4-182 are configured to support the first connecting member 4-131 so that the first connecting member 4-131 can move relative to the fixed member 4-130.

When viewed along the main axis 4-AX, a distance between at least one of the second supporting elements 4-182 and the main axis 4-AX is greater than a distance between any one of the first supporting elements 4-181 and the main axis 4-AX. Based on this design, it can prevent the first connecting member 4-131 from contacting the fixed member 4-130 when the first connecting member 4-131 moves.

In this embodiment, the first supporting elements 4-181 and the second supporting elements 4-182 includes a plastic material. For example, the first supporting elements 4-181 and the second supporting elements 4-182 may be made of plastic steel.

Figure 55:
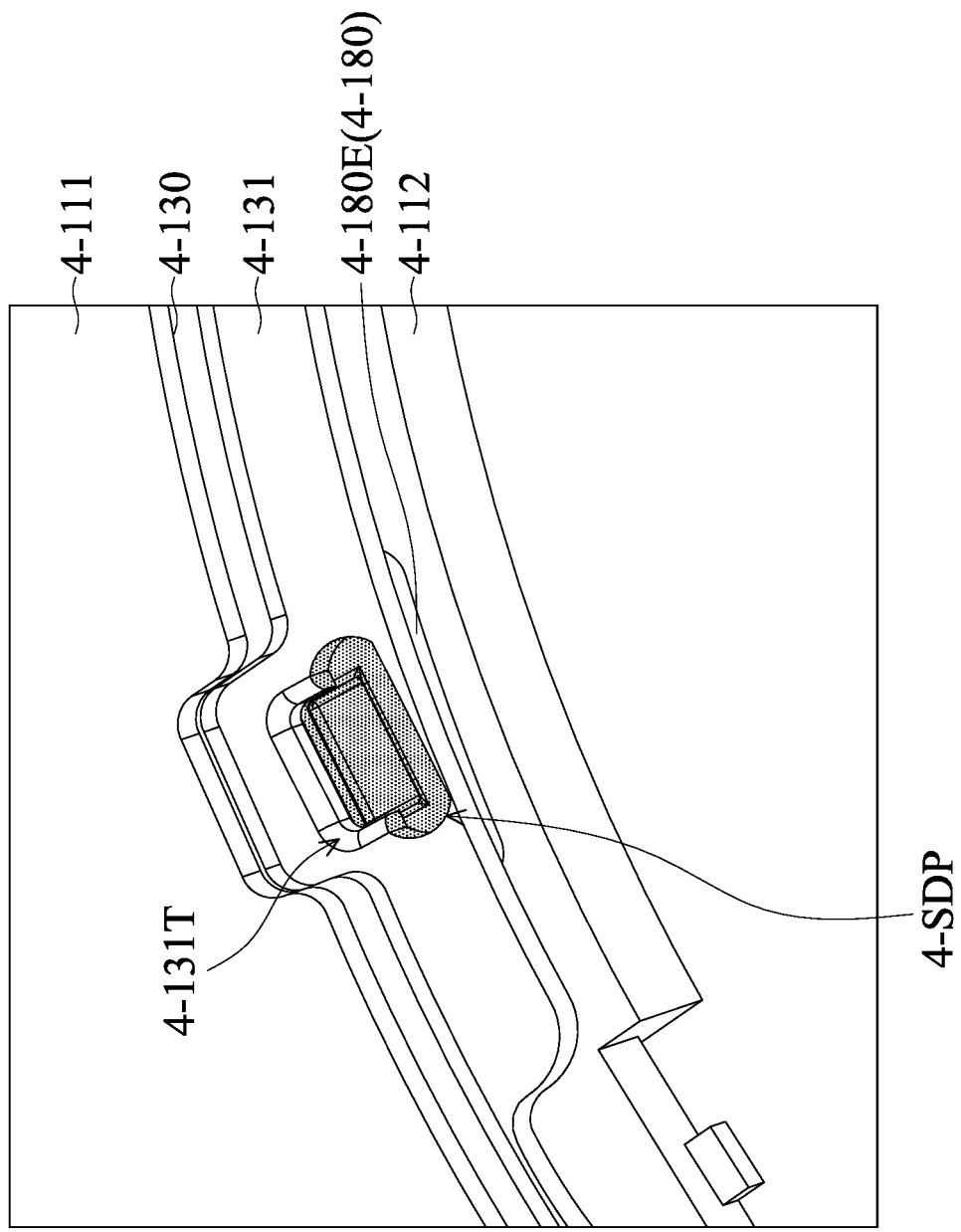
FIG. 55 is a perspective view of the base 4-112, the second driving assembly 4-DA2, and the substrate 4-111 viewed from the bottom according to an embodiment of the present disclosure.

Please also refer to FIG. 55, which is a perspective view of the base 4-112, the second driving assembly 4-DA2, and the substrate 4-111 viewed from the bottom according to an embodiment of the present disclosure. In this embodiment, the optical element driving mechanism 4-100 may further include at least one circuit member 4-180.

The circuit member 4-180 is disposed in the base 4-112, and an exposed portion 4-180E of the circuit member 4-180 is exposed from the base 4-112. The first connecting member 4-131 includes a first through hole 4-131T corresponding to the exposed portion 4-180E. In this embodiment, the first connecting member 4-131 is affixed to the exposed portion 4-180E by laser welding.

When viewed along the main axis 4-AX, a welding portion 4-SDP is formed on the first connecting member 4-131 and the exposed portion 4-180E, and the welding portion 4-SDP overlaps at least part of the first through hole 4-131T. In addition, when viewed along the main axis 4-AX, the substrate 4-111 and the fixed member 4-130 do not overlap the first through hole 4-131T. Based on the above structural design, it can ensure that the substrate 4-111 and the fixed member 4-130 are not be irradiated by the laser during laser welding.

The present disclosure provides an optical element driving mechanism 4-100, and the second driving assembly 4-DA2 may have a first bending member 4-141 and a first clamping member 4-1311. The first clamping member 4-1311 is configured to clamp the driving element 4-133 through the first bending member 4-141 and the first stabilizing element 4-SG1, and the first bending member 4-141 may have a tapered structure. Based on this design, the problem of damage caused by collision with the first bending member 4-141 when the driving element 4-133 deforms can be avoided.

Furthermore, the circuit member 4-180 can be disposed in the base 4-112, the first through hole 4-131T of the first connecting member 4-131 corresponds to the exposed portion 4-180E of the circuit member 4-180, and the first connecting member 4-131 is affixed to the exposed portion 4-180E by laser welding, thereby increasing the strength of the connection between the base 4-112 and the first connecting member 4-131.

Figure 56:
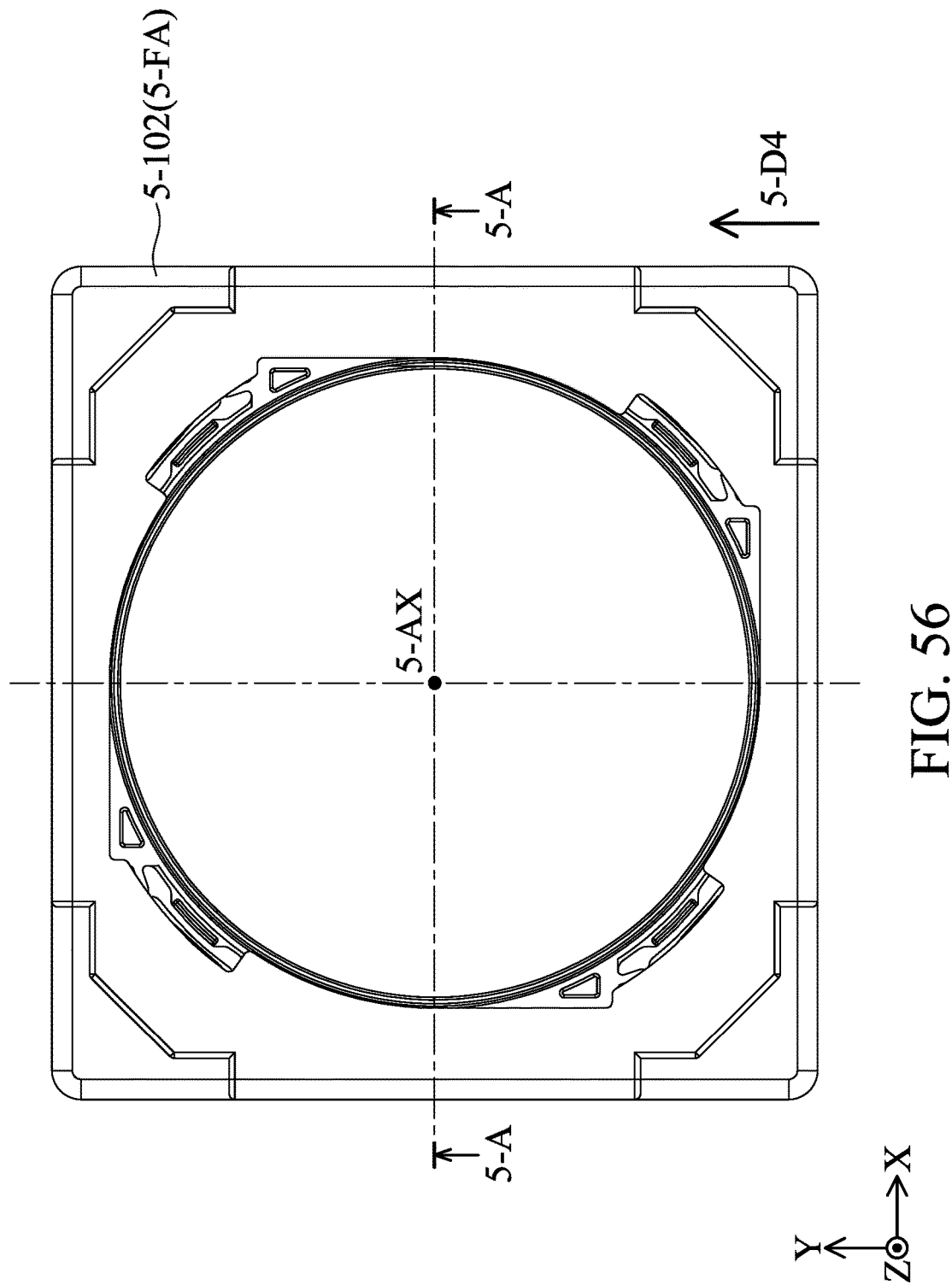
FIG. 56 is a top view of an optical element driving mechanism 5-100 according to an embodiment of the present disclosure.
Figure 57:
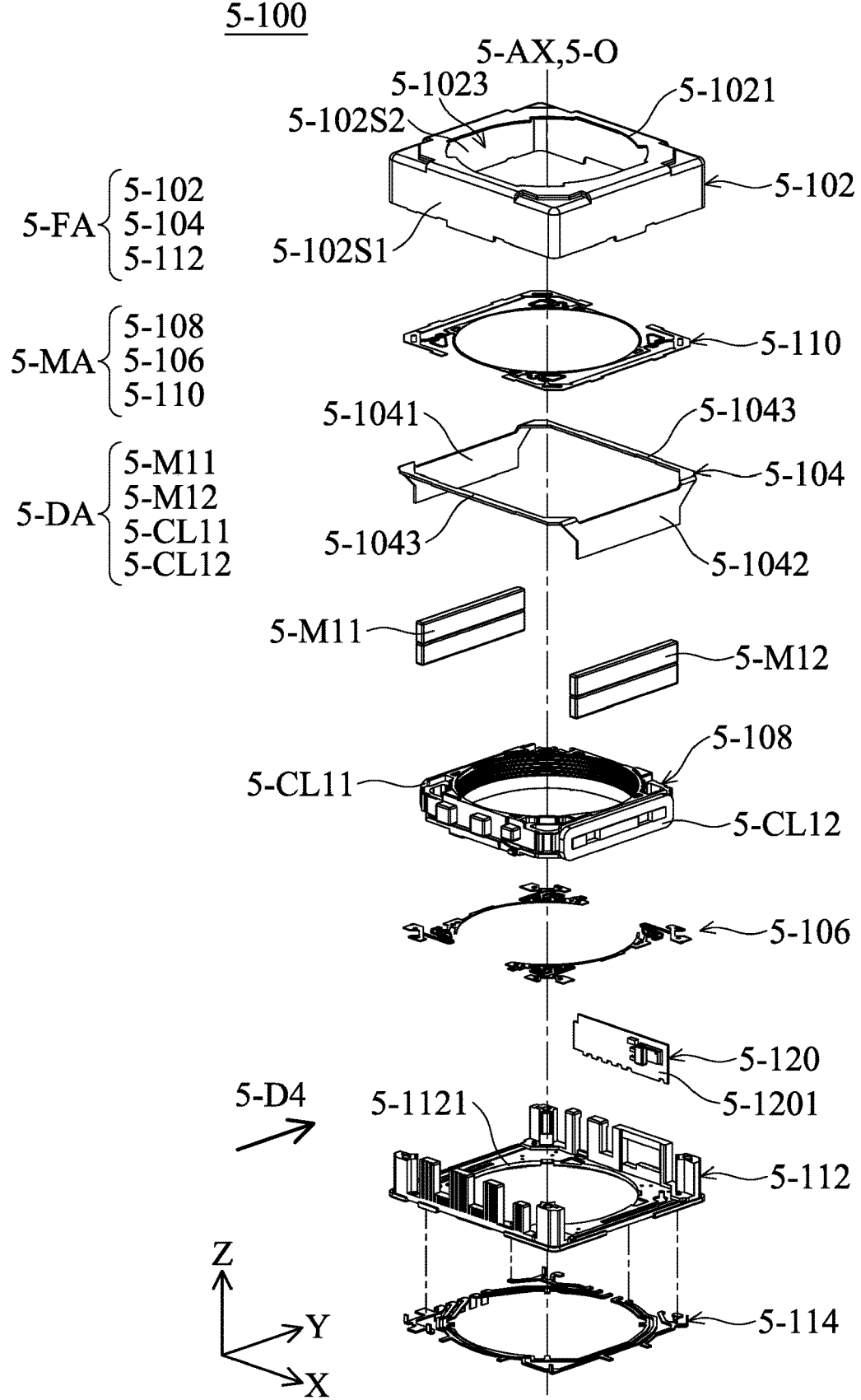
FIG. 57 is an exploded diagram of the optical element driving mechanism 5-100 according to an embodiment of the present disclosure.
Figure 58:
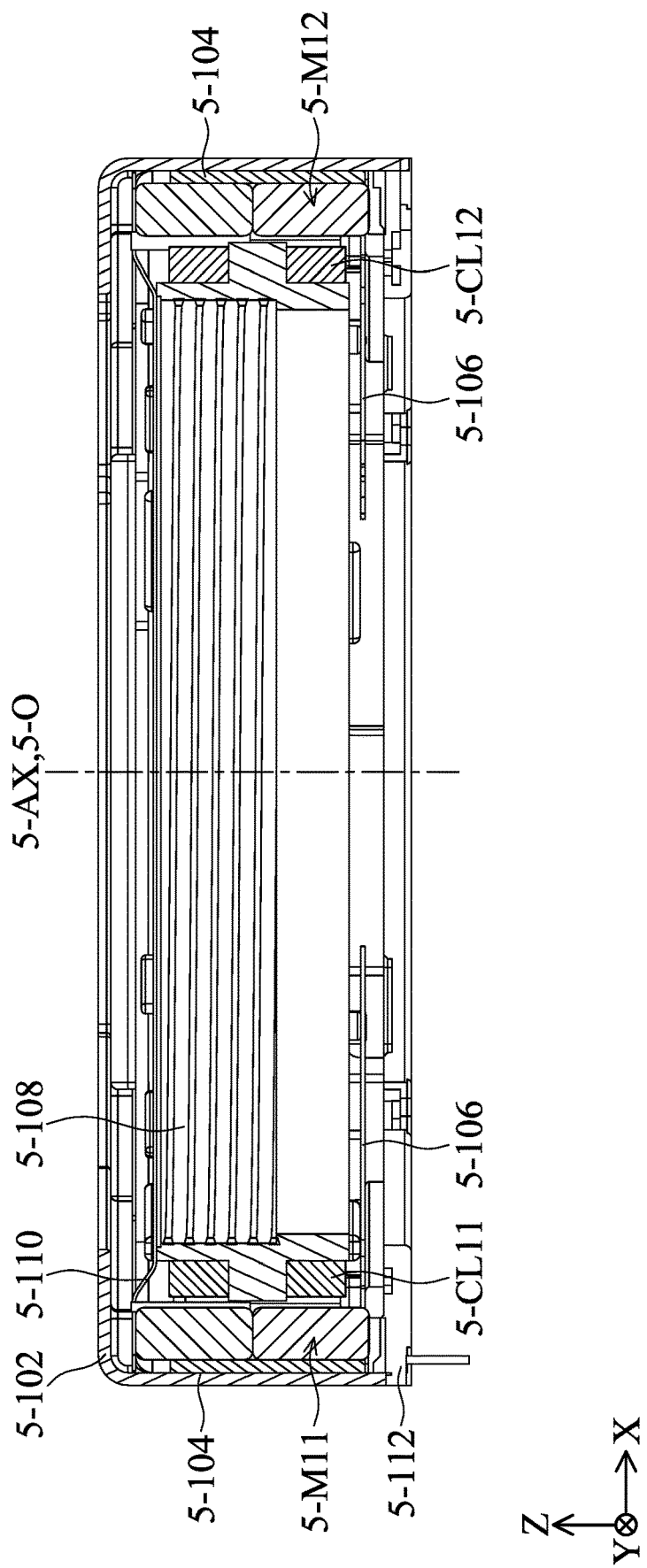
FIG. 58 is a cross-sectional view of the optical element driving mechanism 5-100 along line 5-A-5-A in FIG. 56 according to an embodiment of the present disclosure.

Please refer to FIG. 56 to FIG. 58. FIG. 56 is a top view of an optical element driving mechanism 5-100 according to an embodiment of the present disclosure, FIG. 57 is an exploded diagram of the optical element driving mechanism 5-100 according to an embodiment of the present disclosure, and FIG. 58 is a cross-sectional view of the optical element driving mechanism 5-100 along line 5-A-5-A in FIG. 56 according to an embodiment of the present disclosure. The optical element driving mechanism 5-100 can be an optical camera system and can be configured to hold and drive an optical element. The optical element driving mechanism 5-100 can be installed in various electronic devices or portable electronic devices, such as a smartphone, for allowing a user to perform the image capturing function. In this embodiment, the optical element driving mechanism 5-100 can be a voice coil motor (VCM) with an auto-focusing (AF) function, but it is not limited thereto. In other embodiments, the optical element driving mechanism 5-100 can also perform the functions of auto-focusing and optical image stabilization (OIS).

In this embodiment, the optical element driving mechanism 5-100 may include a fixed assembly 5-FA, a movable assembly 5-MA, and a driving assembly 5-DA. The movable assembly 5-MA is movably connected to the fixed assembly 5-FA, and the movable assembly 5-MA is configured to hold an optical element (not shown in the figures). The driving assembly 5-DA is configured to drive the movable assembly 5-MA to move relative to the fixed assembly 5-FA.

In this embodiment, as shown in FIG. 57, the fixed assembly 5-FA includes a casing 5-102, a frame 5-104 and a base 5-112, the movable assembly 5-MA includes a lens holder 5-108 and the aforementioned optical element, and the lens holder 5-108 is used to hold the optical element.

As shown in FIG. 57, the casing 5-102 has a hollow structure, and a casing opening 5-1021 is formed thereon, and a base opening 5-1121 is formed on the base 5-112. The center of the casing opening 5-1021 corresponds to the optical axis 5-O of the optical element, and the base opening 5-1121 corresponds to a photosensitive element disposed under the base 5-112. The external light can enter the casing 5-102 from the casing opening 5-1021 to be received by the photosensitive element after passing through the optical element and the base opening 5-1121 so as to generate a digital image signal.

Furthermore, the casing 5-102 is disposed on the base 5-112 and may have an accommodating space 5-1023 for accommodating the movable assembly 5-MA (including the aforementioned optical element and the lens holder 5-108) and the driving assembly 5-DA.

The movable assembly 5-MA may further include a first elastic member 5-106 and a second elastic member 5-110. The outer portion (the outer ring portion) of the first elastic member 5-106 is fixed to the base 5-112, the outer portion (the outer ring portion) of the second elastic member 5-110 is fixed to the inner wall surface of the casing 5-102, and the inner portions (the inner ring portions) of the first elastic member 5-106 and the second elastic member 5-110 are respectively connected to the upper and lower sides of the lens holder 5-108, so that the lens holder 5-108 can be suspended in the accommodating space 5-1023.

In this embodiment, the driving assembly 5-DA may include a first magnet 5-M11 (the first magnetic element), a second magnet 5-M12, a first coil 5-CL11, and a second coil 5-CL12. The first coil 5-CL11 and the second coil 5-CL12 are disposed on the lens holder 5-108, and the first magnet 5-M11 and the second magnet 5-M12 are disposed on the frame 5-104 respectively corresponding to the first coil 5-CL11 and the second coil 5-CL12.

In this embodiment, the first coil 5-CL11 and the second coil 5-CL12 may be wound coils and be disposed on opposite sides of the lens holder 5-108. When the first coil 5-CL11 and the second coil 5-CL12 are provided with electricity, the first coil 5-CL11 and the second coil 5-CL12 respectively act with the first magnet 5-M11 and the second magnet 5-M12 to generate an electromagnetic force, so as to drive the lens holder 5-108 and the held optical element to move relative to the base 5-112 along the optical axis 5-O (the Z-axis).

Figure 59:
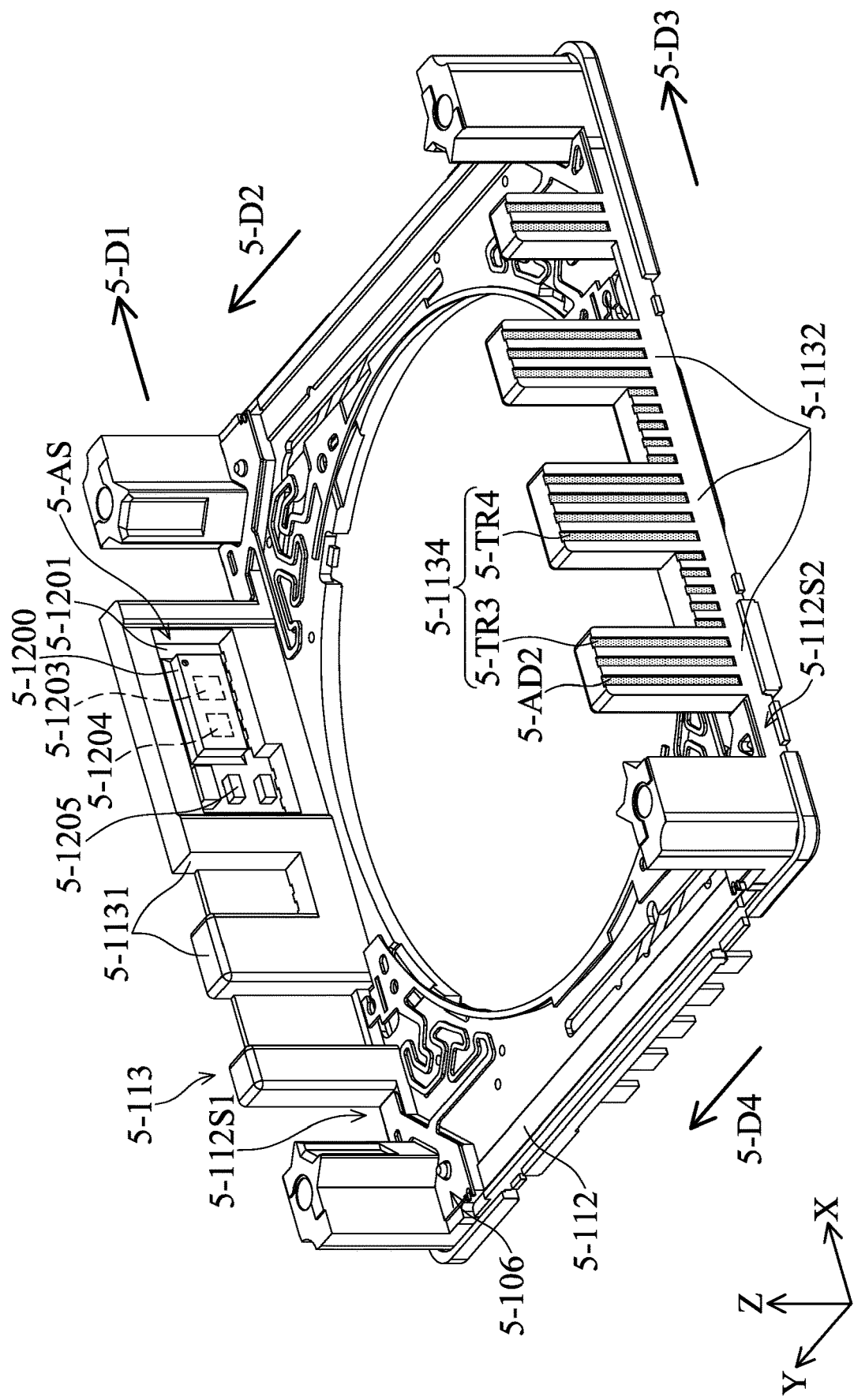
FIG. 59 is a perspective view of the base 5-112 and a circuit element 5-120 according to an embodiment of the present disclosure.

Please refer to FIG. 56, FIG. 57 and FIG. 59. FIG. 59 is a perspective view of the base 5-112 and a circuit element 5-120 according to an embodiment of the present disclosure. In this embodiment, the casing 5-102 and the base 5-112 are arranged along a main axis 5-AX. As shown in FIG. 56, when viewed along the main axis 5-AX, the fixed assembly 5-FA has a polygonal structure, such as a rectangular structure. Furthermore, as shown in FIG. 57 and FIG. 59, the base 5-112 has a plate-shaped structure, and the base 5-112 is perpendicular to the main axis 5-AX.

The optical element driving mechanism 5-100 further includes a circuit assembly 5-120 which is electrically connected to the driving assembly 5-DA, and the circuit assembly 5-120 includes a circuit element 5-1201, a position sensing element 5-1203, a control element 5-1204 and at least one passive element 5-1205.

The circuit element 5-1201 is a circuit board, such as a flexible circuit board, but it not limited thereto. In addition, the circuit element 5-1201 is electrically connected to the driving assembly 5-DA. The position sensing element 5-1203 is used to sense the movement of the lens holder 5-108 of the movable assembly 5-MA relative to the fixed assembly 5-FA. The control element 5-1204 is used to output a driving signal to the driving assembly 5-DA to drive the lens holder 5-108. The passive element 5-1205 has a filtering function, and the passive element 5-1205 can be, for example, a capacitor or an inductor, which is electrically connected to the circuit element 5-1201.

The control element 5-1204 outputs the aforementioned driving signal according to a sensing signal output by the position sensing element 5-1203. It should be noted that the position sensing element 5-1203 and the control element 5-1204 are located in the same package. Specifically, the position sensing element 5-1203 and the control element 5-1204 are covered by the same package component 5-1200, and the package component 5-1200 may be epoxy resin, for example.

As shown in FIG. 59, the fixed assembly 5-FA may further include a structural strengthening assembly 5-113 to strengthen the mechanical structure of the fixed assembly 5-FA. Specifically, the structural strengthening assembly 5-113 is fixedly disposed at the base 5-112, and the structural strengthening assembly 5-113 may include a first strengthening element 5-1131 and a first receiving space 5-AS1.

For example, the first strengthening element 5-1131 may be a protruding structure which protrudes outward from the base 5-112, and the first receiving space 5-AS1 is located at the first strengthening element 5-1131 and used to accommodate at least a part of the circuit assembly 5-120. Specifically, the position sensing element 5-1203 is located in the first receiving space 5-AS1, the passive element 5-1205 is located in the first receiving space 5-AS1, and the control element 5-1204 is located in the first receiving space 5-AS1.

Specifically, the first strengthening element 5-1131 extends along the main axis 5-AX (the Z-axis), and when viewed along the main axis 5-AX, the first strengthening element 5-1131 is located at a first side 5-112S1 of the base 5-112 of the fixed assembly 5-FA, and the first side 5-112S1 extends along a first direction 5-D1 (the X-axis). The first receiving space 5-AS1 is an opening structure that penetrates the first strengthening element 5-1131.

When viewed along a second direction 5-D2 (the Y-axis), the first strengthening element 5-1131 encloses the first receiving space 5-AS1 in a closed manner. The second direction 5-D2 is not parallel to the first direction 5-D1. Specifically, the second direction 5-D2 is perpendicular to the first direction 5-D1. When viewed along the main axis 5-AX, the first receiving space 5-AS1 overlaps at least a part of the first strengthening element 5-1131.

Figure 60:
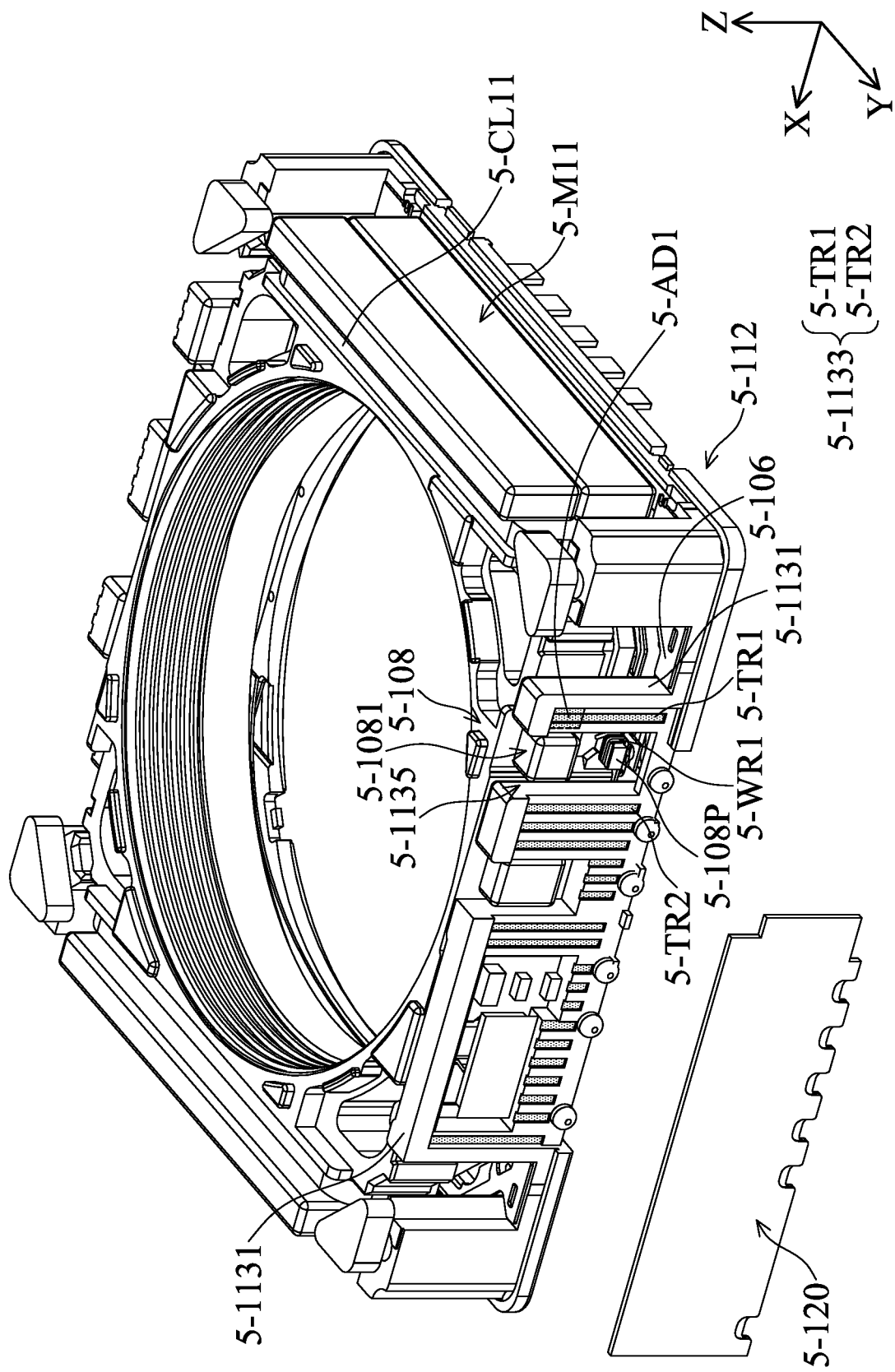
FIG. 60 is a schematic diagram of the base 5-112 and the circuit assembly 5-120 in another view according to an embodiment of the present disclosure.

Please refer to FIG. 60, which is a schematic diagram of the base 5-112 and the circuit assembly 5-120 in another view according to an embodiment of the present disclosure. In this embodiment, the first strengthening element 5-1131 includes a first connecting structure 5-1133, corresponding to the circuit assembly 5-120, for improving the connection strength between the circuit assembly 5-120 and the first strengthening element 5-1131.

The circuit assembly 5-120 is fixedly connected to the first strengthening element 5-1131 via a first adhesive element 5-AD1. The first connecting structure 5-1133 has a first trench 5-TR, the first connecting structure 5-1133 has a second trench 5-TR2, the extending direction of the first trench 5-TR is parallel to the main axis 5-AX, and the first trench 5-TR and the second trench 5-TR2 extend in the same direction.

Similarly, as shown in FIG. 59, the structural strengthening assembly 5-113 further includes a second strengthening element 5-1132 which protrudes outward from the base 5-112. The second strengthening element 5-1132 extends along the main axis 5-AX. When viewed along the main axis 5-AX, the second strengthening element 5-1132 is located on a second side 5-112S2 of the base 5-112 of the fixed assembly 5-FA, and the second side 5-112S2 is extended along a third direction 5-D3. The third direction 5-D3 is parallel to the first direction 5-D1.

The second strengthening element 5-1132 includes a second connecting structure 5-1134 corresponding to a first side wall 5-102S1 of the casing 5-102 and is used to enhance the connection strength between the first side wall 5-102S1 and the second strengthening element 5-1132. For example, the first side wall 5-102S1 is fixedly connected to the second strengthening element 5-1132 via a second adhesive element 5-AD2.

The second connecting structure 5-1134 has at least one third trench 5-TR3, the second connecting structure 5-1134 has at least one fourth trench 5-TR4, the extending direction of the third trench 5-TR3 is parallel to the main axis 5-AX, and the third trench 5-TR3 and the fourth trench 5-TR4 extend in the same direction.

Figure 61:
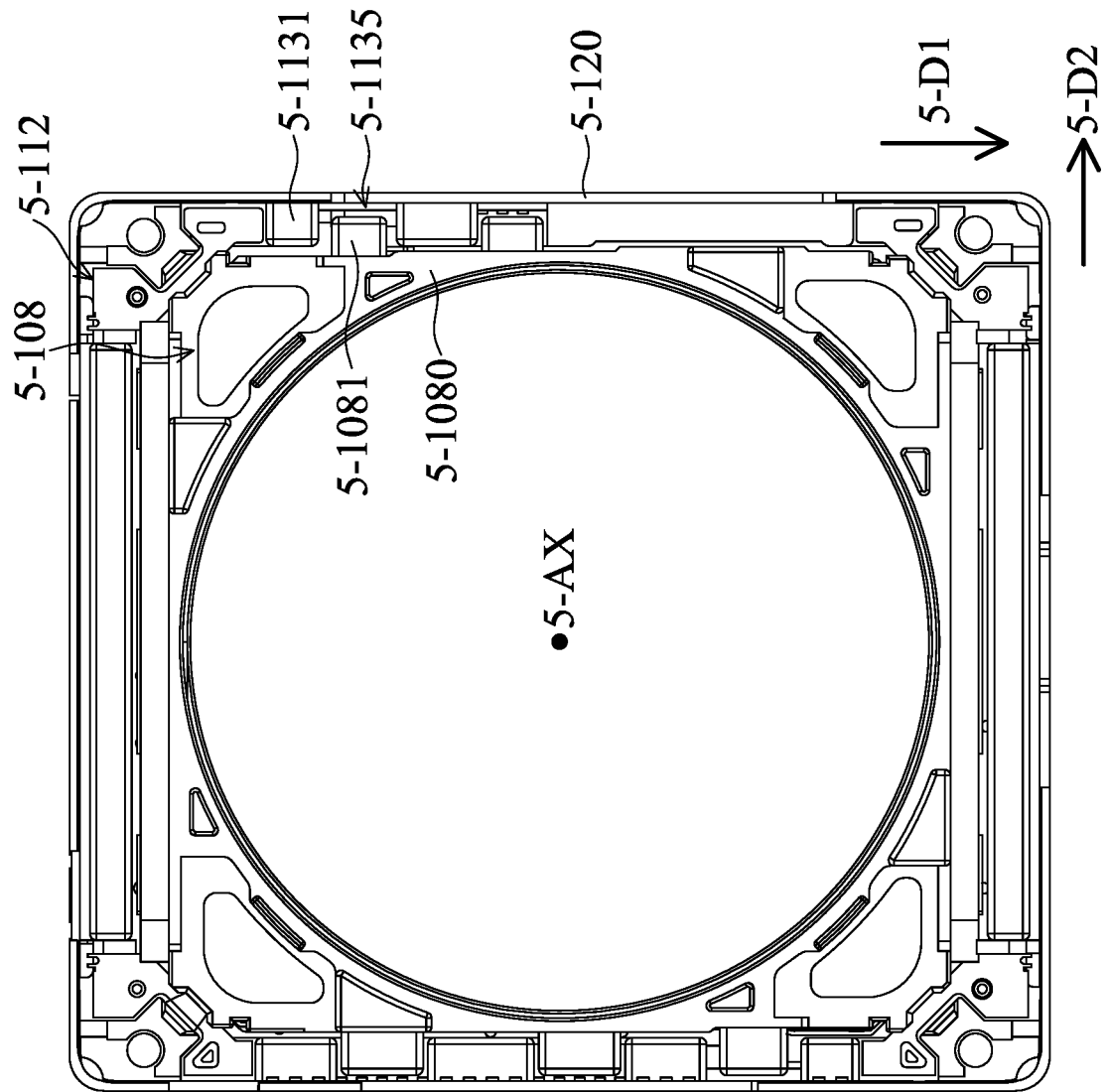
FIG. 61 is a top view of a partial structure of the optical element driving mechanism 5-100 according to an embodiment of the present disclosure.

Please refer to FIG. 57, FIG. 60, and FIG. 61. FIG. 61 is a top view of a partial structure of the optical element driving mechanism 5-100 according to an embodiment of the present disclosure. The structural strengthening assembly 5-113 further includes a first stopping portion 5-1135 located at the first strengthening element 5-1131 and corresponding to a first stopping member 5-1081 of the lens holder 5-108 of the movable assembly 5-MA. The first stopping portion 5-1135 and the first stopping member 5-1081 are used to limit the movement range of the lens holder 5-108 of the movable assembly 5-MA relative to the base 5-112 of the fixed assembly 5-FA.

Specifically, the first stopping portion 5-1135 and the first stopping member 5-1081 are used to limit the movement range of the lens holder 5-108 of the movable assembly 5-MA around the main axis 5-AX relative to the base 5-112 of the fixed assembly 5-FA, such as limiting the rotation angle of the lens holder 5-108 around main axis 5-AX relative to the base 5-112, so as to prevent the lens holder 5-108 from colliding with other components and causing damage. In addition, the movement of the lens holder 5-108 along the X-axis and/or Y-axis is also included in the aforementioned movement range.

In this embodiment, the first stopping portion 5-1135 is a recessed structure formed by the first strengthening element 5-1131, and the first stopping member 5-1081 has a protruding structure which protrudes from a main body 5-1080 of the movable assembly 5-MA. Specifically, the first stopping member 5-1081 is a protruding column, and the first stopping member 5-1081 protrudes along the second direction 5-D2.

Figure 62:
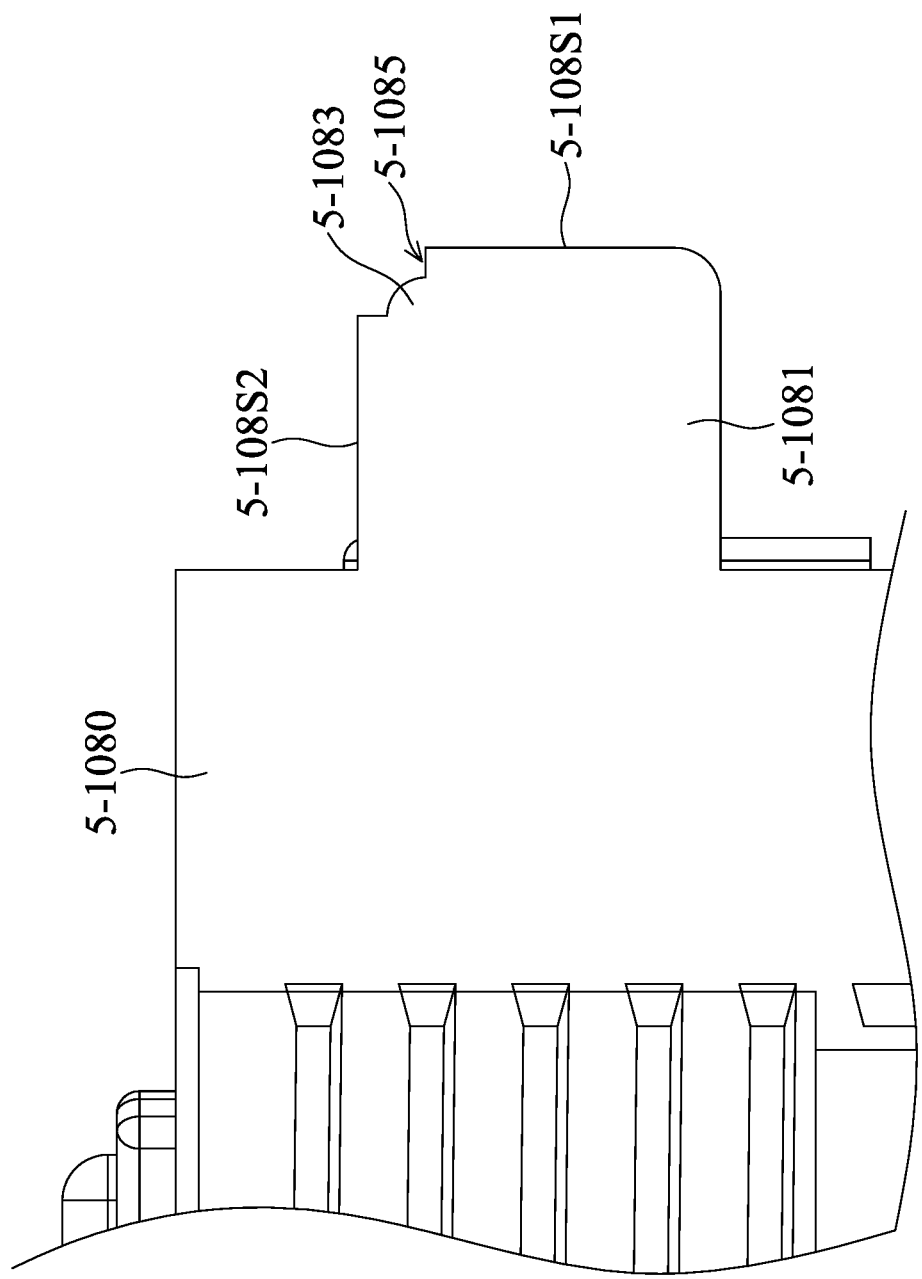
FIG. 62 is a cross-sectional side view of a partial structure of the lens holder 5-108 according to an embodiment of the present disclosure.

Please refer to FIG. 61 and FIG. 62. FIG. 62 is a cross-sectional side view of a partial structure of the lens holder 5-108 according to an embodiment of the present disclosure. As shown in FIG. 62, the first stopping member 5-1081 includes a protrusion 5-1083 located between a first surface 5-108S1 and a second surface 5-108S2 of the first stopping member 5-1081.

When the lens holder 5-108 of the movable assembly 5-MA is located at any position within the aforementioned movement range, the protrusion 5-1083 does not contact the fixed assembly 5-FA, such as the base 5-112, and the protrusion 5-1083 does not contact the first strengthening element 5-1131, either. Based on the above structural design, the problem of particles generated by the collision of the protrusion 5-1083 with other components can be avoided.

In addition, when the lens holder 5-108 of the movable assembly 5-MA is located at any position within the aforementioned movement range, the first stopping member 5-1081 does not contact the circuit assembly 5-120. Based on the above structural design, the problem of damage to the circuit assembly 5-120 being hit by the first stopping member 5-1081 can be avoided.

As shown in FIG. 62, the first surface 5-108S1 and the second surface 5-108S2 are not parallel. Specifically, the first surface 5-1081 is perpendicular to the second surface 5-108S2. The protrusion 5-1083 protrudes between the first surface 5-108S1 and the second surface 5-108S2. Specifically, the protrusion 5-1083 is located at a step structure 5-1085 on the first stopping member 5-1081.

In this embodiment, as shown in FIG. 60, the first strengthening element 5-1131 may be a wall, and the first strengthening element 5-1131 and the base 5-112 are integrally formed in one piece. That is, the first strengthening element 5-1131 and the base 5-112 include the same material. For example, both the first strengthening element 5-1131 and the base 5-112 are made of non-metallic materials, such as a plastic material.

Please refer to FIG. 60 again. As shown in FIG. 60, the first stopping portion 5-1135 corresponds to an electrical connecting portion 5-108P of the lens holder 5-108 of the movable assembly 5-MA. Specifically, the electrical connecting portion 5-108P is located in the first stopping portion 5-1135.

In addition, the first coil 5-CL11 of the driving assembly 5-DA is electrically connected to the first elastic member 5-106 via the electrical connecting portion 5-108P. When viewed along the main axis 5-AX, a leading wire 5-WR1 of the first coil 5-CL11 of the driving assembly 5-DA overlaps at least a part of the electrical connecting portion 5-108P. Specifically, the leading wire 5-WR1 is wound on the electrical connecting portion 5-108P.

It should be noted that when viewed along the main axis 5-AX, the electrical connecting portion 5-108P overlaps at least a part of the first stopping member 5-1081. Specifically, when viewed along the main axis 5-AX, the size of the first stopping member 5-1081 is larger than the electrical connecting portion 5-108P, so as to ensure that the electrical connection part 5-108P does not collide with the first strengthening element 5-1131 or the base 5-112 and cause damage.

Figure 63:
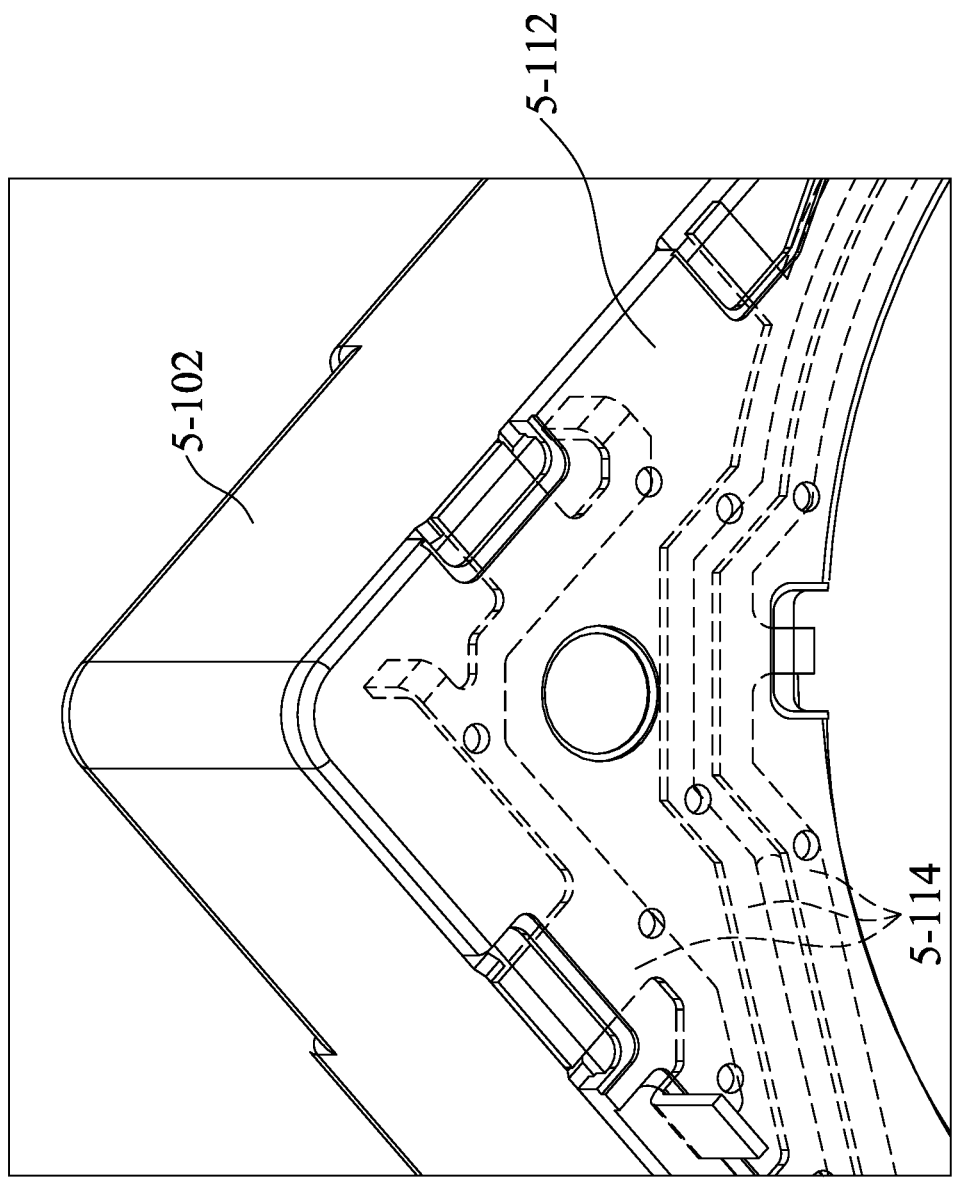
FIG. 63 is a schematic diagram of the optical element driving mechanism 5-100 in another view according to an embodiment of the present disclosure.

Please refer to FIG. 63, which is a schematic diagram of the optical element driving mechanism 5-100 in another view according to an embodiment of the present disclosure. As shown in FIG. 63, the structural strengthening assembly 5-113 may further include a third strengthening element (the circuit member 5-114), and at least a part of the third strengthening element is embedded in the base 5-112. The third strengthening element (the circuit member 5-114) may be made of a metal material.

Furthermore, in this embodiment, the circuit member 5-114 is disposed inside the base 5-112. For example, the base 5-112 is made of a plastic material, and the circuit member 5-114 is formed in the base 5-112 in the form of molded interconnect devices (MID).

As shown in FIG. 63, the third strengthening element is fixedly connected to the casing 5-102. For example, the third strengthening element can be affixed to the casing 5-102 by welding. In addition, the third strengthening element is also electrically connected to the casing 5-102. Because the casing 5-102 is a ground terminal of the optical element driving mechanism 5-100, the third strengthening element is electrically grounded.

Figure 64:
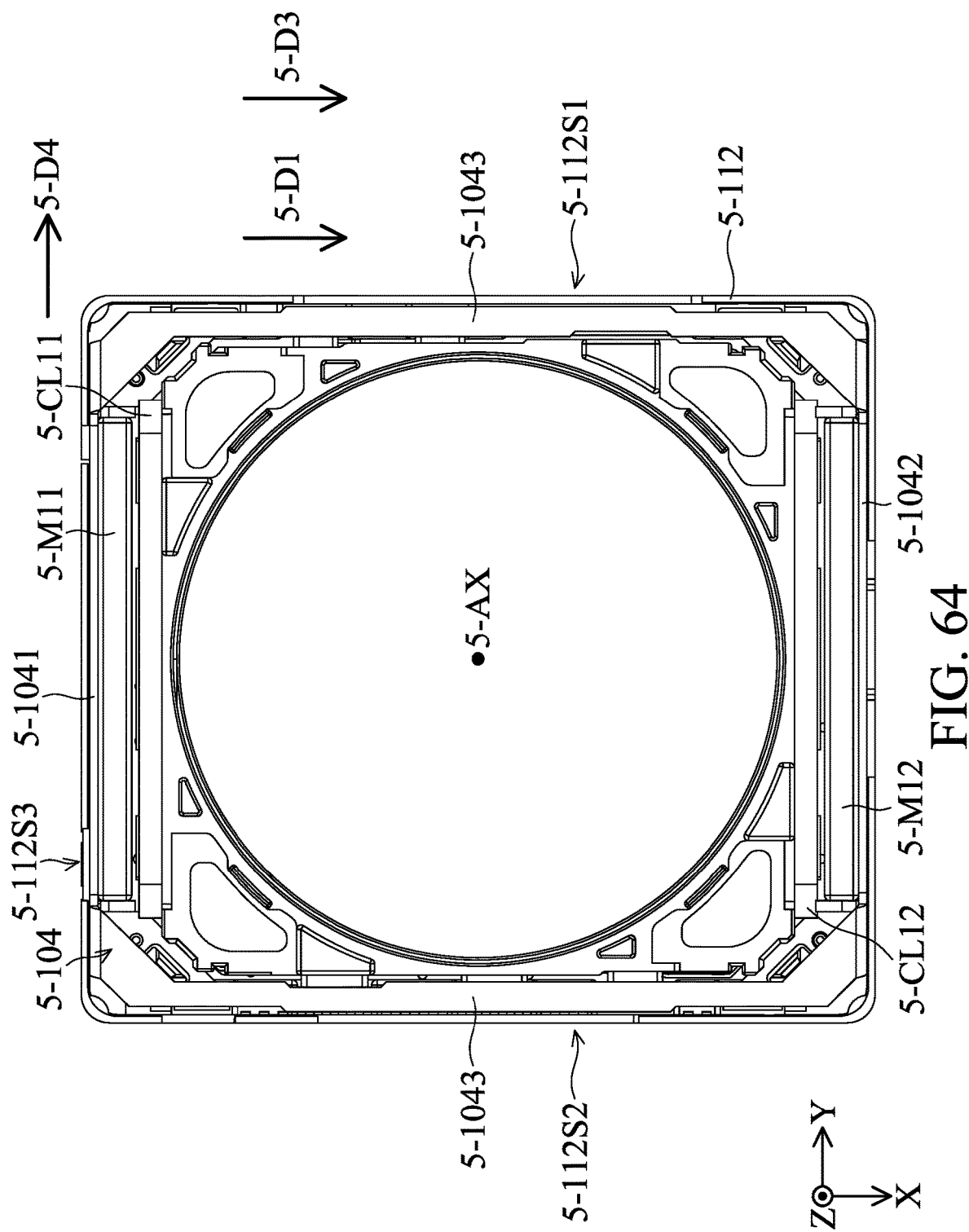
FIG. 64 is a top view of a partial structure of the optical element driving mechanism 5-100 according to an embodiment of the present disclosure.
Figure 65:
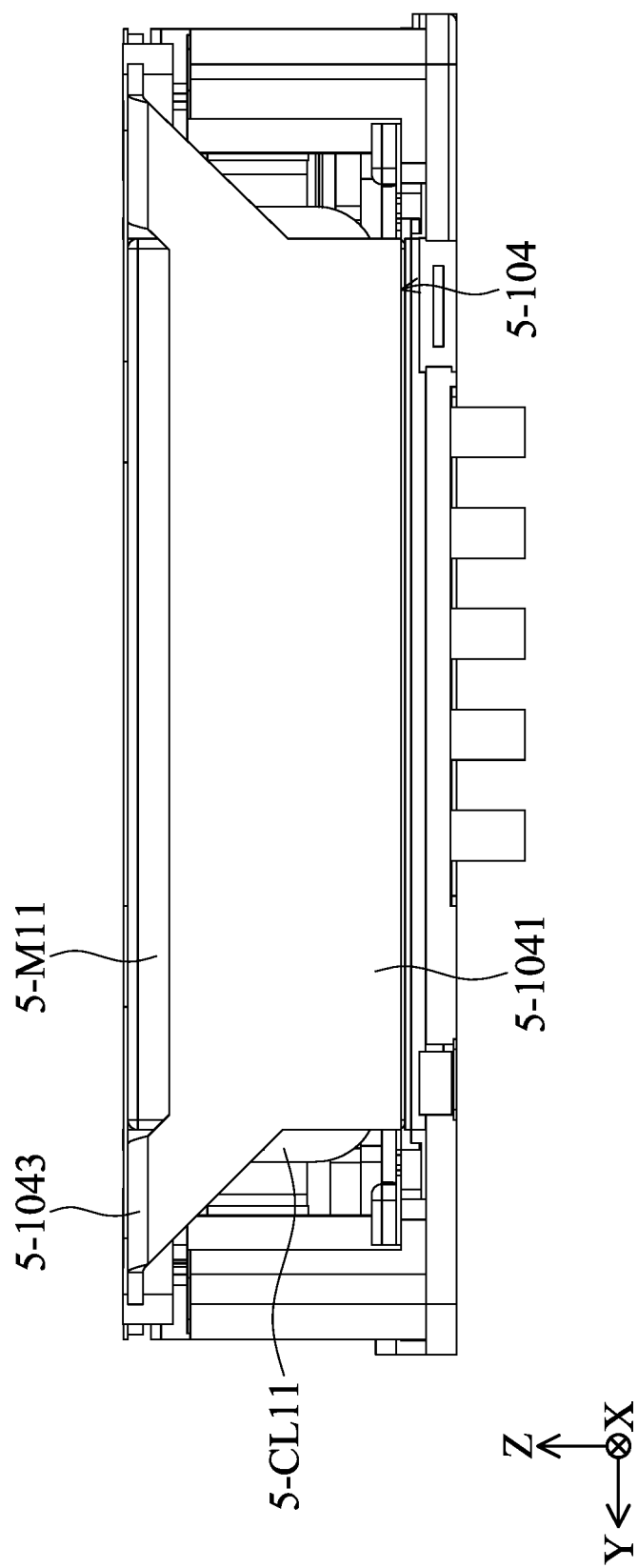
FIG. 65 is a side view of a partial structure of the optical element driving mechanism 5-100 according to an embodiment of the present disclosure.

Please refer to FIG. 57, FIG. 64 and FIG. 65 together. FIG. 64 is a top view of a partial structure of the optical element driving mechanism 5-100 according to an embodiment of the present disclosure, and FIG. 65 is a side view of a partial structure of the optical element driving mechanism 5-100 according to an embodiment of the present disclosure. In this embodiment, the frame 5-104 can be a magnetically permeable element with a magnetically permeable material, and the frame 5-104 (the magnetically permeable element) includes a first magnetically permeable portion 5-1041, a second magnetically permeable portion 5-1042 and two connecting portions 5-1043.

The first magnetically permeable portion 5-1041 corresponds to the first coil 5-CL11 or the first magnet 5-M11 (the first magnetic element), and the second magnetically permeable portion 5-1042 corresponds to the second coil 5-CL12 or the second magnet 5-M12 (the second magnetic element), and the first magnetically permeable portion 5-1041 is connected to the second magnetically permeable portion 5-1042 via two connecting portions 5-1043.

As shown in FIG. 65, when viewed along an arrangement direction (the X-axis) of the first coil 5-CL11 and the first magnet 5-M11 (the first magnetic element), the first magnetically permeable portion 5-1041 overlaps at least a part of the first coil 5-CL11 or the first magnet 5-M11 (the first magnetic element).

As shown in FIG. 64, when viewed along the main axis 5-AX, the first magnetically permeable portion 5-1041 is located on a third side 5-112S3 of the base 5-112 of the fixed assembly 5-FA, and the third side 5-112S3 extends along a fourth direction 5-D4. When viewed along the main axis 5-AX, the fourth direction 5-D4 is not parallel to the first direction 5-D1.

In this embodiment, the first magnetically permeable portion 5-1041 has a plate-shaped structure, the second magnetically permeable portion 5-1042 has a plate-shaped structure, and the connecting portion 5-1043 also has a plate-shaped structure. In this embodiment, the first magnetically permeable portion 5-1041 extends along the Y-axis, the connecting portion 5-1043 extends along the X-axis, the first magnet 5-M11 is fixed to the first magnetically permeable portion 5-1041, and when viewed along the main axis 5-AX, the maximum size of the first magnet 5-M11 (the first magnetic element) in the fourth direction 5-D4 is smaller than the maximum size of the first magnetically permeable portion 5-1041.

As shown in FIG. 64, when viewed along a thickness direction (the Z-axis) of the connecting portion 5-1043, the frame 5-104 (the magnetically permeable element) does not overlap the first magnet 5-M11 (the first magnetic element). When viewed along the thickness direction of the connecting portion 5-1043, the first magnetically permeable portion 5-1041 does not overlap the first magnet 5-M11 (the first magnetic element).

Figure 66:
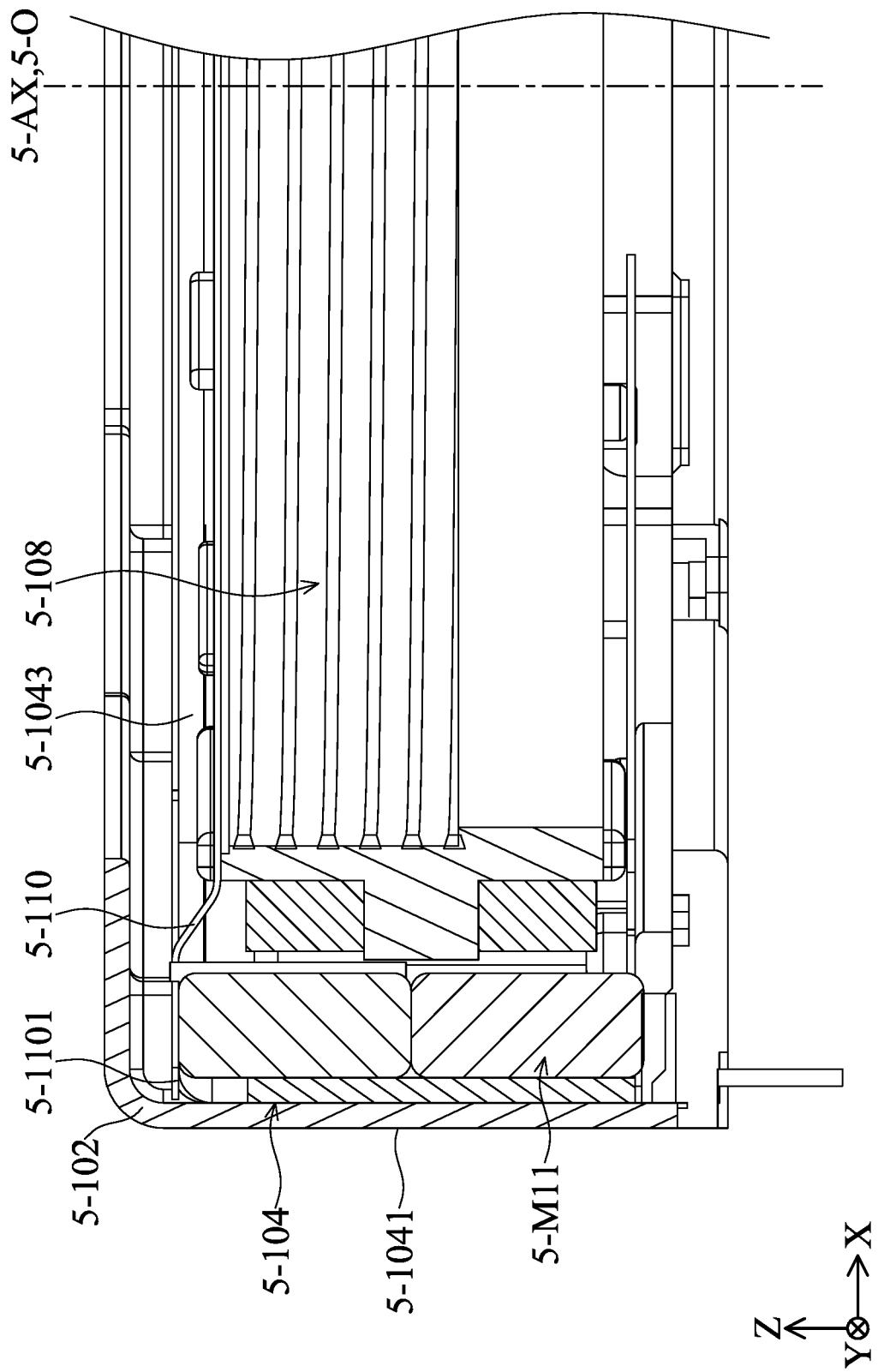
FIG. 66 is a partially enlarged schematic diagram of FIG. 58 according to an embodiment of the present disclosure.

Next, please refer to FIG. 66. FIG. 66 is a partially enlarged schematic diagram of FIG. 58 according to an embodiment of the present disclosure. In this embodiment, when viewed along a direction perpendicular to the thickness direction of the connecting portion 5-1043 (for example, when viewed along the Y-axis), the frame 5-104 (the magnetically permeable element) overlaps at least a part of the first magnet 5-M11 (the first magnetic element).

Specifically, when viewed in a direction perpendicular to the thickness direction of the connecting portion 5-1043 (for example, when viewed along the Y-axis), the connecting portion 5-1043 overlaps at least a part of the first magnet 5-M11 (the first magnetic element).

In this embodiment, the fourth direction 5-D4 is parallel to the Y-axis, so when viewed along the fourth direction 5-D4, the frame 5-104 (the magnetically permeable element) overlaps at least a part of the first magnet 5-M11 (the first magnetic element).

Furthermore, as shown in FIG. 57, FIG. 58 and FIG. 66, the lens holder 5-108 of the movable assembly 5-MA is movably connected to the fixed assembly 5-FA via the second elastic member 5-110. Specifically, the second elastic member 5-110 has a plate-shaped structure, the outer ring portion of the second elastic member 5-110 is affixed to the frame 5-104, and the frame 5-104 (the magnetically permeable element) is fixedly disposed on the casing 5-102 of the fixed assembly 5-FA.

When viewed in a direction perpendicular to the main axis 5-AX, for example, when viewed along the Y-axis, at least a part of the second elastic member 5-110 is located between the first magnet 5-M11 (the first magnetic element) and the casing 5-102.

In this embodiment, at least a part of the second elastic member 5-110 is located between the frame 5-104 (the magnetically permeable element) and the casing 5-102. Specifically, when viewed along the direction perpendicular to the main axis 5-AX, for example, when viewed along the Y-axis, at least a part (the outer ring portion) of the second elastic member 5-110 is located between the connecting portion 5-1043 of the frame 5-104 (the magnetically permeable element) and the casing 5-102.

As shown in FIG. 66, a second elastic member surface 5-1101 of the second elastic member 5-110 faces the frame 5-104 (the magnetically permeable element) and the first magnet 5-M11 (the first magnetic element). Specifically, the second elastic member 5-110 directly contacts the frame 5-104 (the magnetically permeable element) and the first magnet 5-M11 (the first magnetic element).

Based on the above-mentioned structural configuration, the driving efficiency of the driving assembly 5-DA can be increased, and the effect of miniaturization can also be achieved at the same time.

Figure 67:
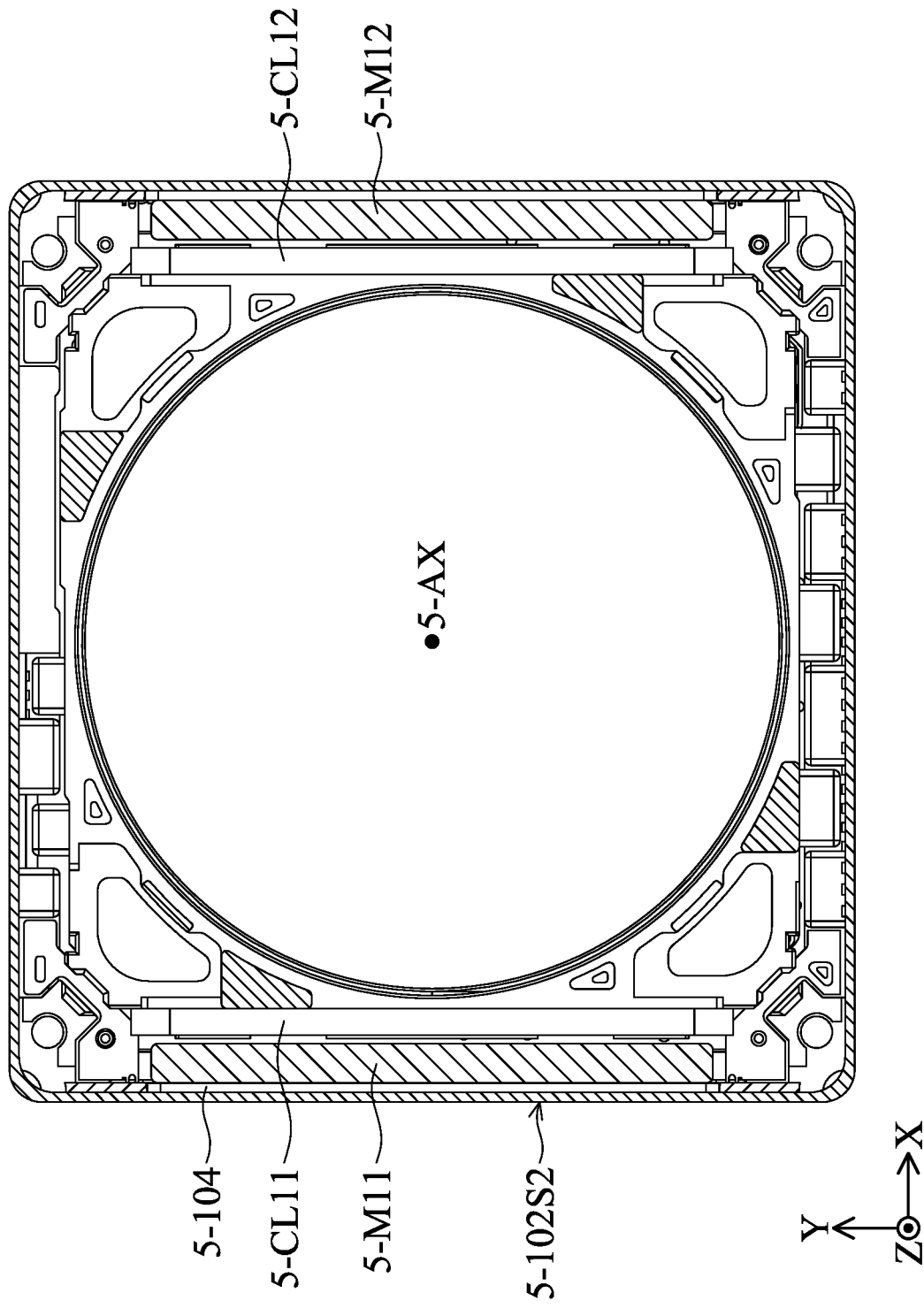
FIG. 67 is a cross-sectional view of a partial structure of the optical element driving mechanism 5-100 according to an embodiment of the present disclosure.

Please refer to FIG. 67, which is a cross-sectional view of a partial structure of the optical element driving mechanism 5-100 according to an embodiment of the present disclosure. As shown in FIG. 67, when viewed along the main axis 5-AX, the frame 5-104 (the magnetically permeable element) is located between a second side wall 5-102S2 of the casing 5-102 and the first magnet 5-M11 (the first magnetic element).

In this embodiment, the second side wall 5-102S2 of the casing 5-102 includes a metal material, and the frame 5-104 (the magnetically permeable element) also has a metal material. However, the second side wall 5-102S2 and the frame 5-104 (the magnetically permeable element) have different magnetic permeability. Specifically, the magnetic permeability of the second side wall 5-102S2 is less than the magnetic permeability of the frame 5-104 (the magnetically permeable element).

Based on the above structural design, it can effectively avoid the problem of magnetic interference between the components outside the optical element driving mechanism 5-100 and the driving assembly 5-DA and the frame 5-104.

The present disclosure provides an optical element driving mechanism, which includes a base 5-112 and a circuit assembly 5-120. A first strengthening element 5-1131 can be disposed on the base 5-112, the first strengthening element 5-1131 and the base 5-112 are integrally formed in one piece, and a part of the circuit assembly 5-120 can be disposed in the first strengthening element 5-1131. Based on this structural design, the mechanical structure of the fixed assembly 5-FA can be strengthened, and the effect of miniaturization can be further achieved.

In addition, the frame 5-104 can serve as a magnetically permeable element to increase the driving efficiency of the driving assembly 5-DA. Furthermore, because the second elastic member surface 5-1101 of the second elastic member 5-110 of the present disclosure directly contacts the frame 5-104 and the first magnet 5-M11, the size of the optical element driving mechanism 5-100 in the main axis 5-AX can be further reduced to achieve miniaturization.

Figure 68:
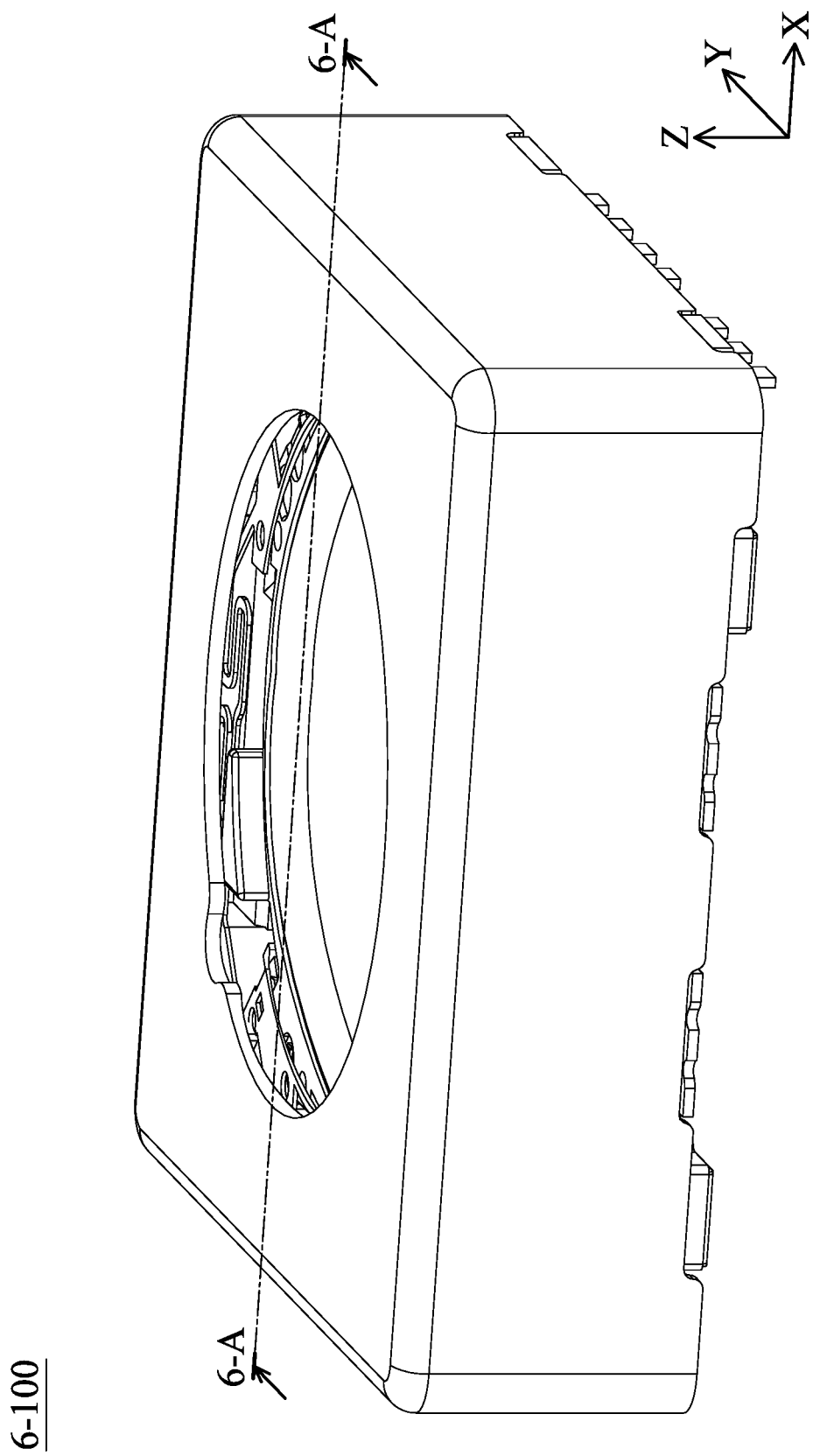
FIG. 68 is a schematic diagram of an optical element driving mechanism 6-100 according to an embodiment of the present disclosure.
Figure 69:
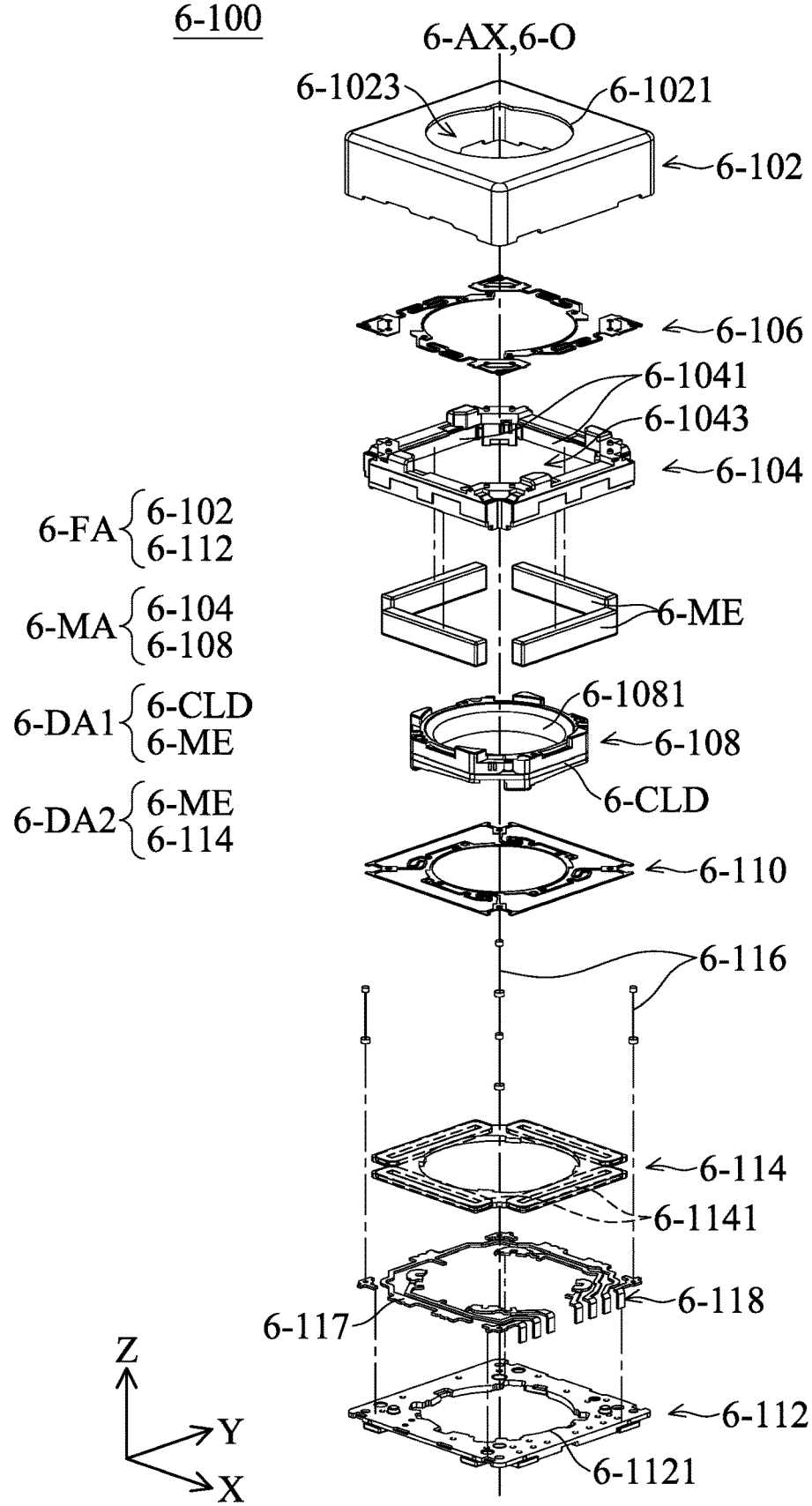
FIG. 69 is an exploded diagram of the optical element driving mechanism 6-100 according to an embodiment of the present disclosure.
Figure 70:
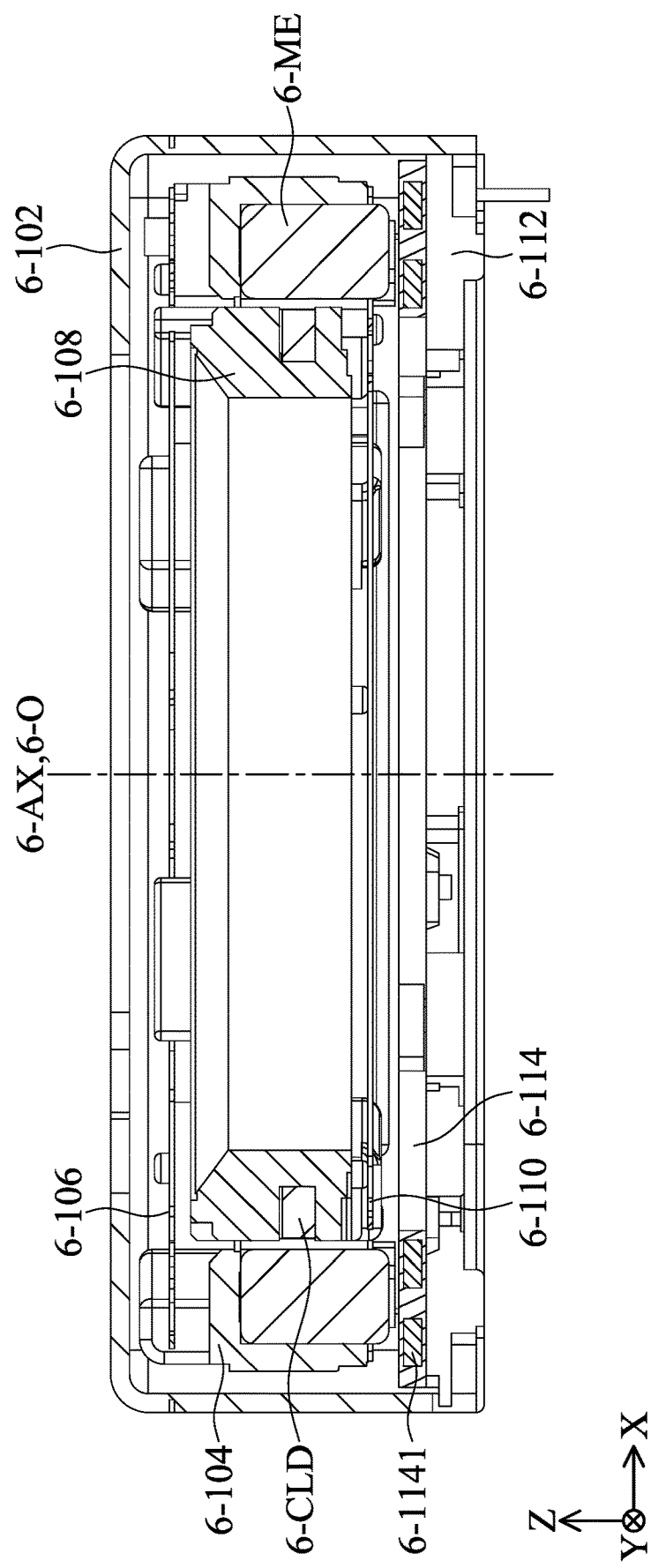
FIG. 70 is a cross-sectional view of the optical element driving mechanism 6-100 along line 6-A-6-A in FIG. 68 according to an embodiment of the present disclosure.

Please refer to FIG. 68 to FIG. 70. FIG. 68 is a schematic diagram of an optical element driving mechanism 6-100 according to an embodiment of the present disclosure, FIG.

69 is an exploded diagram of the optical element driving mechanism 6-100 according to an embodiment of the present disclosure, and FIG. 70 is a cross-sectional view of the optical element driving mechanism 6-100 along line 6-A-6-A in FIG. 68 according to an embodiment of the present disclosure. The optical element driving mechanism 6-100 can be an optical camera system and can be configured to hold and drive an optical element. The optical element driving mechanism 6-100 can be installed in various electronic devices or portable electronic devices, such as a smartphone, for allowing a user to perform the image capturing function. In this embodiment, the optical element driving mechanism 6-100 can be a voice coil motor (VCM) with an auto-focusing (AF) function, but it is not limited thereto. In other embodiments, the optical element driving mechanism 6-100 can also perform the functions of auto-focusing and optical image stabilization (OIS).

In this embodiment, the optical element driving mechanism 6-100 may include a fixed assembly 6-FA, a movable assembly 6-MA, a first driving assembly 6-DA1, and a second driving assembly 6-DA2. The movable assembly 6-MA is movably connected to the fixed assembly 6-FA, and the movable assembly 6-MA is configured to hold an optical element (not shown in the figures). The first driving assembly 6-DA1 and the second driving assembly 6-DA2 are configured to drive the movable assembly 6-MA to move relative to the fixed assembly 6-FA.

In this embodiment, as shown in FIG. 69, the fixed assembly 6-FA includes a casing 6-102 and a base 6-112, and the movable assembly 6-MA includes a lens holder 6-108, the aforementioned optical element and the frame 6-104, and the lens holder 6-108 is used to hold the optical element.

The casing 6-102 has a hollow structure, and a casing opening 6-1021 is formed on the casing 6-102. A base opening 6-1121 is formed on the base 6-112. The center of the casing opening 6-1021 corresponds to an optical axis 6-O of the optical element (not shown in the figures) which is held by the lens holder 6-108. The base opening 6-1121 corresponds to an image sensing element (now shown in the figures) disposed below the base 6-112. The casing 6-102 is fixedly connected to the base 6-112 and can include an accommodating space 1023 for accommodating the movable assembly 6-MA (including the aforementioned optical element and the lens holder 6-108) and these driving assemblies.

Furthermore, the first driving assembly 6-DA1 may include a driving coil 6-CLD and four magnetic elements 6-ME. The second driving assembly 6-DA2 can include four magnetic elements 6-ME and a circuit assembly 6-114. The circuit assembly 6-114 may be a circuit board, and four induction coils 6-1141 are disposed in the circuit assembly 6-114. The number of induction coils 6-1141 is not limited to this embodiment.

As shown in FIG. 69, the lens holder 6-108 has a hollow ring structure, and the lens holder 6-108 has a through hole 6-1081. The through hole 6-1081 forms a threaded structure (not shown) corresponding to another threaded structure (not shown) on the optical element, such that the optical element can be locked in the through hole 6-1081. In this embodiment, the driving coil 6-CLD surrounds the lens holder 6-108. In addition, the frame 6-104 has a plurality of grooves 1041 and a central opening 6-1043. In this embodiment, the frame 6-104 has four grooves 1041 for accommodating the four magnetic elements 6-ME, but the amounts of the grooves 1041 and the magnetic elements 6-ME are not limited thereto. The lens holder 6-108 and the aforementioned optical element are disposed in the central opening 6-1043 and are movable relative to the frame 6-104.

In this embodiment, the optical element driving mechanism 6-100 further includes a first elastic member 6-106 and a second elastic member 6-110. The lens holder 6-108 can be connected to the frame 6-104 through the first elastic member 6-106 and the second elastic member 6-110 to be suspended within the central opening 6-1043. When the driving coil 6-CLD is provided with electricity, the four magnetic elements 6-ME act with the driving coil 6-CLD to generate an electromagnetic driving force, thereby driving the lens holder 6-108 to move along the optical axis 6-O (the Z-axis) relative to the frame 6-104, so as to perform the function of auto focus (Auto Focusing).

In addition, as shown in FIG. 69, the optical element driving mechanism 6-100 further includes four elastic members 6-116 (the third elastic member). Each of the elastic members 6-116 has a long strip-shaped structure, such as a column-shaped structure or a line-shaped structure, but the shape is not limited thereto. In this embodiment, one end of the elastic member 6-116 is connected to the first elastic member 6-106, and the other end of the elastic member 6-116 is connected to the base 6-112 and is electrically connected to the circuit assembly 6-114. Based on the structural configuration, the lens holder 6-108 with the optical element (not shown in the figures) and the frame 6-104 can move relative to the base 6-112 along a direction parallel to the X-Y plane through the four flexible elastic members 6-116.

When the induction coils 6-1141 are provided with electricity and act with the corresponding magnetic elements 6-ME, an electromagnetic driving force is generated to drive the lens holder 6-108 and the optical element to move along the Y-axis or the X-axis. As a result, when the optical element driving mechanism 6-100 is shaken, the lens holder 6-108 can be driven by the electromagnetic force to move along the X-Y plane, so as to achieve the purpose of optical image stabilization (OIS).

Figure 71:
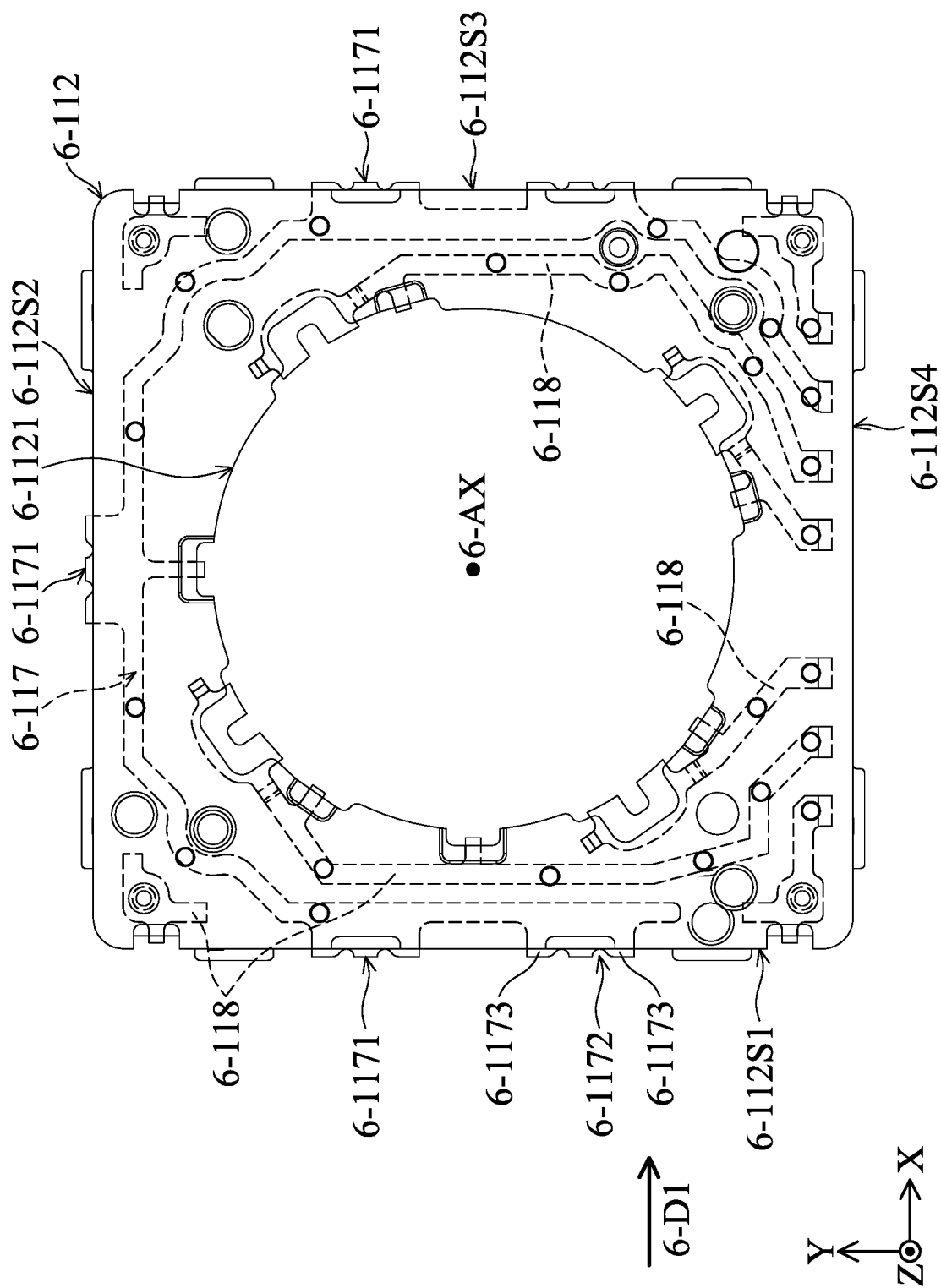
FIG. 71 is a top view of the base 6-112 according to an embodiment of the present disclosure.

Please refer to FIG. 69 and FIG. 71. FIG. 71 is a top view of the base 6-112 according to an embodiment of the present disclosure. In this embodiment, the casing 6-102 and the base 6-112 are arranged along a main axis 6-AX, and the optical element driving mechanism 6-100 may include a plurality of circuit members, which are made of metal. For example, the optical element driving mechanism 6-100 may include a first circuit member 6-117 and a plurality of second circuit members 6-118.

Furthermore, in this embodiment, these circuit members are disposed inside the base 6-112. For example, the base 6-112 is made of plastic materials, and the circuit members are formed in base 6-112 in the form of molded interconnect devices (MID).

That is, the first circuit member 6-117 and the second circuit members 6-118 are buried in the base 6-112. Furthermore, the first circuit member 6-117 is configured to be electrically grounded, and the second circuit members 6-118 are configured to transmit electronic signals. In addition, the first circuit member 6-117 is configured to be fixedly connected to the casing 6-102 of the fixed assembly 6-FA.

As shown in FIG. 71, when viewed along the main axis 6-AX, the base 6-112 has a rectangular structure, and the first circuit member 6-117 has a plurality of pins, which are arranged on the fourth sides of the base 6-112. For example, the pins 6-1171 of the first circuit member 6-117 are disposed on a first side 6-112S1 of the base 6-112.

Furthermore, when viewed along the main axis 6-AX, the first circuit member 6-117 is disposed between the two second circuit members 6-118. For example, as shown in FIG. 71, the left part of the first circuit member 6-117 is between the second circuit member 6-118 located in the upper left corner and the second circuit member 6-118 near the base opening 6-1121.

It is worth noting that when viewed along the main axis 6-AX, the first circuit member 6-117 is a continuous line segment which extends along the first side 6-112S1, and a second side 6-112S2, a third side 6-112S3, and a fourth side 6-112S4 of the base 6-112 in sequence. Specifically, when viewed along the main axis 6-AX, the first circuit member 6-117 surrounds the base opening 6-1121 of the base 6-112.

Figure 72:
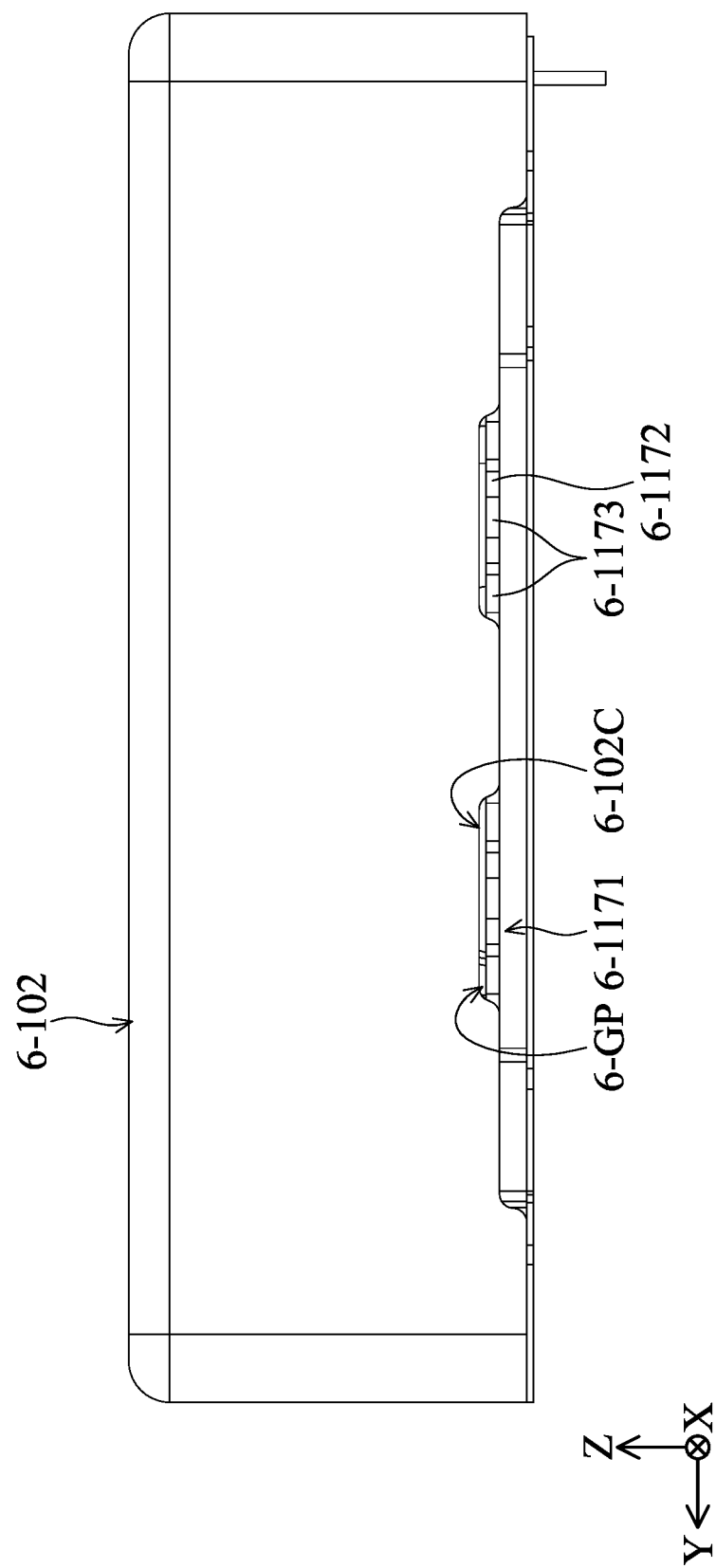
FIG. 72 is a front view of the optical element driving mechanism 6-100 according to an embodiment of the present disclosure.

Please refer to FIG. 68, FIG. 71, and FIG. 72. FIG. 72 is a front view of the optical element driving mechanism 6-100 according to an embodiment of the present disclosure. When viewed along the first direction 6-D1 (the X-axis) perpendicular to the main axis 6-AX, as shown in FIG. 72, a gap 6-GP is formed between the pin 6-1171 and the casing 6-102. Furthermore, when viewed along the first direction 6-D1, a notch 6-102C is formed on the casing 6-102 and is configured to accommodate the pin 6-1171.

Furthermore, when viewed along the main axis 6-AX, the pin 6-1171 has two recessed portions 6-1172, the pin 6-1171 also has three protruding portions 6-1173, and the recessed portion 6-1172 is formed between two protruding portions 6-1173.

In this embodiment, the three protruding portions 6-1173 can be fixed to the notch 6-102C by laser welding. It is worth noting that the recessed portion 6-1172 is not affixed to the notch 6-102C by laser welding. Based on this structural design, more welding points can be implemented on one single pin 6-1171, thereby increasing the connection strength between the first circuit member 6-117 and the casing 6-102, and the advantages of simplifying the welding process can be achieved at the same time.

Figure 73:
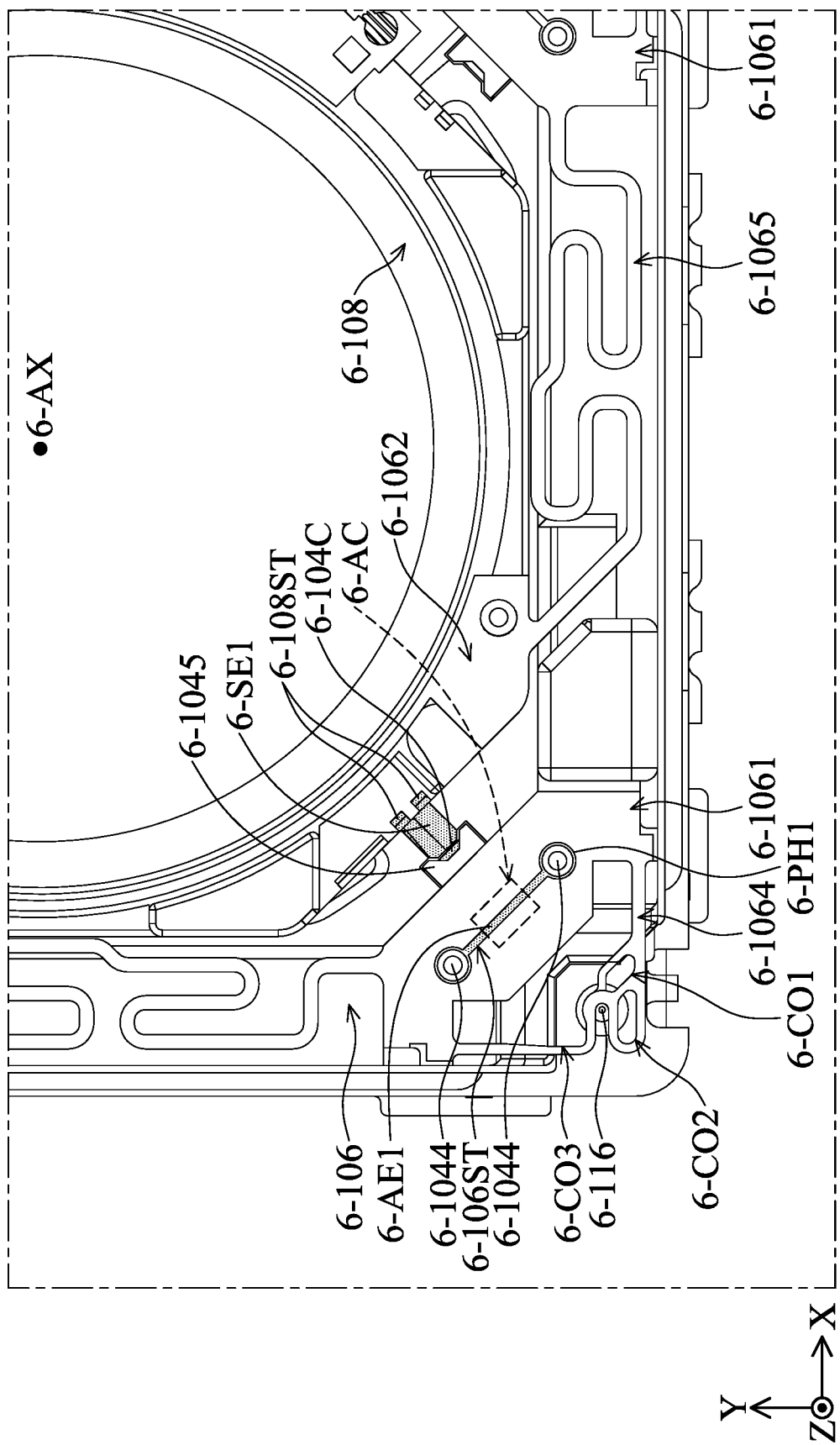
FIG. 73 is a top view of a partial structure of the optical element driving mechanism 6-100 according to an embodiment of the present disclosure.

Please refer to FIG. 69, FIG. 70, and FIG. 73. FIG. 73 is a top view of a partial structure of the optical element driving mechanism 6-100 according to an embodiment of the present disclosure. In this embodiment, as shown in FIG. 70, the lens holder 6-108 is movably connected to the frame 6-104 through the first elastic member 6-106 and the second elastic member 6-110.

As shown in FIG. 73, two positioning columns 6-1044 can be formed on one corner of the frame 6-104, and the first elastic member 6-106 has an outer positioning portion 6-1061 corresponding to the two positioning columns 6-1044. When viewed along the main axis 6-AX, the two positioning columns 6-1044 pass through two positioning hole 6-PH1 of the outer positioning portion 6-1061, so that the first elastic member 6-106 is positioned on the frame 6-104.

As shown in FIG. 73, the first elastic member 6-106 further has a slot 6-106ST formed on the outer positioning portion 6-1061, and the slot 6-106ST is communicated with the positioning holes 6-PH1. Furthermore, when viewed along the main axis 6-AX, the slot 6-106ST is located between two positioning columns 6-1044 and is configured to receive a first adhesive element 6-AE1.

Figure 74:
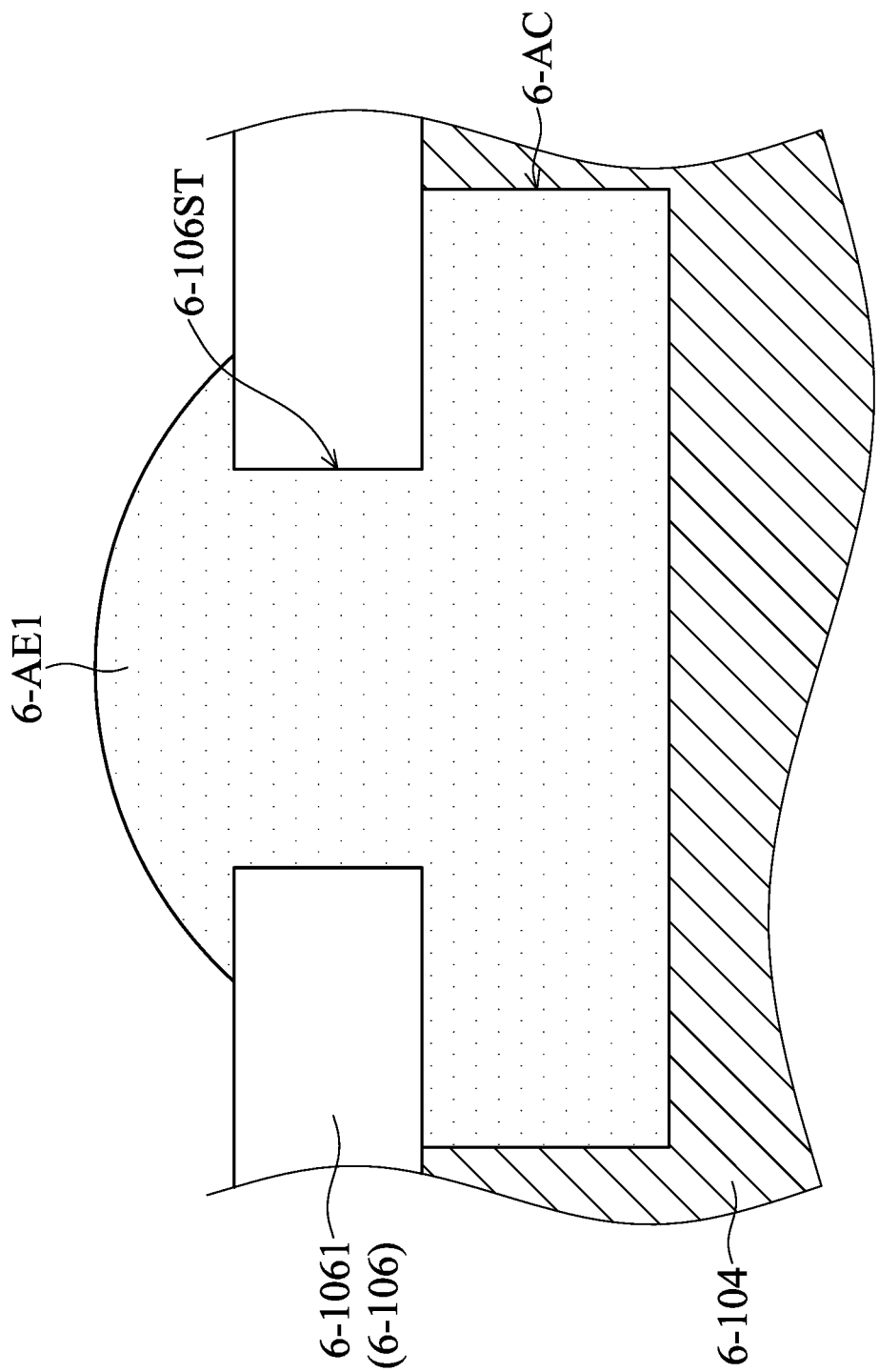
FIG. 74 is a cross-sectional view of the first elastic member 6-106 and the frame 6-104 along an extending direction of the slot 6-106ST according to an embodiment of the present disclosure.

Please refer to FIG. 73 and FIG. 74 together, and FIG. 74 is a cross-sectional view of the first elastic member 6-106 and the frame 6-104 along an extending direction of the slot 6-106ST according to an embodiment of the present disclosure. The frame 6-104 may further have an accommodating groove 6-AC corresponding to the slot 6-106ST. When viewed along the main axis 6-AX, the accommodating groove 6-AC is located between the two positioning columns 6-1044 and is configured to receive the first adhesive element 6-AE1.

When viewed along the extending direction of the slot 6-106ST, as shown in FIG. 74, the size of the accommodating groove 6-AC is larger than the size of the slot 6-106ST. The first adhesive element 6-AE1 can flow into the accommodating groove 6-AC through the slot 6-106ST, so that the outer positioning portion 6-1061 of the first elastic member 6-106 is more stably fixed to the frame 6-104.

In this embodiment, when viewed along the main axis 6-AX, the sizes of the two positioning columns 6-1044 are the same, but it is not limited to this. In other embodiments of the present disclosure, the sizes of the two positioning columns 6-1044 are different.

In the present disclosure, the elastic member 6-116 may also be referred to as the third elastic member, and the first elastic member 6-106 is connected to the base 6-112 through the third elastic member. As shown in FIG. 73, when viewed along the main axis 6-AX, the first elastic member 6-106 may further have an outer string 6-1064 connected to two ends of the outer positioning portion 6-1061.

It is worth noting that when viewed along the main axis 6-AX, the outer string 6-1064 can form at least one closed hole. As shown in FIG. 73, the outer string 6-1064 can form three closed hole 6-CO1, closed hole 6-CO2, and closed hole 6-CO3 with different sizes. Furthermore, when viewed along the main axis 6-AX, the elastic member 6-116 (the third elastic member) is located outside these closed holes.

Based on the design of the outer string 6-1064 and the outer positioning portion 6-1061, the problem of stress concentration can be avoided, thereby avoiding the first elastic member 6-106 from being broken when the movable assembly 6-MA moves.

Figure 75:
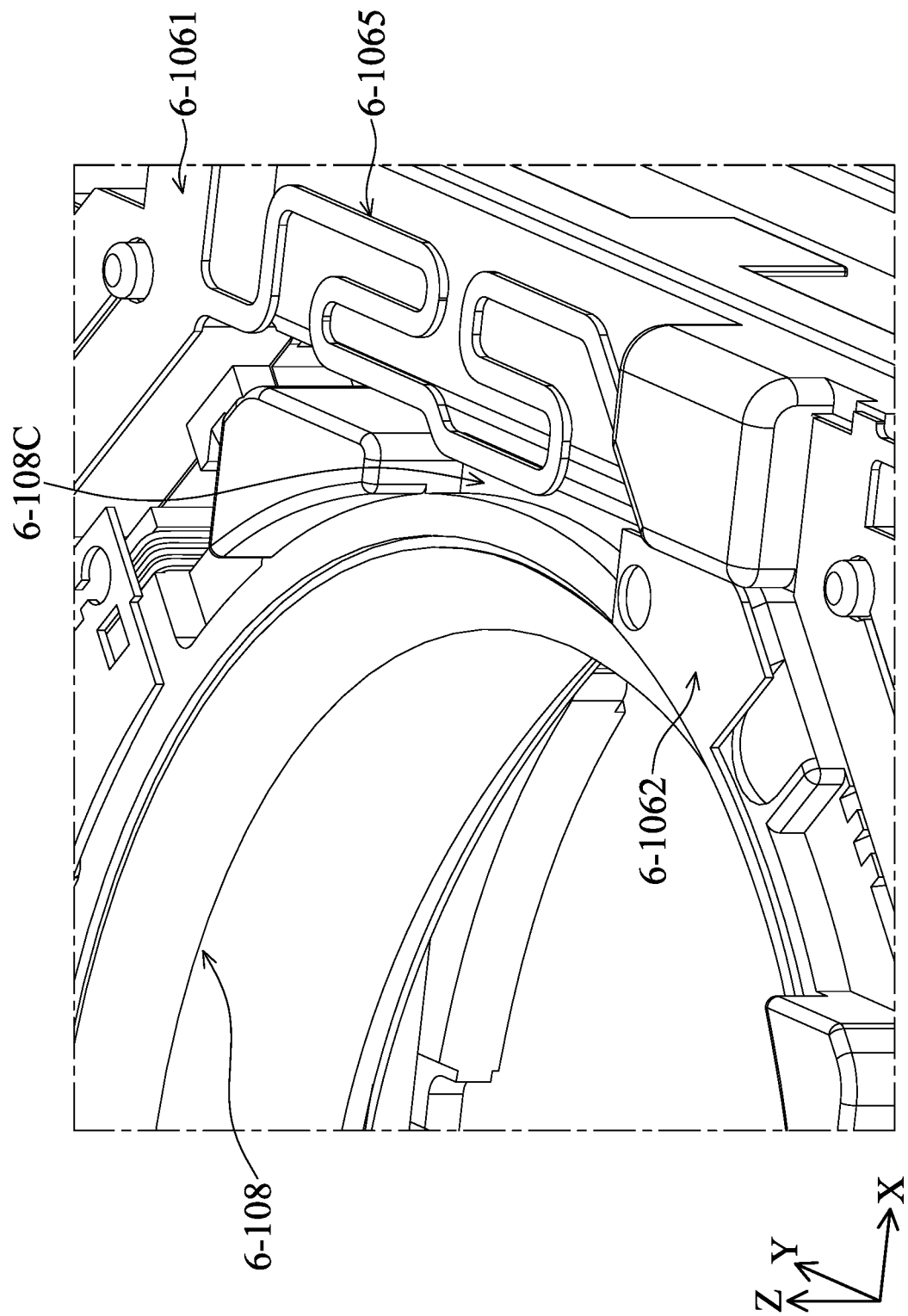
FIG. 75 is a perspective view of a partial structure of the optical element driving mechanism 6-100 according to an embodiment of the present disclosure.

Please refer to FIGS. 6 and 8, and FIG. 75 is a perspective view of a partial structure of the optical element driving mechanism 6-100 according to an embodiment of the present disclosure. In this embodiment, the first elastic member 6-106 further has at least one inner positioning portion 6-1062 fixedly connected to the lens holder 6-108.

The first elastic member 6-106 may further have at least one inner string 6-1065, and the outer positioning portion 6-1061 is connected to the inner positioning portion 6-1062 via the inner string 6-1065. Furthermore, as shown in FIG. 75, the lens holder 6-108 forms a concave structure 6-108C corresponding to at least a part of the inner string 6-1065.

Based on the design of the concave structure 6-108C, it can avoid the problem of breakage of the inner string 6-1065 caused by the collision between the inner string 6-1065 of the first elastic member 6-106 and the lens holder 6-108 when the movable assembly 6-MA moves.

Furthermore, as shown in FIG. 73, at least two grooves 6-108ST are formed on the lens holder 6-108 and are configured to dispose a first stabilizing element 6-SE1. The first stabilizing element 6-SE1 may be a gel, but it is not limited thereto. In addition, the frame 6-104 has a protrusion 6-1045 corresponding to the two grooves 6-108ST. When viewed along the main axis 6-AX, the protrusion 6-1045 can form a trapezoidal groove 6-104C which is configured to receive the first stabilizing element 6-SE1.

Based on the design of the grooves 6-108ST and the protrusion 6-1045, the process of disposing the first stabilizing element 6-SE1 can be implemented more easily, and the positioning accuracy of the first stabilizing element 6-SE1 can also be increased.

Figure 76:
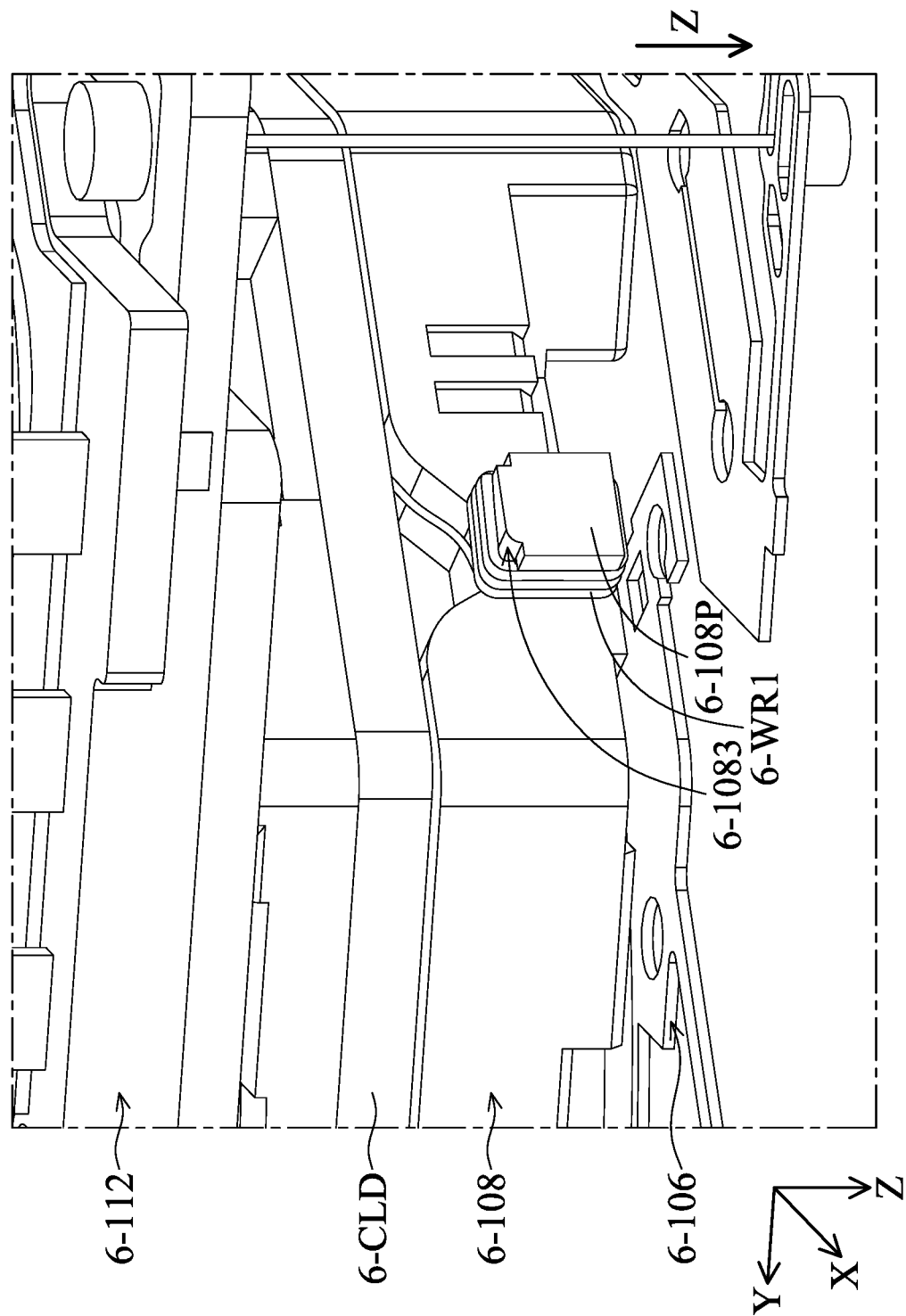
FIG. 76 is a perspective view of a partial structure of the optical element driving mechanism 6-100 in another view according to an embodiment of the present disclosure.

Please refer to FIG. 76, which is a perspective view of a partial structure of the optical element driving mechanism 6-100 in another view according to an embodiment of the present disclosure. As shown in FIG. 76, the driving coil 6-CLD is disposed on the lens holder 6-108, the lens holder 6-108 has a winding structure 6-108P, and a leading wire 6-WR1 of the driving coil 6-CLD is wound on the winding structure 6-108P.

When viewed along the extending direction of the winding structure 6-108P, the winding structure 6-108P has a fillet 6-1083 configured to guide the leading wire 6-WR1. Based on the structural design of the fillet 6-1083, the leading wire 6-WR1 can be wound around the winding structure 6-108P more stably and is not easily broken.

The present disclosure provides an optical element driving mechanism 6-100, which includes a plurality of circuit members disposed in the base 6-112. The first circuit member 6-117 has a plurality of pins arranged on the four sides of the base 6-112, and the first circuit member 6-117 is configured to be electrically grounded. The pin 6-1171 has three protruding portions 6-1173, which can be fixed to the notch 6-102C of the casing 6-102 by laser welding. Based on this structural design, more welding points can be implemented on one single pin 6-1171, thereby increasing the connection strength between the first circuit member 6-117 and the casing 6-102, and the advantages of simplifying the welding process can be achieved at the same time.

In addition, the first elastic member 6-106 has an outer positioning portion 6-1061 positioned on the frame 6-104, and the first elastic member 6-106 may further have an outer string 6-1064 connected to two ends of the outer positioning portion 6-1061. The outer string 6-1064 may form multiple closed holes with different sizes, and the third elastic member is located outside these closed holes. Based on the design of the outer string 6-1064 and the outer positioning portion 6-1061, the problem of stress concentration can be avoided.

Figure 77:
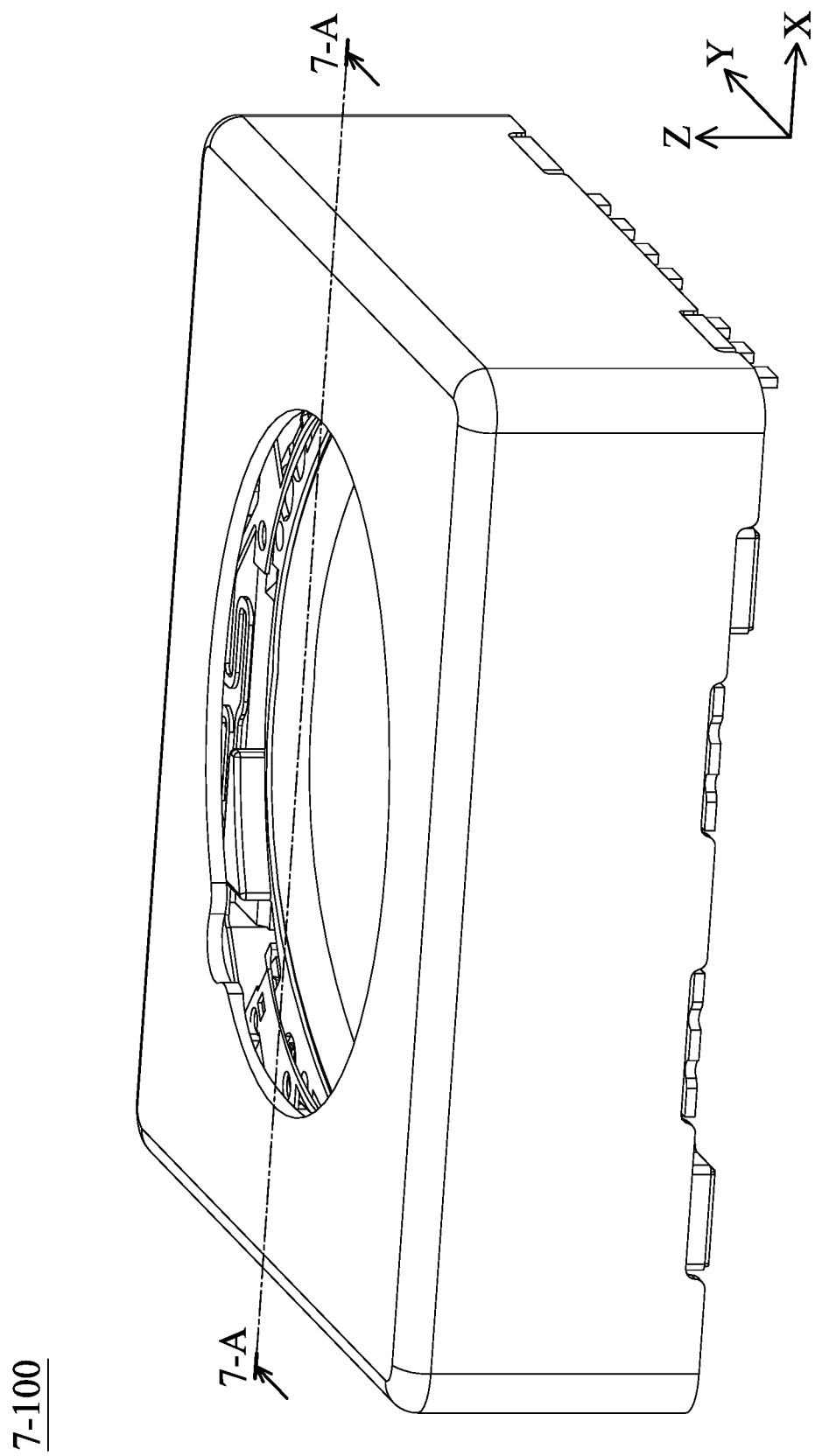
FIG. 77 is a schematic diagram of an optical element driving mechanism 7-100 according to an embodiment of the present disclosure.
Figure 78:
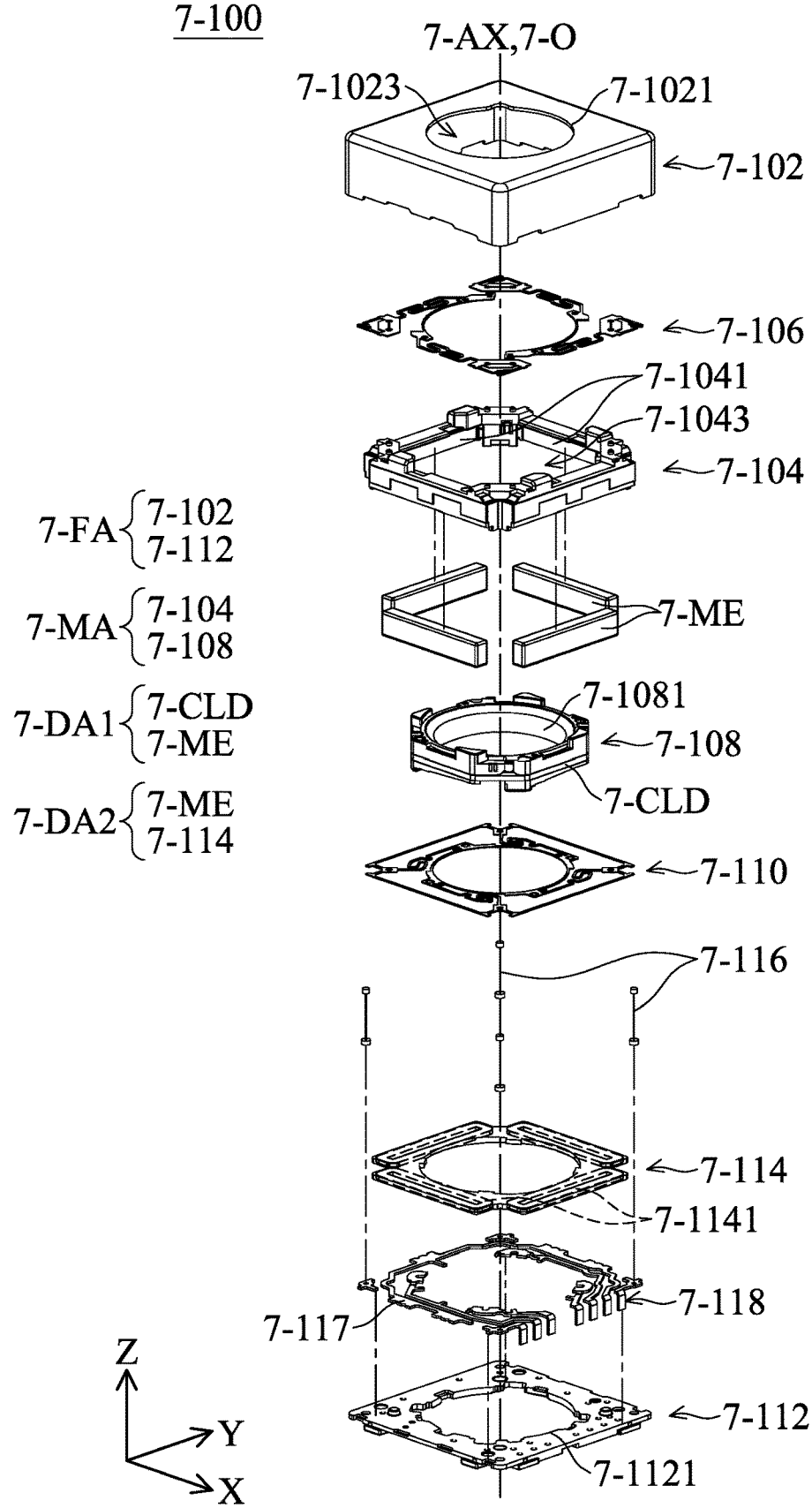
FIG. 78 is an exploded diagram of the optical element driving mechanism 7-100 according to an embodiment of the present disclosure.
Figure 79:
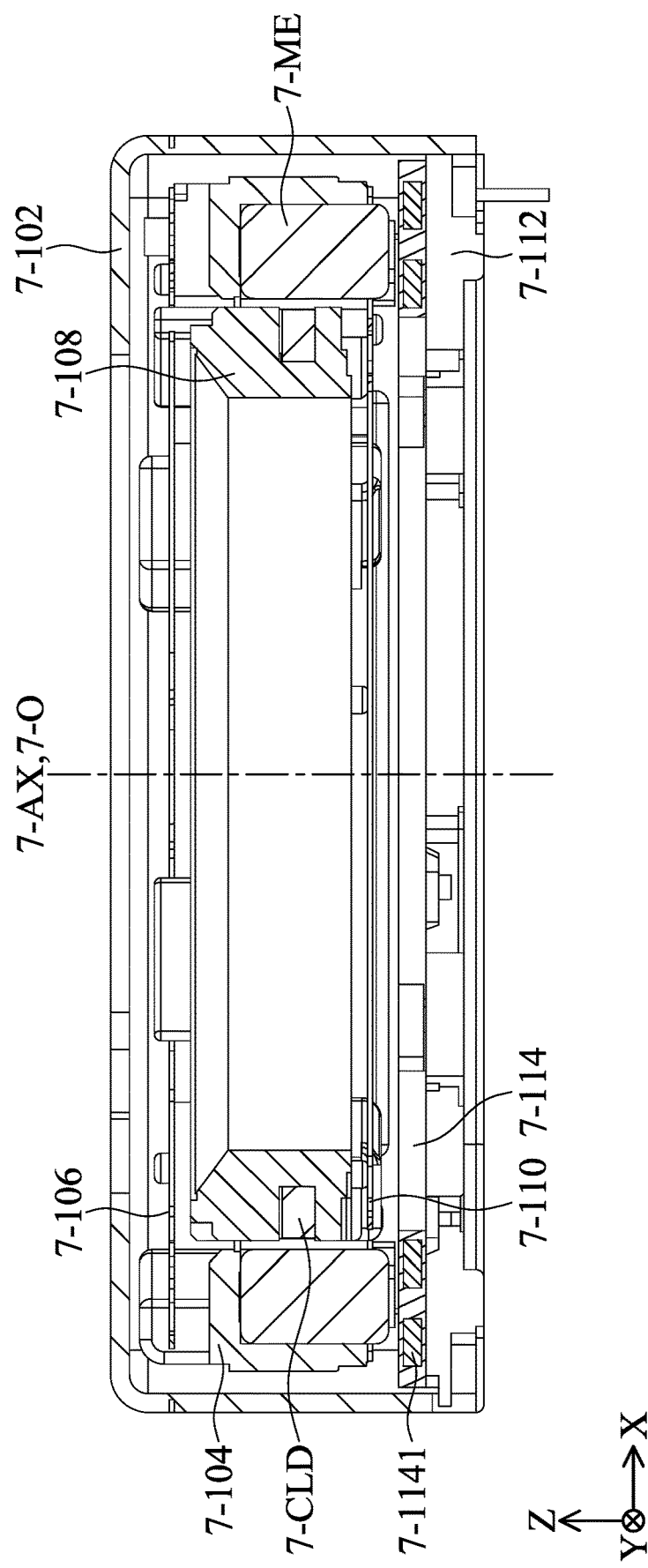
FIG. 79 is a cross-sectional view of the optical element driving mechanism 7-100 along line 7-A-7-A in FIG. 77 according to an embodiment of the present disclosure.

Please refer to FIG. 77 to FIG. 79. FIG. 77 is a schematic diagram of an optical element driving mechanism 7-100 according to an embodiment of the present disclosure, FIG. 78 is an exploded diagram of the optical element driving mechanism 7-100 according to an embodiment of the present disclosure, and FIG. 79 is a cross-sectional view of the optical element driving mechanism 7-100 along line 7-A-7-A in FIG. 77 according to an embodiment of the present disclosure. The optical element driving mechanism 7-100 can be an optical camera system and can be configured to hold and drive an optical element. The optical element driving mechanism 7-100 can be installed in various electronic devices or portable electronic devices, such as a smartphone, for allowing a user to perform the image capturing function. In this embodiment, the optical element driving mechanism 7-100 can be a voice coil motor (VCM) with an auto-focusing (AF) function, but it is not limited thereto. In other embodiments, the optical element driving mechanism 7-100 can also perform the functions of auto-focusing and optical image stabilization (OIS).

In this embodiment, the optical element driving mechanism 7-100 may include a fixed assembly 7-FA, a movable assembly 7-MA, a first driving assembly 7-DA1, and a second driving assembly 7-DA2. The movable assembly 7-MA is movably connected to the fixed assembly 7-FA, and the movable assembly 7-MA is configured to hold an optical element (not shown in the figures). The first driving assembly 7-DA1 and the second driving assembly 7-DA2 are configured to drive the movable assembly 7-MA to move relative to the fixed assembly 7-FA.

In this embodiment, as shown in FIG. 78, the fixed assembly 7-FA includes a casing 7-102 and a base 7-112, and the movable assembly 7-MA includes a lens holder 7-108, the aforementioned optical element and the frame 7-104, and the lens holder 7-108 is used to hold the optical element.

The casing 7-102 has a hollow structure, and a casing opening 7-1021 is formed on the casing 7-102. A base opening 7-1121 is formed on the base 7-112. The center of the casing opening 7-1021 corresponds to an optical axis 7-O of the optical element (not shown in the figures) which is held by the lens holder 7-108. The base opening 7-1121 corresponds to an image sensing element (now shown in the figures) disposed below the base 7-112. The casing 7-102 is fixedly connected to the base 7-112 and can include an accommodating space 1023 for accommodating the movable assembly 7-MA (including the aforementioned optical element and the lens holder 7-108) and these driving assemblies.

Furthermore, the first driving assembly 7-DA1 may include a driving coil 7-CLD and four magnetic elements 7-ME. The second driving assembly 7-DA2 can include four magnetic elements 7-ME and a circuit assembly 7-114. The circuit assembly 7-114 may be a circuit board, and four induction coils 7-1141 are disposed in the circuit assembly 7-114. The number of induction coils 7-1141 is not limited to this embodiment.

As shown in FIG. 78, the lens holder 7-108 has a hollow ring structure, and the lens holder 7-108 has a through hole 7-1081. The through hole 7-1081 forms a threaded structure (not shown) corresponding to another threaded structure (not shown) on the optical element, such that the optical element can be locked in the through hole 7-1081. In this embodiment, the driving coil 7-CLD surrounds the lens holder 7-108. In addition, the frame 7-104 has a plurality of grooves 1041 and a central opening 7-1043. In this embodiment, the frame 7-104 has four grooves 1041 for accommodating the four magnetic elements 7-ME, but the amounts of the grooves 1041 and the magnetic elements 7-ME are not limited thereto. The lens holder 7-108 and the aforementioned optical element are disposed in the central opening 7-1043 and are movable relative to the frame 7-104.

In this embodiment, the optical element driving mechanism 7-100 further includes a first elastic member 7-106 and a second elastic member 7-110. The lens holder 7-108 can be connected to the frame 7-104 through the first elastic member 7-106 and the second elastic member 7-110 to be suspended within the central opening 7-1043. When the driving coil 7-CLD is provided with electricity, the four magnetic elements 7-ME act with the driving coil 7-CLD to generate an electromagnetic driving force, thereby driving the lens holder 7-108 to move along the optical axis 7-O (the Z-axis) relative to the frame 7-104, so as to perform the function of auto focus (Auto Focusing).

In addition, as shown in FIG. 78, the optical element driving mechanism 7-100 further includes four elastic members 7-116 (the third elastic member). Each of the elastic members 7-116 has a long strip-shaped structure, such as a column-shaped structure or a line-shaped structure, but the shape is not limited thereto. In this embodiment, one end of the elastic member 7-116 is connected to the first elastic member 7-106, and the other end of the elastic member 7-116 is connected to the base 7-112 and is electrically connected to the circuit assembly 7-114. Based on the structural configuration, the lens holder 7-108 with the optical element (not shown in the figures) and the frame 7-104 can move relative to the base 7-112 along a direction parallel to the X-Y plane through the four flexible elastic members 7-116.

When the induction coils 7-1141 are provided with electricity and act with the corresponding magnetic elements 7-ME, an electromagnetic driving force is generated to drive the lens holder 7-108 and the optical element to move along the Y-axis or the X-axis. As a result, when the optical element driving mechanism 7-100 is shaken, the lens holder 7-108 can be driven by the electromagnetic force to move along the X-Y plane, so as to achieve the purpose of optical image stabilization (OIS).

Please refer to FIG. 78. In this embodiment, the casing 7-102 and the base 7-112 are arranged along a main axis 7-AX, and the optical element driving mechanism 7-100 may include a plurality of circuit members, which are made of metal. For example, the optical element driving mechanism 7-100 may include a first circuit member 7-117 and a plurality of second circuit members 7-118.

Furthermore, in this embodiment, these circuit members are disposed inside the base 7-112. For example, the base 7-112 is made of plastic materials, and the circuit members are formed in base 7-112 in the form of molded interconnect devices (MID).

That is, the first circuit member 7-117 and the second circuit members 7-118 are buried in the base 7-112. Furthermore, the first circuit member 7-117 is configured to be electrically grounded, and the second circuit members 7-118 are configured to transmit electronic signals. In addition, the first circuit member 7-117 is configured to be fixedly connected to the casing 7-102 of the fixed assembly 7-FA.

Figure 80:
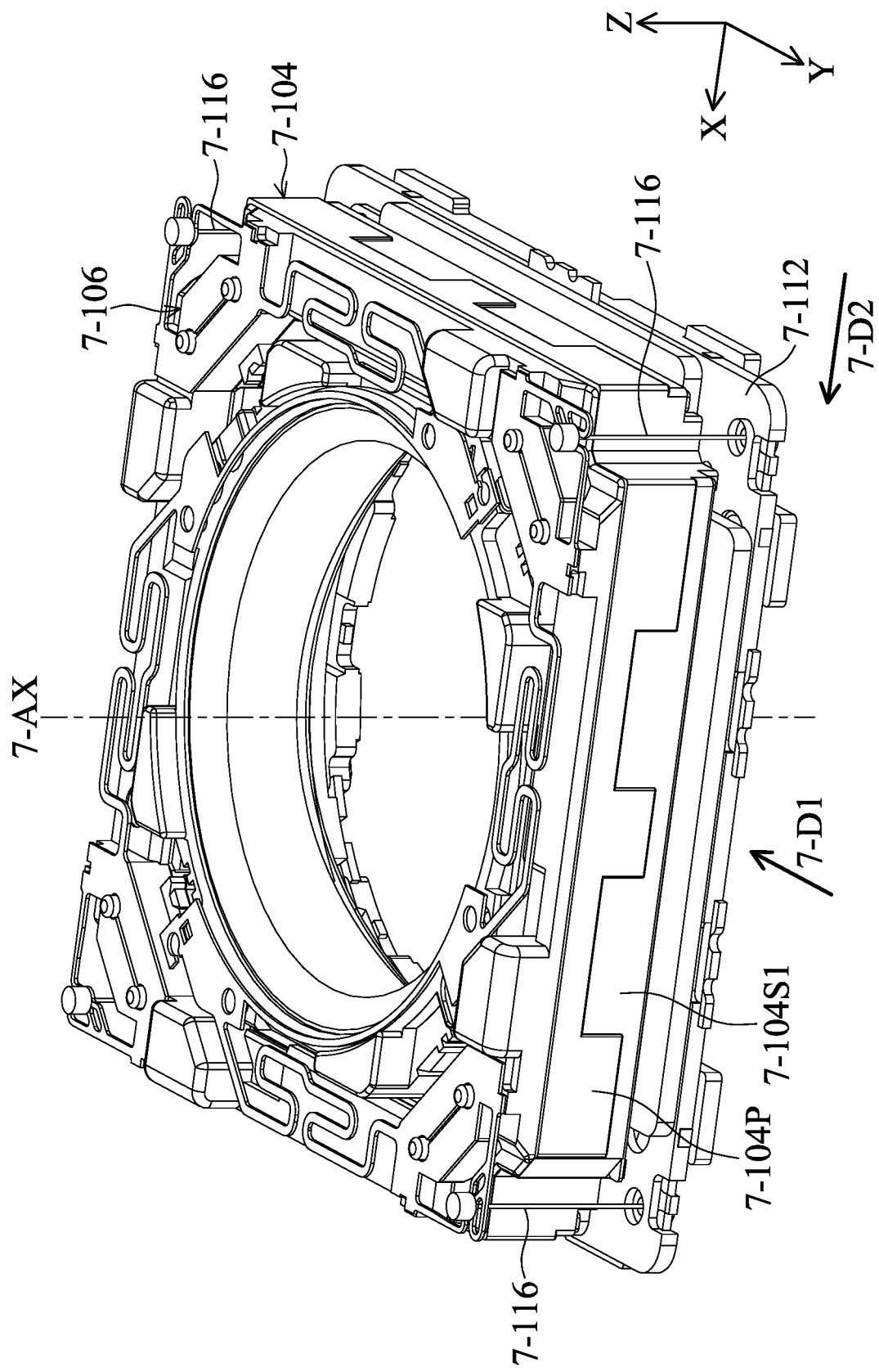
FIG. 80 is a perspective view of the optical element driving mechanism 7-100 after the casing 7-102 is removed according to an embodiment of the present disclosure.

Please refer to FIG. 80, which is a perspective view of the optical element driving mechanism 7-100 after the casing 7-102 is removed according to an embodiment of the present disclosure. As shown in FIG. 80, the first elastic member 7-106 is connected to the base 7-112 through the elastic member 7-116 (third elastic member).

Furthermore, the frame 7-104 may have a polygonal structure. For example, in this embodiment, when viewed along the main axis 7-AX, the frame 7-104 may have a rectangular structure. In addition, a stopping structure 7-104P can be formed on the frame 7-104 and protrudes from a side 7-104S1 of the frame 7-104. Specifically, four stopping structures 7-104P can be formed on the frame 7-104, and the four stopping structures 7-104P are respectively located on four sides of the frame 7-104.

In the present disclosure, the second driving assembly 7-DA2 is configured to drive the movable assembly 7-MA to move along a first direction 7-D1 and/or a second direction 7-D2. The first direction 7-D1 is perpendicular to the main axis 7-AX, and the first direction 7-D1 is perpendicular to the second direction 7-D2.

These stopping structures 7-104P are configured to be in contact with the casing 7-102 when the frame 7-104 moves, so as to limit the movement range the frame 7-104. It is worth noting that the stopping structure 7-104P can have an E-shaped structure, so that the impact area can be increased, thereby dispersing the impact pressure and avoiding particles.

Figure 81:
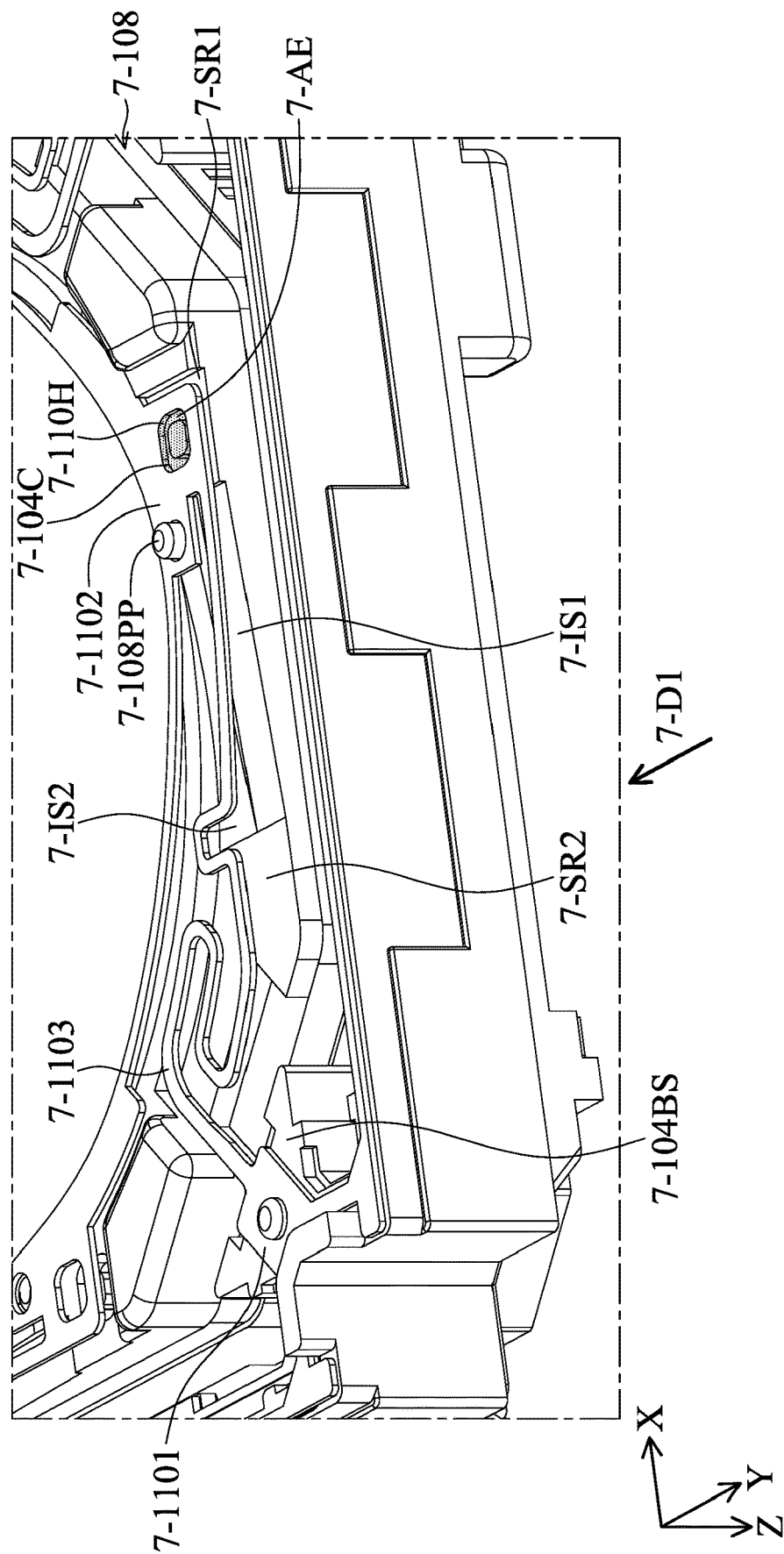
FIG. 81 is a schematic diagram of the frame 7-104, the lens holder 7-108, and the second elastic member 7-110 viewed from the bottom according to an embodiment of the present disclosure.
Figure 82:
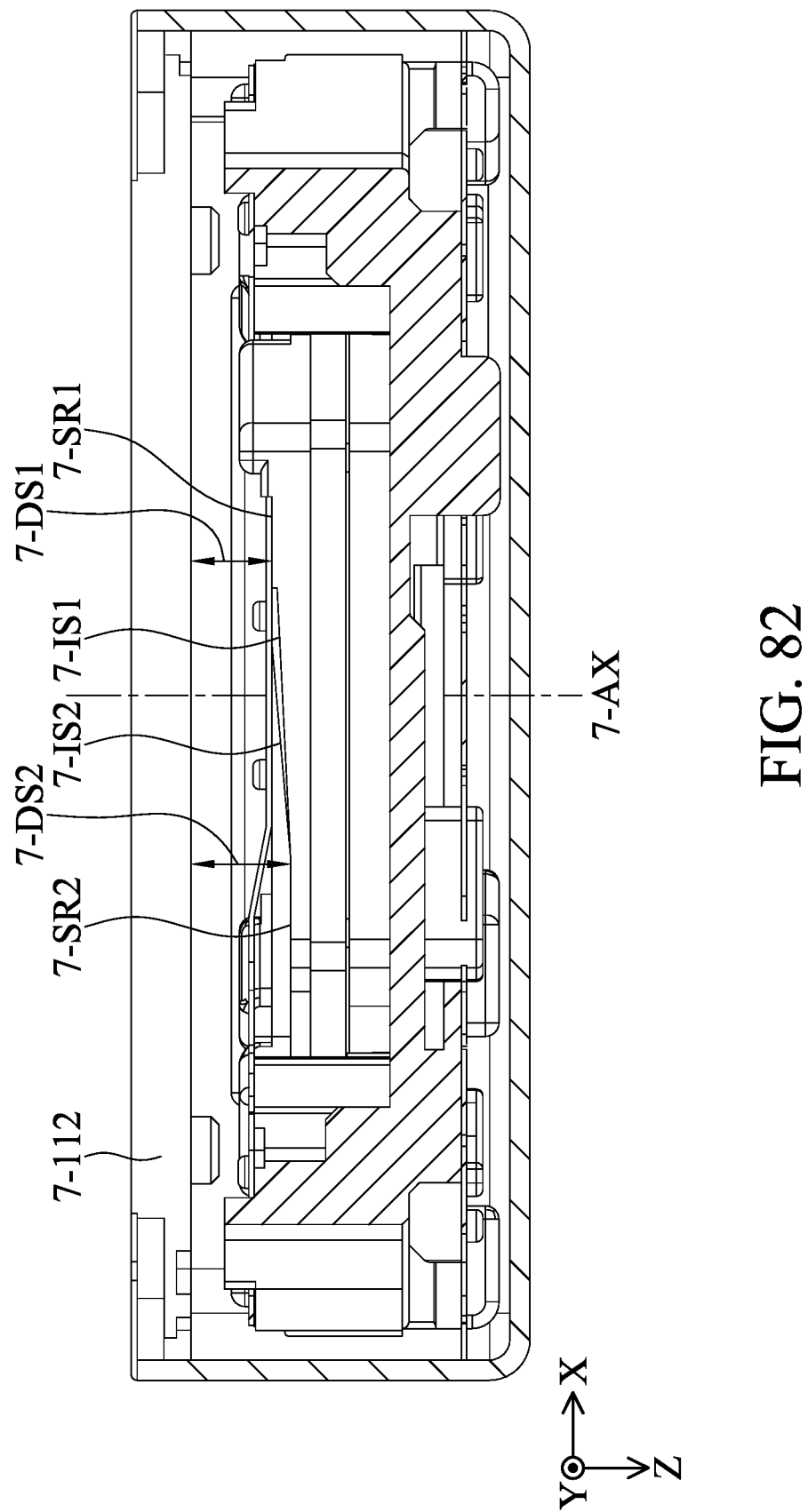
FIG. 82 is a cross-sectional view of the optical element driving mechanism 7-100 in another view according to an embodiment of the present disclosure.
Figure 83:
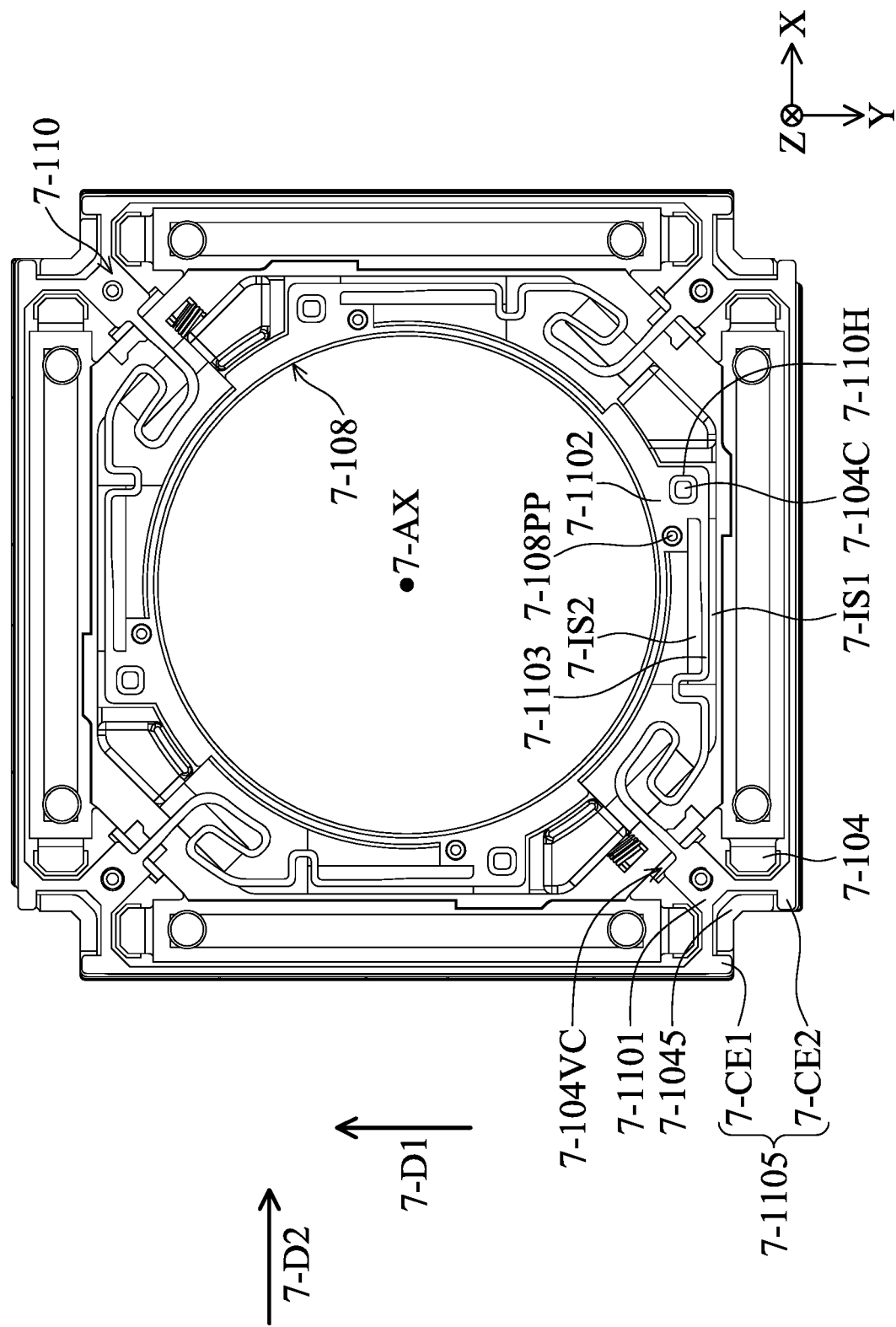
FIG. 83 is a bottom view of the frame 7-104, the lens holder 7-108, and the second elastic 7-110 according to an embodiment of the present disclosure.

Please refer to FIG. 81 to FIG. 83. FIG. 81 is a schematic diagram of the frame 7-104, the lens holder 7-108, and the second elastic member 7-110 viewed from the bottom according to an embodiment of the present disclosure, FIG. 82 is a cross-sectional view of the optical element driving mechanism 7-100 in another view according to an embodiment of the present disclosure, and FIG. 83 is a bottom view of the frame 7-104, the lens holder 7-108, and the second elastic 7-110 according to an embodiment of the present disclosure.

As shown in the figures, the second elastic member 7-110 has an inner positioning portion 7-1102 connected to the lens holder 7-108. The lens holder 7-108 has a protruding portion 7-108PP passing through the inner positioning portion 7-1102, so that the second elastic member 7-110 is fixedly connected to the lens holder 7-108.

In addition, the inner positioning portion 7-1102 has an opening 7-110H, the frame 7-104 has a positioning groove 7-104C corresponding to the opening 7-110H, and the positioning groove 7-104C is configured to accommodate an adhesive element 7-AE. For example, the adhesive element 7-AE may be glue and is configured to fix the inner positioning portion 7-1102 to the lens holder 7-108.

It should be noted that the protruding portion 7-108PP is, for example, engaged with the inner positioning portion 7-1102, and the opening 7-110H is adjacent to the protruding portion 7-108PP. Based on the above design, the connection strength between the inner positioning portion 7-1102 and the lens holder 7-108 can be increased.

As shown in FIG. 81 and FIG. 82, the lens holder 7-108 has a contact surface 7-SR1 and a non-contact surface 7-SR2. The contact surface 7-SR1 is configured to contact the inner positioning portion 7-1102, and the non-contact surface 7-SR2 does not contact the inner positioning portion 7-1102. A first inclined surface 7-IS1 and a second inclined surface 7-IS2 are formed between the contact surface 7-SR1 and the non-contact surface 7-SR2.

As shown in FIG. 82, when viewed along the first direction 7-D1 perpendicular to the main axis 7-AX, the slope of the second inclined surface 7-IS2 is greater than the slope of the first inclined surface 7-IS1. In addition, as shown in FIG. 83, when viewed along the main axis 7-AX, the shortest distance between the second inclined surface 7-IS2 and the main axis 7-AX is less than the shortest distance between the first inclined surface 7-IS1 and the main axis 7-AX.

Furthermore, when viewed along the first direction 7-D1, a first distance 7-DS1 between the contact surface 7-SR1 and the base 7-112 along the main axis 7-AX is less than a second distance 7-DS2 between the non-contact surface 7-SR2 and the base 7-112 along the main axis 7-AX. When viewed along the main axis 7-AX, the first inclined surface 7-IS1 overlaps at least a part of the second elastic member 7-110.

Specifically, as shown in FIG. 81 and FIG. 83, the second elastic member 7-110 includes an outer positioning portion 7-1101 and a connecting string 7-1103. The outer positioning portion 7-1101 is fixedly connected to the frame 7-104, and the outer positioning portion 7-1101 is connected to the inner positioning portion 7-1102 via the connecting string 7-1103. When viewed along the main axis 7-AX, the first inclined surface 7-IS1 and/or the second inclined surface 7-IS2 overlap the connecting string 7-1103.

Figure 84:
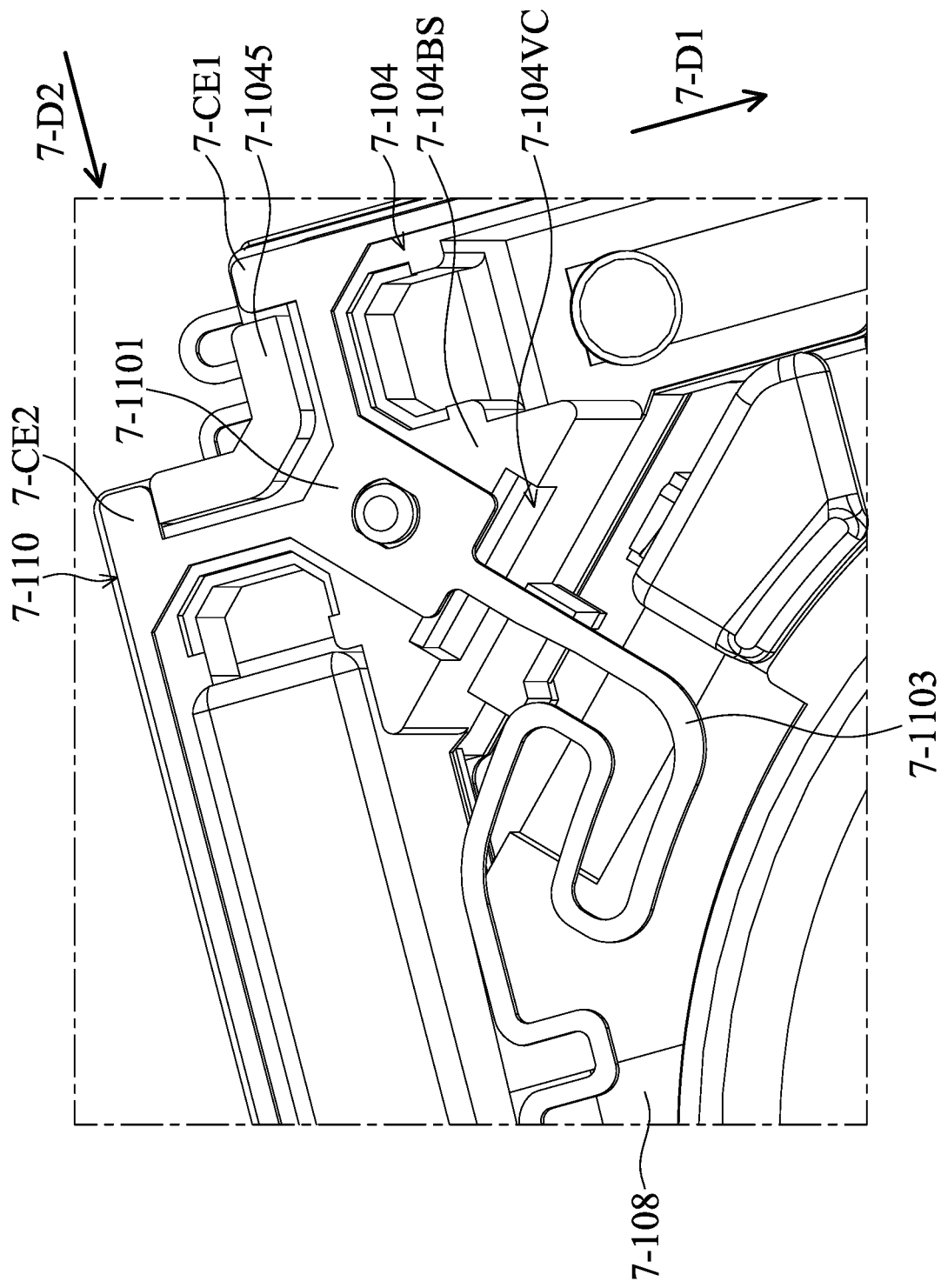
FIG. 84 is a schematic diagram of the frame 7-104, the lens holder 7-108, and the second elastic member 7-110 in another view according to an embodiment of the present disclosure.

Please refer to FIG. 81 and FIG. 84. FIG. 84 is a schematic diagram of the frame 7-104, the lens holder 7-108, and the second elastic member 7-110 in another view according to an embodiment of the present disclosure. As shown in the figures, the frame 7-104 has a bottom surface 7-104BS, and the outer positioning portion 7-1101 is in contact with the bottom surface 7-104BS.

In addition, the frame 7-104 has an evasion groove 7-104VC, which is recessed from the bottom surface 7-104BS along the main axis 7-AX (the Z-axis). When viewed along the main axis 7-AX, the evasion groove 7-104VC overlaps at least a part of the connecting string 7-1103. Based on this structural design, it can avoid the problem of breakage of the connecting string 7-1103 caused by the collision between the connecting string 7-1103 and the frame 7-104 when the lens holder 7-108 moves.

As shown in FIG. 83 and FIG. 84, the frame 7-104 may have a protruding structure 7-1045, which is protruded from the bottom surface 7-104BS along the main axis 7-AX. Furthermore, the outer positioning portion 7-1101 may have a clamp structure 7-1105, and when viewed along the main axis 7-AX, the clamp structure 7-1105 surrounds at least a part of the protruding structure 7-1045.

For example, the clamping structure has a first clamping end 7-CE1 and a second clamping end 7-CE2. When viewed along the first direction 7-D1, the second clamping end 7-CE2 overlaps the protruding structure 7-1045, and when viewed along the second direction 7-D2 perpendicular to the main axis 7-AX, the first clamping end 7-CE1 overlaps the protruding structure 7-1045. Based on this structural design, the positioning accuracy of the second elastic member 7-110 on the frame 7-104 can be increased.

Figure 85:
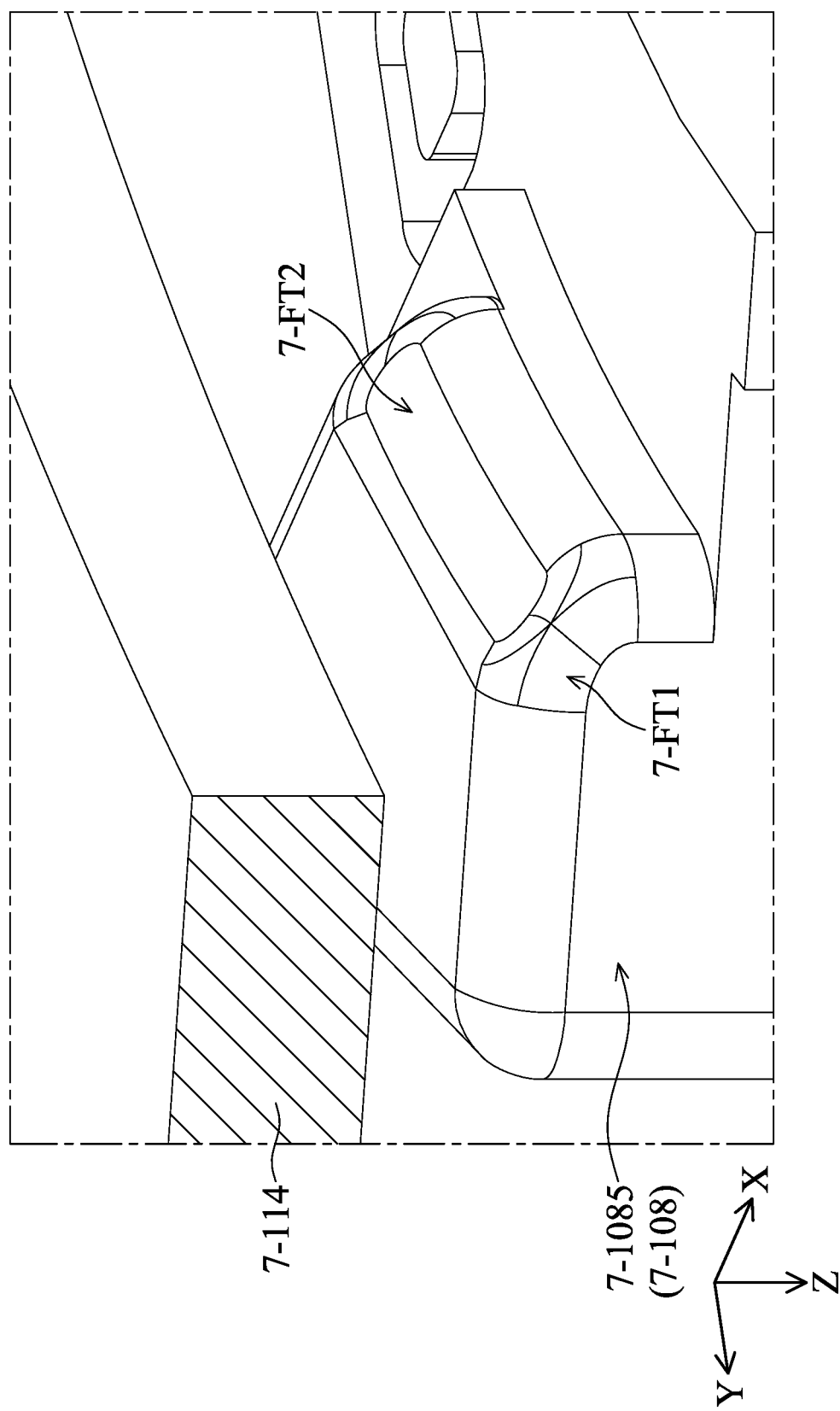
FIG. 85 is a perspective cross-sectional view of the lens holder 7-108 and the circuit assembly 7-114 in another view according to an embodiment of the present disclosure.

Please refer to FIG. 85, which is a perspective cross-sectional view of the lens holder 7-108 and the circuit assembly 7-114 in another view according to an embodiment of the present disclosure. As shown in FIG. 85, the lens holder 7-108 has a blocking member 7-1085 configured to be in contact with the circuit assembly 7-114 of the second driving assembly 7-DA2 when the lens holder 7-108 moves.

The blocking member 7-1085 is configured to limit the range of movement of the lens holder 7-108 along the main axis 7-AX, and the blocking member 7-1085 may have a first fillet 7-FT1 and a second fillet 7-FT2. The first fillet 7-FT1 is a protruding structure, the second fillet 7-FT2 is a recessed structure, and the second fillet 7-FT2 is located in the first fillet 7-FT1.

Based on the design of the first fillet 7-FT1 and the second fillet 7-FT2, the problem of particles resulted from the collision between the blocking member 7-1085 and the circuit assembly 7-114 can be avoided.

Figure 86:
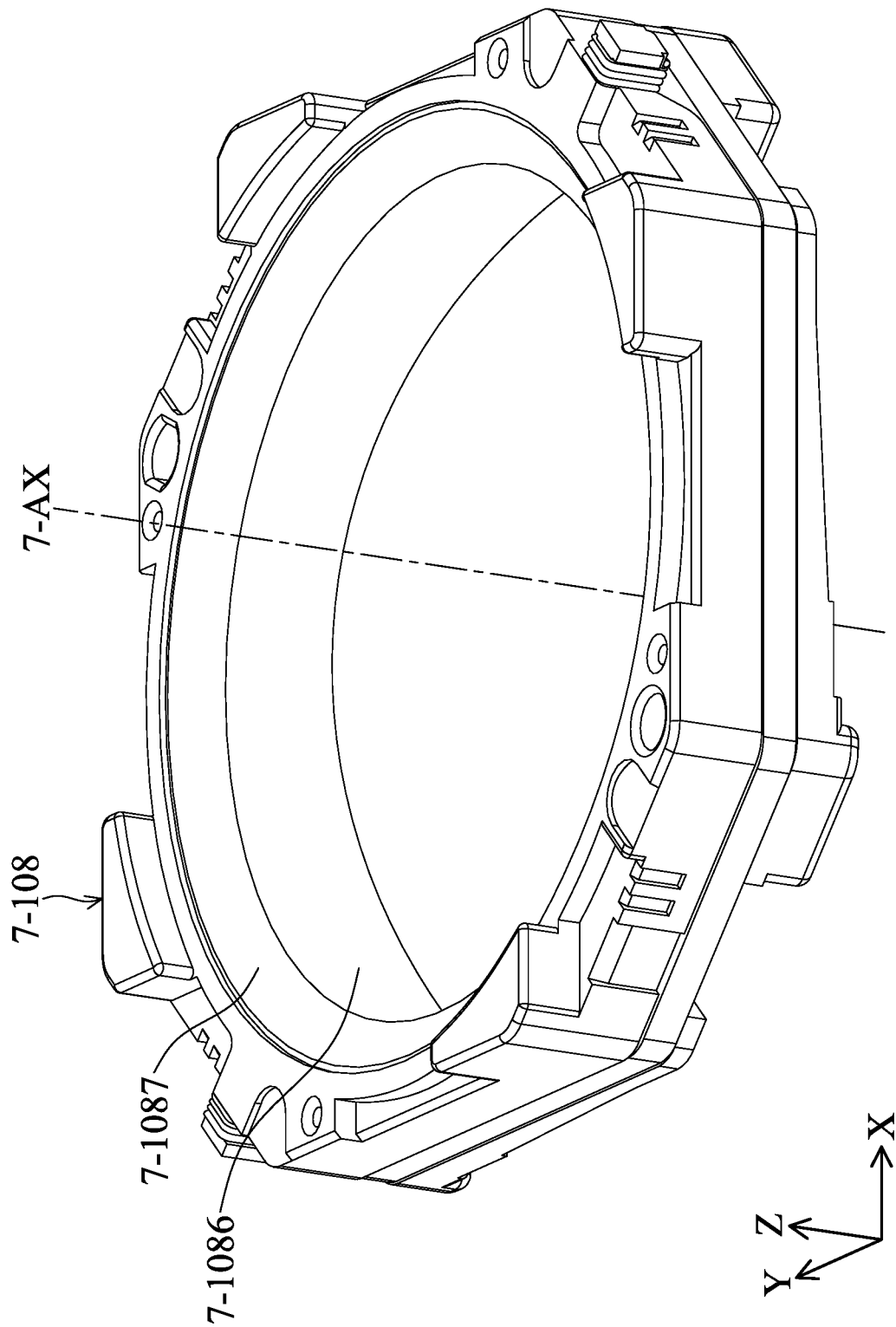
FIG. 86 is a schematic diagram of the lens holder 7-108 according to an embodiment of the present disclosure.

Please refer to FIG. 86, which is a schematic diagram of the lens holder 7-108 according to an embodiment of the present disclosure. In this embodiment, the lens holder 7-108 has a first inner ring surface 7-1086 and a second inner ring surface 7-1087. The first inner ring surface 7-1086 is parallel to the main axis 7-AX, and the second inner ring surface 7-1087 is not parallel to the main axis 7-AX. Based on this structural design, the lens holder 7-108 can hold a camera lens (the optical element) with a large lens, and the connection strength between the lens holder 7-108 and the camera lens can also be increased.

Figure 87:
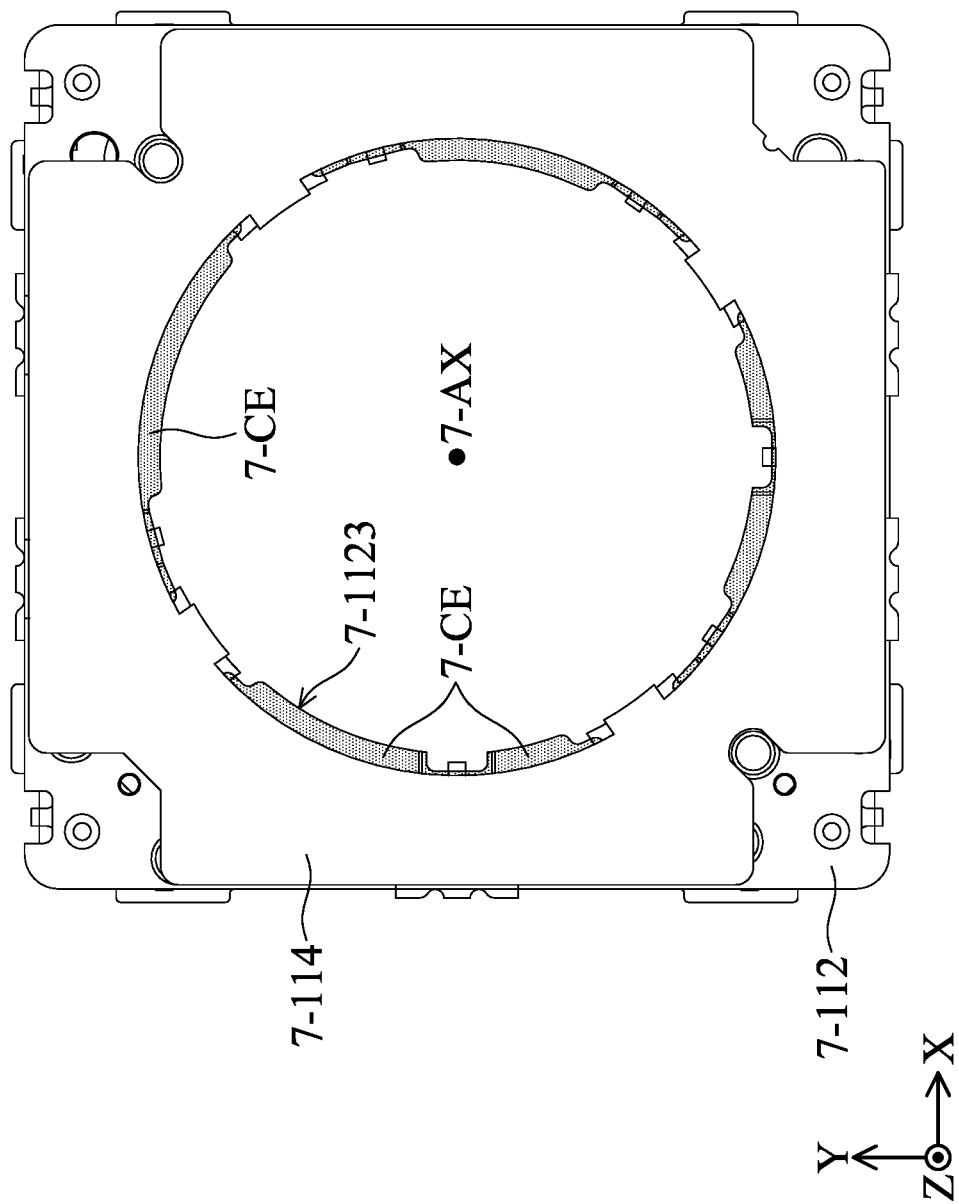
FIG. 87 is a top view of the circuit assembly 7-114 and the base 7-112 according to an embodiment of the present disclosure.
Figure 88:
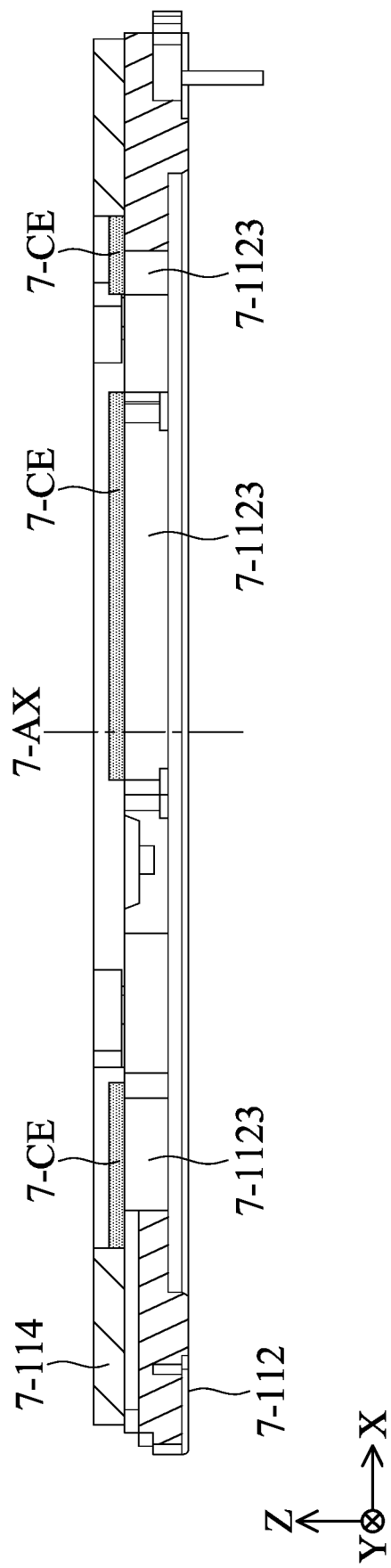
FIG. 88 is a cross-sectional view of the circuit assembly 7-114 and the base 7-112 according to an embodiment of the present disclosure.

Please refer to FIG. 87 and FIG. 88. FIG. 87 is a top view of the circuit assembly 7-114 and the base 7-112 according to an embodiment of the present disclosure, and FIG. 88 is a cross-sectional view of the circuit assembly 7-114 and the base 7-112 according to an embodiment of the present disclosure. In this embodiment, when viewed along the main axis 7-AX, a part (a supporting portion 7-1123) of the base 7-112 is protruded from the circuit assembly 7-114 of the second driving assembly 7-DA2.

Furthermore, the optical element driving mechanism 7-100 may further include a capturing element 7-CE, which is fixedly disposed on the supporting portion 7-1123, and the capturing element 7-CE is configured to capture dust or particles inside the optical element driving mechanism 7-100. For example, the capturing element 7-CE can be glue configured to stick dust or particles to prevent the dust or particles from falling onto the image sensor under the base 7-112.

The present disclosure provides an optical element driving mechanism 7-100, and the outer positioning portion 7-1101 of the second elastic member 7-110 is connected to the frame 7-104. The inner positioning portion 7-1102 of the second elastic member 7-110 is connected to the bottom of the lens holder 7-108. The lens holder 7-108 can form the first inclined surface 7-IS1 and the second inclined surface 7-IS2, and the frame 7-104 can form the evasion groove 7-104VC, so that it can avoid the problem of breakage of the connecting string 7-1103 caused by the collision between the connecting string 7-1103 and the frame 7-104 (or the lens holder 7-108) when the movable assembly 7-MA moves, and miniaturization can also be achieved.

In addition, the frame 7-104 may have a protruding structure 7-1045, which is protruded from the bottom surface 7-104BS along the main axis 7-AX. The outer positioning portion 7-1101 may have a clamp structure 7-1105, and when viewed along the main axis 7-AX, the clamp structure 7-1105 surrounds at least a part of the protruding structure 7-1045. Based on this structural design, the positioning accuracy of the second elastic member 7-110 on the frame 7-104 can be increased.

Figure 89:
FIG. 89 shows a schematic view of an electrical device with an optical element driving mechanism according to an embodiment of the present disclosure.

Please refer to FIG. 89, an optical element driving mechanism 8-OM of an embodiment of the present disclosure may be mounted in an electrical device 8-1 for taking photos or videos, wherein the aforementioned electrical device 8-1 may, for example, be a smartphone or a digital camera, but the present disclosure is not limited to these. It should be noted that the position and the size between the optical element driving mechanism 8-OM and the electrical device 8-1 shown in FIG. 89 are only an example, which is not for limiting the position and the size between the optical element driving mechanism 8-OM and the electrical device 8-1. In fact, according to different needs, the optical element driving mechanism 8-OM may be mounted at different positions in the electrical device 8-1.

Figure 90:
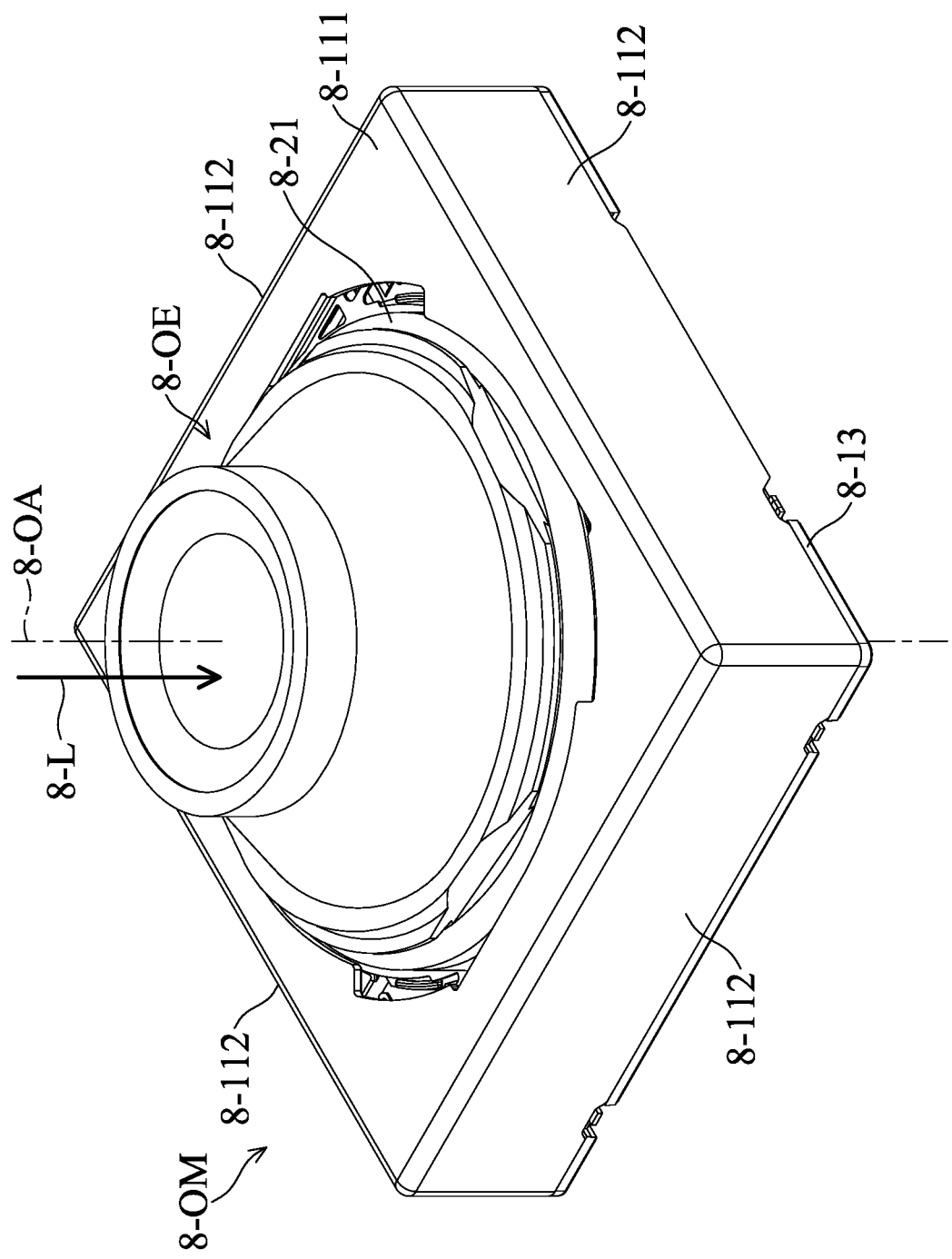
FIG. 90 shows a schematic view of the optical element driving mechanism and an optical element according to an embodiment of the present disclosure.

Please refer to FIG. 90, the optical element driving mechanism 8-OM carries an optical element 8-OE. An image sensor module may be disposed inside or outside of the optical element driving mechanism 8-OM. The image sensor module is located at the downstream of the light entry of the optical element driving mechanism 8-OM. A light 8-L incident to the optical element 8-OE in the optical element driving mechanism 8-OM along an optical axis 8-OA, and then arrives at the image sensor module for imaging.

Figure 91:
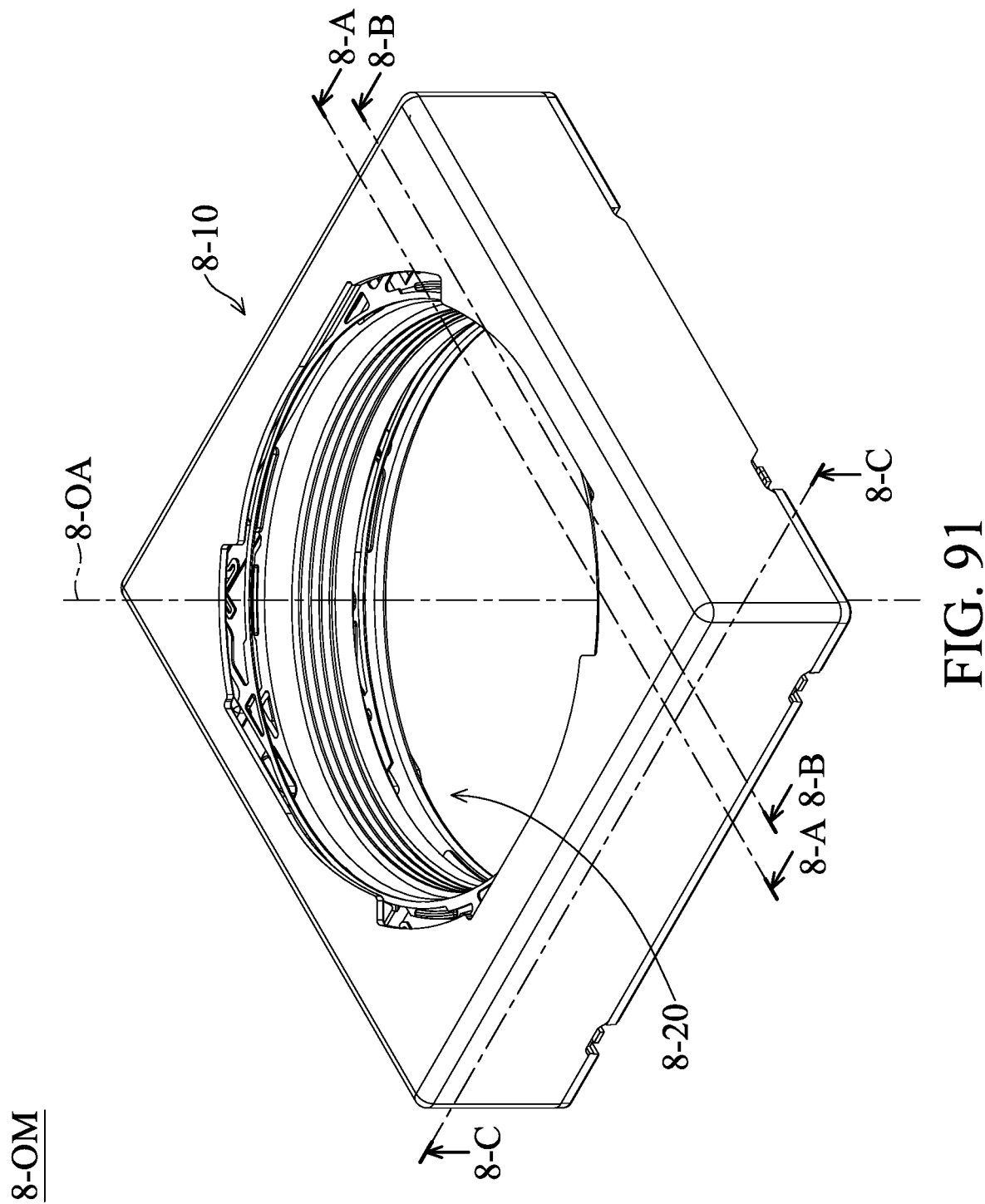
FIG. 91 shows a perspective view of the optical element driving mechanism according to an embodiment of the present disclosure.
Figure 92:
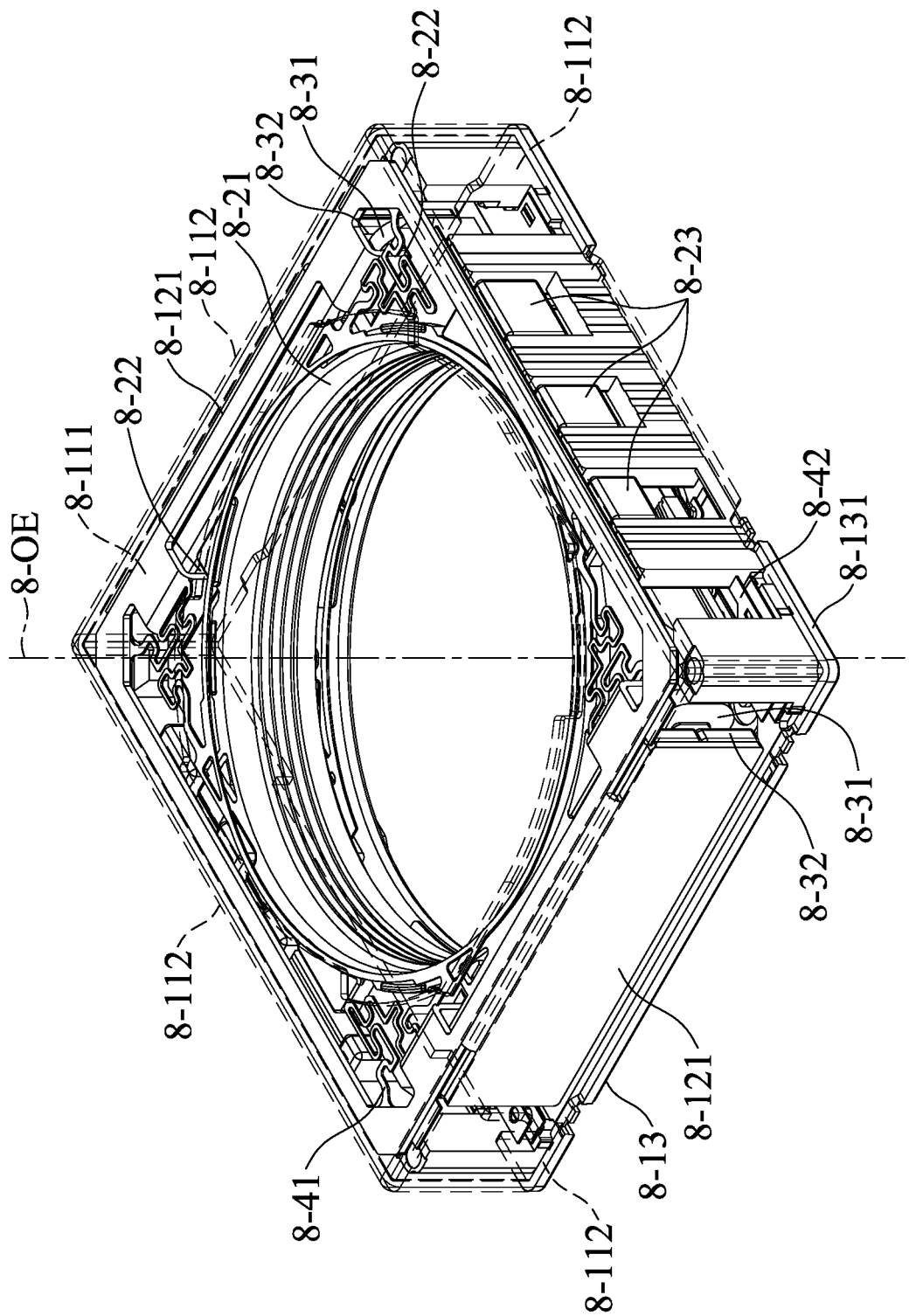
FIG. 92 shows a perspective view of the optical element driving mechanism according to an embodiment of the present disclosure, wherein an outer frame is shown as a dashed line.
Figure 93:
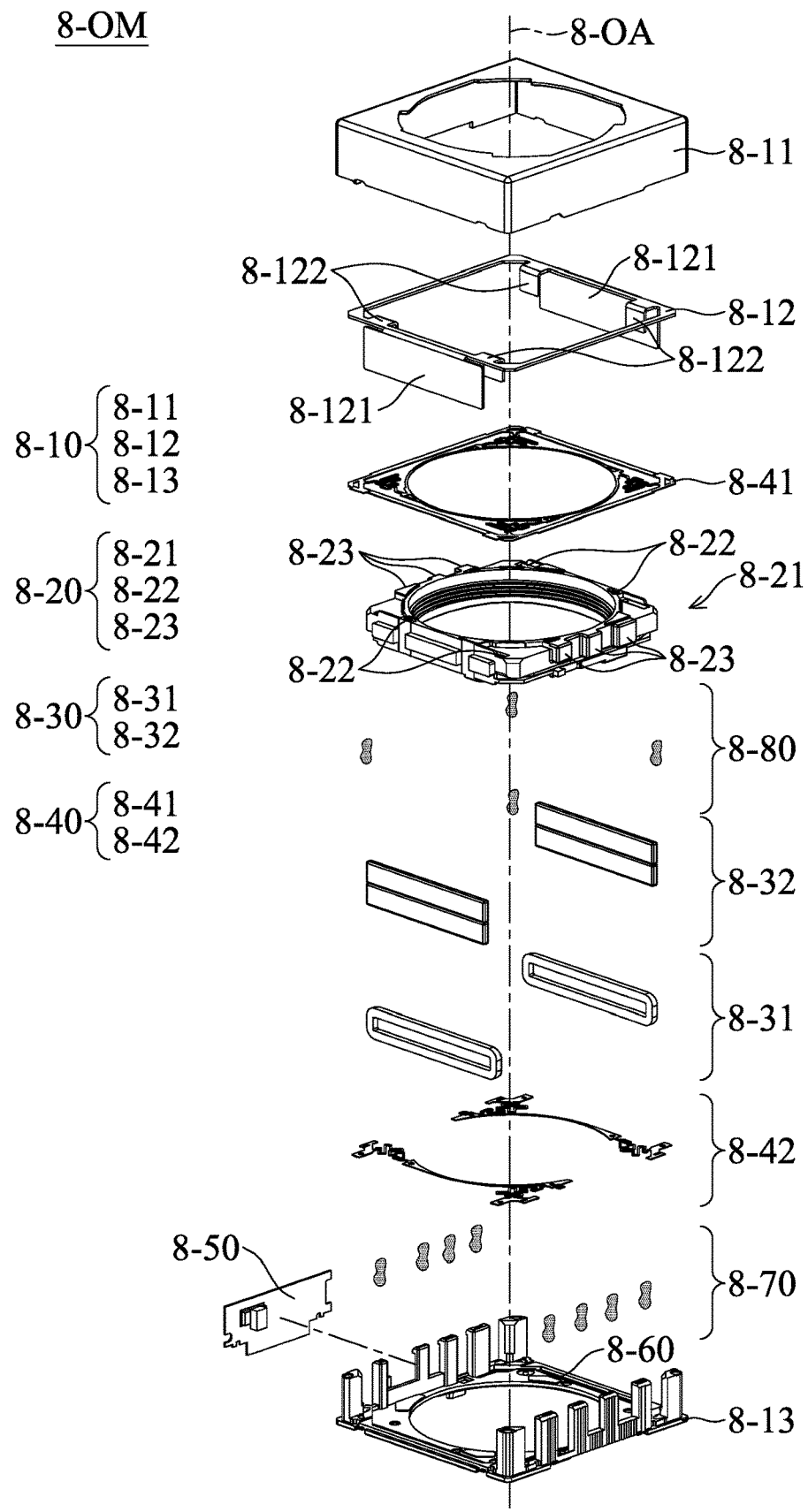
FIG. 93 shows an exploded view of the optical element driving mechanism according to an embodiment of the present disclosure.

Please refer to FIG. 91 to FIG. 93, the optical element driving mechanism 8-OM includes a fixed part 8-10, a movable part 8-20, a driving assembly 8-30, an elastic assembly 8-40, a circuit assembly 8-50, a circuit member 8-60, an adhesion element 8-70, and a damping element 8-80. The driving assembly 8-30 may drive the movable part 8-20 to move relative to the fixed part 8-10.

In the present embodiment, the fixed part 8-10 may include an outer frame 8-11, a frame 8-12, and a base 8-13. In the present embodiment, the movable part 8-20 may include an optical element holder 8-21, four movable part recesses 8-22, and at least one movable part extending column 8-23. In the present embodiment, the driving assembly 8-30 may include a driving coil 8-31, and a driving magnetic element 8-32. In the present embodiment, the elastic assembly 8-40 may include a first elastic element 8-41, and a second elastic element 8-42.

Please refer to FIG. 90 to FIG. 92, the movable part 8-20 is in contact with and is connected to the optical element 8-OE. Specifically, the optical element holder 8-21 of the movable part 8-20 carries and is in contact with the optical element 8-OE. The optical element holder 8-21 may has any shape that is suitable for carrying and connecting to the optical element 8-OE. The movable part recess 8-22 is formed on the optical element holder 8-21, and the movable part recess 8-22 is recessed into the optical element holder 8-21 along the optical axis 8-OA (may refer to FIG. 97). The movable part extending column 8-23 is formed on the optical element holder 8-21, and the movable part extending column 8-23 extends outwardly from the optical element holder 8-21.

The driving coil 8-31 of the driving assembly 8-30 is corresponding to the driving magnetic element 8-32. The driving coil 8-31 may interact with the magnetic field of the driving magnetic element 8-32 and generate electromagnetic driving force to drive the optical element holder 8-21 of the movable part 8-20 and the optical element 8-OE to move relative to the fixed part 8-10.

The elastic assembly 8-40 may connect the optical element holder 8-21 of the movable part 8-20 to the fixed part 8-10. The first elastic element 8-41 may include an elastic element connecting portion 8-41a. In detail, the first elastic element 8-41 of the elastic assembly 8-40 may connect the upper portion of the optical element holder 8-21 to the frame 8-12. The second elastic element 8-42 of the elastic assembly 8-40 may connect the lower portion of the optical element holder 8-21 to the base 8-13, so as to suspend the optical element holder 8-21 and the optical element 8-OE so that the optical element holder 8-21 and the optical element 8-OE are movable relative to the fixed part 8-10.

Please refer to FIG. 90 to FIG. 92, the outer frame 8-11 may include an outer frame top surface 8-111, and four outer frame sidewalls 8-112. The outer frame top surface 8-111 is not parallel to the optical axis 8-OA. The outer frame sidewall 8-112 is parallel to the optical 8-OA, and the outer frame sidewall 8-112 extends from the outer frame top surface 8-111 along the optical axis 8-OA. The base 8-13 has plate-like structure so that the outer frame 8-11 may be placed on the base 8-13.

Please refer to FIG. 92 to FIG. 95, the frame 8-12 may include a magnetic conductive material to enhance the magnetic force of the driving magnetic element 8-32. Furthermore, the frame 8-12 has an annular shape when viewed along the optical axis 8-OA. In the present embodiment, the frame 8-12 may include two first frame extending portions 8-121, and four second frame extending portion 8-122.

In the present embodiment, each of the first frame extending portions 8-121 has two corresponding second frame extending portions 8-122. More specifically, in the present embodiment, two second frame extending portions 8-122 may be provided near the tow ends of each of the first frame extending portions 8-121, and the two second frame extending portion 8-122 is parallel to the corresponding first frame extending portion 8-121. Furthermore, each of the first frame extending portions 8-121 is corresponding to (may be connected to) one outer frame sidewall 8-112 of the outer frame 8-11.

The first frame extending portion 8-121 may be in contact with the driving magnetic element 8-32 of the driving assembly 8-30, so as to enhance the magnetic force of the magnetic element 8-32. The second frame extending portion 8-122 may extend to the movable part recess 8-22, so as to restrict the range of movement of the optical element holder 8-21 of the movable part 8-20.

The first frame extending portion 8-121 does not overlap the second frame extending portion 8-122 when view along the optical axis 8-OA. The first frame extending portion 8-121 overlaps the second frame extending portion 8-122 when viewed a first direction 8-D1 that is perpendicular to the optical axis 8-OA. The first frame extending portion 8-121 does not overlap the second frame extending portion 8-122 when view along a second direction 8-D2 that is perpendicular to the optical axis 8-OA and the first direction 8-D1. The optical element driving mechanism 8-OM may be miniaturized with the abovementioned configuration.

Please refer to FIG. 94 to FIG. 97, the base 8-13 of the fixed part 8-10 may include a base body 8-131, a plurality of base columns 8-132, and four base corner columns 8-133.

The base column 8-132 may be disposed at the side of the optical element driving mechanism 8-OM that is not provided with the first frame extending portion 8-121. The base column 8-132 extends from the base body 8-131 along the optical axis 8-OA, and a gap 8-G may be formed between each of the two adjacent base columns 8-132. The movable part extending column 8-23 of the movable part 8-20 may extend to the gap 8-G. In one embodiment, the movable part extending column 8-23 extends from the optical element holder 8-21 to the gap 8-G along the second direction 8-D2. That is, the base column 8-132 overlaps the movable part extending column 8-23 when viewed along the first direction 8-D1. Thus, the range of movement of the optical element holder 8-21 of the movable part 8-20 may be restricted.

Figure 96:
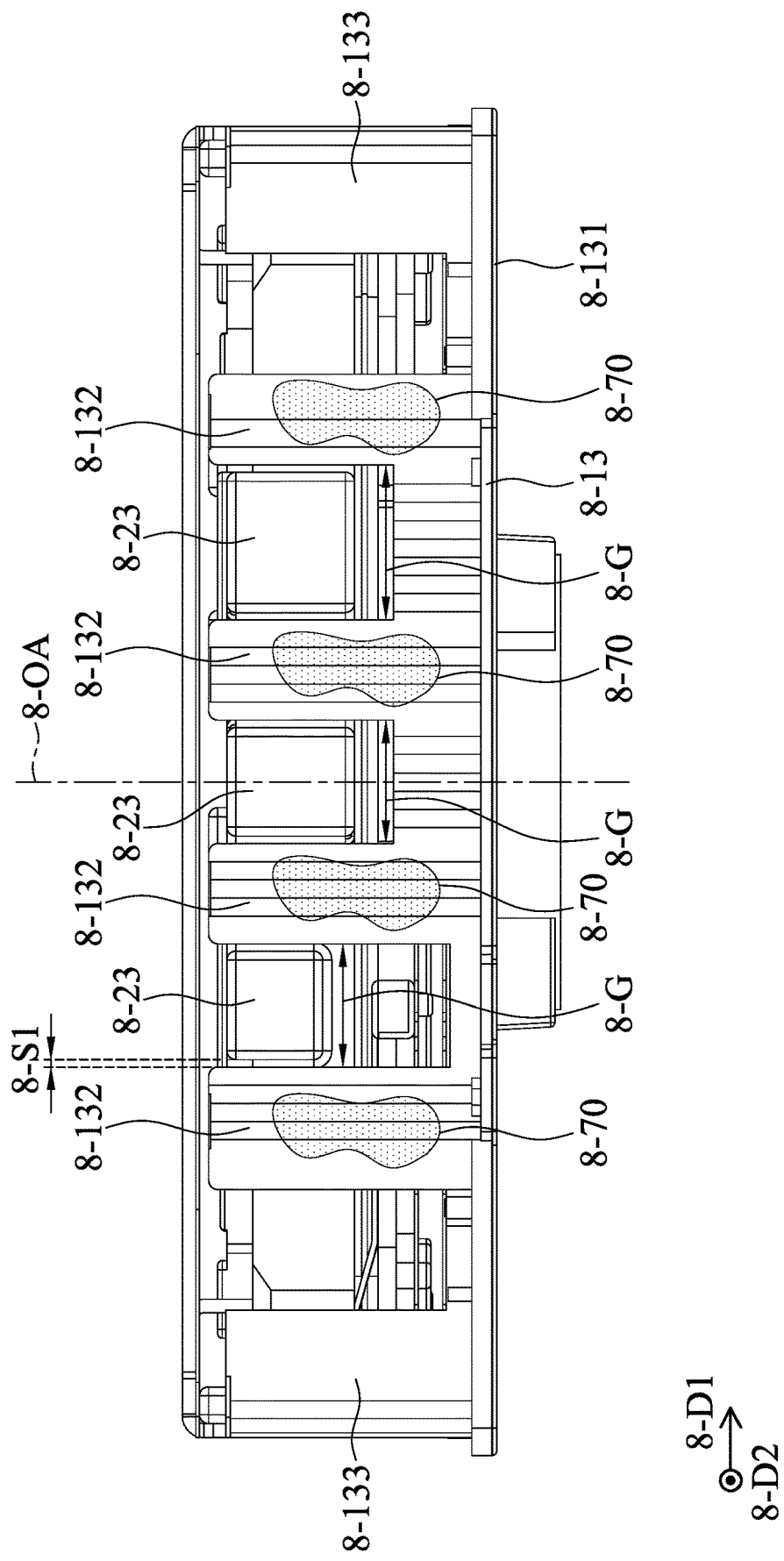
FIG. 96 shows a front view of the optical element driving mechanism according to an embodiment of the present disclosure, wherein the outer frame is omitted.
Figure 97:
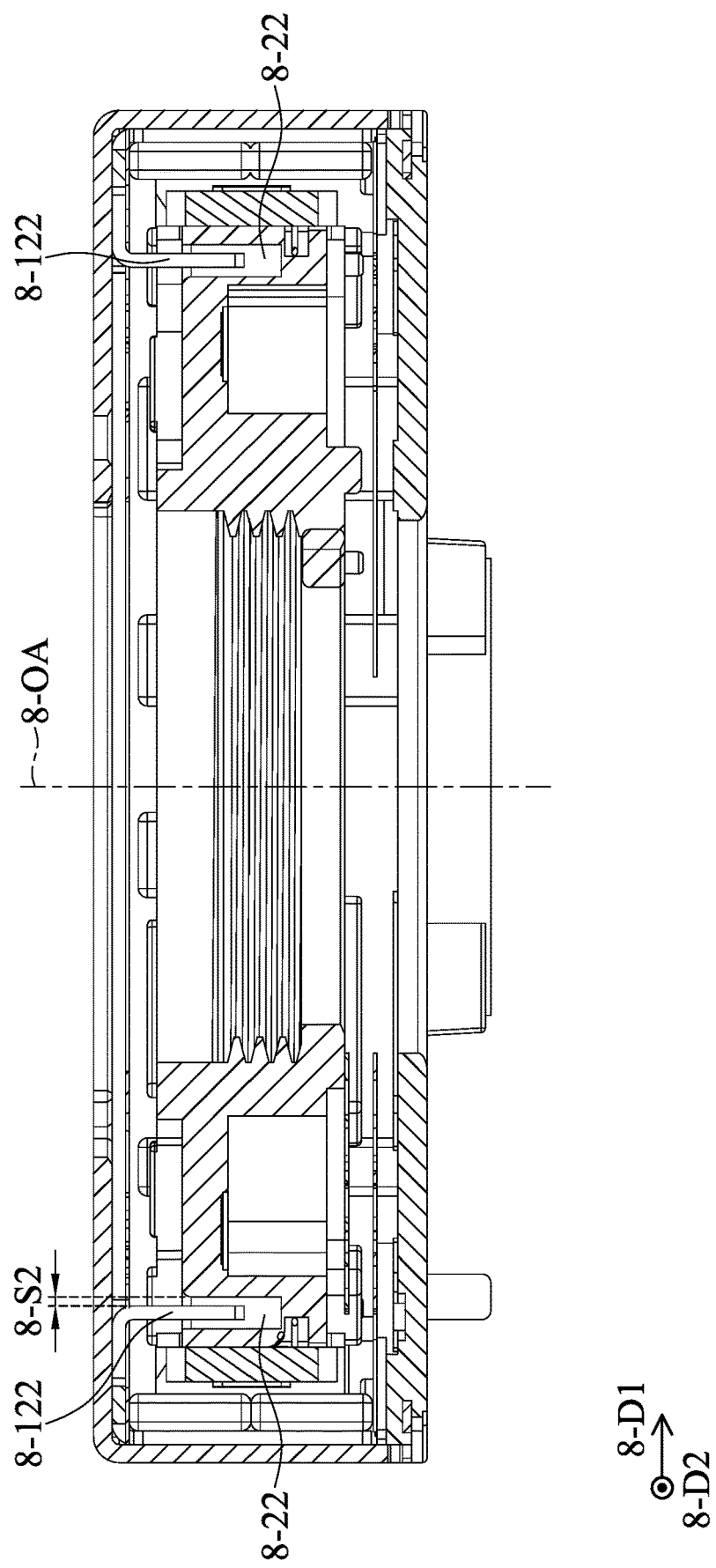
FIG. 97 shows a cross-sectional view of the optical element driving mechanism according to an embodiment of the present disclosure along line 8-A-8-A in FIG. 91.

In particular, please refer to FIG. 96 and FIG. 97, in one embodiment, a shortest distance 8-S1 between the base column 8-132 and the movable part extending column 8-23 is less than a shortest distance 8-S2 between the second frame extending portion 8-122 and the movable part recess 8-22. Thus, the range of movement of the optical element holder 8-21 may be restricted more effectively, and the particles generated after the second frame extending portion 8-122 be in contact with the wall of the movable part recess 8-22 may be avoided.

Figure 94:
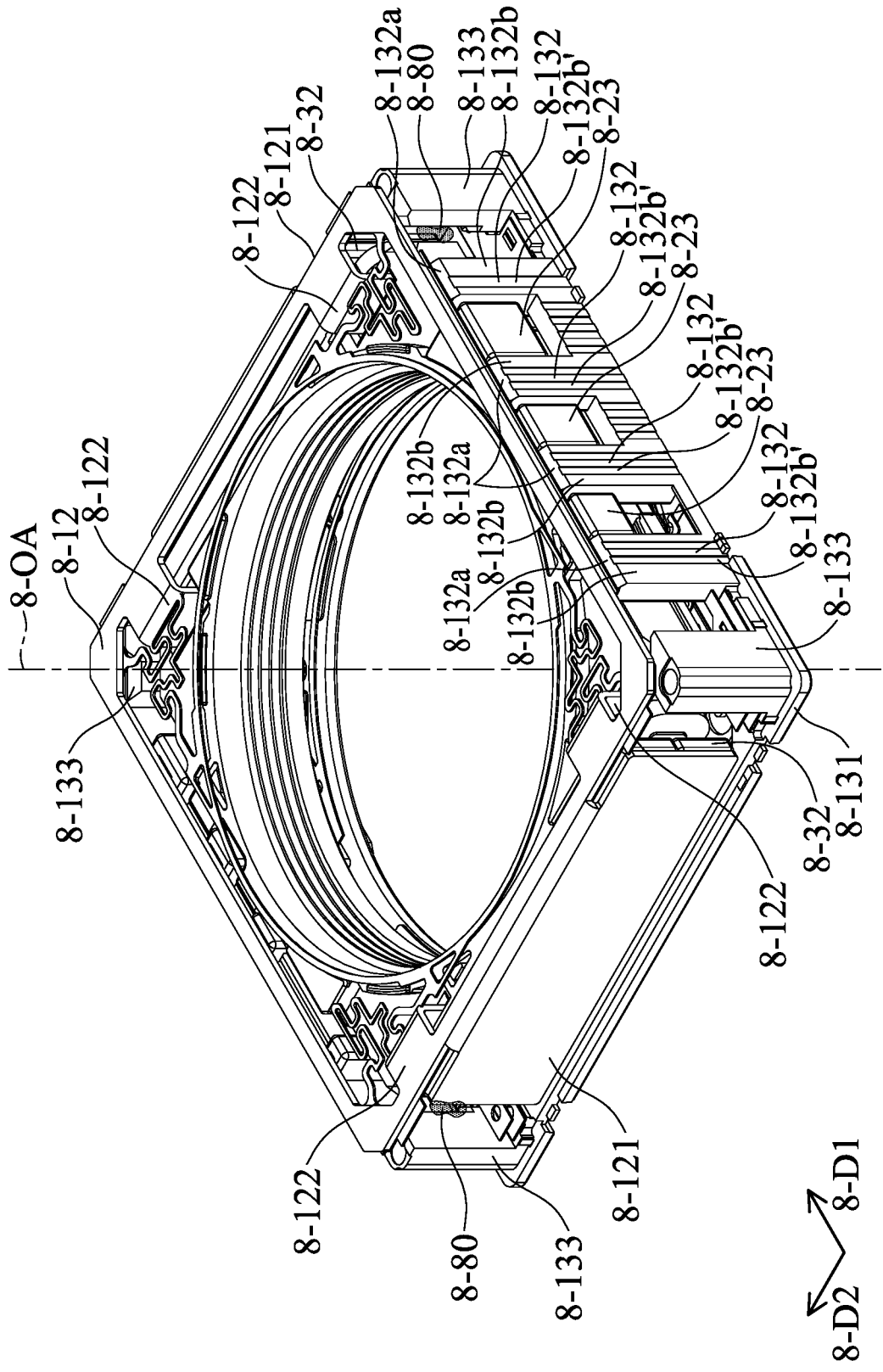
FIG. 94 shows a perspective view of the optical element driving mechanism according to an embodiment of the present disclosure, wherein the outer frame is omitted.

As shown in FIG. 94, each of the base columns 8-132 may include a first base column surface 8-132a. The base column 8-132 may further include a second base column surface 8-132b. The first base column surface 8-132a is an inclined surface, i.e., the first base column surface 8-132a is not perpendicular nor parallel to the optical 8-OA. The manufacturing and assembly of the optical element driving mechanism 8-OM may be facilitated with the abovementioned configuration.

The second base column surface 8-132b is parallel to the optical axis 8-OA. The second base column surface 8-132b has a concave-convex structure 8-132b', and the adhesion element 8-70 is disposed between the concave-convex structure 8-132b' and the outer frame 8-11. The connection between the base 8-13 and the outer frame 8-11 may be enhanced with the abovementioned configuration, and the separation of the base 8-13 from the outer frame 8-11 is prevented, thus, the structure of the optical element driving mechanism 8-OM is strengthened.

Figure 95:
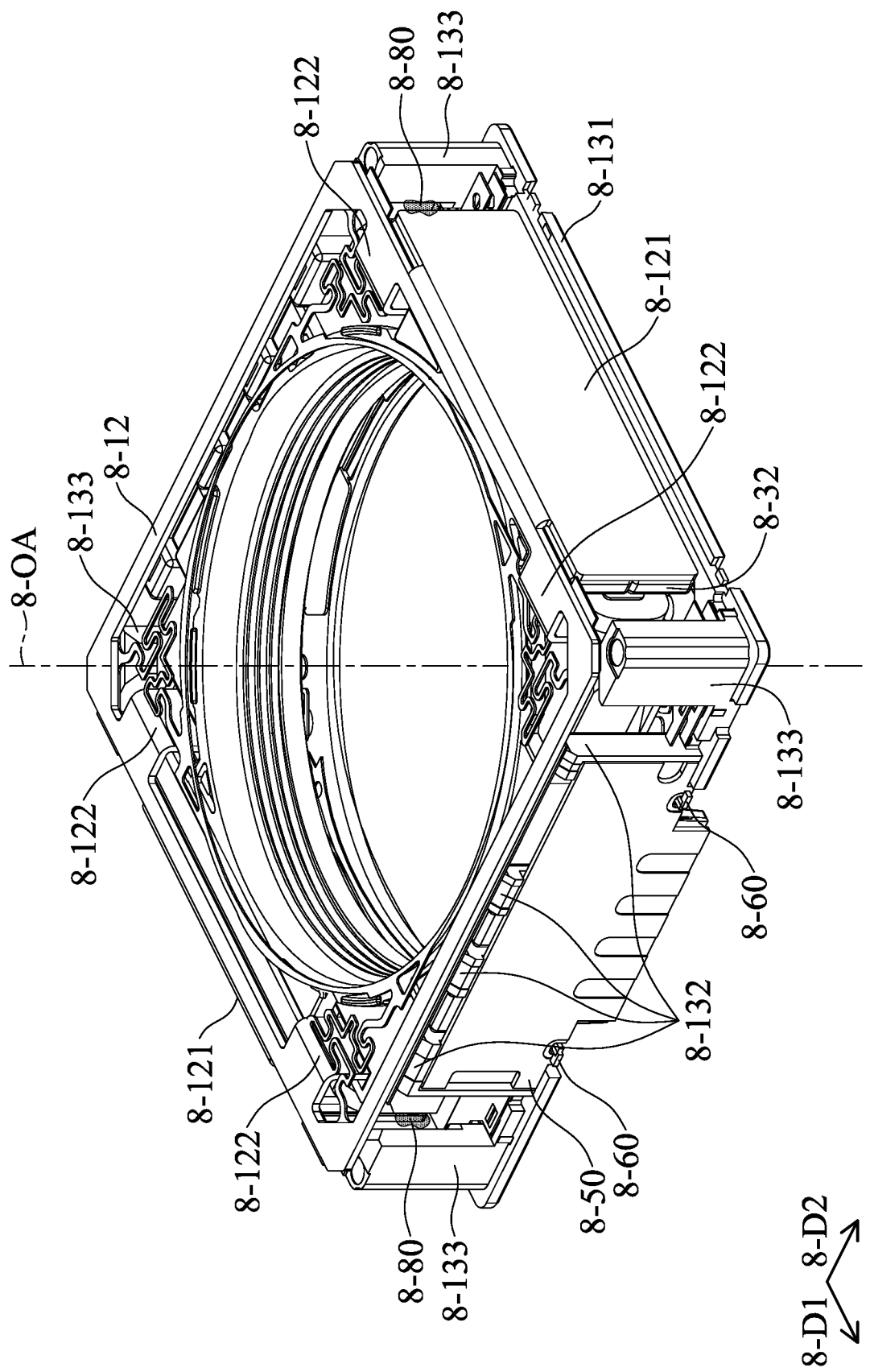
FIG. 95 shows a perspective view of the optical element driving mechanism according to an embodiment of the present disclosure, wherein the outer frame is omitted.

As shown in FIG. 94 and FIG. 95, the four base corner columns 8-133 are located on four different corners of the base body 8-131. The base corner column 8-133 extends from the base body 8-131 along the optical axis 8-OA. The damping element 8-80 is disposed between the base corner columns 8-133 and the optical element holder 8-21 of the movable part 8-20. Thus, the acceleration of the optical element holder 8-21 may be reduced with the abovementioned configuration, and the damage caused by the impact of the optical element holder 8-21 and other elements are avoided.

Please refer to FIG. 95, the circuit assembly 8-50 may be disposed at the side of the optical element driving mechanism 8-OM that is not provided with the first frame extending portion 8-121. That is, the base column 8-132 of the base 8-13 is and the circuit assembly 8-50 may be located at the same side of the optical element driving mechanism 8-OM.

The circuit member 8-60 may be insert molding into the base 8-13. Furthermore, the circuit member 8-60 may extend into the base column 8-132 (not shown). With the abovementioned configuration, the circuit member 8-60 are better protected and is easily to be electrically connected to other elements (e.g., circuit assembly 8-50).

Figure 98:
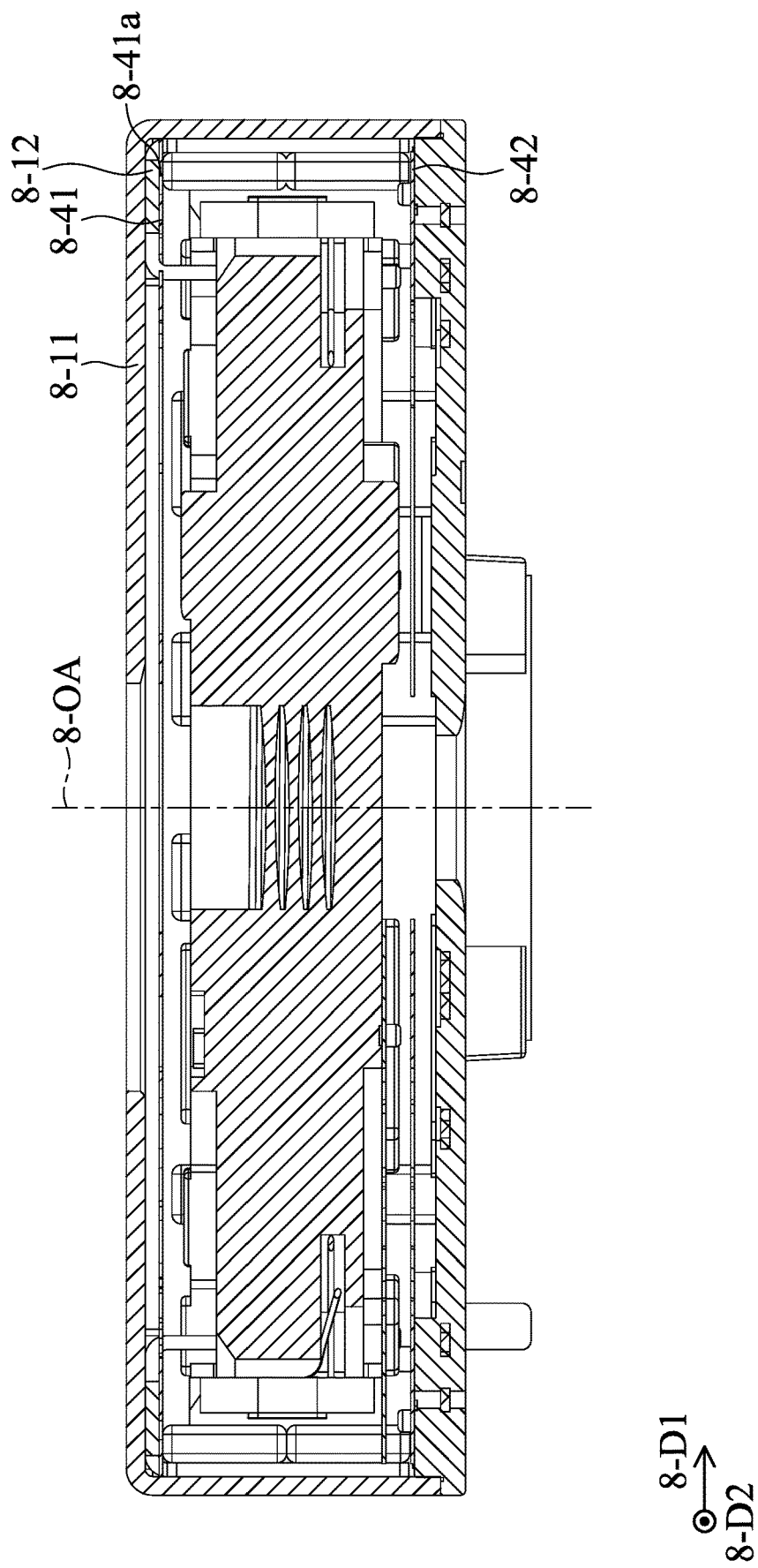
FIG. 98 shows a cross-sectional view of the optical element driving mechanism according to an embodiment of the present disclosure along line 8-B-8-B in FIG. 91.

Please refer to FIG. 98, the outer frame 8-11, the frame 8-12, and the elastic assembly 8-40 overlap each other when viewed along the optical axis 8-OA. Furthermore, in the present embodiment, the frame 8-12 may be located between the outer frame top surface 8-111 of the outer frame 8-11 and the first elastic element 8-41 of the elastic assembly 8-40. That is, the first elastic element 8-41 is not in direct contact with the outer frame top surface 8-111, and the first elastic element 8-41 is away from the frame a top surface 8-111 with a distance.

In other words, the elastic element connecting portion 8-41*a* of the first elastic element 8-41 may be in contact with and is fixed to the frame 8-12. However, the elastic element connecting portion 8-41*a* is not in contact with the outer frame 8-11. With the abovementioned configuration, the stretch of the first elastic element 8-41 along the optical axis 8-OA may be increased, and the range of movement of the optical element holder 8-21 may be increased.

It is noted that, in one embodiment, the outer frame top surface 8-111, the frame 8-12, and the first elastic element 8-41 are connected to each other by laser welding. Furthermore, the outer frame top surface 8-111 is a plane.

Figure 99:
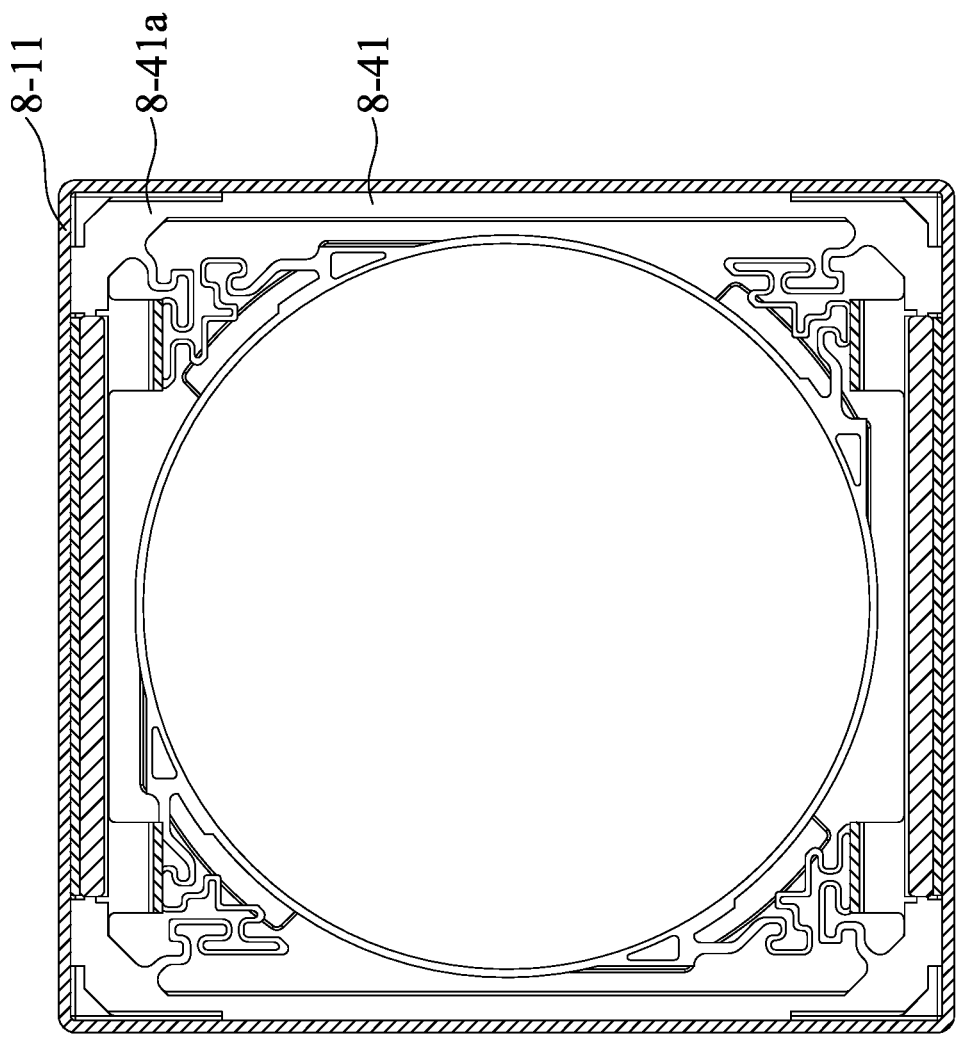
FIG. 99 shows a cross-sectional view of the optical element driving mechanism according to an embodiment of the present disclosure along line 8-C-8-C in FIG. 91.

Please refer to FIG. 99, in one embodiment, the elastic element connecting portions 8-41*a* has no holes, i.e., the frame 8-12 is not exposed to the elastic element connecting portion 8-41*a*. With the abovementioned configuration, the manufacturing and assembly of the optical element driving mechanism 8-OM may be facilitated.

Figure 100:
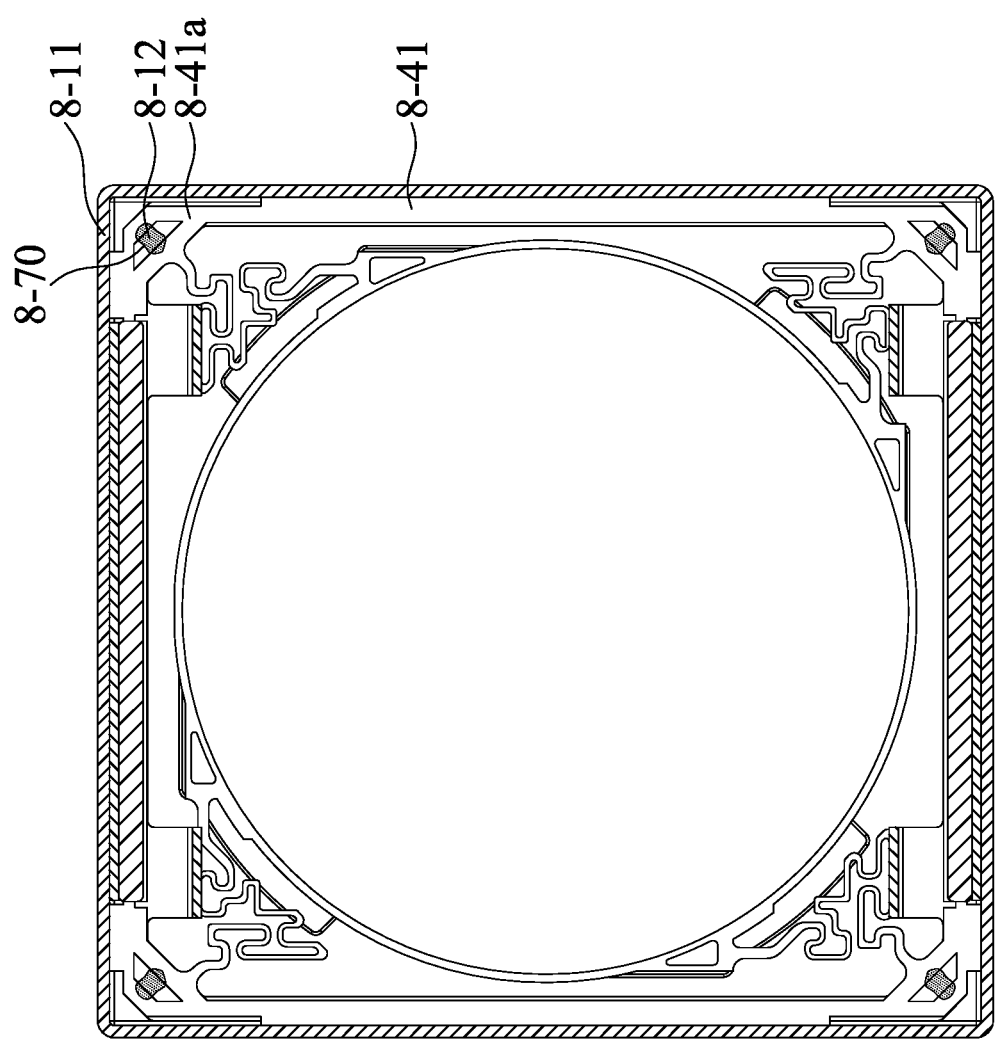
FIG. 100 shows a cross-sectional view of the optical element driving mechanism according to another embodiment of the present disclosure along line 8-C-8-C in FIG. 91.

Please refer to FIG. 100, in another embodiment, the elastic element connecting portions 8-41*a* has a hole, i.e., the frame 8-12 is exposed to the elastic element connecting portion 8-41*a*. Moreover, the hole of the elastic element connecting portions 8-41*a* may accommodate with adhesion element 8-70 so that the connection between the first elastic element 8-41 and the frame 8-12 is more stable.

Next, an optical element driving mechanism driving system 8-OS will be described, wherein the same or similar elements included in the optical element driving mechanism driving system 8-OS are represented by the same or similar symbols. The same or similar elements may perform the same or similar function, the content of which will not be repeated, and they may not be shown in the drawings.

Figure 101:
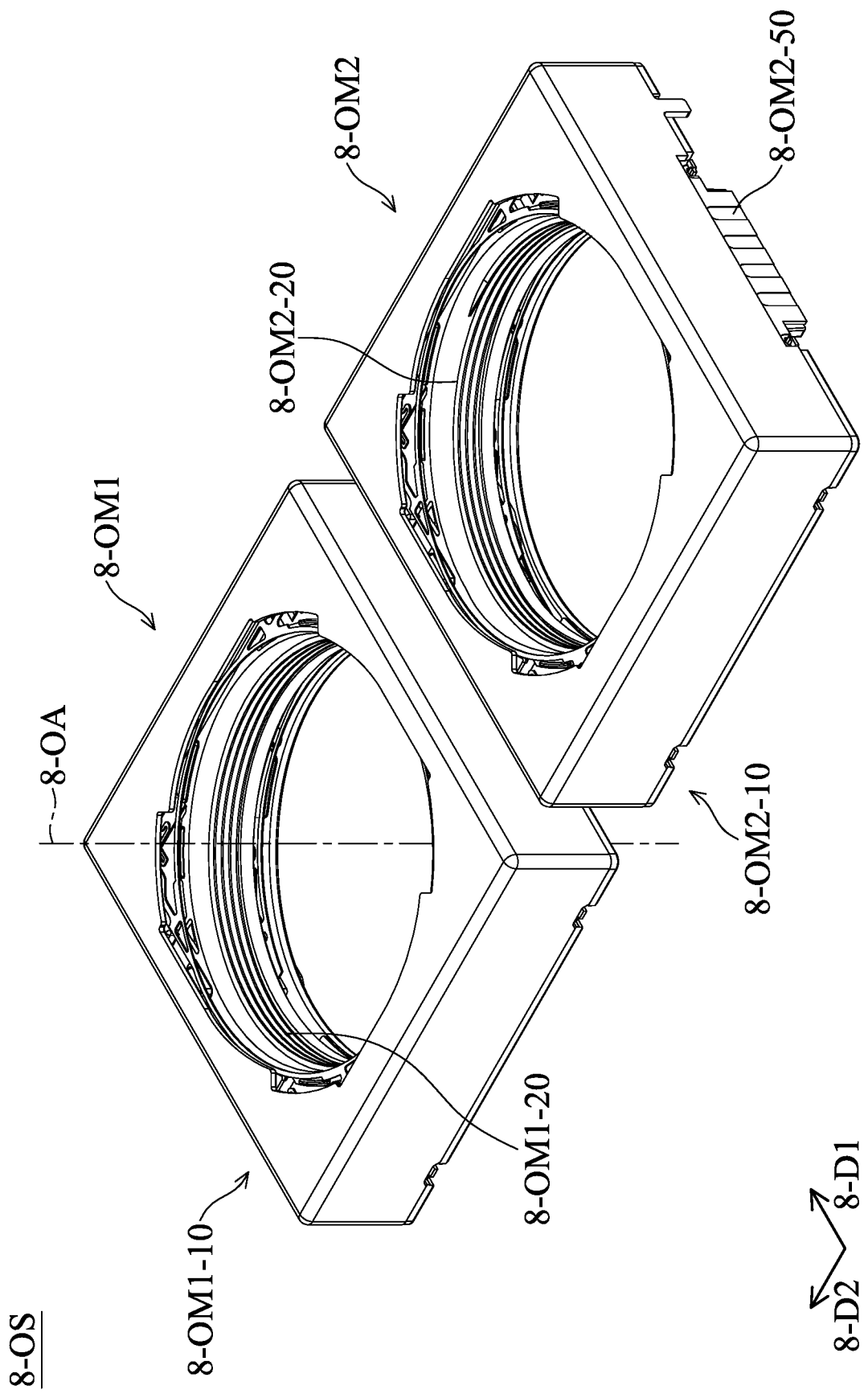
FIG. 101 shows a perspective view of the optical element driving mechanism driving system according to an embodiment of the present disclosure.

Please refer to FIG. 101, the optical element driving mechanism driving system 8-OS may include a first optical element driving mechanism 8-OM1 and a second optical element driving mechanism 8-OM2.

Similar to the optical element driving mechanism 8-OM, the first optical element driving mechanism 8-OM1 may include a first mechanism fixed part 8-OM1-10, a first mechanism movable part 8-OM1-20, and a first mechanism driving assembly 8-OM1-30. The first mechanism driving assembly 8-OM1-30 may drive the first mechanism movable part 8-OM1-20 to move relative to the first mechanism fixed part 8-OM1-10.

Similar to the optical element driving mechanism 8-OM, the second optical element driving mechanism 8-OM2 may include a second mechanism fixed part 8-OM2-10, a second mechanism movable part 8-OM2-20, a second mechanism driving assembly 8-OM2-30, and a second mechanism circuit assembly 8-OM2-50. The second mechanism driving assembly 8-OM2-30 may drive the second mechanism movable part 8-OM2-20 to move relative to the second mechanism fixed part 8-OM2-10.

Similarly, a second mechanism first frame extending portion 8-OM2-121 of the second mechanism fixed part 8-OM2-10 is in contact with the second mechanism driving assembly 8-OM2-30, and a second mechanism second frame extending portion 8-OM2-122 of the second mechanism fixed part 8-OM2-10 extends to a second mechanism movable part recess 8-OM2-22 of the second mechanism movable part 8-OM2-20.

In the present embodiment, the second optical element driving mechanism 8-OM2 may be regarded as rotating the optical element driving mechanism 8-OM clockwise about the optical axis 8-OA by 90 degrees. Thus, the second mechanism first frame extending portion 8-OM2-121 overlaps the second mechanism second frame extending portion 8-OM2-122 when viewed along the second direction 8-D2 (not shown).

In the present embodiment, the first optical element driving mechanism 8-OM1 and the second optical element driving mechanism 8-OM2 are arranged along the second direction 8-D2. The second mechanism circuit assembly 8-OM2-50 of the second optical element driving mechanism 8-OM2 is not adjacent to the first optical element driving mechanism 8-OM1. With the abovementioned configuration, the optical element driving mechanism driving system 8-OS may be easily to be electrically connected to other elements or external elements, and the magnetic forces of the first mechanism driving assembly 8-OM1-30 and the second mechanism driving assembly 8-OM2-30 will not interfere with each other.

The optical element driving mechanism 8-OM of the embodiment of the present disclosure may prevent the generation of particles, and enables the miniaturization of the optical element driving mechanism 8-OM. Furthermore, the configuration of the optical element driving mechanism 8-OM of the embodiment of the present disclosure may facilitate the manufacturing and assembly of the optical element driving mechanism 8-OM, and may strengthen the structure of the optical element driving mechanism 8-OM.

In addition to the advantages mentioned above, the optical element driving mechanism driving system 8-OS of the embodiment of the present disclosure is easily to be electrically connected to external elements, and the inference between the magnetic forces of the driving assemblies with each other is prevented. The magnetic forces of the driving assemblies are efficiently utilized, and the accuracy is enhanced.

Figure 102:
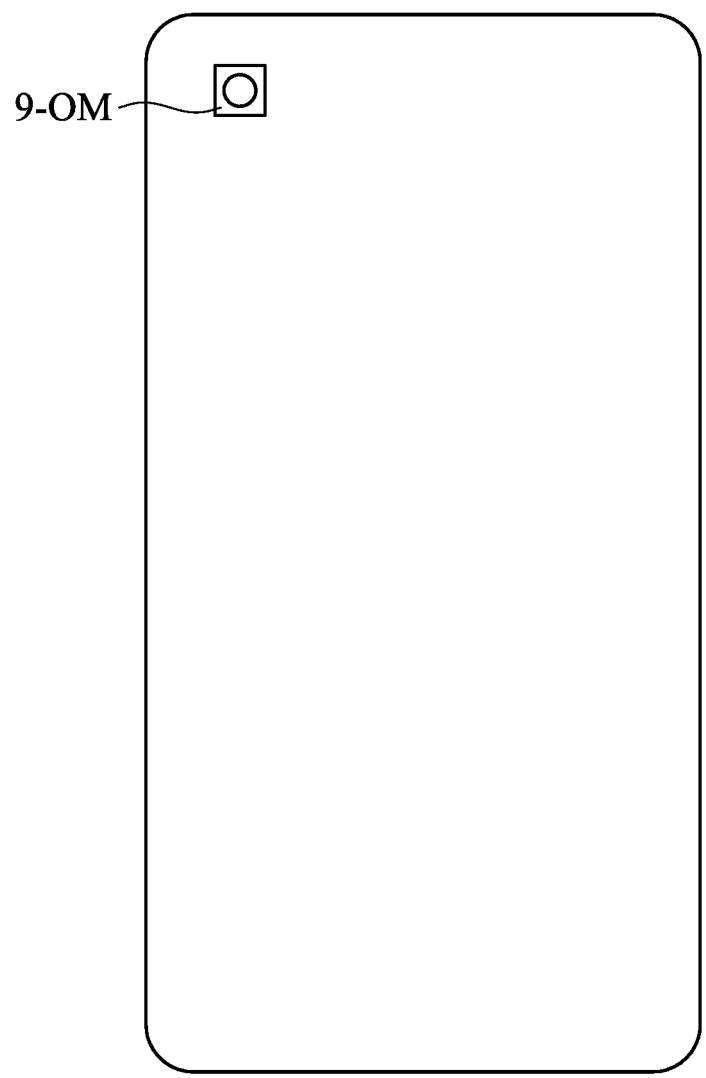
FIG. 102 shows a schematic view of an electrical device with an optical element driving mechanism according to an embodiment of the present disclosure.

Please refer to FIG. 102, an optical element driving mechanism 9-OM of an embodiment of the present disclosure may be mounted in an electrical device 9-1 for taking photos or videos, wherein the aforementioned electrical device 9-1 may, for example, be a smartphone or a digital camera, but the present disclosure is not limited to these. It should be noted that the position and the size between the optical element driving mechanism 9-OM and the electrical device 9-1 shown in FIG. 102 are only an example, which is not for limiting the position and the size between the optical element driving mechanism 9-OM and the electrical device 9-1. In fact, according to different needs, the optical element driving mechanism 9-OM may be mounted at different positions in the electrical device 9-1.

Figure 103:
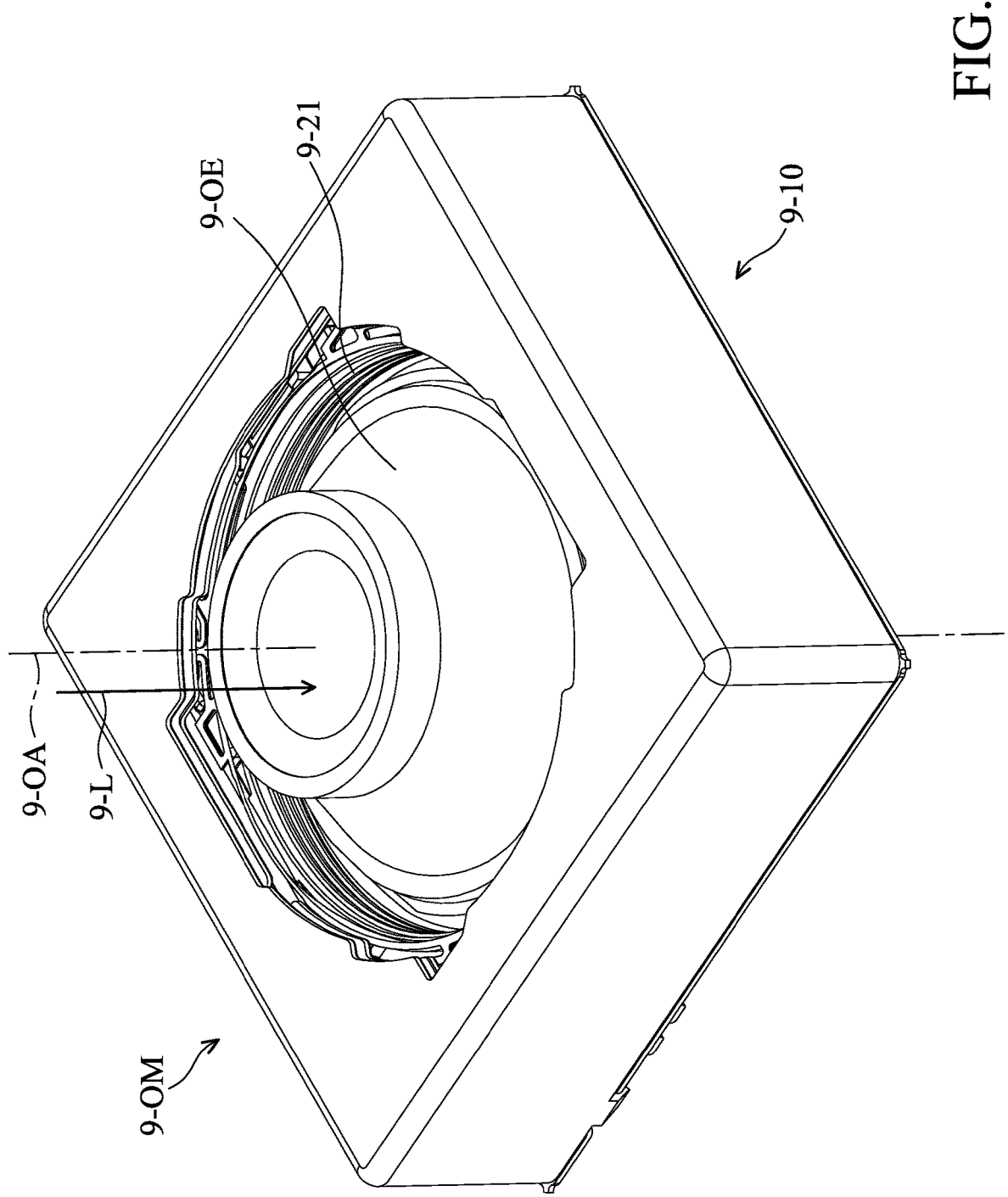
FIG. 103 shows a schematic view of the optical element driving mechanism and an optical element according to an embodiment of the present disclosure.

Please refer to FIG. 103, the optical element driving mechanism 9-OM carries an optical element 9-OE. An image sensor module may be disposed inside or outside of the optical element driving mechanism 9-OM. The image sensor module is located at the downstream of the light entry of the optical element driving mechanism 9-OM. A light 9-L incident to the optical element 9-OE in the optical element driving mechanism 9-OM along an optical axis 9-OA, and then arrives at the image sensor module for imaging.

Figure 104:
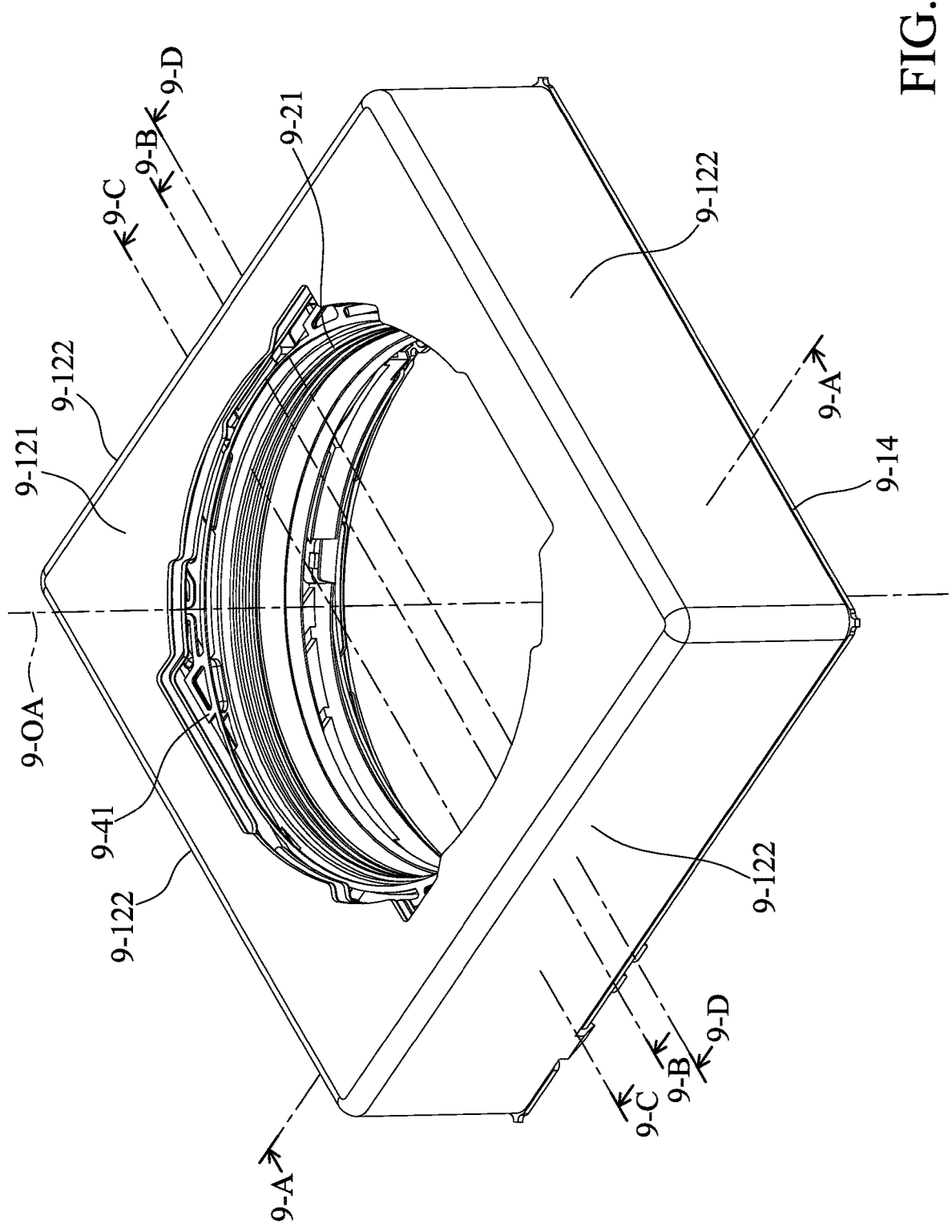
FIG. 104 shows a perspective view of the optical element driving mechanism according to an embodiment of the present disclosure.
Figure 105:
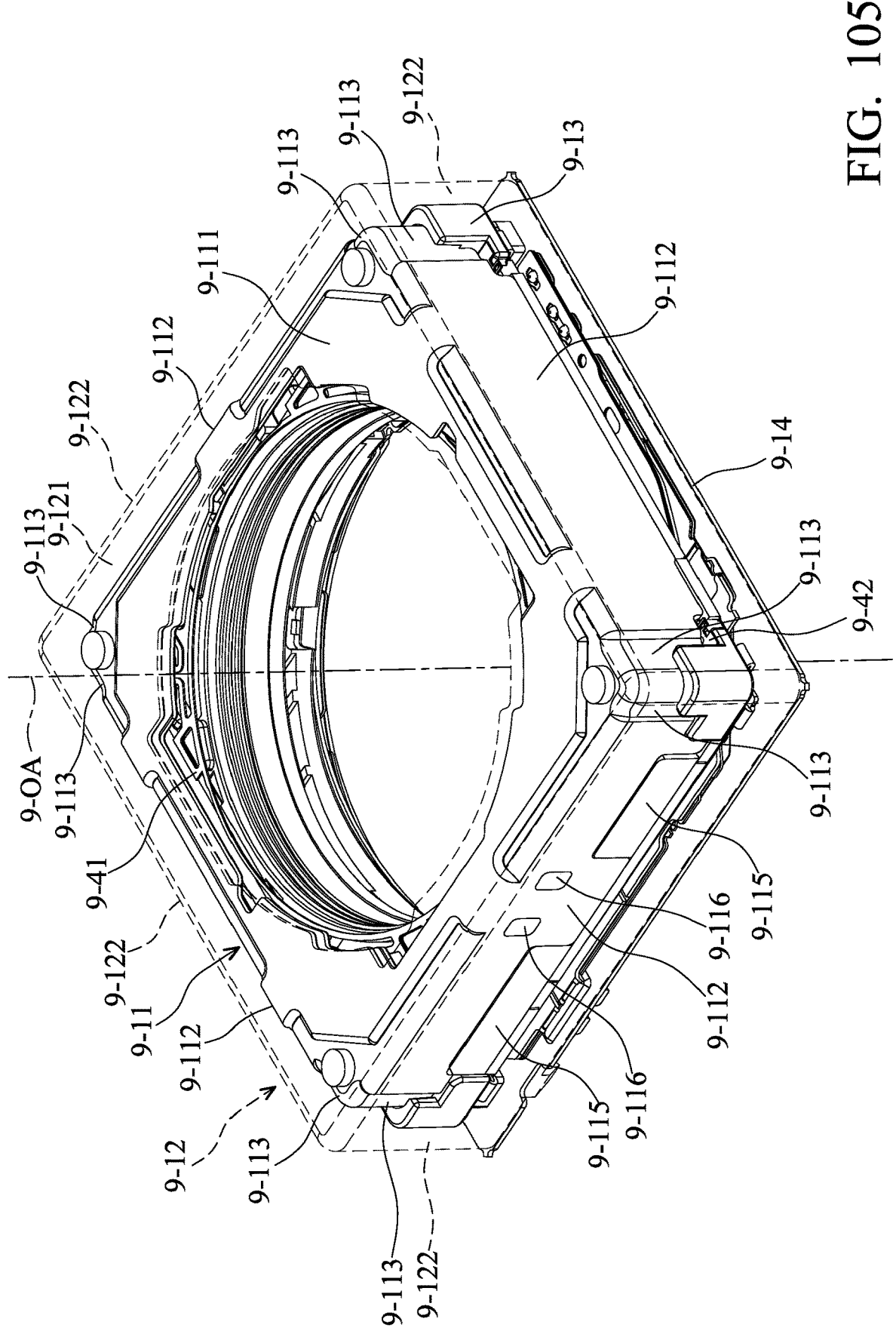
FIG. 105 shows a perspective view of the optical element driving mechanism according to an embodiment of the present disclosure, wherein a second outer frame is shown as a dashed line.
Figure 106:
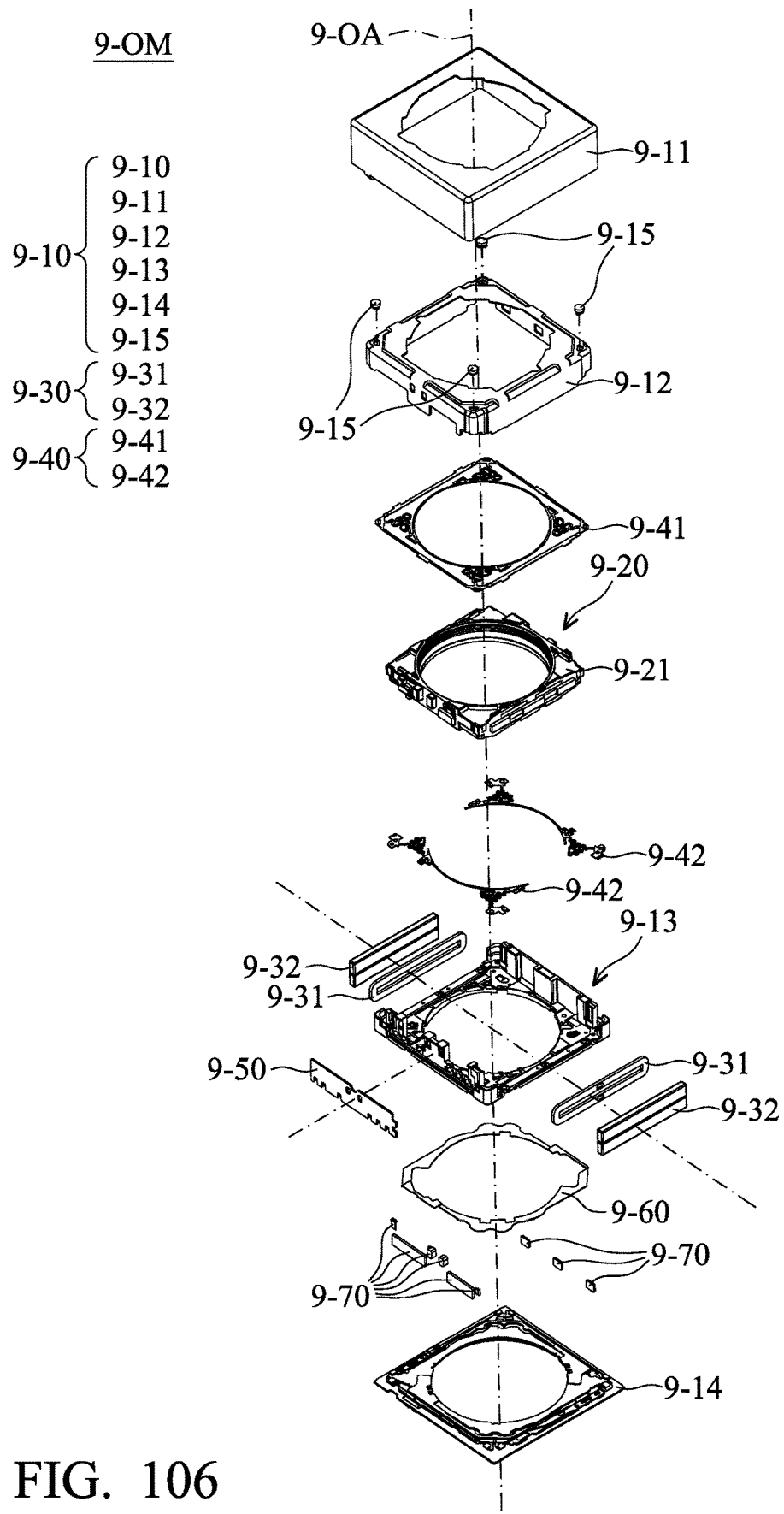
FIG. 106 shows an exploded view of the optical element driving mechanism according to an embodiment of the present disclosure.

Please refer to FIG. 104 to FIG. 106, the optical element driving mechanism 9-OM may include a fixed part 9-10, a movable part 9-20, a driving assembly 9-30, an elastic assembly 9-40, a circuit assembly 9-50, a circuit member 9-60, and an adhesion element 9-70. The driving assembly 9-30 may drive the movable part 9-20 to move relative to the fixed part 9-10.

In the present embodiment, the fixed part 9-10 may include a first outer frame 9-11, a second outer frame 9-12, a base 9-13, a bottom plate 9-14, and four bumper elements 9-15. The movable part 9-20 may include an optical element holder 9-21. The driving assembly 9-30 may include a driving coil 9-31, and a driving magnetic element 9-32. The elastic assembly 9-40 may include a first elastic element 9-41, and a second elastic element 9-42. The circuit assembly 9-50 may include a circuit assembly recess portion 9-51, a circuit assembly connecting portion 9-52, and a circuit assembly opening 9-53. The circuit member 9-60 may include a circuit member connecting portion 9-61.

The movable part 9-20 is in contact with and is connected to the optical element 9-OE. Specifically, the optical element holder 9-21 of the movable part 9-20 carries and is in contact with the optical element 9-OE. The optical element holder 9-21 may has any shape that is suitable for carrying and connecting to the optical element 9-OE.

Figure 107:
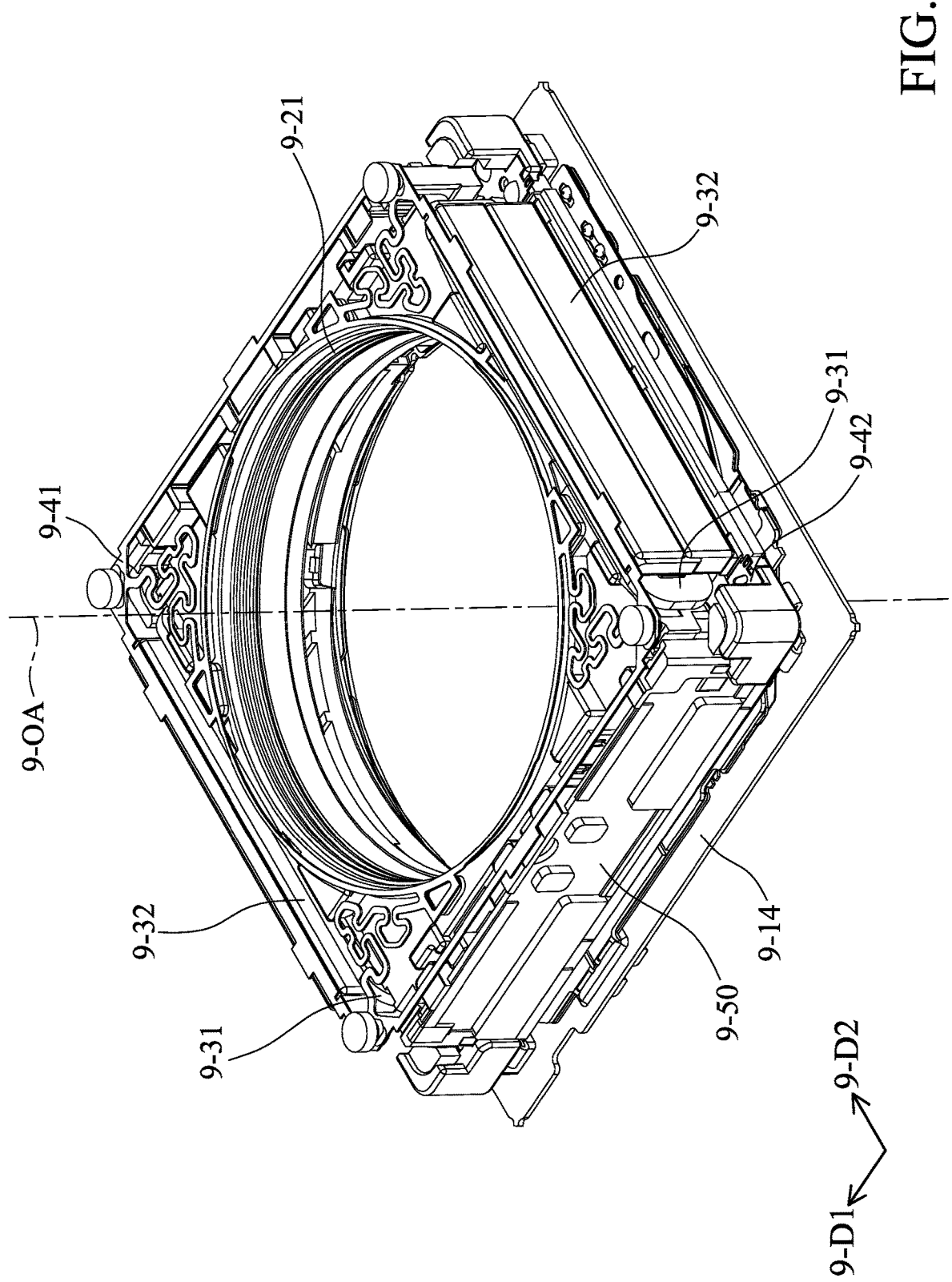
FIG. 107 shows a perspective view of the optical element driving mechanism according to an embodiment of the present disclosure, wherein a first outer frame and the outer frame are omitted.
Figure 108:
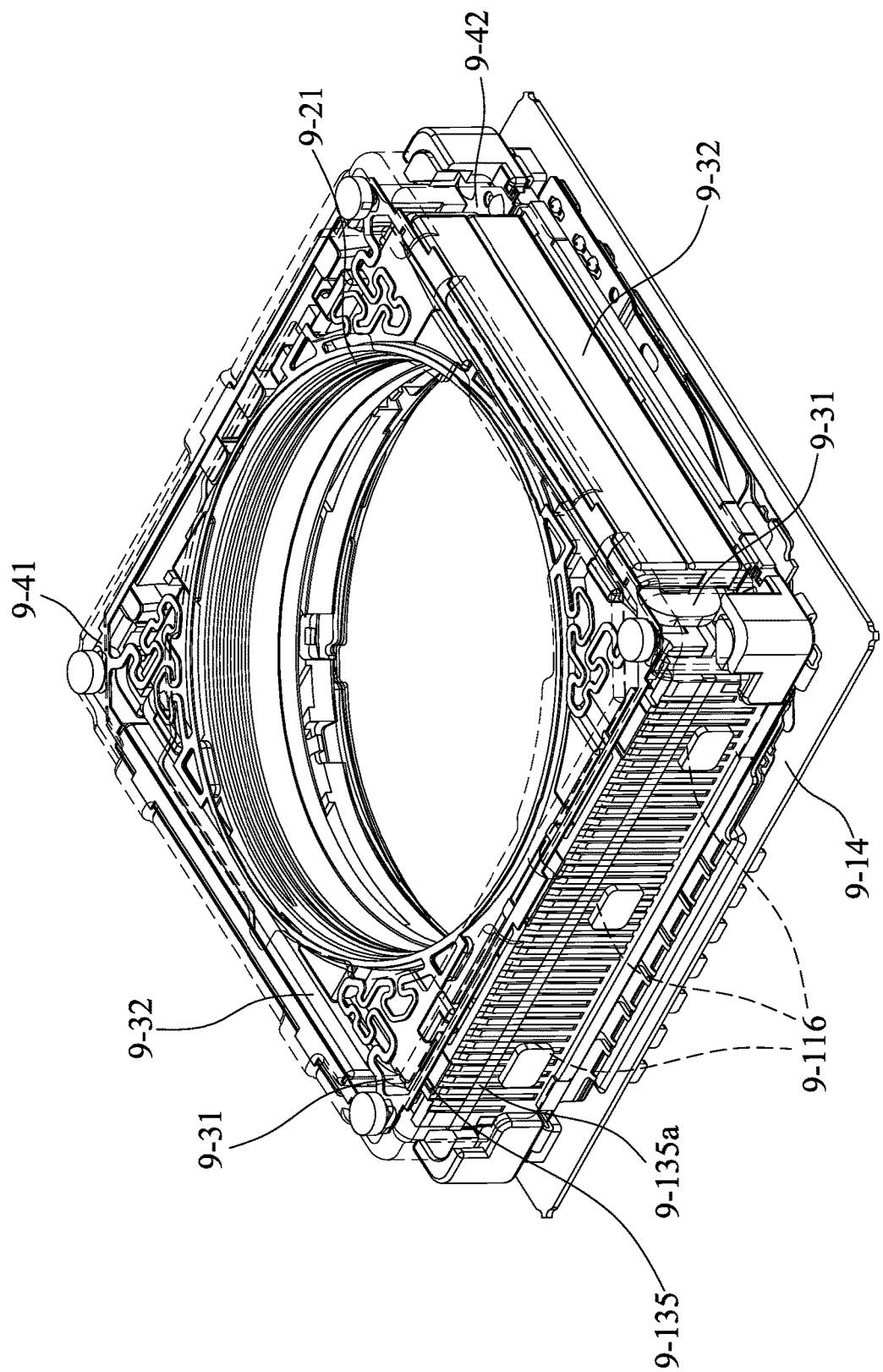
FIG. 108 shows a perspective view of the optical element driving mechanism according to an embodiment of the present disclosure, wherein the second outer frame is omitted, and wherein the first outer frame is shown as a dashed line.
Figure 109:
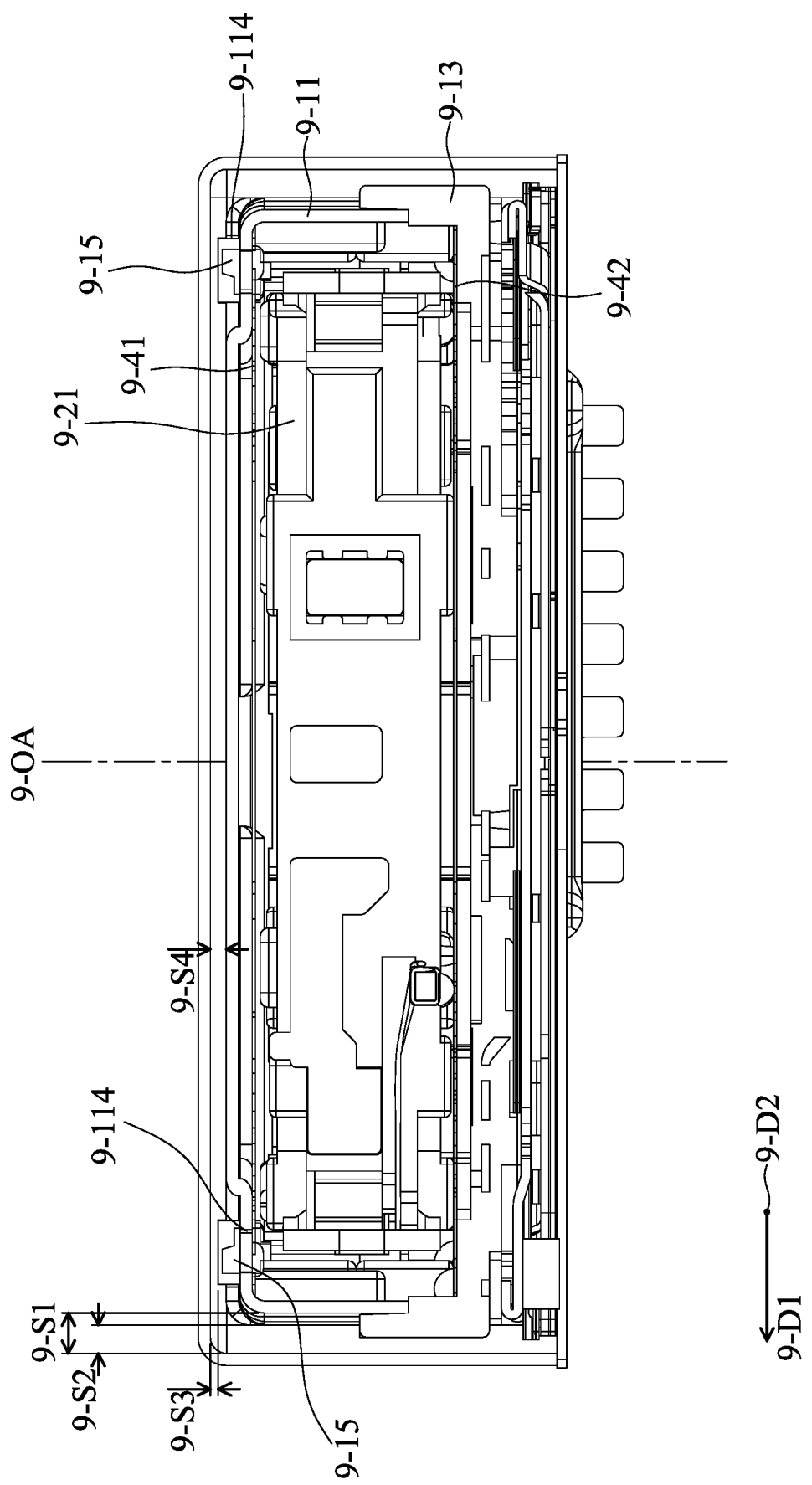
FIG. 109 shows a cross-sectional view of the optical element driving mechanism according to an embodiment of the present disclosure along line 9-A-9-A in FIG. 104.

Please refer to FIG. 107 to FIG. 109, the driving coil 9-31 of the driving assembly 9-30 is corresponding to the driving magnetic element 9-32. The driving coil 9-31 may interact with the magnetic field of the driving magnetic element 9-32 and generate electromagnetic driving force to drive the optical element holder 9-21 of the movable part 9-20 and the optical element 9-OE to move relative to the fixed part 9-10.

The elastic assembly 9-40 may connect the optical element holder 9-21 of the movable part 9-20 to the fixed part 9-10. In detail, the first elastic element 9-41 of the elastic assembly 9-40 may connect the upper portion of the optical element holder 9-21 to the first outer frame 9-11. The second elastic element 9-42 of the elastic assembly 9-40 may connect the lower portion of the optical element holder 9-21 to the base 9-13, so as to suspend the optical element holder 9-21 and the optical element 9-OE so that the optical element holder 9-21 and the optical element 9-OE are movable relative to the fixed part 9-10.

Please continued to refer to FIG. 104 to FIG. 106, the second outer frame 9-12 may include a second outer frame top surface 9-121, and four second outer frame sidewalls 9-122. The second outer frame top surface 9-121 is not parallel to the optical axis 9-OA. The second outer frame sidewall 9-122 is parallel to the optical axis 9-OA, and the second outer frame sidewall 9-122 extends from the second outer frame top surface 9-1211 along the optical axis 9-OA. The bottom plate 9-14 has a plate-like structure, such that the second outer frame 9-12 may be placed on the bottom plate 9-14, and the base 9-13 may be placed on the bottom plate 9-14 as well.

The second outer frame 9-12 and the bottom plate 9-14 of the fixed part 9-10 may together form an internal space to accommodate other elements of the optical element driving mechanism 9-OM. For example, the second outer frame 9-12 may surround the first outer frame 9-11. More specifically, the second outer frame 9-12 and the bottom plate 9-14 may surround the first outer frame 9-11 and the base 9-13.

As shown in FIG. 105 and FIG. 107, in the present embodiment, the first outer frame 9-11 of the fixed part 9-10 may include a first outer frame top surface 9-111, eight first sidewalls 9-112, four second sidewalls 9-113, four first openings 9-114, two first outer frame recess portion 9-115, two second openings 9-116, three third openings 9-117. The first outer frame top surface 9-111 is not parallel to the optical axis 9-OA. The first sidewall 9-112 and the second sidewall 9-113 are parallel to the optical axis 9-OA, and the first sidewall 9-112 and the second sidewall 9-113 extend from the first outer frame top surface 9-111 along the optical axis 9-OA.

In the present embodiment, each of the second sidewall 9-113 is corresponding to two first sidewalls 9-112. More specifically, in the present embodiment, both ends of each of second sidewall 9-113 may be connected to two first sidewalls 9-112, and the two first sidewalls 9-112 are parallel to the corresponding (connected to) second sidewall 9-113. Furthermore, each of second sidewall 9-113 and the two corresponding first sidewalls 9-112 are corresponding to one second outer frame sidewall 9-122 of the second outer frame 9-12.

Please refer to FIG. 109, in other words, the first sidewall 9-112 may be regarded as shrinking from the second sidewall 9-113. That is, a shortest distance 9-S1 between the first sidewall 9-112 and the second outer frame sidewall 9-122 of the second outer frame 9-12 is greater than a shortest distance 9-S2 between the second sidewall 9-113 and the second outer frame sidewall 9-122 of the second outer frame 9-12. With the abovementioned configuration, the first outer frame 9-11 is strengthened, so that the first outer frame 9-11 may be better connected to the base 9-13 (more detail description is shown below).

Figure 110:
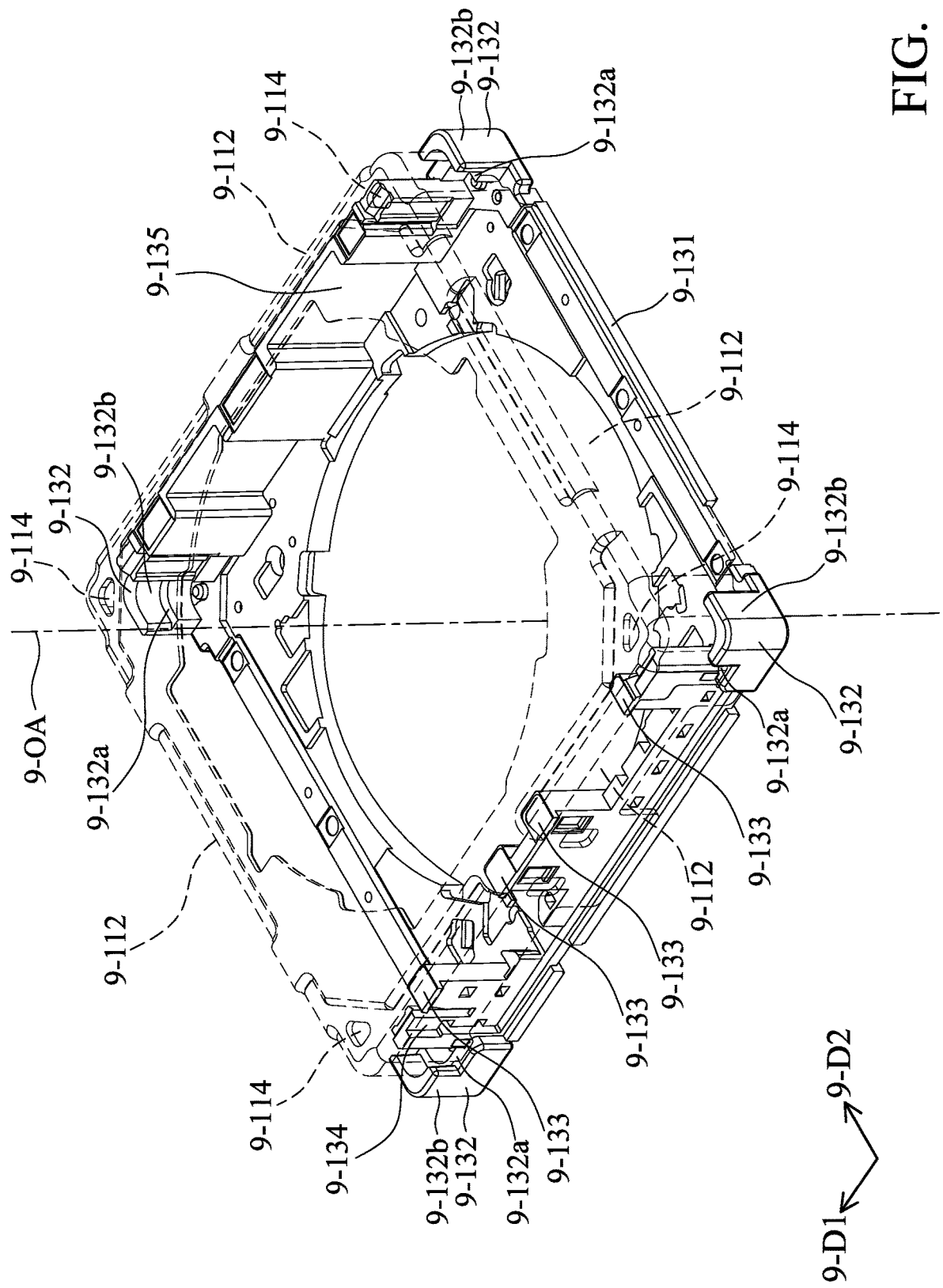
FIG. 110 shows a perspective view of the first outer frame and a base of the optical element driving mechanism according to an embodiment of the present disclosure, wherein the first outer frame is shown as a dashed line.

As shown in FIG. 110, the base 9-13 has a plate-like structure, and the base 9-12 is not parallel to the optical axis 9-O. The base 9-13 may include a base body 9-131, four base extending portions 9-132, at least one base column 9-133, a base recess 9-134, and a base wall 9-135. The four base extending portions 9-132 are located at four different corners of the base body 9-131. The base extending portion 9-132 may include a step 9-132a, and a step wall 9-132b. The step 9-132a may be located on the base body 9-131, and the step wall 9-132b may extend from the step 9-132a. The base wall 9-135 may have a base wall concave-convex structure 9-135a (may refer to FIG. 108).

The first sidewall 9-112 of the first outer frame 9-11 may be placed on the base extending portion 9-132, such that the first outer frame 9-11 is located between the step wall 9-132b of the base extending portion 9-132 and the optical element holder 9-21 of the movable part 9-20 when viewed along the optical axis 9-OA (may refer to FIG. 105 and FIG. 108). The first sidewall 9-112 overlaps the base extending portion 9-132 when viewed along the optical axis 9-OA. The first sidewall 9-112 overlaps the base extending portion 9-132 when viewed along a first direction 9-D1 that is perpendicular to the optical axis 9-OA. The first sidewall 9-112 overlaps the base extending portion 9-132 when viewed along a second direction 9-D2 that is perpendicular to the optical axis 9-OA and the first direction 9-D1. In this way, the first outer frame 9-11 is more stable, and the first outer frame 9-11 is not easily to slide relative to the base 9-13.

Please refer to FIG. 109 and FIG. 110, the second elastic element 9-42 of the elastic assembly 9-40 is disposed on the base extending portion 9-132, and the second elastic element 9-42 of the elastic assembly 9-40 is exposed to the first outer frame 9-11. That is, the second elastic element 9-42 is not covered by the first outer frame 9-11 when viewed along the optical axis 9-OA. Thus, the heat dissipation efficiency of the optical element driving mechanism 9-OM may be improved, and the manufacturing and assembly of the optical element driving mechanism 9-OM may be facilitated.

Figure 111:
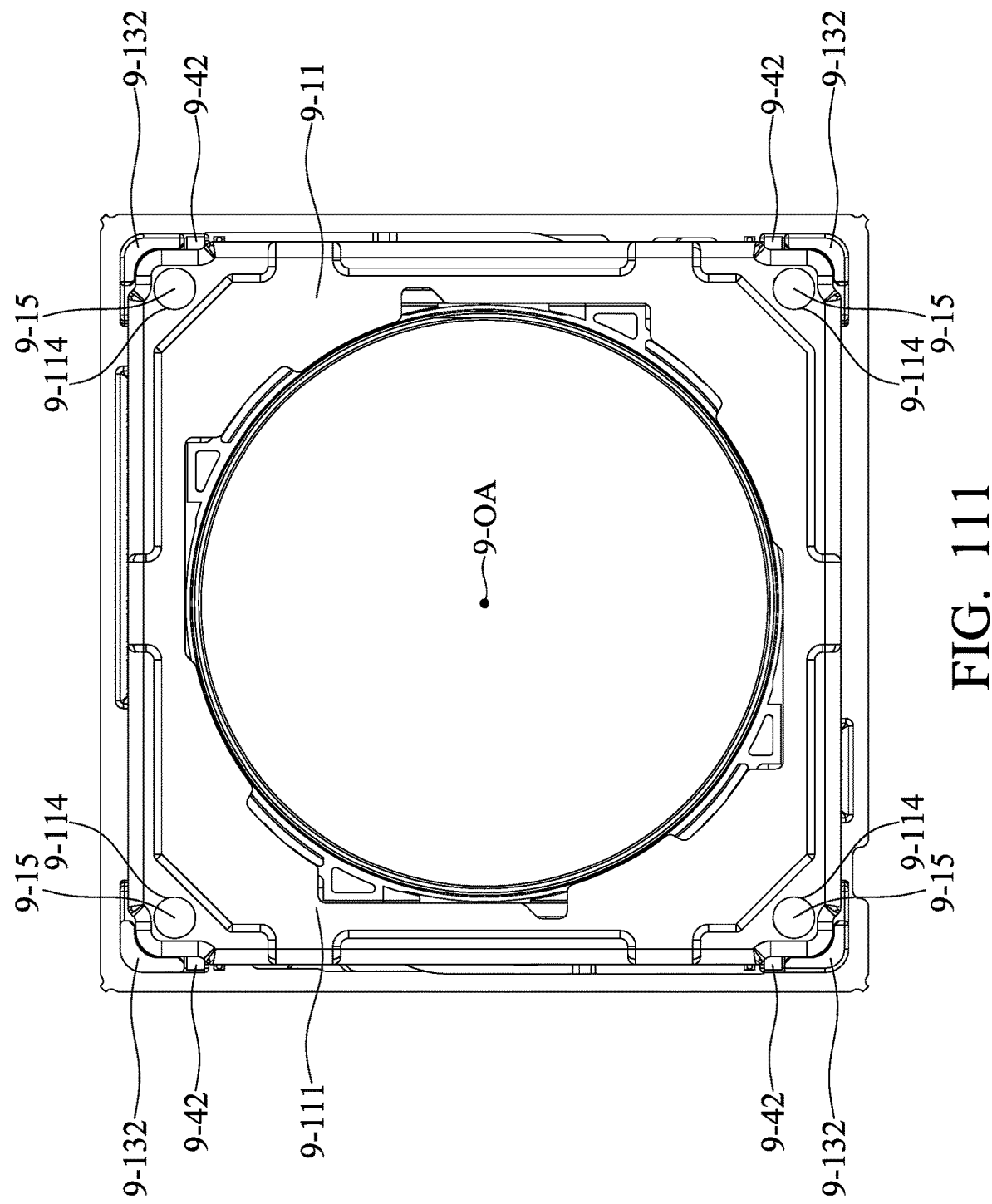
FIG. 111 shows a top view of the optical element driving mechanism according to an embodiment of the present disclosure, wherein the second outer frame is omitted.

Please refer to FIG. 110 and FIG. 111, the four first openings 9-114 of the first outer frame 9-11 are disposed on the first outer frame top surface 9-111 of the first outer frame 9-11. More specifically, the four first openings 9-114 may be disposed at four corners of the first outer frame top surface 9-111, respectively. The bumper element 9-15 is disposed on the first outer frame top surface 9-111 of the first outer frame 9-11. More specifically, the four bumper elements 9-15 may be disposed at four corners of the first outer frame top surface 9-111, respectively.

Please refer FIG. 109 to FIG. 111, in one embodiment, each of the first opening 9-114 accommodates the corresponding bumper element 9-15. The bumper element 9-15 penetrates the first opening 9-114. The bumper element 9-15 overlaps the first opening 9-114 when viewed along the optical axis 9-OA. The bumper element 9-15 overlaps the first opening 9-114 when viewed along the first direction 9-D1 viewed. The bumper element 9-15 overlaps the first opening 9-114 when viewed along the second direction 9-D2.

The bumper element 9-15 extends beyond the first outer frame top surface 9-111 of the first outer frame 9-11. That is, the bumper element 9-15 is taller than the first outer frame top surface 9-111, and the bumper element 9-15 is closer to the second outer frame top surface 9-121 of the second outer frame 9-12 than the first outer frame top surface 9-111 is. That is, a shortest distance 9-S3 between the bumper element 9-15 and the second outer frame top surface 9-121 of the second outer frame 9-12 is shorter than a shortest distance 9-S4 between the first outer frame top surface 9-111 of the first outer frame 9-11 and the second outer frame top surface 9-121 of the second outer frame 9-12.

Figure 112:
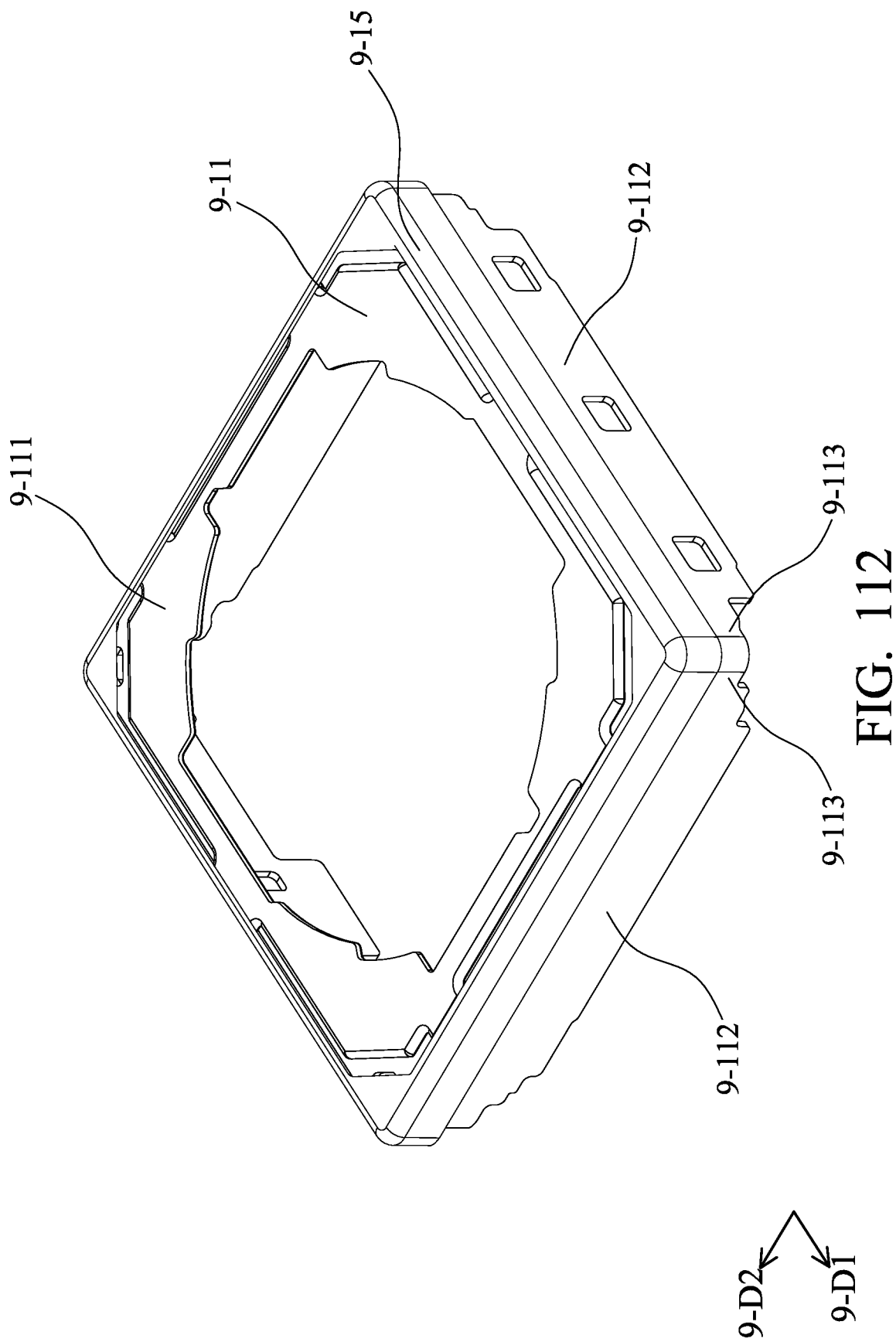
FIG. 112 shows a perspective view of the first outer frame and a bumper element of the optical element driving mechanism according to an embodiment of the present disclosure.

As shown in FIG. 112, in one embodiment, the first outer frame 9-11 may not have the first opening 9-114. The bumper element 9-15 may surround the outer periphery of the first outer frame top surface 9-111, the outer periphery of the upper portion of the first sidewall 9-112, and the outer periphery of the upper portion of the second sidewall 9-113.

Figure 113:
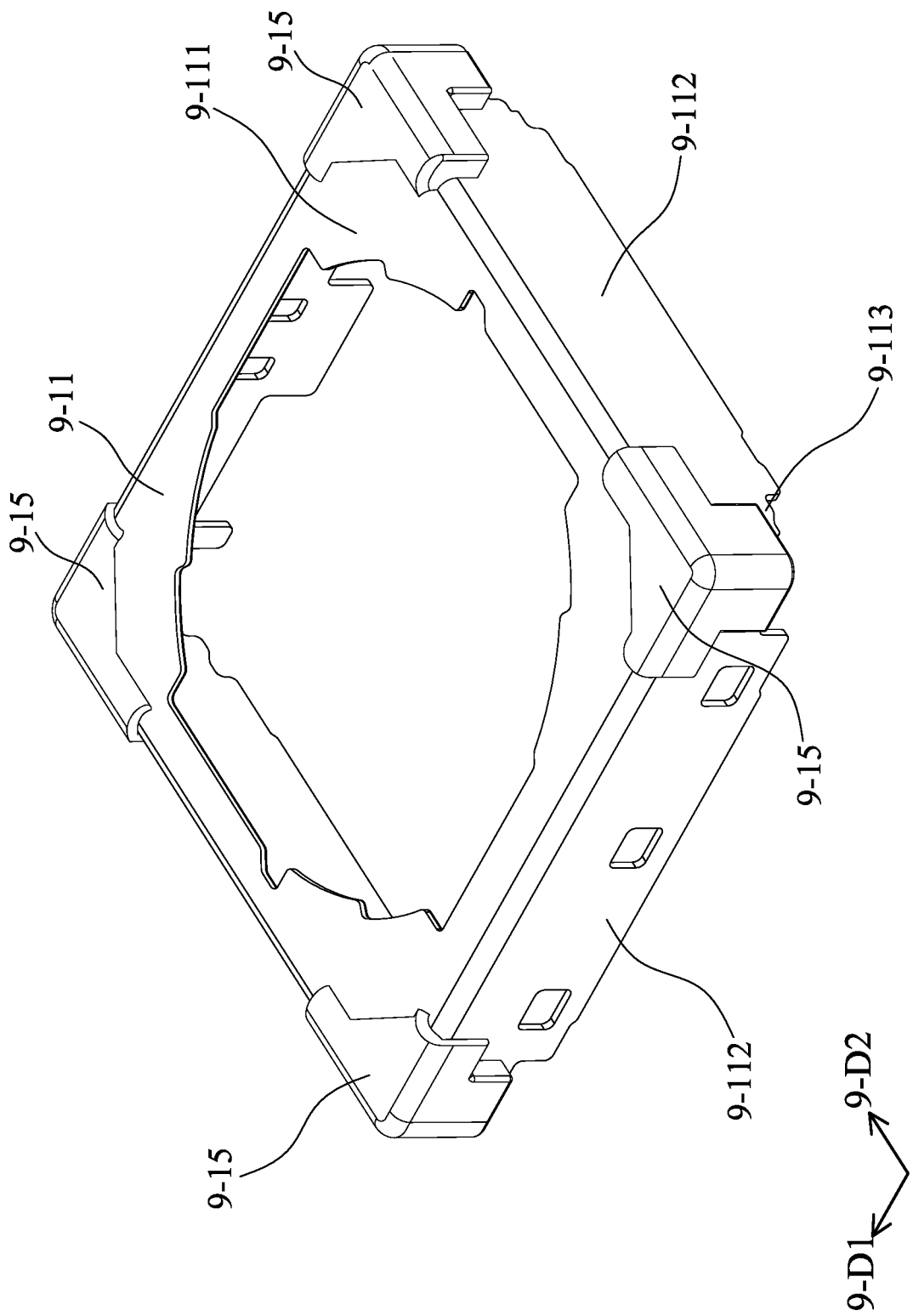
FIG. 113 shows a perspective view of the first outer frame and the bumper element of the optical element driving mechanism according to an embodiment of the present disclosure.

As shown in FIG. 113, in one embodiment, the first outer frame 9-11 may not have the first opening 9-114. The bumper element 9-15 may surround a portion of the outer periphery of the first outer frame top surface 9-111, the outer periphery of the upper portion of the first sidewall 9-112, and a portion of the outer periphery of the upper portion of the second sidewall 9-113.

Figure 114:
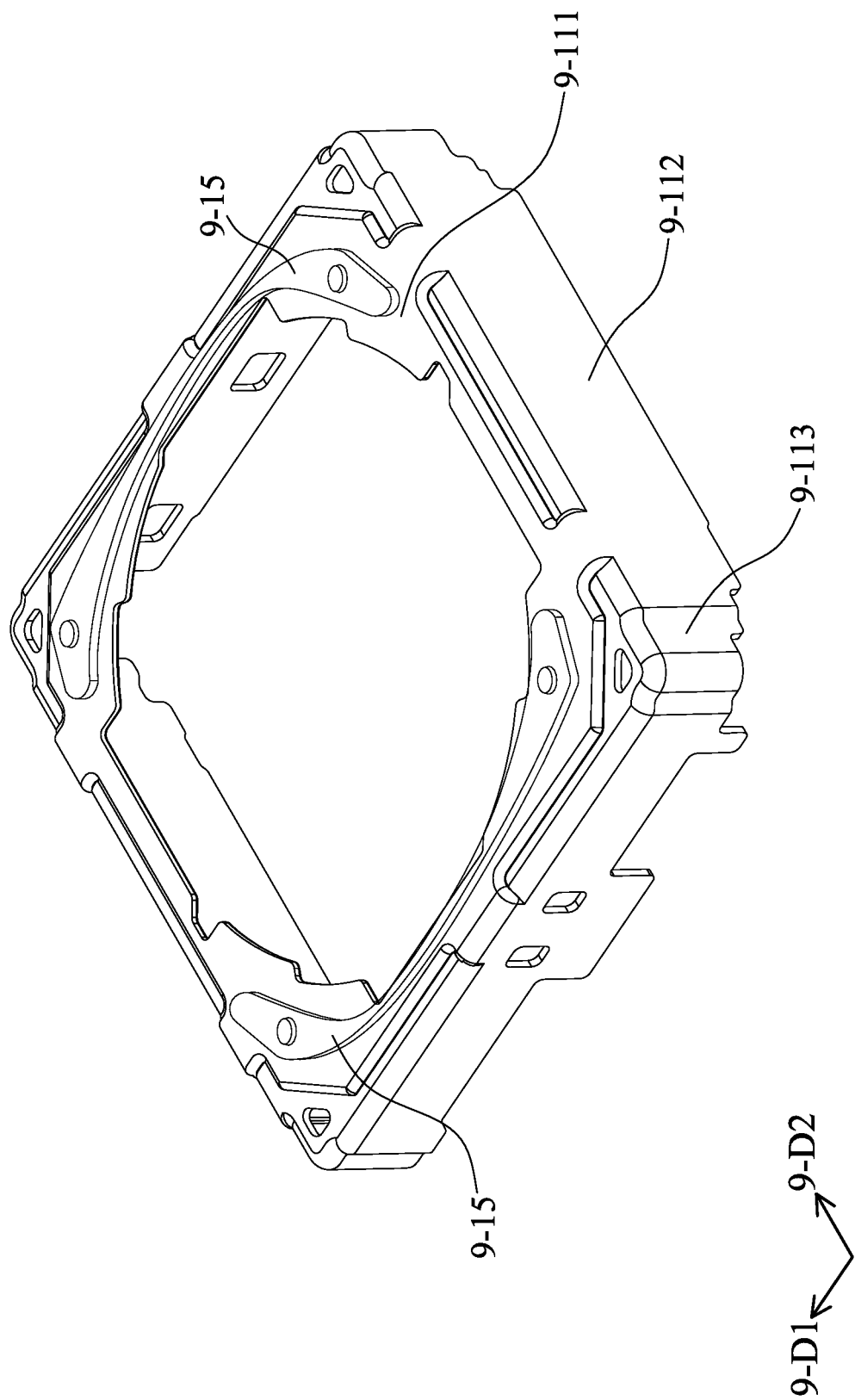
FIG. 114 shows a perspective view of the first outer frame and the bumper element of the optical element driving mechanism according to an embodiment of the present disclosure.

As shown in FIG. 114, in one embodiment, the first outer frame 9-11 may not have the first opening 9-114. The bumper element 9-15 may be disposed on the first outer frame top surface 9-111, and the bumper element 9-15 substantially extends along the first direction 9-D1 or the second direction 9-D2.

In one embodiment, the first outer frame 9-11 and the second outer frame 9-12 may be made of metal, and the bumper element 9-15 may be a resin or a glue material. In one embodiment, the first outer frame 9-11 and the second outer frame 9-12 may be made of metal, and the bumper element 9-15 may be a plastic material, etc. In one embodiment, the first outer frame 9-11 and the second outer frame 9-12 may be made of plastic, and the bumper element 9-15 may be other plastics, resins or glue material.

With the aforementioned configuration, the first outer frame top surface 9-111 is prevented from being in direct contact with the second outer frame top surface 9-121, thereby preventing the damage caused by the contact between the first outer frame top surface 9-111 and the second outer frame top surface 9-121 and the generation of fragments is prevented. Moreover, with the aforementioned configuration, the noise may also be reduced when the optical element driving mechanism 9-OM is impacted.

Figure 115:
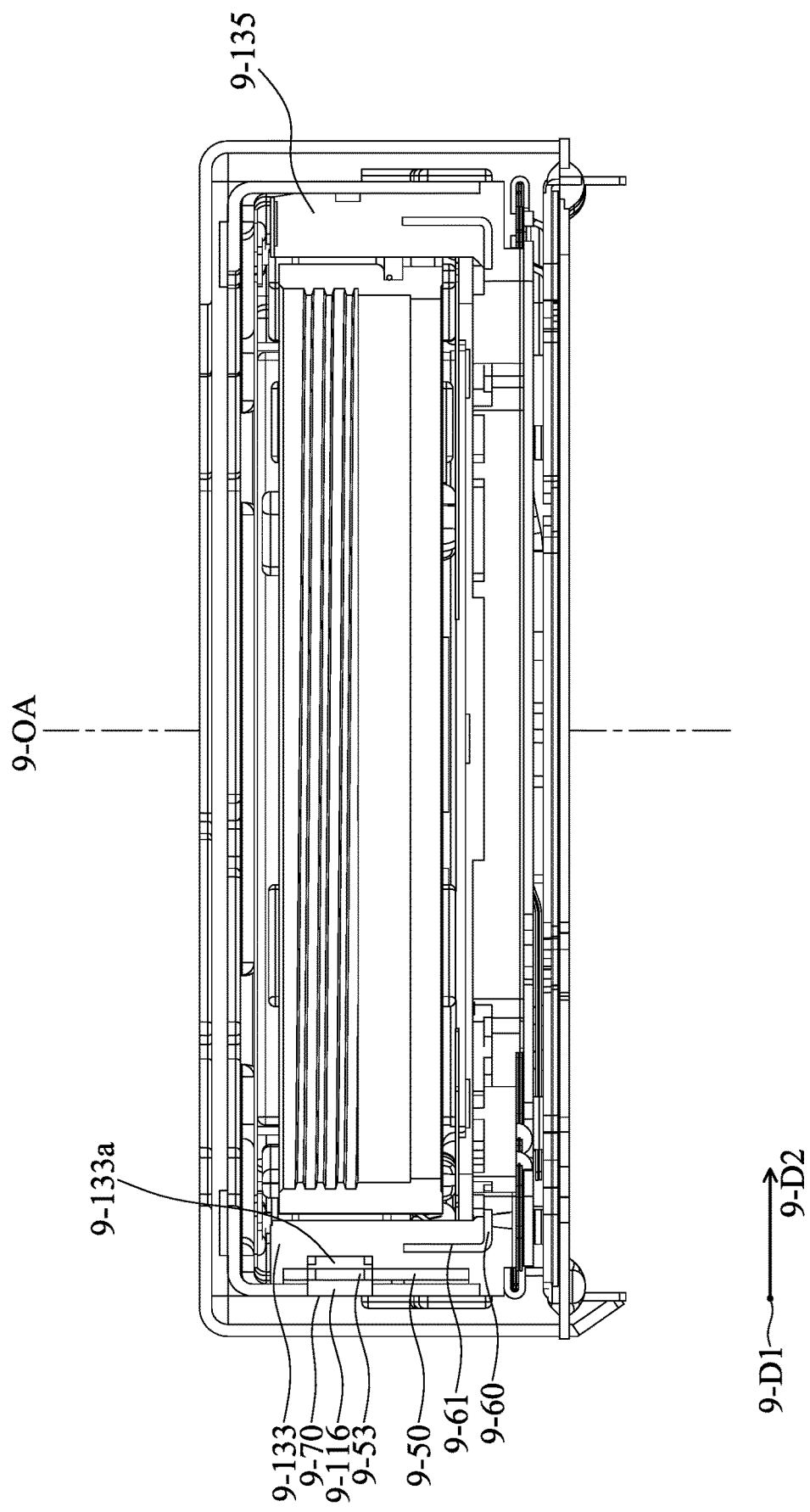
FIG. 115 shows a cross-sectional view of the optical element driving mechanism according to an embodiment of the present disclosure along line 9-B-9-B in FIG. 104.

Please refer to FIG. 115, the base column 9-133 extends from the base body 9-131 along the optical axis 9-OA, and the circuit assembly 9-50 extends along the first direction 9-D1 (please refer to FIG. 107). The base column 9-133 is connected to the circuit assembly 9-50. The base column 9-133 does not overlap the circuit assembly 9-50 when viewed along the first direction 9-D1. The circuit member 9-60 is disposed in the base 9-13. In detail, the circuit member 9-60 may be insert molded into the base 9-13. The circuit member connecting portion 9-61 of the circuit member 9-60 extends along the optical axis 9-OA, and the circuit member connecting portion 9-61 is electrically connected to and is in direct contact with the circuit assembly 9-50 (not shown). With the aforementioned configuration, the optical element driving mechanism 9-OM may be miniaturized.

Figure 116:
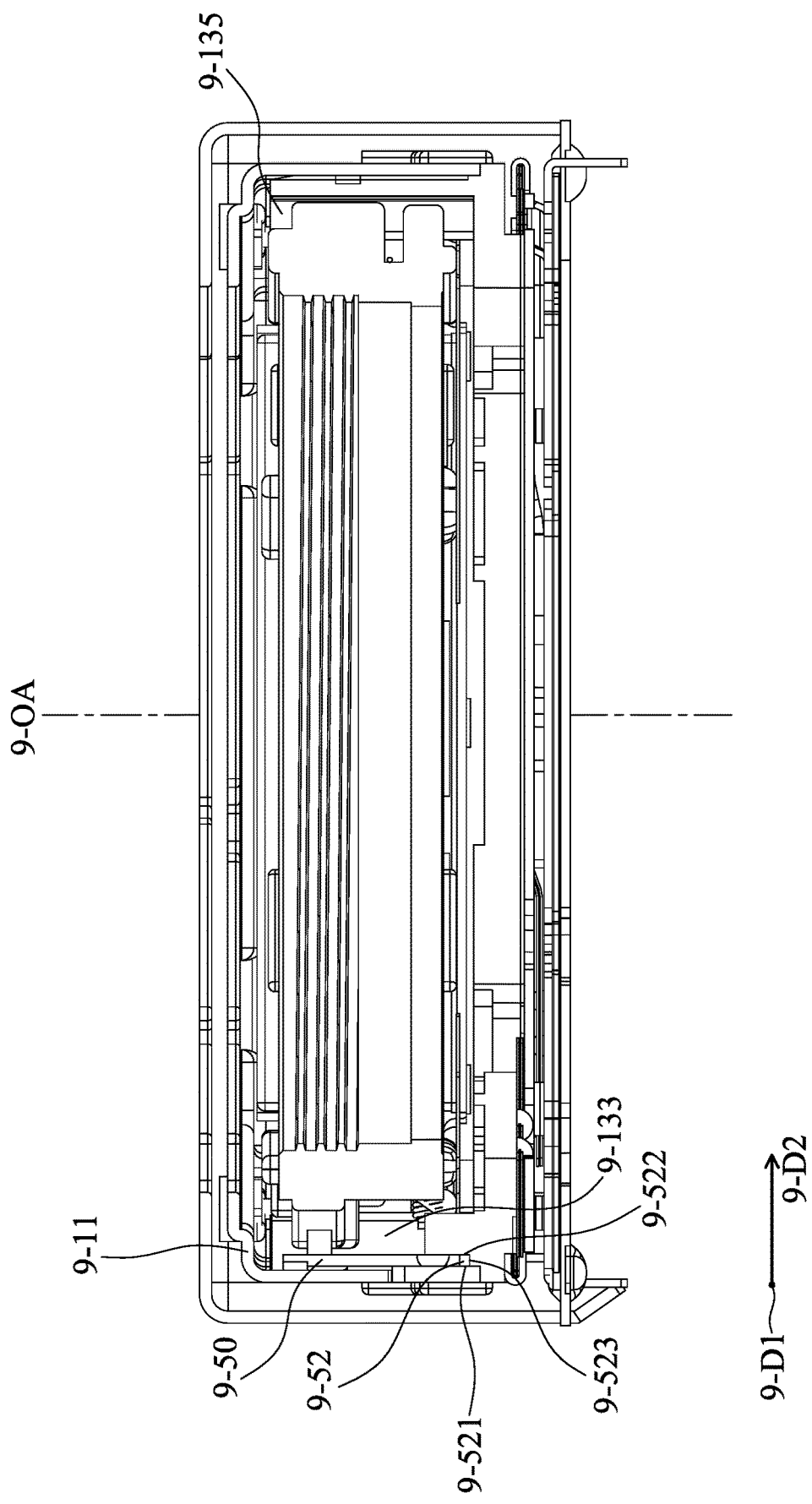
FIG. 116 shows a cross-sectional view of the optical element driving mechanism according to an embodiment of the present disclosure along line 9-C-9-C in FIG. 104.

Please refer to FIG. 116, the circuit assembly connecting portion 9-52 includes a first surface 9-521, a second surface 9-522, and a third surface 9-523. The first surface 9-521 is parallel to the second surface 9-522, the third surface 9-523 is directly connected to the first surface 9-521 and the second surface 9-522, and at least one of the first surface 9-521, the second surface 9-522 and the third surface 9-523 is electrically connected to the circuit member connecting portion 9-61 (not shown in the figures).

The base column 9-133 may include a base column recess 9-133a. The second opening 9-116 of the first outer frame 9-11, the circuit assembly opening 9-53 and the base column recess 9-133a overlap each other when viewed along the second direction 9-D2.

A size of the second opening 9-116 of the first outer frame 9-11 is greater than a size of the circuit assembly opening 9-53, and the size of the circuit assembly opening 9-53 is greater than a size of the base column recess 9-133a when viewed along the first direction 9-D1.

In other words, the size of the second opening 9-116 of the first outer frame 9-11 is greater than the size of the base column recess 9-133a, and the size of the base column recess 9-133a is smaller than the size of the circuit assembly opening 9-53 when viewed along the first direction 9-D1.

Furthermore, the second opening 9-116 of the first outer frame 9-11, the circuit assembly opening 9-53, and the base column recess 9-133a may accommodate the adhesion element 9-70. Thus, the manufacturing and assembly of the optical element driving mechanism 9-OM may be facilitated.

Figure 117:
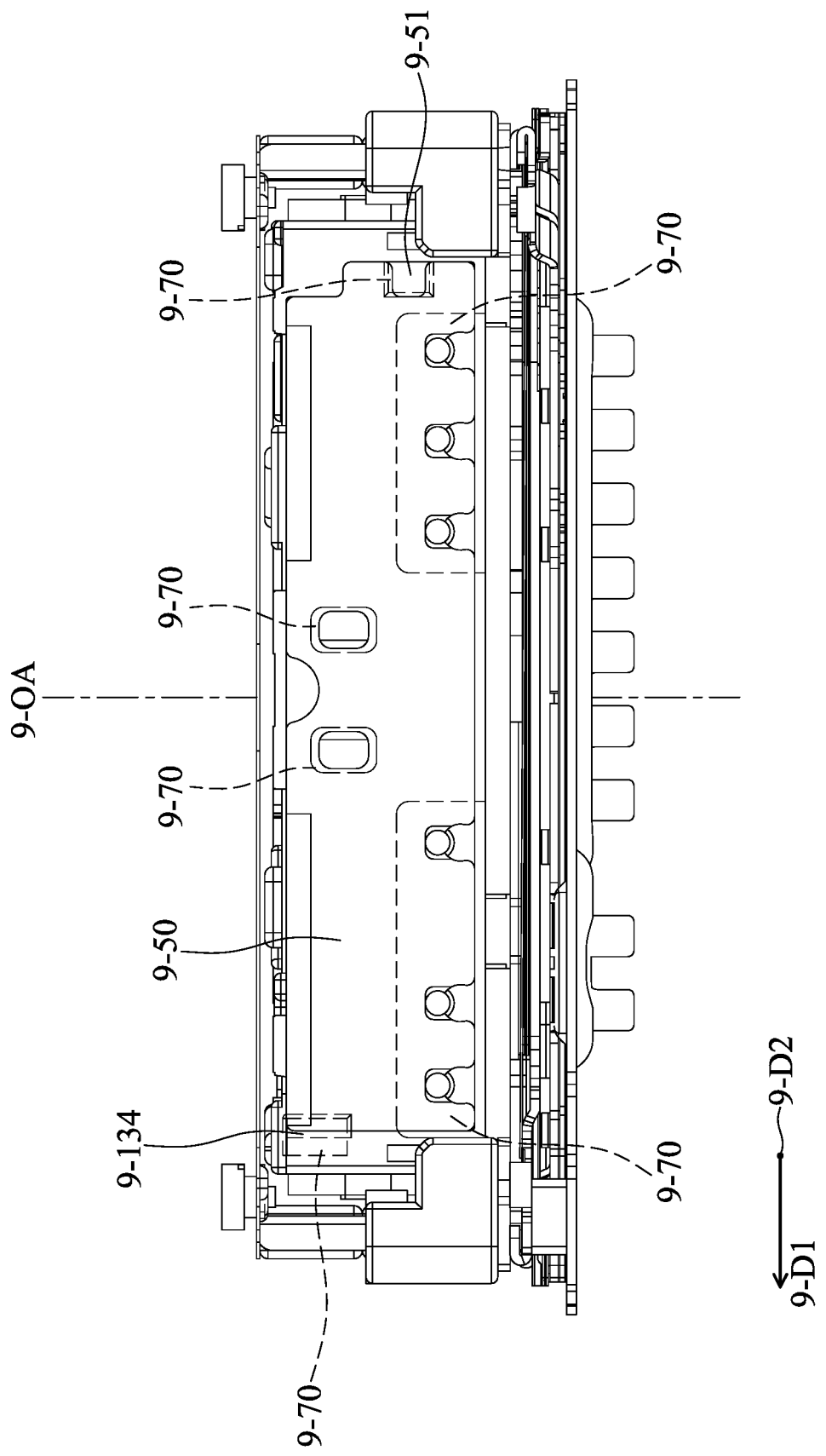
FIG. 117 shows a left side view of the optical element driving mechanism according to an embodiment of the present disclosure, wherein the first outer frame and the second outer frame are omitted, and wherein an adhesion element is shown as a dashed line.

Please refer to FIG. 117, the adhesion element 9-70, the circuit assembly 9-50, and the base recess 9-134 overlap each other when viewed along the first direction 9-D1. The circuit assembly recess portion 9-51 may accommodate the adhesion element 9-70. The circuit assembly connecting portion 9-52 is exposed to the first outer frame recess portion 9-115, and the first outer frame recess portion 9-115 accommodates the adhesion element 9-70 (may refer to FIG. 105).

Figure 118:
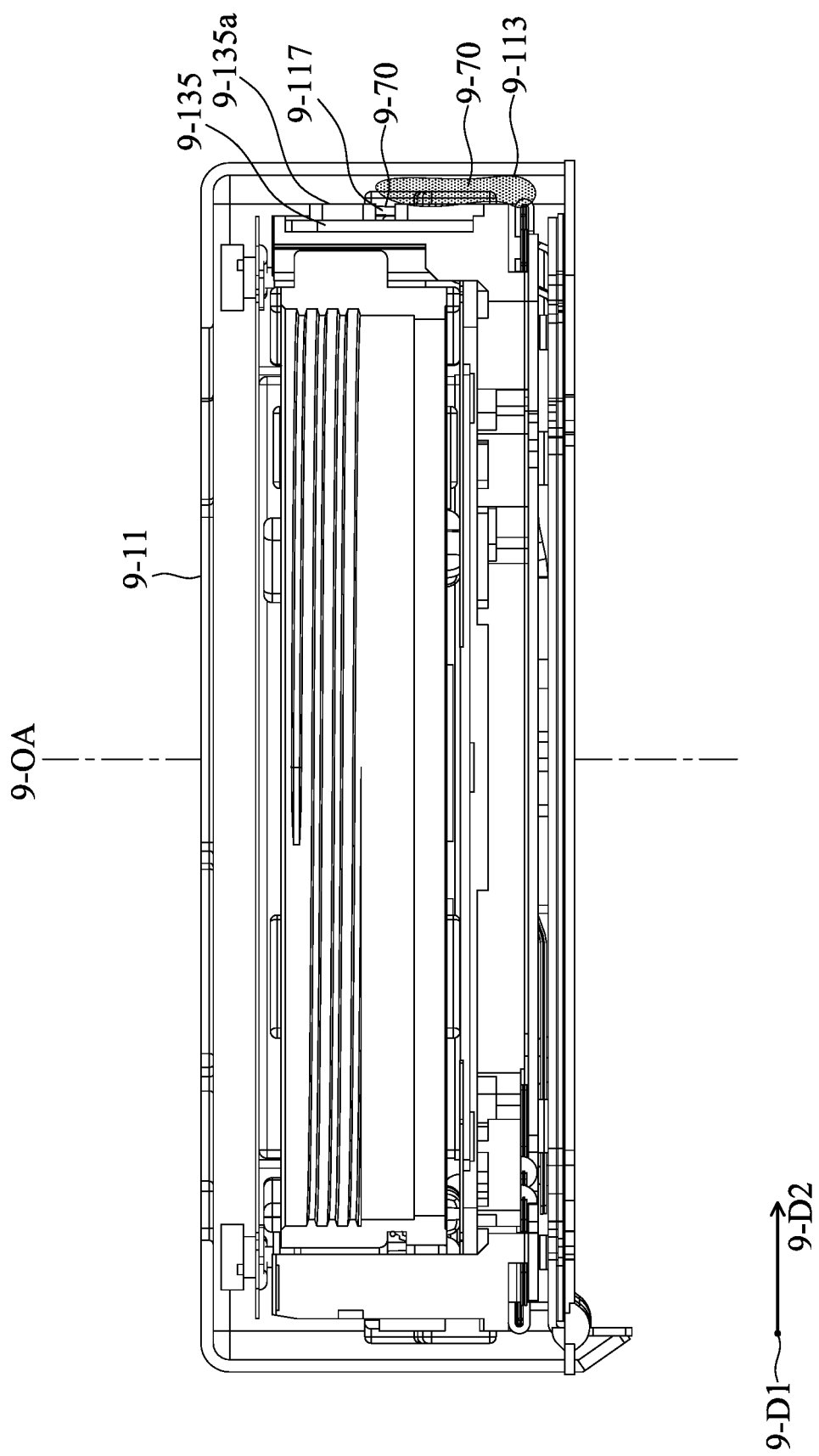
FIG. 118 shows a cross-sectional view of the optical element driving mechanism according to an embodiment of the present disclosure along line 9-D-9-D in FIG. 104.

Please refer to FIG. 118, the base wall 9-135 and the base wall concave-convex structure 9-135a may face the second sidewall 9-113 of the first outer frame 9-11, and the adhesion element 9-70 may be provided between the base wall 9-135 and the second sidewall 9-113, so as to fix the base wall 9-135 and the second sidewall 9-113.

A portion of the base wall concave-convex structure 9-135a is exposed to the third opening 9-117 when viewed along the second direction 9-D2, and the third opening 9-117 accommodates the adhesion element 9-70. Furthermore, the third opening 9-117 overlaps the adhesion element 9-70 when viewed along the optical axis 9-OA. Thus, the manufacturing and assembly of the optical element driving mechanism 9-OM may be facilitated.

In general, the optical element driving mechanism 9-OM of the embodiment of the present disclosure may reduce noise and prevent the generation of fragments when the optical element driving mechanism 9-OM is impacted, and the optical element driving mechanism 9-OM may be miniaturized. With the configuration of the optical element driving mechanism 9-OM of the embodiment of the present disclosure, the manufacturing and assembly of the optical element driving mechanism 9-OM may be facilitated.

Figure 119:
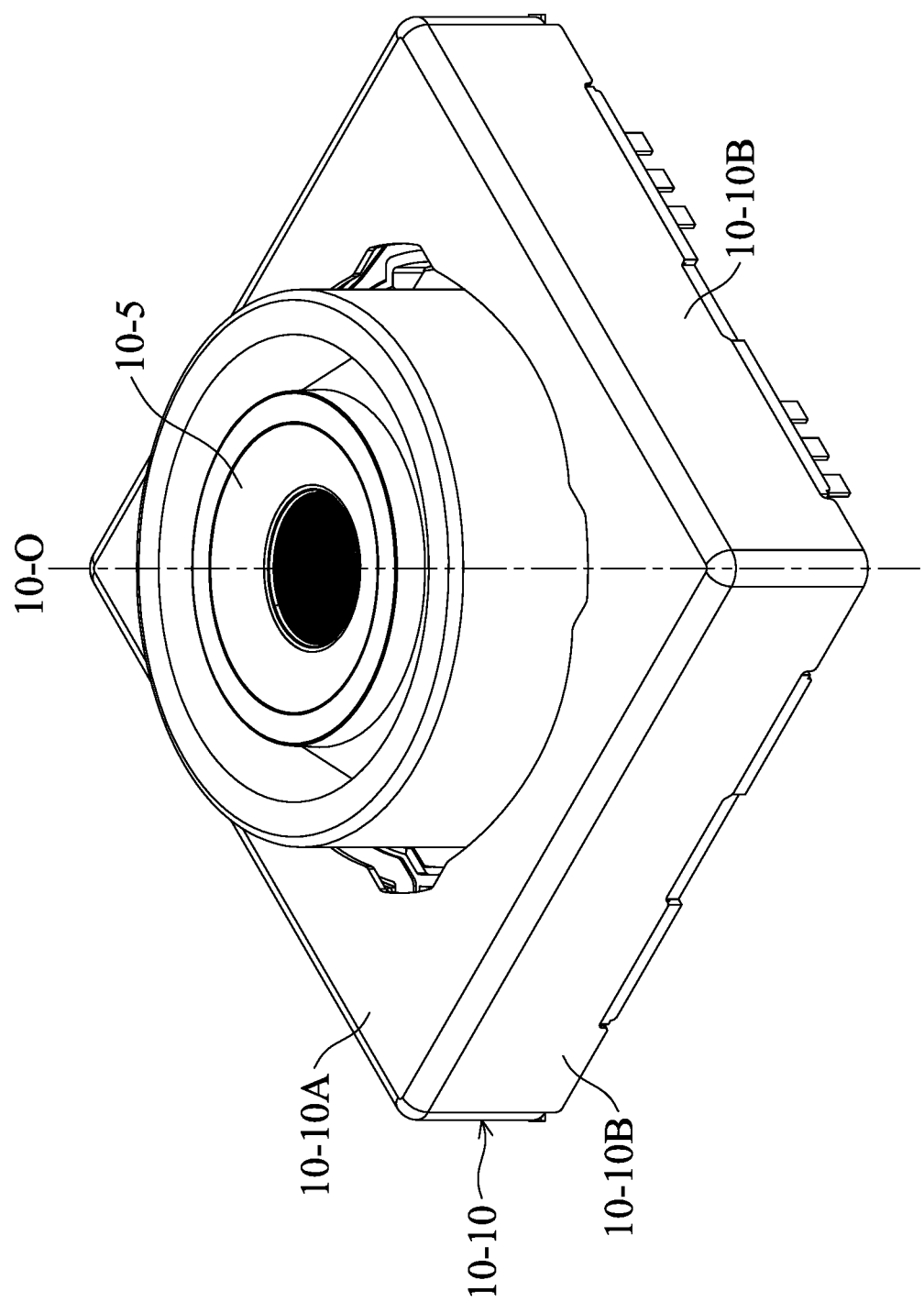
Figure 120A:
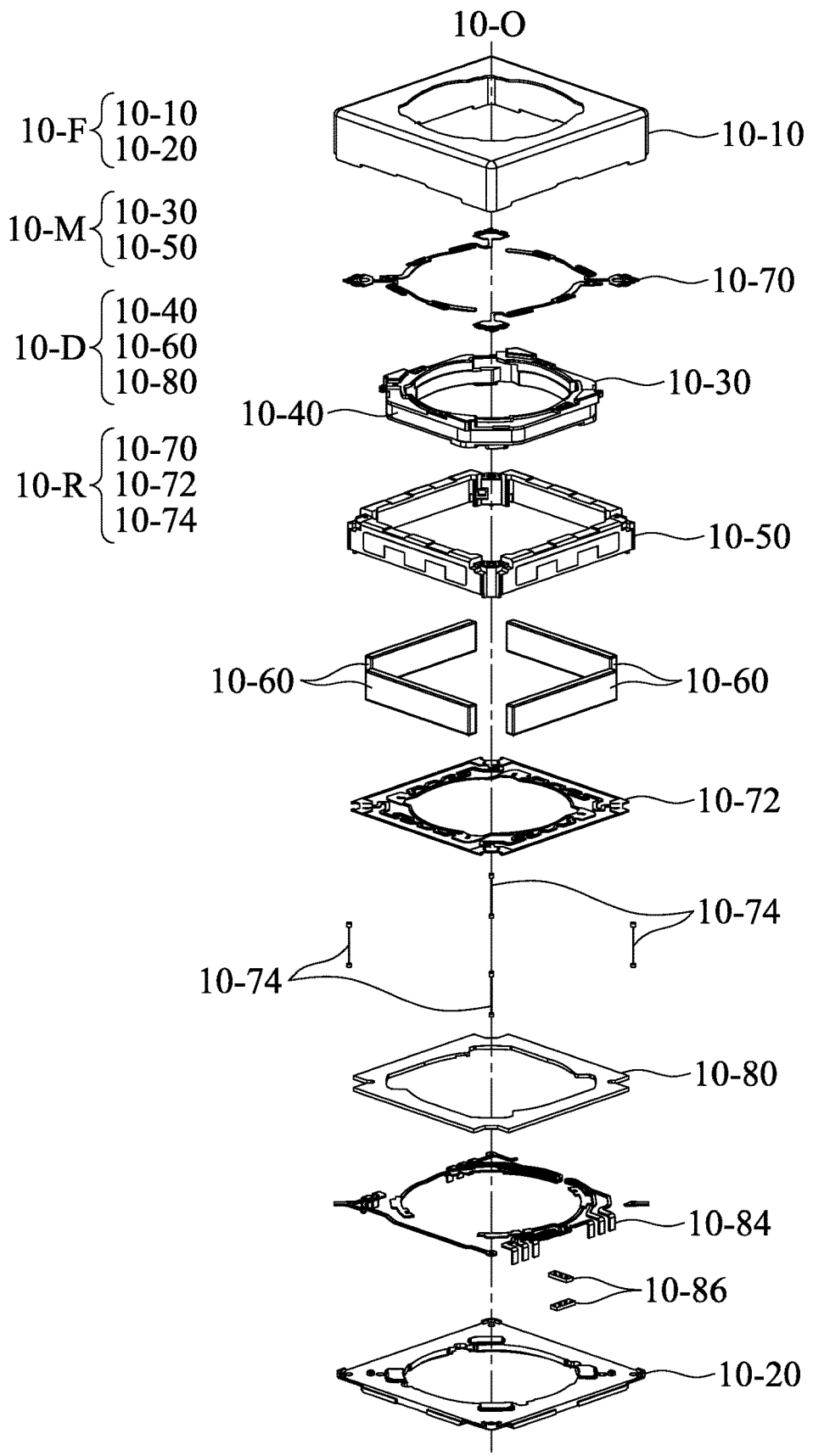
Figure 120B:
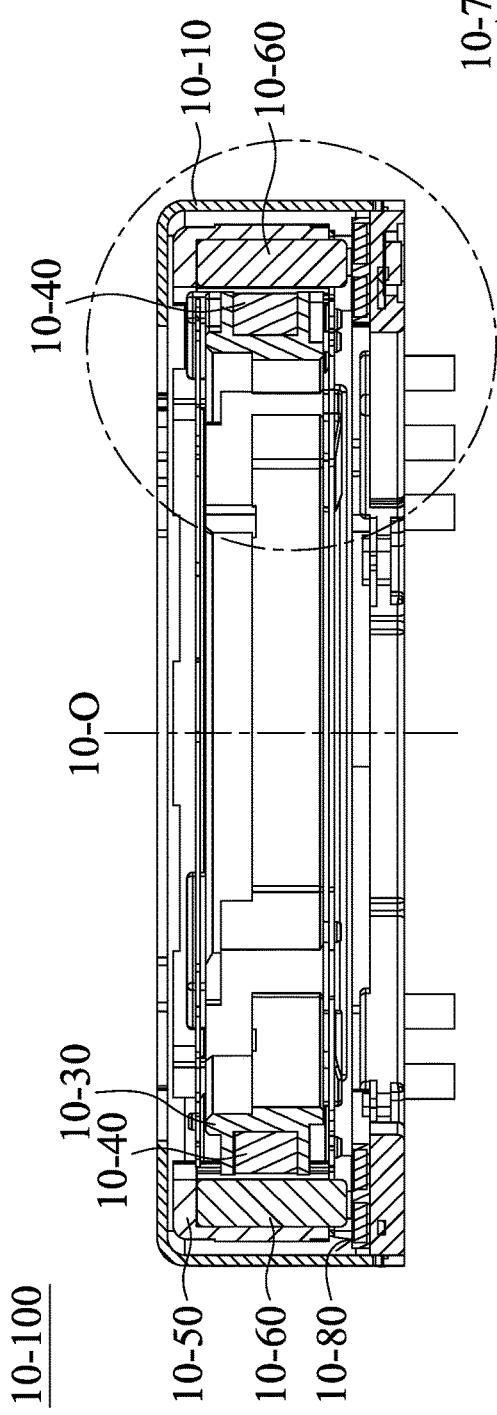
Figure 120C:
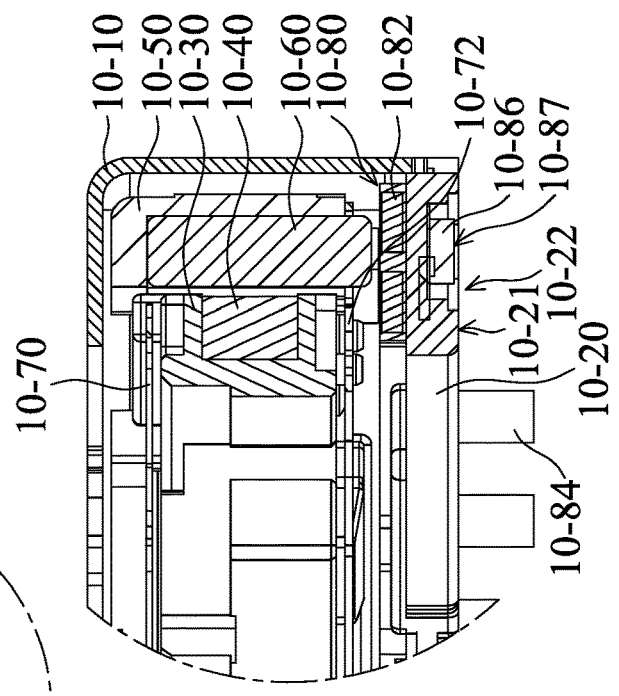

Refer to FIG. 119, FIG. 120A, FIG. 120B, and FIG. 120C. FIG. 119 is a perspective view of an optical element driving mechanism 10-100 in some embodiments of the present disclosure. FIG. 120A is an exploded view of the optical element driving mechanism 10-100. FIG. 120B is a cross-sectional view of the optical element driving mechanism 10-100. FIG. 120C is an enlarged view of FIG. 120B.

As shown in FIG. 119 to FIG. 120C, the optical element driving mechanism 10-100 mainly includes a case 10-10, a bottom 10-20, a holder 10-30, a fifth coil 10-40, a frame 10-50, a plurality of magnetic element 10-60, a upper resilient element 10-70 (includes a first resilient element 10-70A, a second resilient element 10-70B, a third resilient element 10-70C, and a fourth resilient element 10-70D), a fifth resilient element 10-74, a sixth resilient element 10-72, and a circuit board 10-80. A driving coil 10-82 and a circuit assembly 10-84 may be embedded in the circuit board 10-80, and a control element 10-86 may be disposed under the bottom 10-20.

The optical element driving mechanism 10-100 may be used for driving an optical element 10-5 to move, so auto focus (AF) or optical image stabilization (OIS) may be achieved. The case 10-10 and the bottom 10-20 may be called as a fixed portion 10-F, and the holder 10-30 and the frame 10-50 may be called as a movable portion 10-M. The movable portion 10-M is movably connected to the fixed portion 10-F. In other words, the movable portion 10-M is movable relative to the fixed portion 10-F. Moreover, in some embodiments, the fifth coil 10-40 and the magnetic element 10-60 may be called as a driving assembly 10-D used for driving the movable portion 10-M to move relative to the fixed portion 10-F. The upper resilient element 10-70, the fifth resilient element 10-74, and the sixth resilient element 10-72 may be called as a resilient assembly 10-R, and the movable portion 10-M is movably connected to the fixed portion 10-F through the resilient assembly 10-R.

The case 10-10 has a top wall 10-10A and side wall 10-10B extending from the edges of the top wall 10-10A. The case 10-10 and the bottom 10-20 are arranged along the main axis 10-O (the Z direction). The case 10-10 and the bottom 10-20 may be combined to form a shell of the optical element driving mechanism 10-100. For example, the bottom 10-20 may be affixed on the case 10-10. It should be noted that a case opening is formed on the case 10-10, and a bottom opening is formed on the 10-bottom 10-20. The center of the case opening corresponds to the main axis 10-O of the optical element 10-5, and the bottom opening corresponds to an image sensor (not shown) outside the optical element driving mechanism 10-100. Therefore, the optical element 10-5 disposed in the optical element driving mechanism 10-100 may perform focus to the image sensor along the main axis 10-O.

The holder 10-30 includes a through hole, and the optical element 10-5 may be affixed in the through hole. The fifth coil 10-40 may be disposed on external surfaces of the holder 10-30. In some embodiments, the magnetic element 10-60 may be affixed on the frame 10-50 or may be movable relative to the frame 10-50. It should be noted that the interaction between the magnetic element 10-60 and the fifth coil 10-40 may drive the holder 10-30 to move relative to the frame 10-50 along the main axis 10-O, so fast focus may be achieved.

In this embodiment, the holder 10-30 and the optical element 10-5 disposed therein are movably disposed in the frame 10-50. More specifically, the holder 10-30 may be connected to the frame 10-50 and suspended in the frame 10-50 by the upper resilient element 10-70 and the sixth resilient element 10-72 that are made by metal. When current is passed to the fifth coil 10-40, the fifth coil 10-40 may interact with the magnetic element 10-60 to generate an electromagnetic force to move the holder 10-30 and the optical element 10-5 relative to the frame 10-50 along the main axis 10-O, so auto focus may be achieved. Furthermore, the movable portion 10-M may be movably connected to the fixed portion 10-F through the fifth resilient element 10-74.

In some embodiments, the circuit assembly 10-84 on the bottom 10-20 may be electrically connected to other electronic elements inside or outside the optical element driving mechanism 10-100 for auto focus or optical image stabilization. The sixth resilient element 10-72 and the circuit assembly 10-84 on the case 10-10 may be assembled by soldering or laser welding, so the fifth coil 10-40 is allowed to be electrically connected to external circuit.

Moreover, in some embodiments, the driving coil 10-82 embedded in the bottom 10-20 may interact with the magnetic element 10-60 to move the holder 10-30. When the fifth coil 10-40 and the driving coil 10-82 in the bottom 10-20 interact with the magnetic element 10-60, driving forces with different directions may be generated to perform auto focus or optical image stabilization.

Figure 121:
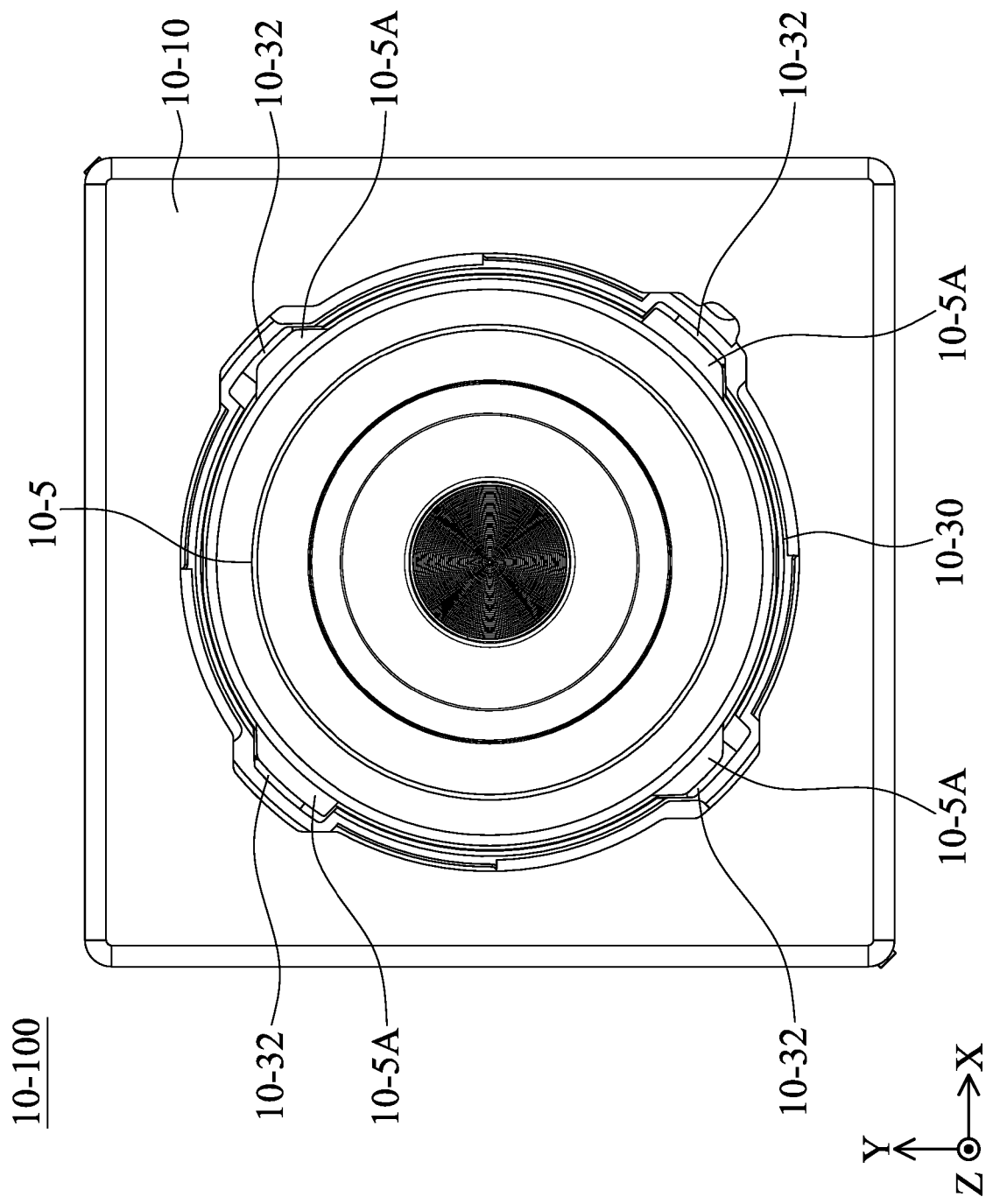

FIG. 121 is a top view of the optical element driving mechanism 10-100, wherein the optical element 10-5 is disposed therein. The holder 10-30 of the optical element driving mechanism 10-100 may include a plurality of concave portion 10-32, the optical element 10-5 may include a plurality of protruding portion 10-5A, and the protruding portion 10-5A may be disposed in the concave portion 10-32 to affix the position of the optical element 10-5 relative to the 10-holder 10-30.

Figure 122:
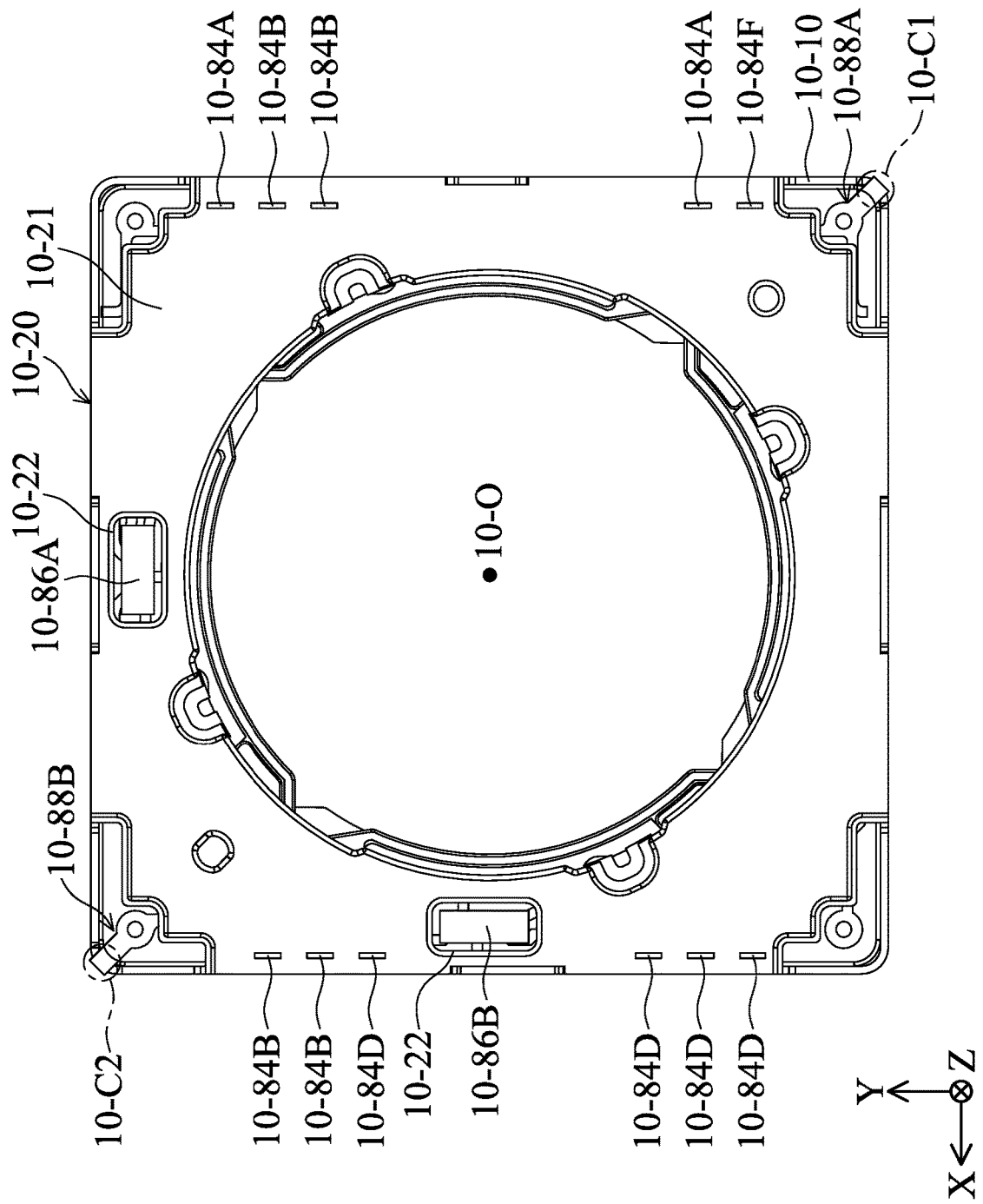
Figures 123A, 123B:
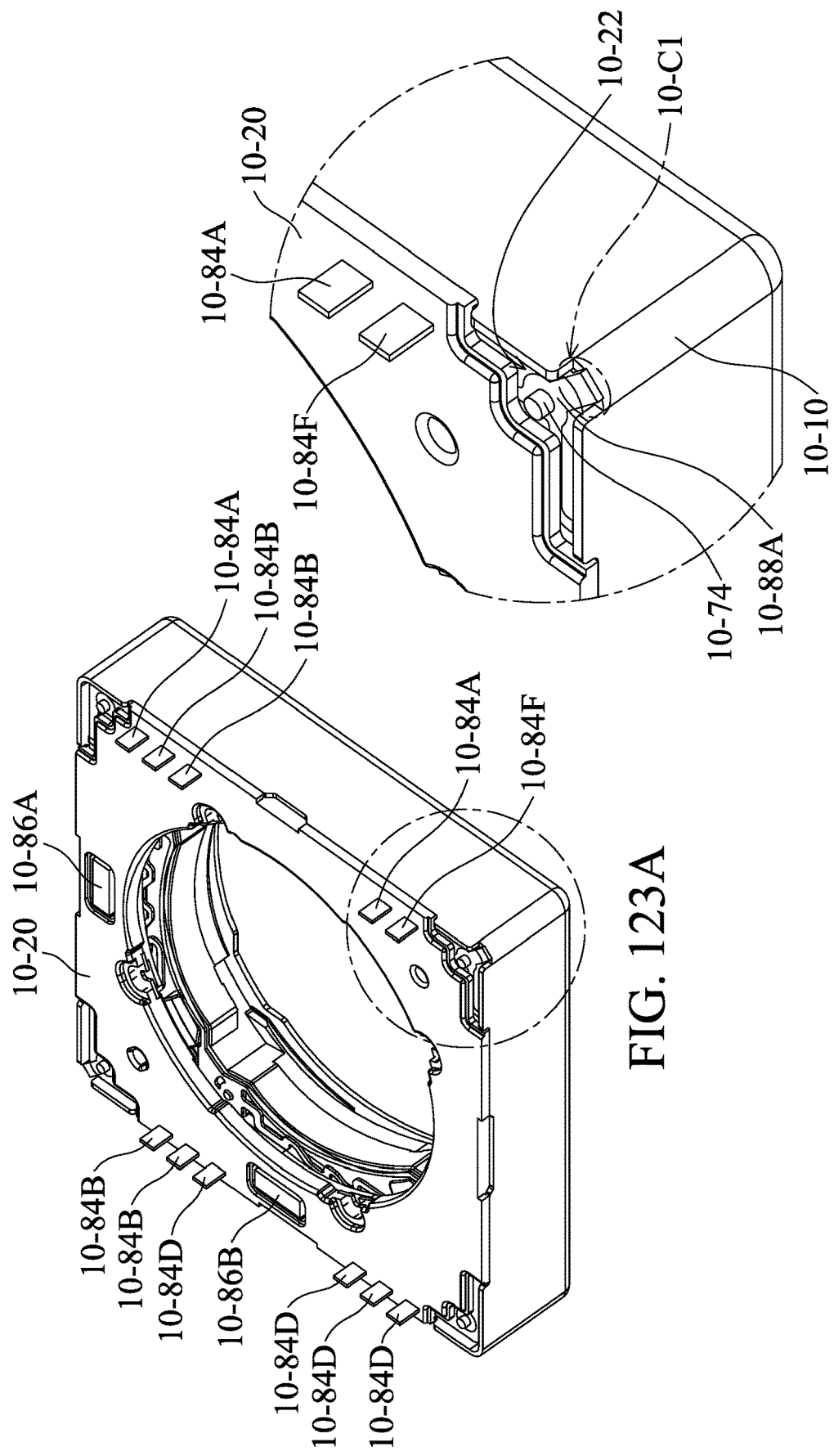

FIG. 122 is a top view of the optical element driving mechanism 10-100, FIG. 123A is a perspective view of the optical element driving mechanism 10-100, and FIG. 123B is an enlarged view of FIG. 123A. In some embodiments, the control element 10-86 may include a first control element 10-86A and a second control element 10-86B disposed in the recess 10-22 of the bottom 10-20 and exposed from the bottom 10-20. In some embodiments, refer to FIG. 120C, the bottom surface 10-87 of the control element 10-86 is not beyond the bottom surface 10-21 of the bottom 10-20. That is, the depth of the recess 10-22 may be greater than the depth of the control element 10-86, so the control element 10-86 may be protected from damaged.

The first control element 10-86A and the second control element 10-86B may be used for driving different elements of the driving assembly 10-D to allow the optical element 10-5 moving in different directions. Different control element 10-86 may be used for controlling the movement of the optical element 10-5, so commands for different directions may be prevented from interference, and the accuracy of controlling the driving assembly 10-D may be thus enhanced.

In some embodiments, a portion of the circuit assembly 10-84 embedded in the circuit board 10-80 may be exposed from the circuit board 10-80 and the bottom 10-20. For example, as shown in FIG. 122, FIG. 123A, and FIG. 123B, the circuit assembly 10-84 may include a grounding element 10-88A and a grounding element 10-88B that are exposed from the bottom 10-20. The grounding element 10-88A and the grounding element 10-88B may be connected to the case 10-10 and the fifth resilient element 10-74 through the first electrical connecting point 10-C1 and the second electrical connecting point 10-C2, respectively. Therefore, the optical element driving mechanism 10-100 may be connected to ground. In some embodiments, the grounding element 10-88A, the grounding element 10-88B, and the case 10-10 may include metal (e.g. stainless steel), or the grounding element 10-88A, the grounding element 10-88B, and the case 10-10 may be formed by an identical material for connection.

When viewed along the main axis 10-O, the fixed portion 10-F has a polygonal shape (e.g. rectangular), and the first electrical connecting point 10-C1 and the second electrical connecting point 10-C2 may at the corners of the fixed portion 10-F, and the main axis 10-O may be between the first electrical connecting point 10-C1 and the second electrical connecting point 10-C2. For example, in some embodiments, the connection between the first electrical connecting point 10-C1 and the second electrical connecting point 10-C2 may pass through the main axis 10-O to separate the first electrical connecting point 10-C1 and the second electrical connecting point 10-C2. When one of the first electrical connecting point 10-C1 and the second electrical connecting point 10-C2 is damaged, another one can keep perform grounding to enhance the durability of the optical element driving mechanism 10-100.

Figure 125:
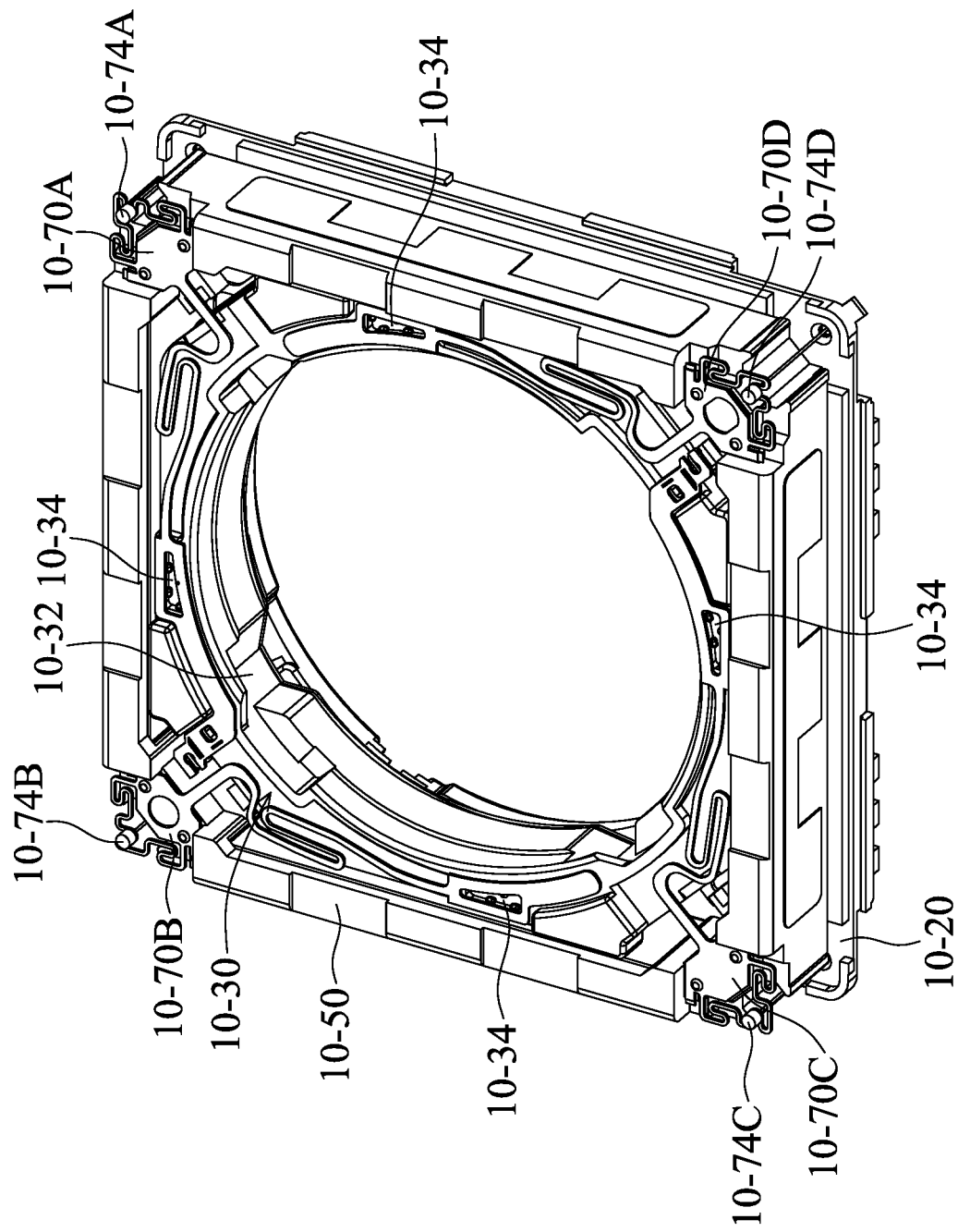

FIG. 124A is a top view of the optical element driving mechanism 10-100, wherein the case 10-10 is omitted. FIG. 124B is an enlarged view of FIG. 124A. FIG. 125 is a perspective view of the optical element driving mechanism 10-100, wherein the case 10-10 is omitted. The upper resilient element 10-70 may include separated portions, such as the first resilient element 10-70A, the second resilient element 10-70B, the third resilient element 10-70C, and the fourth resilient element 10-70D that are connected to the fifth resilient element 10-74A, the fifth resilient element 10-74B, the fifth resilient element 10-74C, and the fifth resilient element 10-74D, which is shown in FIG. 124A. The holder 10-30 may be movably connected to the frame 10-50 of the movable portion 10-M through the upper resilient element 10-70 (which includes the first resilient element 10-70A, the second resilient element 10-70B, the third resilient element 10-70C, and the fourth resilient element 10-70D). In some embodiments, the first resilient element 10-70A, the second resilient element 10-70B, the third resilient element 10-70C, and the fourth resilient element 10-70D are plate-shaped. The first resilient element 10-70A and the third resilient element 10-70C are connected to the grounding element 10-88A and the grounding element 10-88B through the fifth resilient element 10-74A and the fifth resilient element 10-74C, respectively. In some embodiments, the second resilient element 10-70B and the fourth resilient element 10-70D are connected to the driving assembly 10-D through the fifth resilient element 10-74B and the fifth resilient element 10-74D, respectively. Therefore, circuit for transferring different signals may be separated to prevent interference between the signals.

In some embodiments, when viewed along the main axis 10-O (the Z direction), the first resilient element 10-70A and the third resilient element 10-70C are at opposite sides of the main axis 10-O, and the second resilient element 10-70B and the second resilient element 10-70B are at opposite sides of the main axis 10-O. In some embodiments, the fifth resilient element 10-74 may be strip-shaped and may extend in a direction that is parallel to the thickness direction of the first resilient element 10-70A, the second resilient element 10-70B, the third resilient element 10-70C, or the fourth resilient element 10-70D (i.e. the Z direction), so the movable portion 10-M may be movably disposed in the fixed portion 10-F.

FIG. 126A is a perspective view of the optical element driving mechanism 10-100, wherein the case 10-10, the frame 10-50, and the upper resilient element 10-70 are omitted. FIG. 126B is an enlarged view of FIG. 126A. A recessed structure 10-34 may be formed on the holder 10-30, and adhesive material (glue) may be filled in the recessed structure 10-34 to allow the holder 10-30 being affixed to the first resilient element 10-70A, the second resilient element 10-70B, the third resilient element 10-70C, and the fourth resilient element 10-70D.

FIG. 127 is a schematic view of the recessed structure 10-34. In some embodiments, the recessed structure 10-34 may include a protruding structure 10-35 and protruding structure 10-36. The protruding structure 10-35 and protruding structure 10-36 in the recessed structure 10-34 are shown by dashed line. In some embodiments, the recessed structure 10-34 may have a depth 10-H1, the protruding structure 10-35 may have a height 10-H2, and the protruding structure 10-36 may have a height 10-H3. The depth 10-H1 may be greater than the height 10-H2 and the height 10-H3. In other words, the protruding structure 10-35 and the protruding structure 10-36 are lower than the recessed structure 10-34. The protruding structure 10-35 and the protruding structure 10-36 are used for increasing the surface area of the recessed structure 10-34, so the adhesive material disposed in the recessed structure 10-34 may be further connected to the recessed structure 10-34. In some embodiments, the height 10-H3 is less than the height 10-H2 to increase the design flexibility.

FIG. 128 is a top view of the optical element driving mechanism 10-100, wherein the case 10-10, the frame 10-50, and the upper resilient element 10-70 are omitted. FIG. 129 is a top view of the bottom 10-20 and the circuit board 10-80. Refer to FIG. 128 and FIG. 129, the magnetic element 10-60 in of the driving assembly 10-D may include a first magnetic element 10-60A, a second magnetic element 10-60B, a third magnetic element 10-60C, and a fourth magnetic element 10-60D. The driving coil 10-82 may include a driving coil 10-82A, a second coil 10-82B, a third coil 10-82C, and a fourth coil 10-82D. The driving coil 10-82A, the second coil 10-82B, the third coil 10-82C, and the fourth coil 10-82D may respectively correspond to the first magnetic element 10-60A, the second magnetic element 10-60B, the third magnetic element 10-60C, the fourth magnetic element 10-60D, such as may partially overlap each other in the Z direction. The driving coil 10-82A and the third coil 10-82C may be drive the fixed portion 10-F to move in a first dimension (e.g. the Y direction), and the second coil 10-82B and the fourth coil 10-82D may be used for drive the movable portion 10-M to move in a second dimension (e.g. the X direction) to achieve optical image stabilization.

FIG. 130A is a schematic of the bottom 10-20 and the circuit assembly 10-84 in the bottom 10-20. FIG. 130B is a schematic view of the circuit assembly 10-84 and the control element 10-86. FIG. 130C and FIG. 130D are schematic views of the driving coil 10-82A, the second coil 10-82B, the third coil 10-82C, and the fourth coil 10-82D electrically connected to some elements of the circuit assembly 10-84, wherein some elements are omitted for simplicity. As shown in FIG. 130A, the bottom 10-20 may have a first side 10-S1 and a second side 10-S2, the first side 10-S1 extends in a first direction (the Y direction), and the second side 10-S2 extends in a second direction (the X direction), wherein the first direction and the second direction are different. In some embodiments, when viewed along the main axis 10-O, a first virtual line 10-V1 passes through the main axis 10-O and the first control element 10-86A, and the first virtual line 10-V1 is parallel to the first direction (the Y direction). In some embodiments, a second virtual line 10-V2 passes through the main axis 10-O and the second control element 10-86B, and the second virtual line 10-V2 and the second direction (the X direction) are parallel. The first virtual line 10-V1 and the second virtual line 10-V2 may device the bottom 10-20 to four quadrants (e.g. a first quadrant 10-Q1, a second quadrant 10-Q2, a third quadrant 10-Q3, and a fourth quadrant 10-Q4).

Besides the grounding element 10-88A and the grounding element 10-88B, the circuit assembly 10-84 further include a plurality of circuit terminals, such as a first circuit terminal 10-84A, a second circuit terminal 10-84B, a third circuit terminal 10-84C, a fourth circuit terminal 10-84D, a fifth circuit terminal 10-84E, and a sixth circuit terminal 10-84F. The first circuit terminal 10-84A may be connected to the second resilient element 10-70B and the fourth resilient element 10-70D through the fifth resilient element 10-74B and the fifth resilient element 10-74D, so the fifth coil 10-40 may be connected to an external circuit (not shown). The second circuit terminal 10-84B and the third circuit terminal 10-84C may be electrically connected to the first control element 10-86A. The fourth circuit terminal 10-84D and the fifth circuit terminal 10-84E may be electrically connected to the second control element 10-86B.

The first control element 10-86A may be electrically connected to an external circuit through the second coil 10-82B, the second control element 10-86B may be electrically connected to the external circuit through the fourth coil 10-82D to provide control signal and electricity to the first control element 10-86A and the second control element 10-86B through the external circuit.

As shown in FIG. 130B, the sixth circuit terminal 10-84F may be disposed on the grounding element 10-88A. In detail, the grounding element 10-88A may include a extending portion 10-88A1, a extending portion 10-88A2, and a hole 10-88A3. The extending portion 10-88A1 may be used for connected to the case 10-10, the extending portion 10-88A2 may be used for connected to the sixth circuit terminal 10-84F, and the fifth resilient element 10-74C may be connected to the grounding element 10-88A through the hole 10-88A3. Moreover, in some embodiments, the grounding element 10-88B may include a extending portion 10-88B1 and a hole 10-88B3. The extending portion 10-88B1 may be used for connecting to the 10, the fifth resilient element 10-74A may be connected to the grounding element 10-88B through the hole 10-88B3. Therefore, grounding for the case 10-10 will be available through the grounding element 10-88A and the grounding element 10-88B.

As shown in FIG. 130C and FIG. 130D, the first control element 10-86A may be electrically connected to the driving coil 10-82A and the third coil 10-82C through the third circuit terminal 10-84C, so the driving coil 10-82A and the third coil 10-82C may be controlled. The second control element 10-86B may be electrically connected to the second coil 10-82B and the fourth coil 10-82D through the fourth circuit terminal 10-84D, so the driving coil 10-82A and the fourth coil 10-82D may be controlled. The driving coil 10-82A may have a extending circuit 10-89A extending to the third electrical connecting point 10-C3 on the third circuit terminal 10-84C, to allow the driving coil 10-82A being electrically connected to the circuit assembly 10-84 through the third electrical connecting point 10-C3. In some embodiments, the second coil 10-82B may include a extending circuit 10-89B extending to the fourth electrical connecting point 10-C4 on the fourth circuit terminal 10-84D, to allow the second coil 10-82B being electrically connected to the circuit assembly 10-84 through the fourth electrical connecting point 10-C4. The third coil 10-82C may include a extending circuit 10-89C extending to the fifth electrical connecting point 10-C5 of the third circuit terminal 10-84C, to allow the third coil 10-82C being electrically connected to the circuit assembly 10-84 through the fifth electrical connecting point 10-C5. The fourth coil 10-82D may include a extending circuit 10-89D extending to the sixth electrical connecting point 10-C6 of the fourth circuit terminal 10-84D, to allow the fourth coil 10-82D being electrically connected to the circuit assembly 10-84 through the sixth electrical connecting point 10-C6.

As shown in FIG. 130C, when viewed along the main axis 10-O, the main axis 10-O is between the first control element 10-86A and the control element 10-86C, and the third electrical connecting point 10-C3 and the fifth electrical connecting point 10-C5 are at adjacent corners of the fixed portion 10-F, such as may at adjacent quadrants (e.g. the second quadrant 10-Q2 and the third quadrant 10-Q3). Moreover, as shown in FIG. 130D, the main axis 10-O is also between the second control element 10-86B and the control element 10-86D, and the fourth electrical connecting point 10-C4 and the sixth electrical connecting point 10-C6 are at adjacent corners of the fixed portion 10-F, such as at the first quadrant 10-Q1 and the fourth quadrant 10-Q4 in FIG. 130D. In other words, the third electrical connecting point 10-C3, the fourth electrical connecting point 10-C4, the fifth electrical connecting point 10-C5, and the sixth electrical connecting point 10-C6 are at different quadrants, so the distance between them may be increased to prevent interference when assembling.

The driving coil 10-82A and the third coil 10-82C may be electrically connected to each other through the extending circuit 10-89E to allow the first control element 10-86A controlling the driving coil 10-82A and the third coil 10-82C at a same time. Moreover, the second coil 10-82B and the fourth coil 10-82D may be electrically connected to each other through the extending circuit 10-89F to allow the second control element 10-86B controlling the second coil 10-82B and the fourth coil 10-82D at a same time.

In some embodiments, as shown in FIG. 130B, in the first direction (Y direction) or the second direction (X direction), the distance between the adjacent circuit terminals (the first circuit terminal 10-84A, the second circuit terminal 10-84B, the third circuit terminal 10-84C, the fourth circuit terminal 10-84D, and the fifth circuit terminal 10-84E) may be different. For example, in the Y direction, the distance between two third circuit terminals 10-84C is greater than the distance between the two second circuit terminal 10-84B. Moreover, in some embodiments, at least a portion of the circuit terminal (the first circuit terminal 10-84A, the second circuit terminal 10-84B, the third circuit terminal 10-84C, the fourth circuit terminal 10-84D, and the fifth circuit terminal 10-84E) may arrange in the first direction or the second direction. For example, in FIG. 130, the second circuit terminal 10-84B and the fifth circuit terminal 10-84E may arrange along the Y direction in the first quadrant 10-Q1, and the first circuit terminal 10-84A and the second circuit terminal 10-84B may arrange along the Y direction in the second quadrant 10-Q2. In some embodiments, when viewed along the main axis 10-O, the first virtual line 10-V1 or the second virtual line 10-V2 do not overlap the first circuit terminal 10-84A, the second circuit terminal 10-84B1 the third circuit terminal 10-84C, the fourth circuit terminal 10-84D, or the fifth circuit terminal 10-84E (i.e. do no pass through any circuit terminal), so the distance between the control element 10-86 and the circuit terminal may be increased to prevent interference.

FIG. 131A and FIG. 131B are schematic views of the first control element 10-86A and the second control element 10-86B, respectively. In some embodiments, the first control element 10-86A may be used for providing a first control signal, and the second control element 10-86B may be used for providing a second control signal to control the driving assembly 10-D.

As shown in FIG. 131, the first control element 10-86A includes a first sensing unit 10-86A1, a first memory unit 10-86A2, and a first control unit 10-86A3 disposed in the first control element 10-86A and electrically connected to each other. The first sensing unit 10-86A1 may be used for detecting the movement of the movable portion 10-M relative to the fixed portion 10-F and providing a first sensing signal. The first memory unit 10-86A2 may include a first predetermined information which records the characteristic of the driving assembly 10-D. For example, the first predetermined information includes the relationship between the first sensing signal and the position relationship of the movable portion 10-M relative to the fixed portion 10-F. The first predetermined information may be measured by an external apparatus (not shown). For example, the optical element driving mechanism 10-100 may be calibrated, and the calibration information may be recorded in the first predetermined information. The external apparatus is not disposed in the optical element driving mechanism 10-100. The first control unit 10-86A3 may provide the first control signal based on the first sensing signal and/or the first predetermined information. Therefore, close-loop control may be achieved to accurately control the optical element driving mechanism 10-100.

As shown in FIG. 131B, the second control element 10-86B includes a second sensing unit 10-86B1, a second memory unit 10-86B2, and a second control unit 10-86B3 disposed in the second control element 10-86B and electrically connected to each other. The second sensing unit 10-86B1 may be used for detecting the movement of the movable portion 10-M relative to the fixed portion 10-F and providing a second sensing signal. The second memory unit 10-86B2 may include a second predetermined information which records the characteristic of the driving assembly 10-D. For example, the second predetermined information includes the relationship between the second sensing signal and the position relationship of the movable portion 10-M relative to the fixed portion 10-F. The second predetermined information may be measured by the external apparatus (not shown). For example, the optical element driving mechanism 10-100 may be calibrated, and the calibration information may be recorded in the second predetermined information. The external apparatus is not disposed in the optical element driving mechanism 10-100. The second control unit 10-86B3 may provide the second control signal based on the second sensing signal and/or the second predetermined information. Therefore, close-loop control may be achieved to accurately control the optical element driving mechanism 10-100.

The first control element 10-86A and the second control element 10-86B may be used for controlling the optical element driving mechanism 10-100 to let the optical element 10-5 move in two different dimensions. For example, the first control element 10-86A may be used for controlling the movement of the optical element 10-5 in the Y direction, and the second control element 10-86B may be used for controlling the movement of the optical element 10-5 in the X direction to prevent different signal from interference. However, the present disclosure is not limited thereto. In some embodiments, the first control element 10-86A or the second control element 10-86B may be used for controlling the movement of the optical element 10-5 in other dimensions, such as the movement in the Z direction or rotation in other directions, depending on design requirement.

The first sensing unit 10-86A1 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In summary, an optical element driving mechanism is provided in some embodiments of the present disclosure. The optical element driving mechanism includes a movable portion, a fixed portion, a driving assembly, and a circuit assembly. The movable portion is used for connecting to an optical element. The movable portion is movable relative to the fixed portion. The driving assembly is used for driving the movable portion to move relative to the fixed portion. The circuit assembly electrically is connected to the driving assembly, wherein the circuit assembly includes a grounding element. Therefore, the circuit for transferring different signal may be separated to prevent interference between the signals, and miniaturization may be achieved.

The relative positions and size relationship of the elements in the present disclosure may allow the optical element driving mechanism achieving miniaturization in specific directions or for the entire mechanism. Moreover, different optical modules may be combined with the optical element driving mechanism to further enhance optical quality, such as the quality of photographing or accuracy of depth detection. Therefore, the optical modules may be further utilized to achieve multiple anti-vibration systems, so image stabilization may be significantly improved.

Referring to FIGS. 132 and 133, FIG. 132 is an exploded view showing an optical driving mechanism 11-1 according to an embodiment of the present disclosure, and FIG. 133 is a schematic view showing the assembled optical driving mechanism 11-1, wherein the housing 11-H is omitted. The optical driving mechanism 11-1 can be used, for example, to drive and sustain an optical element (such as a lens or a lens assembly) 11-LS, and can be disposed inside an electronic device (such as a camera, a tablet or a mobile phone). When light (incident light) from the outside enters the optical driving mechanism 11-1, the light passes through the optical element 11-LS in the optical driving mechanism 11-1 along an optical axis 11-O and then to an image sensor assembly (not shown) outside the optical driving mechanism 11-1, to acquire an image. The optical driving mechanism 11-1 has a biasing assembly and a driving assembly which can move the optical element 11-LS, to achieve the purpose of Auto-Focusing (AF) and/or Optical Image Stabilization (OIS). The detailed structure of the optical driving mechanism 11-1 will be described below.

As shown in FIGS. 132-135, the optical driving mechanism 11-1 primarily comprises a bottom plate 11-10, a movable portion 11-20, a biasing assembly 11-W, and a housing 11-H. A fixed body 11-11 (FIG. 135) of the bottom plate 11-10 and the housing 11-H (fixed portion) are affixed to each other, and an accommodating space is formed between the housing 11-H and the fixed body 11-11 of the bottom plate 11-10 for the movable portion 11-20 and the biasing assembly 11-W to be disposed in such a way that they can be protected.

Moreover, the movable portion 11-20 is affixed to a moving member 11-14 of the bottom plate 11-10. The biasing assembly 11-W connects the fixed body 11-11 of the bottom plate 11-10 to the moving member 11-14. It should be noted that the biasing assembly 11-W can drive the moving member 11-14 of the bottom plate 11-10 and the movable portion 11-20 to move relative to the fixed body 11-11. The detailed structure of the movable portion 11-20 will be described below, and the biasing assembly 11-W and the bottom plate 11-10 will be described later.

The movable portion 11-20 includes: a base 11-21, a frame 11-22, a holder 11-23, an upper leaf spring 11-24, a lower leaf spring 11-25 and a driving assembly 11-MC. The aforementioned frame 11-22 and the holder 11-23 are disposed on the base 11-21, and the base 11-21 is affixed to the moving member 11-14 of the bottom plate 11-10, wherein the frame 11-22 surrounds the holder 11-23. The holder 11-23 is configured to sustain an optical element 11-LS, such as a lens. The light from the outside passes through the optical element 11-LS along the optical axis 11-O of the optical driving mechanism 11-1 or the optical element 11-LS to an image sensor, to acquire an image.

Referring to FIGS. 133 and 134, the upper and lower leaf springs 11-24 and 11-25 are respectively disposed on the upper and lower sides of the holder 11-23, and connect the holder 11-23 to the base 11-21. In detail, the lower leaf spring 11-25 is disposed on the main body of the base 11-21, and the upper leaf spring 11-24 is disposed on the plurality of (four in this embodiment) pillars (or studs) of the base 11-21. The upper and lower leaf springs 11-24 and 11-25 sandwich the holder 11-23 being movably connected to the base 11-21.

Still referring to FIG. 133, the aforementioned driving assembly 11-MC includes a coil assembly 11-C, a magnetic assembly 11-M and a permeability assembly 11-V, wherein the coil assembly 11-C may include one or more driving coils, the magnetic assembly 11-M may include one or more magnetic elements (e.g., magnets), and the permeability assembly 11-V may include one or more permeability members. The coil assembly 11-C and the magnetic assembly 11-M are disposed on the holder 11-23 and the frame 11-22, respectively. In detail, the coil assembly 11-C is affixed to the holder 11-23, and the magnetic assembly 11-M is connected to the lower surface of the upper leaf spring 11-24 (for example, applying adhesive) or to the frame 11-22 and facing the coil assembly 11-C.

When a suitable driving signal (e.g., drive current) is applied to the coil assembly 11-C, a magnetic force is generated between the coil assembly 11-C and the first magnetic assembly 11-M, such that the first driving assembly 11-MC drives the holder 11-23 and the optical element 11-LS to linearly or obliquely move (tilted) via the magnetic force, so as to achieve the effect of optical focusing or shaking compensation. In addition, the upper and lower leaf springs 11-24 and 11-25 make the holder 11-23 keep in an initial position relative to the base 11-21 before applying the driving signal. It should be understood that the driving assembly 11-MC in this embodiment is a moving coil type, and in other embodiments, it may be a moving magnetic type.

The permeability assembly 11-V of the driving assembly 11-MC is disposed on the inner side of the frame 11-22, which can concentrate the magnetic force generated by the magnetic assembly 11-M in a predetermined direction to enhance the magnetic force that drives the holder 11-23 and the optical element 11-LS to move, and reducing magnetic interference. In other embodiments, the inner side or the portion of the wall of the frame 11-22 corresponding to the magnetic assembly 11-M can be embedded with the permeability assembly 11-V, so that the frame 11-22 has a permeability assembly material, and the mechanical strength of the frame 11-22 can be enhanced.

Thus, the driving assembly 11-MC drives the holder 11-23 to move with the optical element 11-LS disposed therein relative to the base 11-21 and the frame 11-22, thereby achieving the auto-focusing function, or a good compensation effect can be obtained when the optical lens is shaken through the aforementioned mechanism.

The detailed structure of the biasing assembly 11-W and the bottom plate 11-10 will be described in detail below.

Referring to FIGS. 132 and 135, the biasing assembly 11-W connects the fixed body 11-11 to the moving member 11-14 of the bottom plate 11-10, so as to drive the moving member 11-14 and the movable portion 11-20 to move relative to the fixed body 11-11 of the bottom plate 11-10. The biasing assembly 11-W includes at least one biasing element 11-WS (four in this embodiment). The biasing element 11-WS is, for example, a wire having a shape memory alloy (SMA) material, and can be changed in length by applying a driving signal (for example, driving current) thereto through an external power source (not shown). For example, when the driving signal is applied to raise the temperature of the biasing assembly 11-W, the biasing assembly 11-W can be deformed to be elongated or shortened; when the driving signal is stopped, the biasing assembly 11-W can be restored to original length. In other words, by applying an appropriate drive signal, the length of the biasing assembly 11-W can be controlled to move the moving member 11-14 and the movable portion 11-20 (including the carried optical element 11-LS) relative to the bottom plate 11-10, thereby changing the position or posture of the movable portion 11-20 relative to the bottom plate 11-10, so that the optical driving mechanism 11-1 has the functions of focusing, or anti-shake compensation.

The material of the foregoing biasing assembly 11-W, for example, may include TiNi alloy, TiPd, TiNiCu, TiNiPd or combination.

The foregoing bottom plate 11-10 has a fixed body 11-11, an insulating layer 11-12, a conductive layer 11-13 and a moving member 11-14, wherein the insulating layer 11-12 and the conductive layer 11-13 are sandwiched between the fixed body 11-11 and the moving member 11-14. The fixed body 11-11 and the moving member 11-14 will be described below, and the insulating layer 11-12 and the conductive layer 11-13 will be described later (referring to FIGS. 137A and 137B).

Referring to FIGS. 135 and 136, the fixed body 11-11 has a plurality of (two) fixed protrusions 11-111 disposed at diagonal corners, and the moving member 11-14 has a plurality of (two) connecting protrusions 11-141 located at diagonal corners. As can be seen from FIG. 136, the fixed protrusions 11-111 and the connecting protrusions 11-141 are located at the four corners of the bottom plate 11-10 having a substantially rectangular structure, and those protrusions 11-111 and 11-141 are staggered (i.e., any two adjacent corners providing with one fixed protrusion 11-111 and one connecting protrusion 11-141), and the biasing assembly 11-W connects the fixed protrusion 11-111 to the connecting protrusion 11-141.

Specifically, two ends of each biasing element 11-WS of the biasing assembly 11-W are respectively connected to the fixed protrusion 11-111 of the fixed body 11-11 and the connecting protrusion 11-141 of the moving member 11-14. The fixed protrusion 11-111 and the connecting protrusion 11-141 are extending toward the movable portion 11-20.

The moving member 11-14 further includes at least one (two in this embodiment) extending protrusion 11-142 and at least one (two in the present embodiment) L-shaped flexible string arms 11-143. The extending protrusion 11-142 is adjacent to the connecting protrusion 11-141 and is fixedly connected to the movable portion 11-20 above the bottom plate 11-10, and the string arm 11-143 is flexible to movably connect the fixed body 11-11 of the bottom plate 11-10. As such, the biasing assembly 11-W can be driven to move or rotate the movable portion 11-20 relative to the bottom plate 11-10.

Referring to FIGS. 137A and 137B, the bottom plate 11-10 defines a first electrical connection portion 11-101 and a second electrical connection portion 11-102. The biasing element 11-WS is connected to the first electrical connection portion 111-01 and the second electrical connection portion 11-102. Viewed in the direction of the optical axis 11-O, starting from the light incident end (upper end) of the optical driving mechanism 11-1, the fixed body 11-11 (fixed protrusion 11-111), the insulating layer 11-12, and the conductive layer 11-13 are sequentially arranged, and the biasing element 11-WS is sandwiched by the three and electrically connected to the conductive layer 11-13. The fixed protrusion 11-111 has a curved portion, and the surface of the curved portion is not provided with the insulating layer 11-12 and the conductive layer 11-13.

It is to be noted that, in the direction of the optical axis 11-O, the insulating layer 11-12 in the first electrical connecting portion 11-101 protrudes from the fixed protrusion 111 of the fixed body 11-11 and the conductive layers 11-13, and the conductive layer 11-13 protrudes from the fixed body 11-111. In this way, it is ensured that the contact area of the conductive layer 11-12 with the biasing element 11-WS is increased, and the overall quality of the driving mechanism is improved.

Furthermore, the insulating layer 11-12 has a buffer portion 121 located on a surface of the insulating layer 11-12 facing the biasing element 11-WS, and in the direction of the optical axis 11-O, there is a gap (or distance) between the buffer portion 11-121 and the biasing element 11-WS. The buffer portion 11-121 has a function of providing the biasing element 11-WS to be buffered during the movement, which helps to reduce the situation in which the biasing element 11-WS is damaged by the collision. In some embodiments, the buffer portion 11-121 may be of a soft material and have a fillet structure (or curved or rounded structure) or a tapered structure, which may further reduce the damage of the biasing element 11-WS due to collision during the movement.

Still referring to FIG. 137B, when the biasing element 11-WS of the biasing assembly 11-W is assembled to the electrical connection portion 11-101 of the bottom plate 11-10, the biasing element 11-WS is wrapped via the electrically conductive layer 11-13, the insulating layer 11-12 and the fixed body 11-11 which are sequentially arranged from the inside to the outside, and a plurality of clamping forces are applied: a first clamping force 11-F1 and a second clamping force 11-F2 (for example, it is applied by a clamping member (not shown) for assembly). In this embodiment, the first clamping force 11-F1 is applied to a middle position of the first electrical connection portion 11-101, and the second clamping force 11-F2 is applied to one end portion of the first electrical connection portion 11-101 to hold the biasing element 11-WS. The first clamping force 11-F1 is different from the second clamping force 11-F2: the first clamping force 11-F1 is greater than the second clamping force 11-F2. Therefore, the situation that the stress of the biasing assembly 11-W is excessively concentrated to cause damage can be avoided, and the smaller second clamping force 11-F2 applied at the end position can also make the biasing assembly 11-W have better flexible effect.

In another embodiment, the bottom plate 11-10 further includes a first resin member 11-15. Referring to FIG. 137C, the first resin member 11-15 is disposed between the insulating layer 11-12 in the first electrical connection portion 11-101 and the biasing element 11-WS. The first resin member 11-15 is in direct contact with the biasing element 11-WS and the insulating layer 11-12 of the first electrical connecting portion 11-101. Via the first resin member 11-15, the end portion of the biasing element 11-WS can be prevented from directly colliding with the first electrical connecting portion 11-101, particularly for the insulating layer 11-12 in the first electrical connecting portion 11-101, to enhance the reliability of the overall organization. Furthermore, the surface of the biasing element 11-WS has a protective layer 11-WSS. When viewed in the direction of the optical axis 11-O, at the end portion of the first electrical connecting portion 11-101 overlapping the biasing element 11-WS, the protective layer 11-WSS partially overlaps the insulating layer 11-12, and also partially overlaps the conductive layer 11-13. This enhances the protection of the biasing element 11-WS as the biasing assembly 11-W moves.

FIG. 137D shows a schematic view of the connection of the second electrical connection portion 11-102 and the biasing element 11-WS. The bottom plate 11-10 further includes a second resin member 11-16 disposed between and in direct contact with the insulating layer 11-12 in the second electrical connection portion 11-102 and the biasing element 11-WS. Similarly to the aforementioned first resin members 11-15, the second resin members 11-16 can also provide protection for the biasing element 11-WS from being hit against the second electrical connecting portions 11-102 to be damaged. The foregoing first resin member 11-15 and second resin member 11-16 may have a glass fiber or ceramic material, and they may constitute a resin assembly.

FIG. 138 shows that the distance (or a gap) between the first electrical connection portion 11-101 and the second electrical connection portion 11-102 of the bottom plate 11-10: distance 11-t1. That is, the connection line of two is inclined relative to the surface of the bottom plate 11-10. Therefore, the direction in which the first and second electrical connecting portions 11-101, 11-102 are arranged is not perpendicular to and not parallel to the optical axis 11-O as viewed in the direction that is perpendicular to the optical axis 11-O.

FIG. 139 shows that the bottom plate 11-10 further includes a slider 11-17. The slider 11-17 is disposed between the fixed body 11-11 and the moving member 11-14, and the slider 11-17 is slidably in contact with the fixed body 11-11 and the moving member 11-14. In this way, it can be ensured that the biasing assembly 11-WS can force the moving member 11-14 to move relative to the fixed body 11-11 to be smoother, thereby improving the performance of the driving mechanism.

FIG. 140A shows that the aforementioned bottom plate 11-10 further includes a vibration-damping or (seismic) assembly 11-18. In the present embodiment, the vibration-damping assembly 11-18 has a plurality of (four) damping elements 11-181 corresponding to a plurality of biasing elements 11-WS of the biasing assembly 11-W, respectively. Each of the vibration-damping elements 11-181 is disposed on the biasing element 11-WS and in direct contact with the biasing element 11-WS and the elastic string arm 11-143 of the movable member 11-14, so that the effects of fracture prevention and shock absorption for the biasing element 11-WS can be reached. In this embodiment, each of the vibration-damping elements 11-181 is disposed substantially at a middle position of the first and second electrical connecting portions 11-101 and 11-102 (e.g. located at or close to the center of the biasing element 11-WS). A gap (or distance) 11-t2 is between the vibration-damping element 11-181, and another gap (or distance), 11-t2' is between the second electrical connection portion 11-102, wherein the gaps 11-t2 and 11-t2' are substantially equal. When viewed in the direction of the optical axis 11-O, these vibration-damping elements 11-181 surround the optical axis 11-O in a symmetrical form. The vibration-damping elements 11-181 can have a fiberglass or ceramic material.

FIG. 140B shows that the bottom plate 11-10 includes another vibration-damping assembly 11-18 of another embodiment in present disclosure. Unlike the embodiment of the vibration-damping assembly 11-18 of FIG. 140A, the vibration-damping assembly 11-18 of the present embodiment has more of the vibration-damping elements: first vibration-damping elements 11-181, second vibration-damping elements 11-182 and third vibration-damping elements 11-183. Each first vibration-damping element 11-181 is disposed the middle of the first and second electrical connection portions 11-101 and 102; each second vibration-damping element 11-182 is located close to an end of the biasing element 11-WS and in direct contact with the first electrical connection portion 11-101; and each third vibration-damping element 11-183 is located close to the other end of the biasing element 11-WS and in direct contact with the second electrical connection portion 11-102. Furthermore, there is a gap 11-t3 or 11-t3' between two adjacent vibration-damping elements, wherein the gaps 11-t3 or 11-t3' are substantially equal. This can further improve the shock absorption effect.

FIG. 140C shows that the bottom plate 11-10 includes another vibration-damping assembly 11-18 of another embodiment. Different from the embodiment of the seismic assembly 11-18 of FIG. 140B, this vibration-damping assembly 11-18 in this embodiment has more vibration-damping elements: first, second, third, and fourth damping elements 11-181, 11-182, 11-183 and 11-184. The main difference between the embodiments in FIG. 140C and FIG. 140B is that in FIG. 140C, there are two damping elements: the first and fourth damping elements 11-181 and 11-184 disposed between the second and third damping elements 11-182 and 11-183, and substantially equal gaps 11-t4, t4', and 11-t4" are formed between those damping elements. This can further improve the damping effect.

FIG. 141 is a bottom view of a frame 11-22, a housing 11-H, and at least a damper 11-g disposed between the frame 11-22 and the housing 11-H, in accordance with another embodiment of the present disclosure. In some embodiments, as shown in FIG. 141, one or several dampers g may be provided between the frame 11-22 and the housing 11-H, so that the collision noise between the frame 11-22 and the housing 11-H can be prevented, and the risk of damage to the optical driving mechanism 11-1 can be also reduced.

FIG. 142 is a partial sectional view of a buffer element 11-G connected between the holder 11-23 and the frame 11-22 along a vertical direction, in accordance with another embodiment of the present disclosure. In some embodiments, as shown in FIG. 142, a buffer element 11-G may be provided to connect an outer surface 11-231 of the holder 11-23 with an inner surface 11-221 of the frame 11-22 in a vertical direction. Here, the outer surface 11-231 of the holder 11-23 and the inner surface 11-221 of the frame 11-22 are spaced apart from each other by a distance along the vertical direction, and the buffer element 11-G is higher than the top surface 11-232 of the holder 11-23. In some embodiments, the buffer element 11-G may protrude from the top surface 11-222 of the frame 11-22 and connect to the housing 11-H, so that the collision noise between the frame 11-22 and the housing 11-H/the holder 11-23 can be prevented, and the risk of damage to the optical driving mechanism 11-1 can be also reduced.

FIG. 143 is a partial sectional view of a buffer element 11-G connected between the holder 11-23 and the frame 11-22 along a horizontal direction, in accordance with another embodiment of the present disclosure. In some embodiments, as shown in FIG. 143, a buffer element 11-G is provided to connect an outer surface 11-231 of the holder 11-23 with an inner surface 11-221 of the frame 11-22 in a horizontal direction, wherein the outer surface 11-231 and the inner surface 11-221 at least partially overlap when viewed along the horizontal direction. Thus, the collision noise between the frame 11-22 and the holder 11-23 can be prevented, and the risk of damage to the optical driving mechanism 11-1 can be also reduced.

FIG. 144 is a partial perspective view of a buffer element 11-G connected between the holder 11-23 and the base 11-21 along a horizontal direction, in accordance with another embodiment of the present disclosure. In some embodiments, as shown in FIG. 144, a buffer element 11-G is provided to connect the holder 11-23 with a pillar 11-211 of the base 11-21 in a horizontal direction, so that the collision noise between the holder 11-23 and the base 11-21 can be prevented, and the risk of damaging the optical driving mechanism 11-1 can be also reduced.

FIG. 145 is a partial side view of a buffer element 11-G connected between the magnetic assembly 11-M and a protrusion 11-233 of the holder 11-23 along a horizontal direction, in accordance with another embodiment of the present disclosure. In some embodiments, as shown in FIG. 145, a buffer element 11-G is provided to connect the magnetic assembly 11-M with a protrusion 11-233 of the holder 11-23 along a horizontal direction. It should be noted that the magnetic assembly 11-M is disposed on the frame 11-22, and the protrusion 11-233 is formed on a lateral side of the holder 11-23, wherein the protrusion 11-233 extends through and protrudes from the side of the coil assembly 11-C toward the magnetic assembly 11-M. Thus, the collision noise between the magnetic assembly 11-M and the coil assembly 11-C/the holder 11-23 can be prevented, and the risk of damage to the optical driving mechanism 11-1 can be also reduced.

FIG. 146 is a partial perspective view of a buffer element 11-G connected between the magnetic assembly 11-M and a circuit element 11-P on a lateral side of the holder 11-23 along a horizontal direction, in accordance with another embodiment of the present disclosure. In some embodiments, as shown in FIG. 146, a circuit element 11-P (e.g. IC element or printed circuit board) may be mounted to a lateral side of the holder 11-23 by the adhesive 11-R or solder, and the coil assembly 11-C is disposed around the circuit element 11-P. Here, a buffer element 11-G is provided to connect the magnetic assembly 11-M with the circuit element 11-P along a horizontal direction. Therefore, the collision noise between the magnetic assembly 11-M and the coil assembly 11-C/the circuit element 11P can be prevented, and the risk of damaging the optical driving mechanism 11-1 can be also reduced.

In summary, an embodiment of the present disclosure provides an optical driving mechanism, wherein at least a damper 11-g is provided to connect the frame 11-22 (movable portion) and a housing 11-H (fixed portion), so that the collision noise can be prevented, and the risk of damage to the optical driving mechanism can be also reduced. In some embodiments, a buffer element 11-G is provided to connect the magnetic assembly 11-M and the holder 11-23, so that the frame 11-22/the magnetic assembly 11-M can be prevented from collision by the holder 11-23 to reduce the collision noise. In some embodiments, the damper 11-g and the buffer element 11-G may comprise silica gel, glass fiber or ceramic material.

The embodiments in present disclosure have at least one of the advantages or effects that the optical driving mechanism has better focus function and optical compensation, and can protect the biasing assembly, to greatly reduce the damage or breakage caused by the collision during the movement. In some embodiments, the optical driving mechanism further includes a resin assembly and a vibration-damping assembly disposed on and in direct contact with the biasing element to provide a vibration-damping effect, thereby improving the quality of the driving mechanism.

Referring to FIG. 147, in an embodiment of the invention, an optical member driving mechanism 12-10 can be disposed in an electronic device 12-20 and used to hold and drive an optical member 12-30, so that the optical member 12-30 can move relative to an image sensor (not shown) in the electronic device 12-20, and the purpose of focus and/or zoom can be achieved. For example, the electronic device 12-20 can be a smartphone, a laptop computer, or a digital camera, and the optical member 12-30 can be a lens.

FIG. 148 is a schematic diagram of the aforementioned optical member driving mechanism 12-10, FIG. 149 is an exploded-view diagram of the optical member driving mechanism 12-10, and FIG. 150 is a cross-sectional view along line 12-A-12-A in FIG. 148. As shown in FIG. 148 to FIG. 150, the optical member driving mechanism 12-10 primarily includes a fixed portion 12-100, a movable portion 12-200, a first elastic member 12-300, a second elastic member 12-400, and a driving assembly 12-500.

The fixed portion 12-100 includes a first member 12-110 and a second member 12-120. The first member 12-110 and the second member 12-120 can be fixedly connected to each other, so as to form a receiving space 12-R therebetween. The movable portion 12-200, the first elastic member 12-300, the second elastic member 12-400, and the driving assembly 12-500 can be accommodated in the receiving space 12-R.

The first member 12-110 can be a housing, including a top wall 12-111 and at least one lateral wall 12-112. The top wall 12-111 has a plate structure, and is perpendicular to the main axis 12-AX1 of the optical member driving mechanism 12-10. The lateral wall 12-112 has a plate structure too. The lateral wall 12-112 is connected to the edge of the top wall 12-111 and extended from the edge toward the second member 12-120. Therefore, the extending direction of the lateral wall 12-112 is not perpendicular to the main axis 12-AX1. In this embodiment, the extending direction of the lateral wall 12-112 is parallel to the main axis 12-AX1. The first member 12-110 can include metal, but it is not limited thereto.

A first tapered structure 12-113 is formed on the lateral wall 12-112 of the first member 12-110. In particular, the first tapered structure 12-113 includes a first surface 12-S1 and a second surface 12-S2. The first surface 12-S1 has a plane structure. When the first member 12-110 and the second member 12-120 are engaged with each other, the first surface 12-S1 faces the second member 12-120 and is parallel to the main axis 12-AX1. The second surface 12-S2 is inclined relative to the first surface 12-S1. Therefore, the second surface 12-S2 is not parallel and not perpendicular to the main axis 12-AX1 and the first surface 12-S1. The first surface 12-S1 and the second surface 12-S2 face different directions.

The second member 12-120 can be a base, including plastic material. One or more wires 12-W can be embedded in the second member 12-120. The second member 12-120 includes a second tapered structure 12-121. In particular, the second tapered structure 12-121 includes a third surface 12-S3 and a fourth surface 12-S4. When the first member 12-110 and the second member 12-120 are engaged with each other, the third surface 12-S3 faces the first member 12-120 and is parallel to the main axis 12-AX1. The fourth surface 12-S4 is inclined relative to the third surface 12-S3. Therefore, the fourth surface 12-S4 is not parallel and not perpendicular to the main axis 12-AX1 and the third surface 12-S3. The third surface 12-S3 and the fourth surface 12-S2 face different directions. In this embodiment, the side of the second member 12-120 has a stepped structure, so that the third surface 12-S3 of the second tapered structure 12-121 has two sections 12-S31 and 12-S32.

In this embodiment, the first tapered structure 12-113 can be attached to the second tapered structure 12-121 via a first adhesive member 12-P1 and a second adhesive member 12-P2, so as to fixedly connect the first member 12-110 to the second member 12-120. As shown in FIG. 150, when the first member 12-110 and the second member 12-120 are engaged, the first surface 12-S1 and the third surface 12-S3 face the opposite directions, a first gap 12-G1 is formed between the first surface 12-S1 and the section 12-S31 of the third surface 12-S3, and a second gap 12-G2 is formed between the first surface 12-S1 and the section 12-S32 of the third surface 12-S3. The first gap 12-G1 is communicated with the second gap 12-G2. Since the section 12-S31 is closer to the first surface 12-S1 than the section 12-S32, the shortest distance between the first member 12-110 and the second member 12-120 in the first gap 12-G1 is less than the shortest distance between the first member 12-110 and the second member 12-120 in the second gap 12-G2.

The first adhesive member 12-P1 can be filled into the first gap 12-G1. After the first adhesive member 12-P1 is cured, the second adhesive member 12-P2 can be filled into the second gap 12-G2. Since the section 12-S32 is closer to the external environment of the optical member driving mechanism 12-10 than the section 12-S31 when the first member 12-110 and the second member 12-120 are assembled, the shortest distance between the first gap 12-G1 and the receiving space 12-R is less than the shortest distance between the second gap 12-G2 and the receiving space 12-R. Therefore, when the first member 12-110 and the second member 12-120 are affixed to each other by using the first adhesive member 12-P1 and the second adhesive member 12-P2, the second gap 12-G2 and the second adhesive member 12-P2 are exposed, and the first gap 12-G1 and the first adhesive member 12-P1 are not exposed.

Since the positions of the first gap 12-G1 and the second gap 12-G2 correspond to the first tapered structure 12-113 of the first member 12-110 and the second tapered structure 12-121 of the second member 12-120, when the optical member driving mechanism 12-10 is impacted, the first tapered structure 12-113 and/or the second tapered structure 12-121 can be slightly deformed to disperse the stress. The separation or the break at the adhesive point between the first member 12-110 and the second member 12-120 can be avoided.

In detail, in this embodiment, the first surface 12-S1 faces the first gap 12-G1 and the second gap 12-G2, and the third surface 12-S3 also faces the first gap 12-G1 and the second gap 12-G2. As seen from a direction that is perpendicular to the main axis 12-AX1, the first surface 12-S1, and/or the third surface 12-S3, the first tapered structure 12-113 overlaps the second tapered structure 12-121, the tapering direction of the first tapered structure 12-113 is opposite to that of the second tapered structure 12-121, the first surface 12-S1 overlaps the first gap 12-G1 and the second gap 12-G2, and the sections 12-S31 and 12-S32 respectively overlap the first gap 12-G1 and the second gap 12-G2. When the first adhesive member 12-P1 and the second adhesive member 12-P2 are respectively filled into the first gap 12-G1 and the second gaps 12-G2, the first adhesive member 12-P1 is in direct contact with the first surface 12-S1 and the section 12-S31, the second adhesive member 12-P2 is in direct contact with the first surface 12-S1 and the section 12-S32, and the first adhesive member 12-P1 and the second adhesive member 12-P2 are in direct contact with each other. Therefore, the contact areas of the first adhesive member 12-P1 and the second adhesive member 12-P1 are increased, and the adhesive reliability can be enhanced.

It should be noted that, the adhesive material of the first adhesive member 12-P1 is different from that of the second adhesive member 12-P2. For example, the first adhesive member 12-P1 is heat curing glue, and the second adhesive member 12-P2 is light curing glue. In other words, the first adhesive member 12-P1 can be cured by heating, and the second adhesive member 12-P2 can be cured by providing light. The viscosity of the uncured first adhesive member 12-P1 is less than that of the uncured second adhesive member 12-P2. The Young's modulus of the cured first adhesive member 12-P1 is greater than that of the cured second adhesive member 12-P2. The first adhesive member 12-P1 and the second adhesive member 12-P2 can be made of suitable resin.

Moreover, as seen from the main axis 12-AX1, the first gap 12-G1 continuously and uninterruptedly surrounds the second member 12-120, so that the first adhesive member 12-P1 filled in the first gap 12-G1 continuously and uninterruptedly surrounds the second member 12-120. The gap between the first member 12-110 and the second member 12-120 can be fully sealed, so as to prevent the liquid or the external objects entering the receiving space 12-R.

In this embodiment, the first adhesive member 12-P1 and the second adhesive member 12-P2 are used to connect the first member 12-110 to the second member 12-120 in the fixed portion 12-120. In some embodiments, the movable portion 12-200 includes a plurality of components, and these components can be connected to each other by the same manner.

Referring to FIG. 148 to FIG. 150, in this embodiment, the movable portion 12-200 can be a holder, and the optical member 12-30 can be affixed to the movable portion 12-200. The movable portion 12-200 is disposed between the first elastic member 12-300 and the second elastic member 12-400, and movably connected to the fixed portion 12-100 via the first elastic member 12-300 and the second elastic member 12-400.

The first elastic member 12-300 can be a sheet metal spring having a plate structure. The first elastic member 12-300 is perpendicular to the main axis 12-AX1 and can be divided into at least one first fixed portion connecting section 12-310, at least one first movable portion connecting section 12-320, and at least one first elastic deformable section 12-330. As shown in FIG. 149 and FIG. 150, the first fixed portion connecting section 12-310 is affixed to the second member 12-120 via a third adhesive member 12-P3, and the first movable portion connecting section 12-320 is affixed to the movable portion 12-200 via a fourth adhesive member 12-P4. The first elastic deformable section 12-330 is disposed between the first fixed portion connecting section 12-310 and the first movable portion connecting section 12-320, and connects the first fixed portion connecting section 12-310 to the first movable portion connecting section 12-320.

The material of the third adhesive member 12-P3 and the material of the fourth adhesive member 12-P4 are the same as the material of the second adhesive member 12-P2. In other words, the third adhesive member 12-P3 and the fourth adhesive member 12-P4 are light curing glue, and the Young's modulus of the cured third adhesive member 12-P3 and the Young's modulus of the cured fourth adhesive member 12-P4 are the same as that of the cured second adhesive member 12-P2. Since the first elastic deformable section 12-330, the third adhesive member 12-P3 and the fourth adhesive member 12-P4 are deformable, they can disperse excessive stress during the movement of the movable portion 12-200 relative to the fixed portion 12-100, and the damage of the optical member driving mechanism 12-10 can be prevented.

In this embodiment, the third adhesive member 12-P3 is in direct contact with a first attaching surface 12-122 of the second member 12-120 facing the receiving space 12-R and a second attaching surface 12-311 of the first fixed portion connecting section 12-310 facing the receiving space 12-R, and further in direct contact with the fourth surface 12-S4 of the second tapered structure 12-121. Therefore, the contact area is increased, and the adhesive reliability is enhanced.

The second elastic member 12-400 can be a sheet metal spring having a plate structure. The second elastic member 12-400 is perpendicular to the main axis 12-AX1 and can be divided into at least one second fixed portion connecting section 12-410, at least one second movable portion connecting section 12-420, and at least one second elastic deformable section 12-430. As shown in FIG. 149 and FIG. 150, the second fixed portion connecting section 12-410 is affixed to the first member 12-110 via a fifth adhesive member 12-P5, and the second movable portion connecting section 12-420 is affixed to the movable portion 12-200 via a sixth adhesive member 12-P6. The second elastic deformable section 12-430 is disposed between the second fixed portion connecting section 12-410 and the second movable portion connecting section 12-420, and connects the second fixed portion connecting section 12-410 to the second movable portion connecting section 12-420.

The material of the fifth adhesive member 12-P5 and the material of the sixth adhesive member 12-P6 are the same as the material of the second adhesive member 12-P2. In other words, the fifth adhesive member 12-P5 and the sixth adhesive member 12-P6 are light curing glue, and the Young's modulus of the cured fifth adhesive member 12-P5 and the Young's modulus of the cured sixth adhesive member 12-P6 are the same as that of the cured second adhesive member 12-P2. Since the second elastic deformable section 12-430, the fifth adhesive member 12-P5 and the sixth adhesive member 12-P6 are deformable, they can disperse excessive stress during the movement of the movable portion 12-200 relative to the fixed portion 12-100, and the damage of the optical member driving mechanism 12-10 can be prevented.

Referring to FIG. 149, the driving assembly 12-500 includes a driving coil 12-510 and at least one magnetic member 12-520, wherein the driving coil 12-510 is disposed on the movable portion 12-200, and the magnetic member 12-520 is affixed to the first member 12-110. When a current flows through the driving coil 12-510, an electromagnetic effect is generated between the driving coil 12-510 and the magnetic member 12-520, and a driving force can be applied. Therefore, the movable portion 12-200 and the optical member 12-30 disposed thereon can be driven to move relative to the fixed portion 12-100.

As shown in FIG. 151 and FIG. 152, the end of the driving coil 12-510 winds around a winding portion 12-210 of the movable portion 12-200, and is connected to the first movable portion connecting section 12-320 of the first elastic member 12-300 via a seventh adhesive member 12-P7. For example, the seventh adhesive member 12-P7 is conductive glue. After curing, the seventh adhesive member 12-P7 can include a conductive region 12-P71 and an adhesive region 12-P72. The conductive region 12-P71 is in contact with the driving coil 12-510 and the first movable portion connecting section 12-320. The adhesive region 12-P72 covers the conductive region 12-P71 and is in contact with the winding portion and the first movable portion connecting section 12-320. Since the conductive region 12-P71 and the adhesive region 12-P72 respectively include metal and resin, the resistivity of the conductive region 12-P71 is less than that of the adhesive region 12-P72. The driving coil 12-510 and the first elastic member 12-300 can be electrically connected to each other through the conductive region 12-P71.

In this embodiment, the conductivity of the conductive region 12-P71 is greater than that of the cured fifth adhesive member 12-P5, the Young's modulus of the adhesive region 12-P72 is greater than that of the cured third adhesive member 12-P3, and the seventh adhesive member 12-P7 can be cured by heating.

Moreover, as shown in FIG. 150, in this embodiment, the first fixed portion connecting section 12-310 is connected to the second member 12-120 via an eighth adhesive member 12-P8. For example, the eighth adhesive member 12-P8 can be a solder. Thus, the conductivity of the cured eighth adhesive member 12-P8 is greater than that of the cured third adhesive member 12-P3. The eighth adhesive member 12-P8 can be in contact with the wire 12-W that is embedded in the second member 12-120, so as to electrically connect the first elastic member 12-300 to the wire 12-W. It should be noted that, the melting point of the eighth adhesive member 12-P8 is higher than the curing temperature of the seventh adhesive member 12-P7. Therefore, when the seventh adhesive member 12-P7 is heated to cure, the eighth adhesive member 12-P8 will not melt to cause desoldering.

An optical member driving mechanism 12-10 in another embodiment of the invention is shown in FIG. 153 and FIG. 154. The optical member driving mechanism 12-10 and the optical member driving mechanism 12-10 shown in FIG. 148 to FIG. 150 have the following differences: (1) the fixed portion 12-100 in this embodiment further includes a third member 12-130; (2) as seen from the main axis 12-AX1, the lateral wall 12-112 of the first member 12-110 does not overlap the section 12-S32 of the third surface 12-S3; and (3) the optical member driving mechanism 12-10 further includes a ninth adhesive member 12-P9.

The third member 12-130 can be a frame disposed on the first member 12-110. As seen from the main axis 12-AX1, the third member 12-130 overlaps the magnetic member 12-520, and the third member 12-130 overlaps the first member 12-110. As seen from the direction that is perpendicular to the main axis 12-AX1, a portion of the third member 12-130 is disposed between the magnetic member 12-520 and the top wall 12-111. In this embodiment, the third member 12-130 has plastic material.

The second fixed portion connecting section 12-410 of the second elastic member 12-400 is connected to the third member 12-130. In this embodiment, the fifth adhesive member 12-P5 can be directly contact with the first member 12-110, the third member 12-130, the second fixed portion connecting section 12-410, and the magnetic member 12-520, so that the third member 12-130, the second fixed portion connecting section 12-410, and the magnetic member 12-520 can be fixed relative to each other and affixed to the first member 12-110.

In this embodiment, the fifth adhesive member 12-P5 can be heat curing glue, so that the first member 12-110, the third member 12-130, the second fixed portion connecting section 12-410, and the magnetic member 12-520 can be connected to each other more securely. Furthermore, the Young's modulus of the of the cured fifth adhesive member 12-P5 is greater than that of the cured third adhesive member 12-P3, the cured fourth adhesive member 12-P4, and the cured sixth adhesive member 12-P6. The Young's modulus of the of the cured fifth adhesive member 12-P5 is greater than that of the adhesive region 12-P72 of the seventh adhesive member 12-P1, and less than that of the cured eighth adhesive member 12-P8. The conductivity of the cured eighth adhesive member 12-P8 is greater than that of the cured fifth adhesive member 12-P5. Moreover, since the magnetic member 12-520 includes metal, the adhesive reliability can be further enhanced.

In this embodiment, as seen from the main axis 12-AX1, the lateral wall 12-112 of the first member 12-110 does not overlap the section 12-S32 of the third surface 12-S3. Therefore, the second adhesive member 12-P2 and the second gap 12-G2 are exposed from the side of the optical driving mechanism 12-10.

The ninth adhesive member 12-P9 can be a damping member. The ninth adhesive member 12-P9 is directly in contact with the fixed portion 12-100 and the movable portion 12-200, so as to reduce the vibration caused by the movement of the movable portion. In this embodiment, the ninth adhesive member 12-P9 is in direct contact with the fourth surface 12-S4 of the second tapered structure 12-121. The Young's modulus of the of the cured ninth adhesive member 12-P9 is less than that of the cured fourth adhesive member 12-P4.

In some embodiments, the ninth adhesive member 12-P9 is in direct contact with the fixed portion 12-100 and the first elastic member 12-300. In some embodiments, the ninth adhesive member 12-P9 is in direct contact with the fixed portion 12-100 and the second elastic member 12-400. In some embodiments, the ninth adhesive member 12-P9 is in direct contact with the fixed portion 12-100, the movable portion 12-200, the first elastic member 12-300, and the second elastic member 12-400.

In summary, an optical member driving mechanism for connecting an optical member is provided, including a fixed portion and a first adhesive member. The fixed portion includes a first member and a second member, wherein the first member is fixedly connected to the second member via the first adhesive member.

Referring to FIG. 155, in an embodiment of the invention, an optical member driving mechanism 13-10 can be disposed in an electronic device 13-20 and used to hold and drive an optical member 13-30, so that the optical member 13-30 can move relative to an image sensor (not shown) in the electronic device 13-20, and the purpose of focus and/or zoom can be achieved. For example, the electronic device 13-20 can be a smartphone, a laptop computer, or a digital camera, and the optical member 13-30 can be a lens.

FIG. 156 is a schematic diagram of the aforementioned optical member driving mechanism 13-10, FIG. 157 is an exploded-view diagram of the optical member driving mechanism 13-10, and FIG. 158 is a cross-sectional view along line 13-A-13-A in FIG. 156. As shown in FIG. 156 to FIG. 158, the optical member driving mechanism 13-10 primarily includes a movable portion 13-100, a first driving assembly 13-200, a fixed portion 13-300, a plurality of suspension wires 13-400, a second driving assembly 13-500, and at least one position sensing assembly 13-600.

The movable portion 13-100 includes a holder 13-110, a first elastic member 13-120, a second elastic member 13-130, and a frame 13-140. In this embodiment, the holder 13-110 can be referred as a first member, and the first elastic member 13-120 can be referred as a second member.

The optical member 13-30 can be affixed to the holder 13-110. The holder 13-110 can be disposed between the first elastic member 13-120 and the second elastic member 13-130, and can be movably connected to the frame 13-140 by the first elastic member 13-120 and the second elastic member 13-130.

The first elastic member 13-120 can be a sheet metal spring having a plate structure. The first elastic member 13-120 is perpendicular to a main axis 13-AX1 of the optical member driving mechanism 13-10 and can be divided into at least one connecting section 13-121, at least one connecting section 13-122, and at least one string section 13-123. The connecting section 13-121 is affixed to the holder 13-110 via a first adhesive member 13-P1, and the connecting section 13-122 is affixed to the frame 13-140 via a second adhesive member 13-P2. The string section 13-123 is disposed between the connecting section 13-121 and the connecting section 13-122, and connects the connecting section 13-121 to the connecting section 13-122.

Specifically, as shown in FIG. 159, in this embodiment, the holder 13-110 includes an attaching enhanced structure 13-111. The first adhesive member 13-P1 adheres the connecting section 13-121 of the first elastic member 13-120 and the attaching enhanced structure 13-111 to connect the first elastic member 13-120 to the holder 13-110. In detail, the attaching enhanced structure 13-111 includes a first attaching surface 13-S1, a second attaching surface 13-S2, a third attaching surface 13-S3, a fourth attaching surface 13-s4, a fifth attaching surface 13-S5, a sixth attaching surface 13-S6, a seventh attaching surface 13-S7, an eighth attaching surface 13-S8, a ninth attaching surface 13-S9, a first receiving space 13-R1, a second receiving space 13-R2, a first protruding structure 13-T1, and a second protruding structure 13-T2.

The first attaching surface 13-S1 is the top surface of the holder 13-110, and is substantially perpendicular to the main axis 13-AX1 of the optical member driving mechanism 13-10. The first receiving space 13-R1 is formed on the first attaching surface 13-S1, and has a concave structure recessed from the first attaching surface 13-S1.

The second attaching surface 13-S2 and the third attaching surface 13-S3 are disposed in the first receiving space 13-R1. The lateral surface of the first receiving space 13-R1 can be formed by the second attaching surface 13-S2, and the bottom surface of the first receiving space 13-R1 can be formed by the third attaching surface 13-S3. In other words, the second attaching surface 13-S2 is adjacent and connected to the first attaching surface 13-S1, and the third attaching surface 13-S3 is adjacent and connected to the second attaching surface 13-S2. In this embodiment, the first attaching surface 13-S1 is parallel to the third attaching surface 13-S3, and the second attaching surface 13-S2 is not parallel to the third attaching surface 13-S3 and the main axis 13-AX1.

The first protruding structure 13-T1 protrudes from the third attaching surface 13-S1. As seen from the main axis 13-AX1, the first receiving space 13-R1 surrounds the first protruding structure 13-T1. The fourth attaching surface 13-S4 and the fifth attaching surface 13-S5 are disposed on the first protruding structure 13-T1, wherein the fourth attaching surface 13-S4 is adjacent and connected to the third attaching surface 13-S3, and the fifth attaching surface 13-S5 is adjacent and connected to the fourth attaching surface 13-S4. The first attaching surface 13-S1 and the fifth attaching surface 13-S5 face the same direction. In this embodiment, the fourth attaching surface 13-S4 is not parallel to the third attaching surface 13-S3, the fifth attaching surface 13-S5, and the main axis 13-AX1, and the fifth attaching surface 13-S5 is parallel to the third attaching surface 13-S3.

The second receiving space 13-R2 is formed on the fifth attaching surface 13-S5, and has a concave structure recessed from the fifth attaching surface 13-S5. The sixth attaching surface 13-S6 and the seventh attaching surface 13-S7 are disposed in the second receiving space 13-R2. The lateral surface of the second receiving space 13-R2 can be formed by the sixth attaching surface 13-S6, and the bottom surface of the second receiving space 13-R2 can be formed by the seventh attaching surface 13-S7. In other words, the sixth attaching surface 13-S6 is adjacent and connected to the fifth attaching surface 13-S5, and the seventh attaching surface 13-S7 is adjacent and connected to the sixth attaching surface 13-S6. In this embodiment, the sixth attaching surface 13-S6 is not parallel to the fifth attaching surface 13-S5, the seventh attaching surface 13-S7, and the main axis 13-AX1, and the seventh attaching surface 13-S7 is parallel to the fifth attaching surface 13-S5.

The second protruding structure 13-T2 protrudes from the seventh attaching surface 13-S7. As seen from the main axis 13-AX1, the second receiving space 13-R2 surrounds the second protruding structure 13-T2. The eighth attaching surface 13-S8 and the ninth attaching surface 13-S9 are disposed on the second protruding structure 13-T2, wherein the eighth attaching surface 13-S8 is adjacent and connected to the seventh attaching surface 13-S7, and the ninth attaching surface 13-S9 is adjacent and connected to the eighth attaching surface 13-S8. The ninth attaching surface 13-S9 and the fifth attaching surface 13-S5 face the same direction. In this embodiment, the eighth attaching surface 13-S8 is not parallel to the seventh attaching surface 13-S7, the ninth attaching surface 13-S9, and the main axis 13-AX1, and the ninth attaching surface 13-S9 is parallel to the fifth attaching surface 13-S5.

As seen from the direction that is perpendicular to the main axis 13-AX1, the second attaching surface 13-S2, the third attaching surface 13-S3, and the fourth attaching surface 13-S4 can form a U-shaped structure between the first attaching surface 13-S1 and the fifth attaching surface 13-S5, and the sixth attaching surface 13-S6, the seventh attaching surface 13-S7, and the eighth attaching surface 13-S8 can form a U-shaped structure between the fifth attaching surface 13-S5 and the ninth attaching surface 13-S9.

In this embodiment, the third attaching surface 13-S3 and the seventh attaching surface 13-S7 are coplanar. Since the height of the first protruding structure 13-T1 and the height of the second protruding structure 13-T2 are less than the depth of the first receiving space 13-R1, and the height of the first protruding structure 13-T1 is less than the height of the second protruding structure 13-T2, the first attaching surface 13-S1, the fifth attaching surface 13-S5, and the ninth attaching surface are not coplanar. As seen from the direction that is perpendicular to the main axis 13-AX1, the ninth attaching surface 13-S9 is disposed between the first attaching surface 13-S1 and the fifth attaching surface 13-S5 along the main axis 13-AX1.

Furthermore, in this embodiment, the width of the seventh attaching surface 13-S7 is less than the width of the third attaching surface. That is, as seen from the direction that is perpendicular to the main axis 13-AX1, the shortest distance between the sixth attaching surface 13-S6 and the eighth attaching surface 13-S8 is less than the shortest distance between the second attaching surface 13-S2 and the fourth attaching surface 13-S4. In order to make the first adhesive member 13-P1 smoothly fill the first receiving space 13-R1 and the second receiving space 13-R2, the angle between the sixth attaching surface 13-S6 and the seventh attaching surface 13-S7 can be larger than the angle between the second attaching surface 13-S2 and the third attaching surface 13-S3, and the angle between the seventh attaching surface 13-S7 and the eighth attaching surface 13-S8 can be larger than angle between the third attaching surface 13-S3 and the fourth attaching surface 13-S4.

Owing to the aforementioned structure, when the first adhesive member 13-P1 adheres the connecting section 13-121 of the first elastic member 13-120 and the attaching enhanced structure 13-111, the first adhesive member 13-P1 can smoothly enter the first receiving space 13-R1 and the second receiving space 13-R2, and directly contact the first attaching surface 13-S1, the second attaching surface 13-S2, the third attaching surface 13-S3, the fourth attaching surface 13-S4, the fifth attaching surface 13-S5, the sixth attaching surface 13-S6, the seventh attaching surface 13-S7, the eighth attaching surface 13-S8, and the ninth attaching surface 13-S9. The contact area can be greatly increased, so that the adhesive reliability between the holder 13-110 and the first elastic member 13-120 can be effectively enhanced.

In this embodiment, the first adhesive member 13-P1 and the second adhesive member 13-P2 can include same material. Therefore, the Young's modulus of the cured first adhesive member 13-P1 is substantially the same as that of the cured second adhesive member 13-P2. For example, the first adhesive member 13-P1 and the second adhesive member 13-P2 can be light curing glue. In other words, the first adhesive member 13-P1 and the second adhesive member 13-P2 can be cured by providing light.

Referring to FIG. 156 to FIG. 158, similar to the first elastic member 13-120, the second elastic member 13-130 can be a sheet metal spring having a plate structure. The second elastic member 13-130 is perpendicular to the main axis 13-AX1 and can be divided into at least one connecting section 13-131, at least one connecting section 13-132, and at least one string section 13-133. The connecting section 13-131 is affixed to the holder 13-110 via a third adhesive member 13-P3, and the connecting section 13-132 is affixed to the frame 13-140 via a fourth adhesive member 13-P4. The string section 13-133 is disposed between the connecting section 13-131 and the connecting section 13-132, and connects the connecting section 13-131 to the connecting section 13-132.

In this embodiment, the third adhesive member 13-P3 and the fourth adhesive member 13-P4 can be the same as the material of the second adhesive member 13-P2. Therefore, the Young's modulus of the cured second adhesive member 13-P2 is substantially the same as that of the cured third adhesive member 13-P3 and that of the cured fourth adhesive member 13-P4.

The first driving assembly 13-200 includes a driving coil 13-210 and at least one magnetic member 13-220, wherein the driving coil 13-210 is disposed on the holder 13-110, and the magnetic member 13-220 is affixed to the frame 13-140. When a current flows through the driving coil 13-210, an electromagnetic effect is generated between the driving coil 13-210 and the magnetic member 13-220, and a driving force can be applied. Therefore, the holder 13-110 and the optical member 13-30 disposed thereon can be driven to move relative to the frame 13-140.

As shown in FIG. 160 and FIG. 161, the end of the driving coil 13-210 winds around a winding portion 13-112 of the movable portion 13-110, and is connected to the connecting section 13-121 of the first elastic member 13-120 via a fifth adhesive member 13-P5. For example, the fifth adhesive member 13-P5 is conductive glue. After curing, the fifth adhesive member 13-P5 can include a conductive region 13-P51 and an adhesive region 13-P52. The conductive region 13-P51 is in contact with the driving coil 13-210 and the connecting section 13-121. The adhesive region 13-P52 covers the conductive region 13-P51. Since the conductive region 13-P51 and the adhesive region 13-P52 respectively include metal and resin, the resistivity of the conductive region 13-P51 is less than that of the adhesive region 13-P52. The driving coil 13-210 and the first elastic member 13-120 can be electrically connected to each other through the conductive region 13-P51.

In this embodiment, the conductivity of the conductive region 13-P51 is greater than that of the cured first adhesive member 13-P1, and the Young's modulus of the adhesive region 13-P52 is greater than that of the cured first adhesive member 13-P1.

Moreover, as shown in FIG. 158, in this embodiment, the fourth adhesive member 13-P4 is in direct contact with the magnetic member 13-220, so that the connecting section 13-132 can further affixed to the magnetic member 13-220.

FIG. 162 is a cross-sectional view along line 13-B-13-B in FIG. 156. Referring to FIG. 157 and FIG. 162, the fixed portion 13-300 includes a housing 13-310 and a base 13-320. The housing 13-310 and the base 13-320 can be fixedly connected to each other, so as to form a receiving space 13-R therebetween. The movable portion 13-100 is accommodated in the receiving space 13-R.

The housing 13-310 includes a top wall 13-311 and at least one lateral wall 13-312. The top wall 13-311 has a plate structure, and is perpendicular to the main axis 13-AX1. The lateral wall 13-312 has a plate structure too. The lateral wall 13-312 is connected to the edge of the top wall 13-311 and extended from the edge toward the base 13-320. Therefore, the lateral wall 13-312 is not perpendicular to the main axis 13-AX1.

The side surface of the base 13-320 facing the lateral wall 13-312 has a stepped structure, so that the side surface of the base 13-320 includes a surface 13-321 and a surface 13-322. A first gap 13-G1 is formed between the surface 13-321 and the lateral wall 13-312, and a second gap 13-G2 is formed between the surface 13-322 and the lateral wall 13-312. The first gap 13-G1 is communicated with the second gap 13-G2. Since the surface 13-321 is closer to the lateral wall 13-312 than the surface 13-322, the shortest distance between the housing 13-310 and the base 13-320 in the first gap 13-G1 is less than the shortest distance between the housing 13-310 and the base 13-320 in the second gap 13-G2.

In this embodiment, the housing 13-310 can be attached to the base 13-320 via a sixth adhesive member 13-P6 and a seventh adhesive member 13-P7. The sixth adhesive member 13-P6 can be filled into the first gap 13-G1. After the sixth adhesive member 13-P6 is cured, the seventh adhesive member 13-P7 can be filled into the second gap 13-G2. Since the surface 13-322 is closer to the external environment of the optical member driving mechanism 13-10 than the surface 13-321 when the housing 13-310 and the base 13-320 are assembled, the shortest distance between the first gap 13-G1 and the receiving space 13-R is less than the shortest distance between the second gap 13-G2 and the receiving space 13-R. Therefore, when the housing 13-310 and the base 13-320 are affixed to each other by using the sixth adhesive member 13-P6 and the seventh adhesive member 13-P7, the seventh adhesive member 13-P7 is exposed from the base 13-320, and the sixth adhesive member 13-P6 is not exposed therefrom.

It should be noted that, the adhesive material of the sixth adhesive member 13-P6 is different from that of the seventh adhesive member 13-P6. For example, the sixth adhesive member 13-P6 is heat curing glue, and the seventh adhesive member 13-P7 is light curing glue. In other words, the sixth adhesive member 13-P6 can be cured by heating, and the seventh adhesive member 13-P7 can be cured by providing light. The viscosity of the uncured sixth adhesive member 13-P6 is less than that of the uncured seventh adhesive member 13-P7. The Young's modulus of the cured sixth adhesive member 13-P6 is greater than that of the cured seventh adhesive member 13-P7. The sixth adhesive member 13-P6 and the seventh adhesive member 13-P7 can be made of suitable resin.

Moreover, as seen from the main axis 13-AX1, the first gap 13-G1 continuously and uninterruptedly surrounds the base 13-320, so that the sixth adhesive member 13-P6 filled in the first gap 13-G1 continuously and uninterruptedly surrounds the base 13-320. The gap between the housing 13-310 and the base 13-320 can be fully sealed, so as to prevent the liquid or the external objects entering the receiving space 13-R.

Each of the suspension wires 13-400 includes a longitudinal structure. The suspension wires 13-400 are extended along the direction that is perpendicular to the first elastic member 13-120 and pass through the base 13-320. The opposite ends of each of the suspension wires 13-400 are respectively affixed to the first elastic member 13-120 and the base 13-320 via eighth adhesive members 13-P8, so as to restrict the moving range of the movable portion 13-100 relative to the fixed portion 13-300. In detail, an eighth adhesive members 13-P8 at an end of one of the suspension wires 13-400 is in contact with this suspension wire 13-400 and the first elastic member 13-120, so that the end of this suspension wires 13-400 can be affixed to the first elastic member 13-120. Another eighth adhesive members 13-P8 at another end of this suspension wire 13-400 is in contact with this suspension wire 13-400 and the seventh adhesive member 13-P7, so that the another end of this suspension wires 13-400 can be affixed to the base 13-320.

In this embodiment, the suspension wires 13-400 are extended into the second gap 13-G2. Therefore, at least a portion of each of the suspension wires 13-400 is accommodated in the second gap 13-G2. The material of the eighth adhesive member 13-P8 can be the same as that of the seventh adhesive member 13-P2, so that the Young's modulus of the cured eighth adhesive member 13-P8 is substantially the same as that of the cured seventh adhesive member 13-P7. In some embodiments, the seventh adhesive member 13-P7 and the eighth adhesive member 13-P8 can be integrally formed as one piece. In this embodiment, each of the suspension wire 13-400 can be referred as a third elastic member.

The second driving assembly 13-500 can include a circuit board 13-510. The circuit board 13-510 is disposed on the base 13-320 and accommodated in the receiving space 13-R. When a current flows through the circuit on the circuit board 13-510, an electromagnetic effect is generated between the circuit and the magnetic member 13-220, and a driving force can be applied. Therefore, the whole movable portion 13-100 can be driven to move relative to the fixed portion 13-300.

As shown in FIG. 158, the circuit board 13-510 can be electrically connected to a circuit assembly 13-W (such as a wire) at an electrical contact 13-Wi, wherein the circuit assembly 13-W is embedded in the base 13-320. In this embodiment, the optical member driving mechanism 13-10 includes a ninth adhesive member 13-P9 to contact and cover the electrical contact 13-Wi.

As shown in FIG. 157 and FIG. 163, the position sensing assembly 13-600 is disposed on the base 13-320 and configured to detect the movement of the movable portion 13-100 and/or the holder 13-110 relative to the fixed portion 13-300. For example, the position sensing assembly 13-600 can be a hall sensor, a magnetoresistance effect sensor (MR sensor), a giant magnetoresistance effect sensor (GMR sensor), a tunneling magnetoresistance effect sensor (TMR sensor), or a fluxgate sensor.

The position sensing assembly 13-600 can be attached to the base 13-320 via a tenth adhesive member 13-P10. The material of the ninth adhesive member 13-P9 and the material of the tenth adhesive member 13-P10 can be the same as the material of the seventh adhesive member 13-P7. Thus, the ninth adhesive member 13-P9 and the tenth adhesive member 13-P10 can be light curing glue. The Young's modulus of the cured seventh adhesive member 13-P7 is substantially the same as that of the cured ninth adhesive member 13-P9 and that of the cured tenth adhesive member 13-P10. In addition, as seen from the exterior of the optical member driving mechanism 13-10, the eighth adhesive member 13-P8, the ninth adhesive member 13-P9, and the tenth adhesive member 13-P10 are exposed from the base 13-320.

Referring to FIG. 164 and FIG. 1551, in another embodiment, in order to make the first elastic member 13-120 affix to the holder 13-110 more securely, the holder 13-100 further includes a connecting portion 13-112 disposed beside the attaching enhanced structure 13-111. The connecting portion 13-112 includes a protruding section 13-112A and a positioning section 13-112B, wherein the protruding section 13-112A protrudes from the first attaching surface 13-S1 and passes through an opening 13-124 of the first elastic member 13-120, and the positioning section 13-112B is connected to the protruding section 13-112A. As seen from the direction that is perpendicular to the main axis 13-AX1, the protruding section 13-112A is disposed between the positioning section 13-112B and the first attaching surface 13-S1. As seen from the main axis 13-AX1, the largest dimensions of the positioning section 13-112B are greater than that of the protruding section 13-112A in the direction that is perpendicular to the main axis 13-AX1. Thus, the positioning section 13-112B can restrict the position of the first elastic member 13-120 relative to the holder 13-110 along the main axis 13-AX1. In this embodiment, the protruding section 13-112A and the positioning section 13-112B include same material, and are integrally formed as one piece. The positioning section 13-112B can be formed by riveting. Thus, there is no glue, which used to connect the protruding section 13-112A to the positioning section 13-112B, disposed between the protruding section 13-112A to the positioning section 13-112B.

Furthermore, in this embodiment, an enhanced adhesive member 13-P11 can be disposed on the positioning section 13-112B. The enhanced adhesive member 13-P11 is in direct contact with the positioning section 13-112B, so that the first elastic member 13-120 can be affixed to the holder 13-110 more securely. The material of the enhanced adhesive member 13-P11 is the same as the material of the first adhesive member 13-P1, and is different from the material of the positioning section 13-112B. In some embodiments, the enhanced adhesive member 13-P11 and the first adhesive member 13-P1 can be connected to each other, and can be integrally formed as one piece.

In summary, an optical member driving mechanism is provided, including a movable portion and a first adhesive member. The movable portion includes a first member and a second member, wherein the first member is connected to the second member via the first adhesive member.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism for connecting an optical member, comprising:
    a fixed portion, comprising:
        a first member; and
        a second member, fixedly connected to the first member;
    a first adhesive member, wherein the first member is fixedly connected to the second member via the first adhesive member;
    a movable portion, configured to connect the optical member;
    a driving assembly, configured to drive the movable portion to move relative to the fixed portion;
    a second adhesive member, wherein the first member is fixedly connected to the second member via the second adhesive member;
    a first gap, formed between the first member and the second member and configured to receive the first adhesive member; and
    a second gap, configured to receive the second adhesive member;
    wherein:
    as seen from an exterior of the optical member driving mechanism, at least a portion of the second gap is exposed, and at least a portion of the second adhesive member is exposed;
    a shortest distance between the first member and the second member in the first gap is different from a shortest distance between the first member and the second member in the second gap;
    the first gap is communicated with the second gap;
    a receiving space is formed between the first member and the second member, and the receiving space is configured to receive the movable portion;
    a shortest distance between the first gap and the receiving space is different from a shortest distance between the second gap and the receiving space;
    a viscosity of the uncured first adhesive member is different from a viscosity of the uncured second adhesive member.

2. The optical member driving mechanism as claimed in claim 1, wherein
    the Young's modulus of the cured first adhesive member is different from the Young's modulus of the cured second adhesive member;
    the first adhesive member is in direct contact with the second adhesive member;
    the first member comprises a top wall and a lateral wall, wherein the top wall has a plate structure and is perpendicular to a main axis, the lateral wall has a plate structure and extends from an edge of the top wall, and an extending direction of the lateral wall is not perpendicular to the main axis;
    as seen from the main axis, the first gap surrounds the second member;

the second gap is formed between the first member and the second member;
as seen from an exterior of the optical member driving mechanism, the first gap is not exposed;
as seen from the exterior of the optical member driving mechanism, the first adhesive member is not exposed.

3. The optical member driving mechanism as claimed in claim 2, wherein the optical member driving mechanism further comprises:
a first elastic member, wherein the movable portion is movably connected to the fixed portion via the first elastic member;
a third adhesive member, wherein the first elastic member is connected to the fixed portion via the third adhesive member;
a fourth adhesive member, wherein the first elastic member is connected to the movable portion via the fourth adhesive member;
a second elastic member, wherein the movable portion is movably connected to the fixed portion via the second elastic member;
a fifth adhesive member, wherein the second elastic member is connected to the fixed portion via the fifth adhesive member;
a sixth adhesive member, wherein the second elastic member is connected to the movable portion via the sixth adhesive member; and
a third member, fixedly disposed on the first member;
wherein the Young's modulus of the cured third adhesive member is different from the Young's modulus of the cured first adhesive member;
the Young's modulus of the cured third adhesive member is the same as the Young's modulus of the cured second adhesive member;
the Young's modulus of the cured fourth adhesive member is the same as the Young's modulus of the cured third adhesive member;
the Young's modulus of the cured fifth adhesive member is different from the Young's modulus of the cured third adhesive member and/or the Young's modulus of the cured fourth adhesive member;
the Young's modulus of the cured sixth adhesive member is different from the Young's modulus of the cured fifth adhesive member;
the first elastic member is connected to the second member via the third adhesive member;
the second elastic member is connected to the first member via the fifth adhesive member;
the third adhesive member is deformable to disperse excessive stress;
the fourth adhesive member is deformable to disperse excessive stress;
the sixth adhesive member is deformable to disperse excessive stress;
a magnetic member of the driving assembly is connected to the fixed portion via the fifth adhesive member;
the third member is fixedly connected to the first member via the fifth adhesive member;
the second elastic member is connected to the third member via the fifth adhesive member;
the fifth adhesive member is in direct contact with the first member;
the fifth adhesive member is in direct contact with the third member;
the fifth adhesive member is in direct contact with the magnetic member; and
the fifth adhesive member is in direct contact with the second elastic member.

4. The optical member driving mechanism as claimed in claim 3, wherein the first elastic member further comprises:
a first fixed portion connecting section, fixedly connected to the fixed portion via the third adhesive member;
a first movable portion connecting section, fixedly connected to the movable portion via the fourth adhesive member; and
a first elastic deformable section, wherein the first movable portion connecting section is connected to the first fixed portion connecting section via the first movable portion connecting section, the first fixed portion connecting section is fixedly connected to the second member via the third adhesive member, and the first elastic deformable section is deformable to disperse excessive stress;
wherein the second elastic member further comprises:
a second fixed portion connecting section, fixedly connected to the fixed portion via the fifth adhesive member;
a second movable portion connecting section, fixedly connected to the movable portion via the sixth adhesive member; and
a second elastic deformable section, wherein the second movable portion connecting section is connected to the second fixed portion connecting section via the second movable portion connecting section, and the second elastic deformable section is deformable to disperse excessive stress.

5. The optical member driving mechanism as claimed in claim 4, wherein the first adhesive member is cured by heating;
the second adhesive member is cured by providing light;
the third adhesive member is cured by providing light;
the fourth adhesive member is cured by providing light;
the fifth adhesive member is cured by heating; and
the sixth adhesive member is cured by providing light.

6. The optical member driving mechanism as claimed in claim 3, wherein the optical member driving mechanism further comprises a seventh adhesive member, configured to electrically connect to the driving assembly;
the cured seventh adhesive member comprises a conductive region and an adhesive region;
the adhesive region includes resin;
the conductive region includes metal;
the Young's modulus of the adhesive region is different from the Young's modulus of the cured third adhesive member;
the Young's modulus of the adhesive region is different from the Young's modulus of the cured fifth adhesive member;
the movable portion is connected to the first elastic member via the seventh adhesive member;
the first elastic member is connected to a driving coil of the driving assembly via the seventh adhesive member; and
the seventh adhesive member is cured by heating.

7. The optical member driving mechanism as claimed in claim 6, wherein the optical member driving mechanism further comprises an eighth adhesive member, configured to electrically connect to the driving assembly;
the eighth adhesive member includes metal;
the Young's modulus of the cured eighth adhesive member is different from the Young's modulus of the cured fifth adhesive member;

the first elastic member is connected to the second member via the eighth adhesive member; and the melting point of the eighth adhesive member is higher than the curing temperature of the seventh adhesive member.

8. The optical member driving mechanism as claimed in claim 3, wherein the optical member driving mechanism further comprises a ninth adhesive member, and the ninth adhesive member comprises a damping member;

the ninth adhesive member is in direct contact with at least one of the movable portion, the fixed portion, the first elastic member, and the second elastic member; and the Young's modulus of the cured ninth adhesive member is different from the Young's modulus of the cured fourth adhesive member.

9. The optical member driving mechanism as claimed in claim 8, wherein the first member further comprises a first tapered structure;

the first tapered structure corresponds to the first gap, and has a first surface facing the first gap;

the first tapered structure further has a second surface, the first surface is not perpendicular to the second surface, and the first surface and the second surface face different directions;

the first surface is not parallel to the second surface;

the first surface is parallel to the main axis;

the second surface is not parallel to the main axis;

the first tapered structure corresponds to the second gap;

the first surface faces the second gap;

the first surface has a plane structure;

as seen from a direction that is perpendicular to the first surface, the first surface overlaps the first gap, and the first surface overlaps the second gap;

the first adhesive member is in direct contact with the first surface;

the second adhesive member is in direct contact with the second surface;

the second member comprises a second tapered structure corresponding to the first gap;

the second tapered structure has a third surface, wherein the third surface faces the first gap;

the second tapered structure has a fourth surface, wherein the third surface is not perpendicular to the fourth surface, and the third surface and the fourth surface face different directions;

the third surface is parallel to the main axis;

the third surface and the first surface face different directions;

the fourth surface is not parallel to the main axis;

the first adhesive member is in direct contact with the third surface;

the second adhesive member is in direct contact with the third surface;

the second tapered structure corresponds to the second gap;

the third surface faces the second gap;

as seen from a direction that is perpendicular to the third surface, the third surface overlaps the first gap, and the third surface overlaps the second gap;

the ninth adhesive member is in direct contact with the fourth surface;

as seen from the direction that is perpendicular to the main axis, the tapering direction of the first tapered structure is different from the tapering direction of the second tapered structure;

as seen from the direction that is perpendicular to the first surface, the first tapered structure overlaps the second tapered structure;

the third adhesive member is in direct contact with a first attaching surface of the fixed portion; and the third adhesive member is in direct contact with a second attaching surface of the first elastic member, and the first attaching surface and the second attaching surface face the same direction.

* * * * *